US012642746B2

(12) United States Patent
Wood et al.

(10) Patent No.: US 12,642,746 B2
(45) Date of Patent: Jun. 2, 2026

(54) SYSTEMS, METHODS, AND APPARATUSES FOR PRODUCING AND PACKAGING FLUIDS

(71) Applicant: DEKA Products Limited Partnership, Manchester, NH (US)

(72) Inventors: Ryan P. Wood, Bedford, NH (US); Michael J. Haynes, Manchester, NH (US); Hans Erik Johnson, Salem, NH (US); Thaddeus Joseph Hughes, Manchester, NH (US); Robert Houston Lawler, Jr., Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 10 days.

(21) Appl. No.: 19/024,457

(22) Filed: Jan. 16, 2025

(65) Prior Publication Data

US 2025/0177254 A1 Jun. 5, 2025

Related U.S. Application Data

(63) Continuation of application No. 18/634,275, filed on Apr. 12, 2024, now Pat. No. 12,239,607, which is a
(Continued)

(51) Int. Cl.

*A61J 1/20* (2006.01)
*A61J 1/10* (2006.01)
(Continued)

(52) U.S. Cl.

CPC ............... *A61J 1/2013* (2015.05); *A61J 1/10* (2013.01); *A61J 1/2037* (2015.05); *A61J 1/2079* (2015.05);
(Continued)

(58) Field of Classification Search

CPC ...... A61J 1/2013; A61J 1/2037; A61J 1/2079; A61J 1/10; A61J 2205/60; B01F 35/7137; B65B 3/003
(Continued)

(56) References Cited

U.S. PATENT DOCUMENTS

| | | | |
|---|---|---|---|
| 4,090,541 | A | 5/1978 | Cammarata, III et al. |
| D263,746 | S | 4/1982 | Johnson et al. |

(Continued)

FOREIGN PATENT DOCUMENTS

| | | | |
|---|---|---|---|
| EP | 3677345 | A1 | 7/2007 |
| JP | 2001112847 | A | 4/2001 |

(Continued)

OTHER PUBLICATIONS

Medical Water / Drug Production, DEKA, retrieved Dec. 2, 2025, URL: https://dekaresearch.com/innovations/.

(Continued)

*Primary Examiner* — Christopher M Afful

(74) *Attorney, Agent, or Firm* — Toohey Law Group, LLC; Kevin D. Mandro

(57) ABSTRACT

A liquid concentrate generation system may comprise a manifold having an inlet receptacle including a first piercing member, an outlet receptacle including a second piercing member, and a flow channel connecting the inlet receptacle and outlet receptacle. The system may further comprise a cartridge having an inlet port and an outlet port sealed by a respective first and second cover. The inlet and outlet port may be respectively configured to displace within the inlet receptacle and outlet receptacle from an unspiked position to a spiked position. First and second piercing members may be in communication with the flow channel and spaced apart respectively from the first and second cover in the unspiked position. The first and second piercing members may be
(Continued)

isolated from the flow channel and may respectively puncture the first and second cover in the spiked position.

25 Claims, 230 Drawing Sheets

Related U.S. Application Data continuation of application No. 17/484,425, filed on Sep. 24, 2021, now Pat. No. 11,980,587.

(60) Provisional application No. 63/118,410, filed on Nov. 25, 2020.

(51) Int. Cl.
*B01F 35/71* (2022.01)
*B65B 3/00* (2006.01)

(52) U.S. Cl.
CPC .......... *B01F 35/7137* (2022.01); *B65B 3/003* (2013.01); *A61J 2205/60* (2013.01)

(58) Field of Classification Search
USPC .......................................................... 604/408
See application file for complete search history.

(56) References Cited

U.S. PATENT DOCUMENTS

| | | | |
|---|---|---|---|
| D272,762 S | 2/1984 | Tanner, II | |
| 4,547,900 A | 10/1985 | Larkin et al. | |
| 4,601,704 A | 7/1986 | Larkin | |
| 4,602,910 A | 7/1986 | Larkin | |
| 4,610,684 A | 9/1986 | Knox et al. | |
| 4,784,495 A | 11/1988 | Jonsson et al. | |
| 4,786,279 A | 11/1988 | Wilkinson et al. | |
| D350,822 S | 9/1994 | Lanigan | |
| D350,823 S | 9/1994 | Lanigan | |
| 5,462,526 A | 10/1995 | Barney et al. | |
| 5,746,719 A | 5/1998 | Farra et al. | |
| D397,789 S | 9/1998 | Barney et al. | |
| D398,051 S | 9/1998 | Lanigan et al. | |
| D400,246 S | 10/1998 | Niedospial, Jr. et al. | |
| D400,252 S | 10/1998 | Ropiak et al. | |
| D407,816 S | 4/1999 | Barney et al. | |
| D408,533 S | 4/1999 | Niedospial, Jr. et al. | |
| D409,748 S | 5/1999 | Lanigan et al. | |
| 5,928,213 A | 7/1999 | Barney et al. | |
| 5,944,709 A | 8/1999 | Barney et al. | |
| D416,477 S | 11/1999 | Flint | |
| 5,993,425 A * | 11/1999 | Kriesel | A61M 5/152 604/191 |
| 6,179,821 B1 | 1/2001 | Caspary et al. | |
| 6,183,460 B1 | 2/2001 | Smith et al. | |
| D442,278 S | 5/2001 | Rury | |
| 6,325,775 B1 * | 12/2001 | Thom | A61M 1/362266 210/85 |
| 6,391,623 B1 * | 5/2002 | Besemer | B01F 33/30 436/501 |
| 6,428,518 B1 | 8/2002 | Brengle et al. | |
| D539,904 S | 4/2007 | Inoue et al. | |
| D541,414 S | 4/2007 | Wallace | |
| D560,799 S | 1/2008 | Inoue et al. | |
| D567,940 S | 4/2008 | Inoue et al. | |
| D594,115 S | 6/2009 | Osterlin et al. | |
| D594,970 S | 6/2009 | Inoue et al. | |
| D600,796 S | 9/2009 | Inoue et al. | |
| D603,042 S | 10/2009 | Sato et al. | |
| D603,957 S | 11/2009 | Sato et al. | |
| D606,197 S | 12/2009 | Collins et al. | |
| D612,936 S | 3/2010 | Cremonese | |
| D615,189 S | 5/2010 | McGill et al. | |
| D615,191 S | 5/2010 | McGill et al. | |
| D616,539 S | 5/2010 | McGill | |
| D618,340 S | 6/2010 | Marshall | |
| D623,734 S | 9/2010 | Tsuruoka et al. | |
| D650,896 S | 12/2011 | McGill et al. | |
| D653,332 S | 1/2012 | Pittet | |
| D653,751 S | 2/2012 | Ecabert et al. | |
| 8,142,624 B2 | 3/2012 | Kim | |
| D684,260 S | 6/2013 | Lund et al. | |
| D688,794 S | 8/2013 | Ueda et al. | |
| 8,518,233 B2 | 8/2013 | Kim | |
| D699,343 S | 2/2014 | Clements et al. | |
| D751,190 S | 3/2016 | Ueda et al. | |
| D777,323 S | 1/2017 | Honda et al. | |
| D784,519 S | 4/2017 | Nordquist et al. | |
| D784,520 S | 4/2017 | Nordquist et al. | |
| D785,785 S | 5/2017 | Logarzo | |
| D862,691 S | 10/2019 | Fenton | |
| D879,953 S | 3/2020 | Ljungloelf et al. | |
| 10,632,807 B2 | 4/2020 | Galla et al. | |
| D900,311 S | 10/2020 | Henaut et al. | |
| D908,869 S | 1/2021 | Kumar et al. | |
| D915,581 S | 4/2021 | Rose | |
| D927,683 S | 8/2021 | Blin et al. | |
| 11,110,032 B2 | 9/2021 | Bazin | |
| D958,537 S | 7/2022 | Balestri et al. | |
| D978,677 S | 2/2023 | Naughton et al. | |
| D979,090 S | 2/2023 | Suenaga | |
| D988,510 S | 6/2023 | Arnault | |
| D988,538 S | 6/2023 | Divekar et al. | |
| D989,952 S | 6/2023 | Suarez | |
| 2004/0134802 A1 | 7/2004 | Inoue et al. | |
| 2004/0141886 A1 | 7/2004 | Py et al. | |
| 2005/0087456 A1 | 4/2005 | Oka et al. | |
| 2005/0177128 A1 | 8/2005 | Nagao et al. | |
| 2007/0187335 A1 | 8/2007 | Gaignet | |
| 2008/0015494 A1 * | 1/2008 | Santini | A61M 5/14248 604/65 |
| 2008/0033390 A1 | 2/2008 | Kitagawa et al. | |
| 2009/0145509 A1 | 6/2009 | Baker et al. | |
| 2010/0206400 A2 | 8/2010 | Winkler et al. | |
| 2013/0116665 A1 * | 5/2013 | Humayun | A61M 5/162 604/891.1 |
| 2014/0107835 A1 | 4/2014 | Biasi et al. | |
| 2019/0298231 A1 * | 10/2019 | Grant | F04B 43/026 |
| 2019/0298653 A1 | 10/2019 | Yamanouchi et al. | |
| 2019/0316948 A1 | 10/2019 | Karol et al. | |
| 2020/0032947 A1 | 1/2020 | Hasunuma | |
| 2021/0150699 A1 | 5/2021 | Kappeler et al. | |
| 2023/0240941 A1 | 8/2023 | Calasso et al. | |
| 2024/0277574 A1 | 8/2024 | Wood et al. | |
| 2025/0178931 A1 | 6/2025 | Kamen et al. | |
| 2025/0255779 A1 | 8/2025 | Wood et al. | |

FOREIGN PATENT DOCUMENTS

| | | |
|---|---|---|
| JP | 2001269393 A | 10/2001 |
| JP | 2005281238 A | 10/2005 |
| JP | 2010132602 A | 6/2010 |
| JP | 2017100777 A | 6/2017 |
| JP | 2017217195 A | 12/2017 |
| WO | WO2023154256 A1 | 8/2023 |

OTHER PUBLICATIONS

ASPR Press Office. (Jun. 5, 2025). Trump Administration set to demonstrate point-of-care technology to help prevent IV fluid shortages. https://aspr.hhs.gov/newsroom/Pages/IV-Fluid-Shortages-5June2025.aspx.

NextMed Health. "Dean Kamen—The Dean of Invention: Lessons on Inventing the Future & Inspiring the Next Generation." YouTube, May 22, 2025 (Presented Mar. 30, 2025), https://www.youtube.com/watch?v=5-4MMgcScwY&t=855s.

DEKA Research & Development Corp. NextMed Health Deka R&D Display Booth (Mar. 30, 2025). NextMed Health 2025. San Diego; The Hotel Del Coronado.

DEKA Research & Development Corp. Meeting in the Millyard Deka R&D Display Booth (May 20, 2025). Meeting in the Millyard 2025. Manchester, New Hampshire; 150 Dow Street.

(56) References Cited

OTHER PUBLICATIONS

Lim, C. W., & Son, K. C. (2024). Deep Learning Model-Based Real-Time Inspection System for Foreign Particles inside Flexible Fluid Bags. Applied Sciences, 14(17), 7960. https://doi.org/10.3390/app14177960.

* cited by examiner

SYSTEMS, METHODS, AND APPARATUSES FOR PRODUCING AND PACKAGING FLUIDS

CROSS REFERENCE TO RELATED APPLICATIONS

The present application is a continuation of U.S. Ser. No. 18/634,275, entitled Systems, Methods, and Apparatuses for Producing and Packaging Fluids, filed Apr. 12, 2024, which is a continuation of U.S. Ser. No. 17/484,425, entitled Systems, Methods, and Apparatuses for Producing and Packaging Fluids, filed Sep. 24, 2021, now U.S. Pat. No. 11,980,587, issued May 14, 2024, and claims the benefit of U.S. Provisional Application Ser. No. 63/118,410, entitled Systems, Methods, and Apparatuses for Producing and Packaging Fluids, filed Nov. 25, 2020, each of which being incorporated by reference herein in their entireties.

STATEMENT REGARDING FEDERALLY SPONSORED RESEARCH OR DEVELOPMENT

This invention was made with Government support under Agreement HHSO100201900017C, awarded by HHS. The Government has certain rights in the invention.

BACKGROUND

Field of Disclosure

This disclosure relates to medical fluids. More specifically, this disclosure relates to the generation and packaging of medical fluids.

Description of Related Art

Almost every hospitalized patient is administered saline or a saline based solution. As a result, the quantity of saline solution consumed is very large. More than a billion bags of saline are used per year in the US alone. Despite the demand, there are only a small number of different saline manufactures which provide this solution for the US market. Unfortunately, manufacturing challenges which limit production from one manufacturer can and do cause shortages of saline in the United States. Compounding the issue, these manufactures have uneven market share in regards to all bagged saline products. For instance, 50% of 250 ml or smaller saline bags are provided by a single manufacture. As a result, when such a manufacturer faces production problems, the impact on the availability of that particular type of bag is much greater.

Most recently, the media spotlight has been shown on delays caused in the wake of hurricane Maria which have led to a shortage of small volume saline bags. According to the American Society of Health-System Pharmacists, shortages for large volume bags and bags of saline for irrigation purposes also currently exist. An alternative means of producing medical fluid bags which may perhaps be locatable in the institution using the bag would be desirable.

SUMMARY

In accordance with an embodiment of the present disclosure a constituent cartridge may comprise a first end portion having a first port and a second port which project from a main section of the first end portion. Each of the first and second ports may include a wide region proximal to the main section and a narrow region distal to the main section. The cartridge may further comprise a first cover attached to a distal end of the first port. The cartridge may further comprise a second cover attached to a distal end of the second port. The cartridge may further comprise a second end portion. The cartridge may further comprise an intermediate portion retained between the first end portion and second end portion. The first end portion, second end portion, and intermediate portion may define an interior volume of the cartridge. The cartridge may further comprise a conduit extending through the interior volume and having a first end in fluid communication with the first port via a first flow channel in the first end portion. The conduit may have a second end disposed adjacent the second end portion.

In some embodiments, the first port and second port may project from the main section parallel to one another. In some embodiments, the first port and second port may each have a longitudinal axis which extends along a plane disposed perpendicular to a longitudinal axis of the intermediate portion. In some embodiments, the interior volume may be filled with a crystalline constituent. In some embodiments, the interior volume may be filled with a crystalline salt. In some embodiments, the first cover and second cover may form a seal over the distal end of the respective first and second port and each may include at least a frangible region. In some embodiments, the wide region of the first port and second port may each include a gasket member. In some embodiments, the narrow region of the first port and second port may each include a gasket member. In some embodiments, each of the first and second port may include a first gasket member proximal to the main section and a second gasket member distal to the main section. In some embodiments, the second end of the conduit may include at least one side port. In some embodiments, the constituent cartridge may further comprise a particulate filter disposed between the interior volume and the second port. In some embodiments, the constituent cartridge may further comprise a relief valve. In some embodiments, the first end cap may include a mating shoe configured to couple to a mating interface of an actuation assembly. In some embodiments, the constituent cartridge may further comprise an identification tag. In some embodiments, the constituent cartridge further may comprise an RFID tag. The RFID tag may store at least a unique identifier for the constituent cartridge. In some embodiments, the constituent cartridge may further comprise at least one metal body disposed in the first end portion.

In accordance with another embodiment of the present disclosure a liquid concentrate generation system may comprise a manifold. The manifold may have an inlet receptacle including first piercing member. The manifold may also include an outlet receptacle including a second piercing member. The manifold may also include a flow channel connecting the inlet receptacle and outlet receptacle. The system may further comprise a cartridge having an inlet port and an outlet port sealed by a respective first and second cover. The inlet and outlet port may be respectively configured to displace within the inlet receptacle and outlet receptacle from an unspiked position to a spiked position. The first and second piercing members may be in communication with the flow channel and spaced apart respectively from the first and second cover in the unspiked position. The first and second piercing members may be isolated from the flow channel and respectively puncturing the first and second cover in the spiked position.

In some embodiments, the cartridge may have an interior volume filled at least partially with a solid constituent. In some embodiments, the cartridge may have an interior volume filled at least partially with a crystalline salt. In some embodiments, the first piercing member may include a flow lumen in fluid communication with a fluid supply flow path of the manifold. In some embodiments, the second piercing member may include a flow lumen in fluid communication with a liquid concentrate flow path of the manifold. In some embodiments, the inlet port and outlet port may each include a wide region associated with a first gasket member and a narrow region associated with a second gasket member. In some embodiments, in the unspiked position, the first gasket members of the inlet port and outlet port respectively form a seal against the wall of the inlet receptacle and outlet receptacle and the second gasket members of the inlet port and outlet port may be out of contact with the wall of the inlet receptacle and outlet receptacle respectively. In some embodiments, in the spiked position, the first and second gasket members of the inlet port may form a seal against the wall of the inlet receptacle and the first and second gasket members of the outlet port may form a seal against the wall of the outlet receptacle. In some embodiments, the inlet receptacle and outlet receptacle may each include a wide region and a narrow region. In some embodiments, the first piercing member may be disposed more proximal the narrow region of the inlet receptacle than the wide region of the inlet receptacle and the second piercing member may be disposed more proximal the narrow region of the outlet receptacle than the wide region of the outlet receptacle. In some embodiments, in the spiked position the first piercing member may be in fluid communication with the second piercing member via a flow path from the inlet port, through an interior volume of the cartridge, and to the outlet port. In some embodiments, the system may further comprise an actuation assembly and the cartridge may be configured to couple to a mating interface of the actuation assembly. In some embodiments, the cartridge may include a particulate filter between an interior volume of the cartridge and the outlet port of the cartridge. In some embodiments, the inlet receptacle and outlet receptacle may each be in communication with an expandable volume. In some embodiments, the inlet receptacle and outlet receptacle may include an at least partially displaceable wall.

In accordance with another embodiment of the present disclosure a reservoir feeding apparatus may comprise a conveyer assembly including a motor, a belt, and a set of pulleys. The apparatus may further comprise a least one guide body. The at least one guide body may define a track extending from a first end to an opposing second end of the reservoir feeding apparatus. The apparatus may further comprise a clip stop assembly including a gate member having a displacement range from an open position to a blocking position in which the gate member obstructs access to the second end of the track. The gate member may be biased to the blocking position by a bias member. The apparatus may further comprise a position sensing assembly associated with the track configured to generate at least one data signal which alters in relationship to the position of reservoir clips along the track. The apparatus may further comprise a controller configured to power the motor based at least in part on the at least one data signal.

In some embodiments, the belt may be toothed and a pulley of the set of pulleys which is coupled to an output shaft of the motor may be toothed. In some embodiments, one of the at least one guide body may be formed in a housing which at least partially encloses the conveyer assembly. In some embodiments, the belt may extend into the track. In some embodiments, the track may be configured to accept a rail of a reservoir clip. The rail may include a cantilevered arm having a toothed projection on an unsupported end thereof. The belt may be configured to resiliently deflect the cantilevered arm when the rail is within the track. In some embodiments, the track may include one of a T-slot and a dovetail slot. In some embodiments, the apparatus further comprises a gate sensor which may be configured to generate a gate position signal indicative of the position of the gate member. In some embodiments, the motor may include a motor encoder. The motor encoder may be in data communication with the controller. The controller may be configured to power the motor based at least in part on the at least one data signal and a motor encoder data signal. In some embodiments, the bias member may be a constant force spring. In some embodiments, the bias member may be an extension spring.

In accordance with another embodiment of the present disclosure a reservoir clip may comprise a main body including a number of retention receptacles. Each of the retention receptacles may be defined between a pair of cantilevered members. The retention receptacles may each include at least one notch. The clip may further comprise a rail. The clip may further comprise a plurality of reservoirs. Each of the reservoirs may include at least one port. Each of the at least one port of each reservoir may be disposed within one of the at least one notch of a respective one of the retention receptacles. Each of the notches may be smaller than each of the ports.

In some embodiments, the plurality of reservoirs may be medical bags. In some embodiments, each of the plurality of reservoirs may have an interior volume variable between a full state and an empty state. The reservoirs on the clip may be in the empty state. In some embodiments, the rail may be a t-shaped rail. In some embodiments, the rail may be a dovetail rail. In some embodiments, the rail may include at least one toothed projection. In some embodiments, each of the at least one toothed projection may be disposed at an unsupported end of a cantilevered member included on the rail. In some embodiments, the clip may include a tier attached to and spaced apart from the main body. The tier may include a plurality of tier retention receptacles each defined between a pair of tier cantilevered members. The tier retention receptacles may each be disposed in alignment with a respective retention receptacle in the main body. In some embodiments, the clip may include a tier attached to and spaced apart from the main body. In some embodiments, the tier may include a plurality of tier cradles. Each of the tier cradles may be disposed in alignment with a notch of a respective retention receptacle of the main body. In some embodiments, the clip may include a tier attached and spaced apart from the main body, the rail extending from the tier.

In accordance with another embodiment of the present disclosure a cutting cartridge may comprise a cartridge body including a slot extending from an edge of the cartridge body to a terminal wide region of the slot in an intermediate portion of the cartridge body. The cutting cartridge may further comprise a blade element spanning across the slot between the edge and the wide region. The cutting cartridge may further comprise a removable cover clip including a set of pinch arms extending over the slot and having a width at least equal to a width of the slot. At least one of the pinch arms may include a projection more distal to the edge than the blade element. The projection may extend from the pinch arm a distance greater than a distance from that pinch arm to the blade element.

In some embodiments, the cutting cartridge may further comprise a metallic body in the cartridge body. In some embodiments, the cartridge body may be substantially planar. In some embodiments, the cartridge body may be constructed of a first body portion and a second body portion. The blade element may be captured between the first and second body portions. In some embodiments, a second edge of the cartridge body may include a notch. In some embodiments, the blade element may be disposed at a diagonal angle with respect to the slot. In some embodiments, the cartridge body may include a set of guide pegs. At least one of the guide pegs may extend from a first side of the cartridge body and at least another of the guide pegs may extend from an opposing side of the cartridge body. In some embodiments, the blade element may be constructed of a metal. In some embodiments, the pinch arms may be coupled to one another via a bridge of material at a point between the two ends of each of the pinch arms. In some embodiments, the cutting cartridge may include an identification tag. In some embodiments, the identification tag may be selected from a list consisting of an RFID, a data matrix, and a bar code.

In accordance with another embodiment of the present disclosure a medical fluid reservoir port cutting apparatus may comprise a cartridge housing including a main portion and a projecting portion. The apparatus may further comprise a receiving slot for a cutting cartridge extending into the housing from a side of the cartridge housing. The receiving slot may extend through the main portion of the cartridge housing. A portion of the receiving slot may also extend within the projecting portion. The apparatus may further comprise a bias member. The apparatus may further comprise an arm pivotally coupled to the projecting portion of cartridge housing. The arm may be biased to a home position by the bias member and displaceable from the home position toward a cavity in the main portion which extends to the receiving slot.

In some embodiments, the receiving slot may include a set of guides. In some embodiments, each of the guides may include a detent notch. In some embodiments, at least one of the guides may extend within the projecting portion and may include a terminal recess at an end of the guide opposite the side of the cartridge housing. In some embodiments, the apparatus may further comprise a spring loaded pin which projects into the terminal recess. In some embodiments, the bias member may be a torsion spring. In some embodiments, the receiving slot may be configured to align a blade of the cutting cartridge between the cavity and the arm when the arm is in the home position and the cutting cartridge is installed within the receiving slot. In some embodiments, the apparatus may further comprise a sensor assembly adjacent the receiving slot. In some embodiments, the sensor assembly may be a cutting cartridge detector. The sensor assembly may be configured to generate an output signal indicative of whether a cutting cartridge is present or absent in the receiving slot. In some embodiments, the sensor assembly may be a beam break sensor.

In accordance with an embodiment of the present disclosure a fluid conduit dispenser may comprise a housing including a mounting body, a reel portion, and a guide portion. The dispenser may further comprise an organizer disposed within the reel portion. The dispenser may further comprise a span of conduit having a first terminal end section, an intermediate section disposed on the organizer within the housing, and a second terminal end extending out of the housing through a dispenser inlet. The dispenser may further comprise a cap element disposed at the end of the first terminal end section. The cap may include a plug body engaged with the lumen of the conduit and a guide loop surrounding the conduit and removably attached to the plug body.

In some embodiments, the guide portion may be in the shape of a conic frustum. In some embodiments, the guide portion may include an outlet opening though which the first terminal end section of the span of conduit extends. In some embodiments, the span of conduit may be at least 50 feet long. In some embodiments, the mounting body may be a rail. In some embodiments, the mounting body may be a T-rail. In some embodiments, the plug body may include a compliant member extending around an exterior surface of the plug body. The guide loop may compress the compliant member when attached to the plug body. In some embodiments, the guide loop may be frictionally retained on the plug body. In some embodiments, the guide loop may include a retention recess in an exterior surface thereof. In some embodiments, the guide loop may include a dispensing end and a feed end. The feed end may be upstream of the dispensing end. At least a portion of the feed end may be tapered so as to increase in diameter as distance from the dispensing end increases.

In accordance with an embodiment of the present disclosure, a reservoir filling assembly may comprise a fluid supply set including a supply conduit and a filling nozzle. The filling nozzle may include an inlet end to which the supply conduit is coupled, an outlet end, a midbody between the inlet and outlet ends. A lumen may extend from the inlet end to the outlet end. The midbody may be wider than the inlet and outlet ends and including variable width transition spans at each end of the midbody. The assembly may further comprise a nozzle dock including at least one bias member, a stationary portion, and a clasping body. The clasping body may be biased toward the stationary portion by the at least one bias member. Each of the stationary portion and clasping body may include a notch and transition span receptacle.

In some embodiments, the fluid supply set further may include a filter. In some embodiments, the filter assembly may be a 0.2 micron filter. In some embodiments, the midbody may be ribbed. In some embodiments, the transition span adjacent the inlet end may be rounded and the transition span receptacle of the clasping portion may be a cooperating rounded recess. In some embodiments, the transition span adjacent the outlet end may be tapered and the transition span receptacle of the stationary body may be a cooperating tapered recess. In some embodiments, the transition span adjacent the inlet and the transition span receptacle of the clasping body may form a ball and socket interface. In some embodiments, when the filling nozzle is disposed within the nozzle dock, the at least one bias member may be configured to exert a bias force on the clasping body which urges the transition spans to self-center within the transition span receptacles. In some embodiments, the outlet end of the filling nozzle may include a tapered portion at the terminal section of the outlet end.

In accordance with another embodiment of the present disclosure a method of packaging a medical fluid into a reservoir may comprise collecting a reservoir including a plurality of sealed ports from a reservoir feeder. The method may further comprise cutting a port of the plurality of sealed ports to create an opened port. The method may further comprise filling the reservoir with the medical fluid through the opened port. The method may further comprise welding the opened port to weld closed the opened port. The method may further comprise pressing the reservoir against a labeler and applying a label to the bag. The method may further comprise ejecting the bag from an environmentally controlled enclosure.

In some embodiments, collecting the reservoir may comprise grasping a portion of the reservoir with a robotic grasper and displacing the robotic grasper to pull the reservoir out of a clip. In some embodiments, cutting the port may comprise pressing the port against a blade and sweeping a severed end of the port into a waste chute with a pivoting arm. In some embodiments, welding the opened port may comprise compressing the port between a first jaw and a second jaw and heating the jaws for a preset period of time. In some embodiments, cutting the port may comprise placing the port of the plurality of sealed ports into an aperture of a cutting assembly and driving a blade into the aperture via powering of a blade actuator. In some embodiments, driving the blade may comprise displacing the blade along a displacement axis. In some embodiments driving the blade may comprise rotating the blade about a pivot axis. In some embodiments, applying the to the reservoir may comprise printing the label directly on the reservoir. In some embodiments, filling the reservoir may comprise detecting at least one characteristic of the reservoir with a reservoir sensing assembly and dispensing a volume of the medical fluid determined at least in part on the at least one characteristic.

In accordance with another embodiment of the present disclosure a method of packaging a medical fluid into a reservoir may comprise collecting a reservoir from a reservoir dispenser. The method may further comprise cutting open a sealed port of the reservoir and a sealed end of a filling conduit with a heated blade. The method may further comprise joining the port to the filling conduit at a weld joint without exposing the interior of the port and filling conduit to the surrounding environment. The method may further comprise compressing the weld joint against a stationary plate with a compression element. The method may further comprise transferring fluid into the reservoir from the fill conduit through the port and into the reservoir. The method may further comprise generating occluded regions in the fill conduit and port adjacent the weld joint with a set of dies. The method may further comprise cutting the fill conduit and port in the occluded regions by heating the dies. The method may further comprise cooling the dies.

In some embodiments, heating the dies may comprise heating the dies with at least one aluminum nitride heating element. In some embodiments, generating the occluded regions may comprise compressing the fill conduit and port between sets of raised sealing surfaces defined in the dies. In some embodiments, compressing the fill conduit and port may comprise compressing the fill conduit and port to a thickness not greater than 85% of the thickness of the walls of one of the fill conduit and port. In some embodiments, compressing the fill conduit and port may comprise compressing the fill conduit and port to a thickness not greater than 75% of the thickness of walls of one of the fill conduit and port. In some embodiments, cutting the fill conduit and port may comprise compressing the fill conduit and port between the set of dies as the dies are heated. In some embodiments, compressing the fill conduit and port between the set of dies as the dies are heated may comprise apply constant pressure to the fill conduit and port with the dies. In some embodiments, heating the dies may comprise heating the dies to a cutting temperature set point in less than 10 seconds. In some embodiments, cooling the dies may comprise cooling the dies to a cooling temperature set point in less than 15 seconds. In some embodiments, cutting the fill conduit and port may comprise separating the fill conduit from the port and creating a scrap conduit span including the weld joint. In some embodiments, the method may further comprise holding the scrap conduit span in place on one of the dies with a scrap retention element and releasing the scrap conduit span into a scrap container by retracting the scrap retention element. In some embodiments, the method may further comprise compressing a portion of the fill conduit and port adjacent the occluded regions between the dies without occluding a lumen in each of the fill conduit and port in the portion of the fill conduit and port adjacent the occluded regions.

In accordance with another embodiment of the present disclosure, a clip for retaining a reservoir may comprise a main body. The main body may include a first face, an opposing second face, and a notch recessed into a sidewall of the main body. The clip may further comprise a set of retention cradles projecting from the first face. The clip may further comprise at least one spacer extending from the second face. The clip may further comprise a set of wing bodies. The wing bodies may be coupled to the main body and may extend along a plane between the second face and a portion of the at least one spacer most distal to the second face. Each of the wing bodies may include a fenestration.

In some embodiments, the clip may further comprise at least one support cradle. In some embodiments, at least one of the at least one support cradle may be flanked by a set of guide clips. In some embodiments, the set of retention cradles may include at least two retention cradles disposed in a line parallel to and adjacent an edge of the main body opposite the sidewall. In some embodiments, the at least one spacer element may project substantially perpendicularly from the second face. In some embodiments, the at least one spacer element may include a pair of substantially parallel spacer elements. In some embodiments, the spacers elements may each be disposed intermediate a set of a retention cradles on the opposing first face of the main body. In some embodiments, the main body may include a plateau portion. The notch may be recessed into the sidewall at the location of the plateau portion. In some embodiments, at least one port of a reservoir may be captured in the set of retention cradles. In some embodiments, at least one port of a bag may be captured in the set of retention cradles.

In accordance with another embodiment of the present disclosure a bag feeder assembly may comprise a housing including a guide tube receptacle and an outlet opening. The assembly may further comprise a guide tube disposed within the guide tube receptacle of the housing. The guide tube may include an outlet aligned with the outlet opening when the guide tube is installed within the guide tube receptacle of the housing. The assembly may further comprise a plurality of reservoirs. Each of the reservoirs may include at least one port having an enlarged region. The enlarged regions may be retained within a channel of the guide tube. The assembly may further comprise an advancement assembly. The advancement assembly may be configured to displace enlarged regions of ports toward the outlet of the guide tube.

In some embodiments, the advancement assembly may be configured to exert pressure upon the enlarged regions within the guide tube. The pressure may press a foremost enlarged region against a wall of the outlet opening to frictionally retain the enlarged portion at the outlet opening. In some embodiments, the housing may include an ejector. In some embodiments, the ejector may include a receptacle configured to hold an enlarged portion of a port. The ejector may be displaceable between a channel aligned position in which the receptacle is aligned with the channel of the guide tube and a present position in which the receptacle is disposed outside of the housing. In some embodiments, the ejector may be displaceable along a displacement axis which may be substantially parallel to an axis of the at least one port having the enlarged region. In some embodiments, the ejector may be displaceable along a displacement axis which may be substantially perpendicular to an axis of the at least one port having the enlarged region. In some embodiments, the guide tube may include a set of cantilevered projections which extend toward one another from opposing sides of the guide tube. In some embodiments, the advancement assembly may include one of an electromechanical actuator, a pneumatic actuator, and a hydraulic actuator. In some embodiments, the advancement assembly may include a spring biased follower biased toward the outlet opening of housing by a bias member.

In accordance with an embodiment of the present disclosure, a reservoir clip may comprise a main body including a central span flanked on opposing first and second sides by a number of retention receptacles. Each of the retention receptacles may be defined between a pair of cantilevered members. The clip may further comprise a rail. The clip may further comprise a plurality of reservoirs. Each of the reservoirs may include at least one port. Each of the at least one port may include a clip interface body disposed in one of the retention receptacles. Each of the clip interface bodies may be form fit within the retention receptacles. The retention receptacles on the first side of the central span may be offset or staggered with respect to the retention receptacles on the second side of the central span.

In some embodiments, the plurality of reservoirs may be medical fluid bags. In some embodiments, each of the plurality of reservoirs may have an interior volume variable between a full state and an empty state. The reservoirs may be in an empty state one the clip. In some embodiments, the rail may be a t-shaped rail and the rail may project from the central span. In some embodiments, the rail may be a dovetail rail and may project from the central span. In some embodiments, the rail may include at least one toothed projection. In some embodiments, each of the at least one toothed projection may be disposed at an unsupported end of a cantilevered arm included on the rail.

In accordance with another embodiment of the present disclosure a reservoir clip may comprise a main body including a number of retention receptacles. Each of the retention receptacles may be defined between a set of cantilevered members. The retention receptacles may each including a wide region proximal the main body and a narrow region distal the main body. The clip may further comprise a rail. The clip may further comprise a plurality of reservoirs. Each of the reservoirs may include at least one port including a clip interface body disposed in the wide region of a respective retention receptacle. The narrow region of each retention receptacle may have a width which is less than the width of the clip interface bodies.

In some embodiments, the transition between the wide region and narrow region of each retention receptacle may be ramped. In some embodiments, the reservoirs may be medical fluid bags. In some embodiments, the cantilevered members may be configured to resiliently deflect. In some embodiments, the rail may include at least one toothed projection. In some embodiments, each of the at least one toothed projection may be disposed at an unsupported end of a cantilevered arm included on the rail. In some embodiments, the rail may include a detent recess. In some embodiments, the clip may further comprise a support arm extending from the main body. The support arm may have number of locating projections at an end of the support arm most distal to the main body. In some embodiments, each of the reservoirs may include a second port. The second port of each reservoir may be engaged with at least one of the locating projections on the support arm to constrain the second port of each reservoir to a known position.

In accordance with yet another example embodiment of the present disclosure, a fluid production system for producing a fluid have at least one desired characteristic may comprise a mixing circuit. The mixing circuit may have a diluent portion and concentrate portion each being in communication via respective valves with a mixing portion. The mixing circuit may have an inlet and outlet receptacle each including a piercing member. The inlet and outlet receptacle may be connected to one another via a flow channel. The system may further comprise a cartridge having an inlet port and an outlet port each sealed by a cover. The inlet and outlet port may be configured to displace respectively within the inlet receptacle and outlet receptacle from a first position to a second position. The piercing member may be in fluid communication via the flow channel in the first position. The piercing members may be isolated from the flow channel and each cover may be punctured by a respective piercing member of the piercing members when the inlet and outlet port are in the second position.

In some embodiments, the diluent portion, concentrate portion, and mixing portion each may include at least one fluid conductivity sensor. In some embodiments, the system may further comprise a controller configured to govern operation of the valves based on data from at least one of the at least one fluid conductivity sensor of the diluent portion, concentrate portion, and mixing portion. In some embodiments, the cartridge may have an interior volume filled at least partially with a solid constituent. The first piercing member may include a flow lumen in fluid communication with a diluent supply flow path of the manifold. The second piercing member may include a flow lumen in fluid communication with an inlet to the concentrate portion. In some embodiments, the system may further comprise an actuation assembly for displacing the inlet and outlet ports from the first position to the second position. The actuation assembly may be configured to couple to a mating interface of the cartridge. The actuation assembly may further comprise a cartridge detection sensor, a cartridge position sensor, and a brake. The cartridge may be inhibited from displacing when the brake is in an engaged state.

BRIEF DESCRIPTION OF THE DRAWINGS

FIG. 113 depicts a block diagram of an example bag dispenser;

FIG. 114 depicts another block diagram of the example bag dispenser of FIG. 113;

FIGS. 115-117 depict views of an example bag dispenser;

FIGS. 118-121 depict views of another example bag dispenser;

FIGS. 122-124 depict views of another example bag dispenser;

FIGS. 125-127 depict views of another example bag dispenser;

FIG. 128 depicts a block diagram of an example bag dispenser and an example clip;

FIG. 129 depicts a block diagram of an example clip;

FIGS. 130-131 depict views of an example clip;

FIGS. 132-133 depict views of another example clip;

FIGS. 134-136 depict views of another example clip;

FIGS. 137-139 depict views of another example clip;

Figure 140:
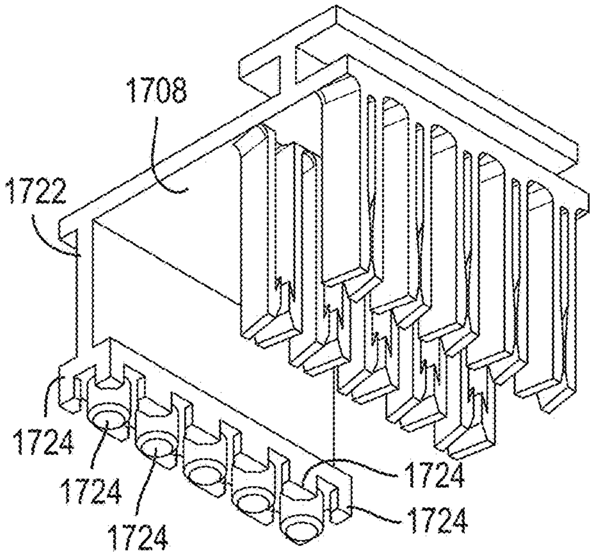
Figure 141:
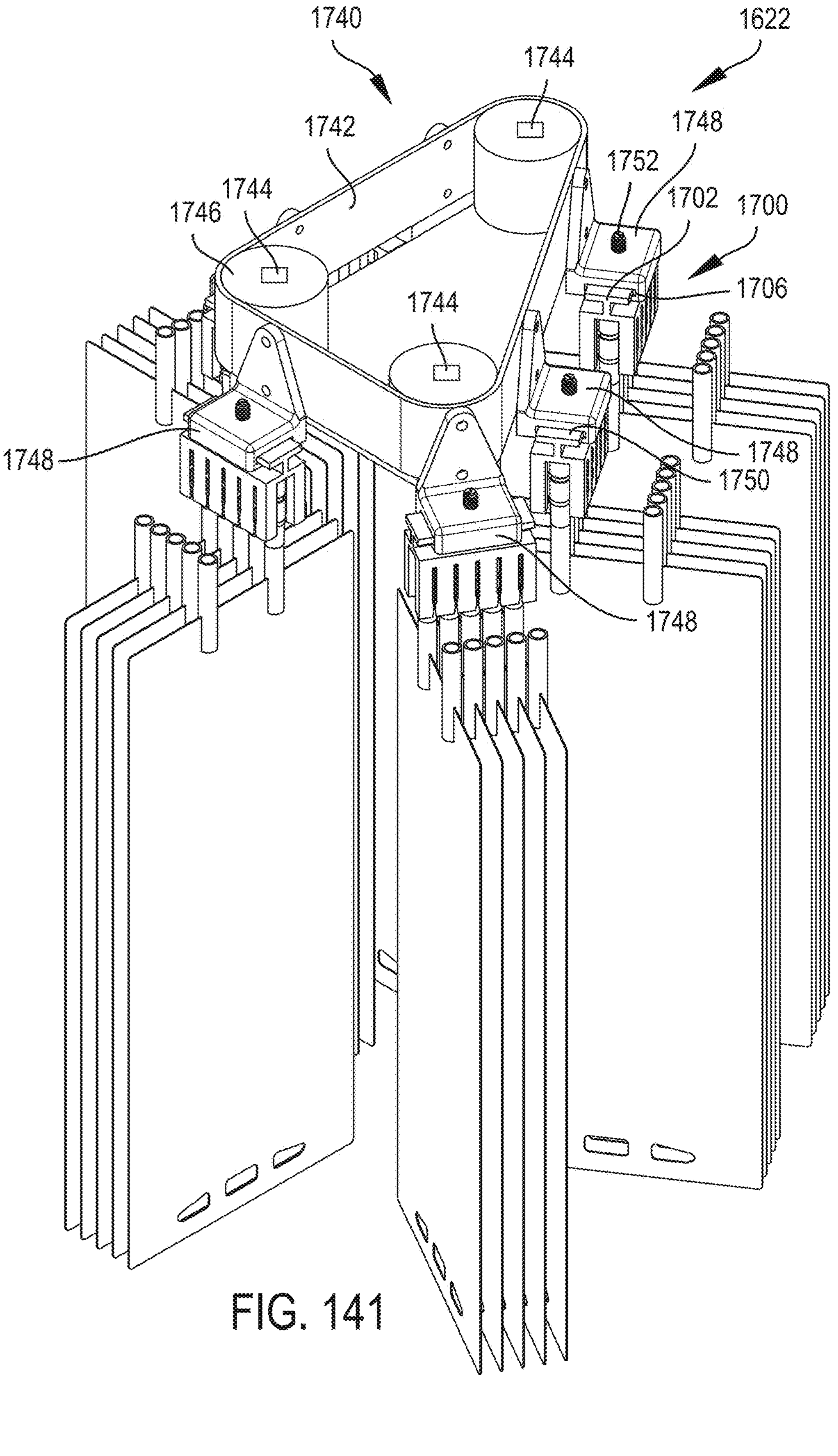
Figure 142:
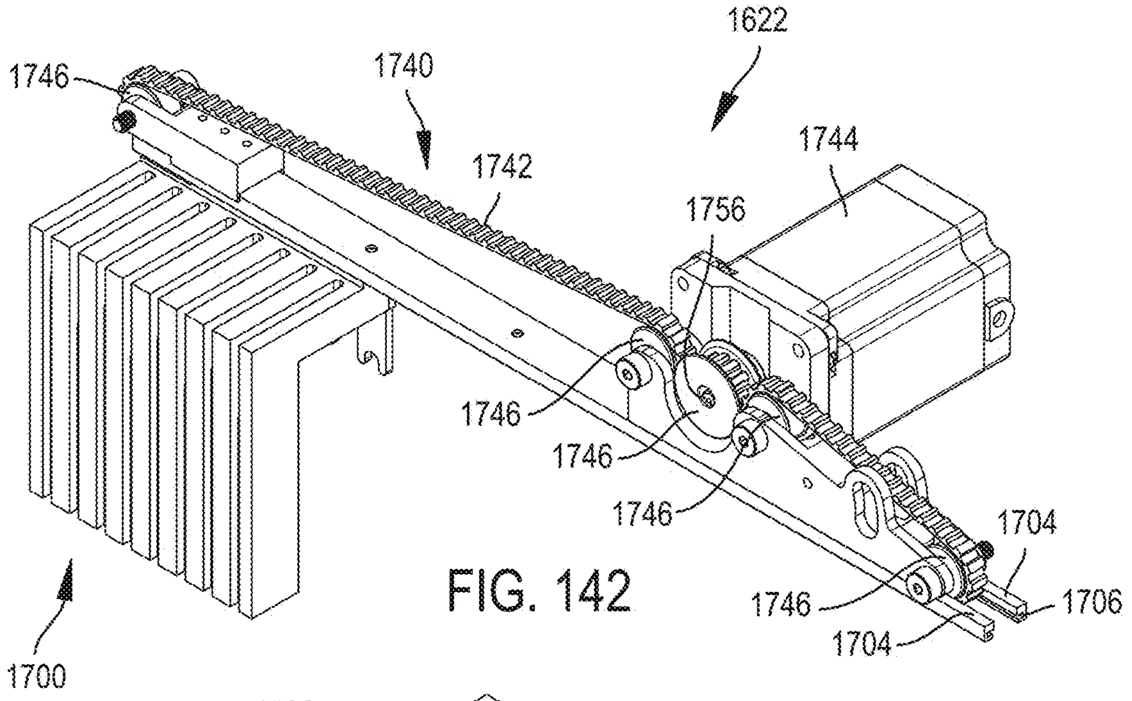
Figure 143:
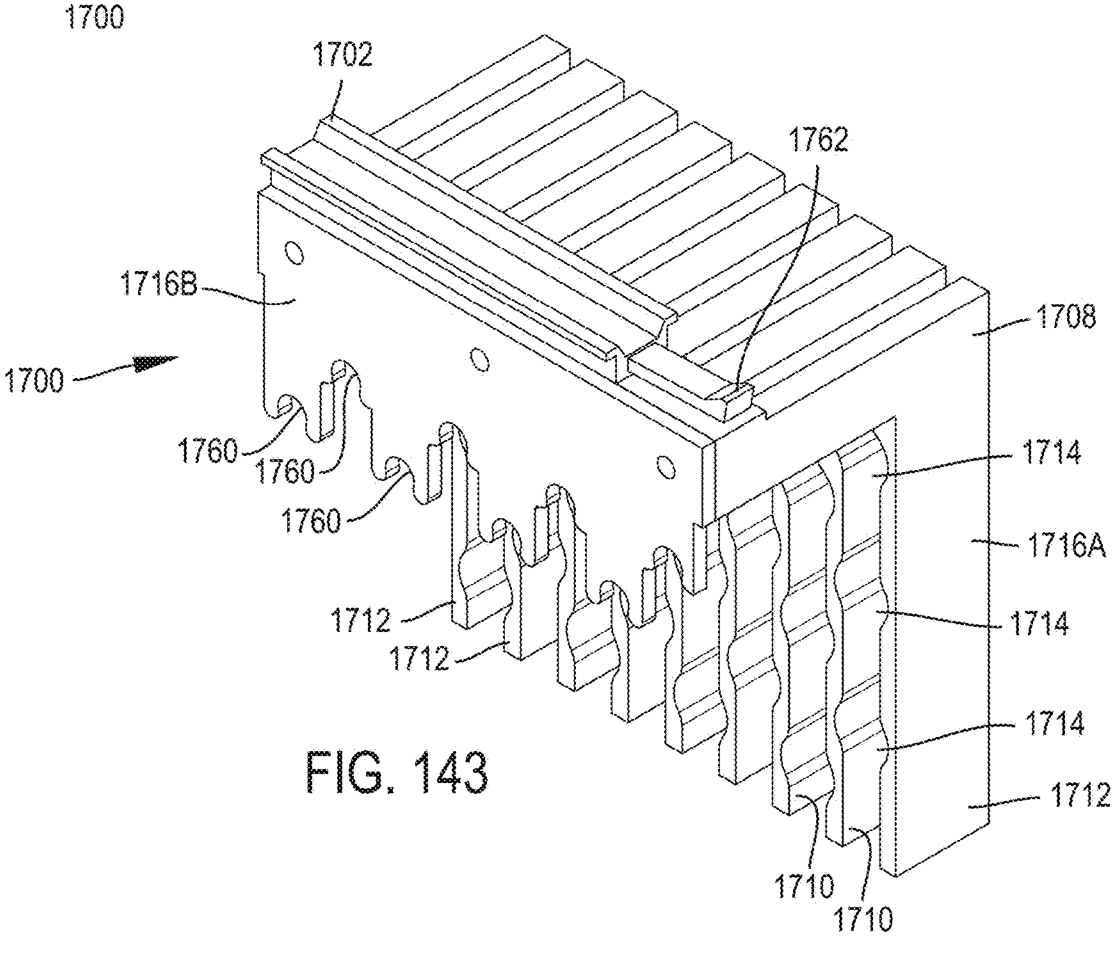
Figure 144:
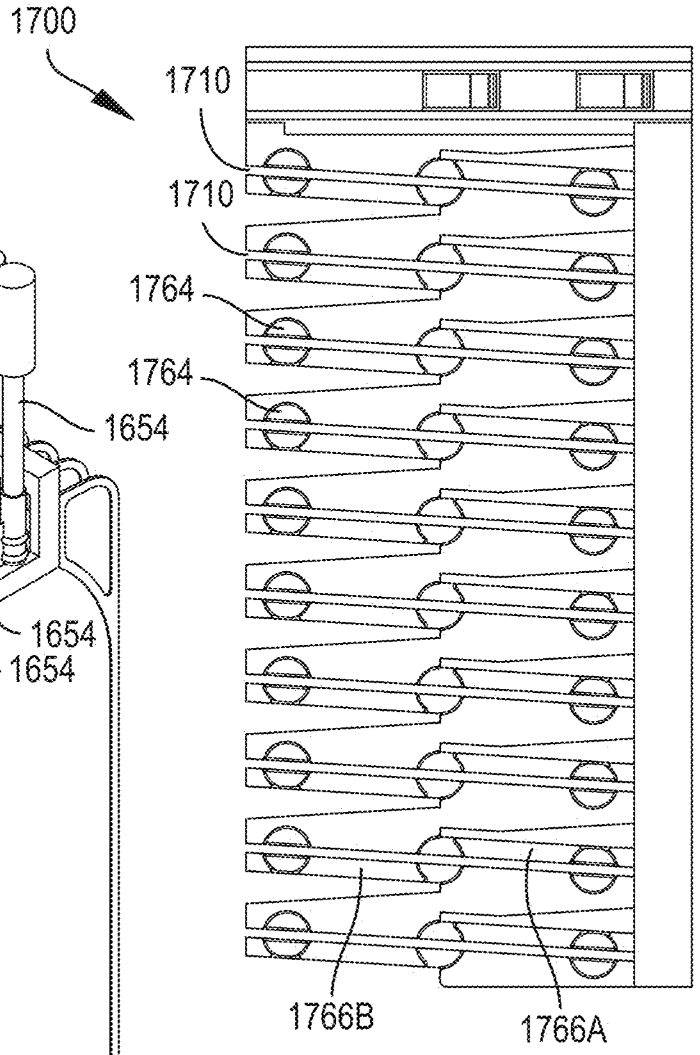
Figure 145:
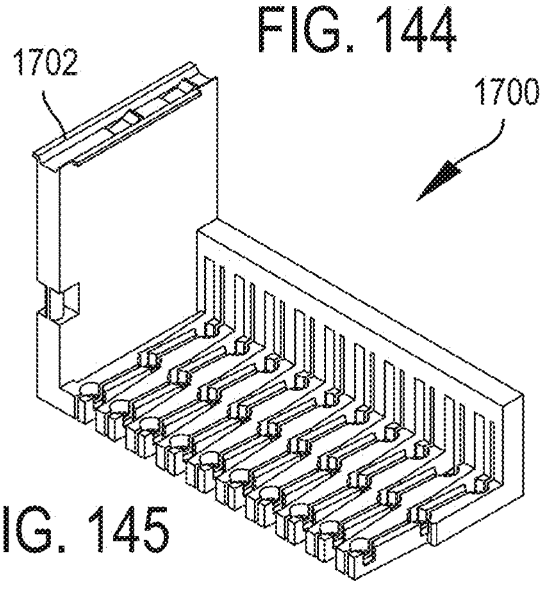
Figure 146:
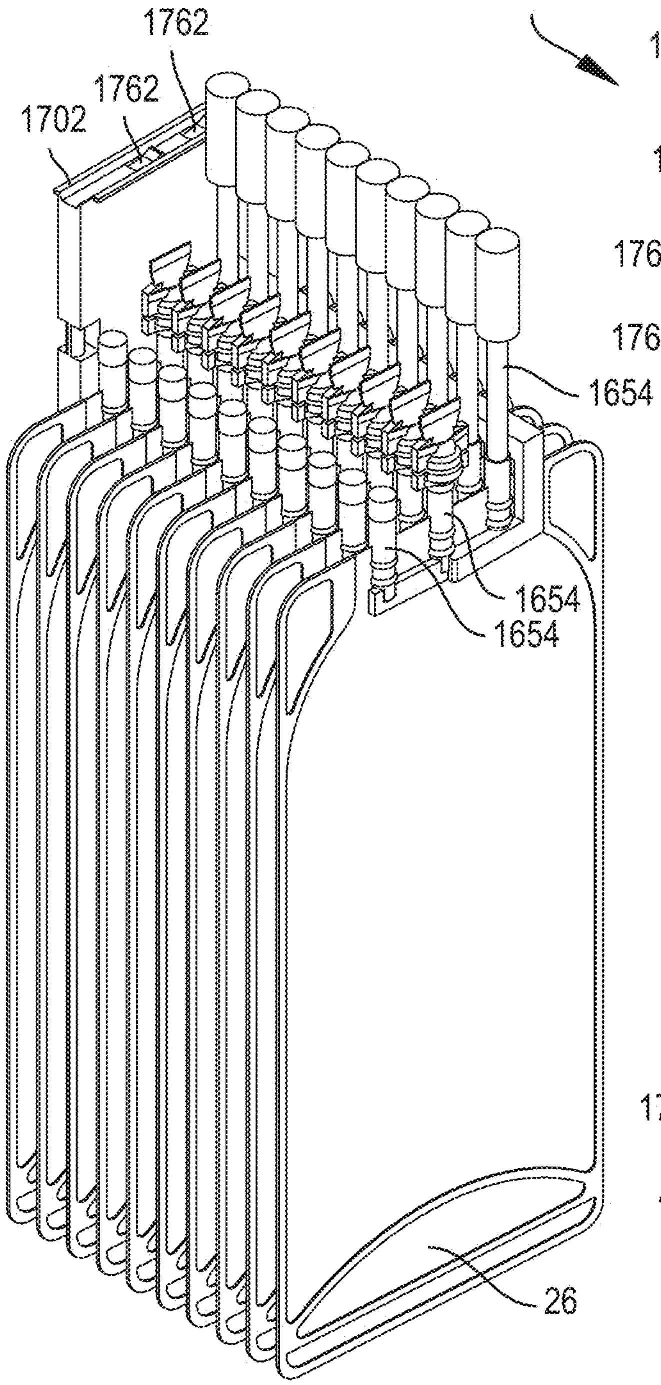
Figure 147:
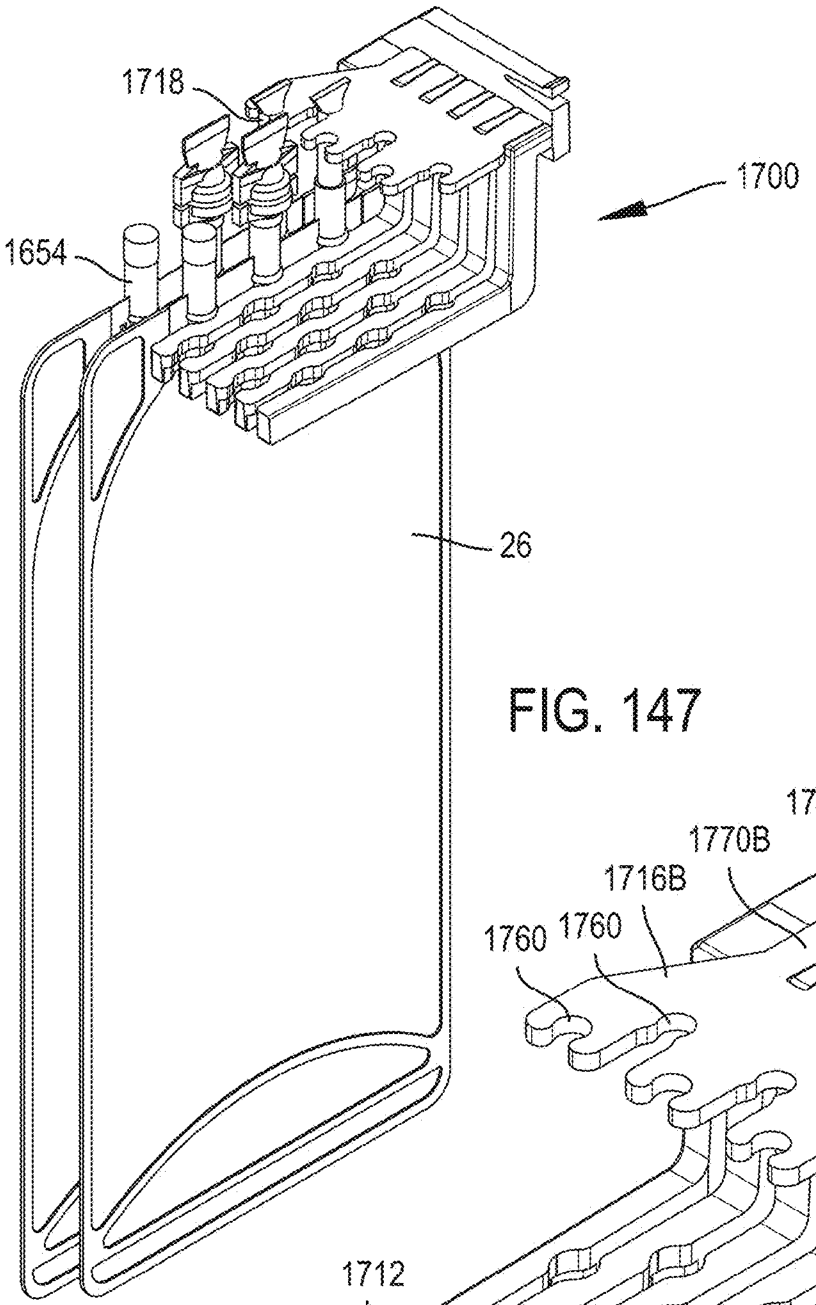
Figure 148:
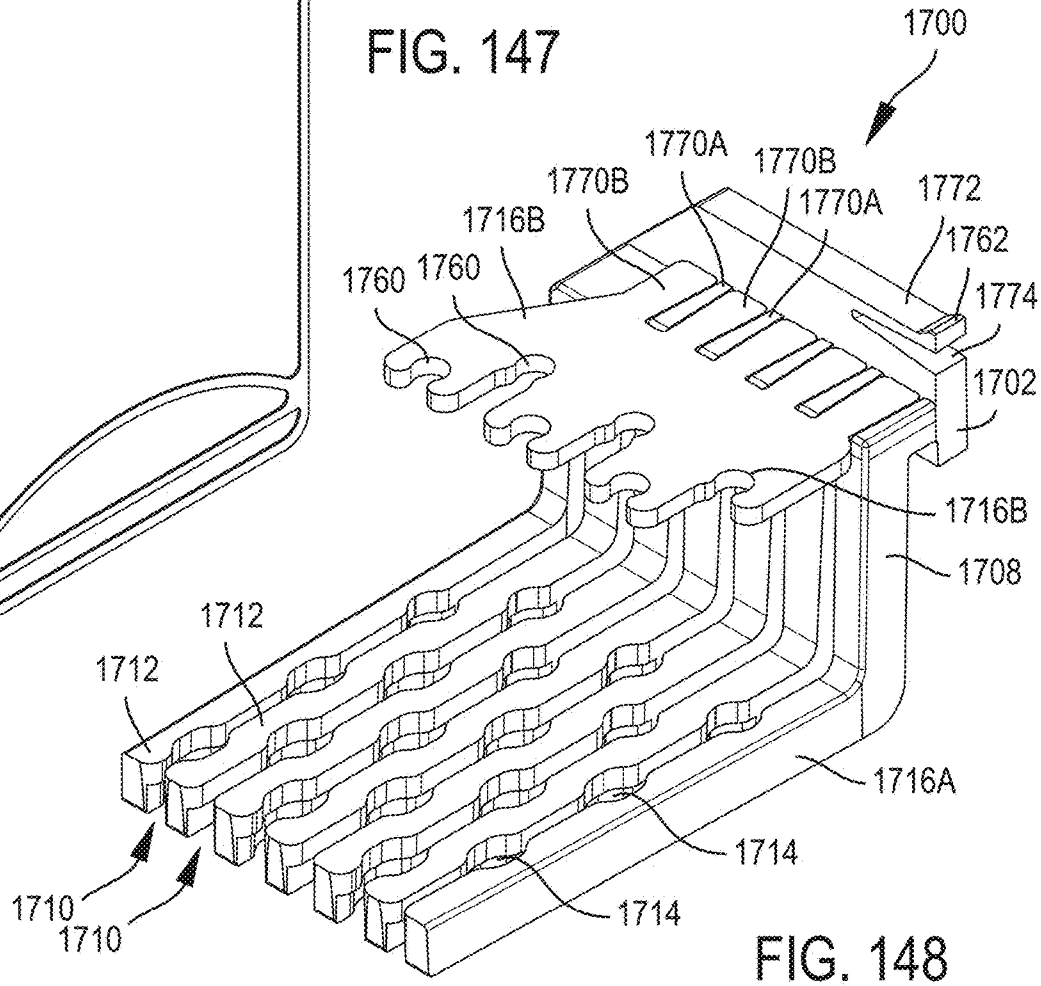
Figure 149:
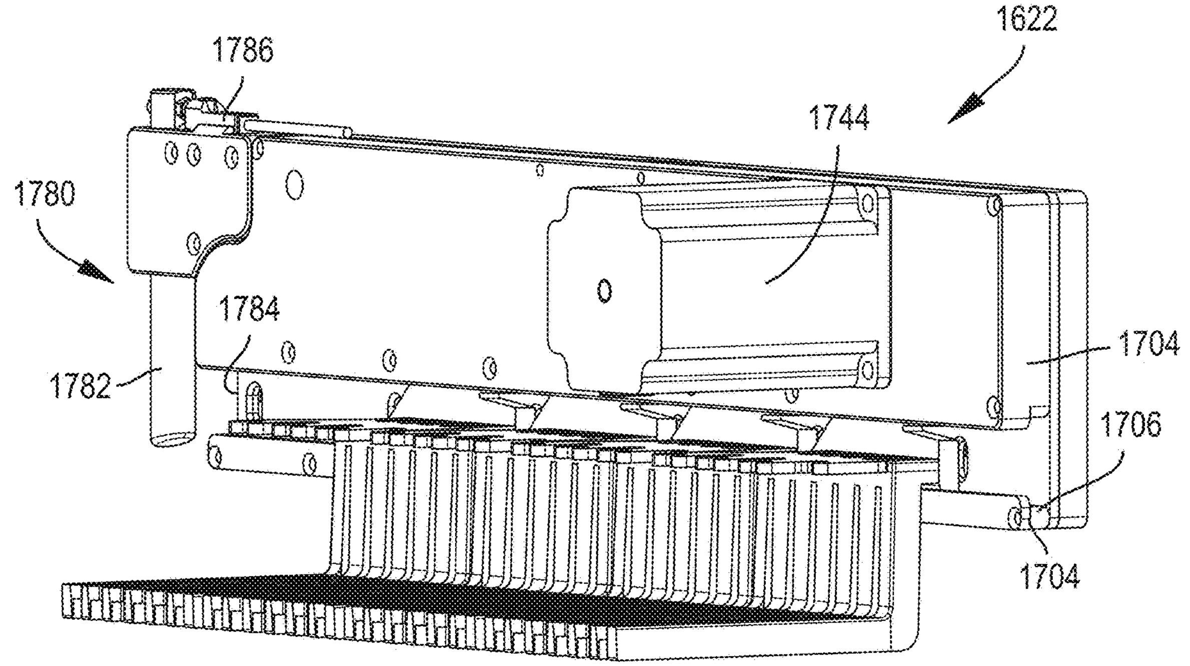
Figure 150:
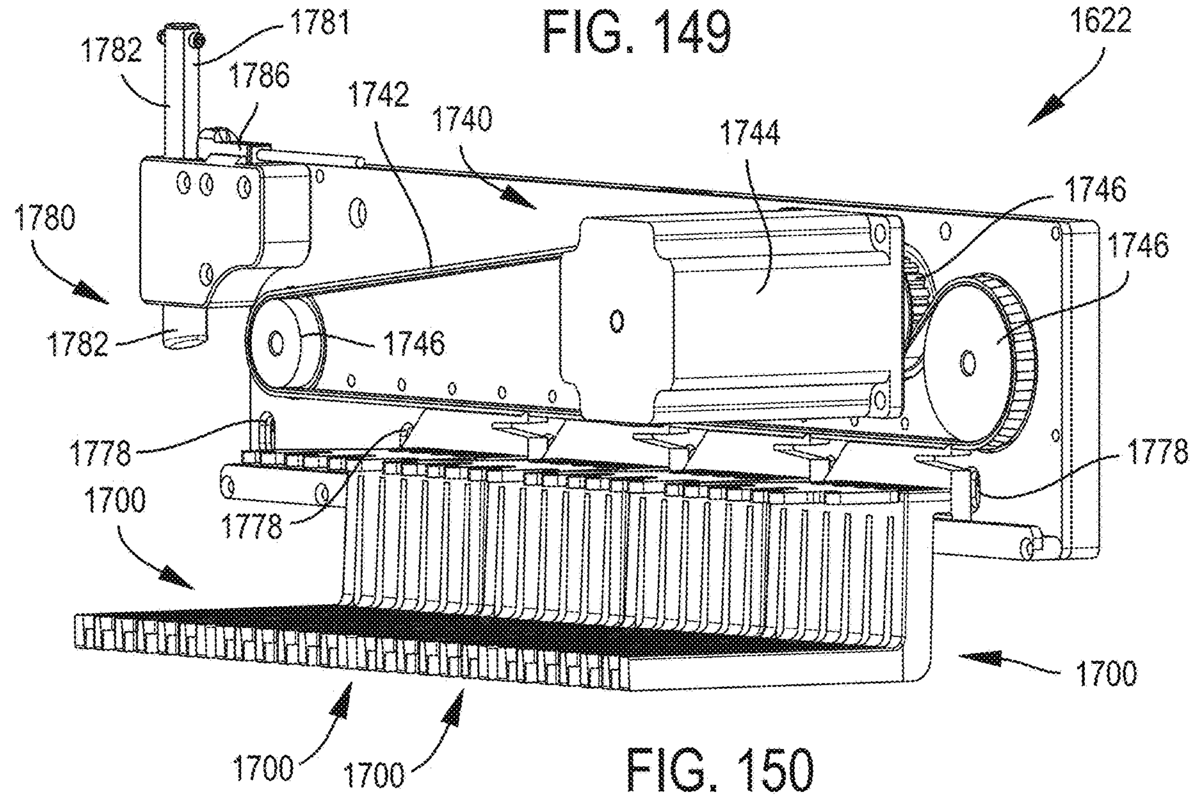
Figure 151:
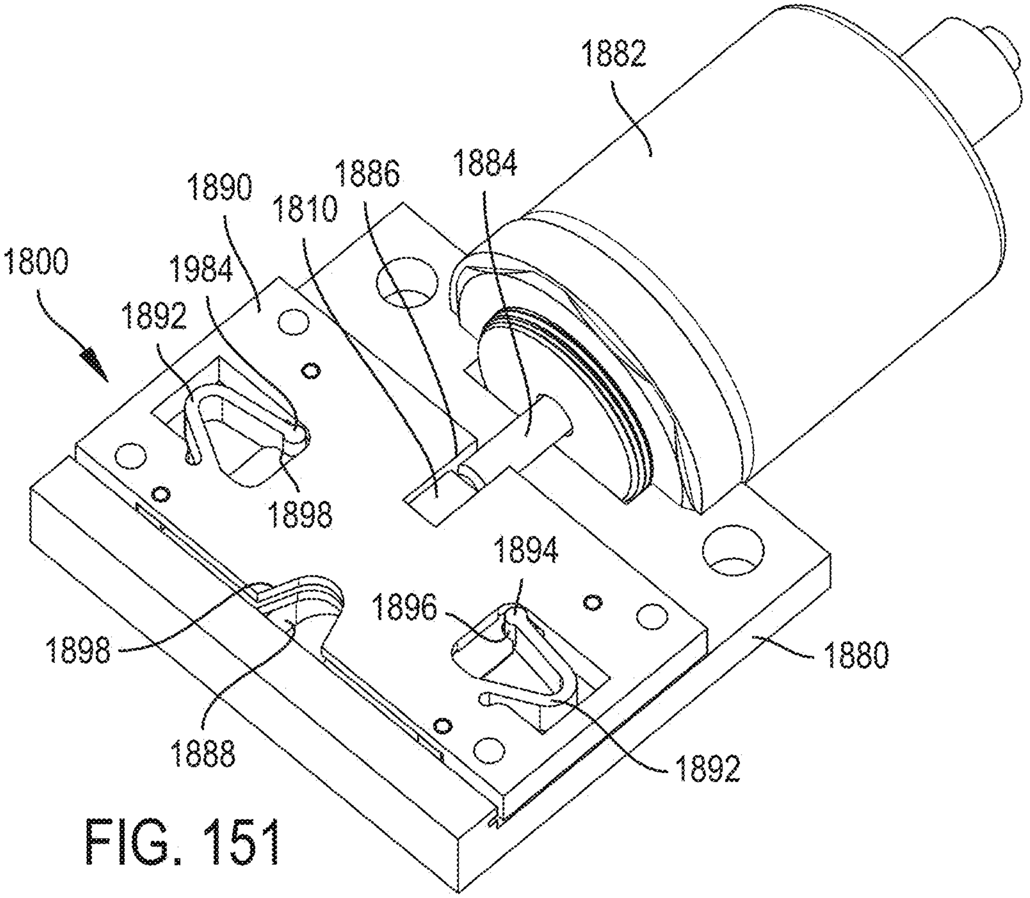
Figure 152:
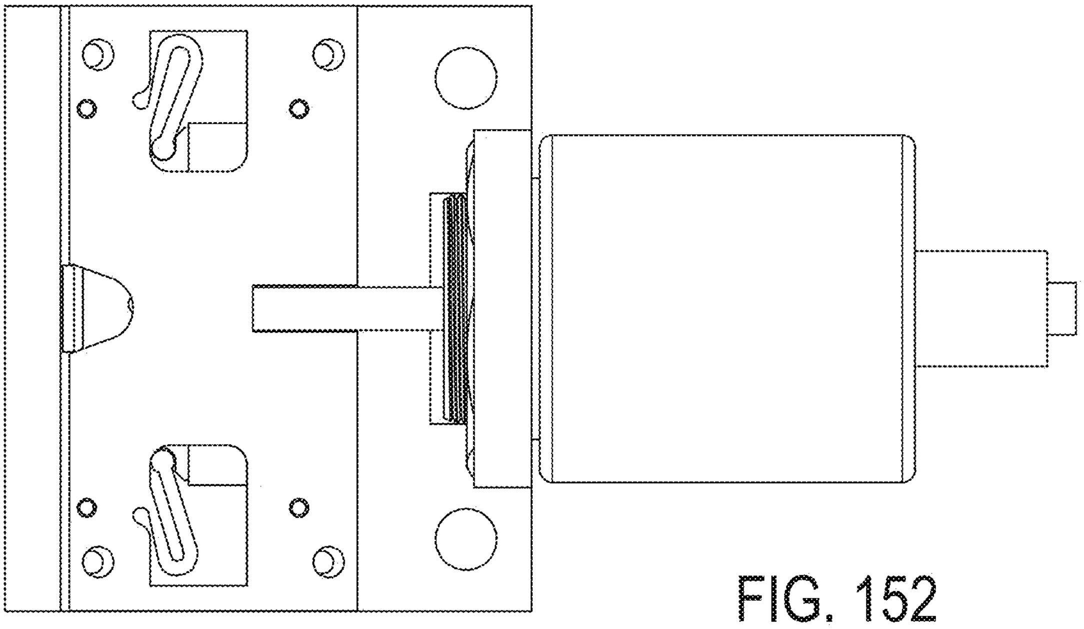
Figure 153:
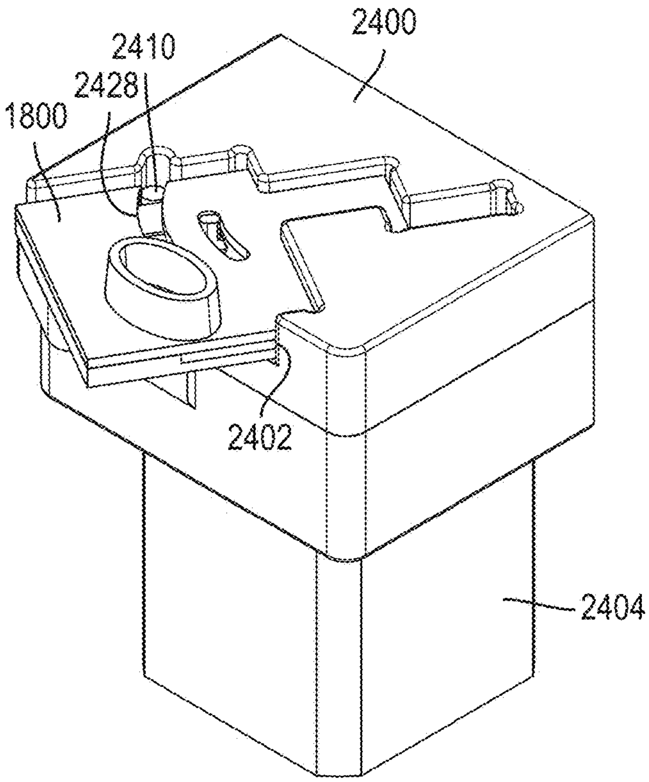
Figure 154:
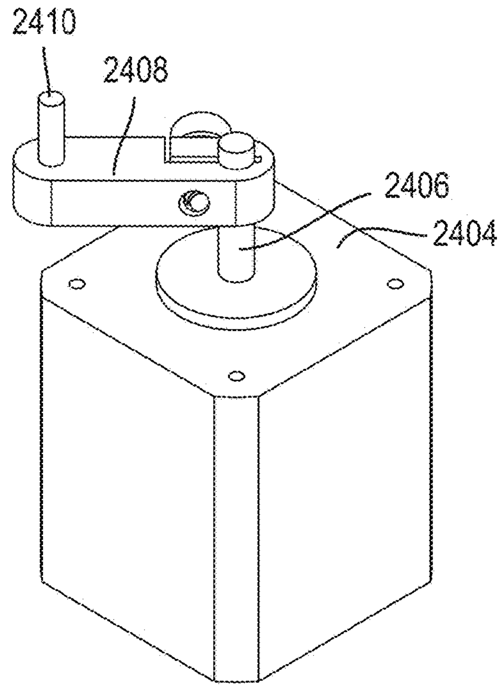
Figure 155:
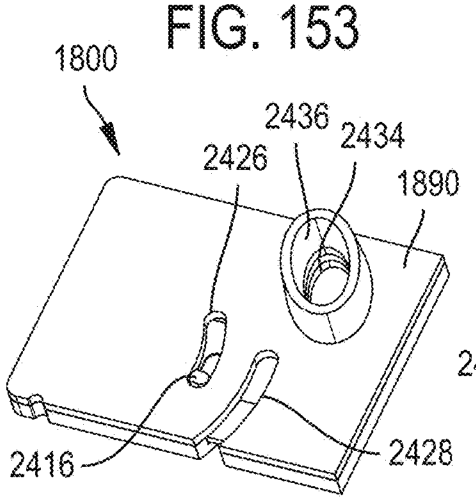
Figure 156:
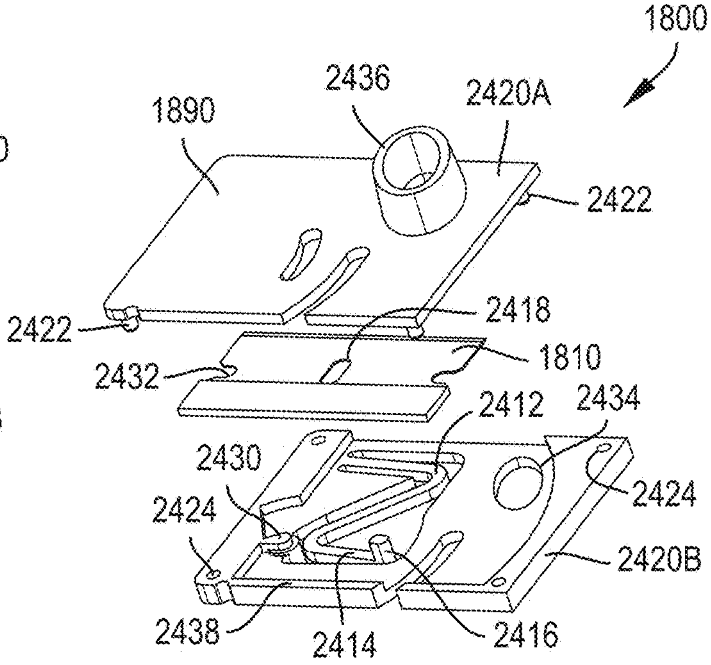
Figure 157:
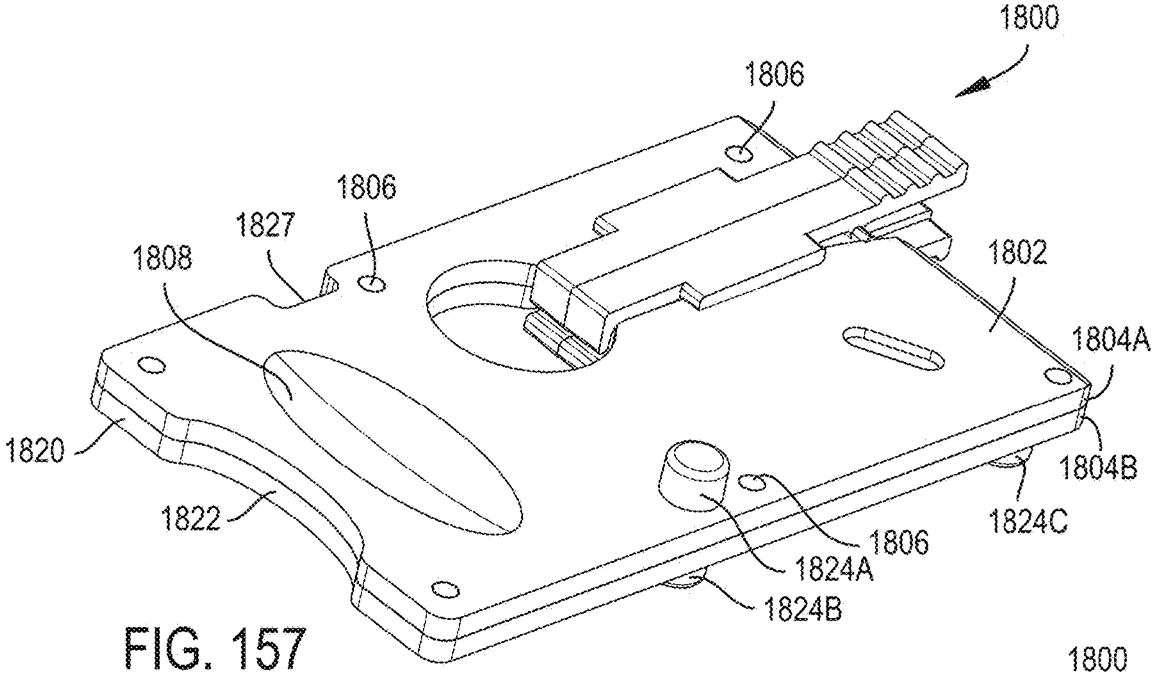
Figure 158:
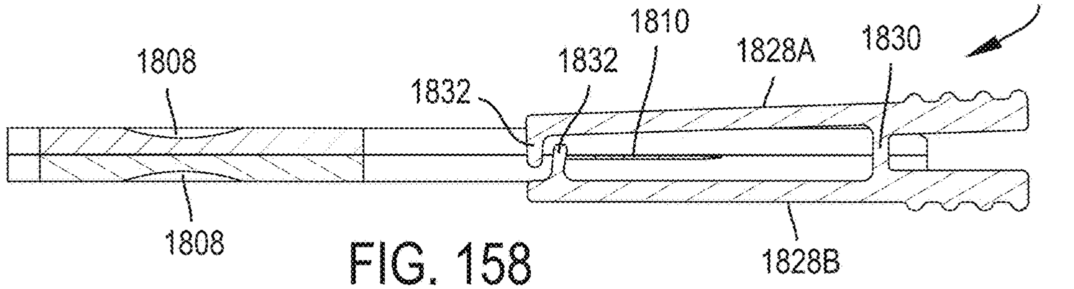
Figure 159:
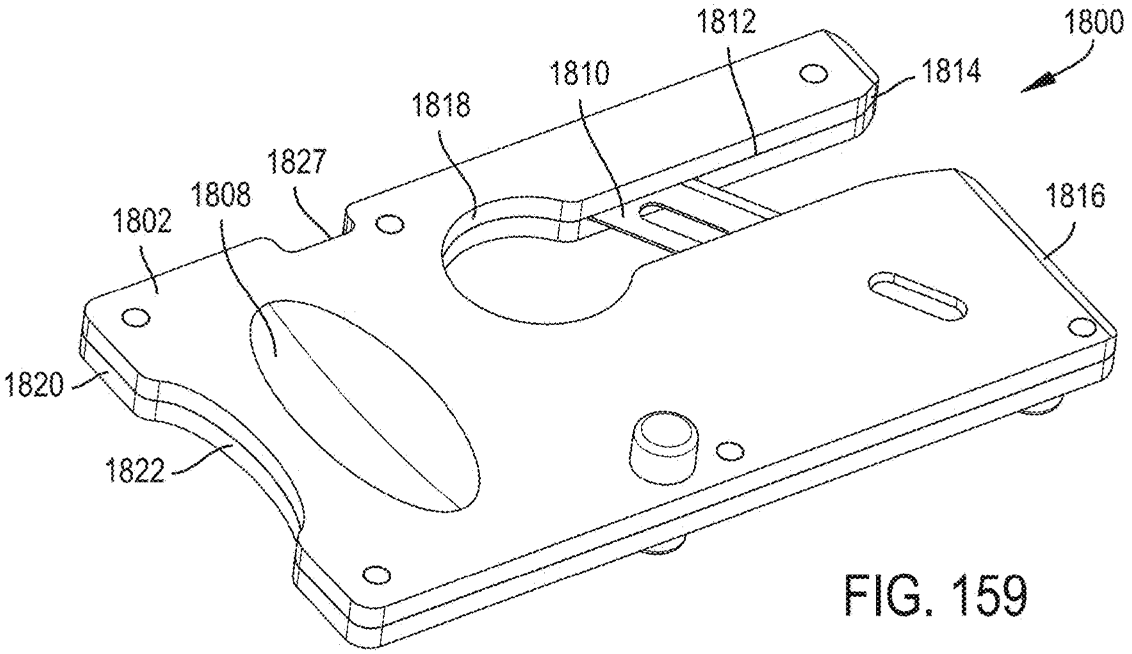
Figure 160:
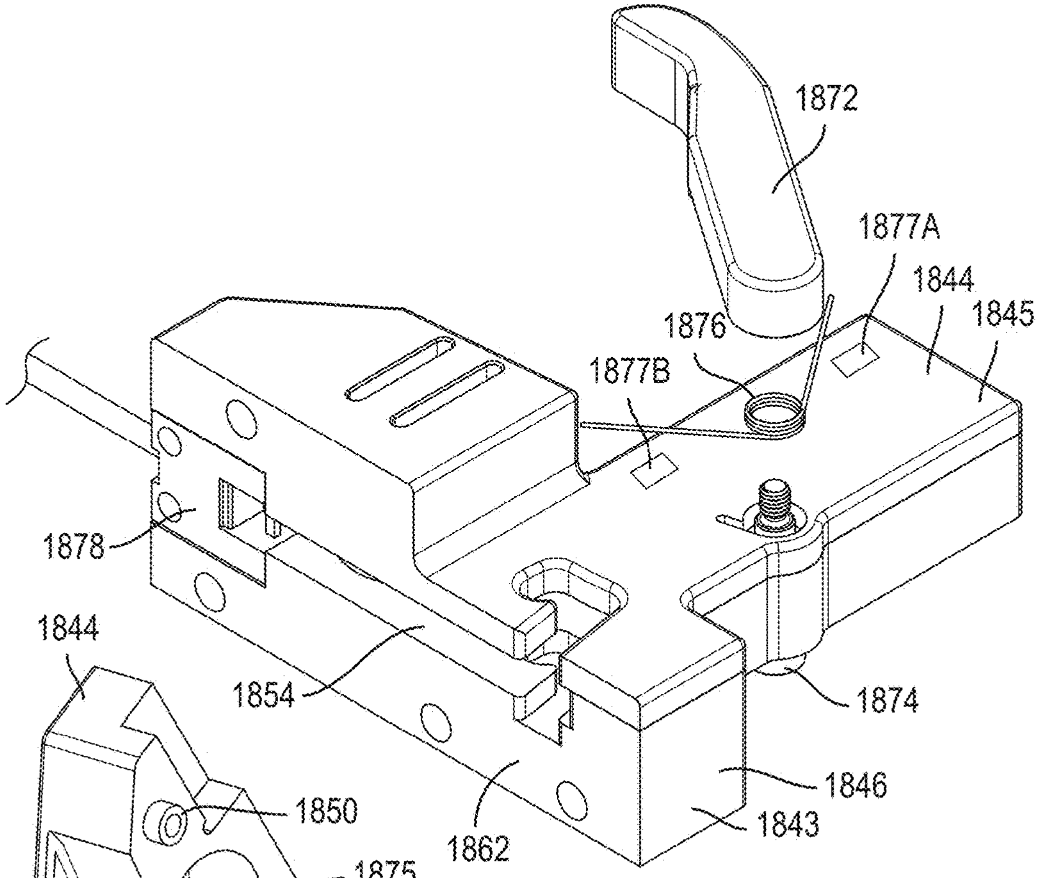
Figure 161:
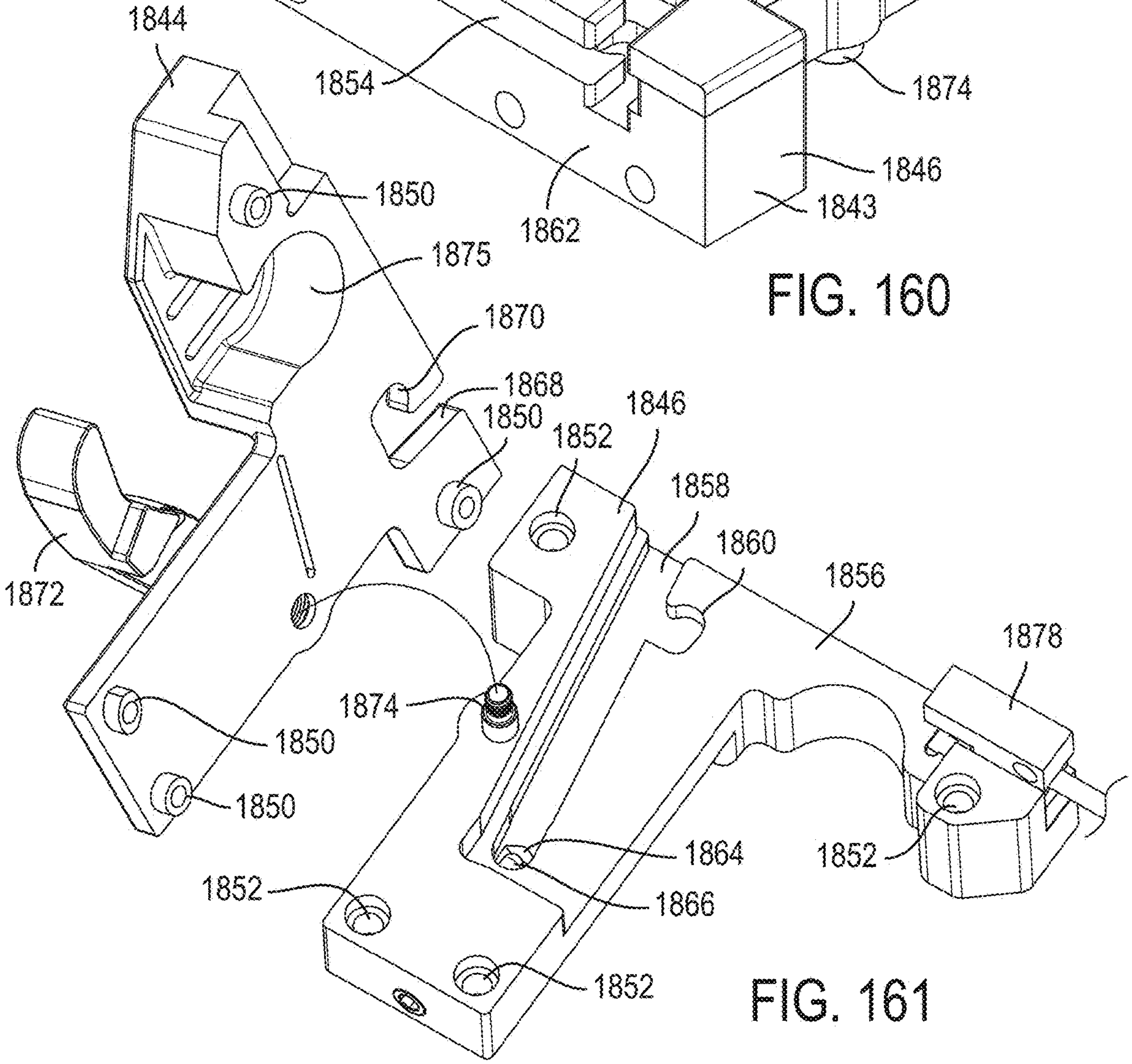
Figure 162:
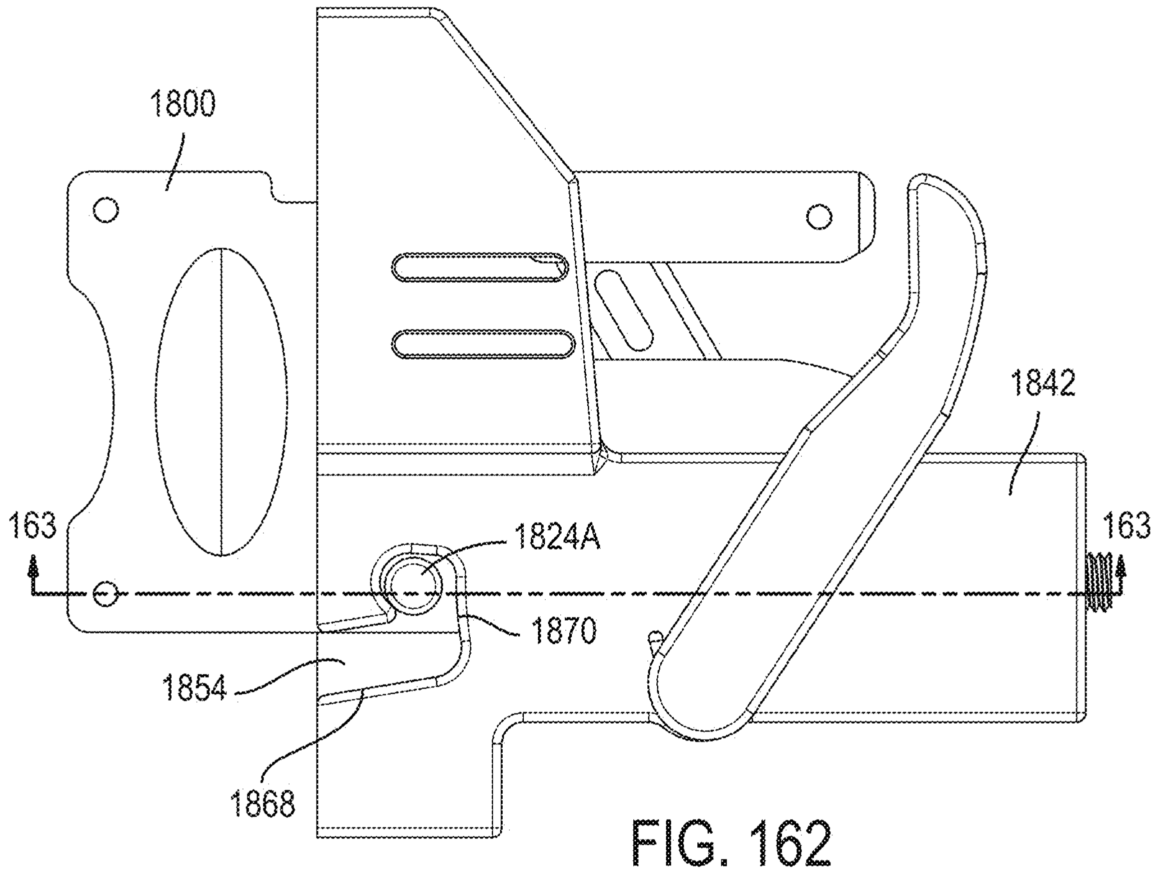
Figure 163:
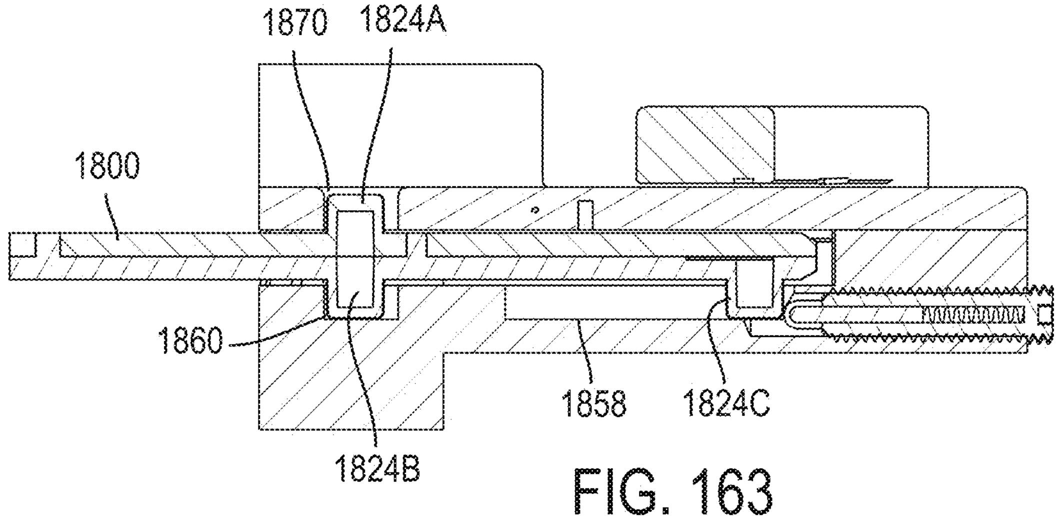
Figure 164:
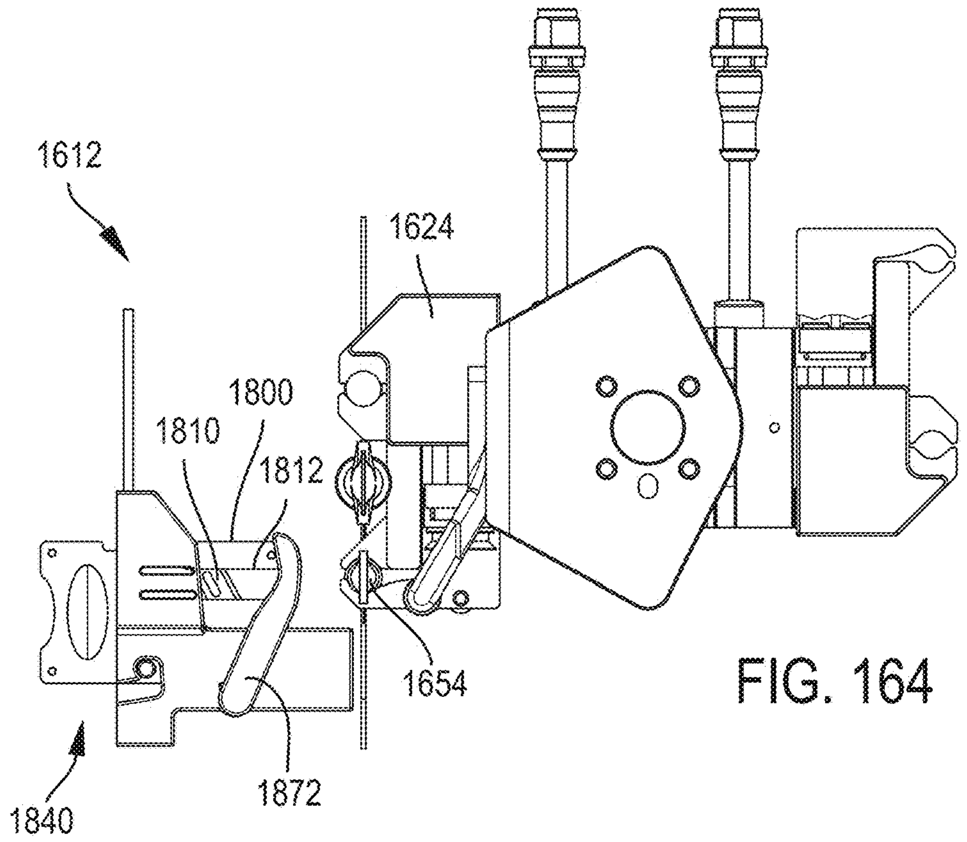
Figure 165:
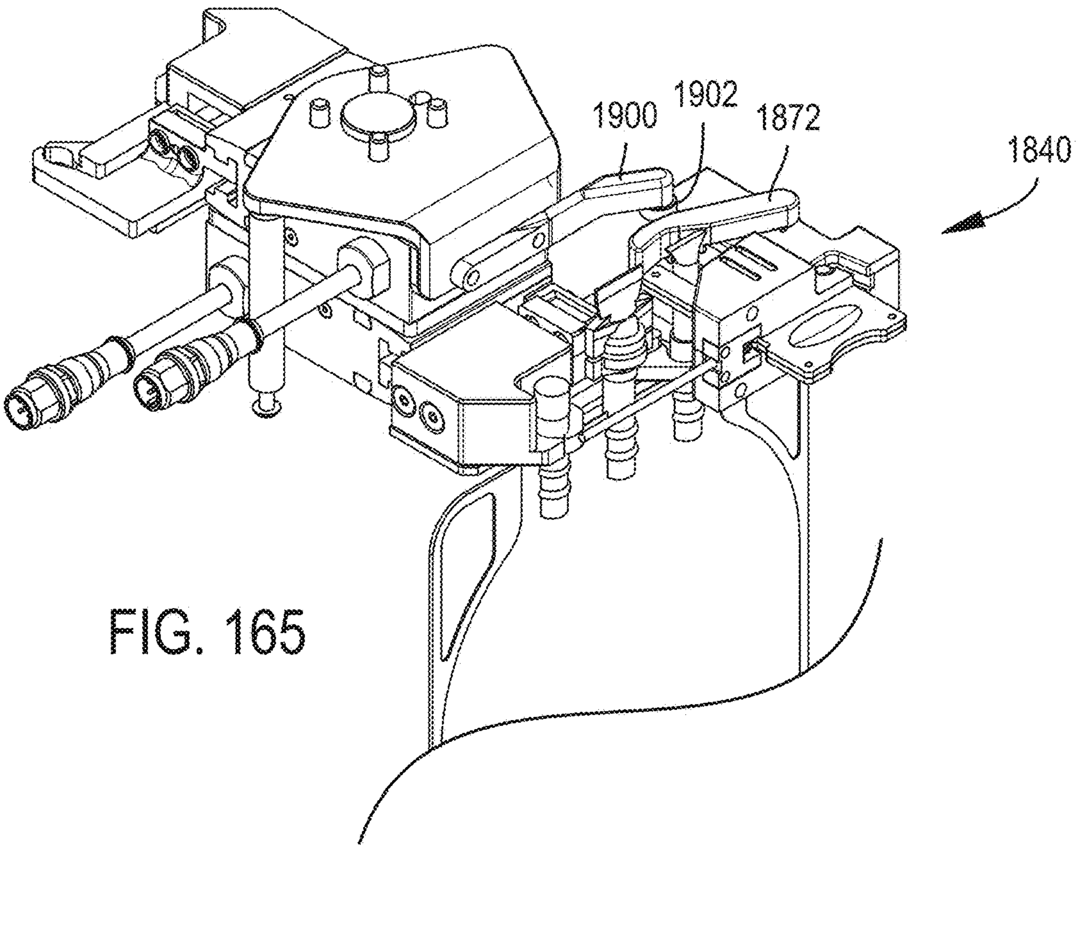
Figure 166:
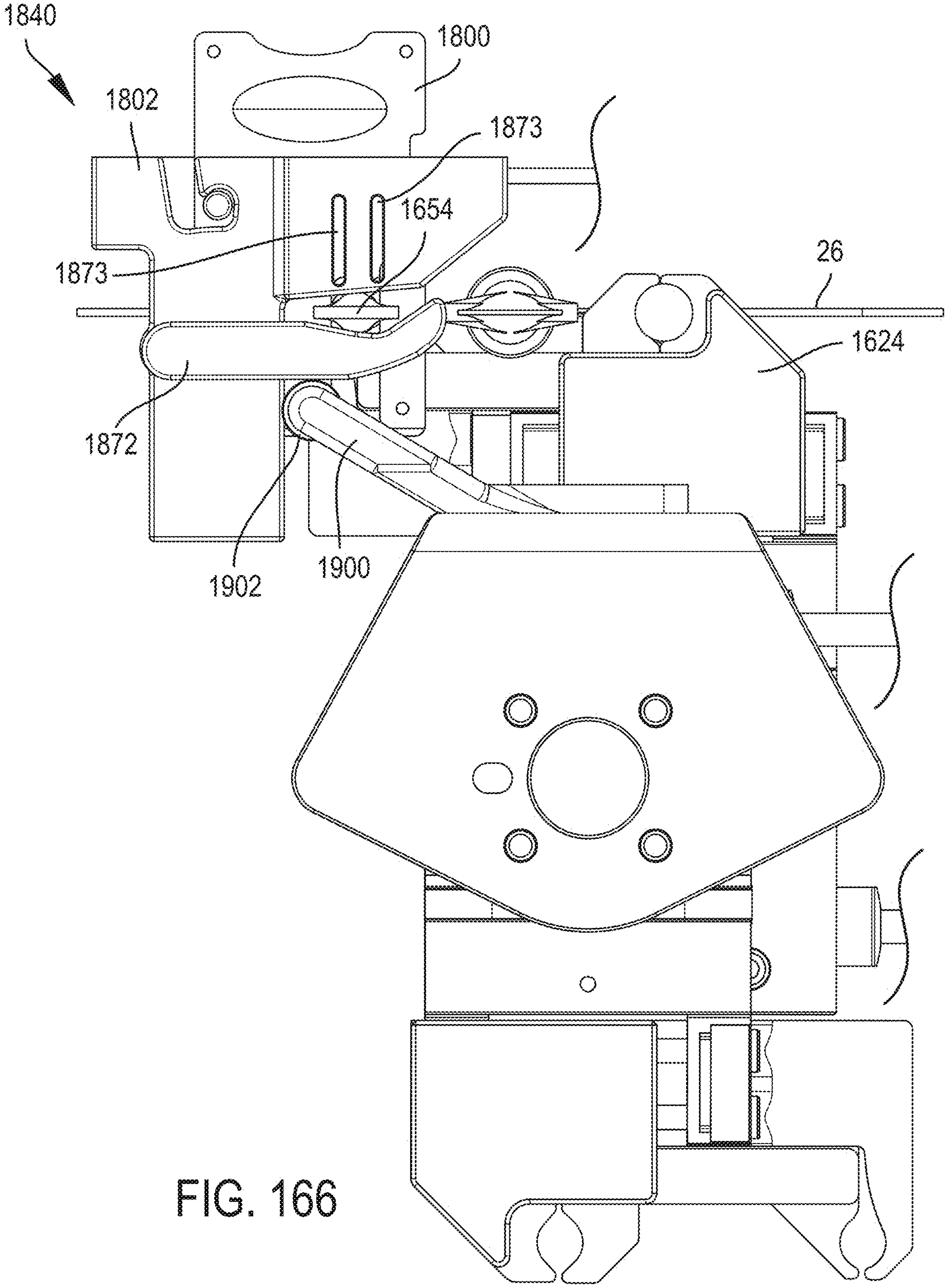
Figure 167:
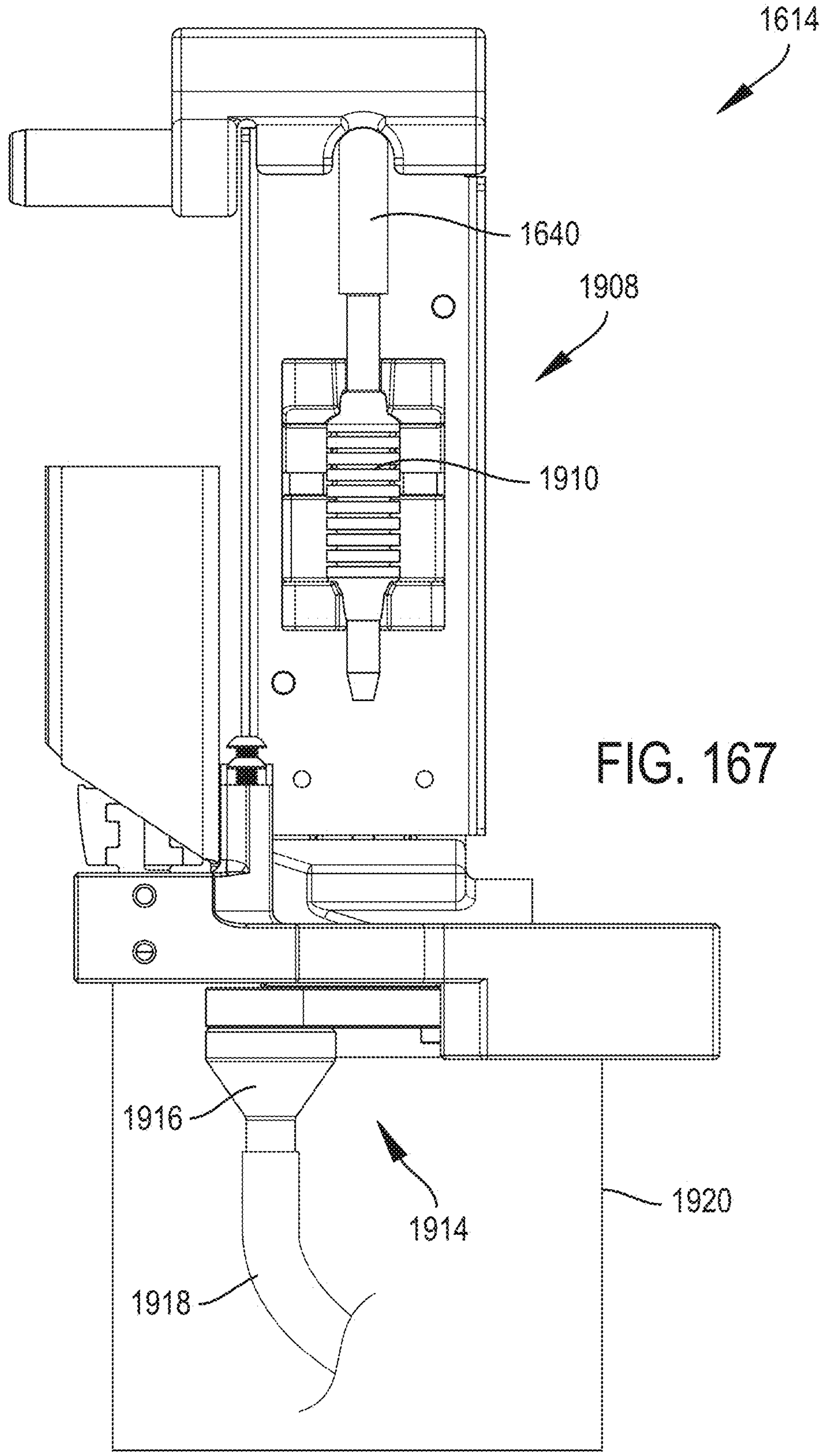
Figure 168:
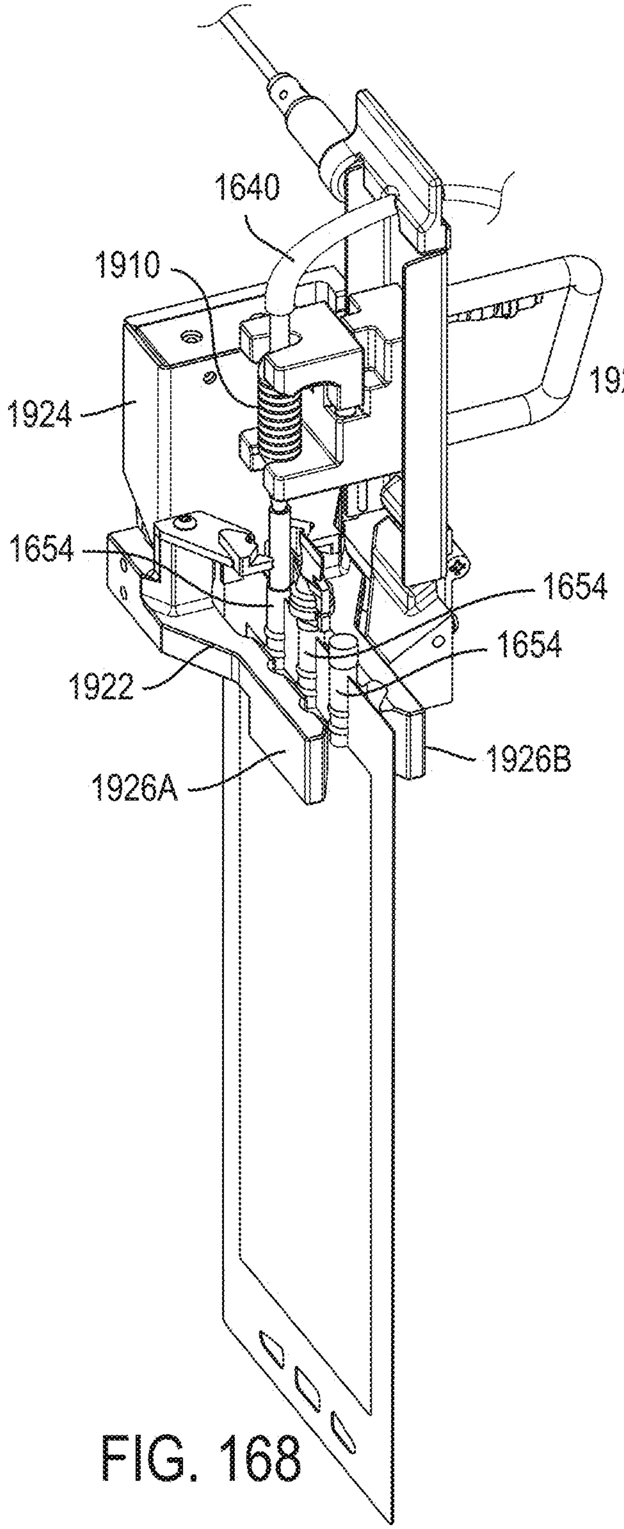
Figure 169:
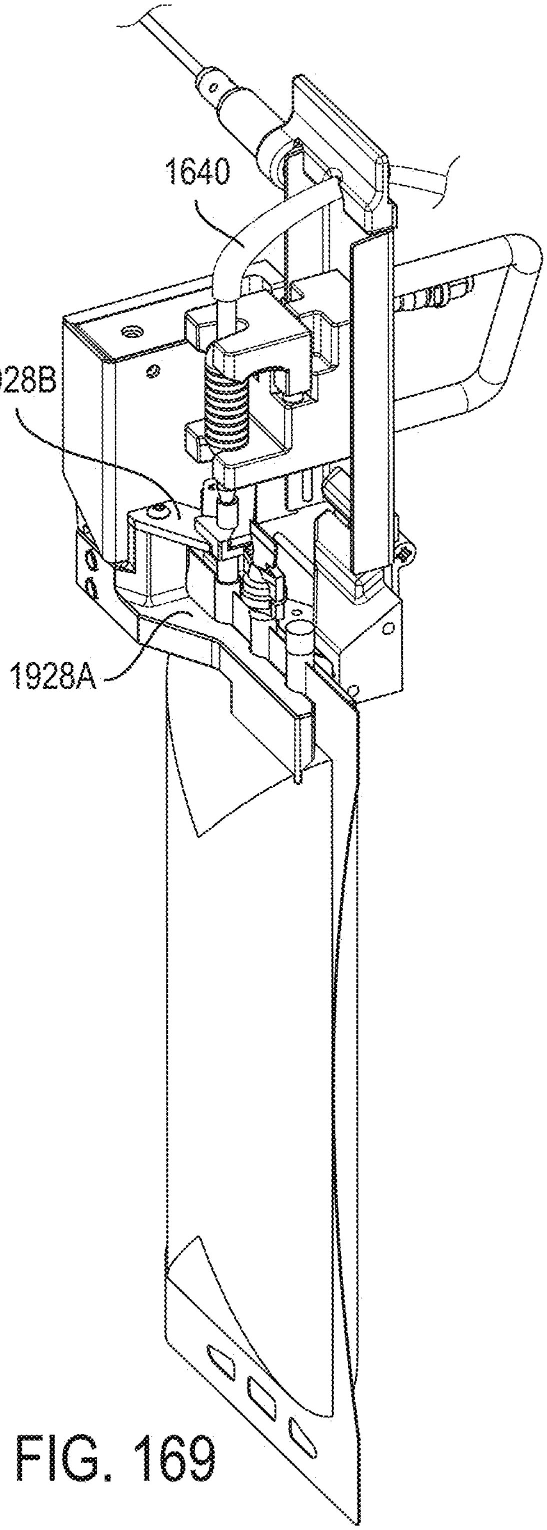
Figure 170:
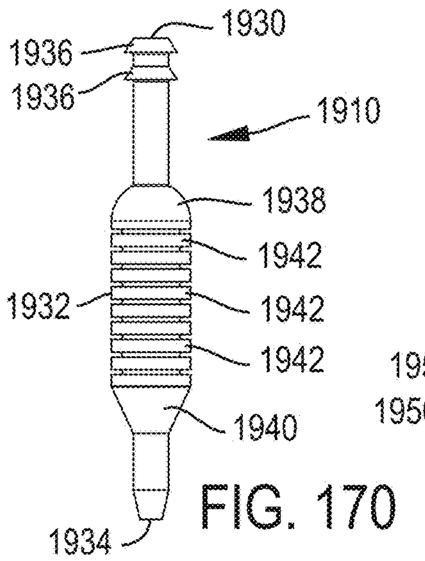
Figure 171:
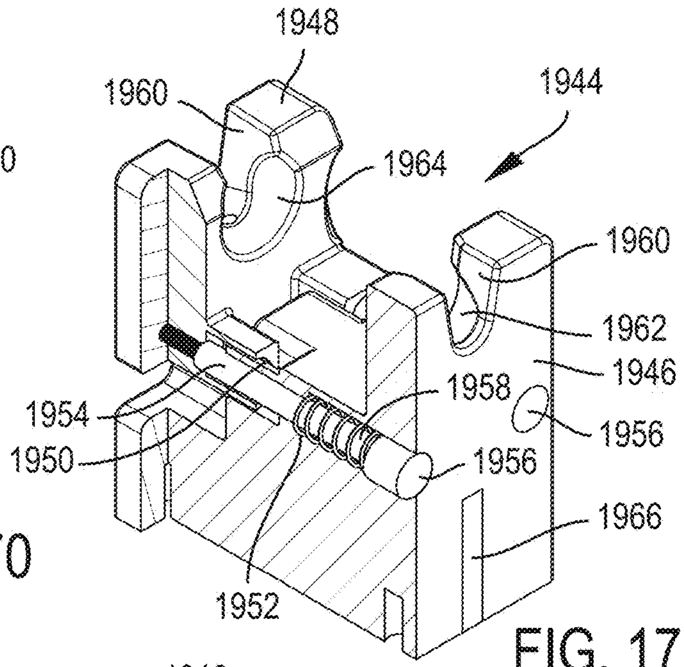
Figure 172A:
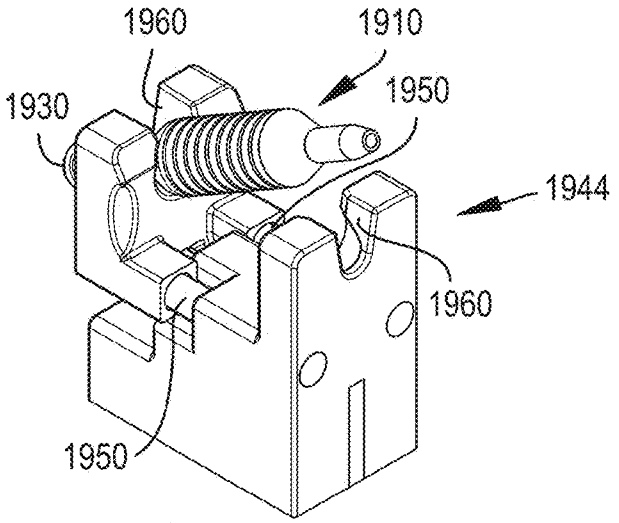
Figure 172B:
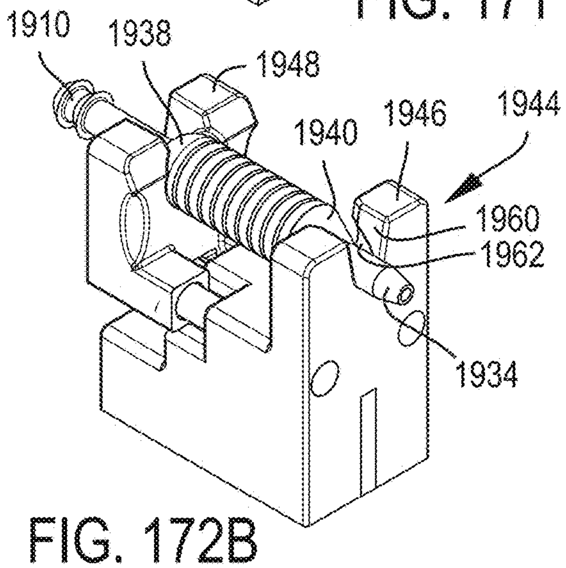
Figure 172C:
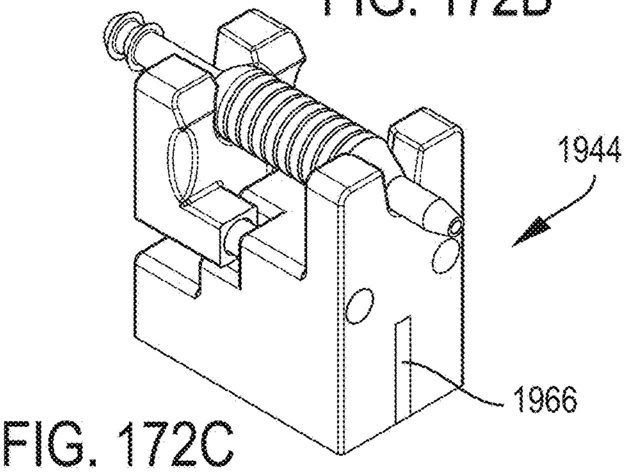
Figure 173:
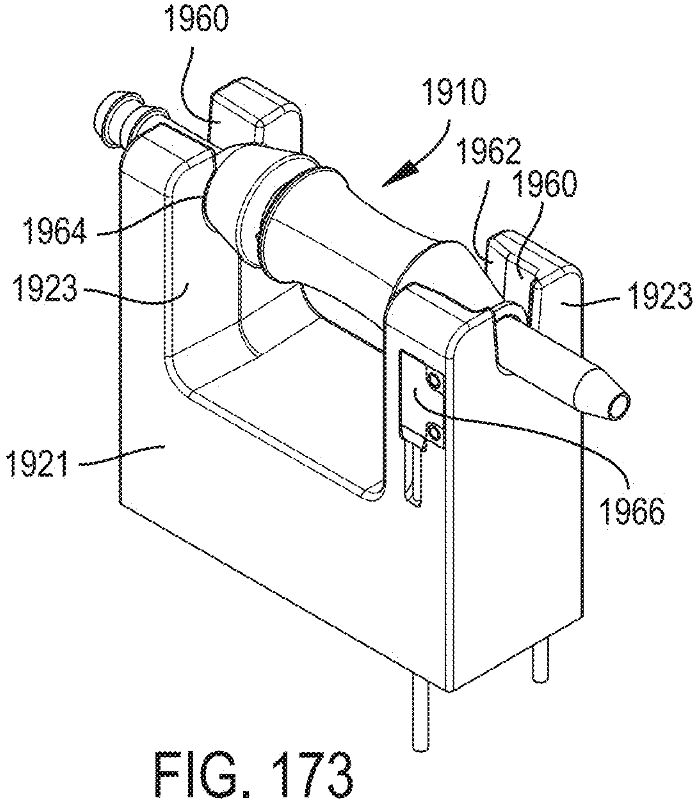
Figure 174:
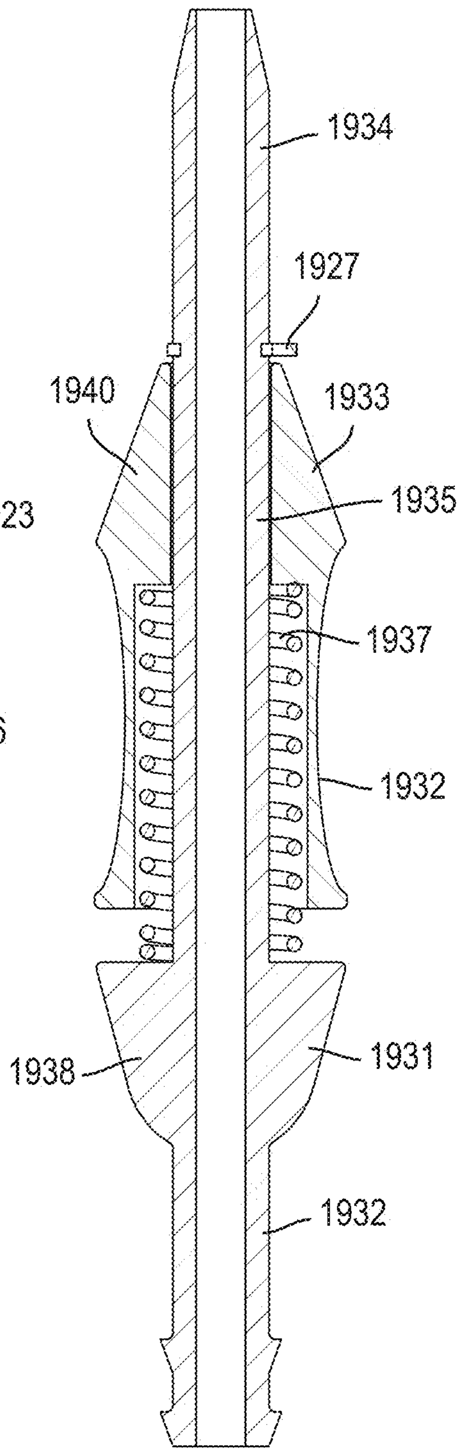
Figure 175:
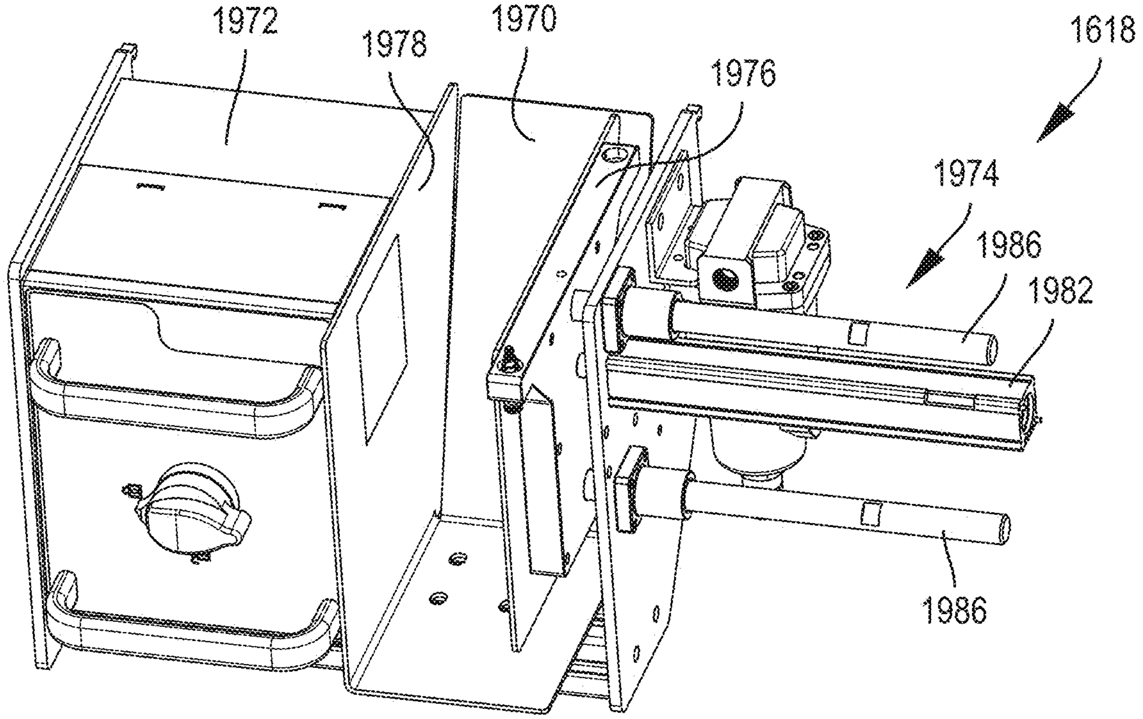
Figure 176:
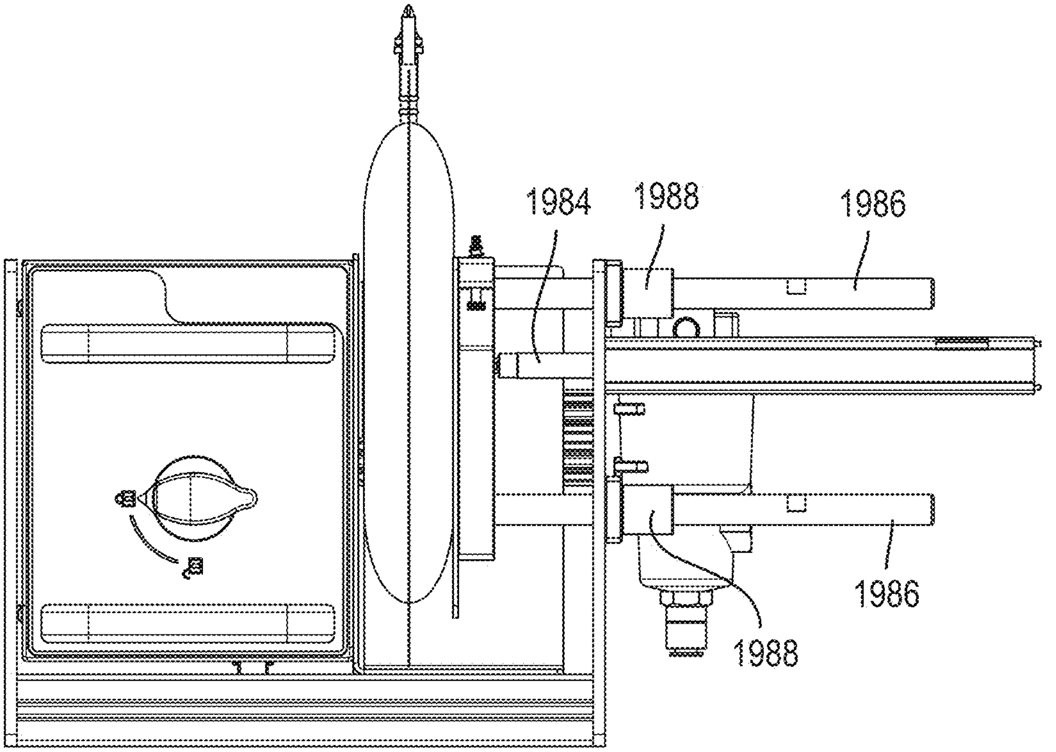
Figure 177:
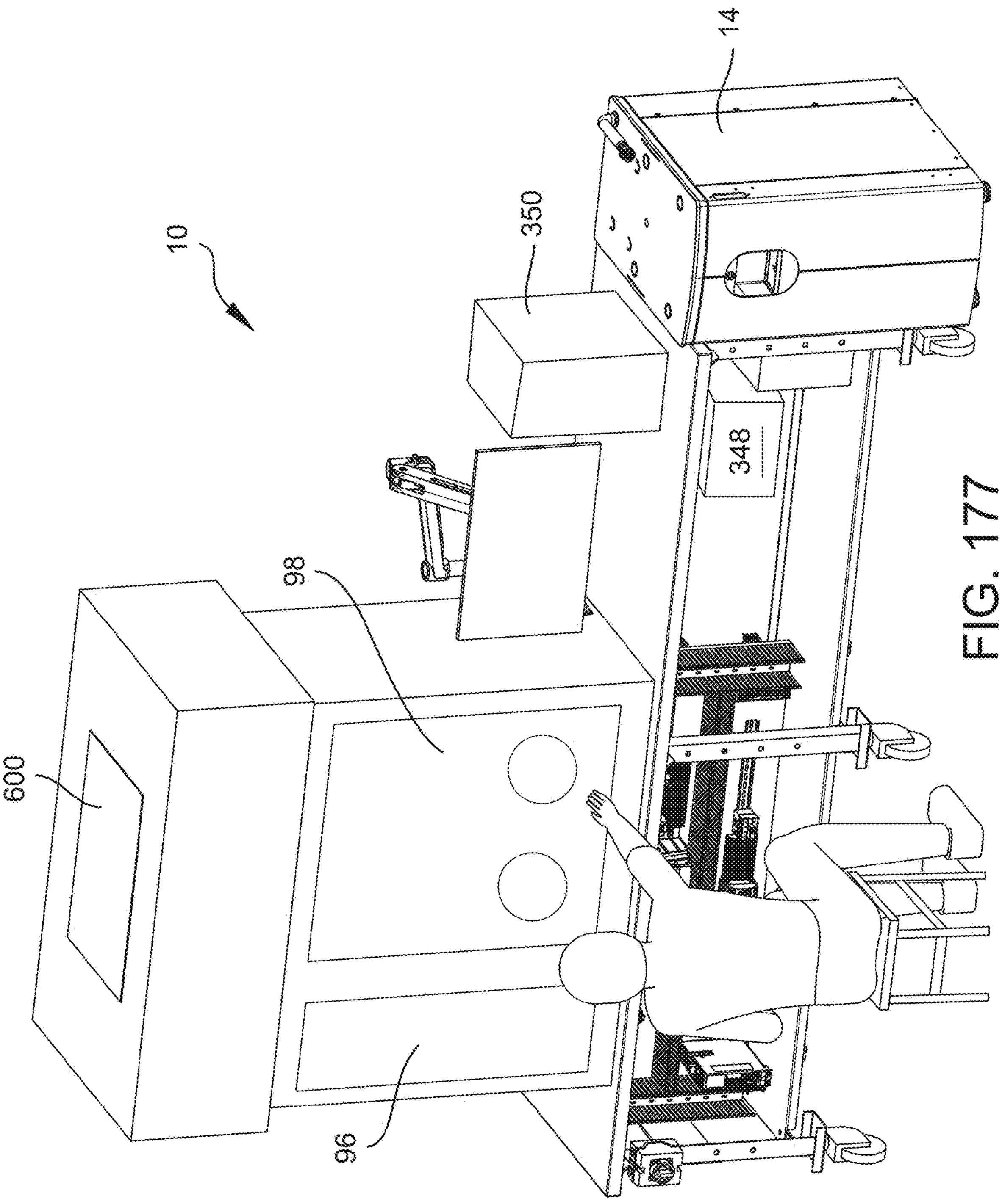
Figure 178:
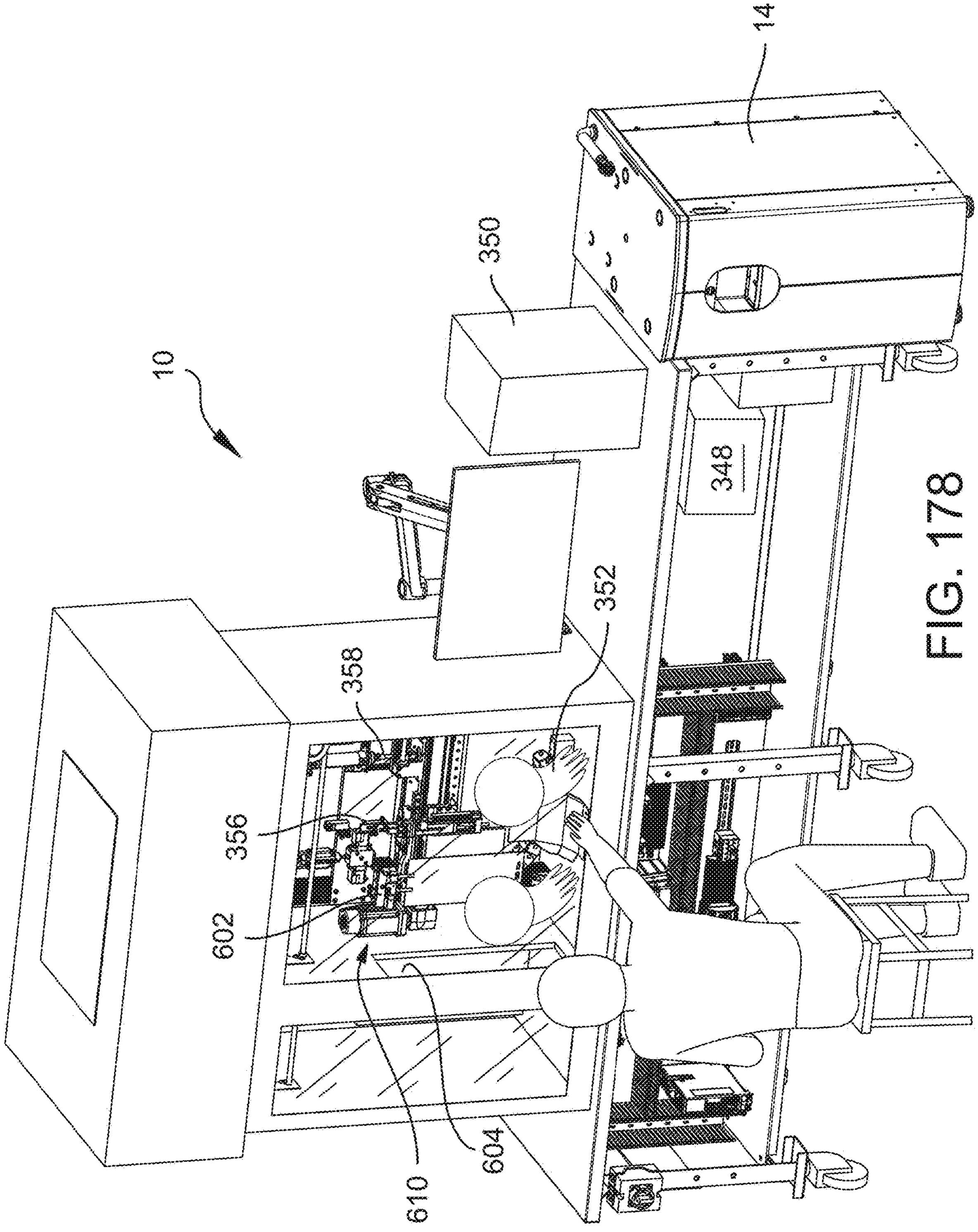
Figure 179:
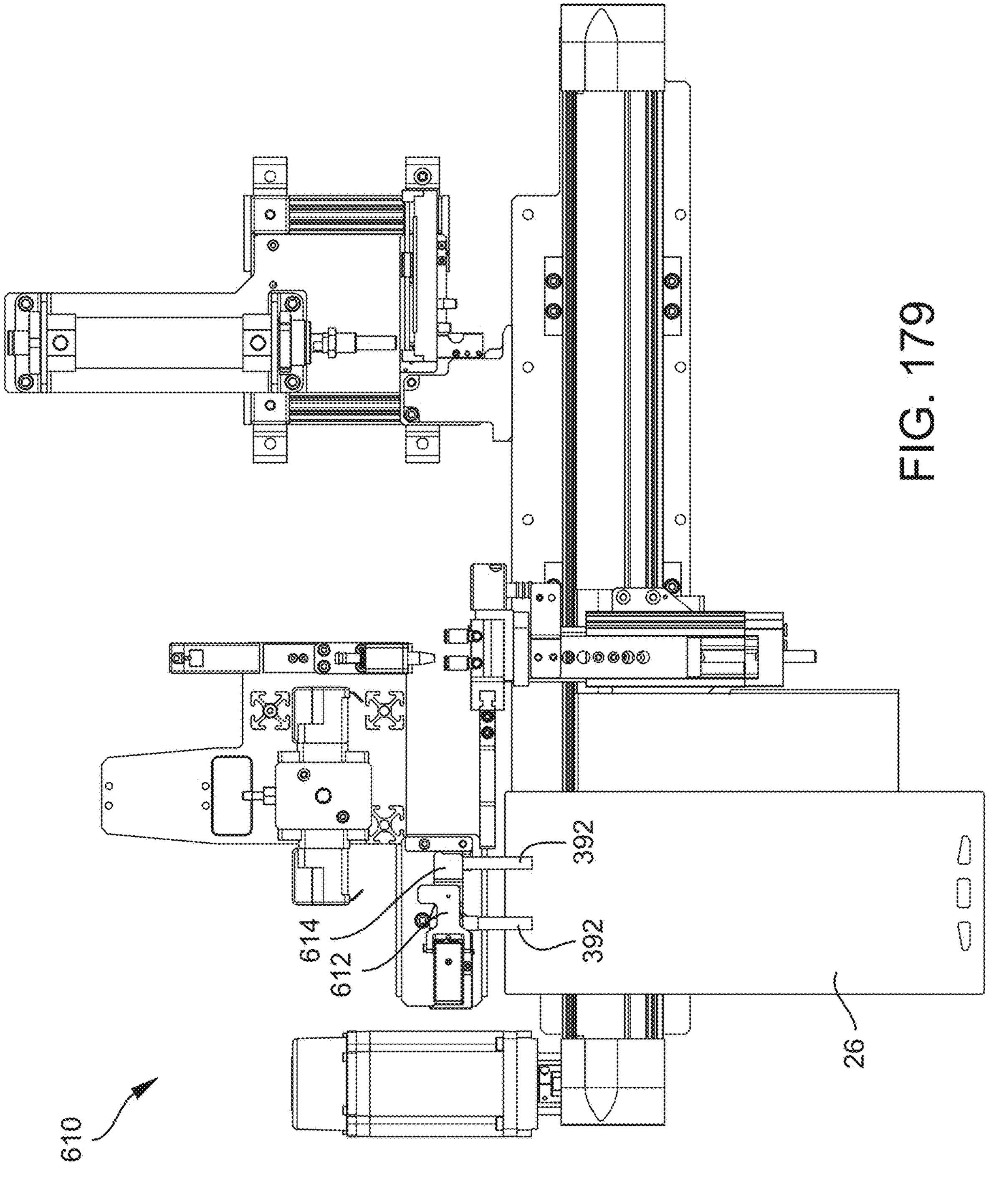
Figure 180A:
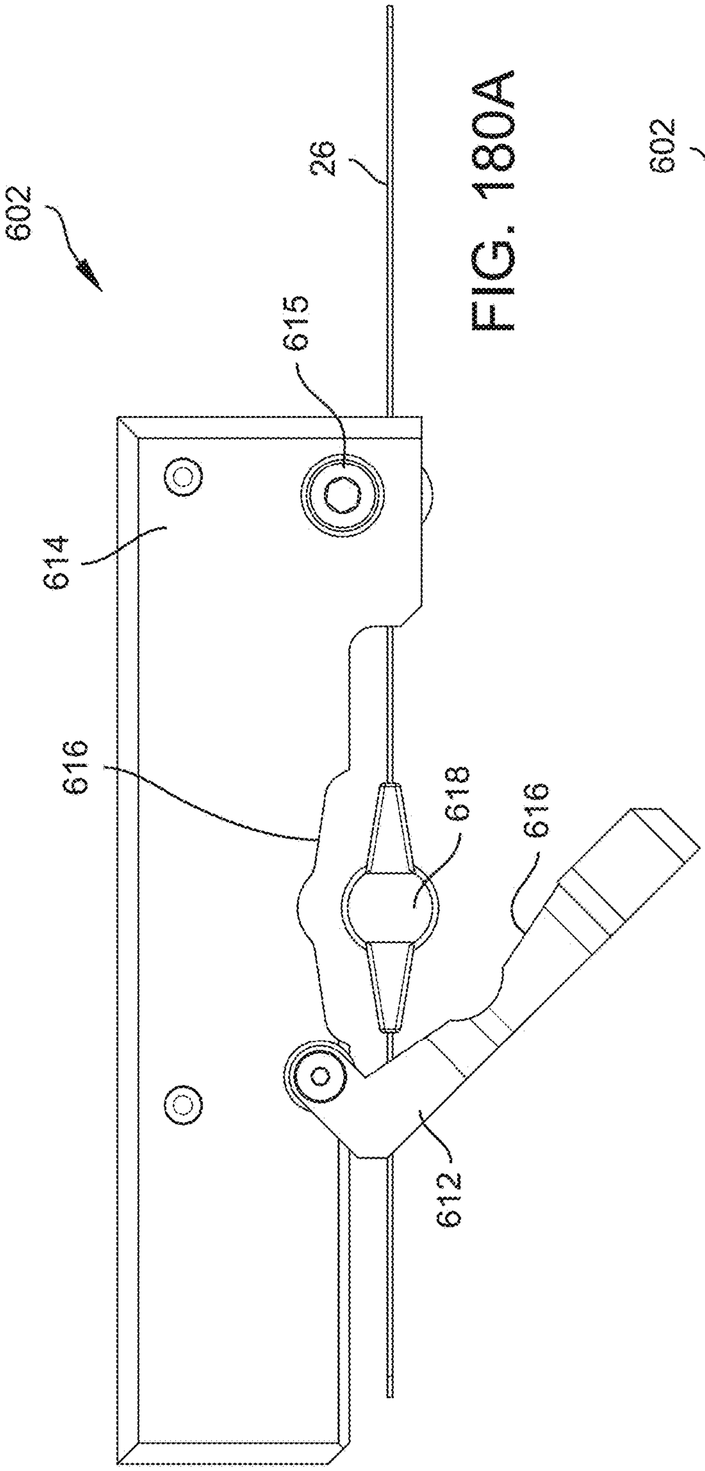
Figure 180B:
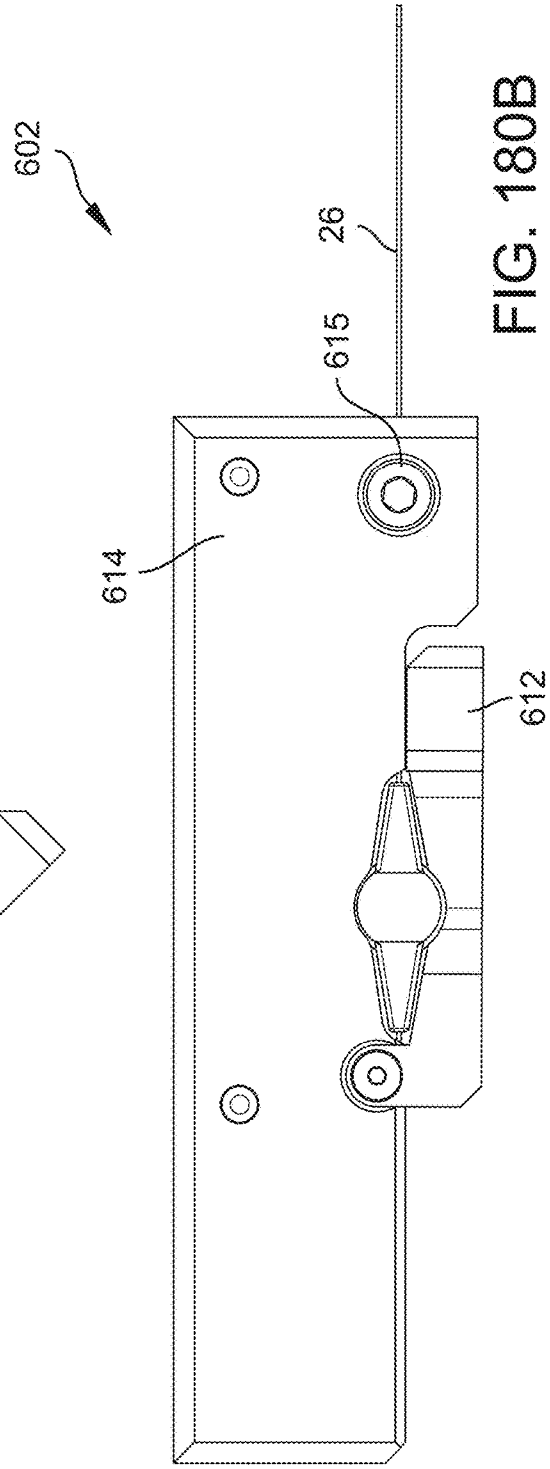
Figure 181:
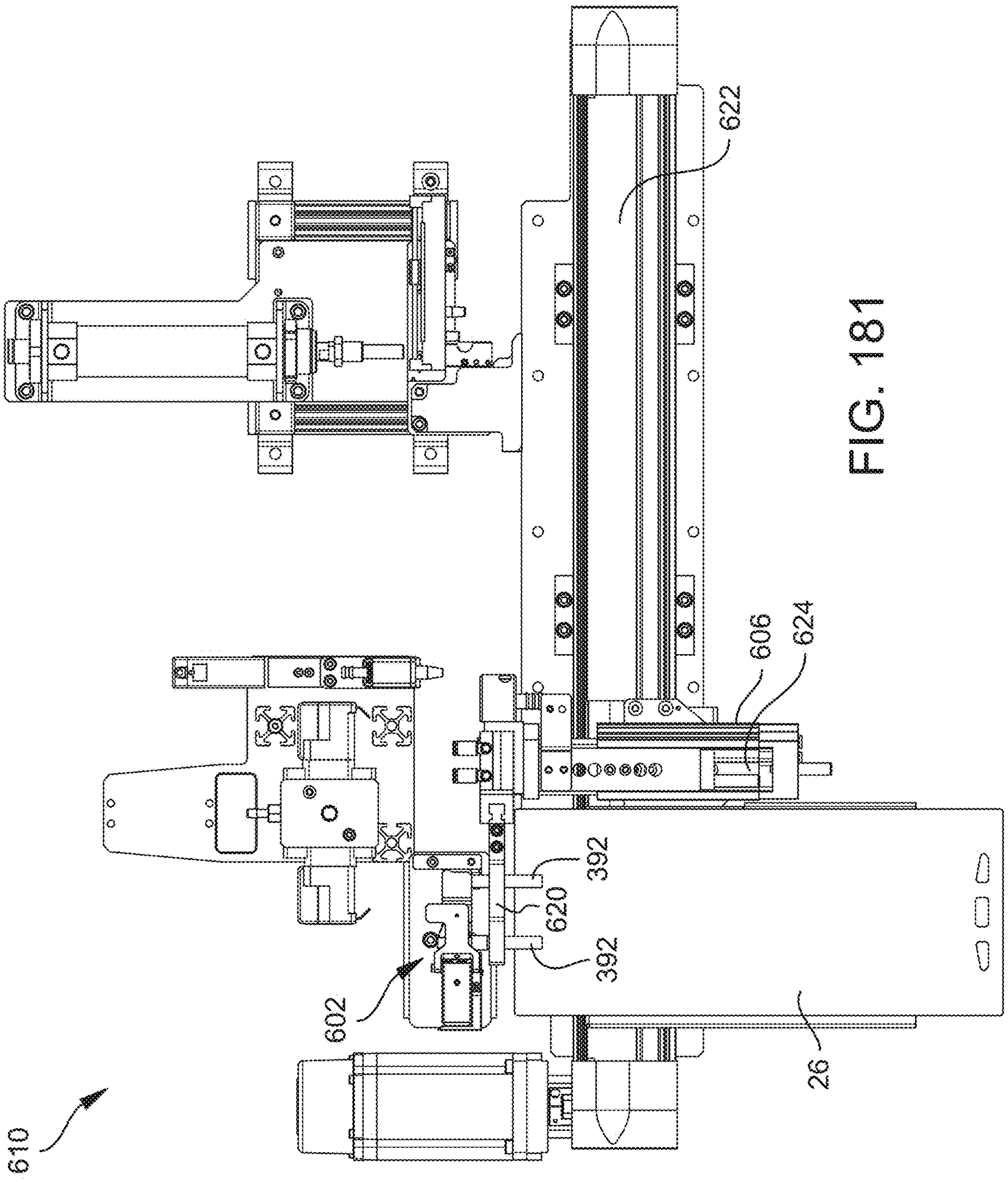
Figure 182:
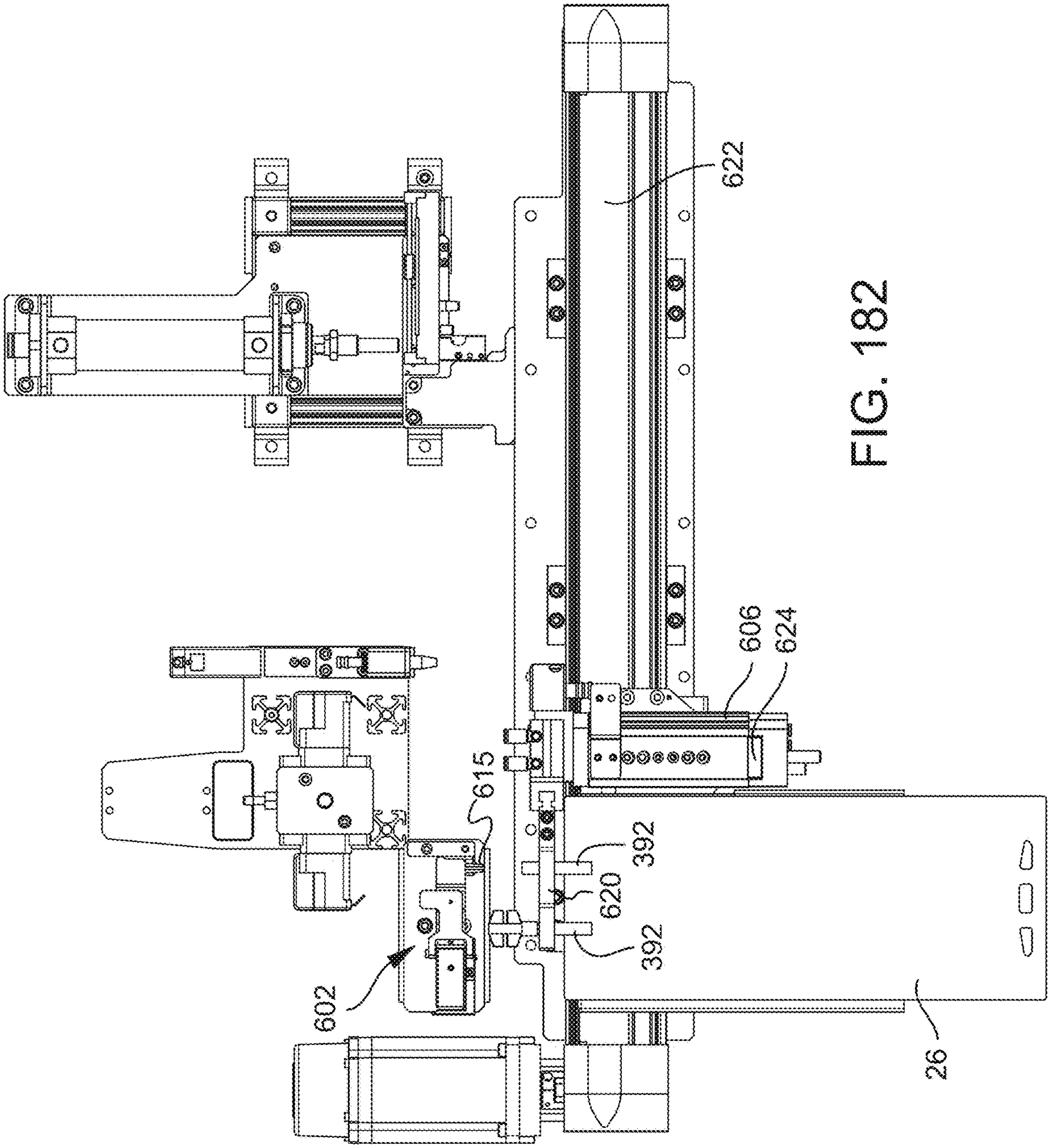
Figure 183:
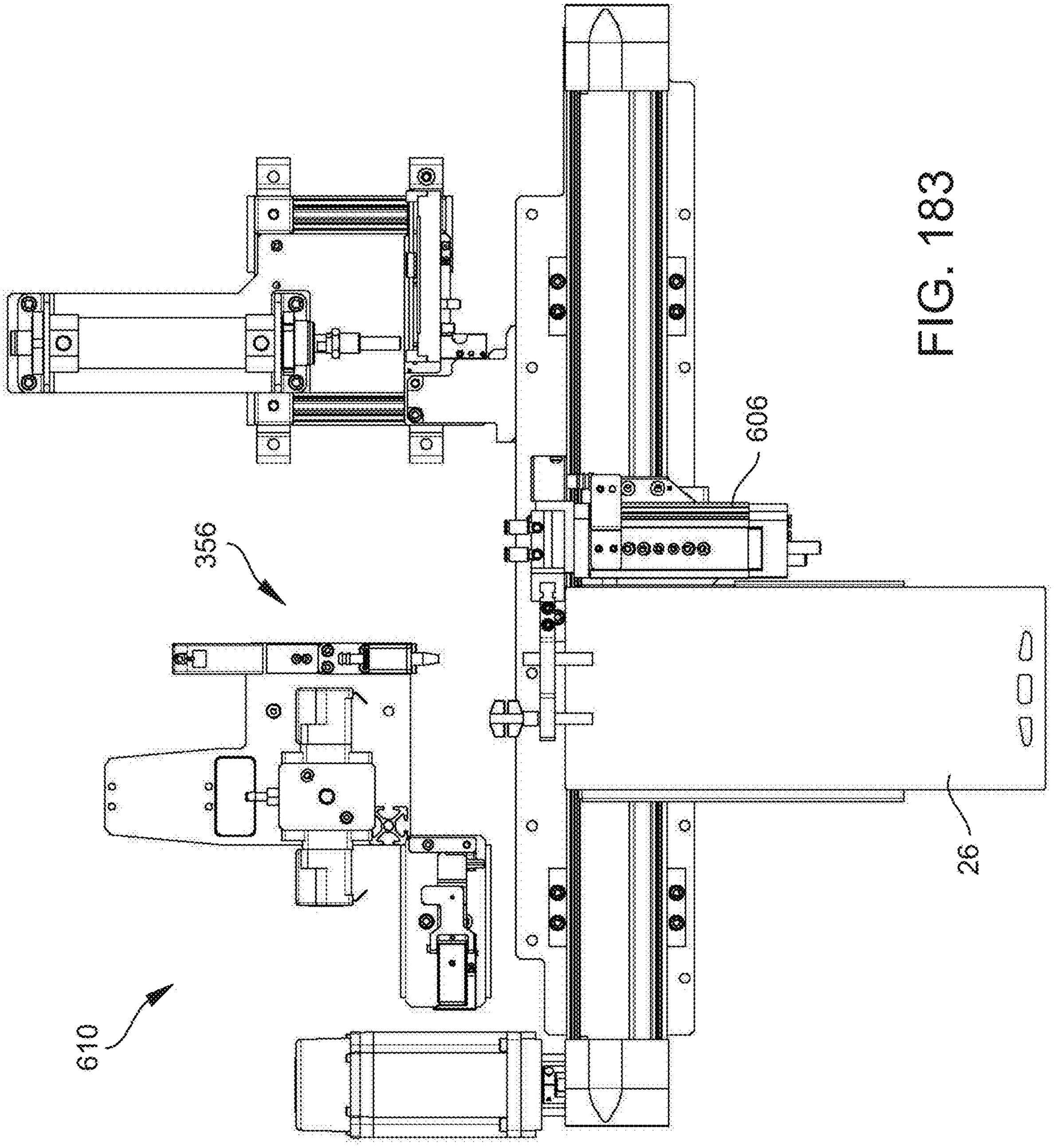
Figure 184A:
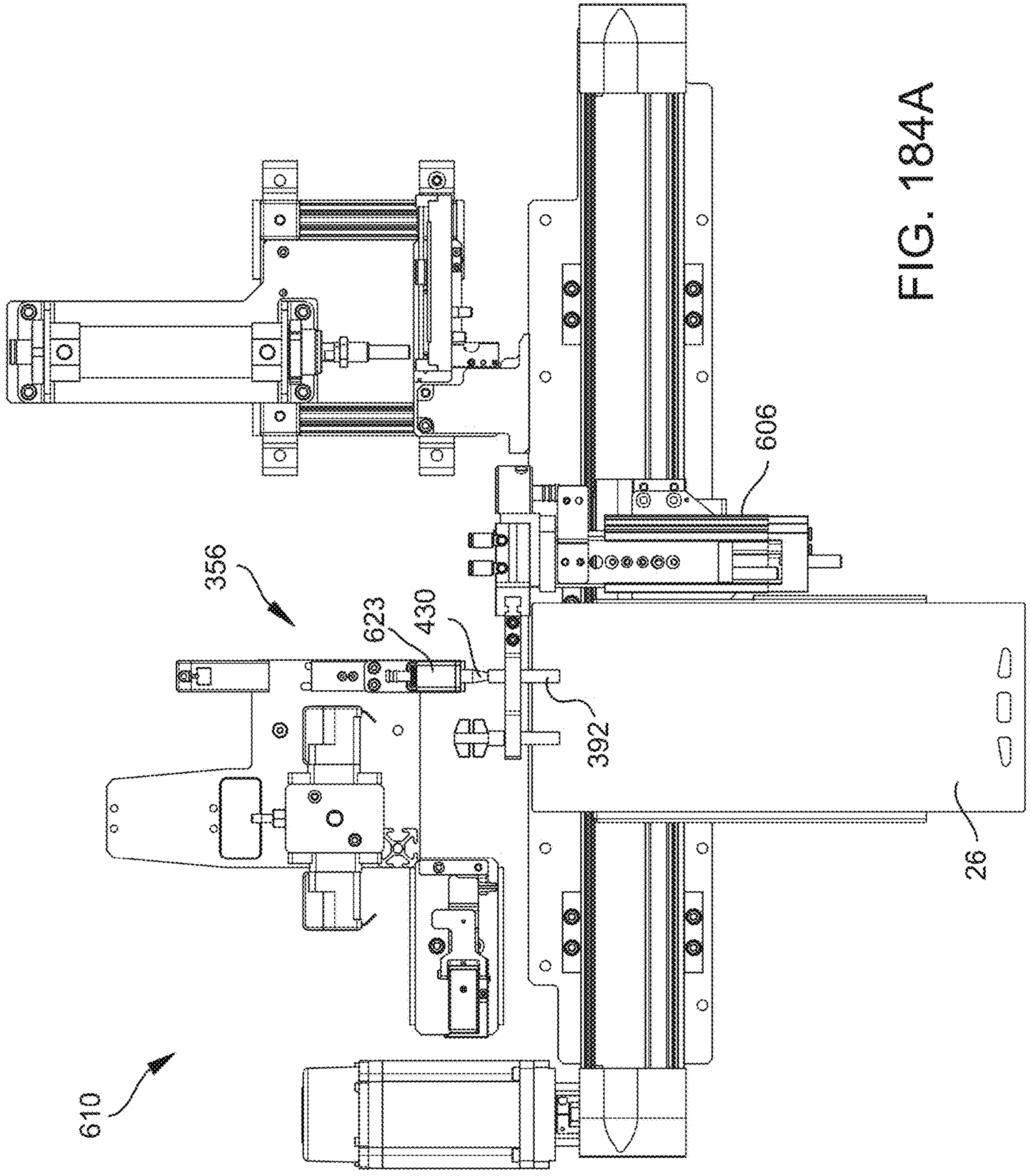
Figure 184B:
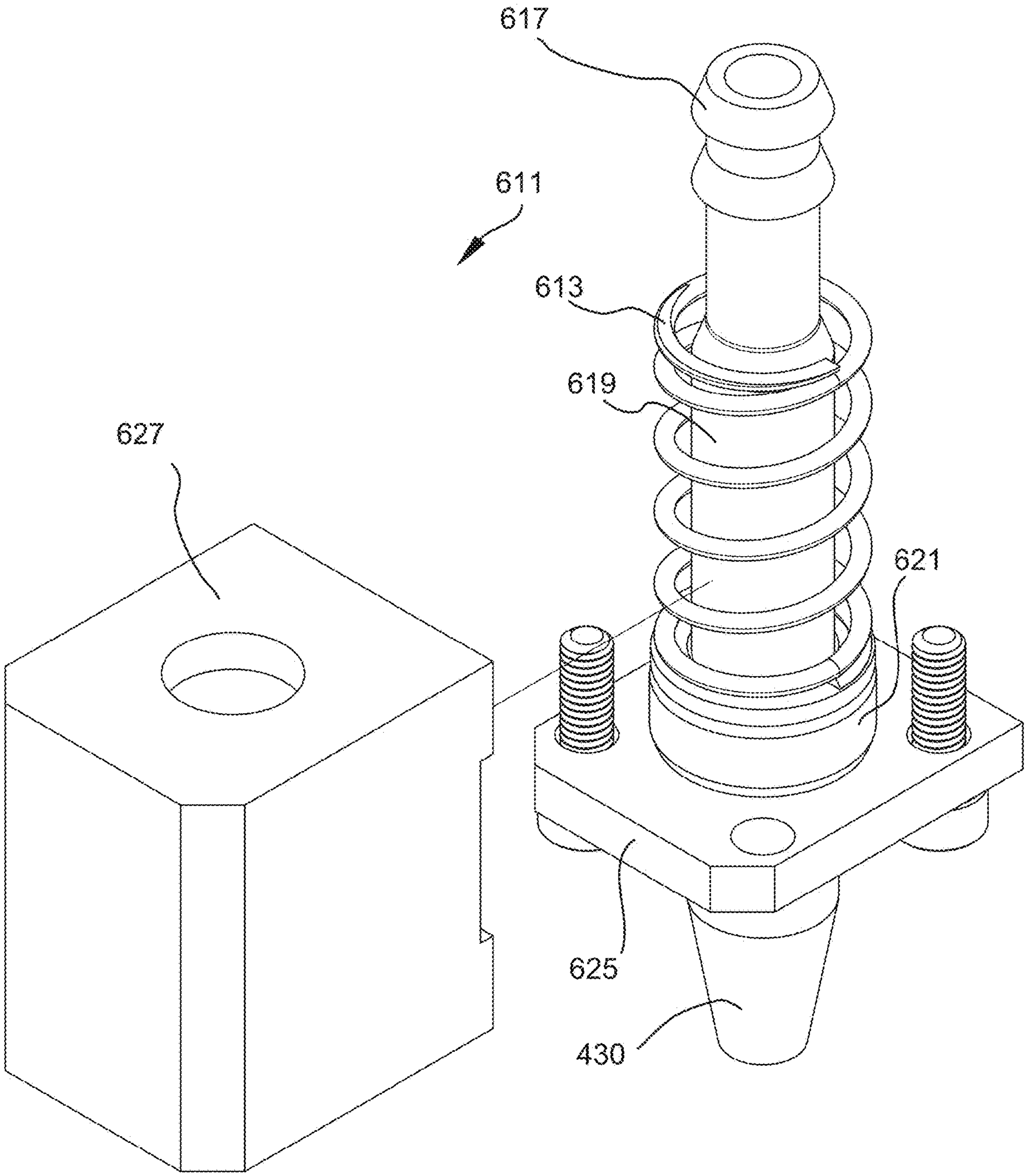
Figure 185:
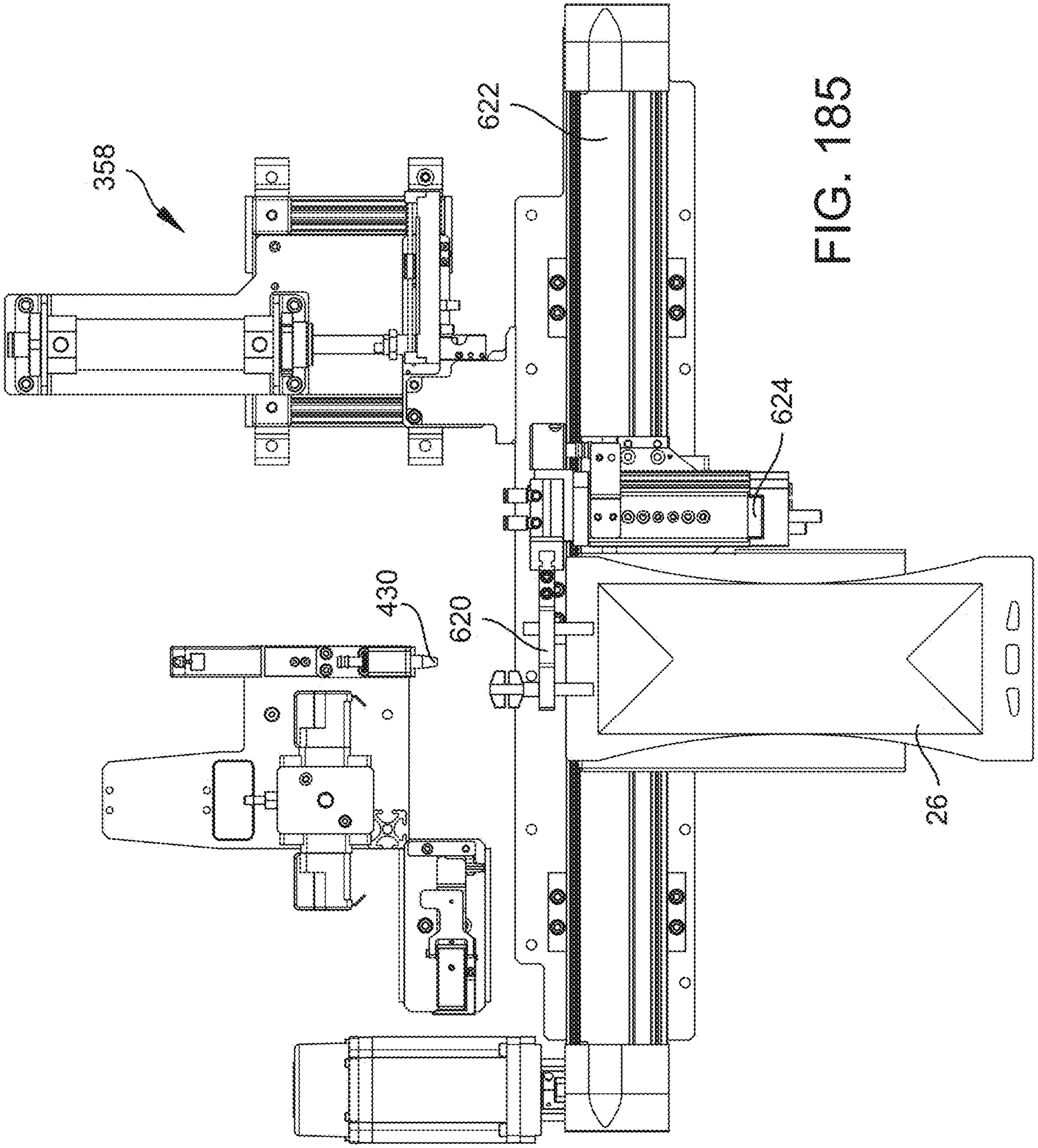
Figure 186:
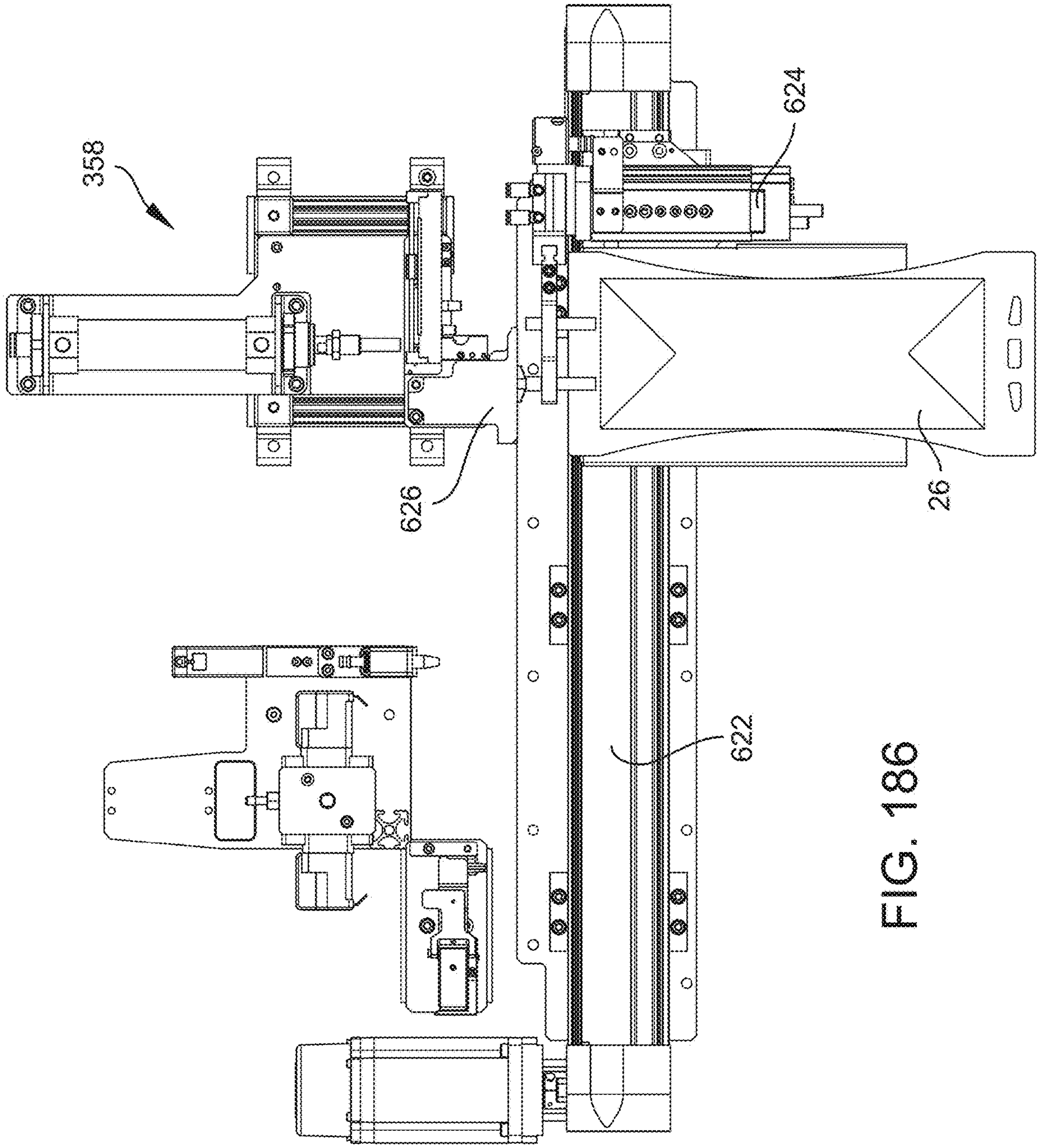
Figure 187:
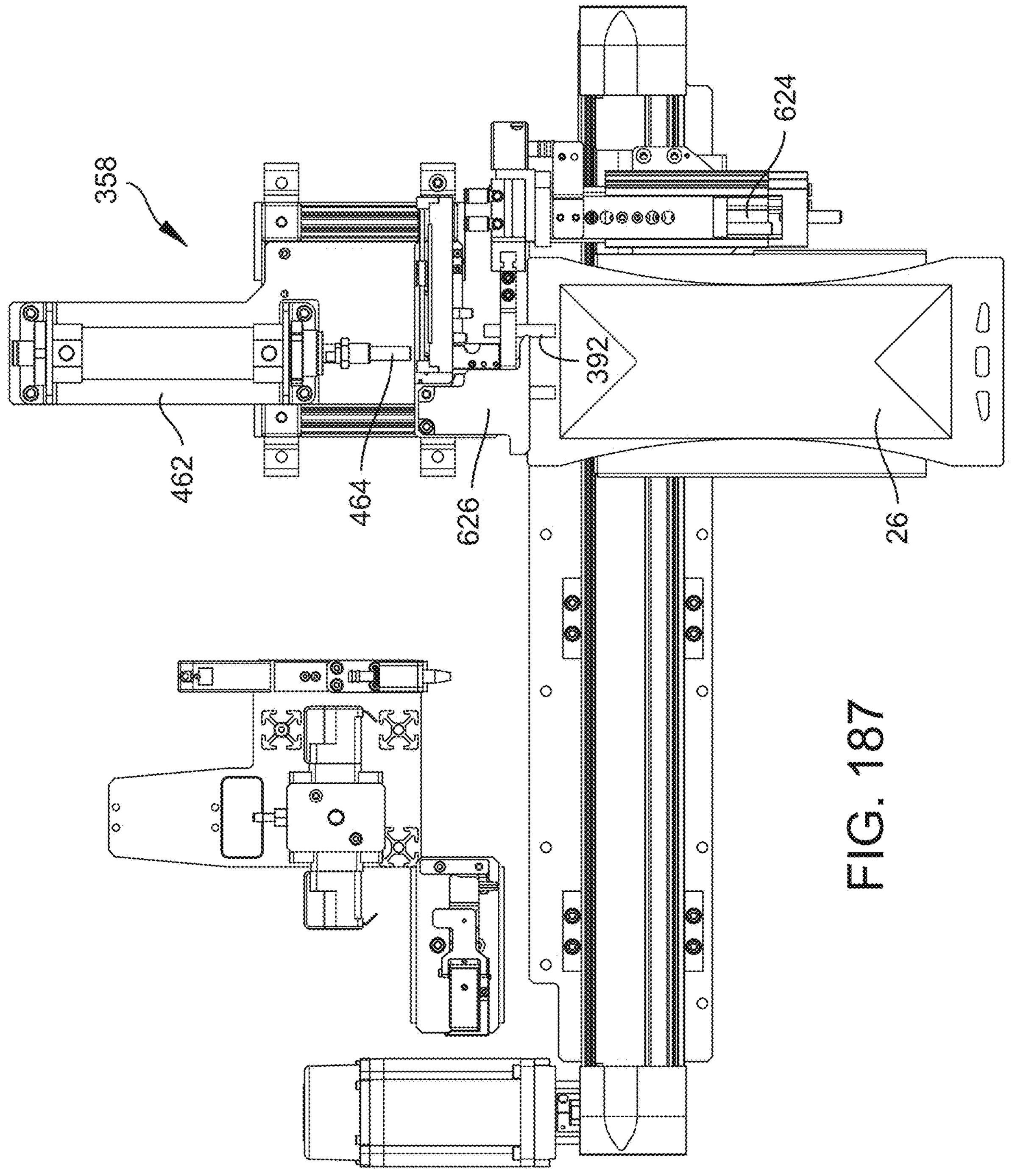
Figure 188:
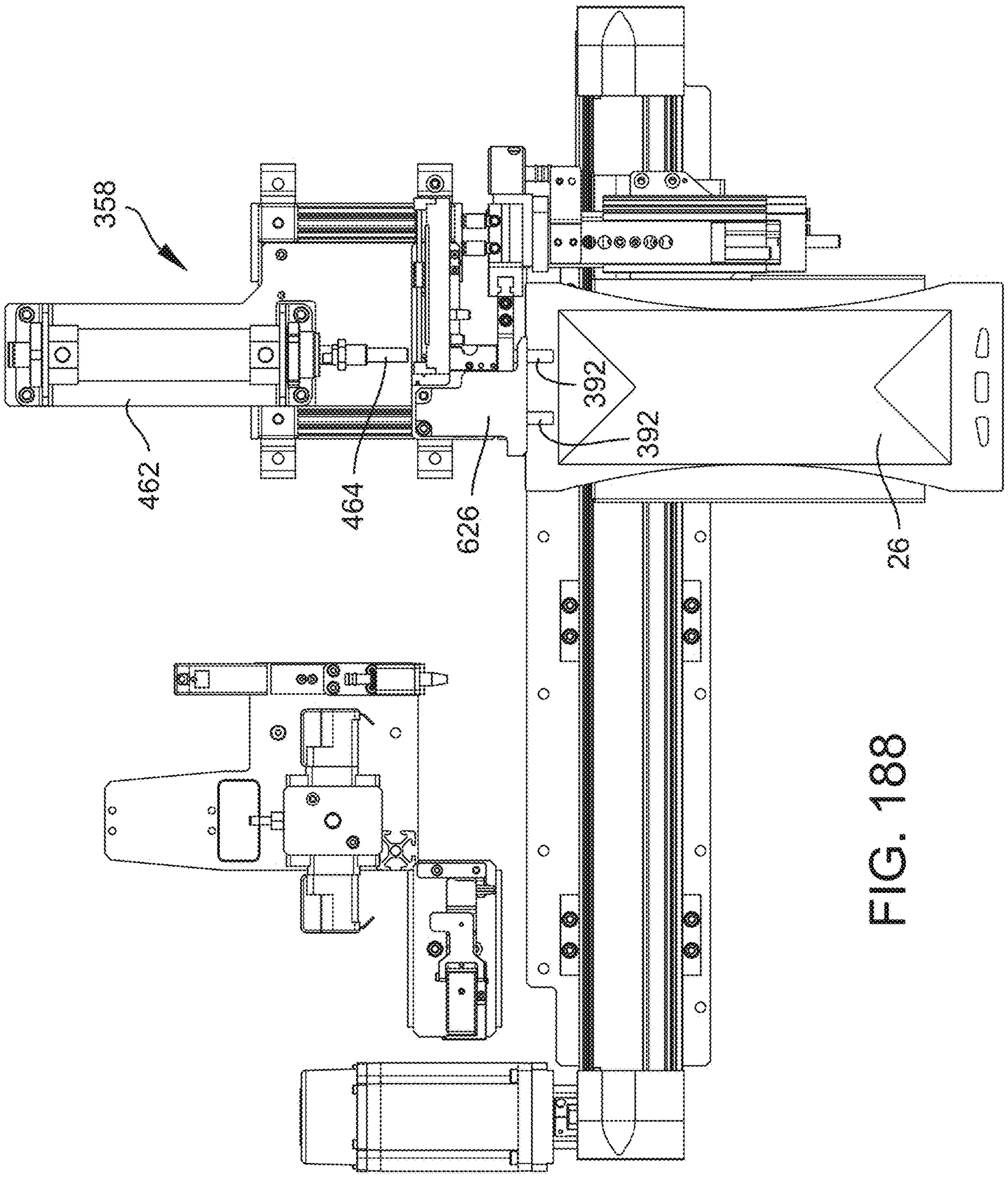
Figure 189:
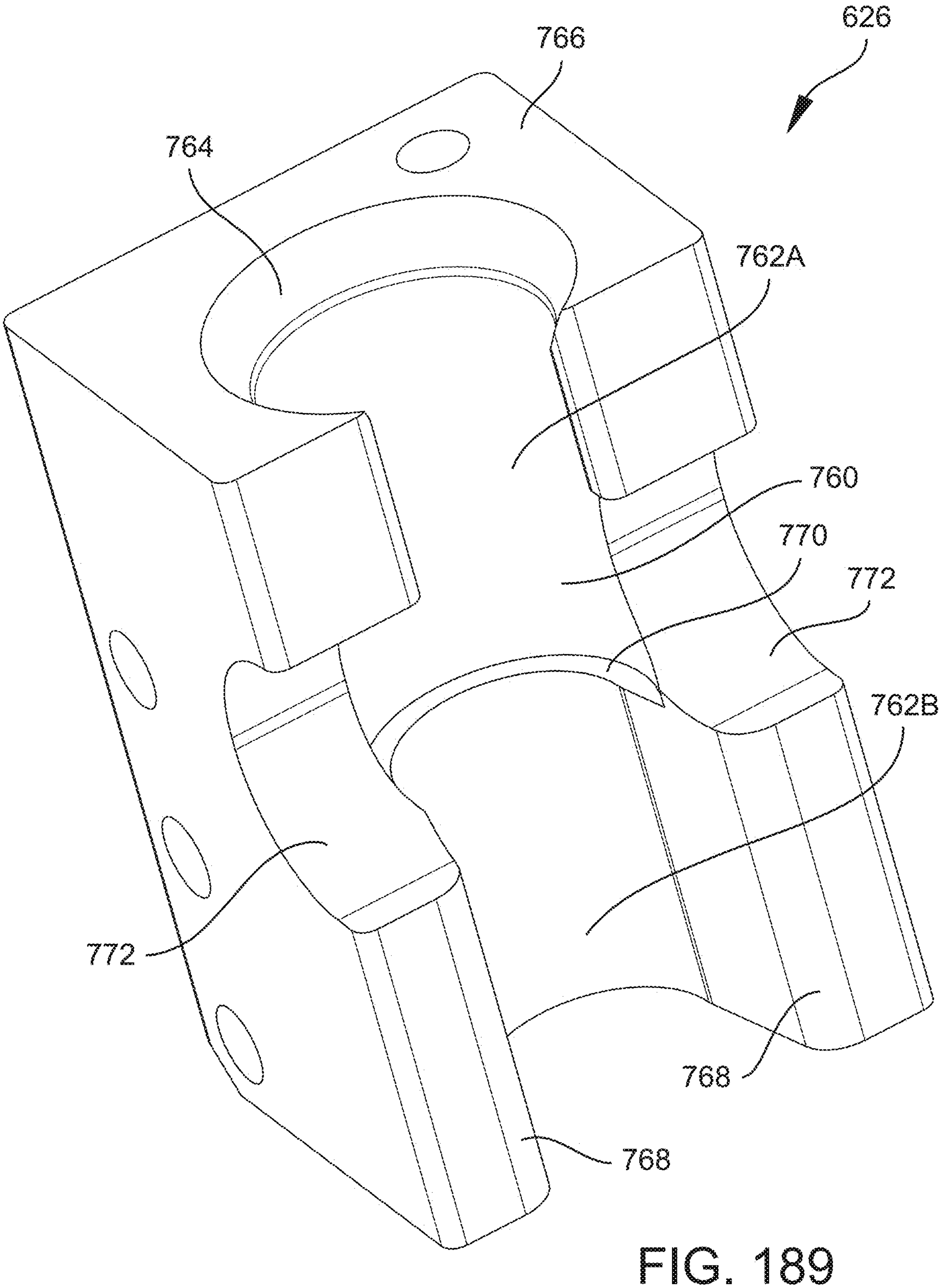
Figure 190:
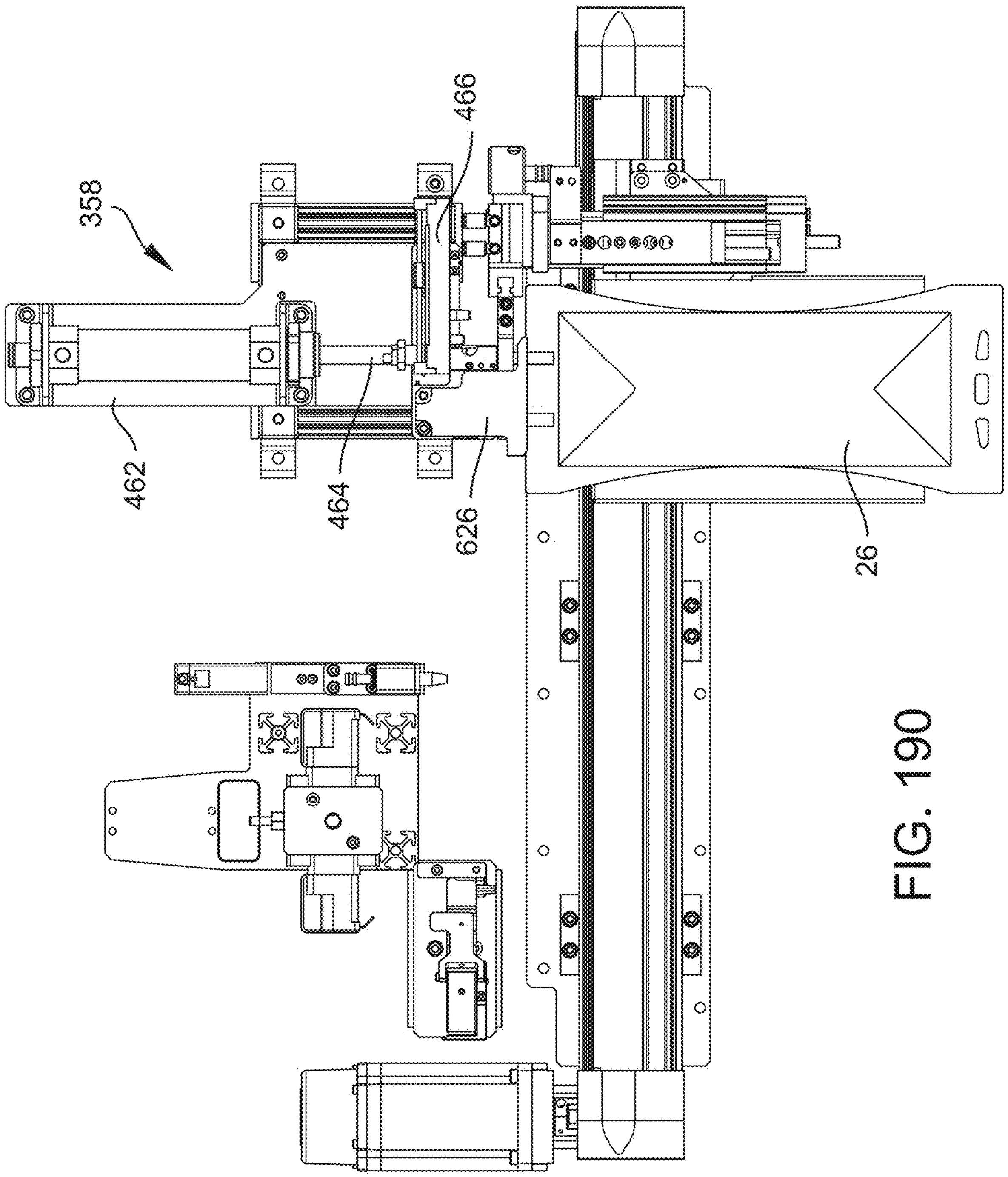
Figure 191:
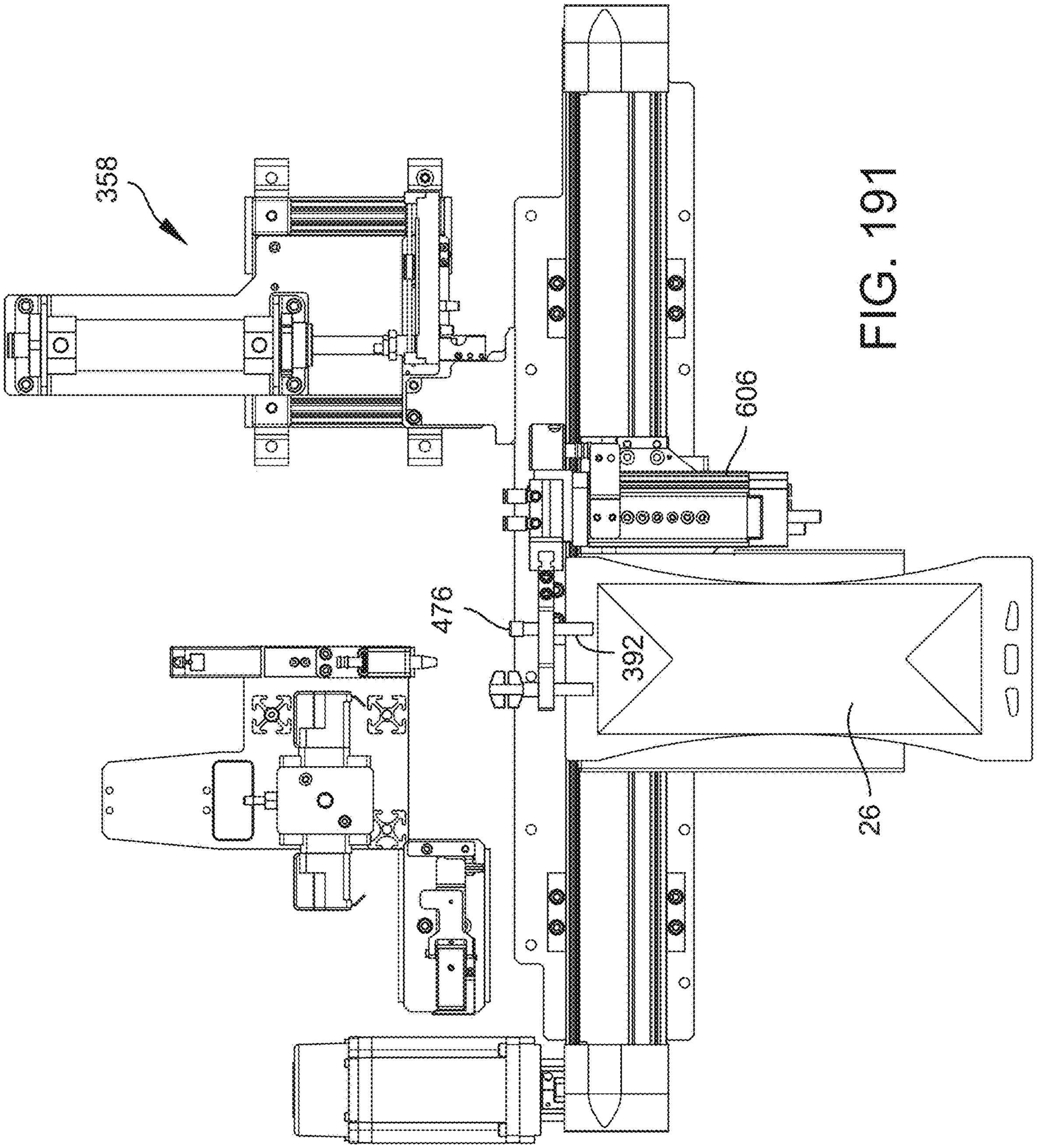
Figure 192:
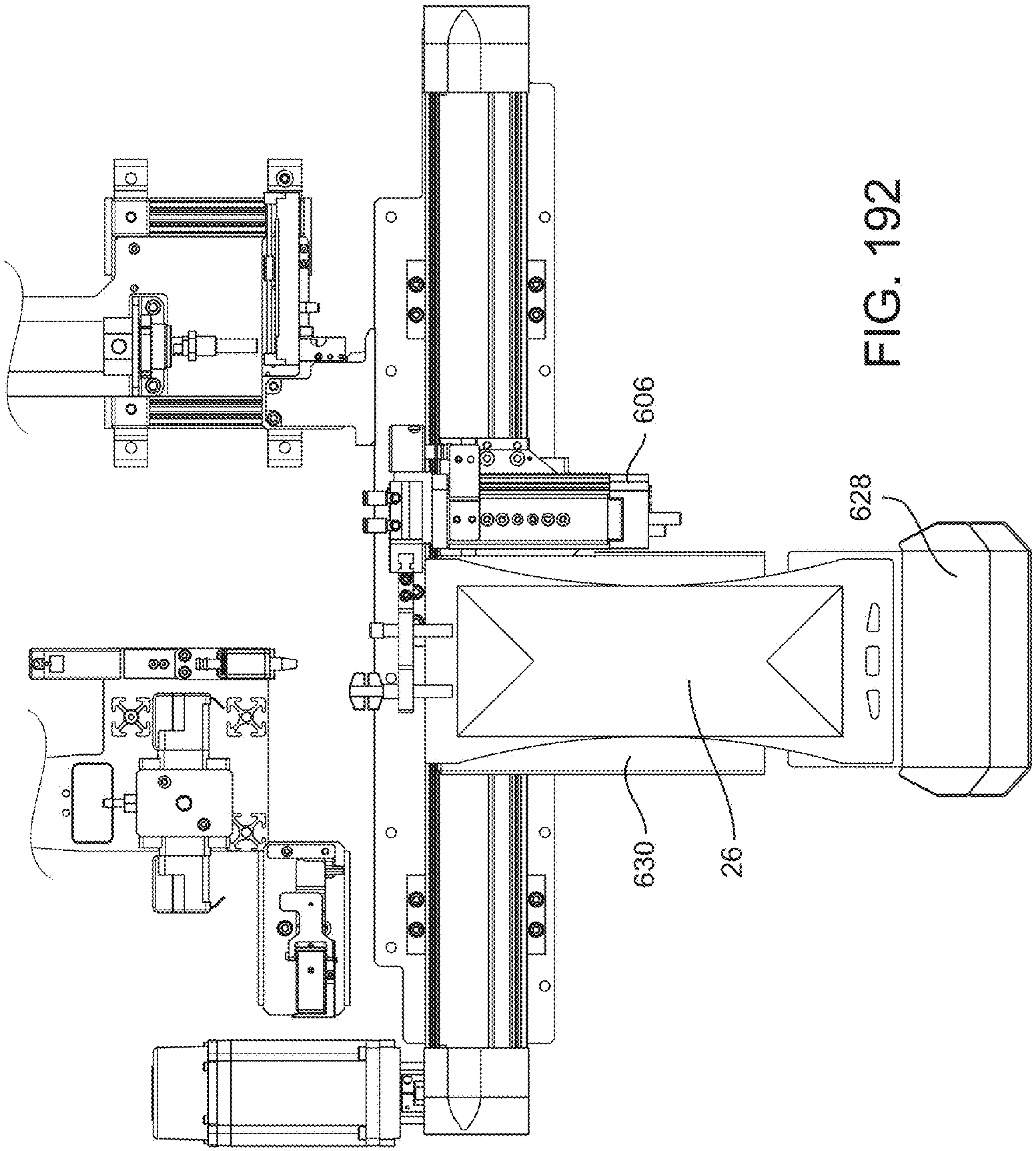
Figure 193:
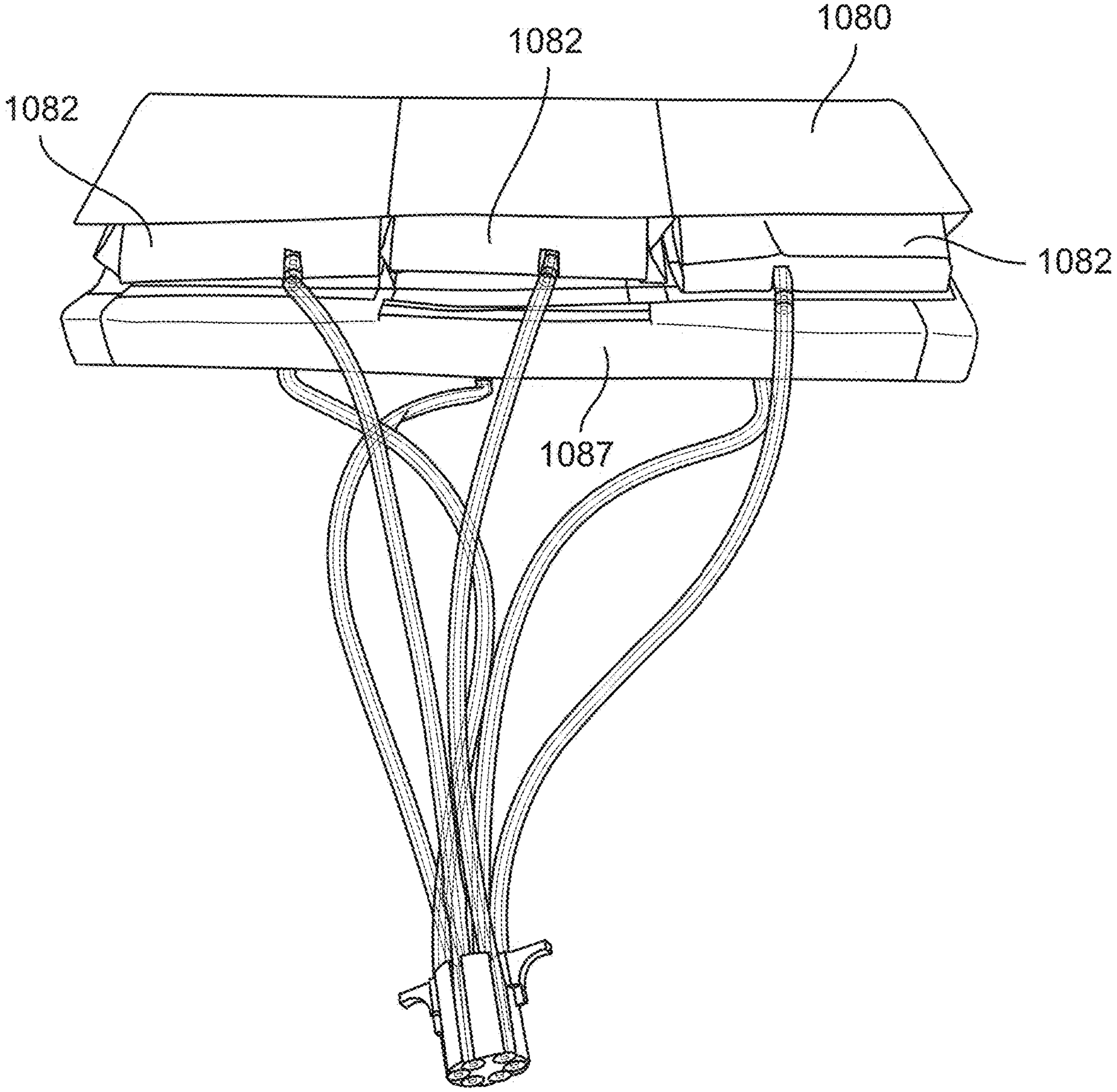
Figure 194:
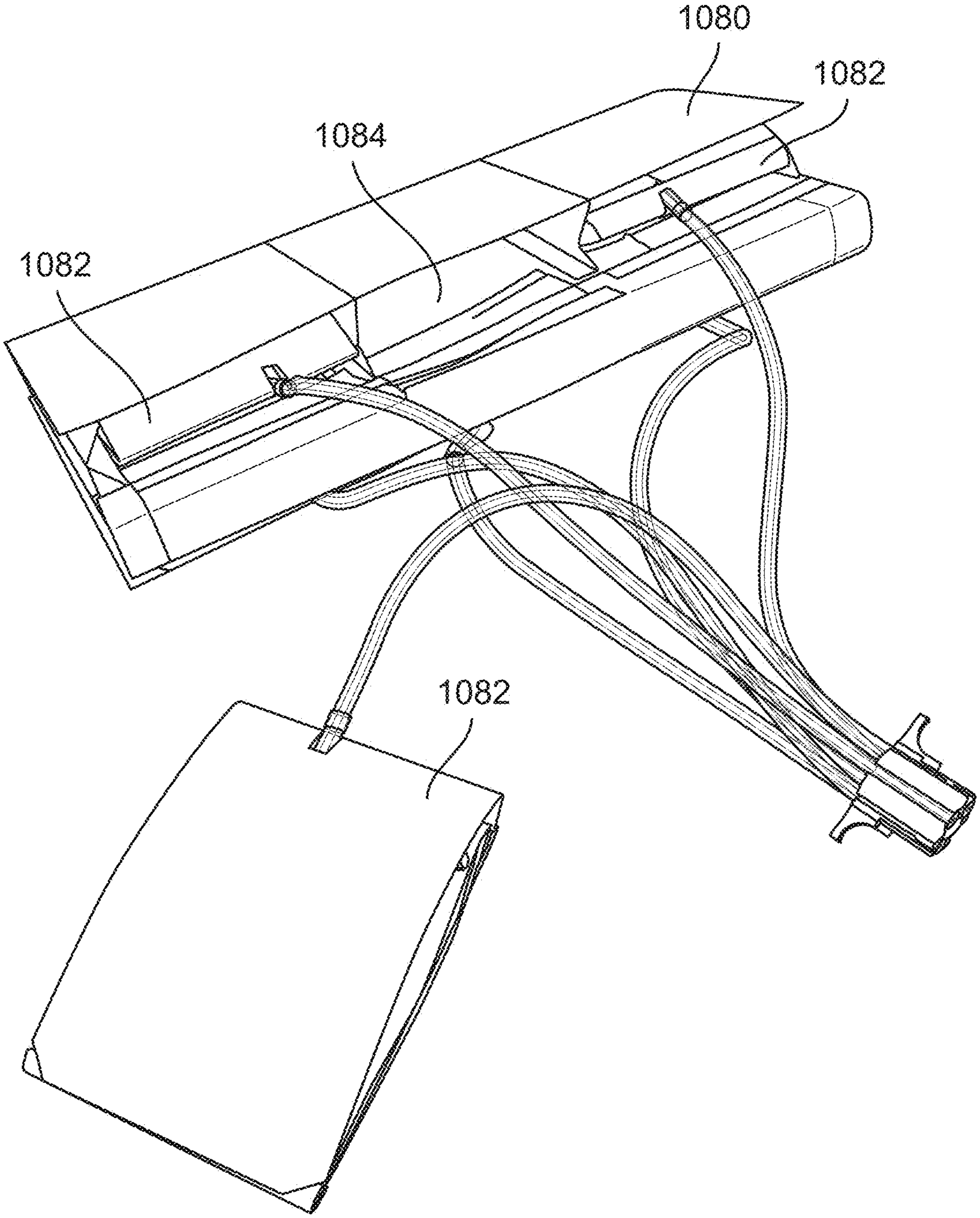
Figure 195:
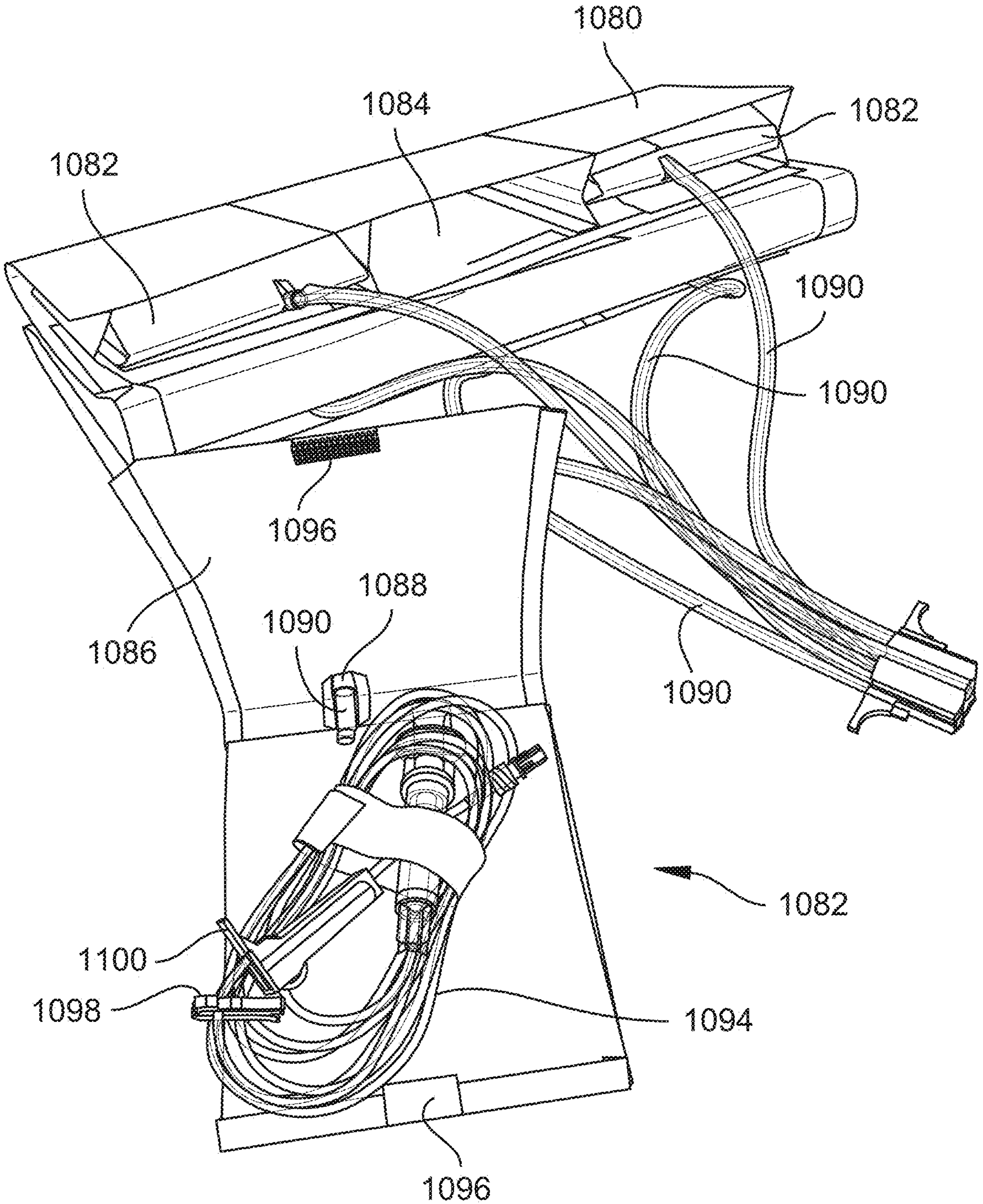
Figure 196:
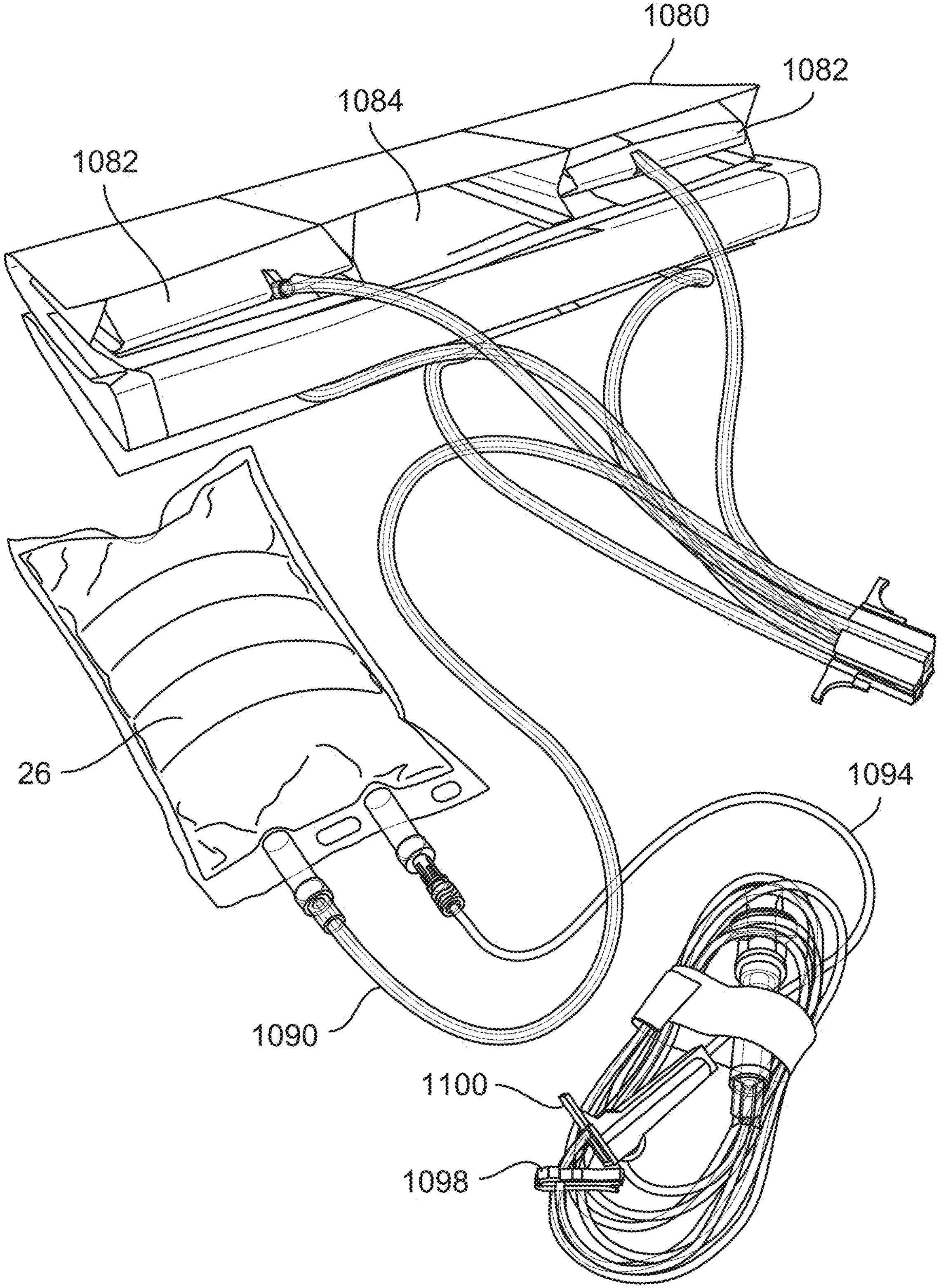
Figure 197:
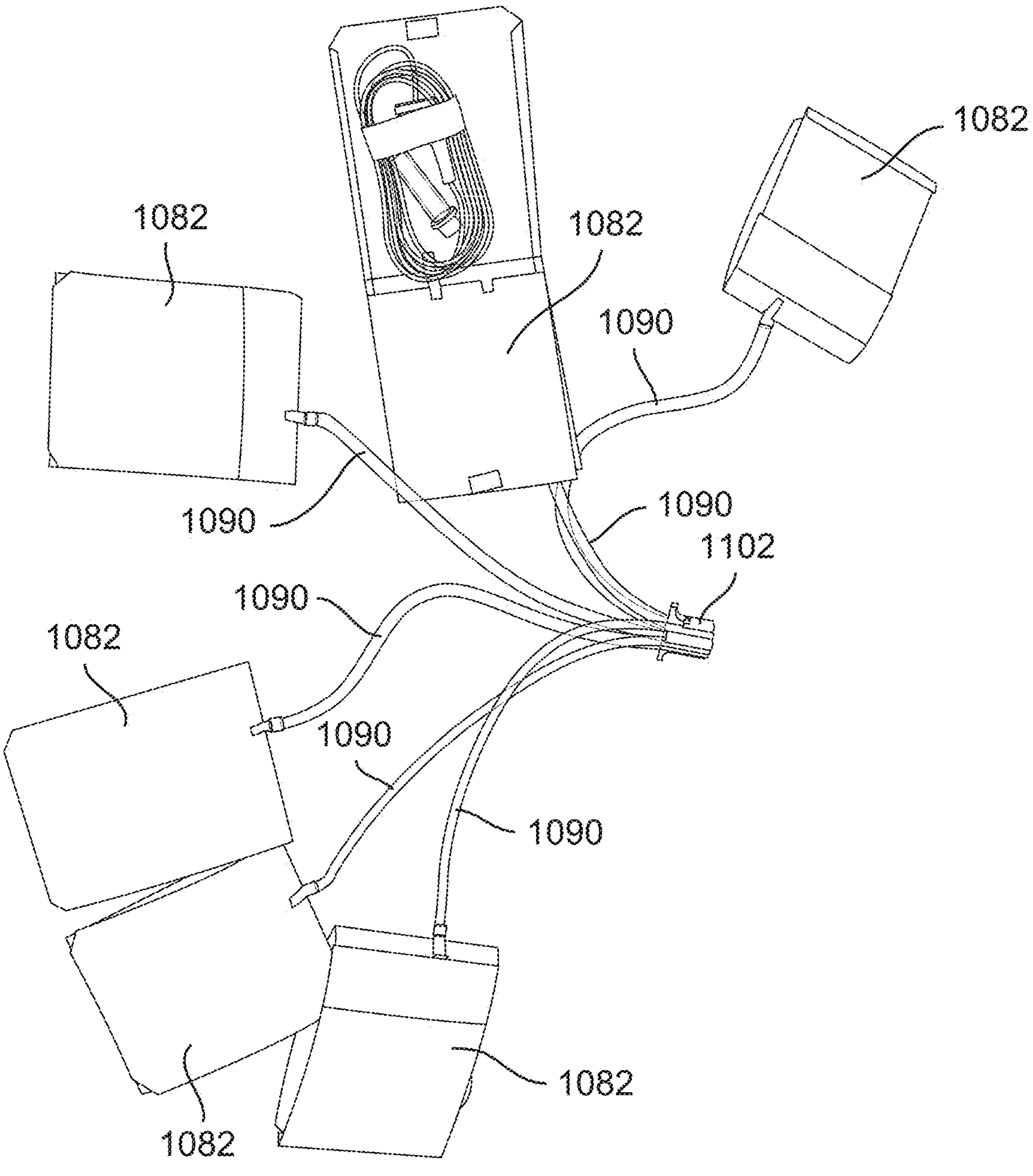
Figure 198:
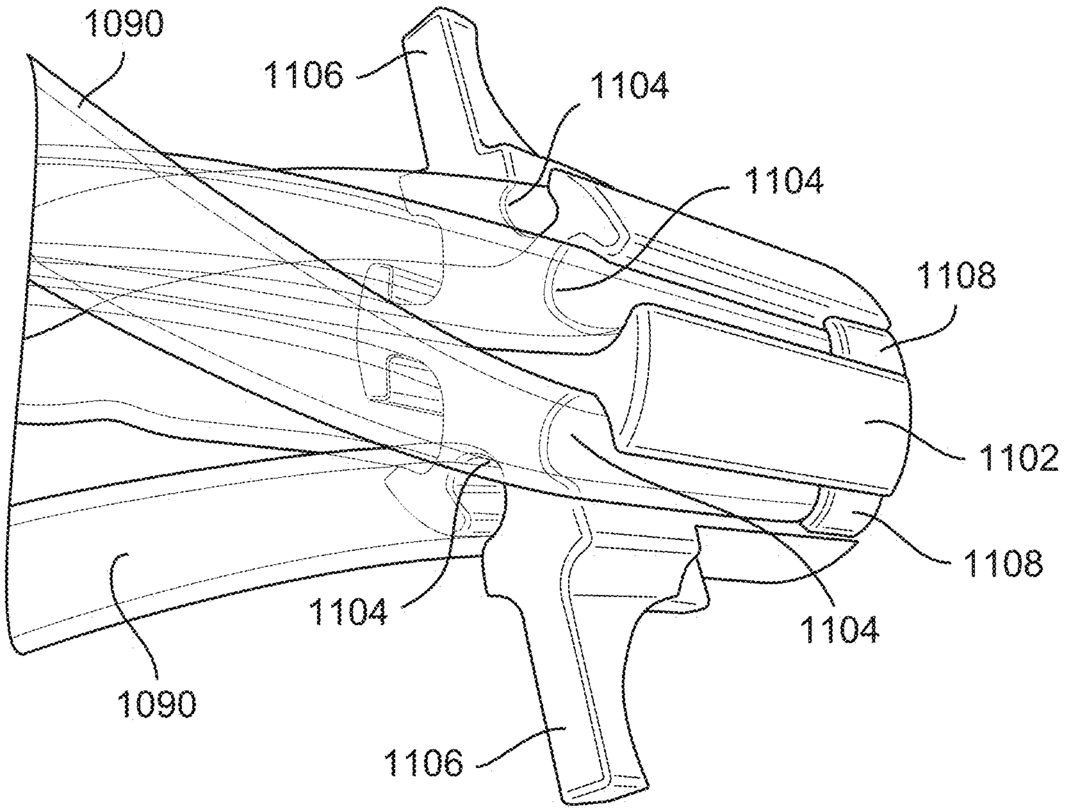
Figure 199A:
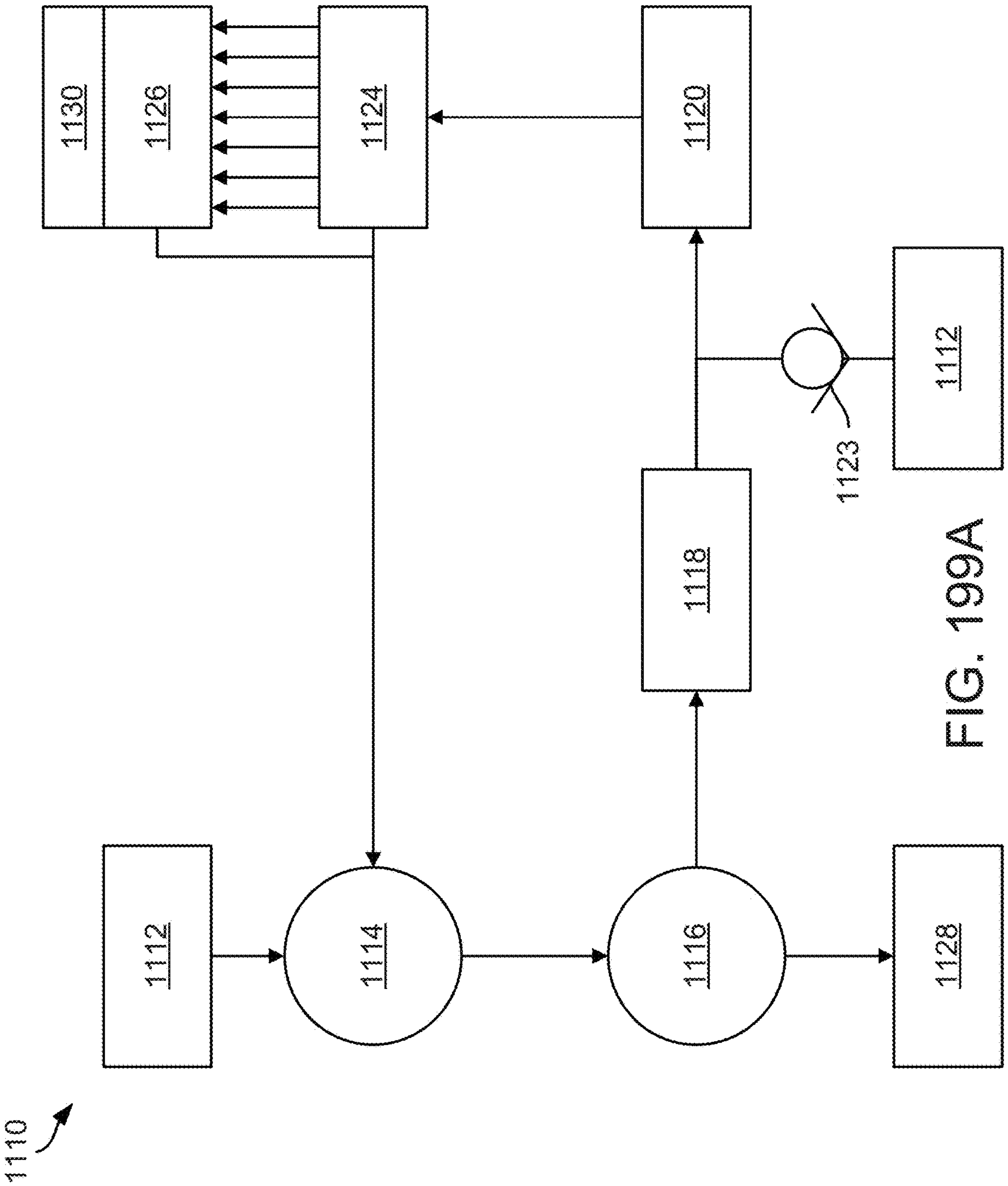
Figure 199B:
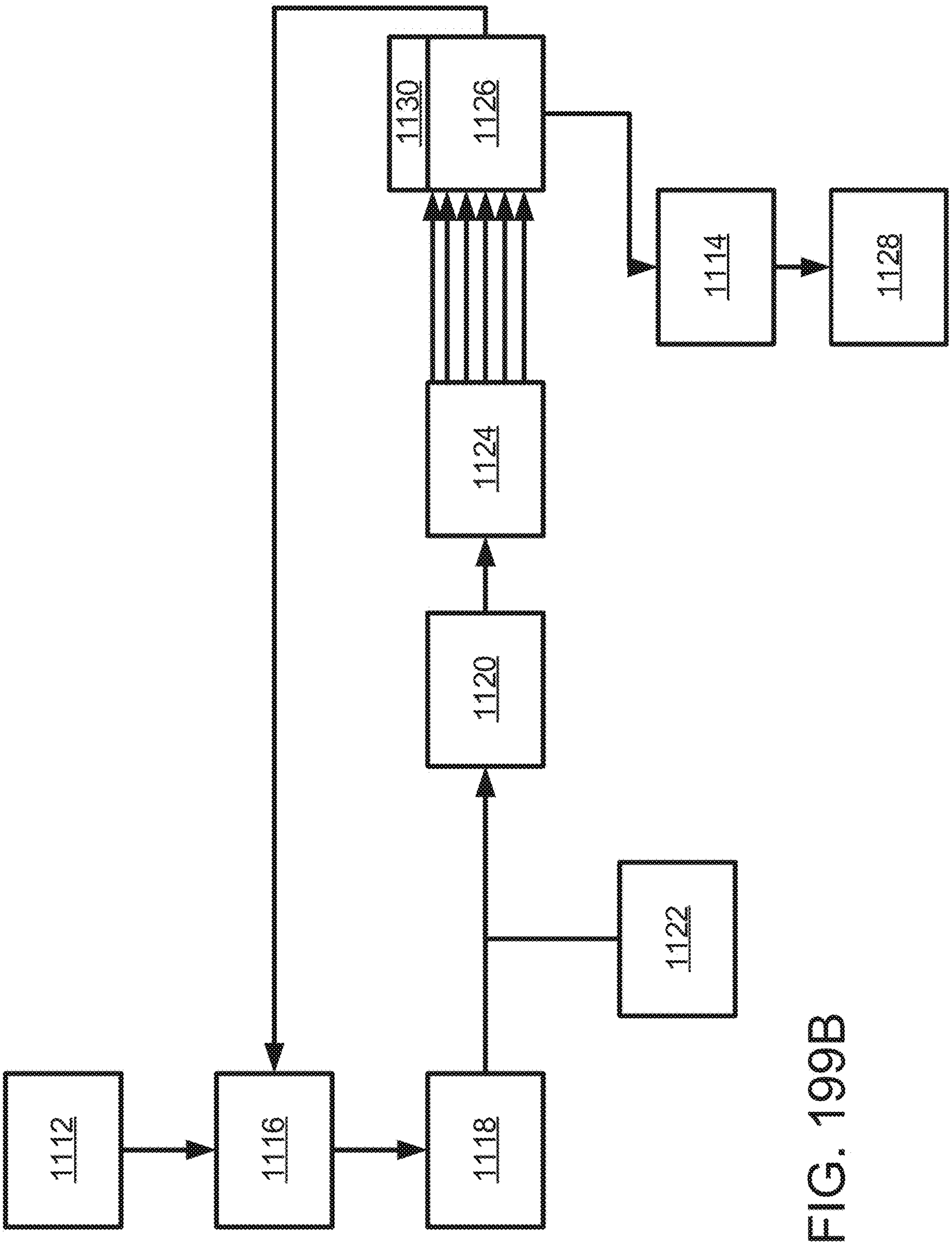

FIG. 140 depicts a view of another example clip;

FIG. 141 depicts a perspective view of an example bag feeder including a conveyer assembly;

FIG. 142 depicts a perspective view of another example bag feeder including a conveyer assembly;

FIG. 143 depicts a perspective view of another example clip;

FIGS. 144-146 depict views of another example clip;

FIGS. 147-148 depict view of another example clip;

FIG. 149 depicts a perspective view of another example bag feeder including a conveyer assembly;

FIG. 150 depicts a view of the bag feeder of FIG. 149 with a cover over the conveyer assembly removed;

FIG. 151 depicts a perspective view of an example port opening assembly with an actuated blade element;

FIG. 152 depicts a perspective view of the port opening assembly of FIG. 151 with the blade element displaced to a deployed position;

FIG. 153 depicts a perspective view of another example port opening assembly with an actuated blade;

FIG. 154 depicts a view of the port opening assembly of FIG. 153 where portions of the port cutting assembly have been hidden;

FIG. 155 depicts a perspective view of an example cutting cartridge;

FIG. 156 depicts an exploded view of the example cutting cartridge of FIG. 155;

FIG. 157 depicts a perspective view of an example cutting cartridge with a cover clip in place around the blade element of the cutting cartridge;

FIG. 158 depicts a cross-sectional view of the example cutting cartridge of FIG. 157;

FIG. 159 depicts a perspective view of the example cutting cartridge of FIG. 157 with the cover clip removed;

FIG. 160 depicts a perspective view of another example port opening assembly;

FIG. 161 depicts an exploded view of the example port opening assembly of FIG. 160;

FIG. 162 depicts a top down view of the example port opening assembly of FIG. 160;

FIG. 163 depicts a cross sectional view of the example port opening assembly of FIG. 162 taken at the indicated cut plane in FIG. 162;

FIG. 164 depicts an exemplary grasper which may be attached to a robotic arm approaching an example port opening assembly;

FIG. 165 depicts a perspective view of a port of a bag displaced into a cutting cartridge installed in an example port opening assembly;

FIG. 166 depicts a top down view of a port of a bag being cut at a port opening assembly;

FIG. 167 depicts a view of an example filling station which may be included in a system for producing and packaging fluids;

FIG. 168 depicts an empty bag about to be grasped between jaws of an example filling station;

FIG. 169 depicts a filled bag grasped between jaws of an example filling station;

FIG. 170 depicts an example fill nozzle;

FIG. 171 depicts an example nozzle dock with a portion of the nozzle dock cut away;

FIGS. 172A-C depict an example nozzle being installed into and retained within an example nozzle dock;

FIG. 173 depicts another example nozzle dock with an example filling nozzle retained therein;

FIG. 174 depicts a cross-sectional view of the example filling nozzle shown in FIG. 173;

FIG. 175 depicts a perspective view of an example labeling station which may be included within a system for producing and packaging fluids;

FIG. 176 depicts a top down view of the example labeling station of FIG. 175 in which a bag is in the process of being labeled;

FIG. 177 depicts a perspective view of another example system for producing and packaging medical fluids;

FIG. 178 depicts another perspective view of the system for producing and packaging medical fluids of FIG. 177 with portions of the enclosure of the system depicted as transparent;

FIG. 179 depicts a front view of an example packaging assembly;

FIGS. 180A-B depicts top down view of an example bag retainer;

FIG. 181 depicts a front view of an example packaging assembly with a grasper grasping a bag which is docked at an example bag retainer of the packing assembly;

FIG. 182 depicts a front view of an example packaging assembly with a grasper holding a bag which has been freed from the example bag retainer of the packaging assembly;

FIG. 183 depicts a front view of an example packaging assembly with an example robotic manipulator which as advanced a bag held by a grasper of the robotic manipulator into alignment with an example fill nozzle of the packaging assembly;

FIG. 184A depicts a front view of an example packaging assembly with an example fill nozzle of the packing assembly in a port of a bag;

FIG. 184B depicts an exploded view of an example filling nozzle and biasing assembly;

FIG. 185 depicts a front view of an example packaging assembly with a filled bag held by an example grasper of an example robotic manipulator of the packaging assembly;

FIG. 186 depicts a front view of an example packaging assembly with a filled bag displaced to an example sealing station of the packaging assembly;

FIG. 187 depicts a front view of an example packaging assembly with a filled bag displaced to an example sealing station of the packaging assembly;

FIG. 188 depicts a front view of an example packaging assembly with a filled bag displaced so as to insert a port of the bag into an example support cradle of an example sealing station of the packaging assembly;

FIG. 189 depicts a perspective view of an example support cradle;

FIG. 190 depicts a front view of an example packaging assembly with an example ram of the example sealing station actuated to drive a stopper into a port of a bag disposed within an example support cradle of the packaging assembly;

FIG. 191 depicts a front view of an example packaging assembly with a filled and sealed bag held by an example grasper of an example robotic manipulator of the packaging assembly;

FIG. 192 depicts a front view of an example packaging assembly with a directing chute;

FIG. 193 depicts a perspective view of an example carrier which may contain packets each holding at least one bag and administration set;

FIG. 194 depicts a perspective view of an example carrier having an example packet removed from a compartment of the carrier;

FIG. 195 depicts a perspective view of an example carrier having an example packet removed from a compartment of the carrier, the packet having a cover flap opened;

FIG. 196 depicts a perspective view of an example carrier with an example bag and example administration set removed from a packet;

FIG. 197 depicts a perspective view of a plurality of example packets which may be placed within compartments of a carrier;

FIG. 198 depicts a perspective view of a spiking adapter which may be included with a carrier;

FIG. 199A depicts a block diagram of an example filling station;

FIG. 199B depicts a block diagram of another example filling station

Figure 200:
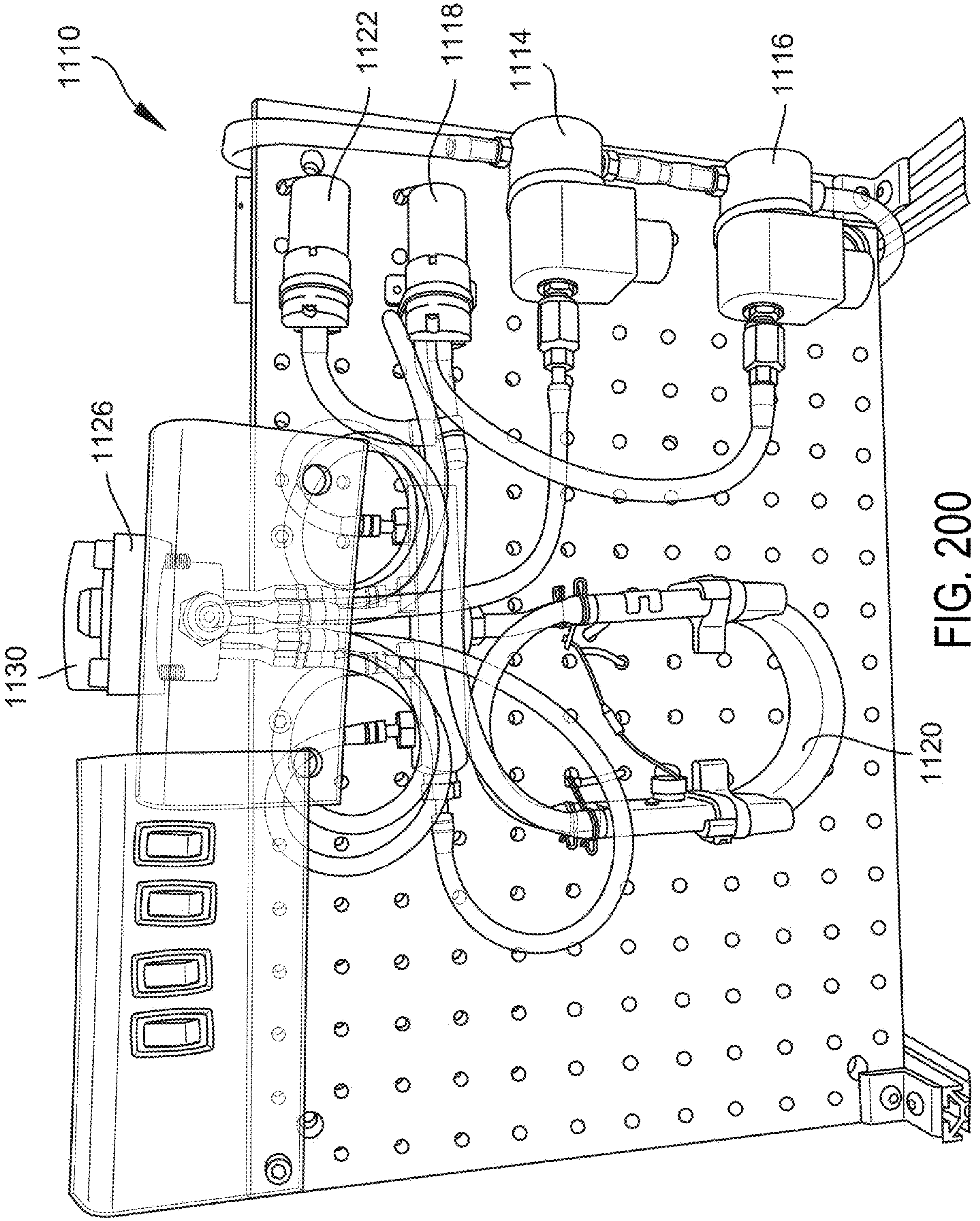
Figure 201:
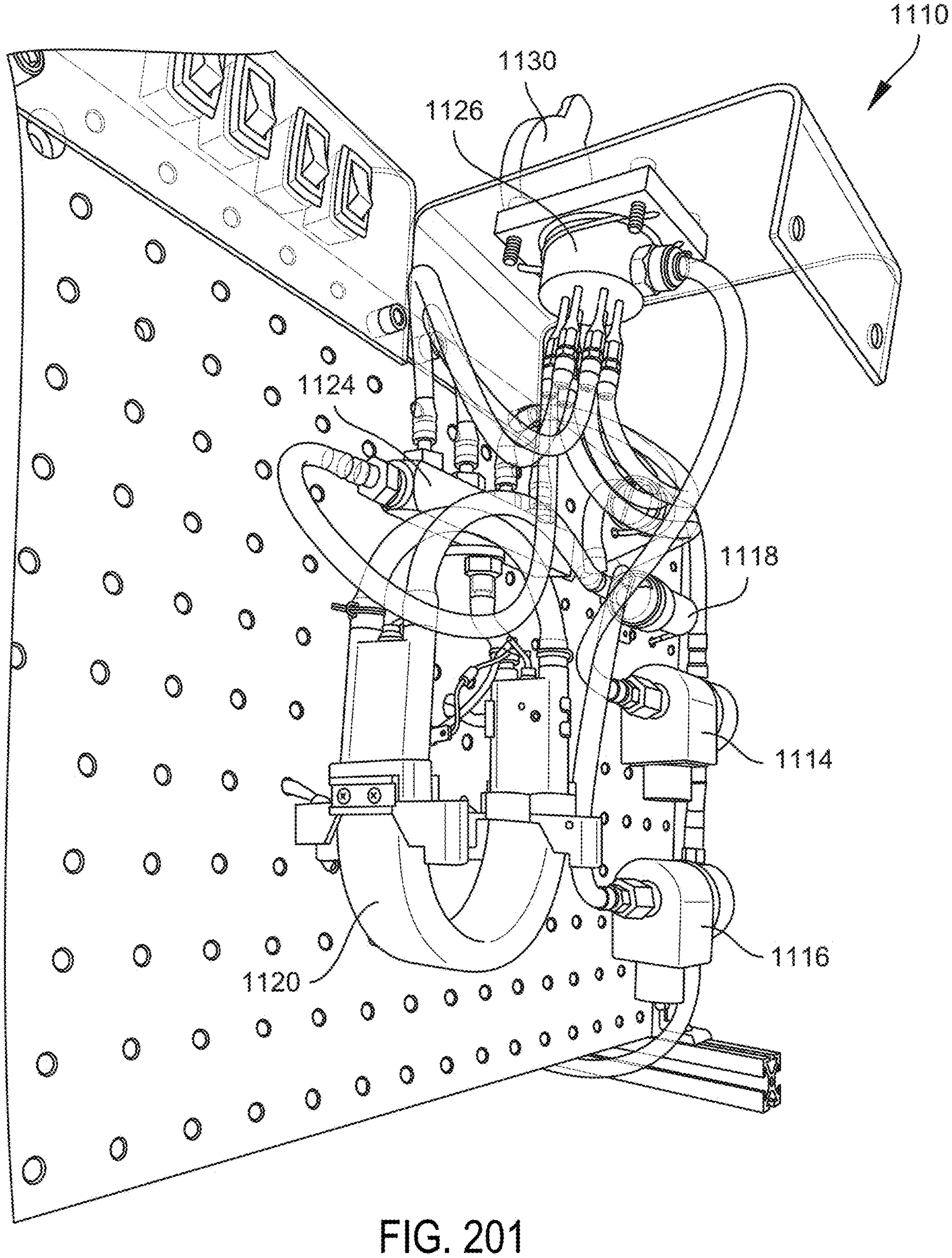
Figure 202:
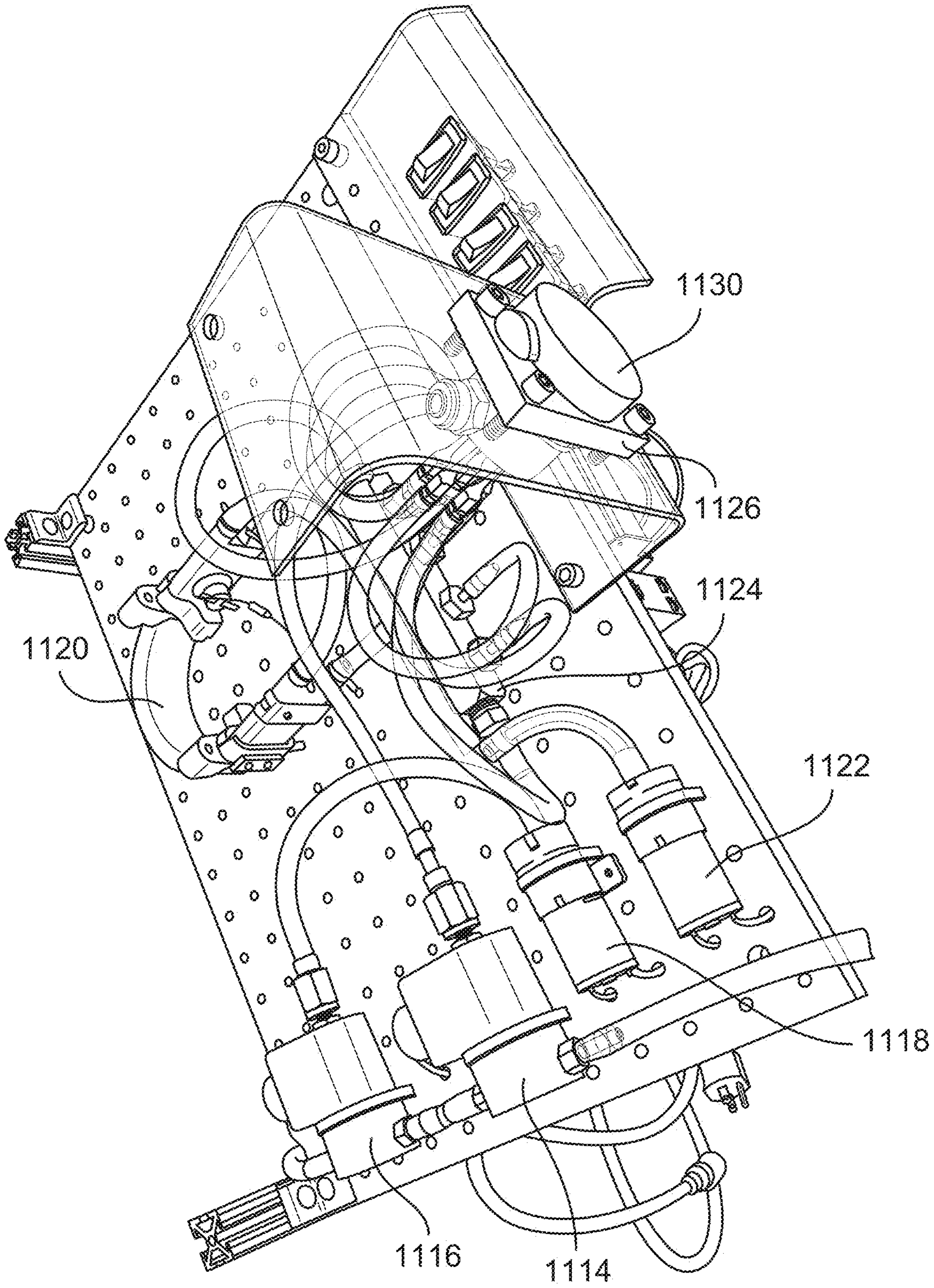
Figure 203:
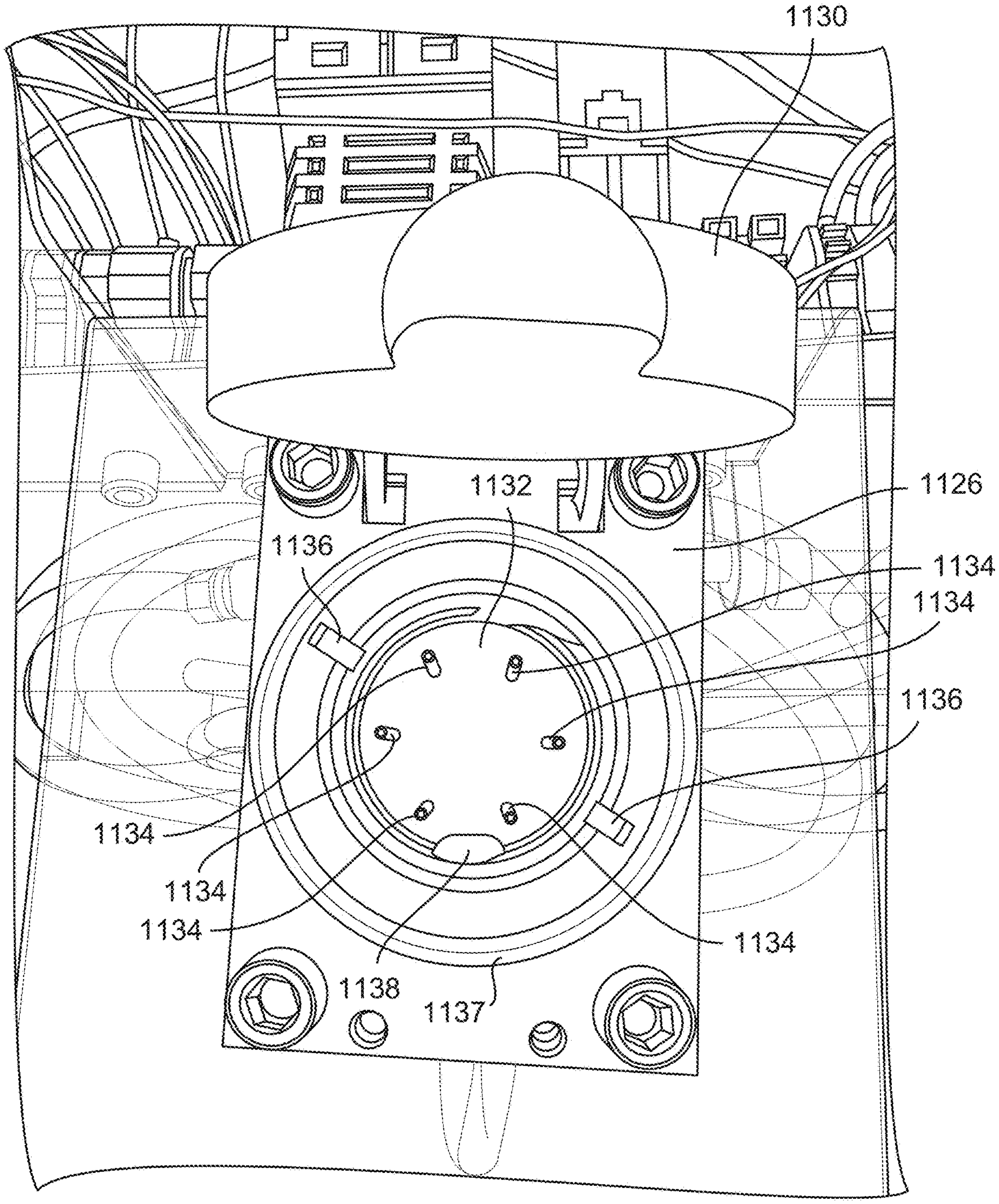
Figure 204:
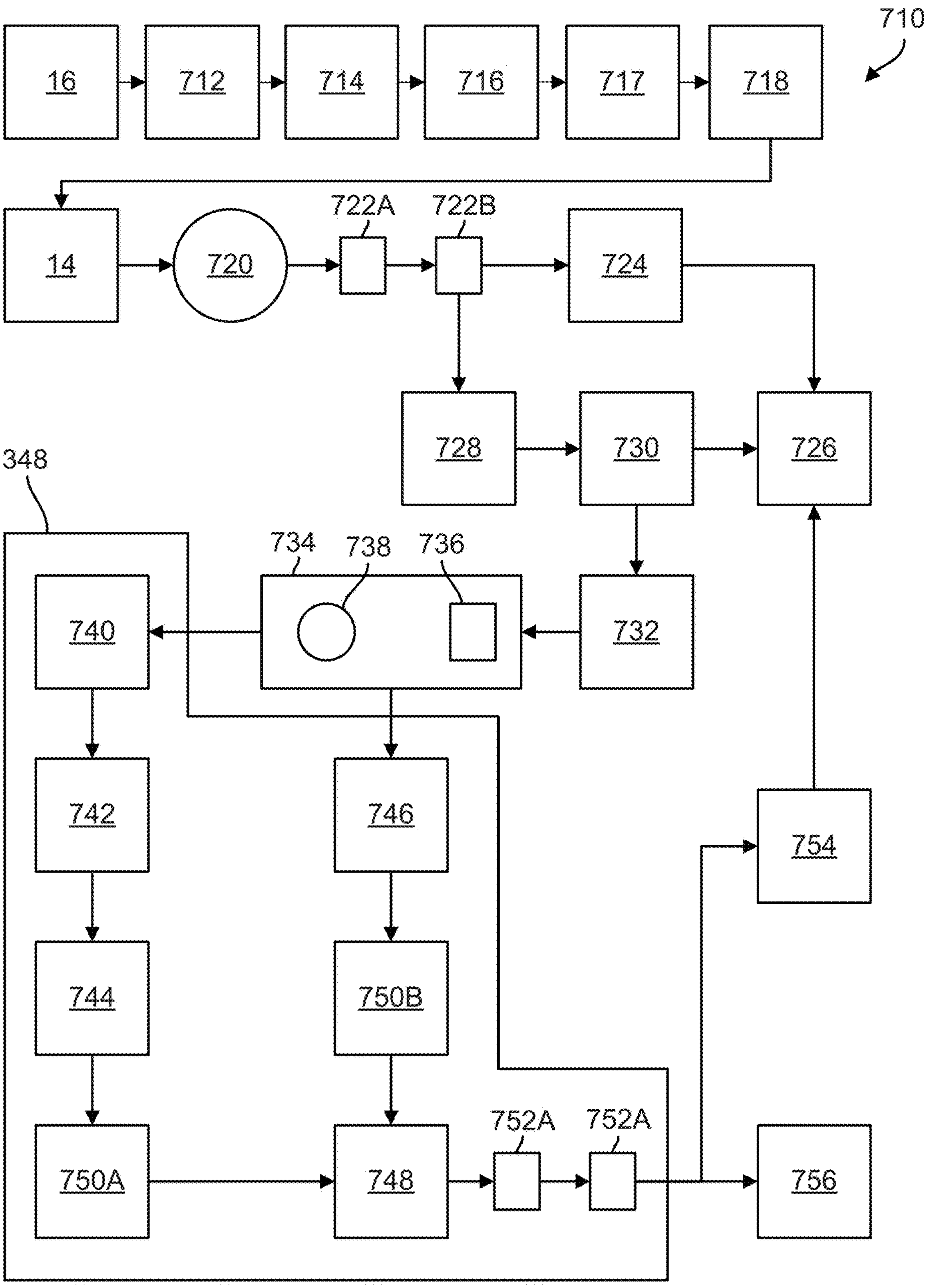
Figure 205:
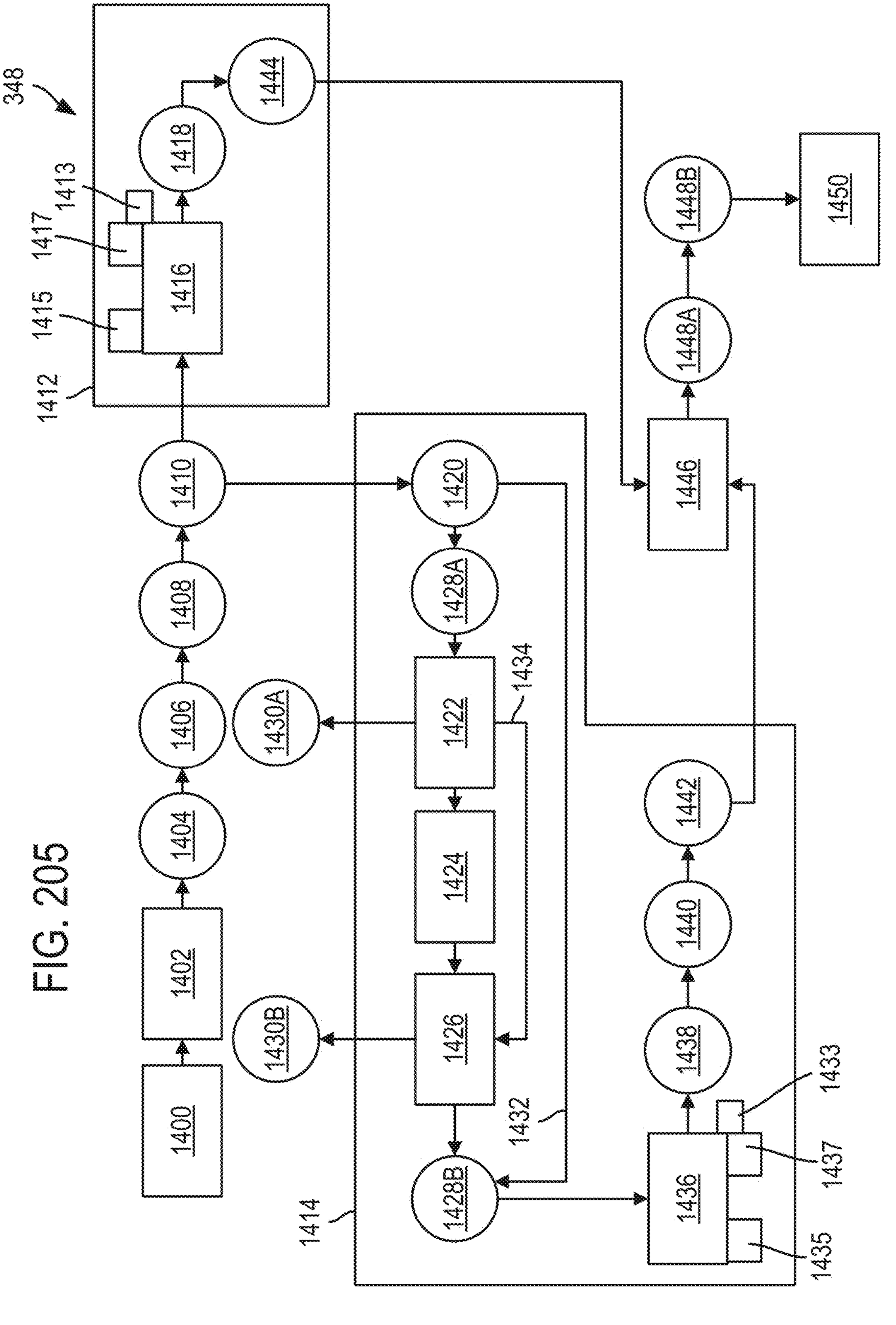
Figure 206:
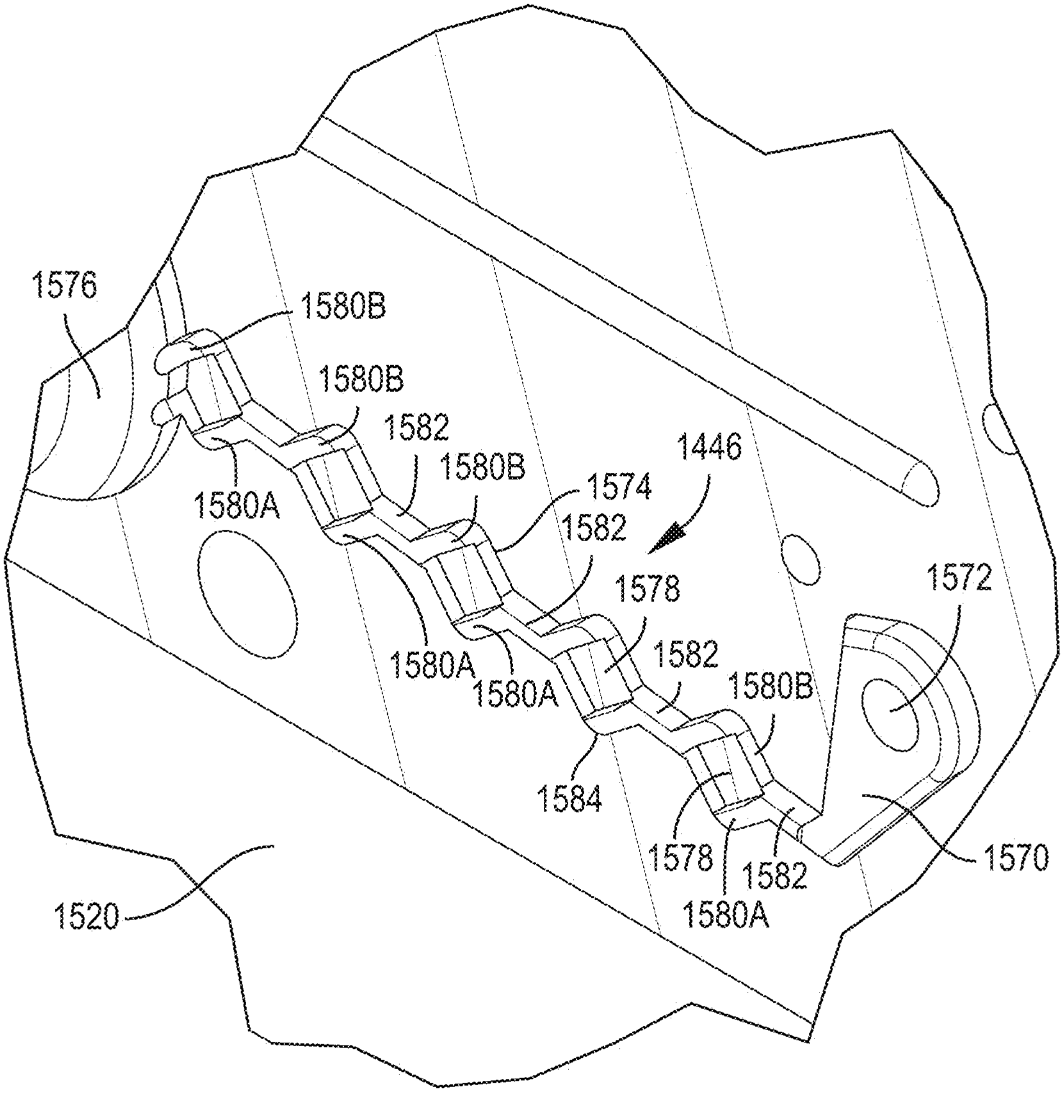
Figure 207:
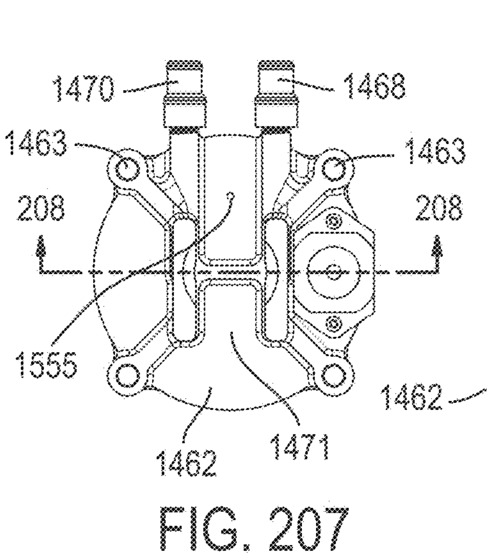
Figure 208:
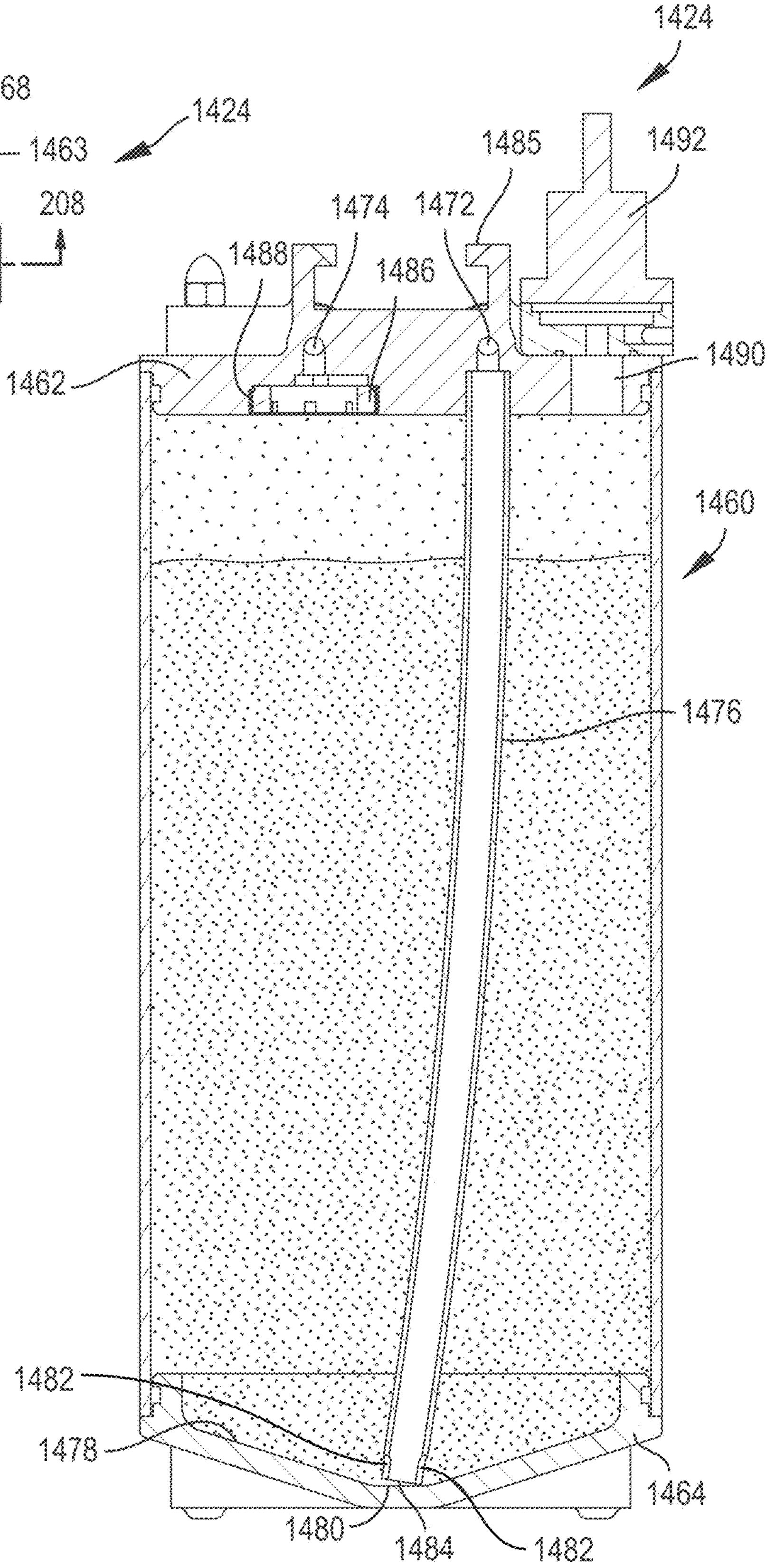
Figure 209:
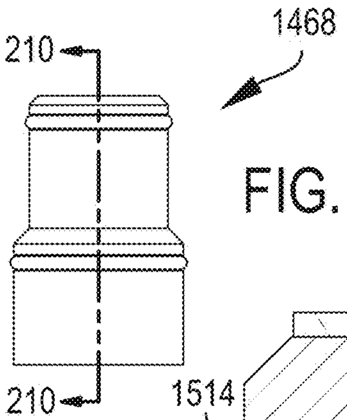
Figure 210:
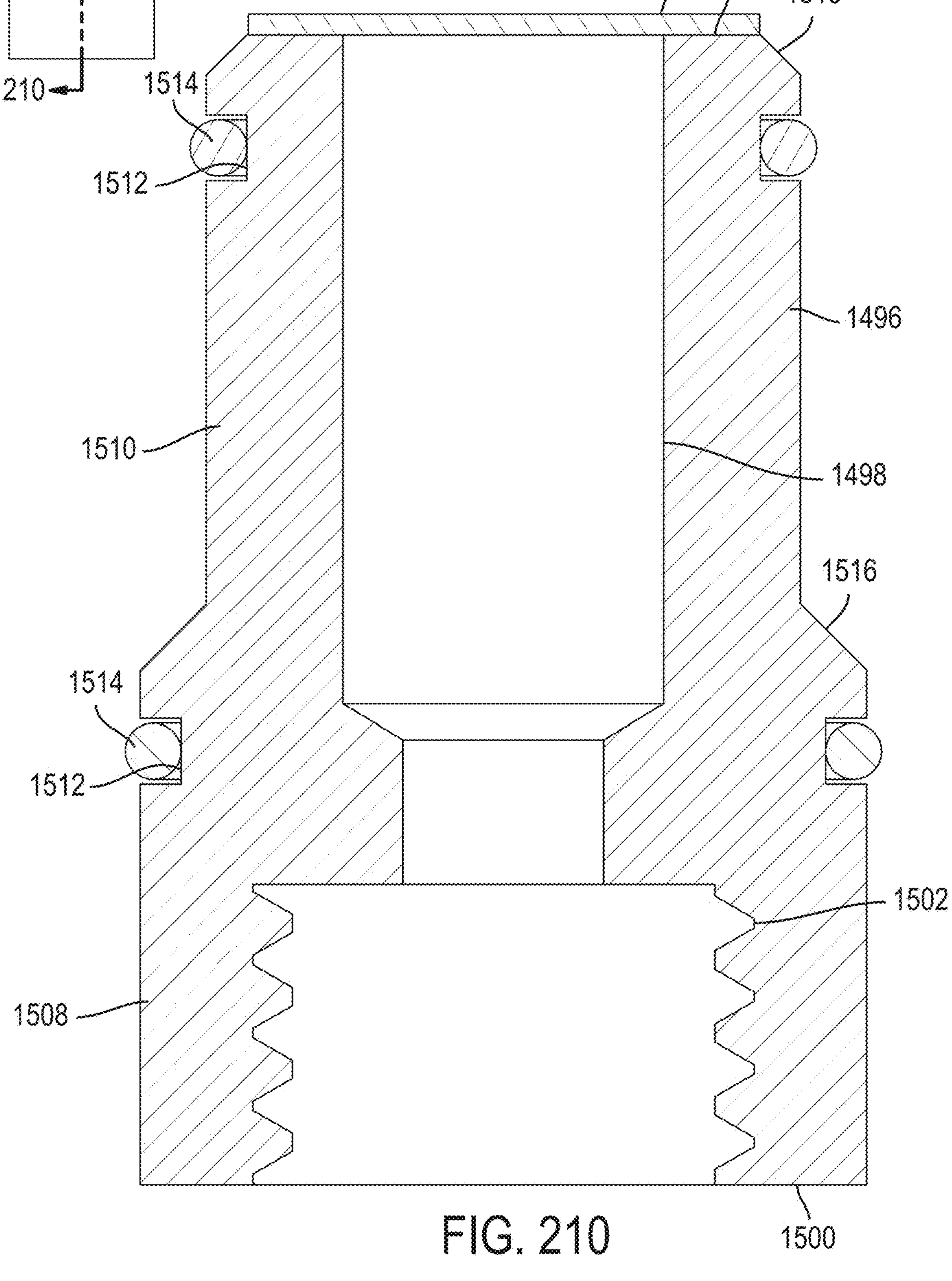
Figure 211:
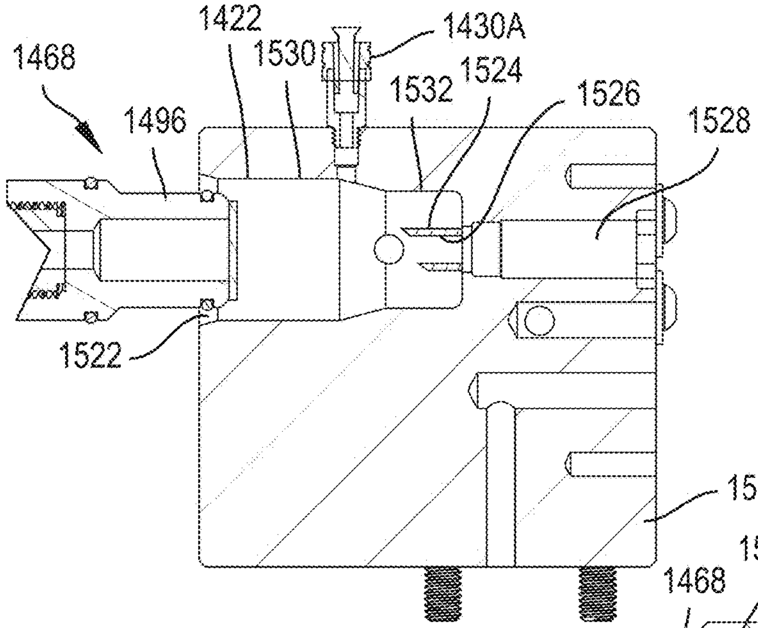
Figure 212:
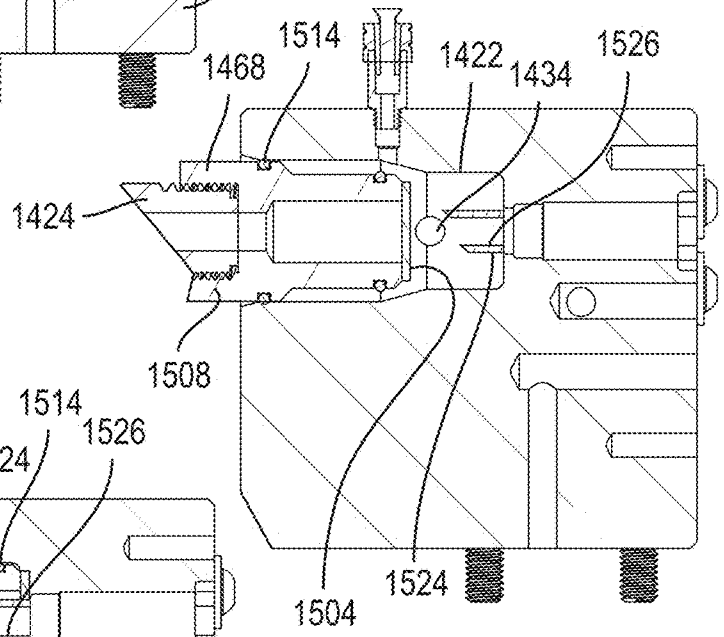
Figure 213:
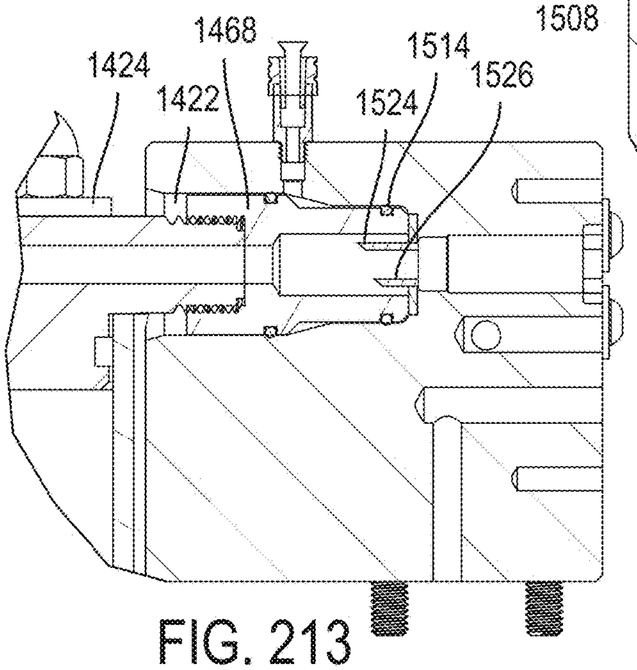
Figure 214:
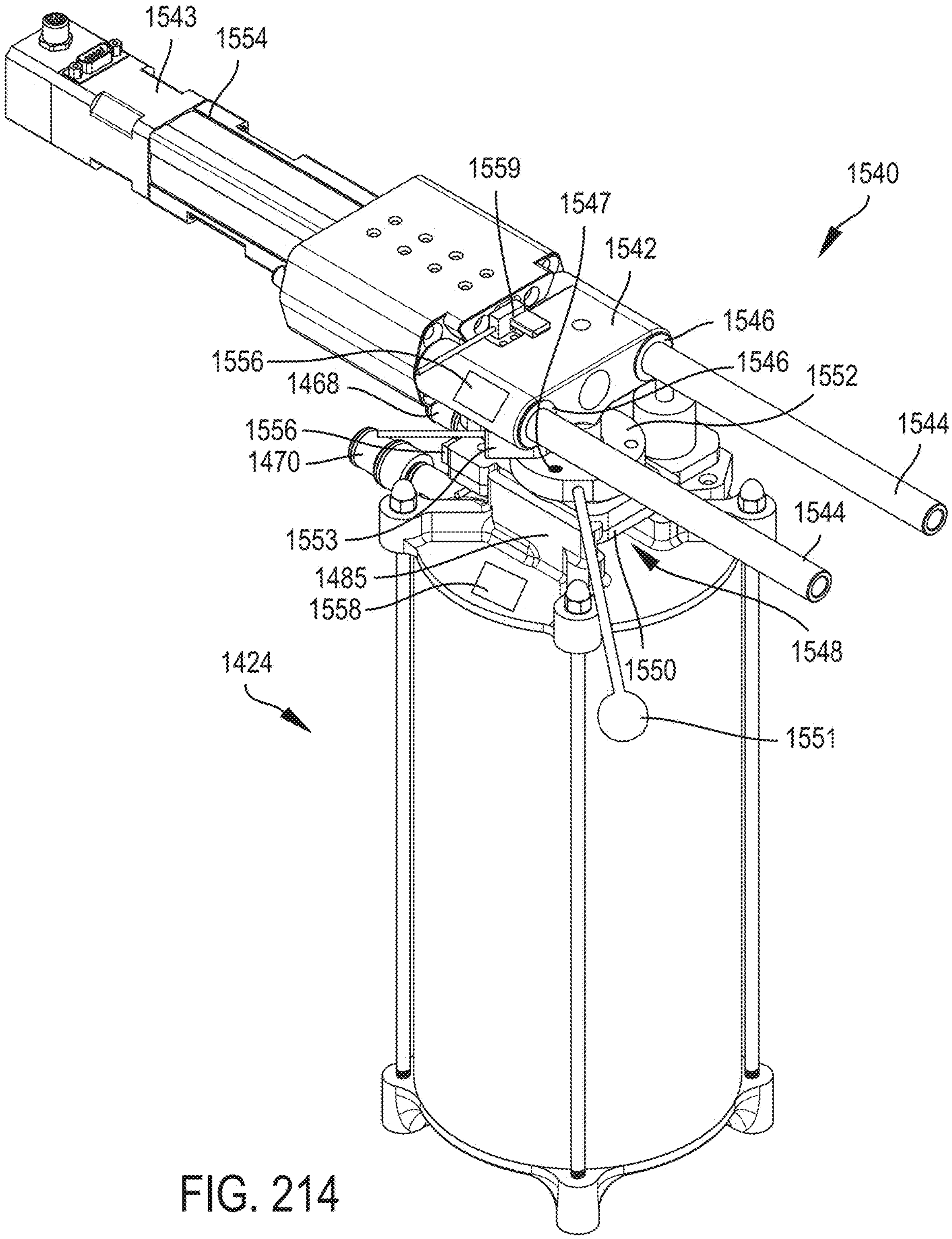
Figure 215:
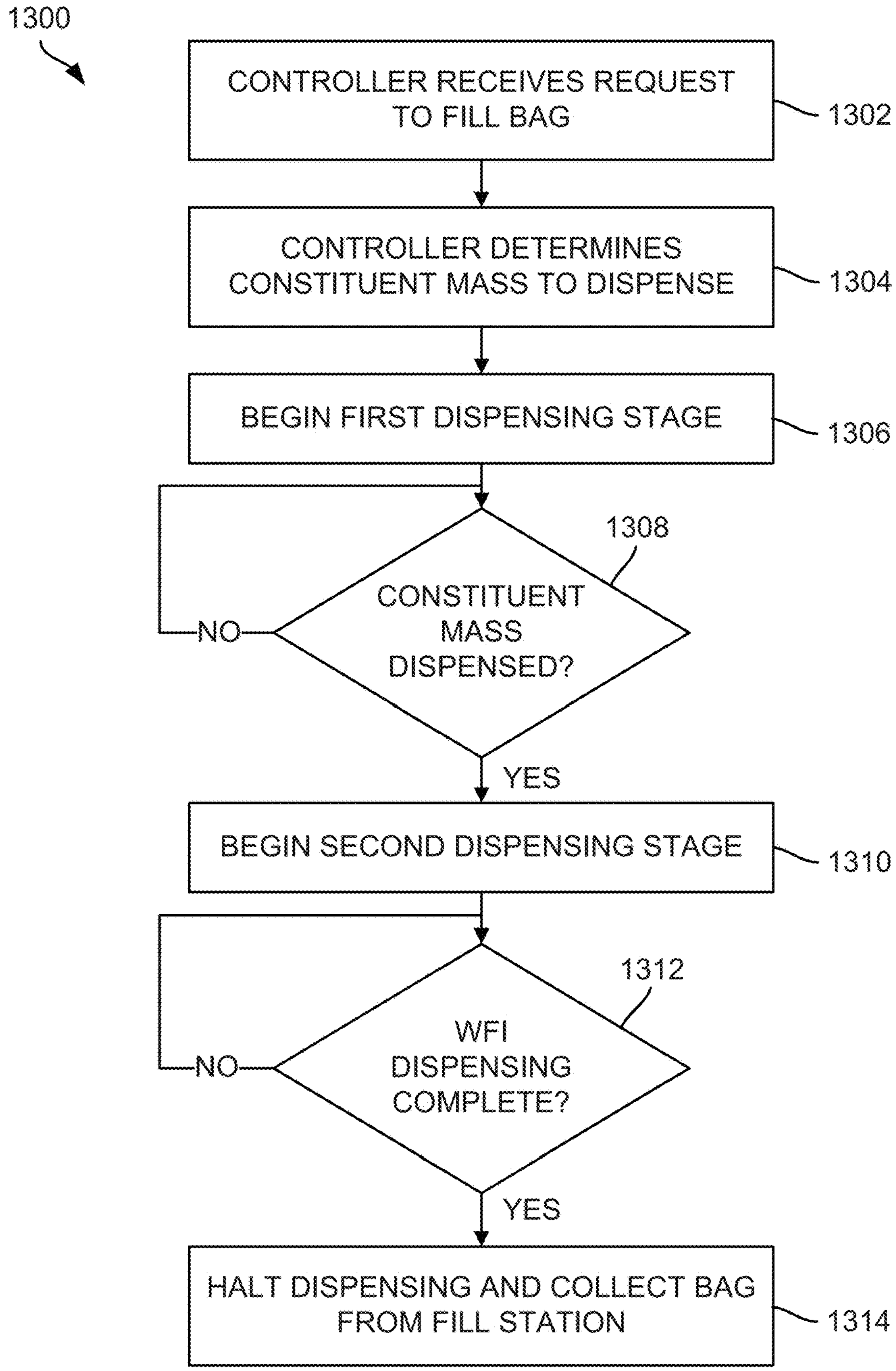
Figure 216:
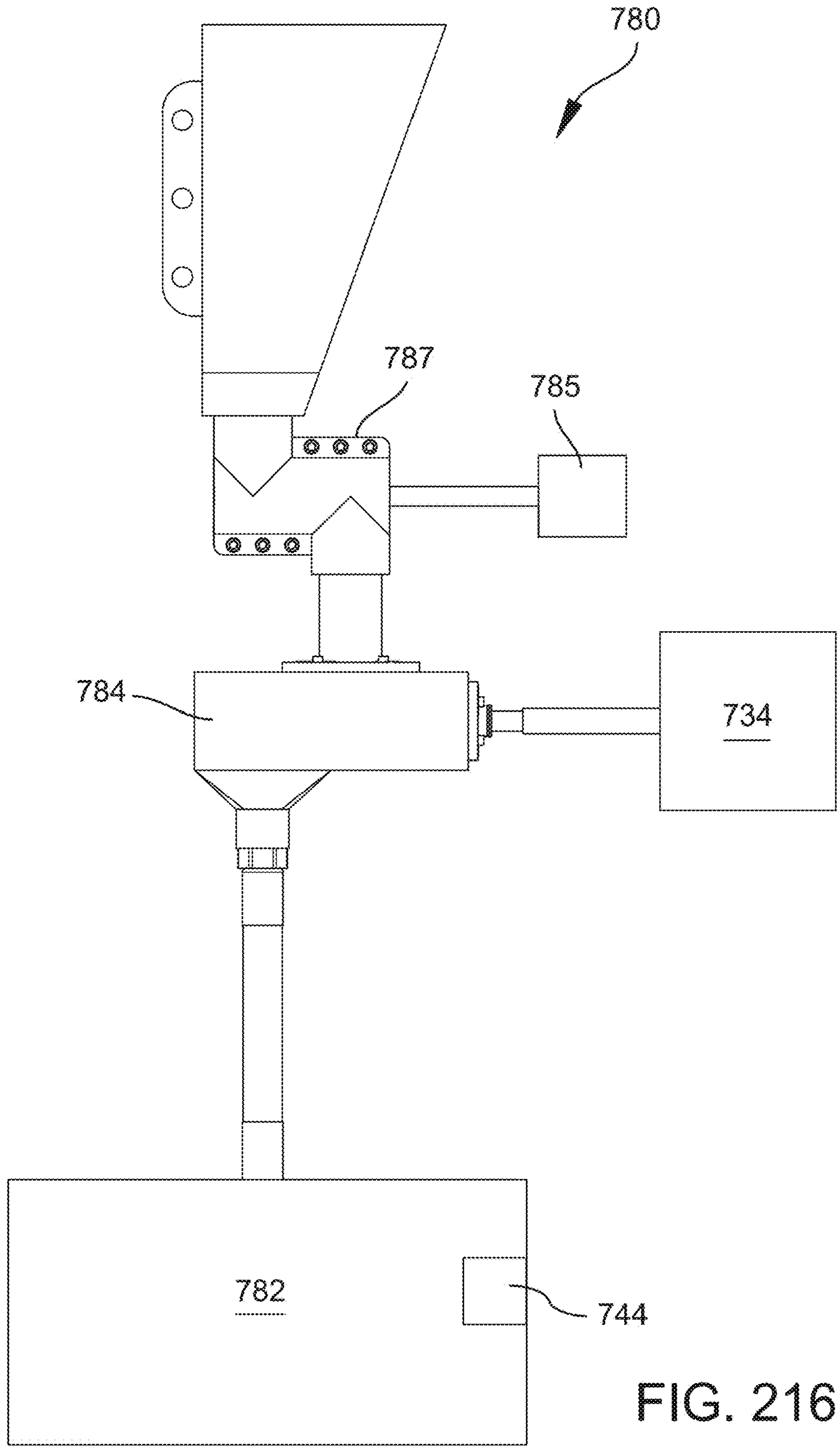
Figure 217:
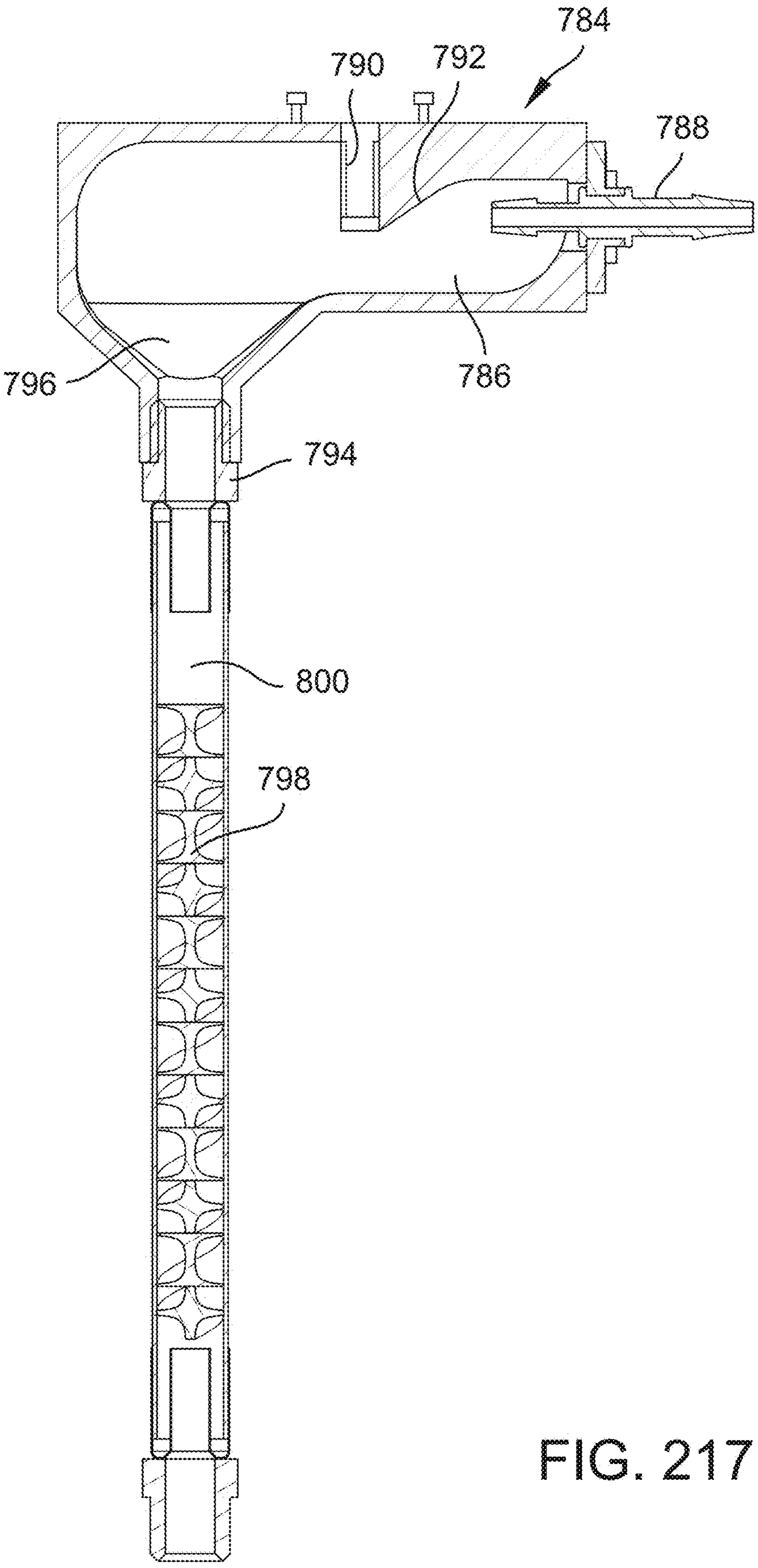
Figure 218:
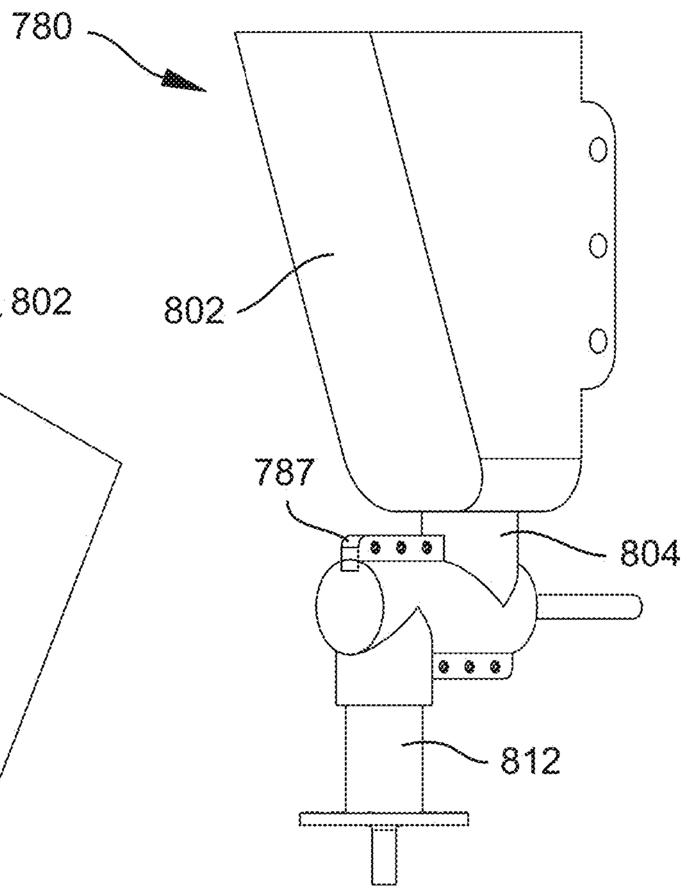
Figure 219:
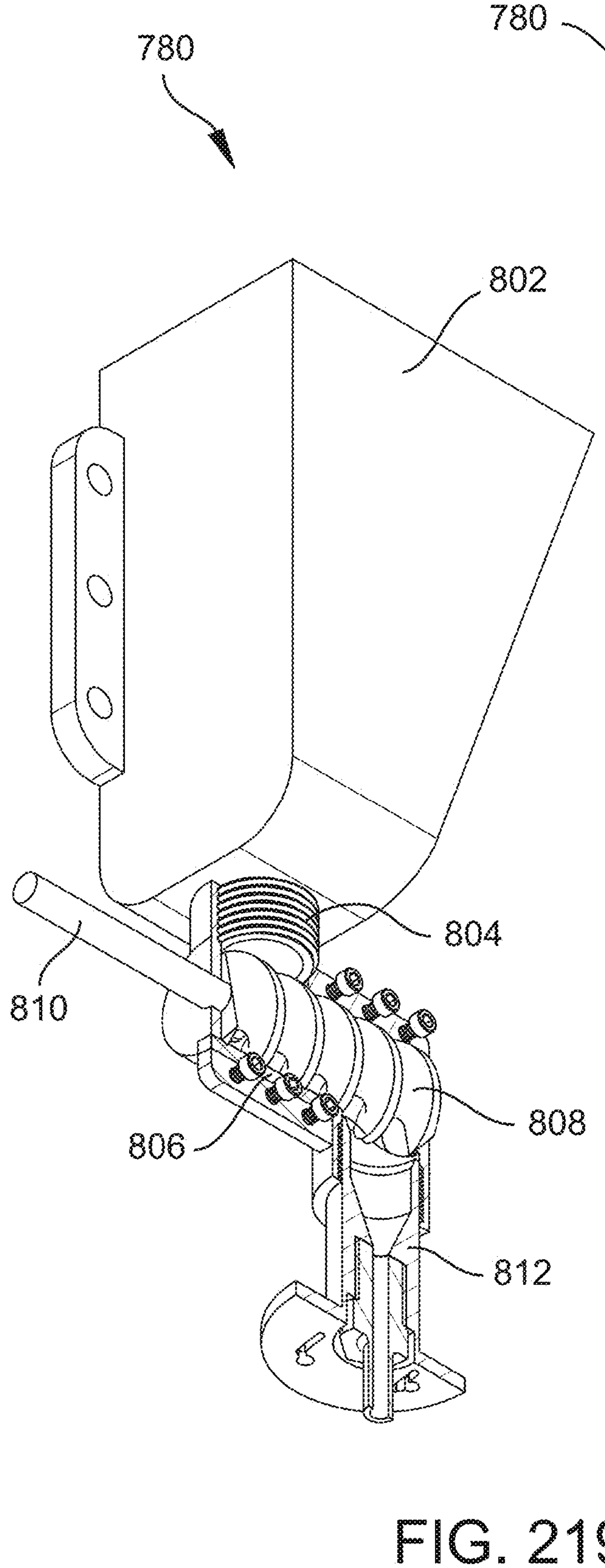
Figure 220:
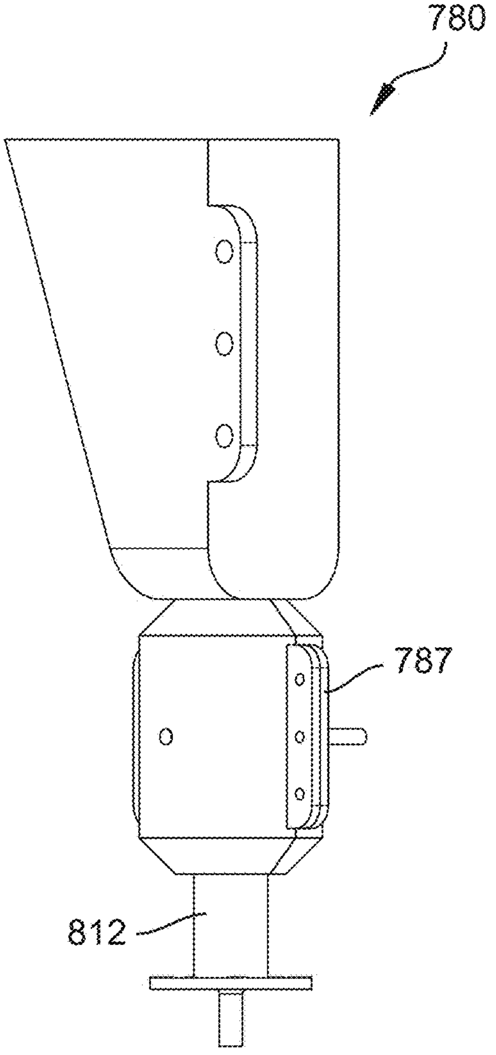
Figure 221:
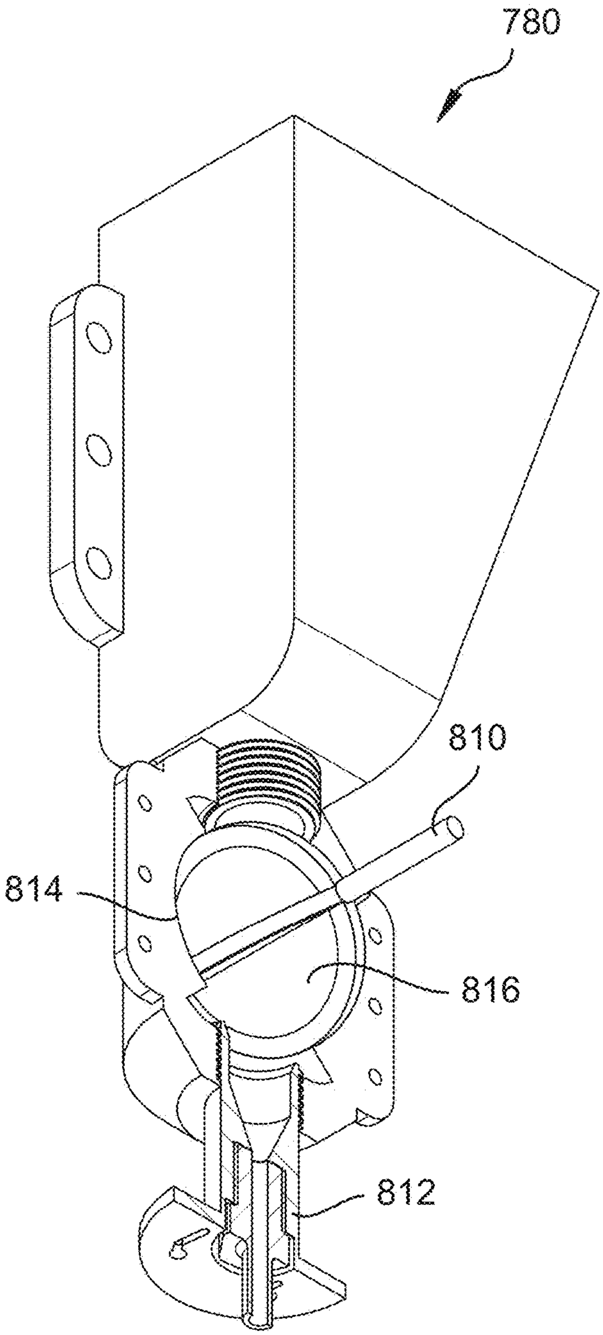
Figure 222:
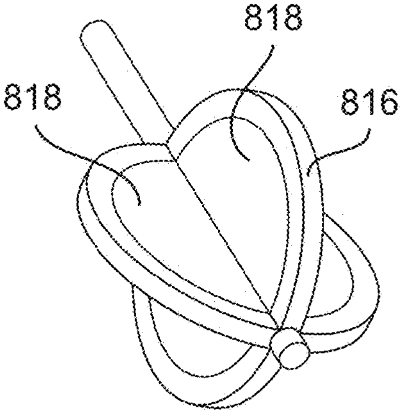
Figure 223:
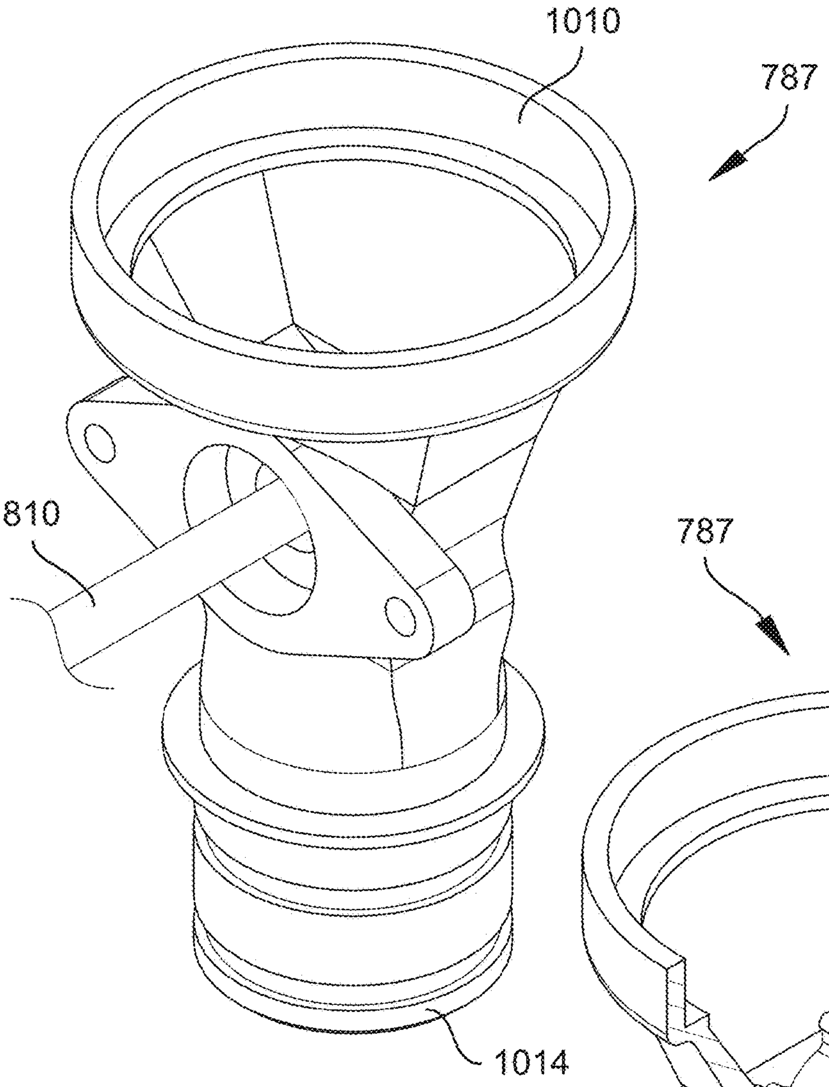
Figure 224:
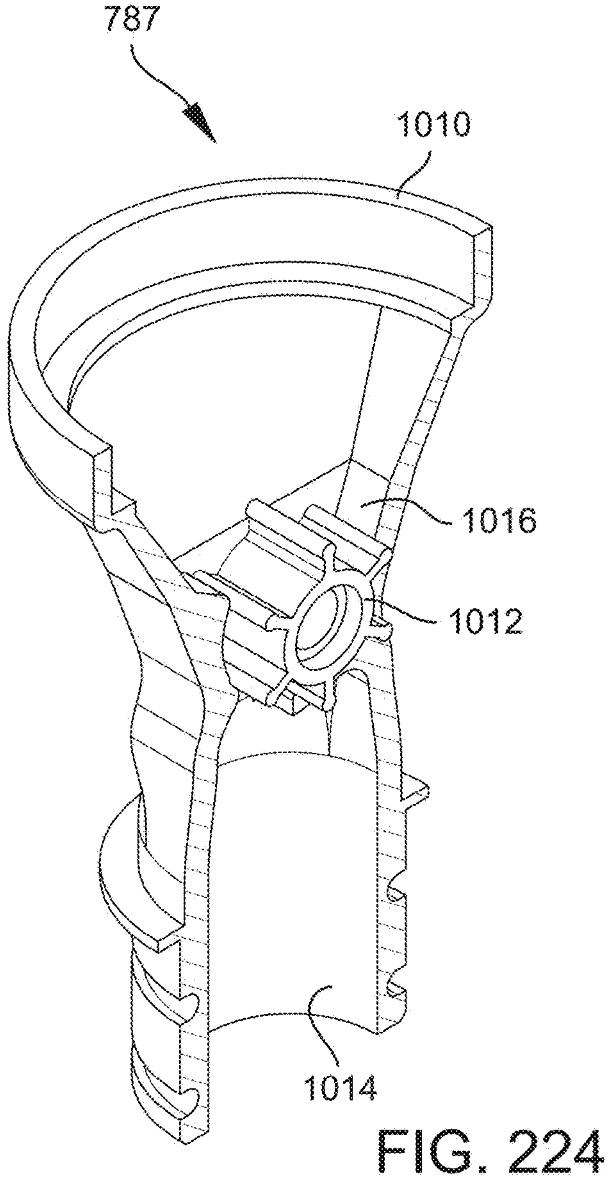
Figure 225:
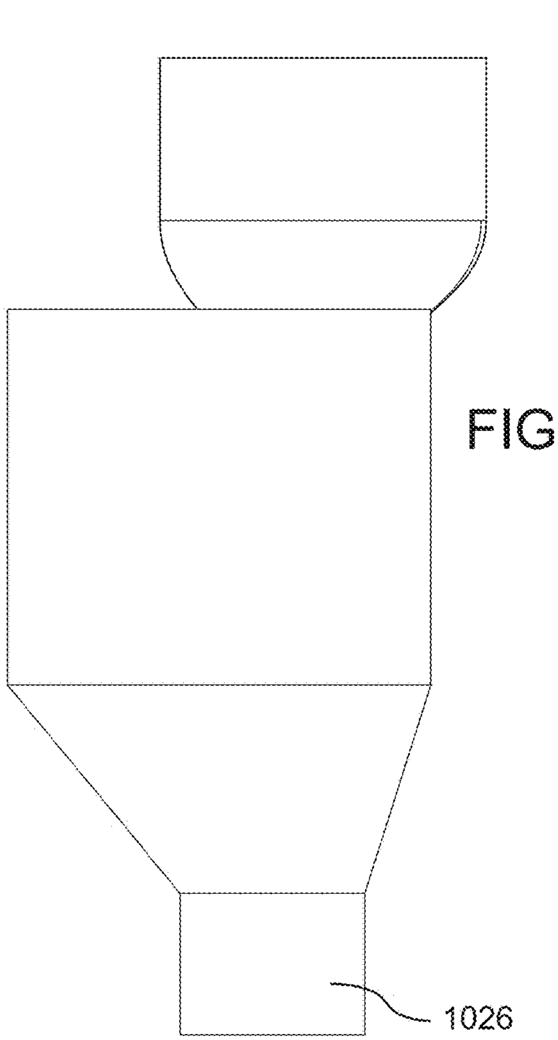
Figure 226:
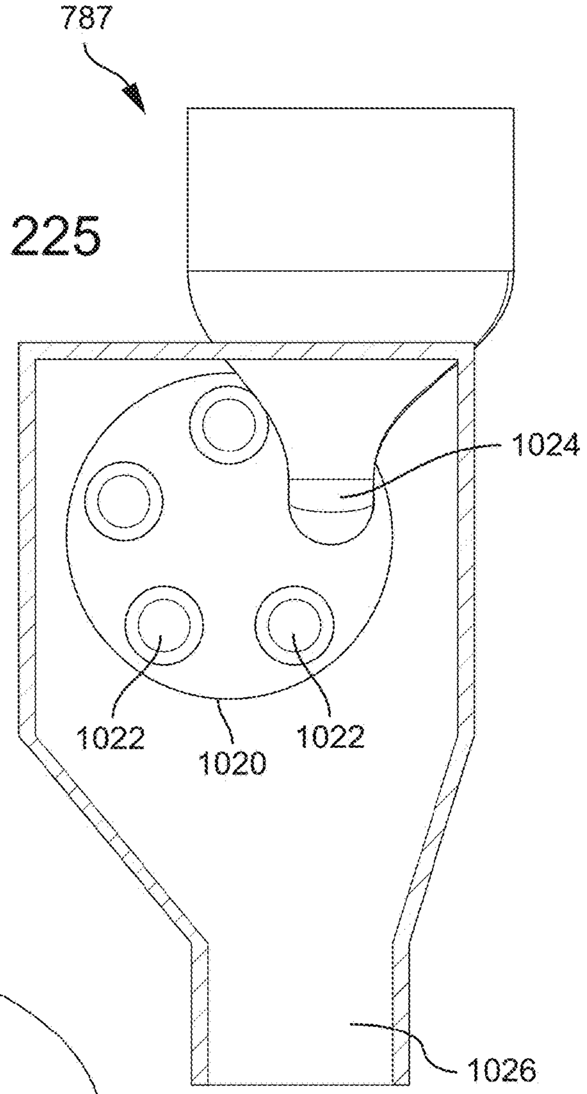
Figure 227:
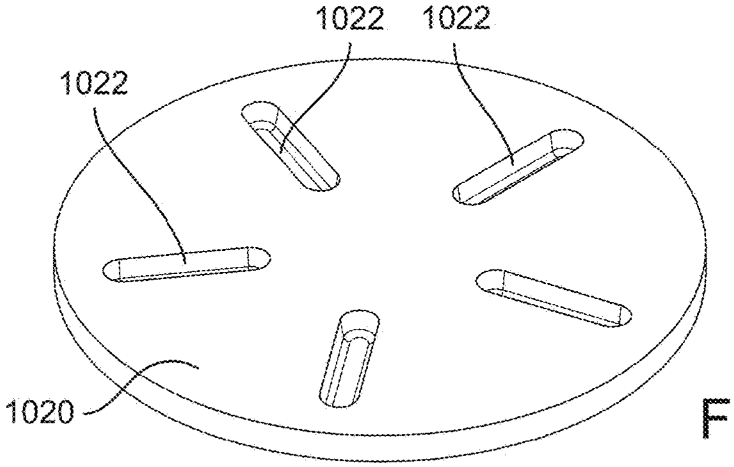
Figure 228A:
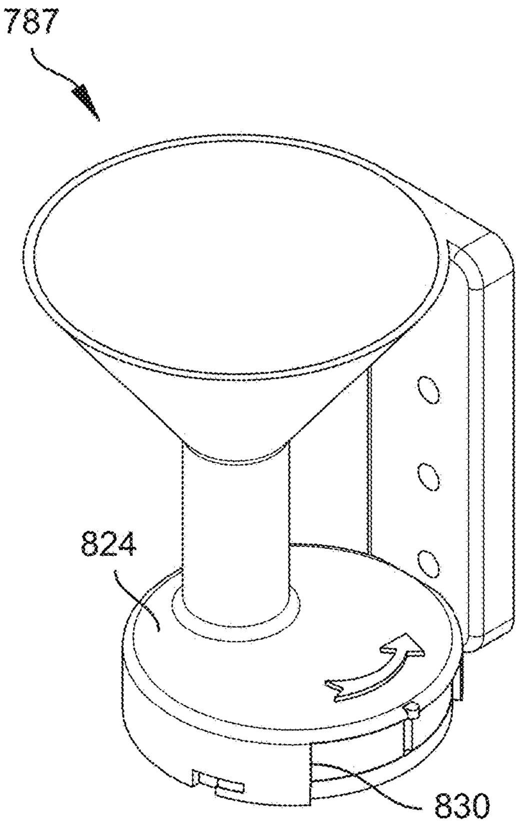
Figure 228B:
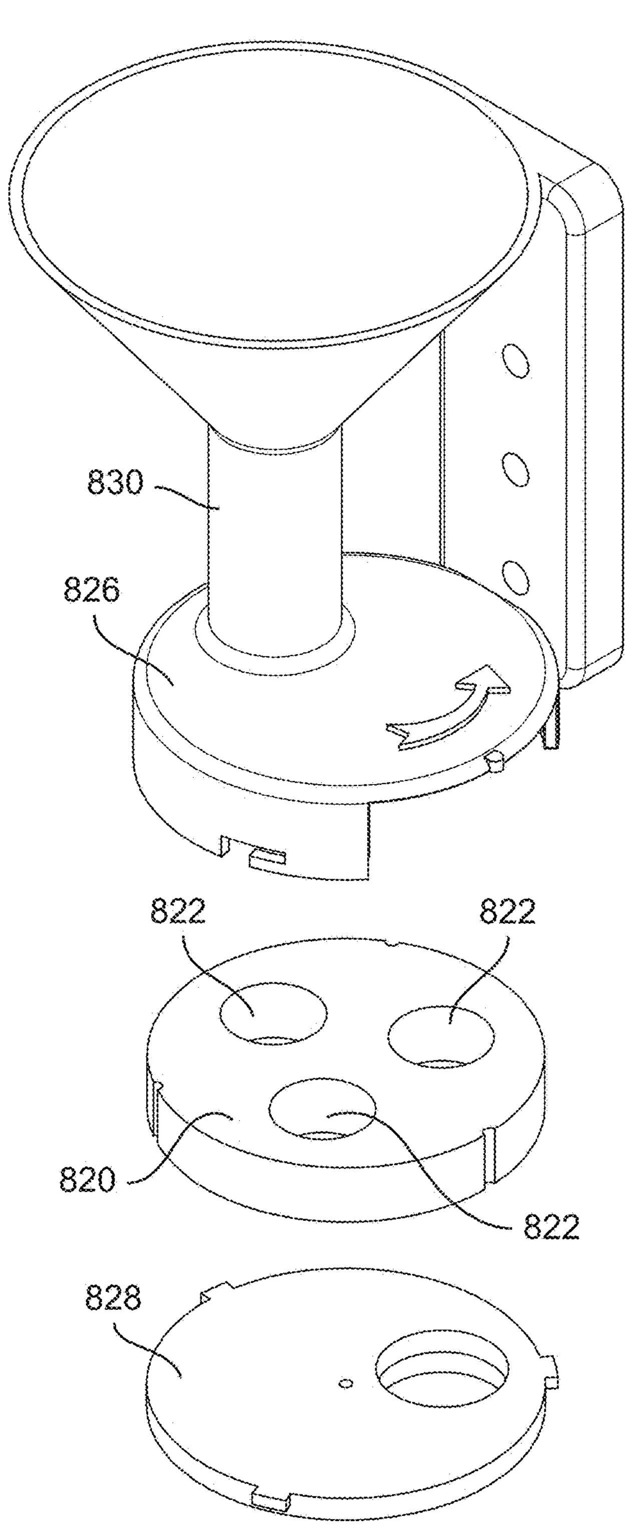
Figure 229A:
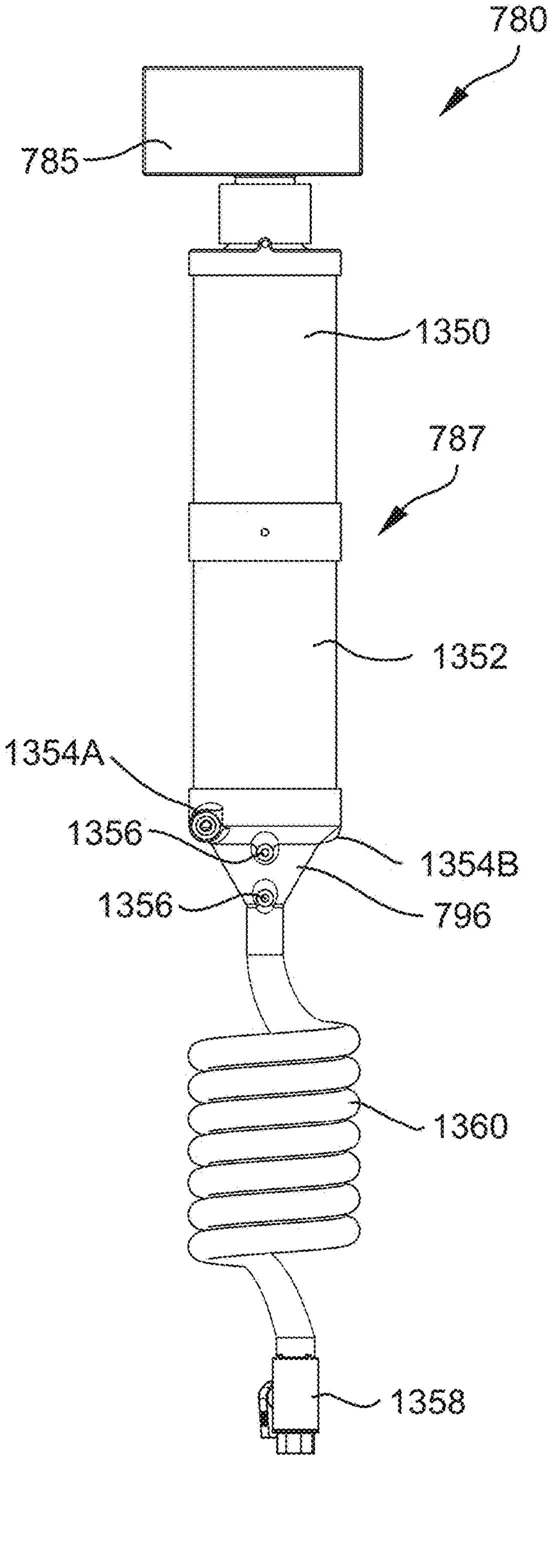
Figure 229B:
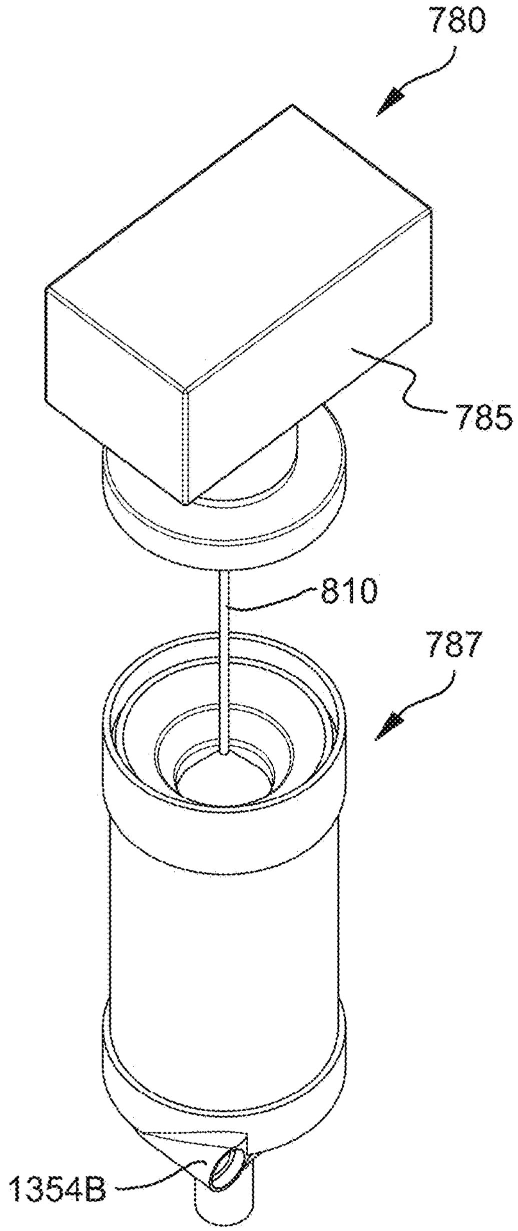
Figure 230:
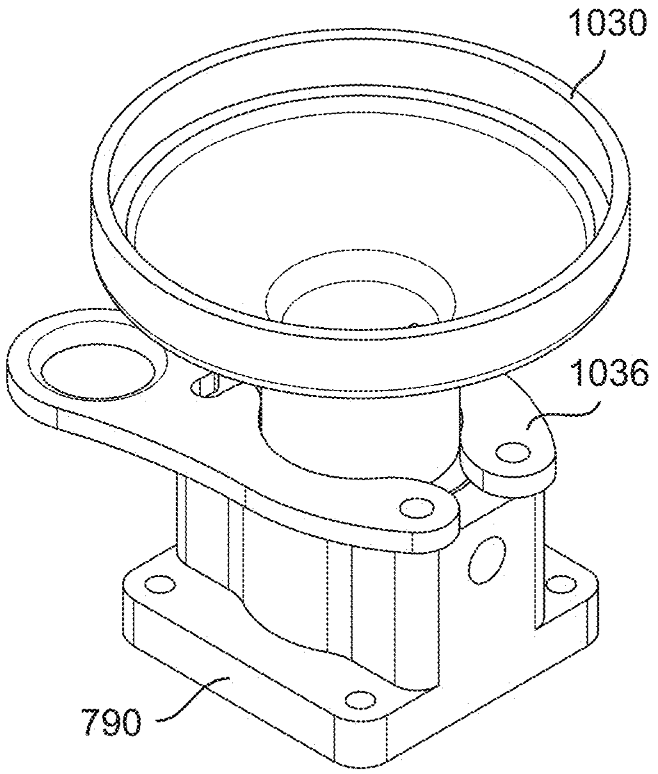
Figure 231:
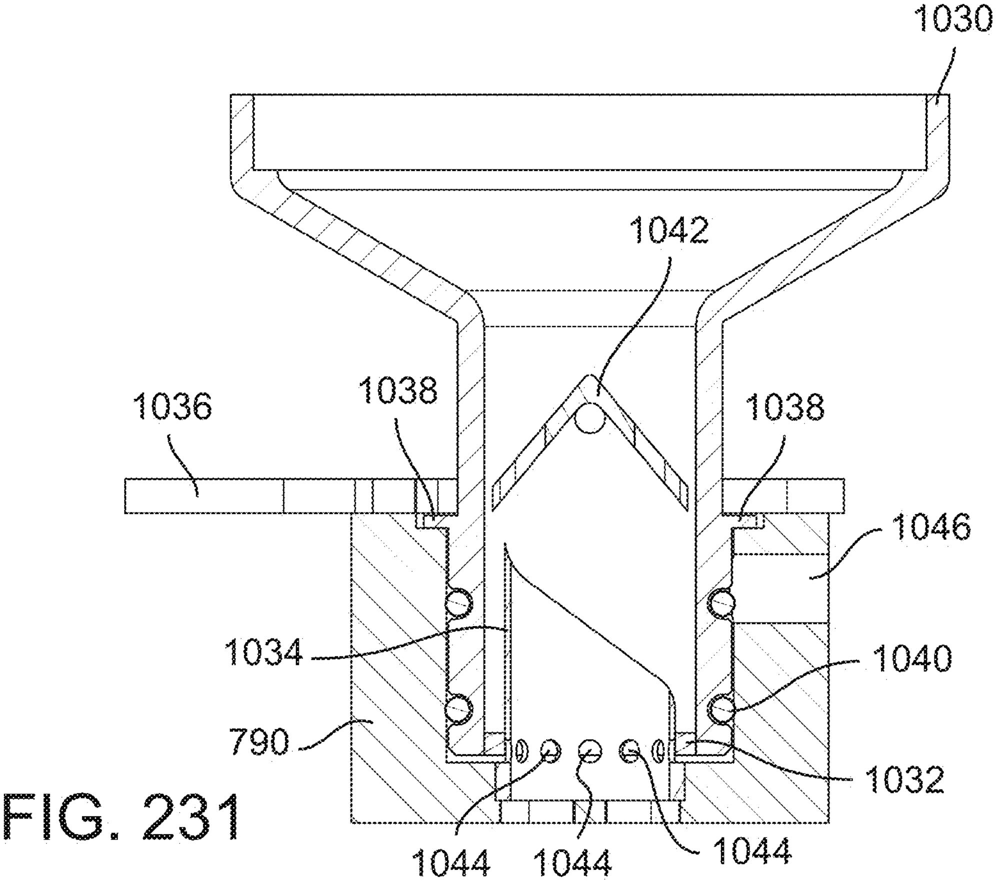
Figure 232:
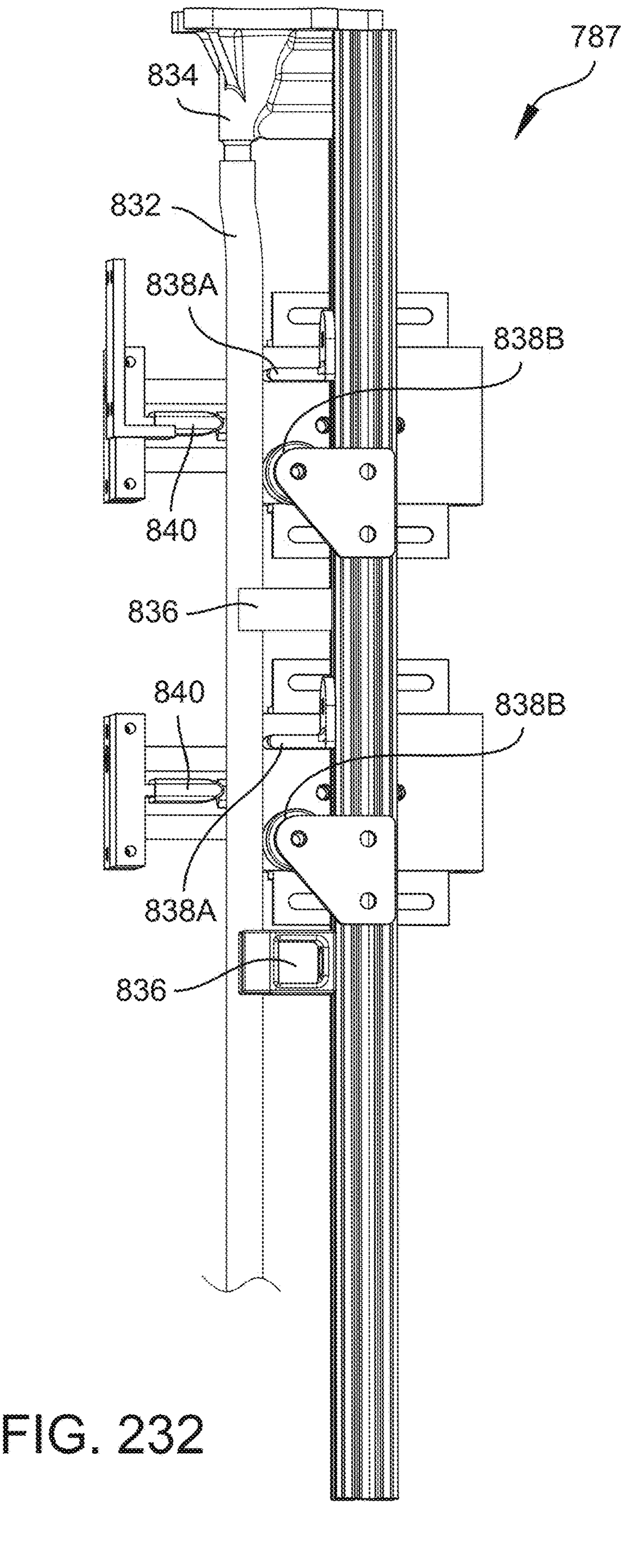
Figure 233:
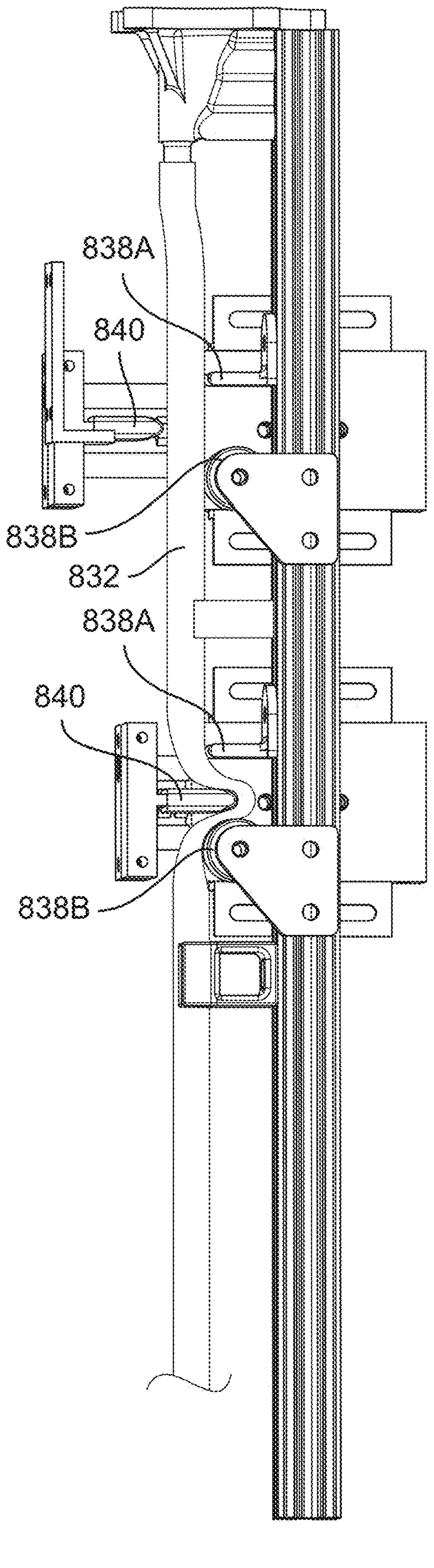
Figure 234:
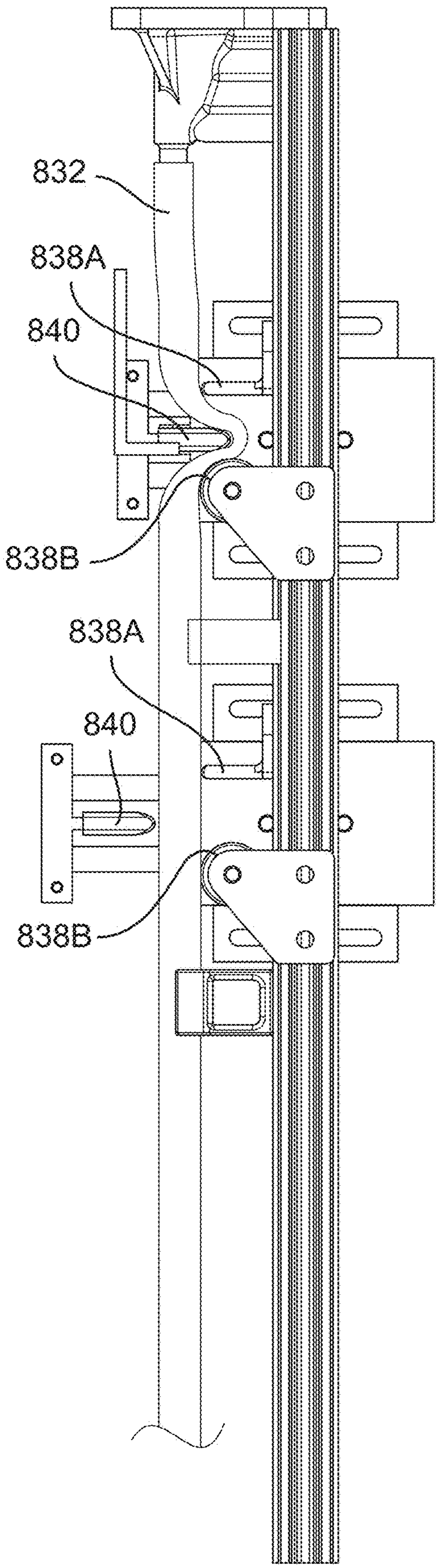
Figure 235:
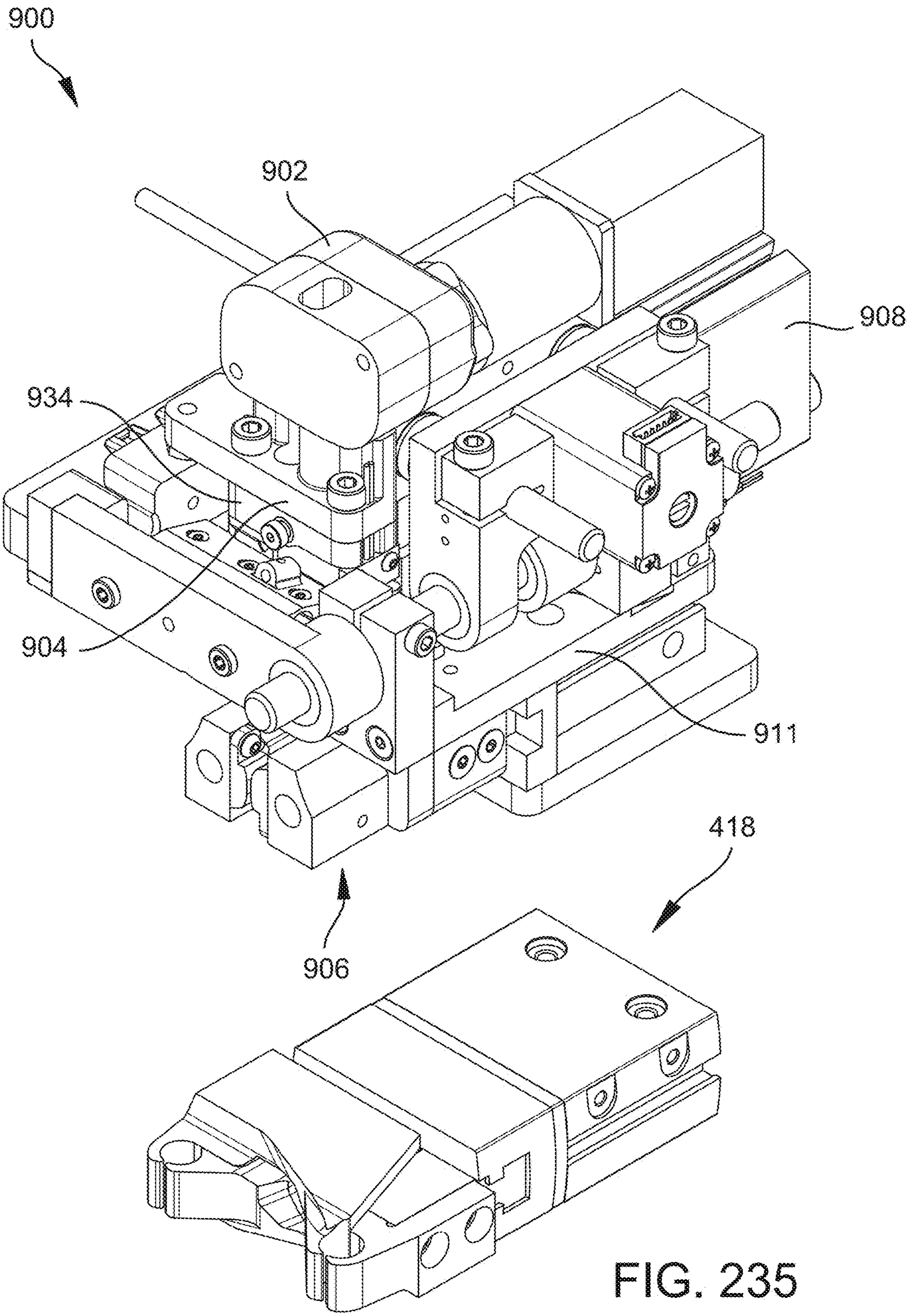
Figure 236:
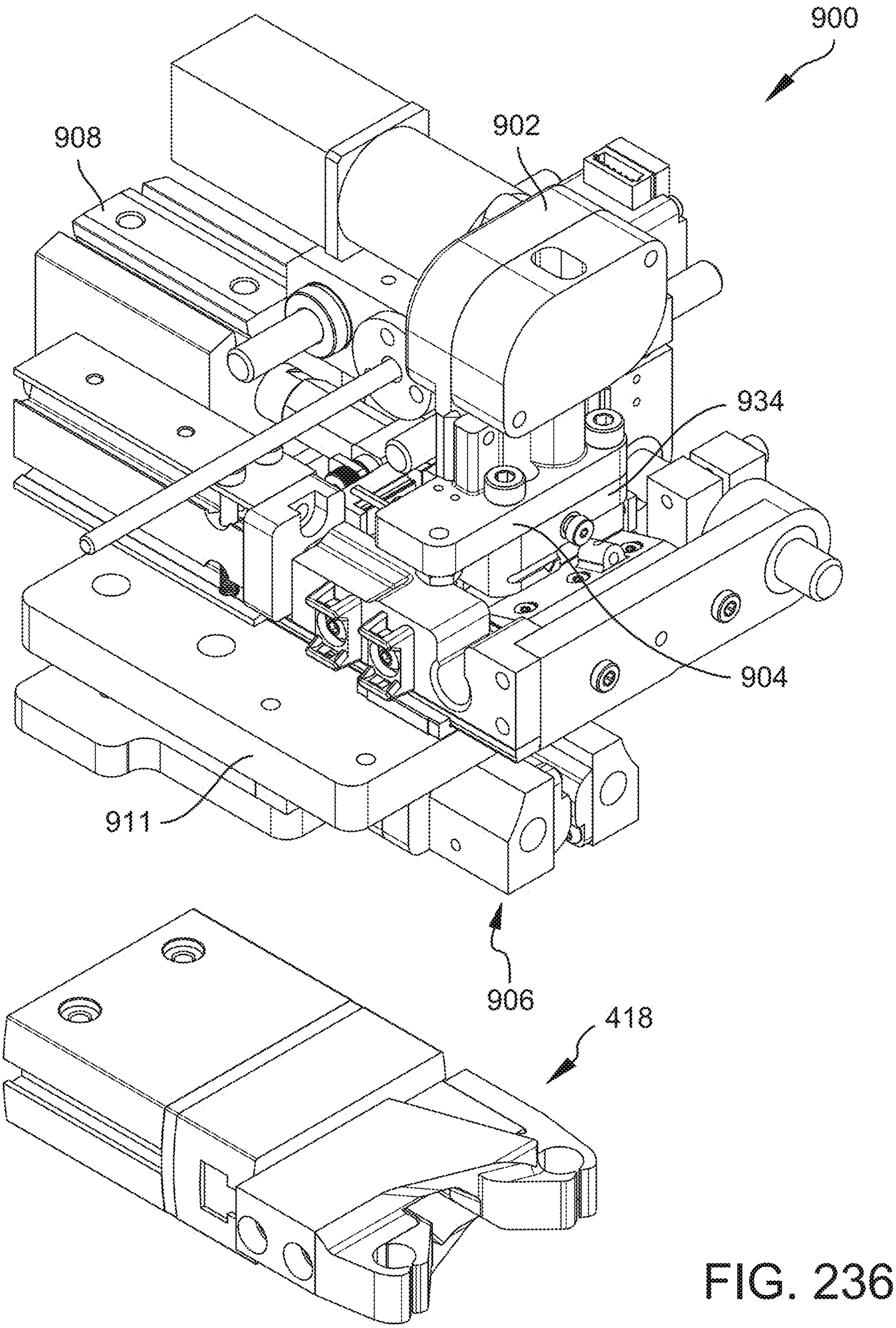
Figure 237:
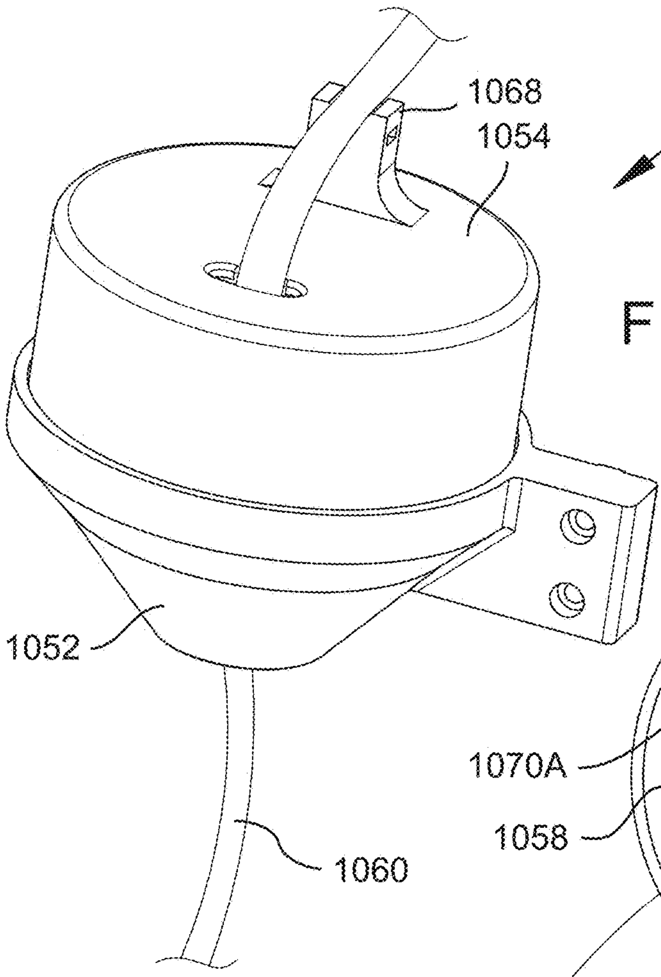
Figure 238:
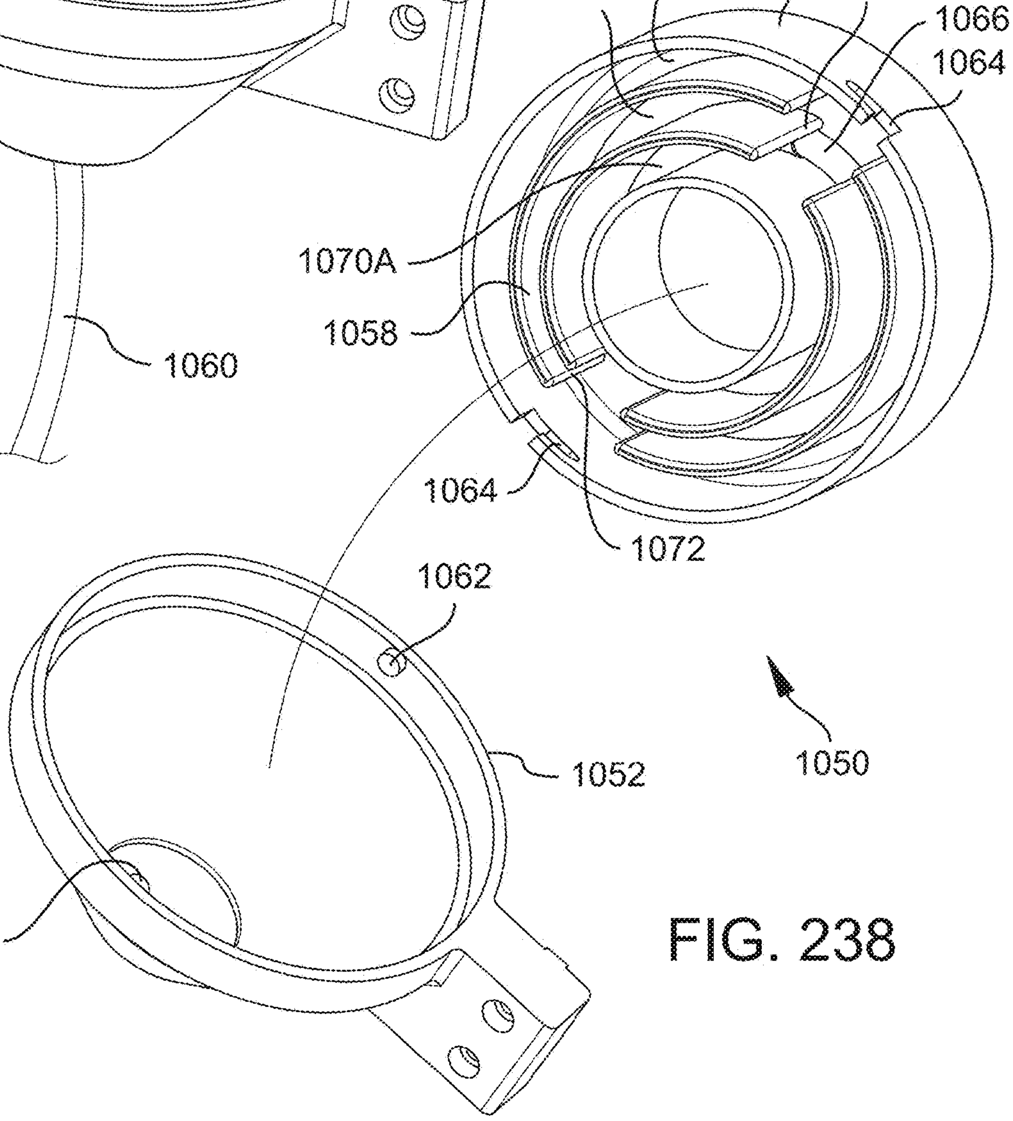
Figure 239:
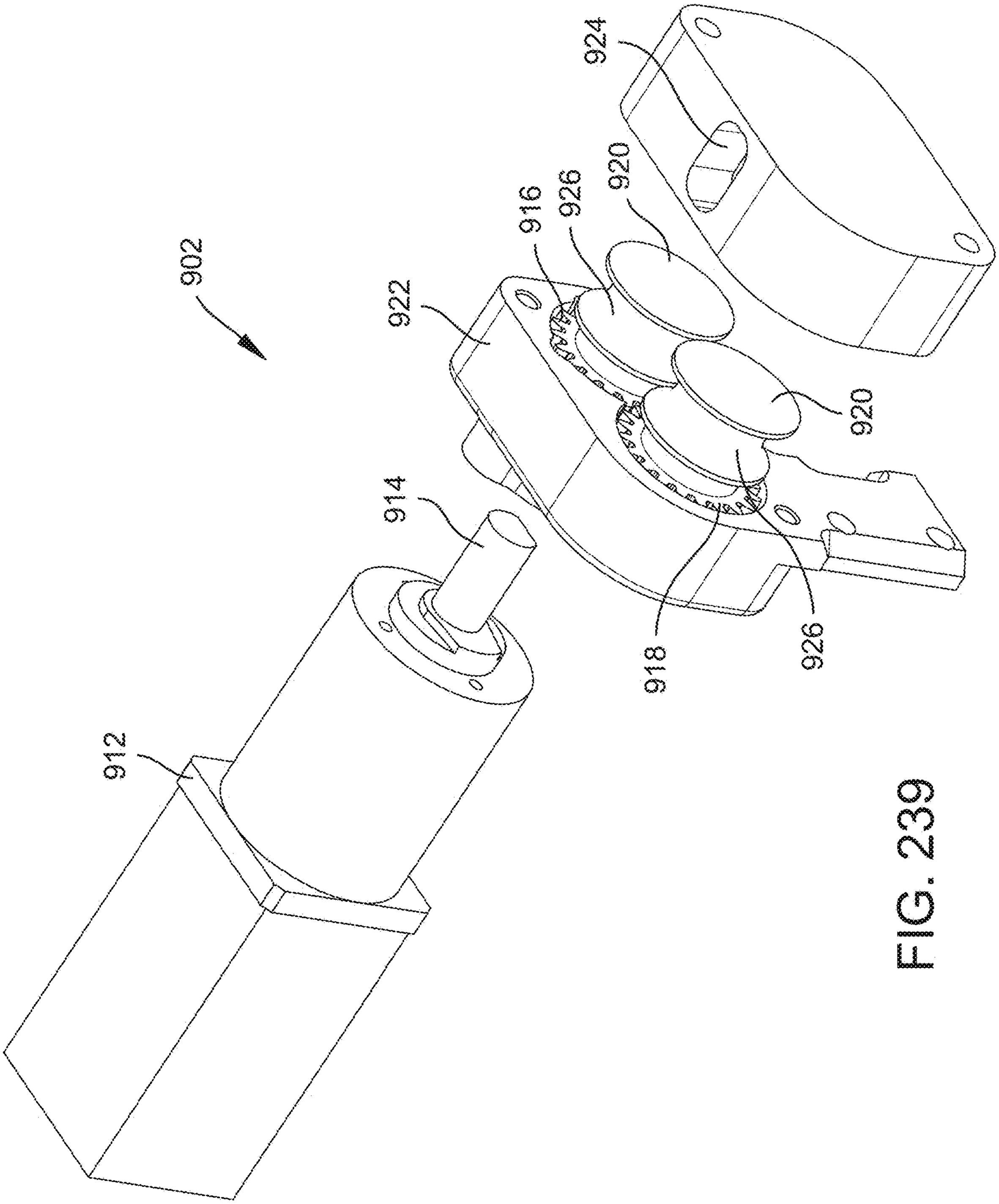
Figure 240:
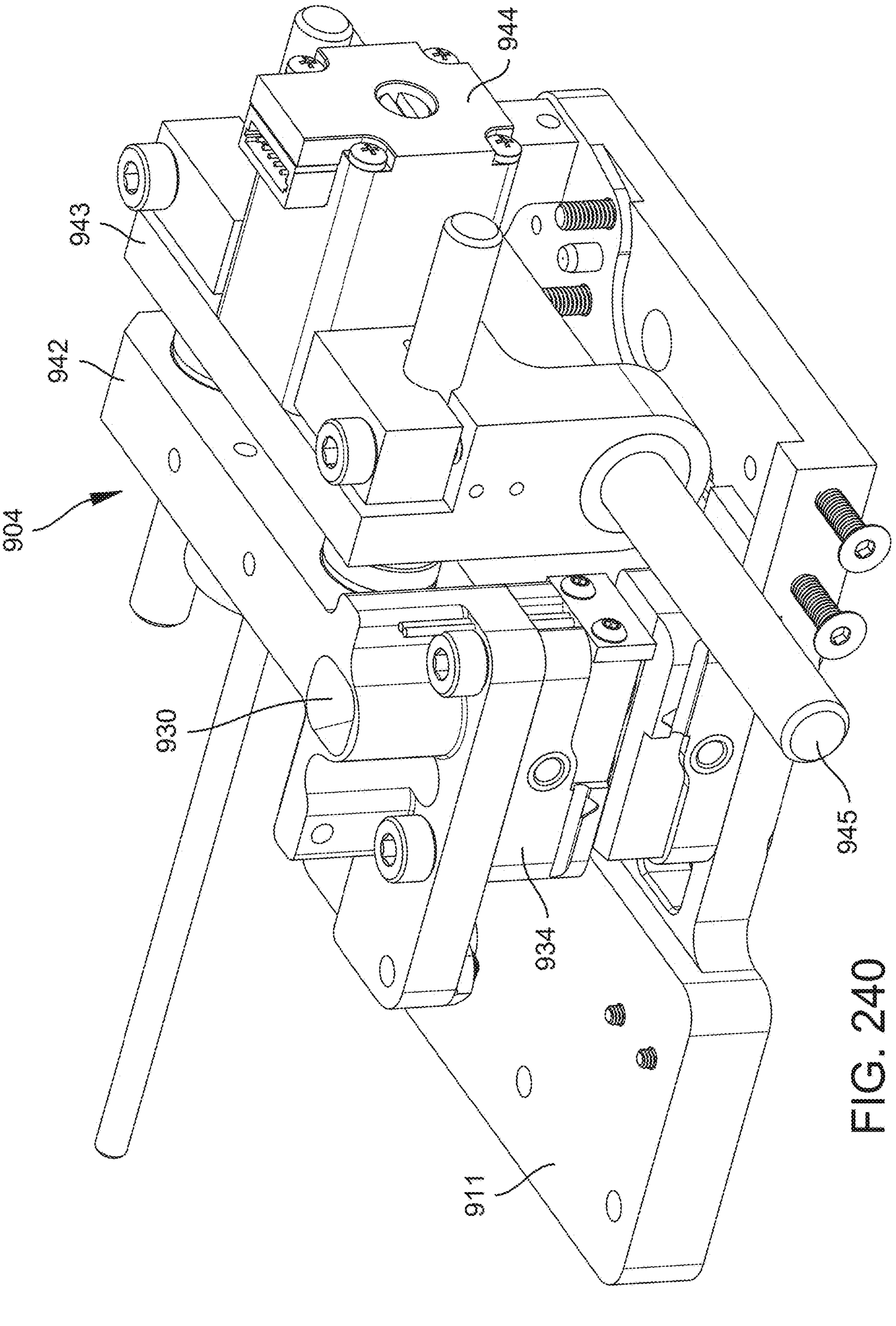
Figure 241:
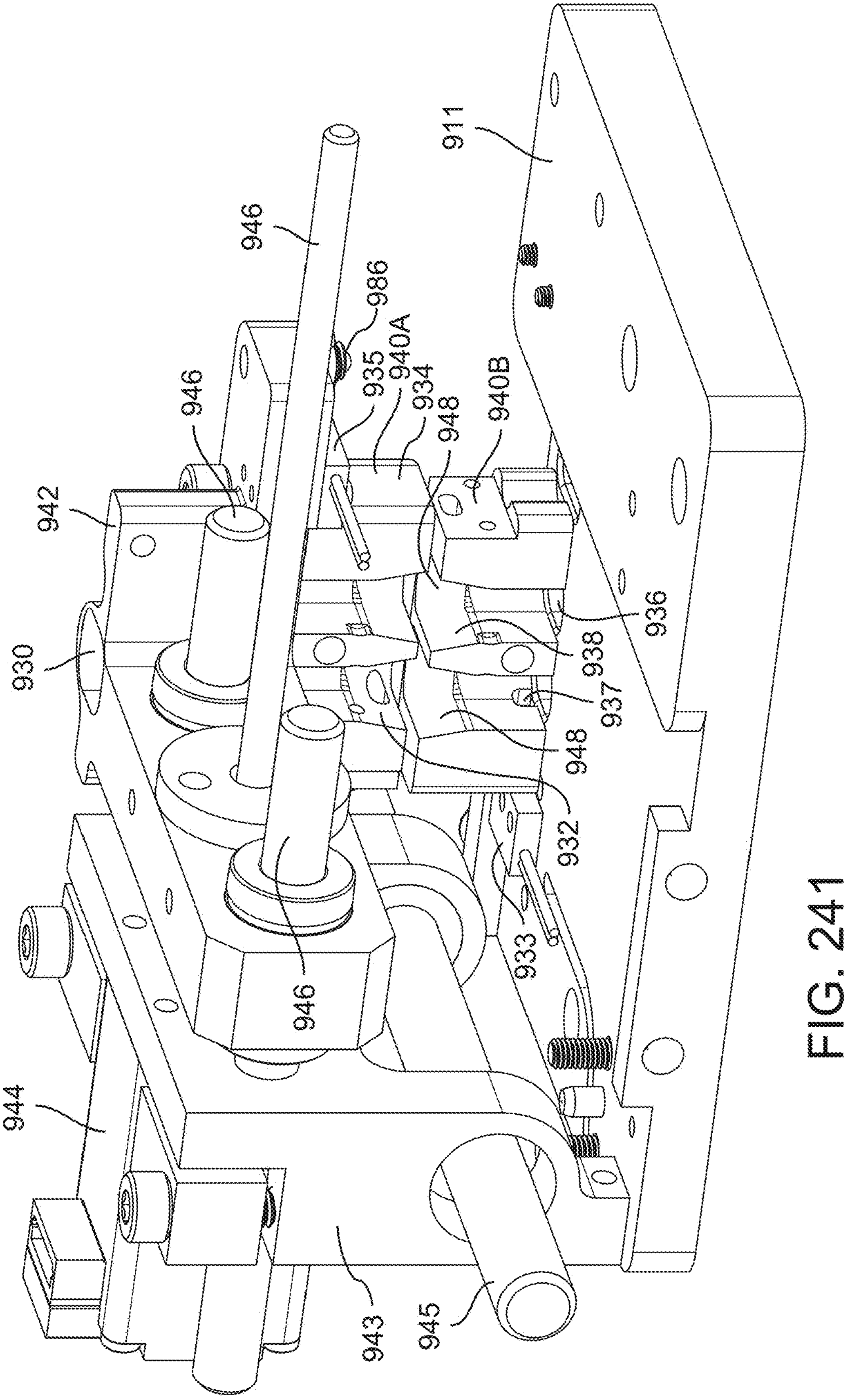
Figure 242:
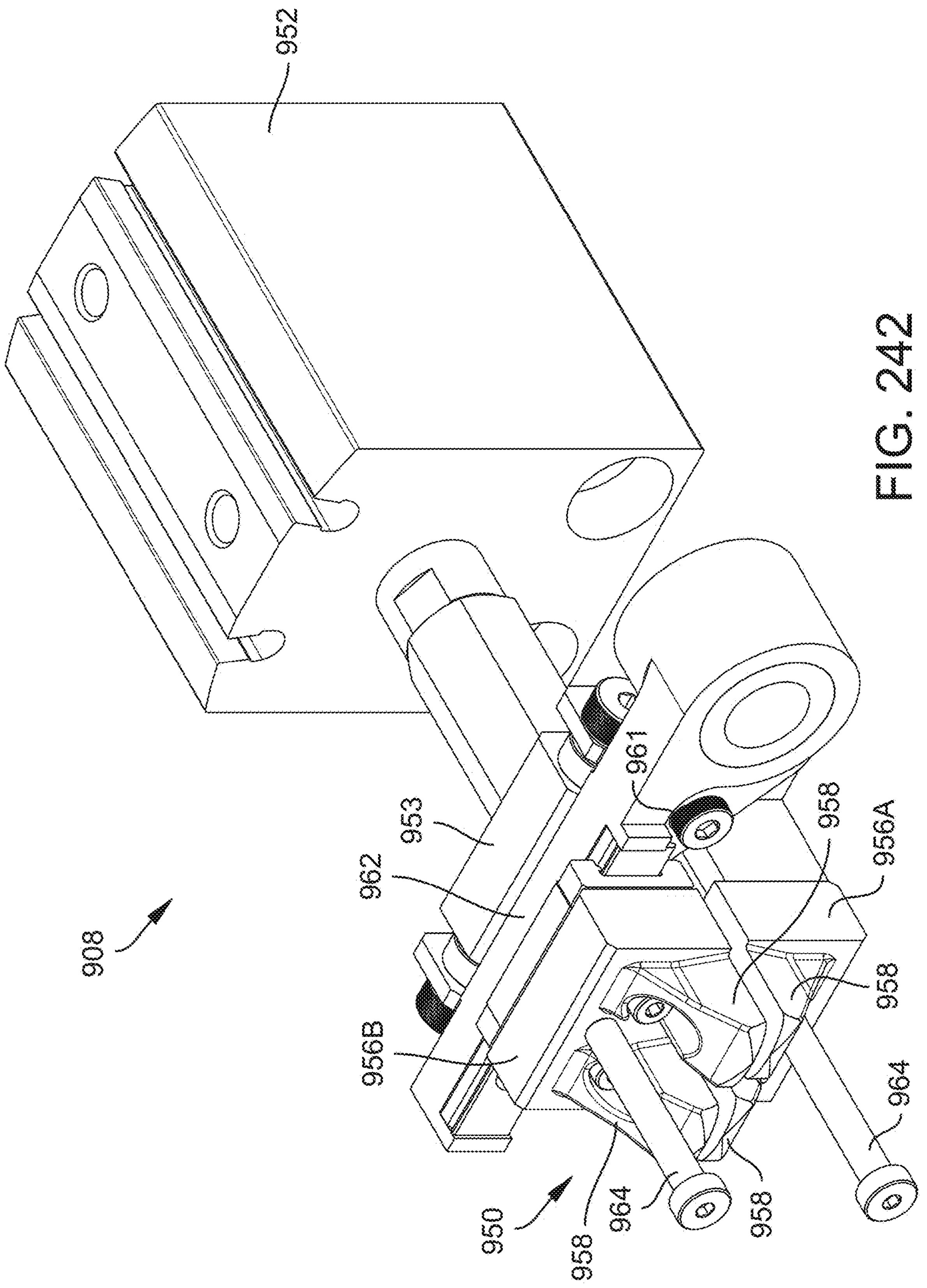
Figure 243:
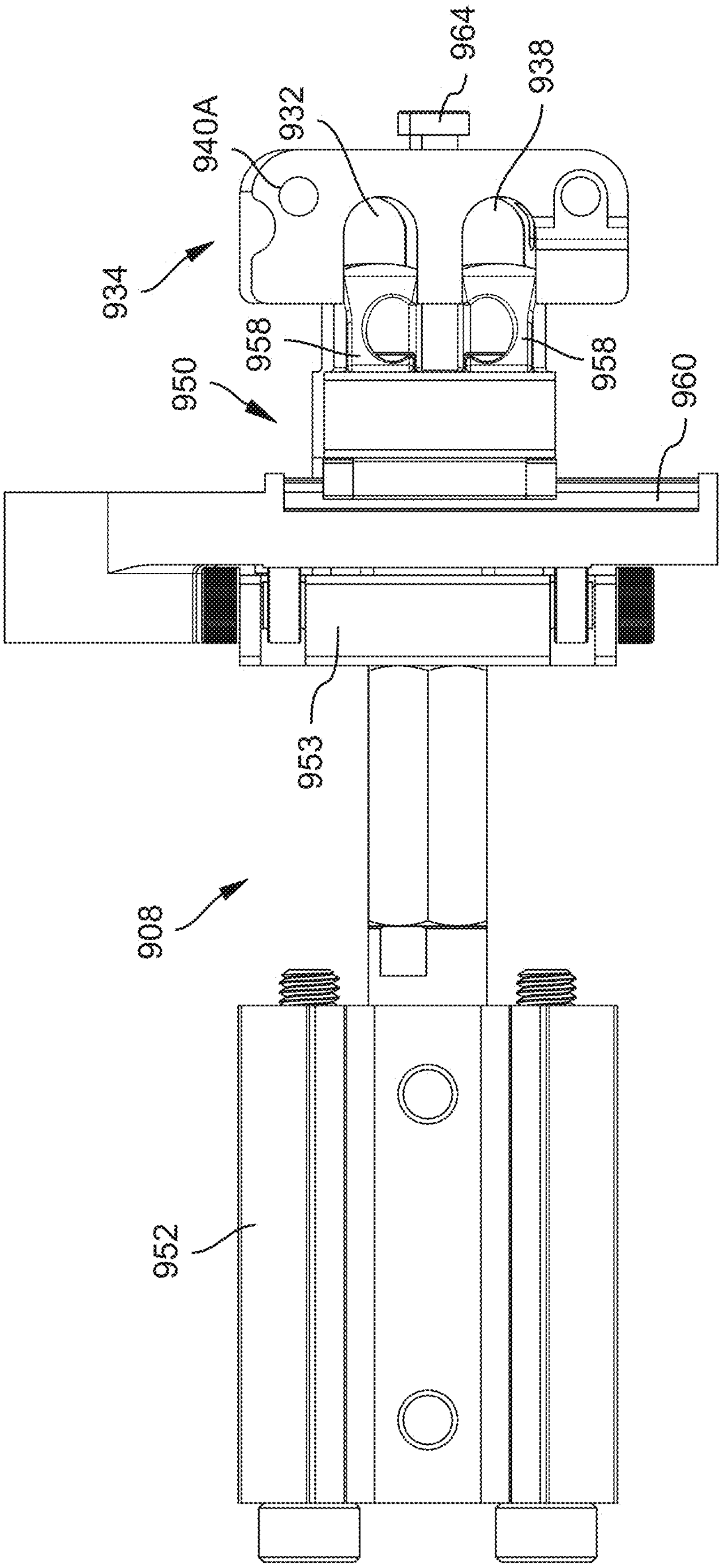
Figure 244:
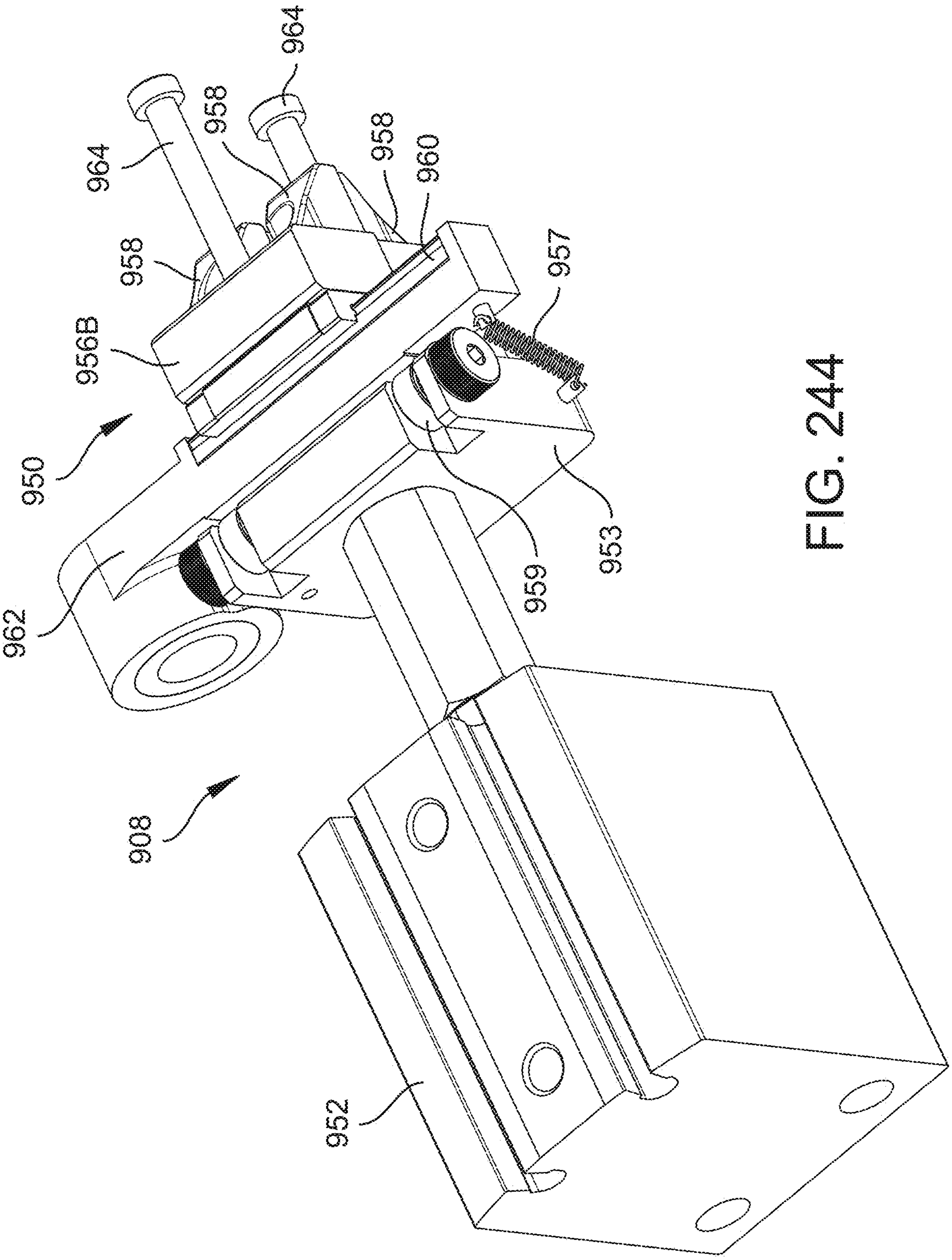
Figure 245:
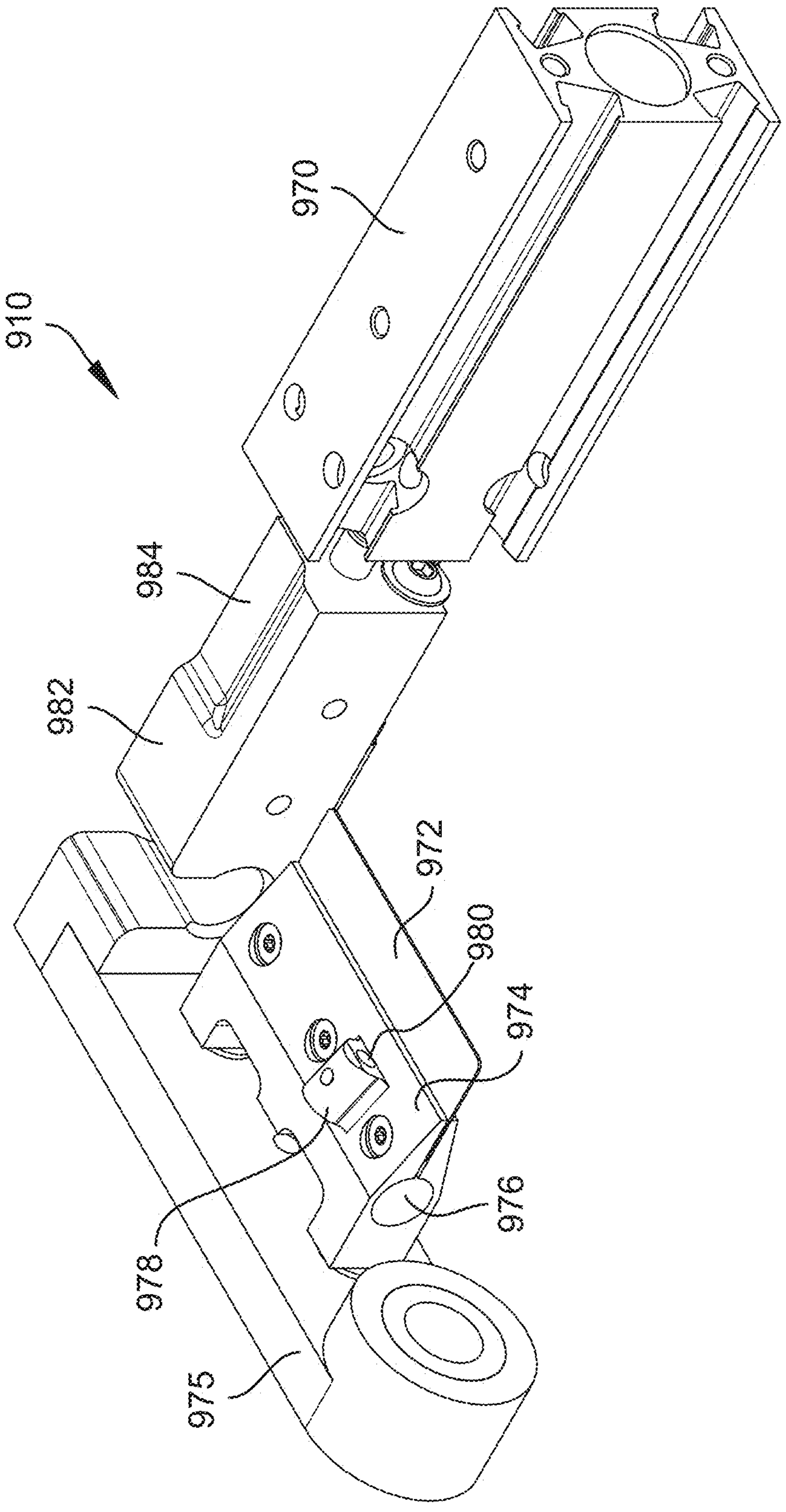
Figure 246:
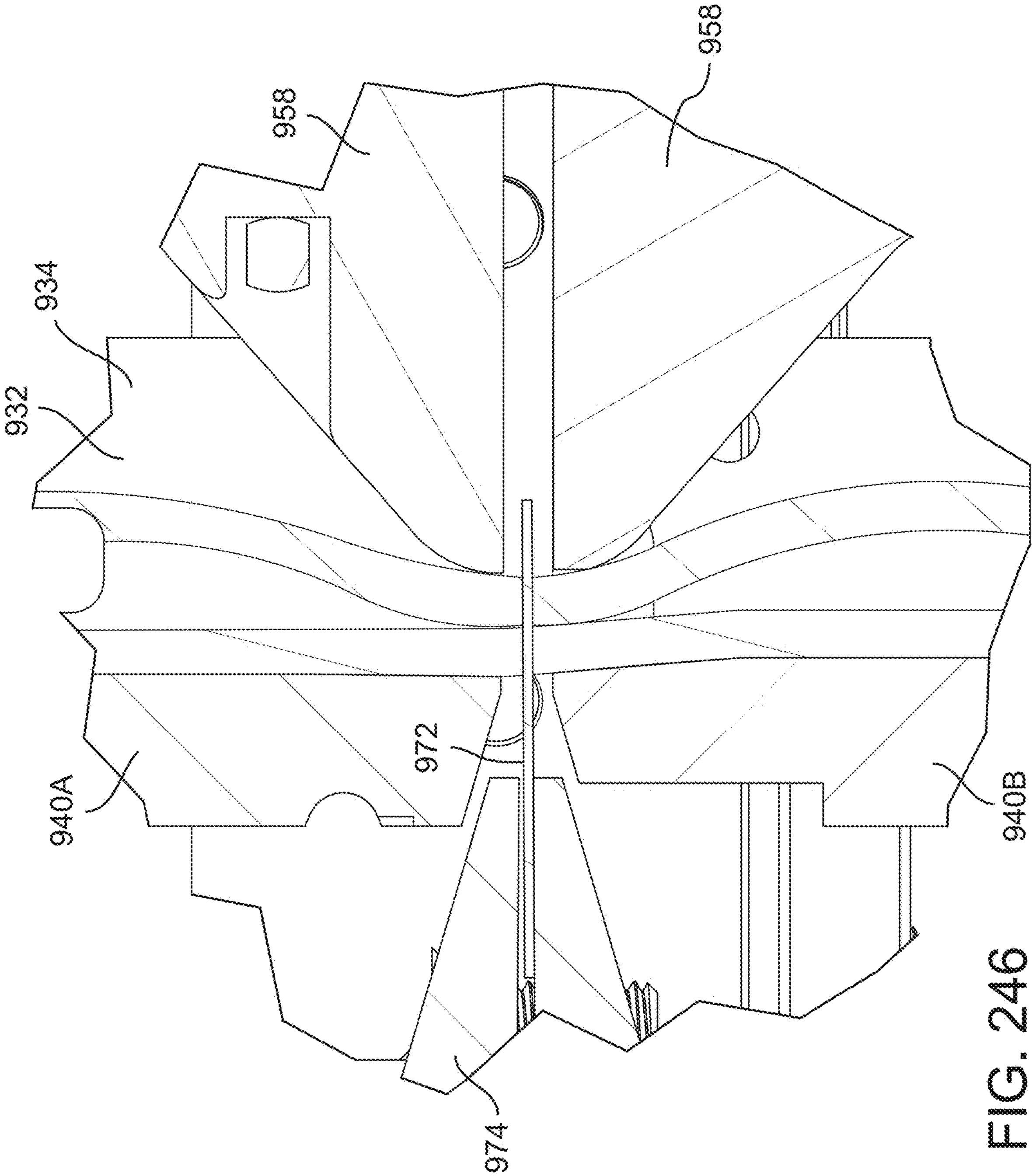
Figure 247:
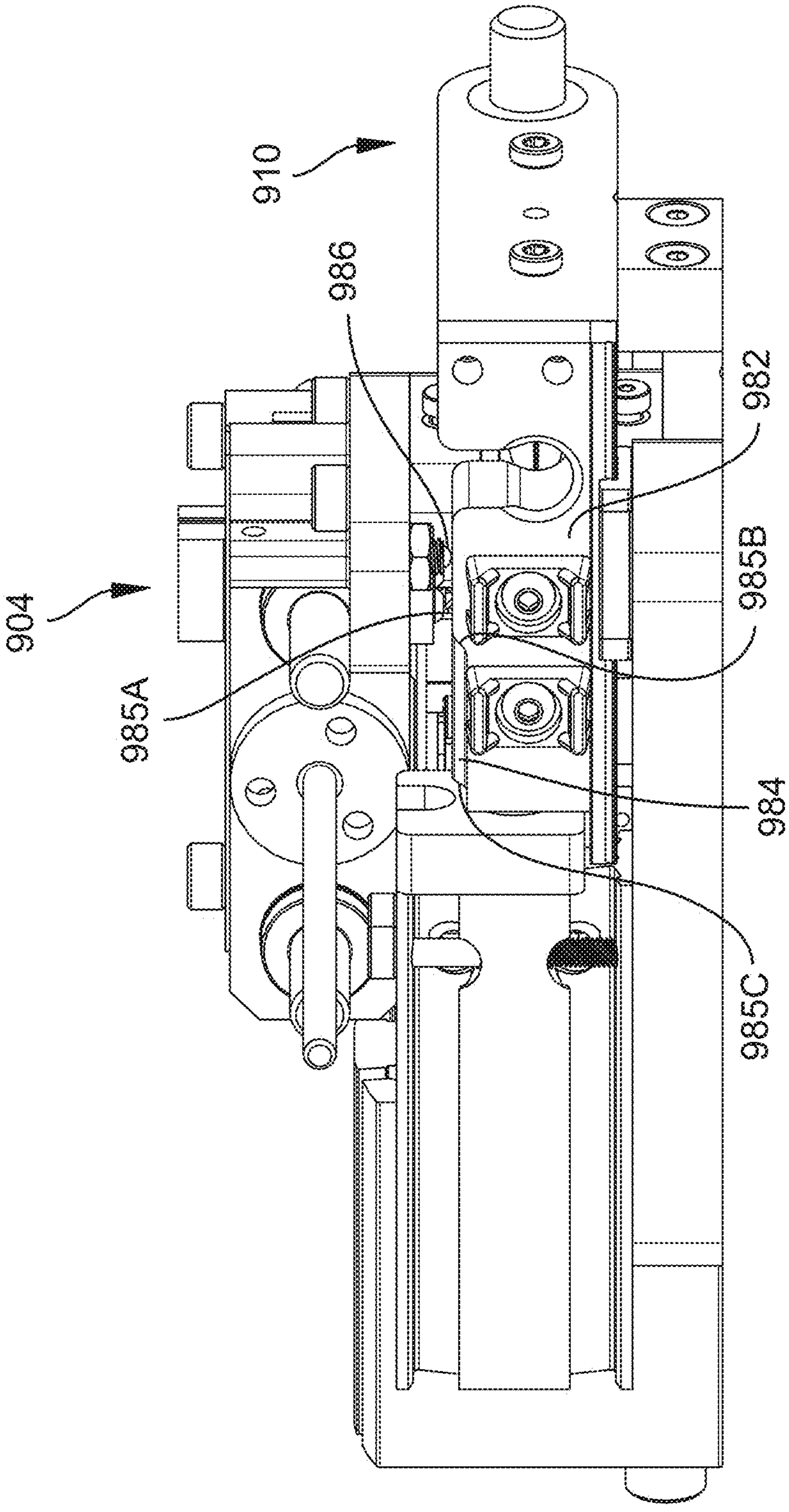
Figure 248:
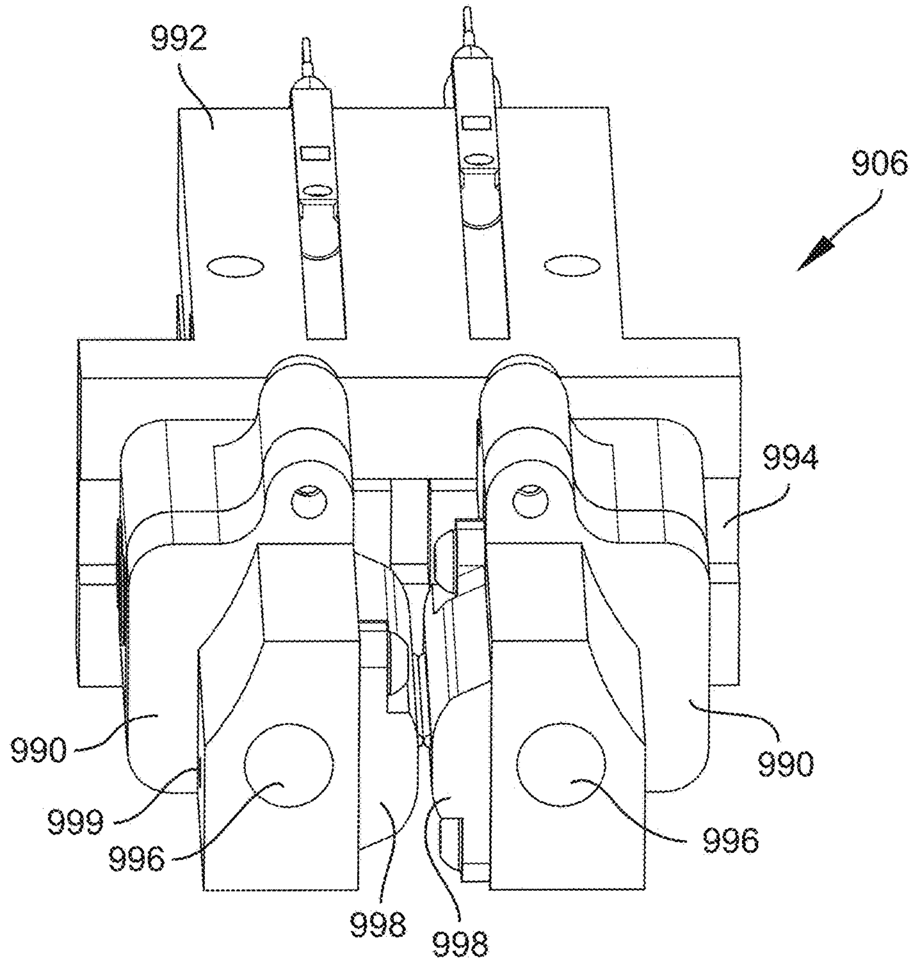
Figure 249:
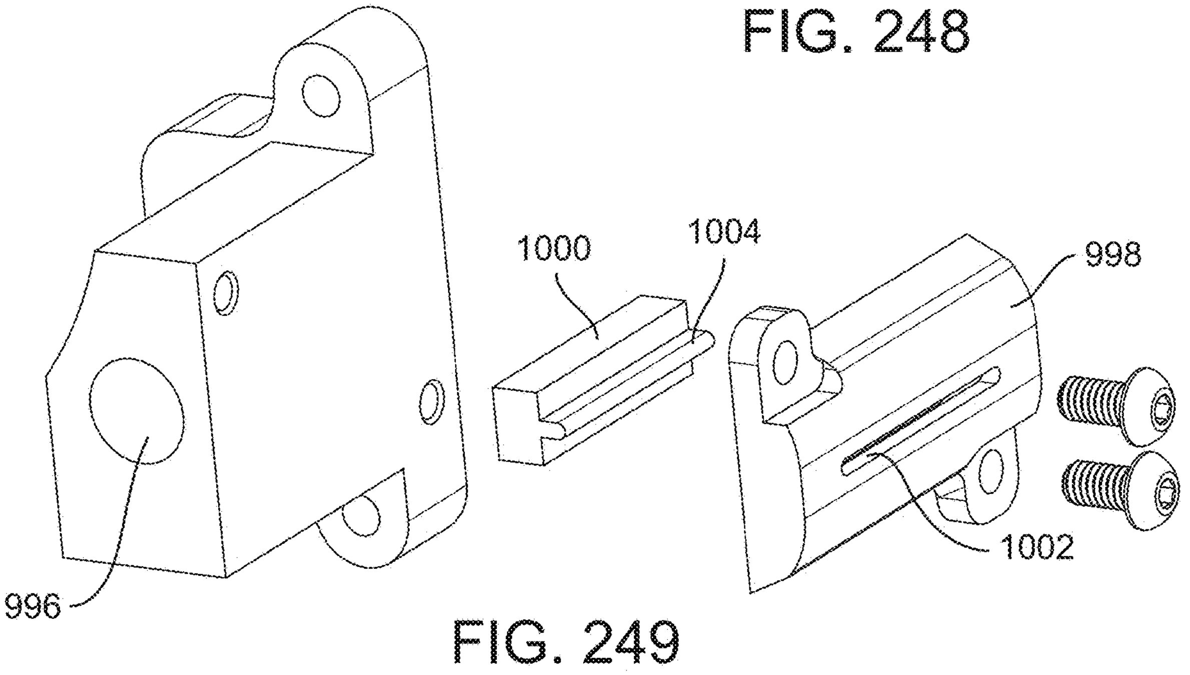
Figure 250:
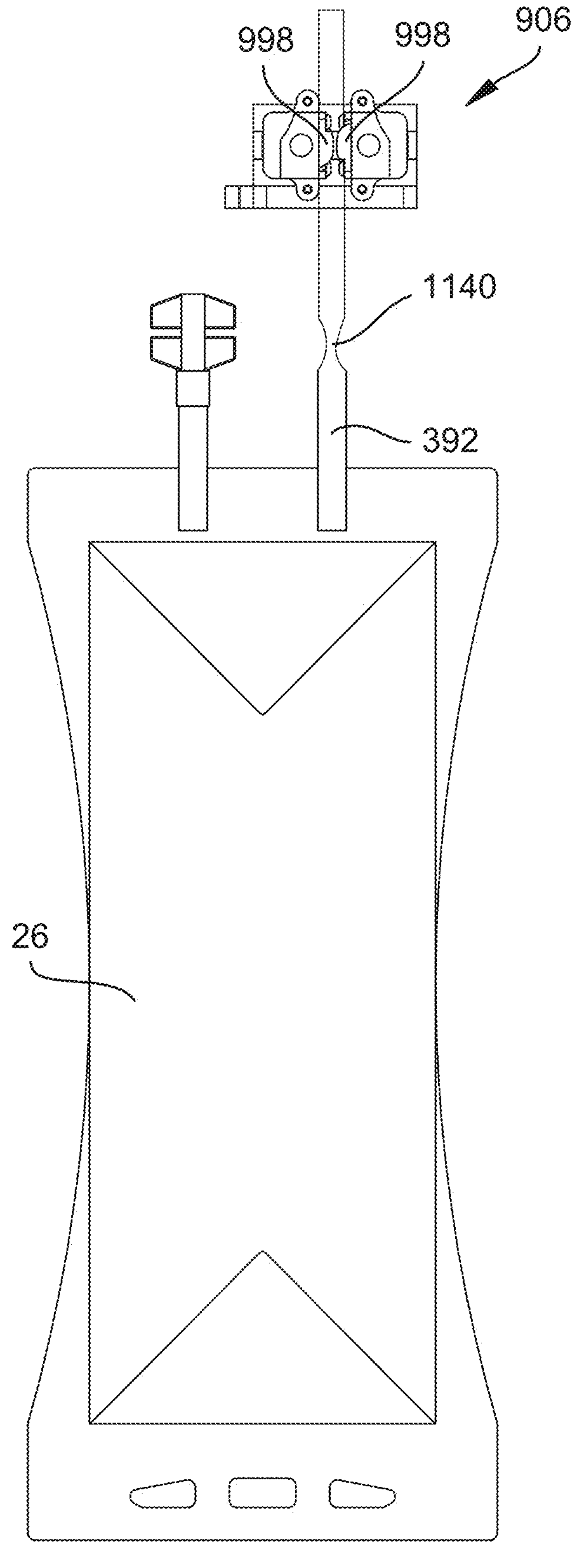
Figure 251:
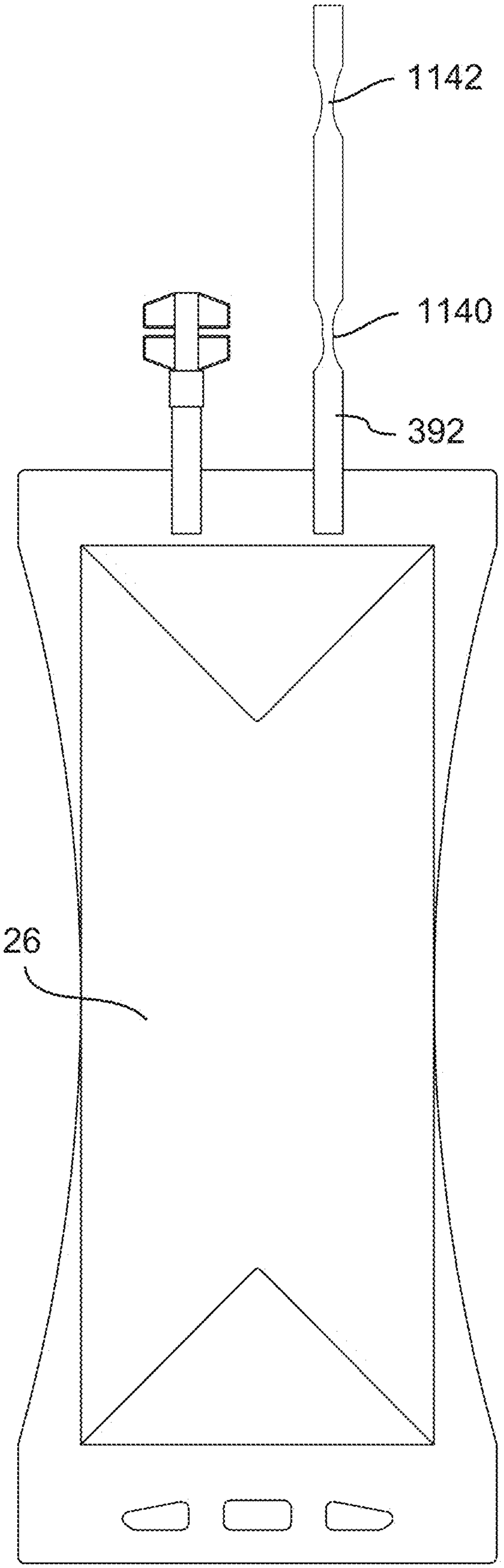
Figure 252:
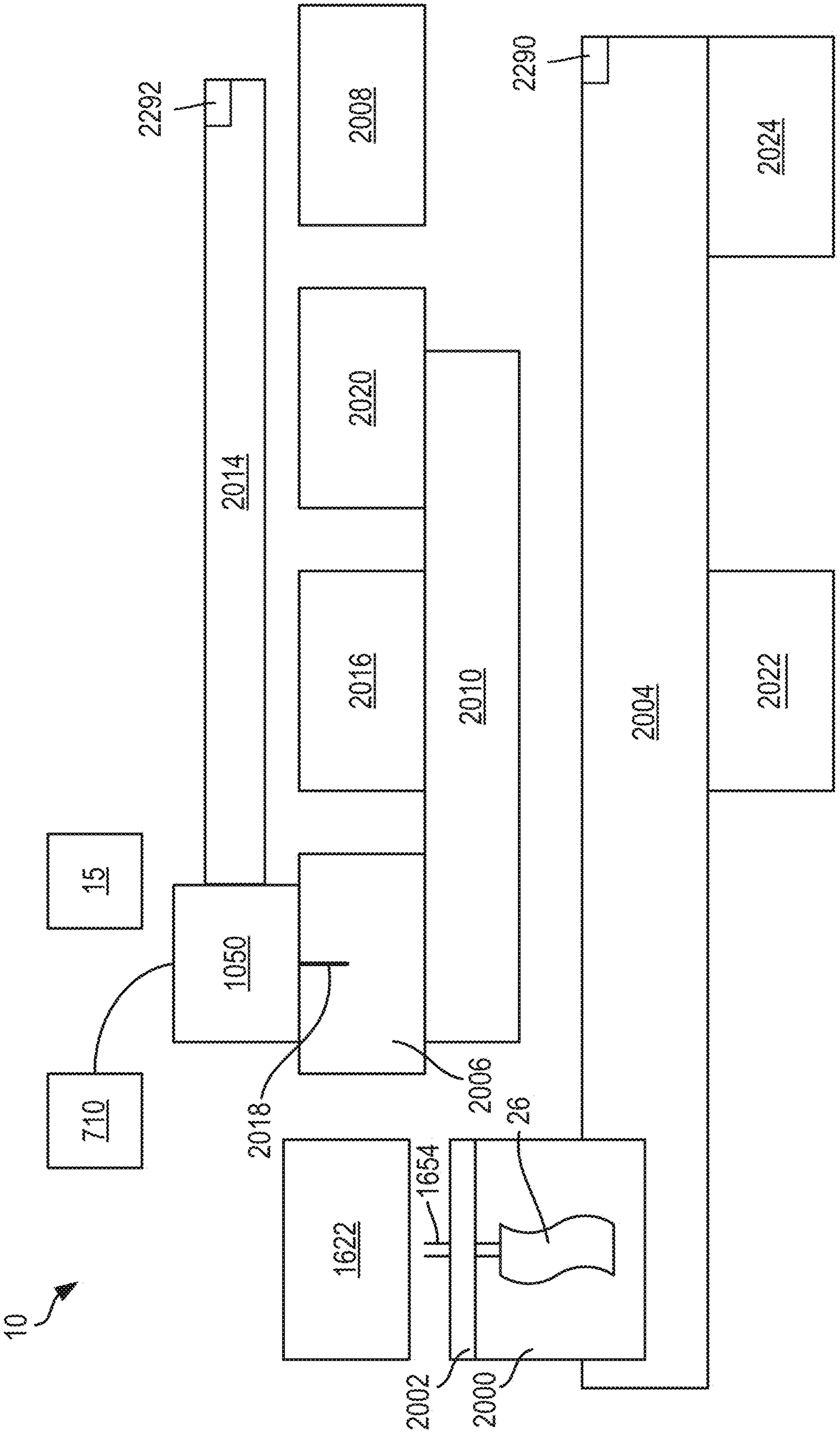
Figure 253:
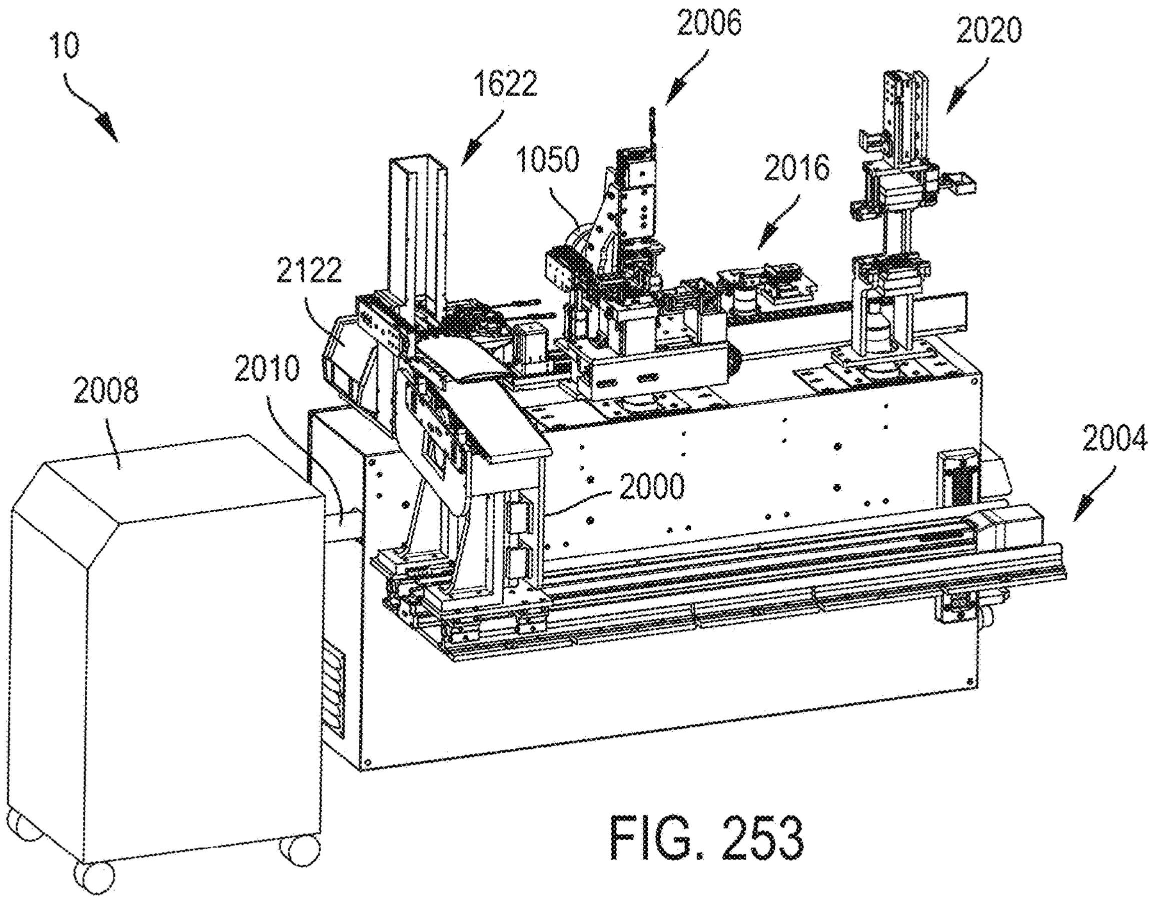
Figure 254:
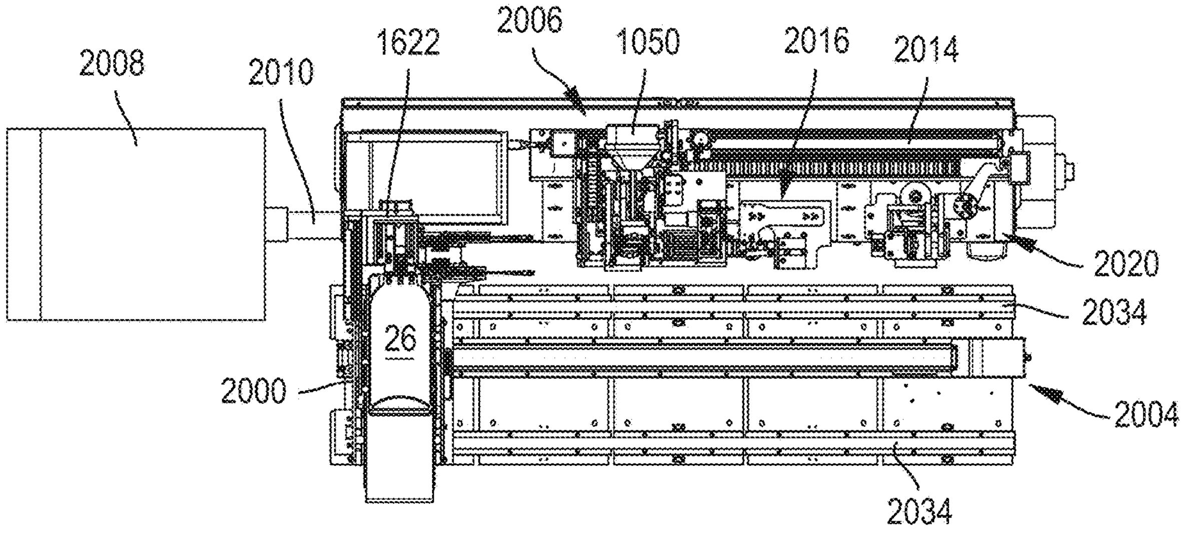
Figure 255:
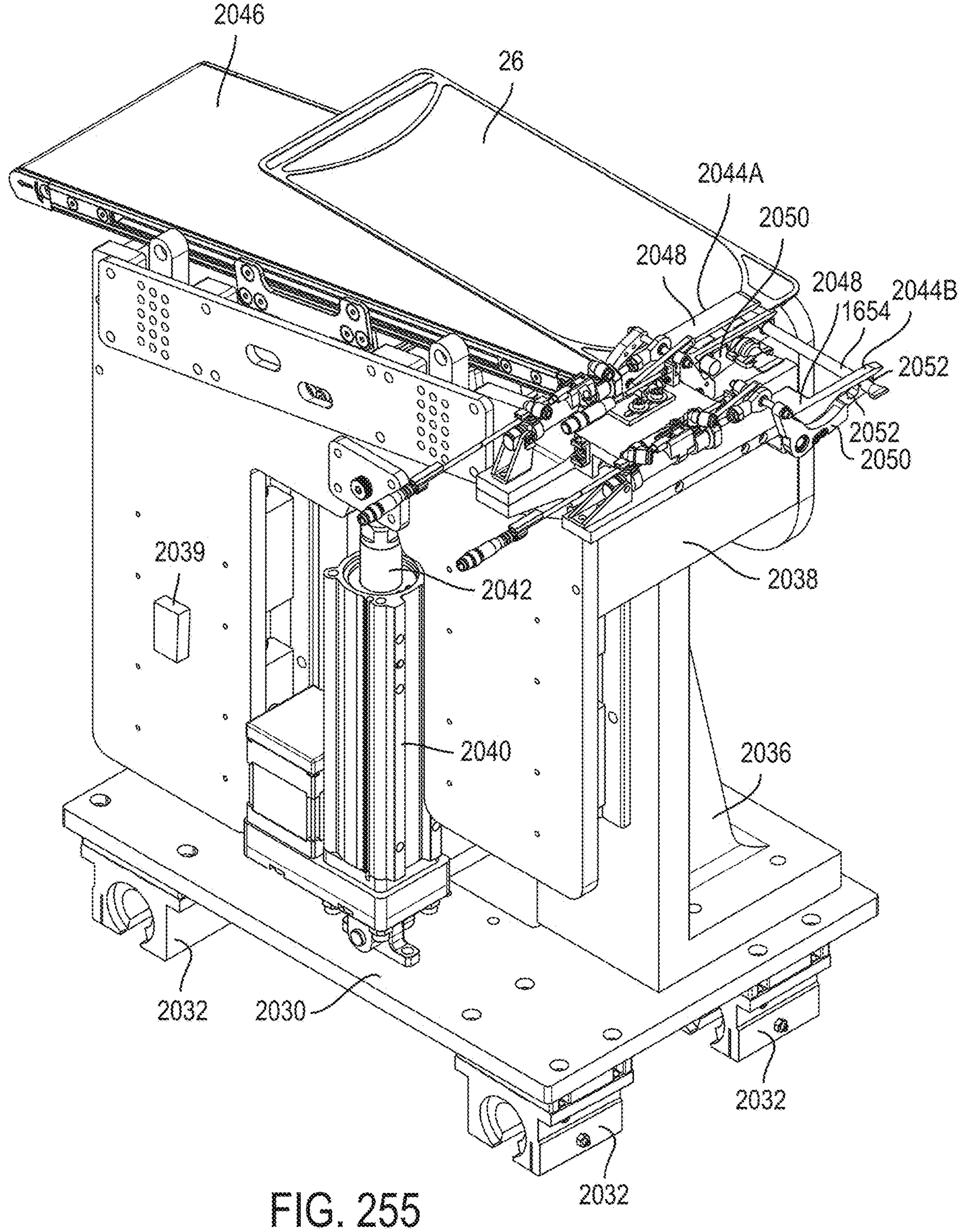
Figure 256:
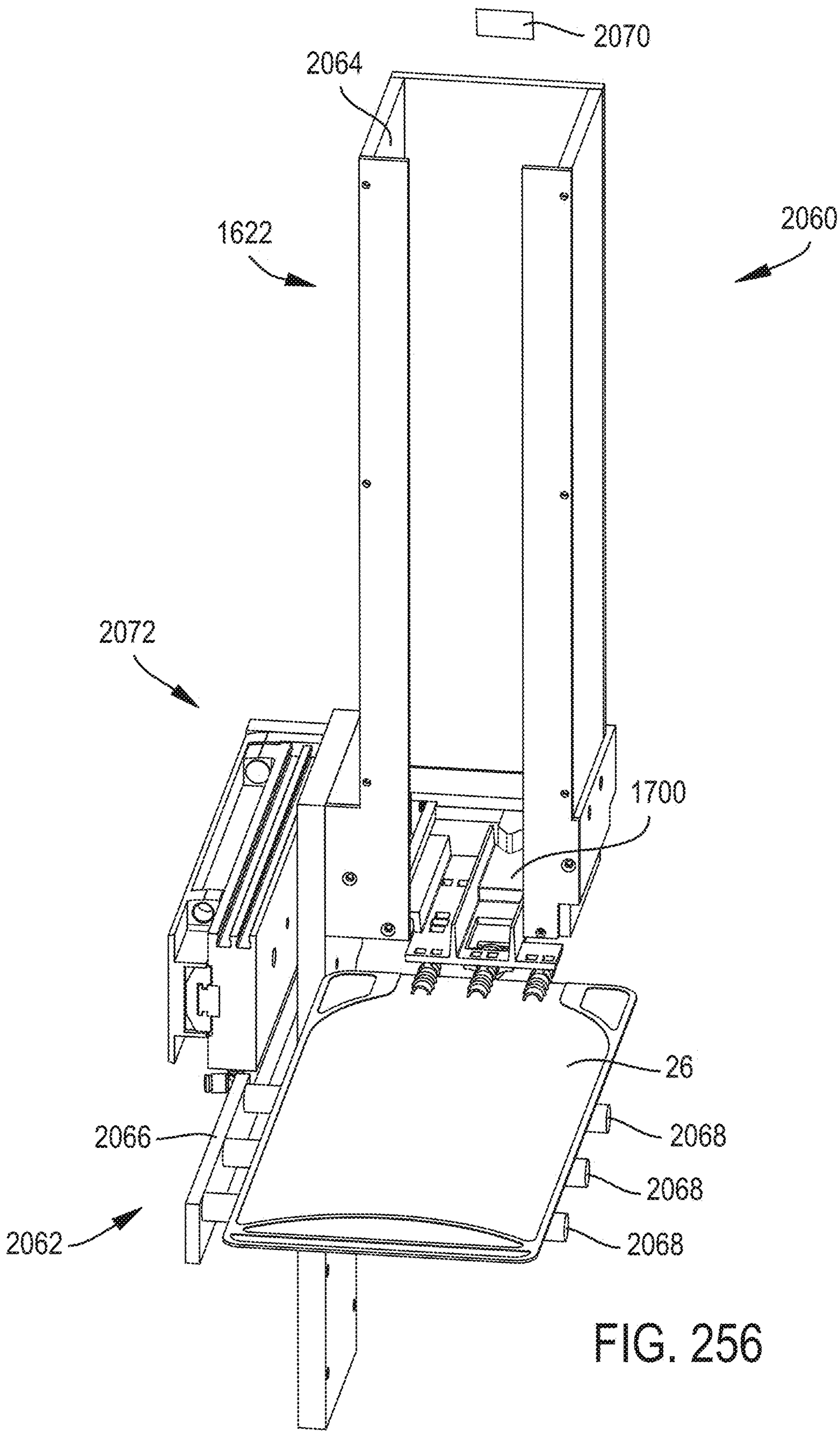
Figure 257:
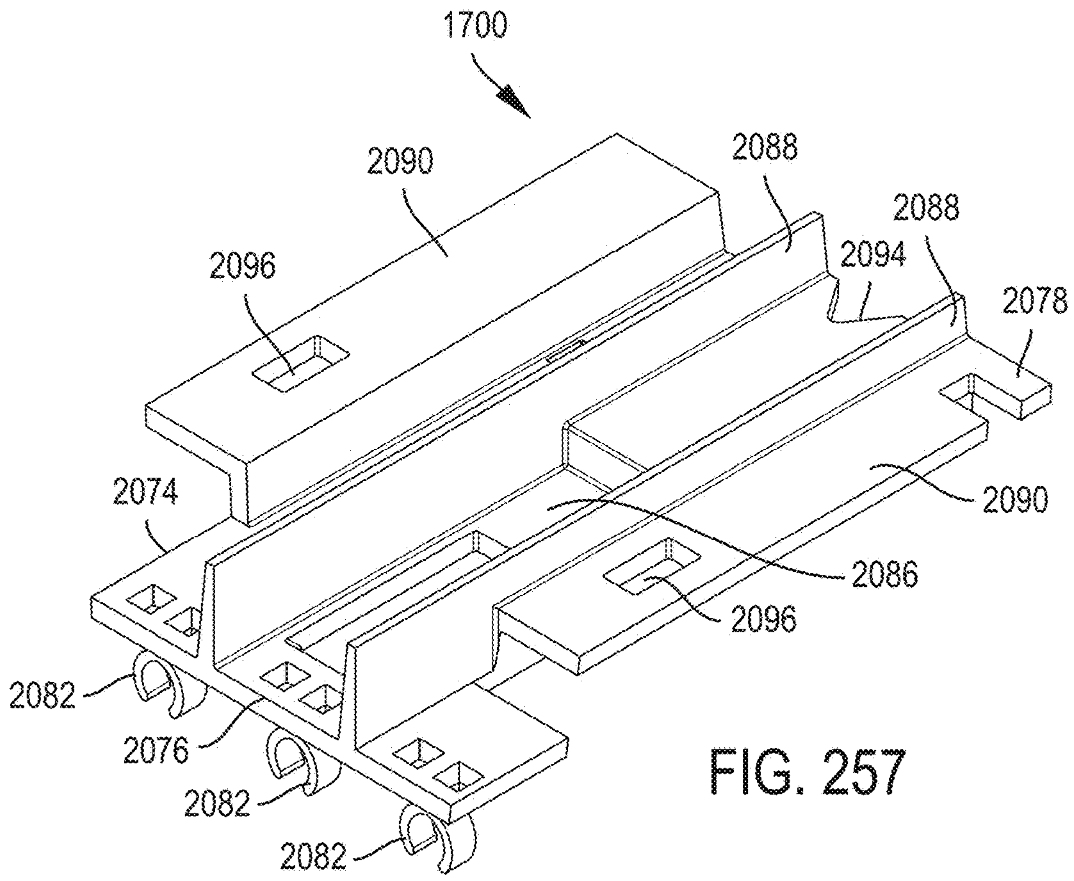
Figure 258:
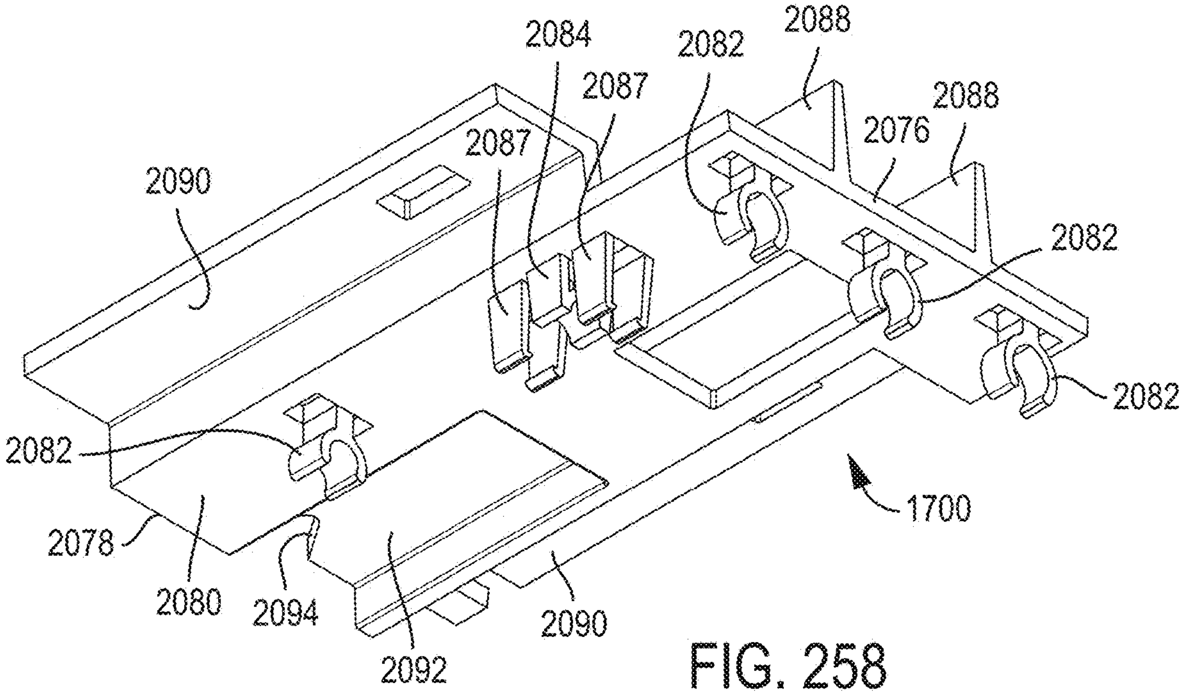
Figure 259:
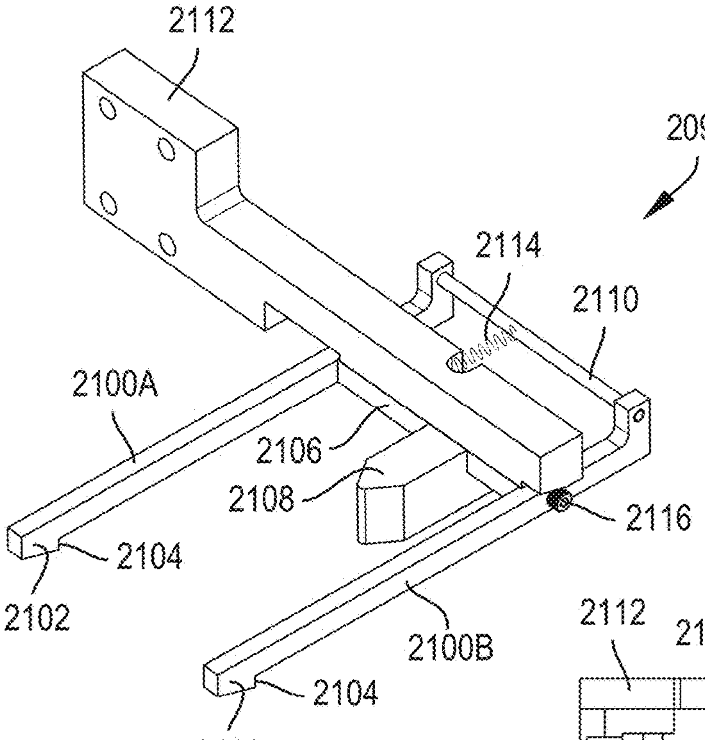
Figure 260:
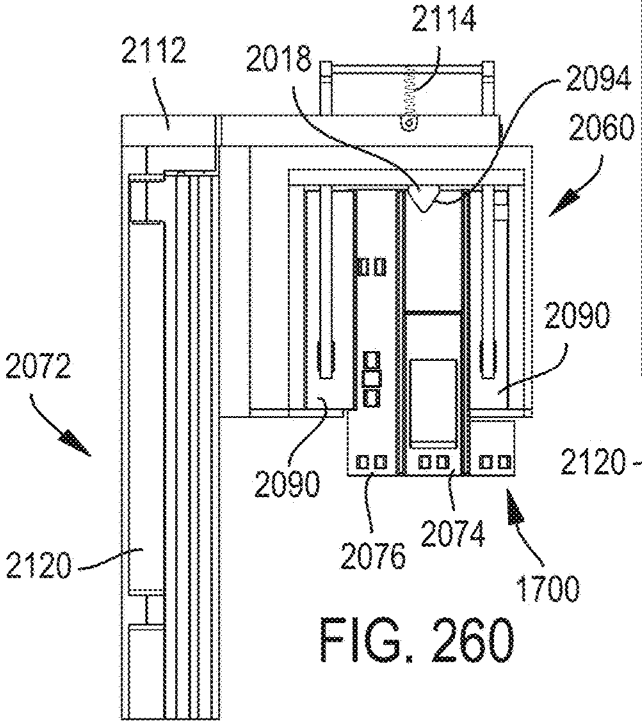
Figure 261:
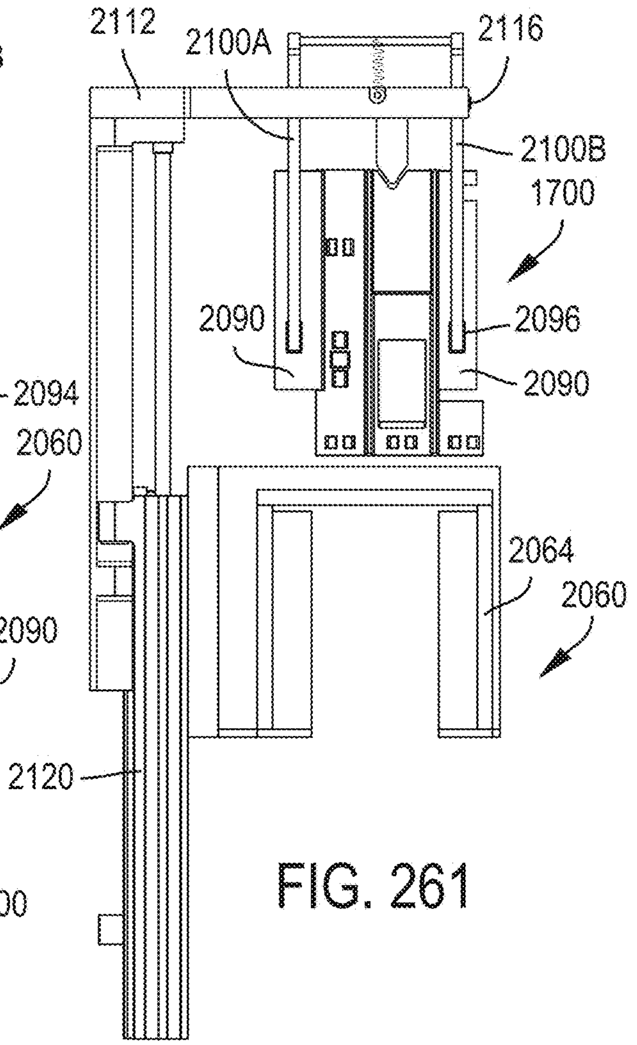
Figure 262:
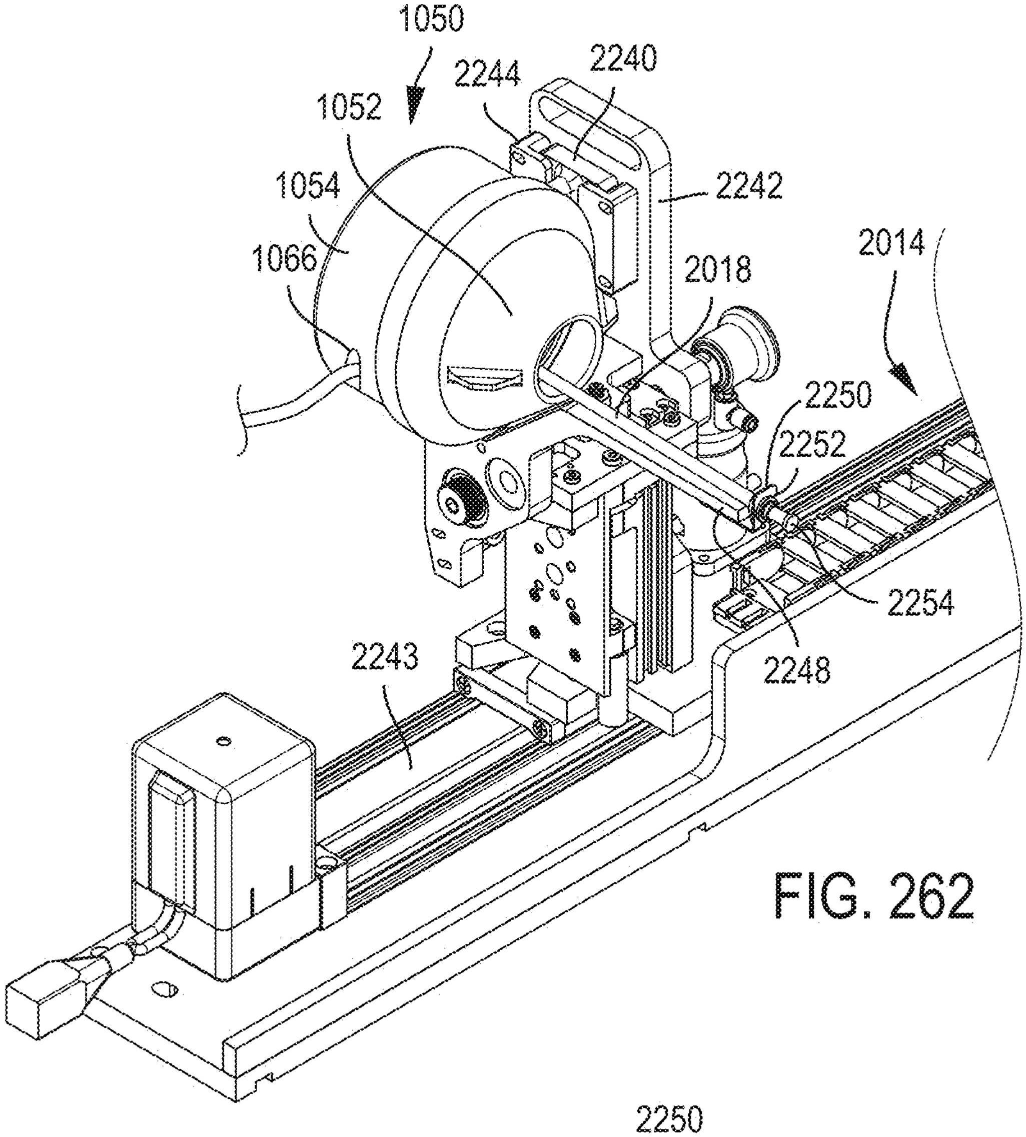
Figure 263:
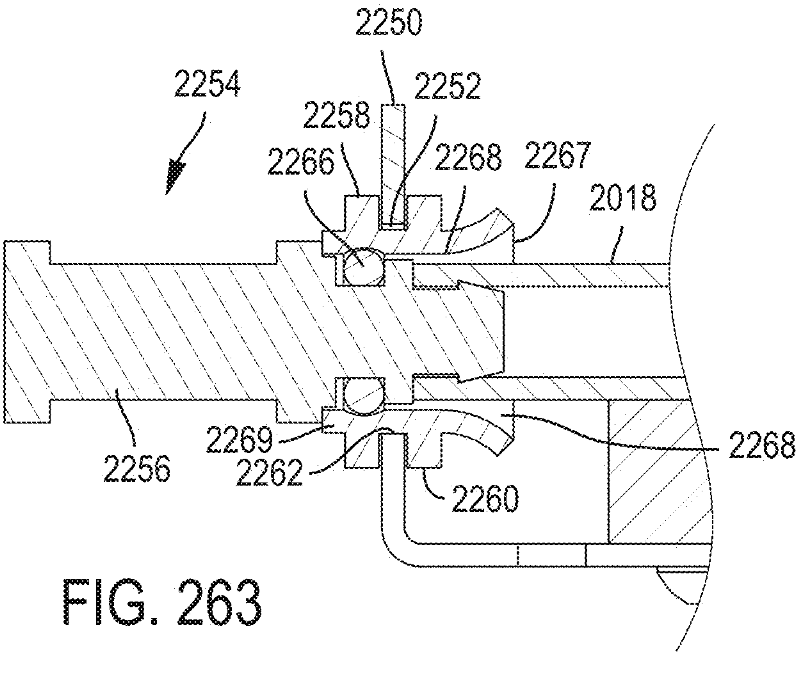
Figure 264:
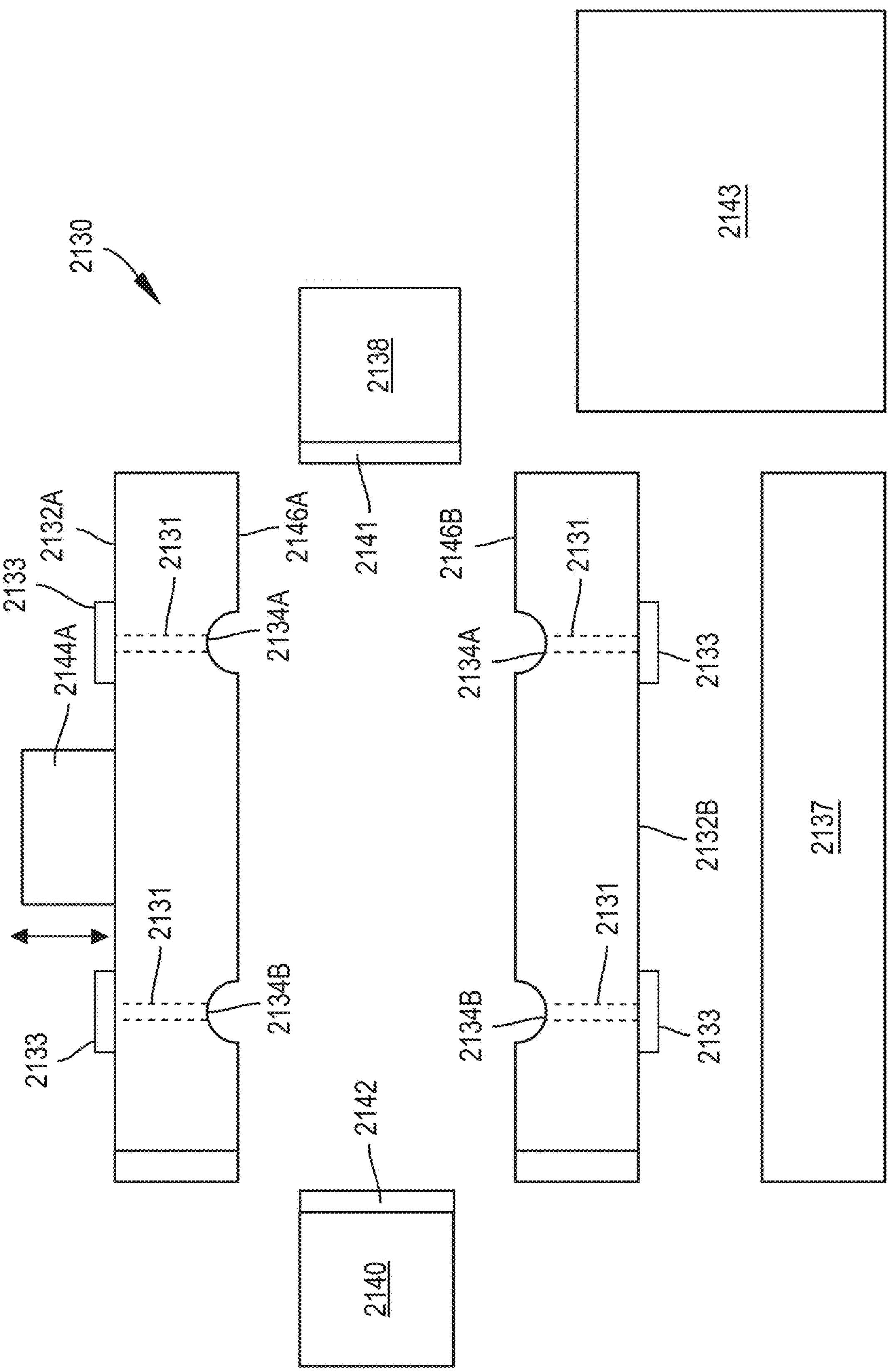
Figure 265:
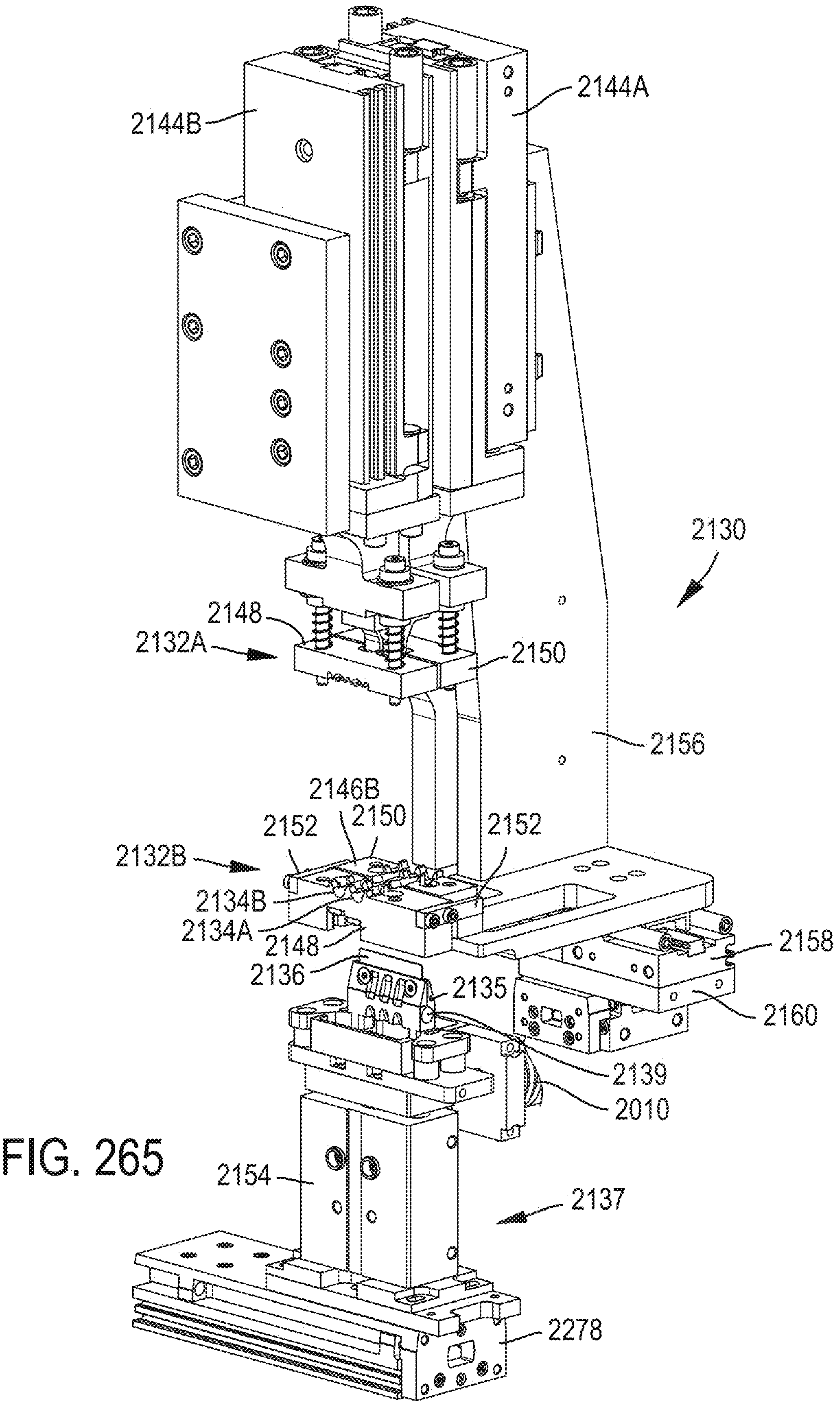
Figure 266:
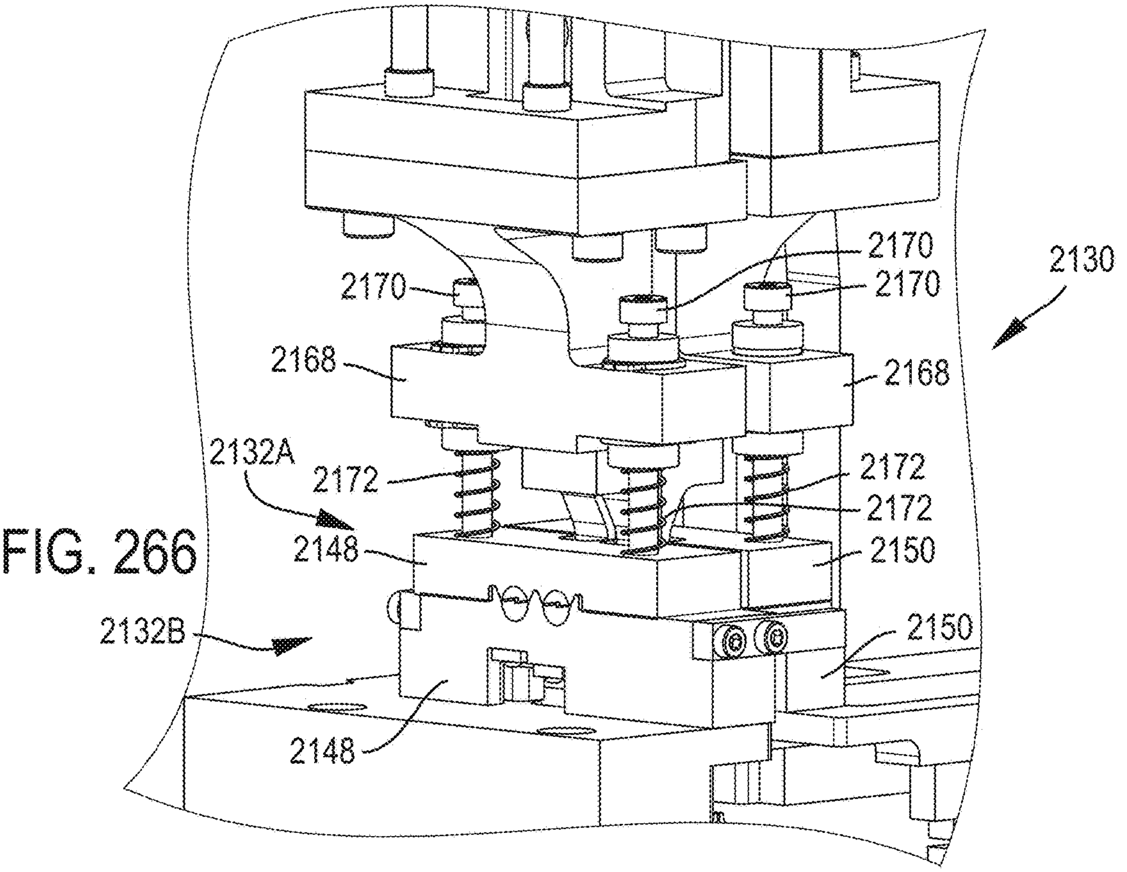
Figure 267:
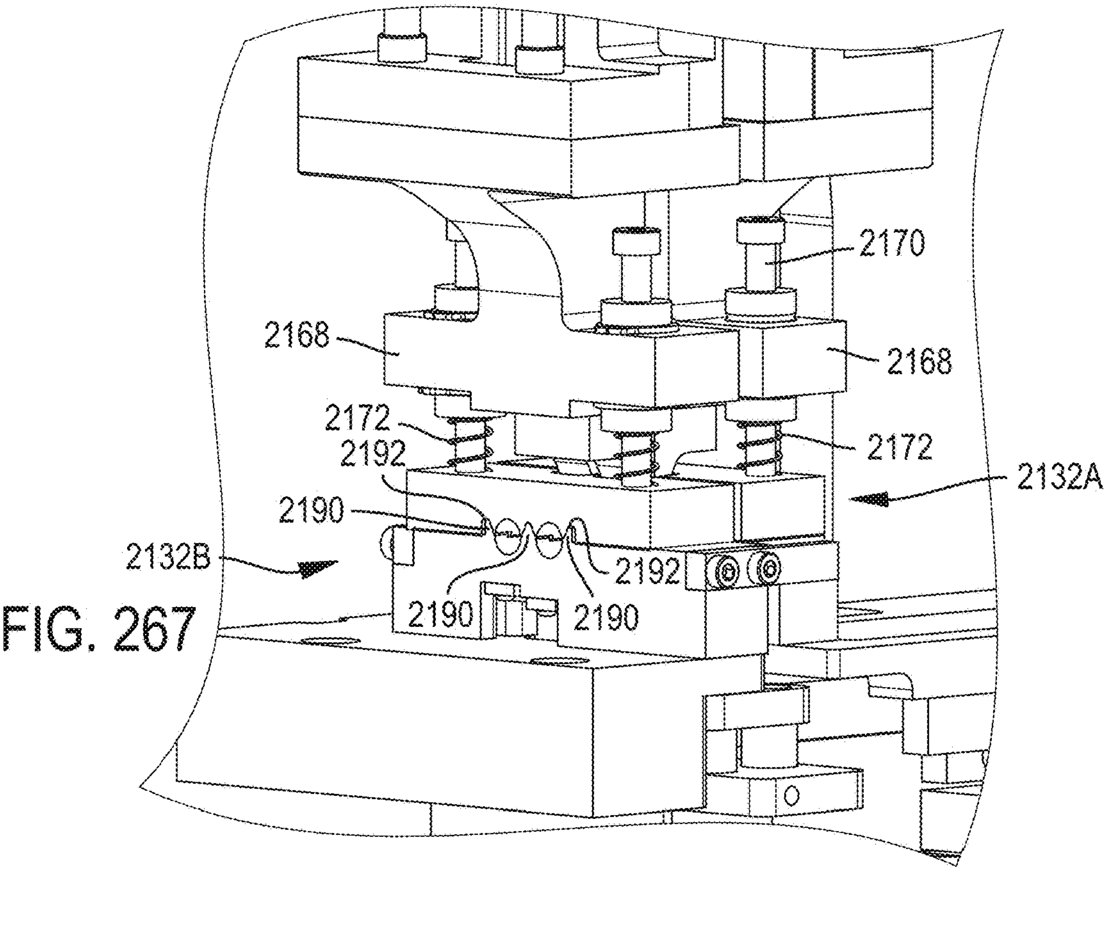
Figure 268:
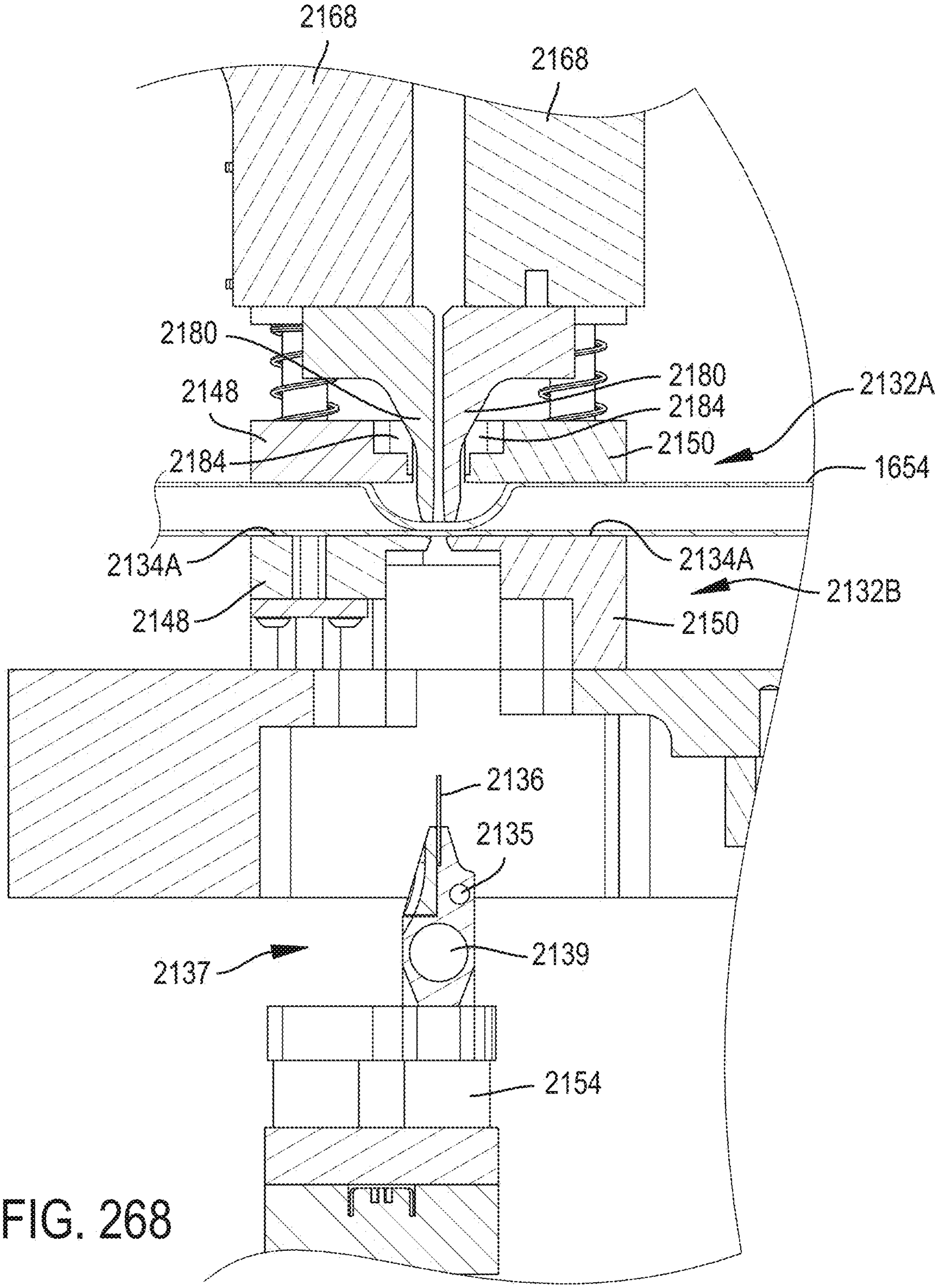
Figure 269:
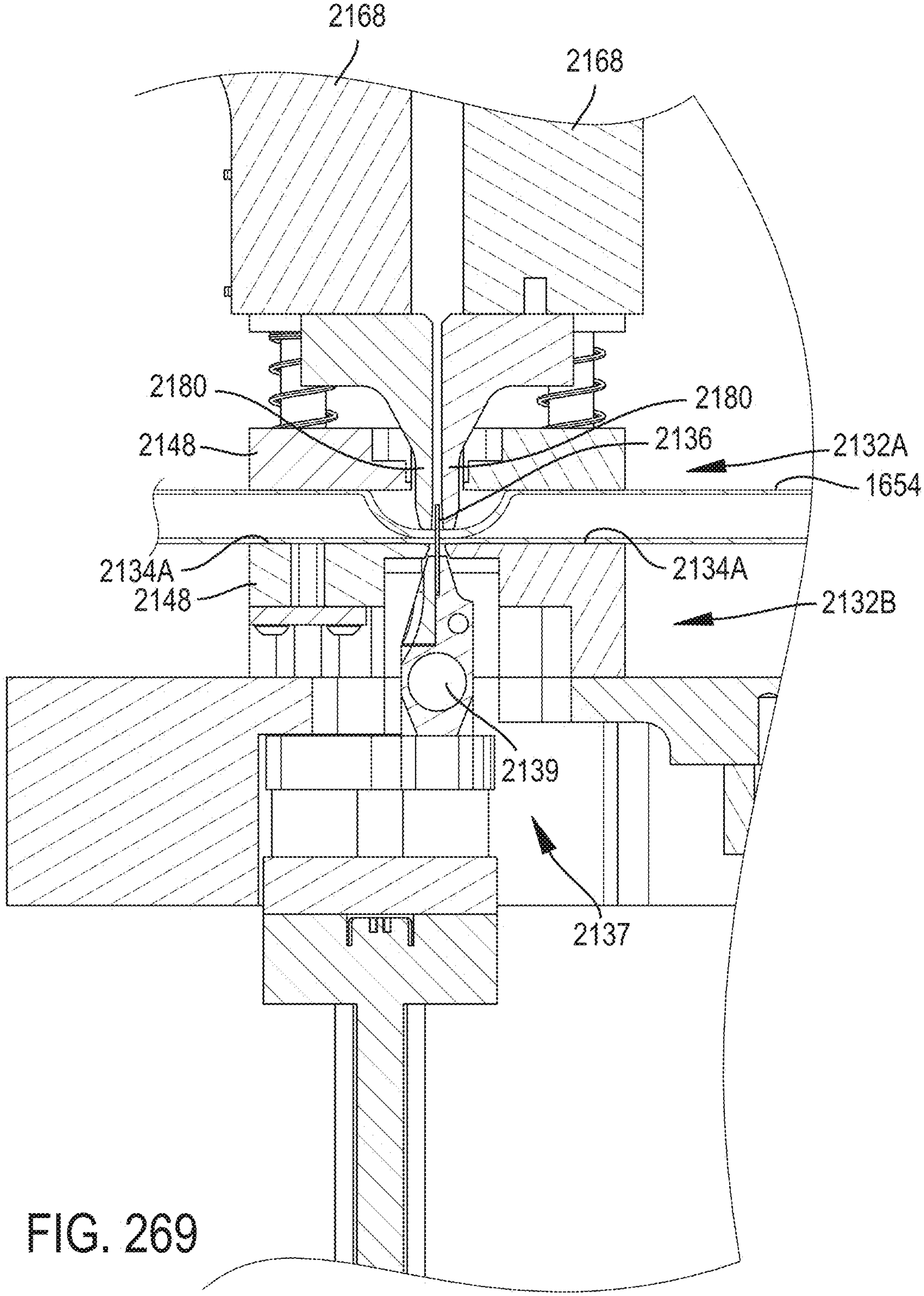
Figure 270:
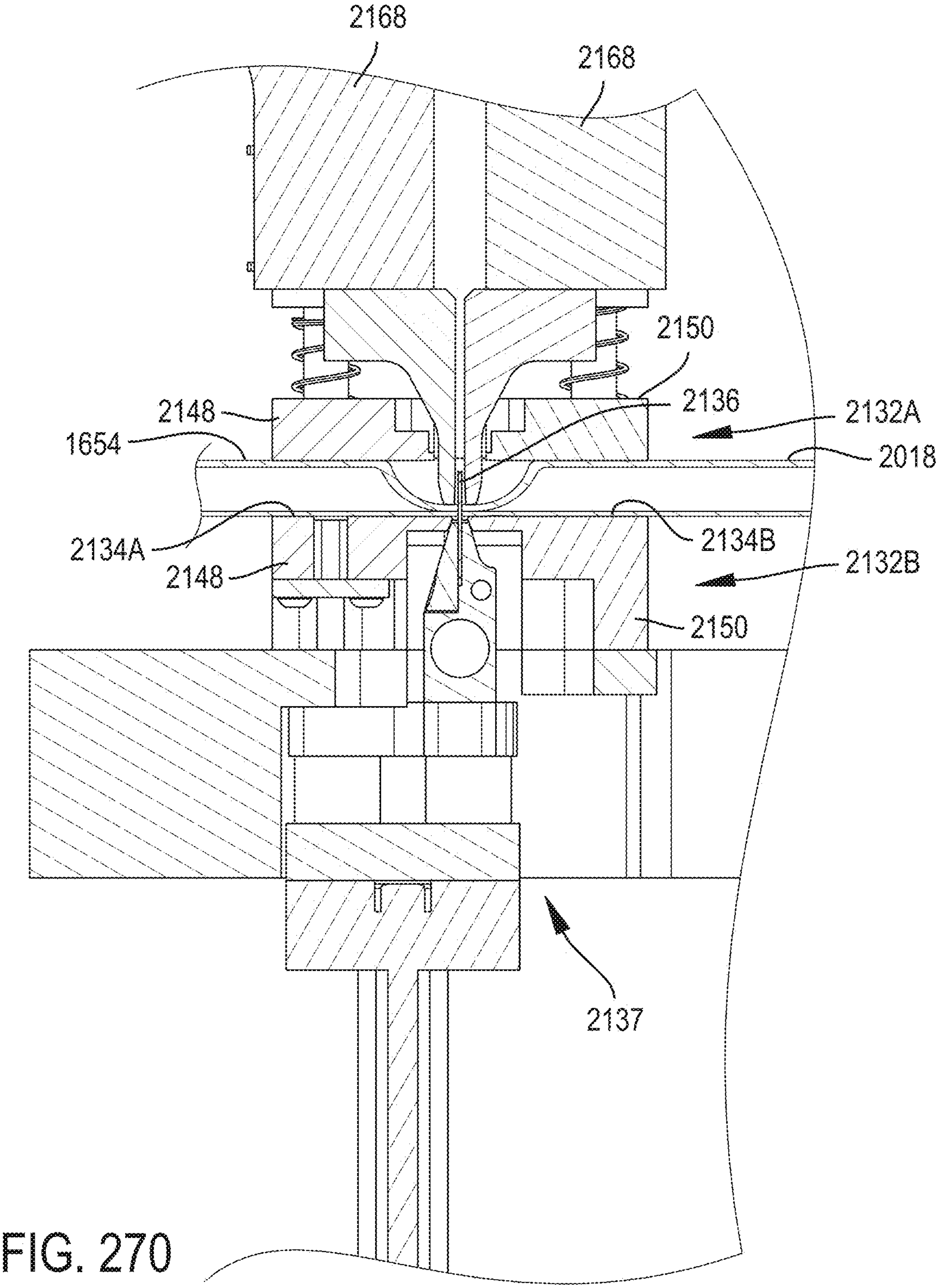
Figure 271:
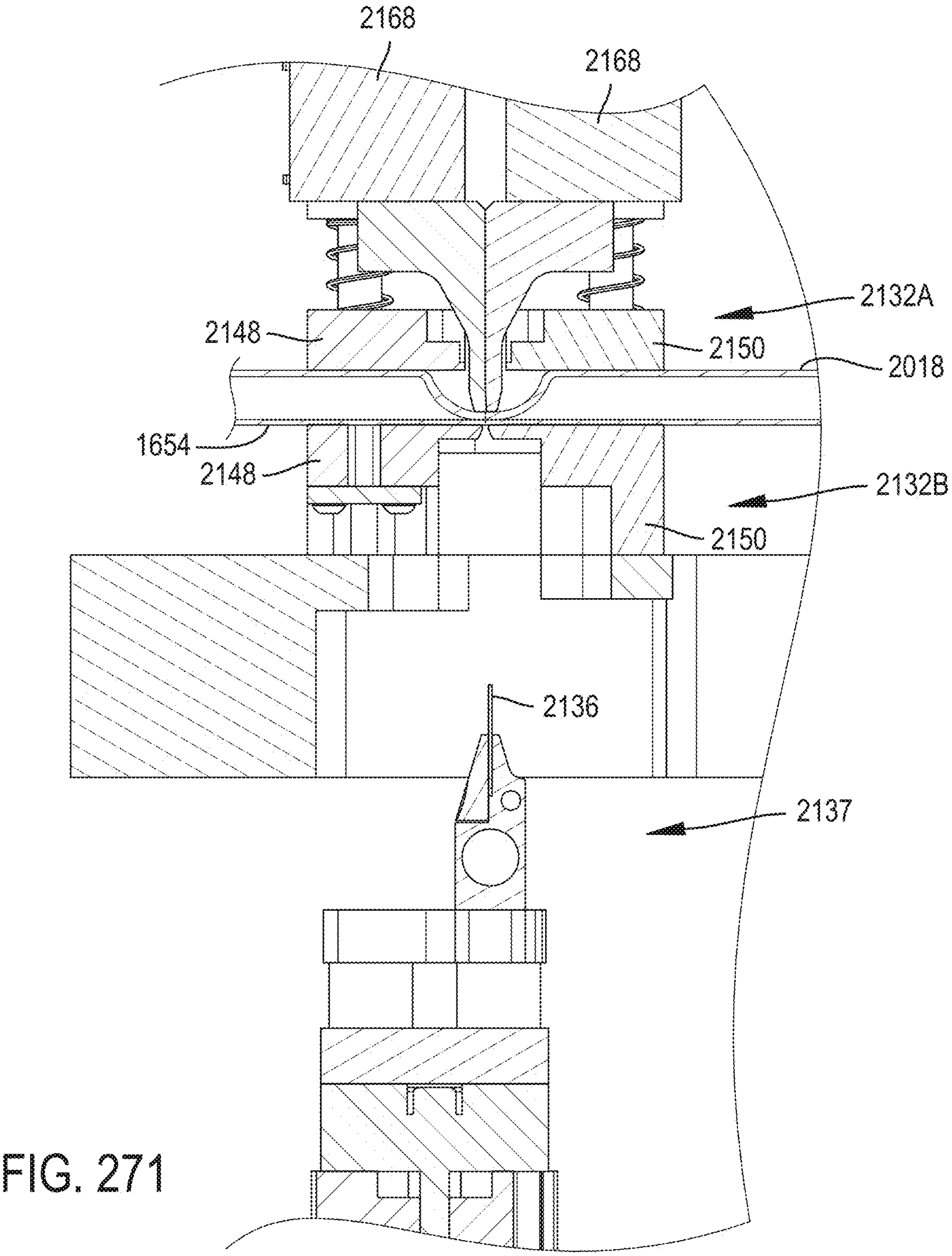
Figure 272:
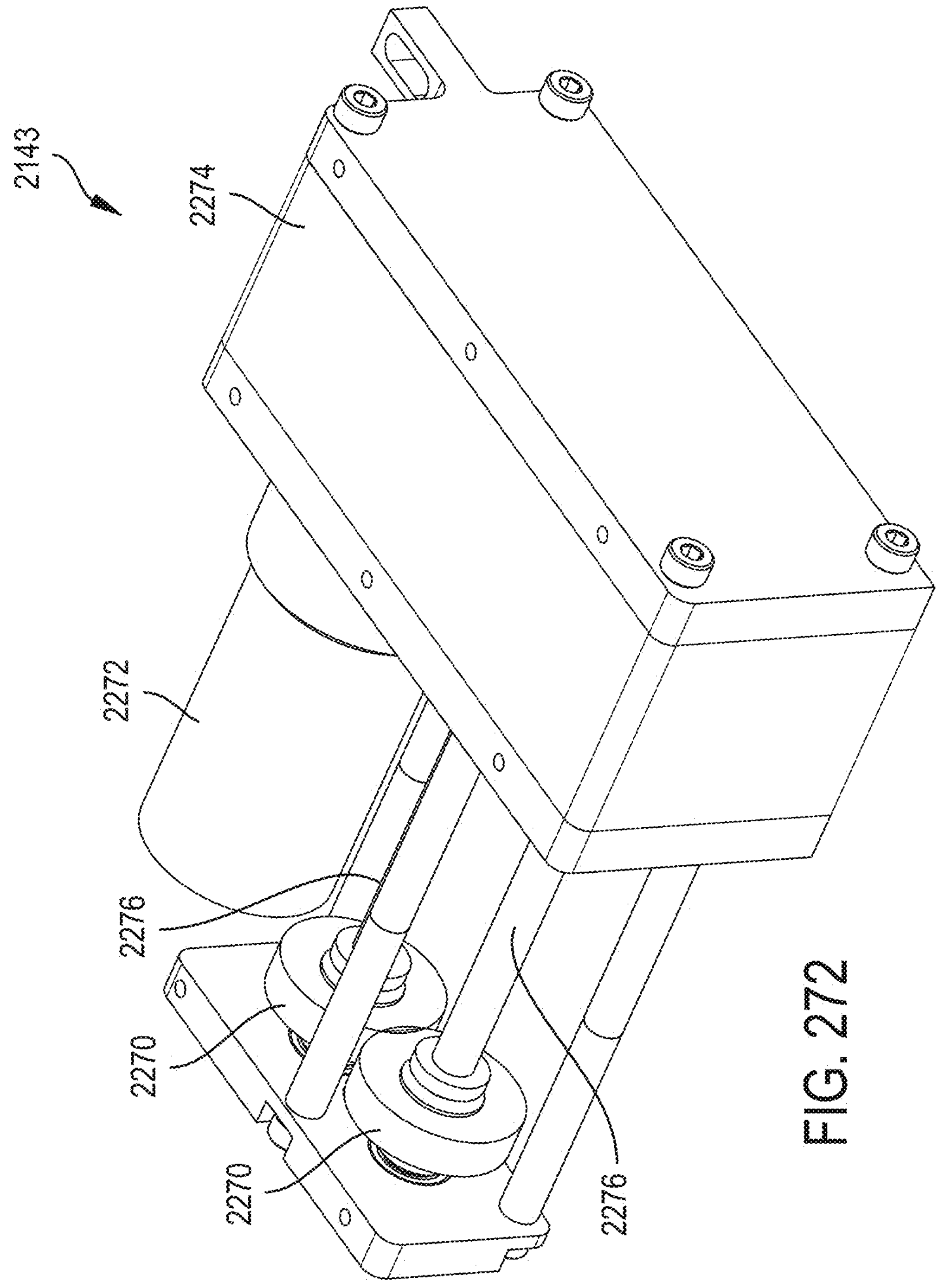
Figure 274:
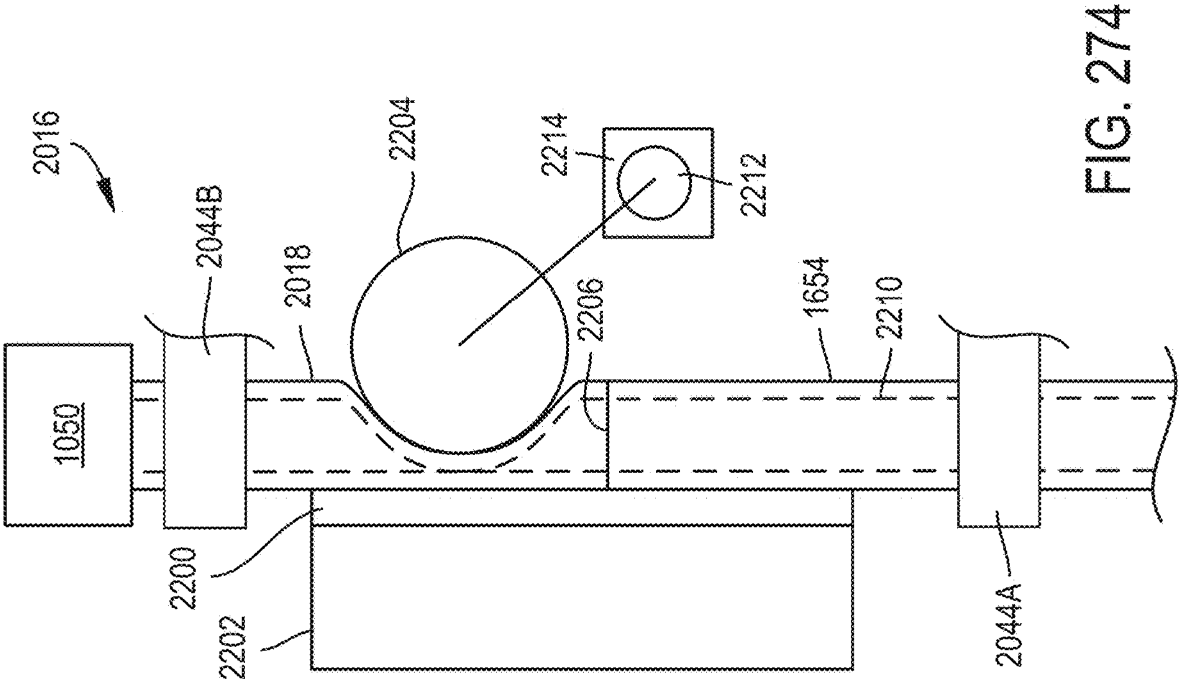
Figure 273:
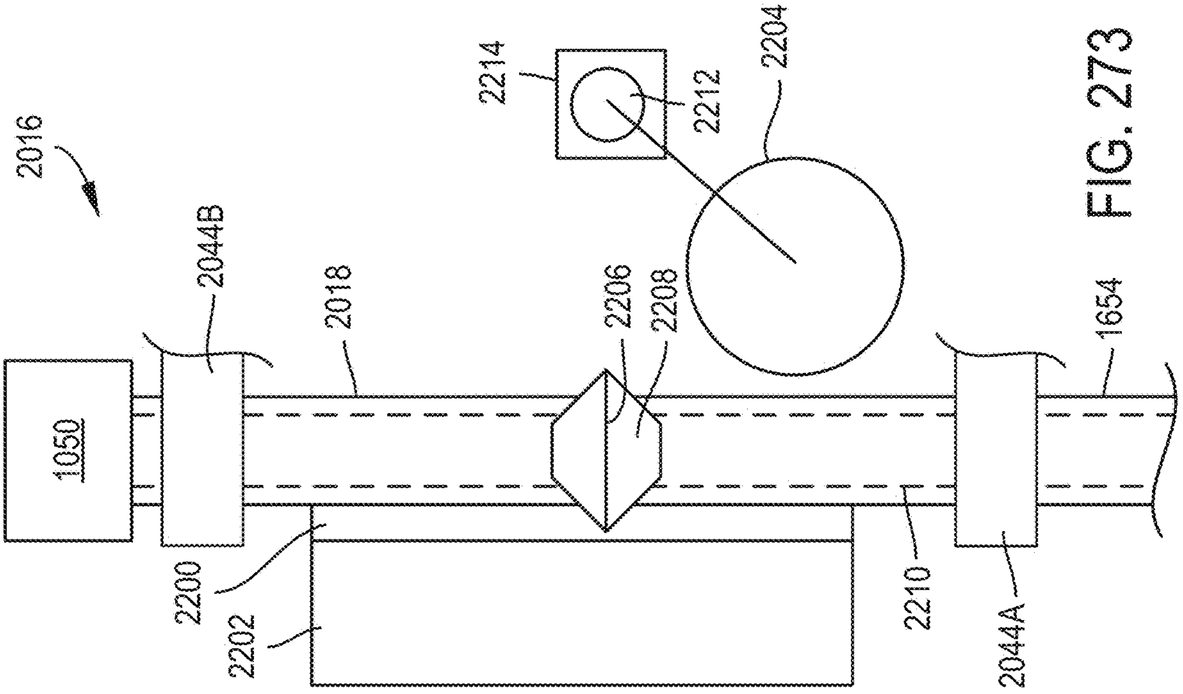
Figure 275:
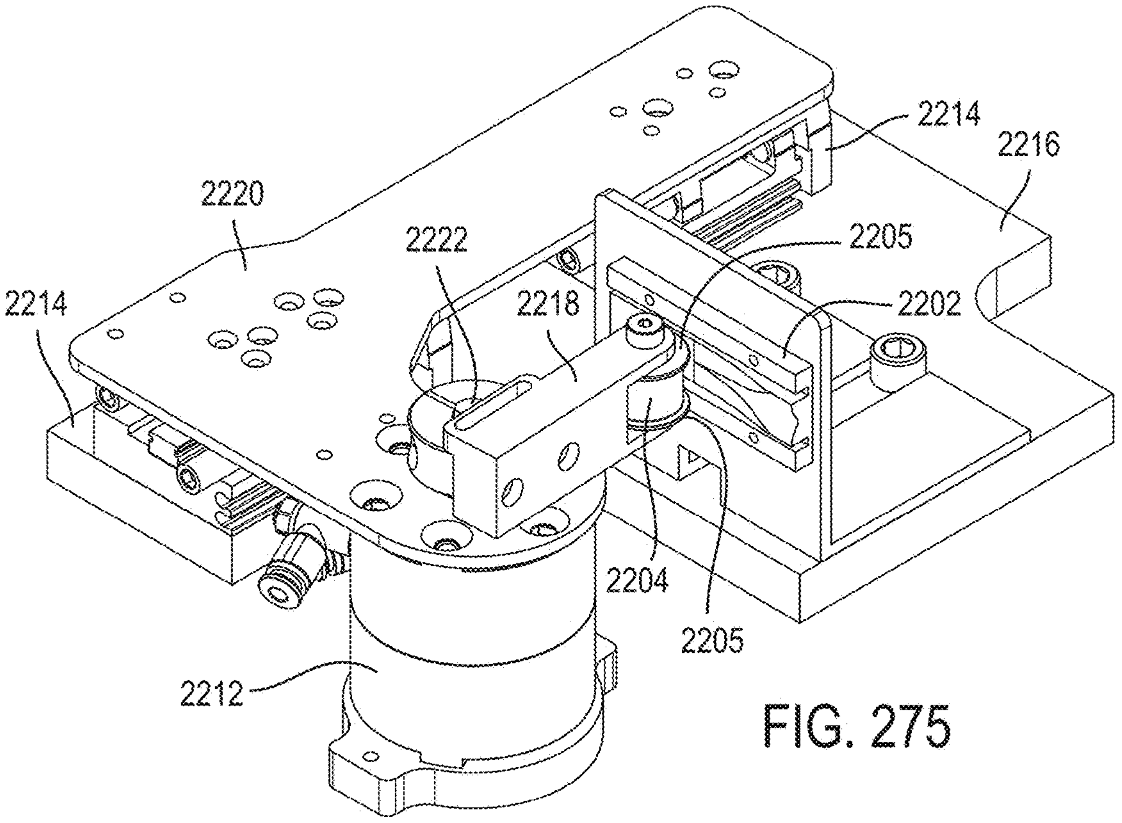
Figure 276:
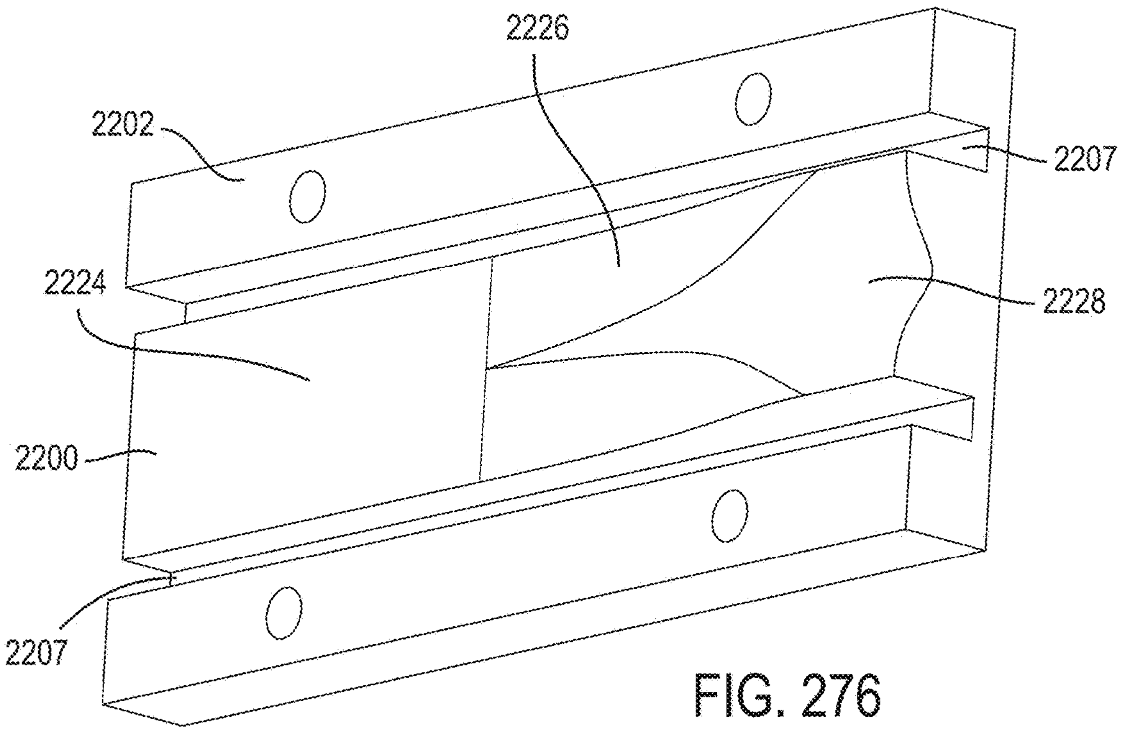
Figure 277:
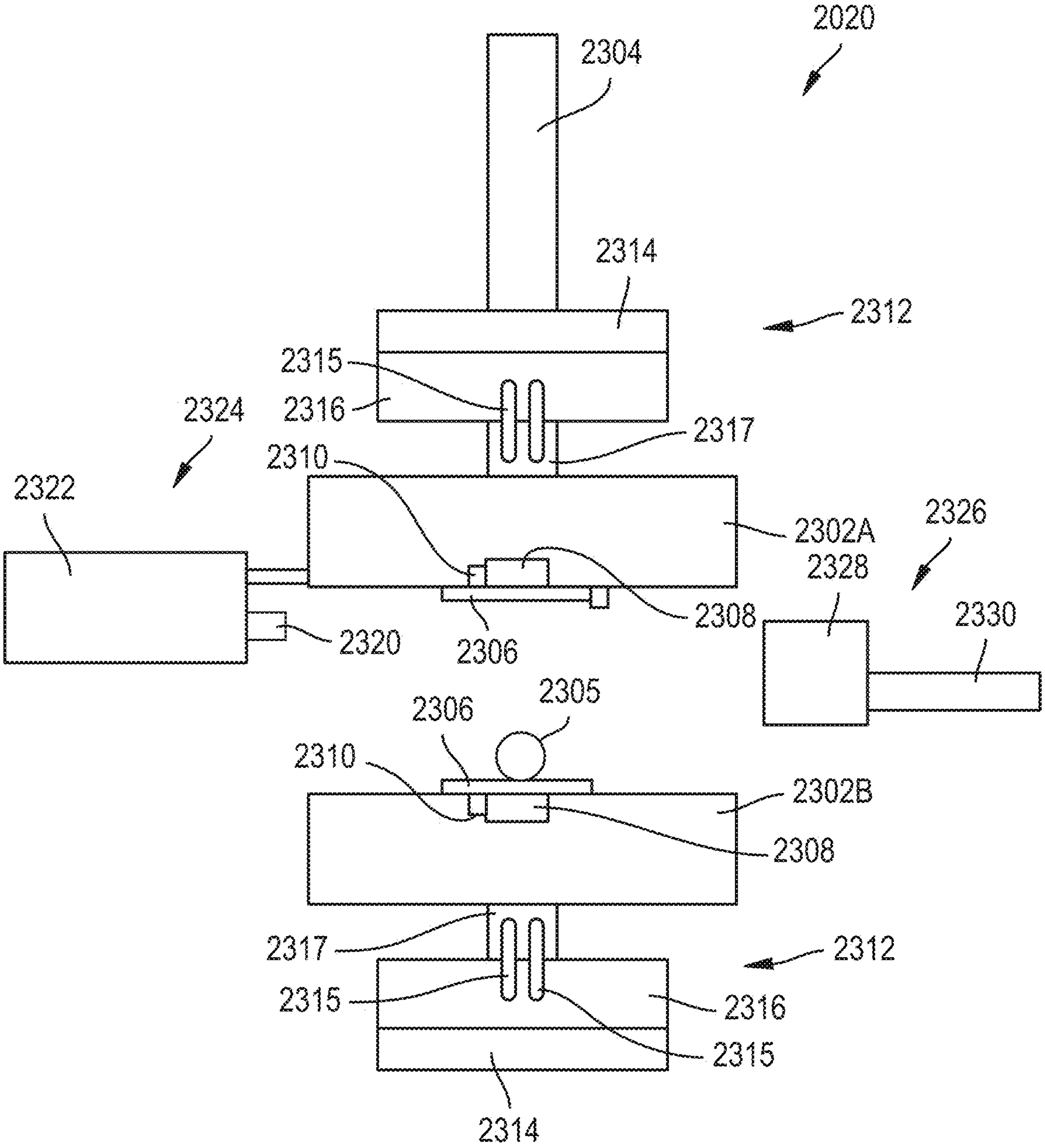
Figure 278:
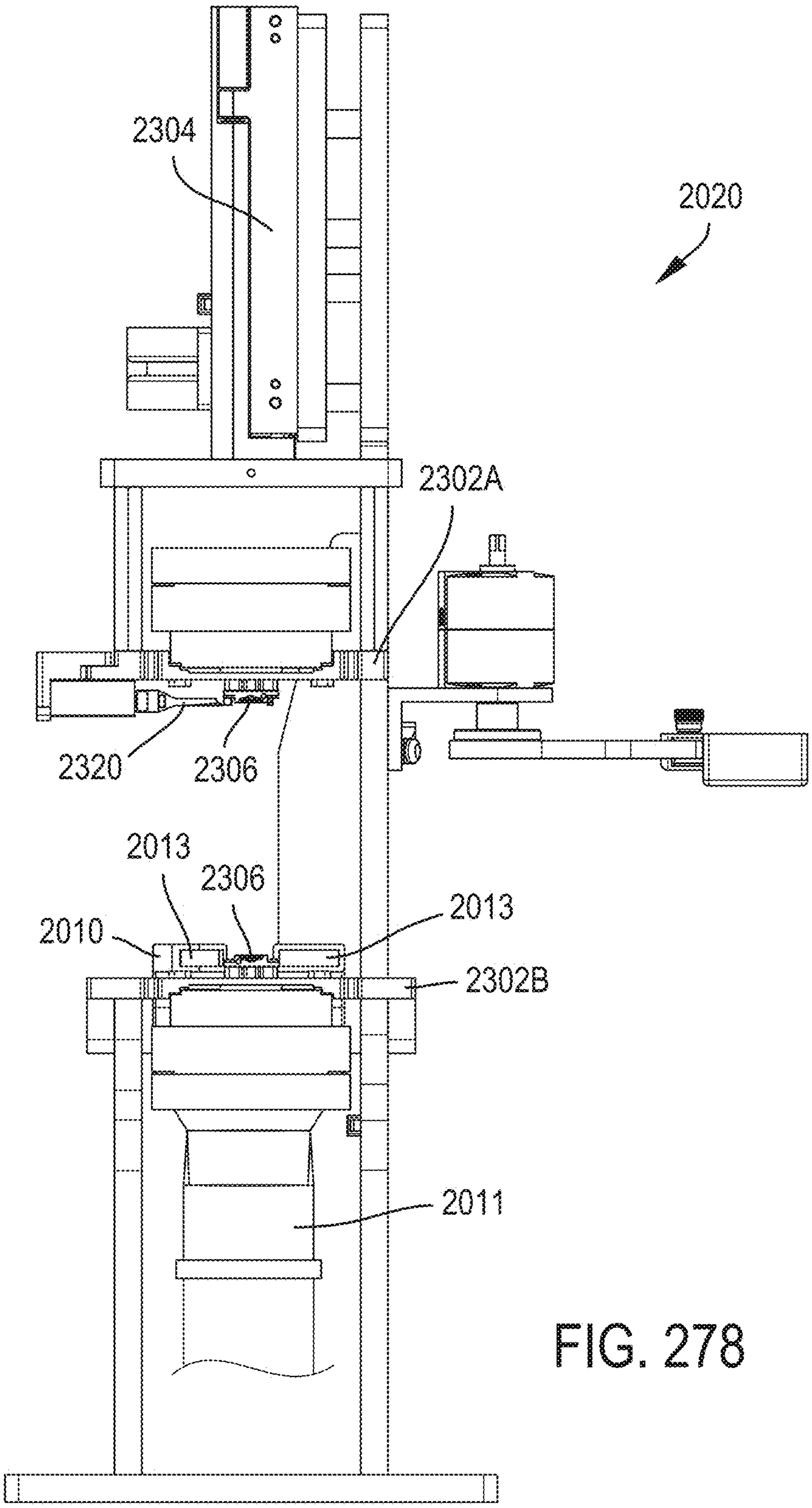
Figure 279:
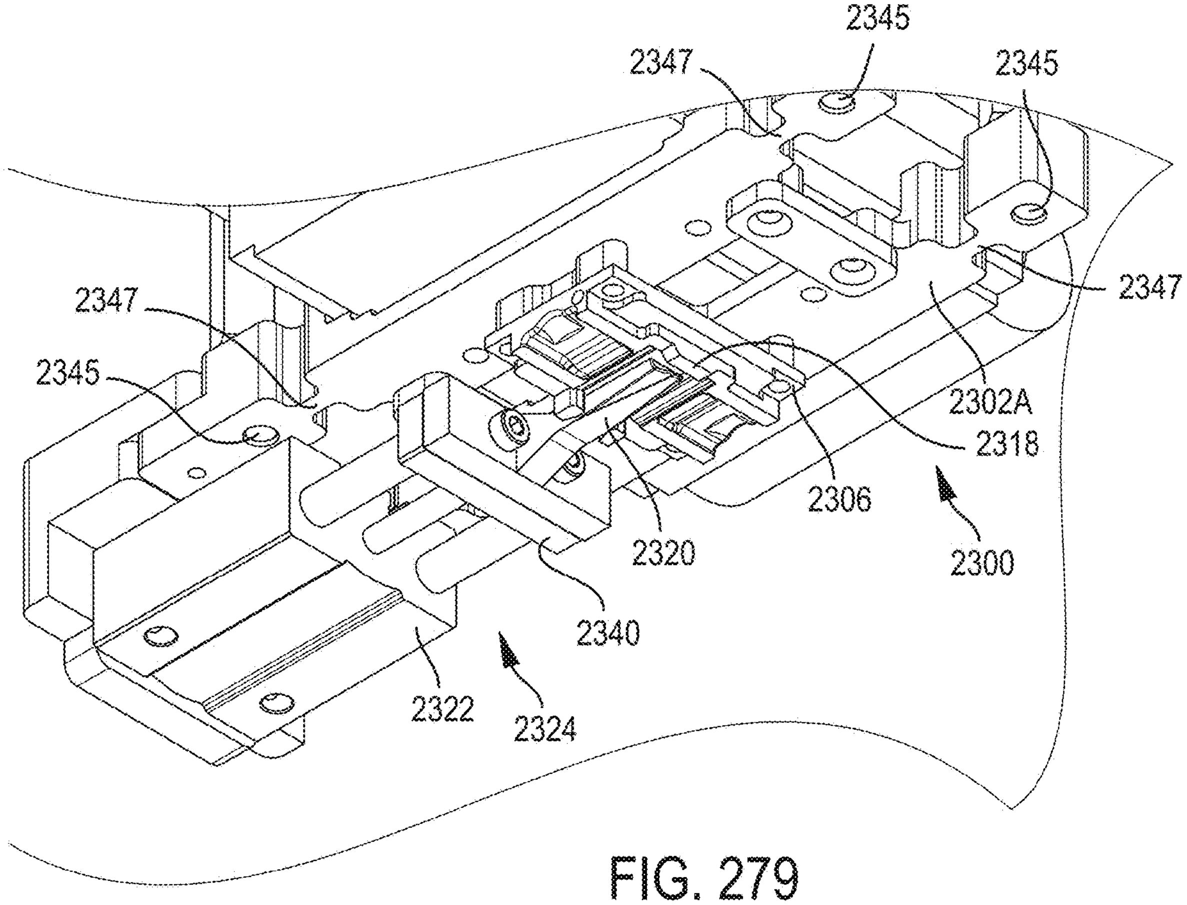
Figure 280:
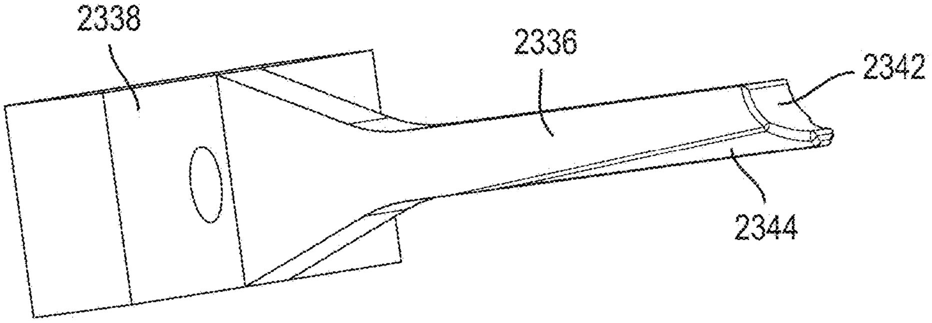
Figure 281:
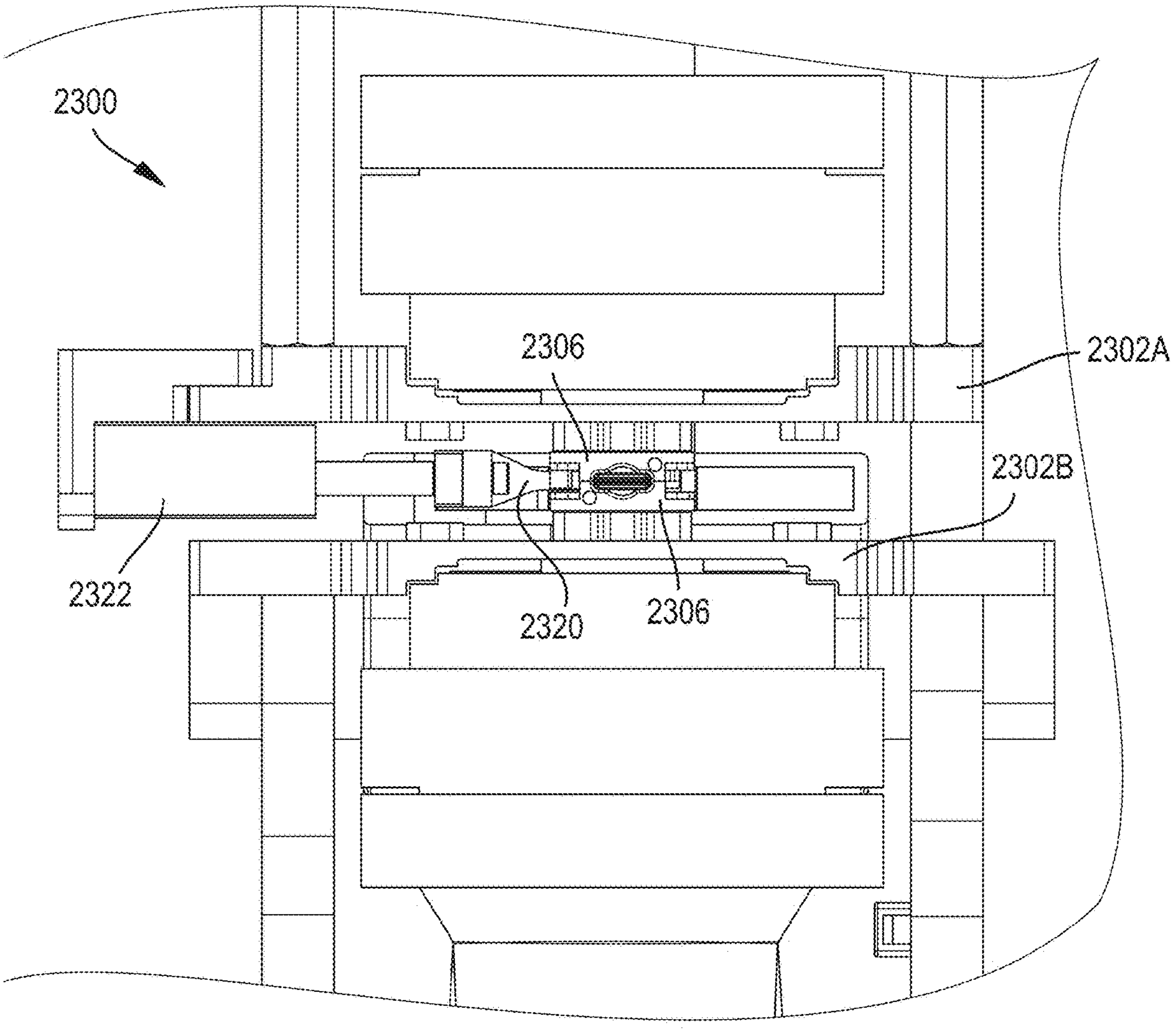
Figure 282:
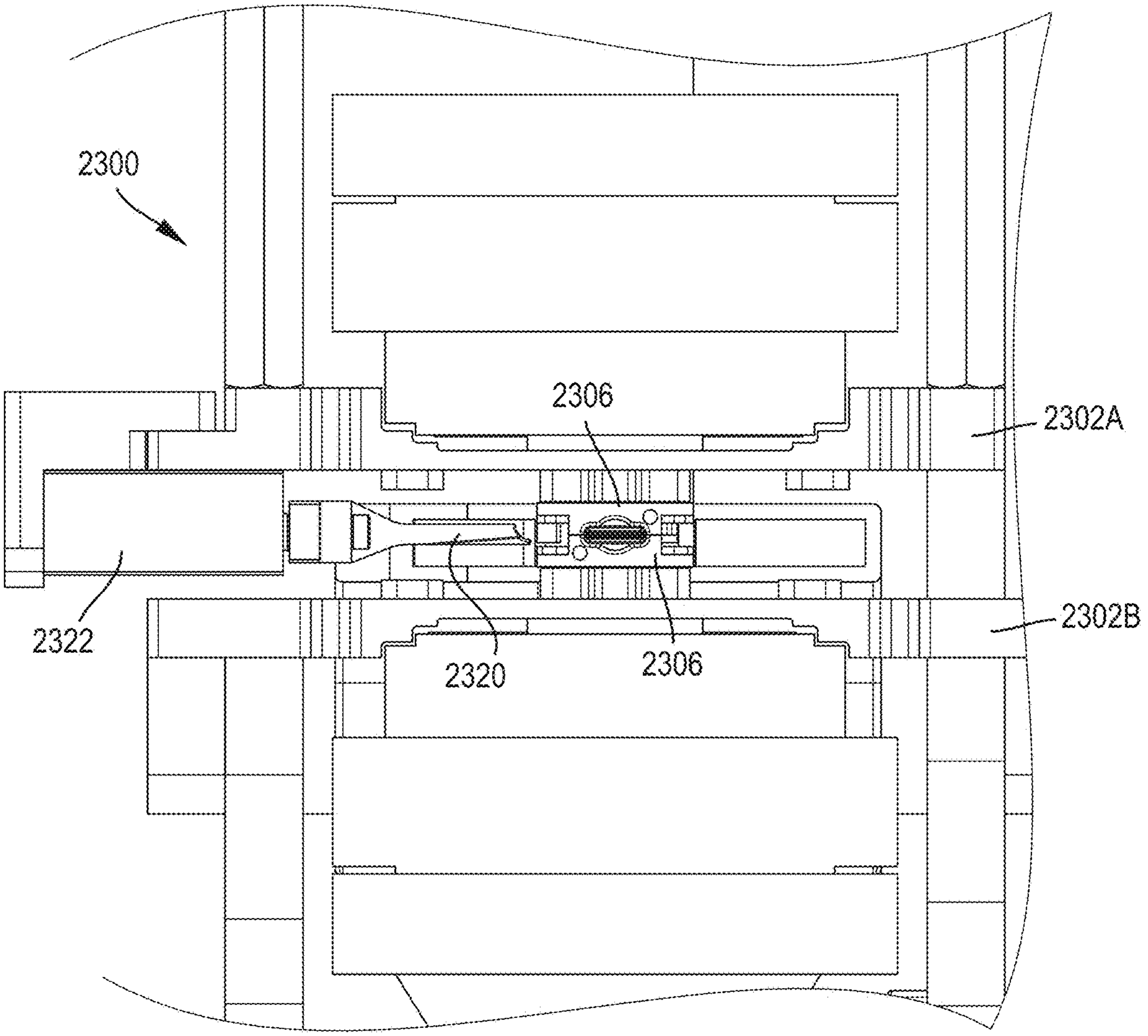
Figure 283:
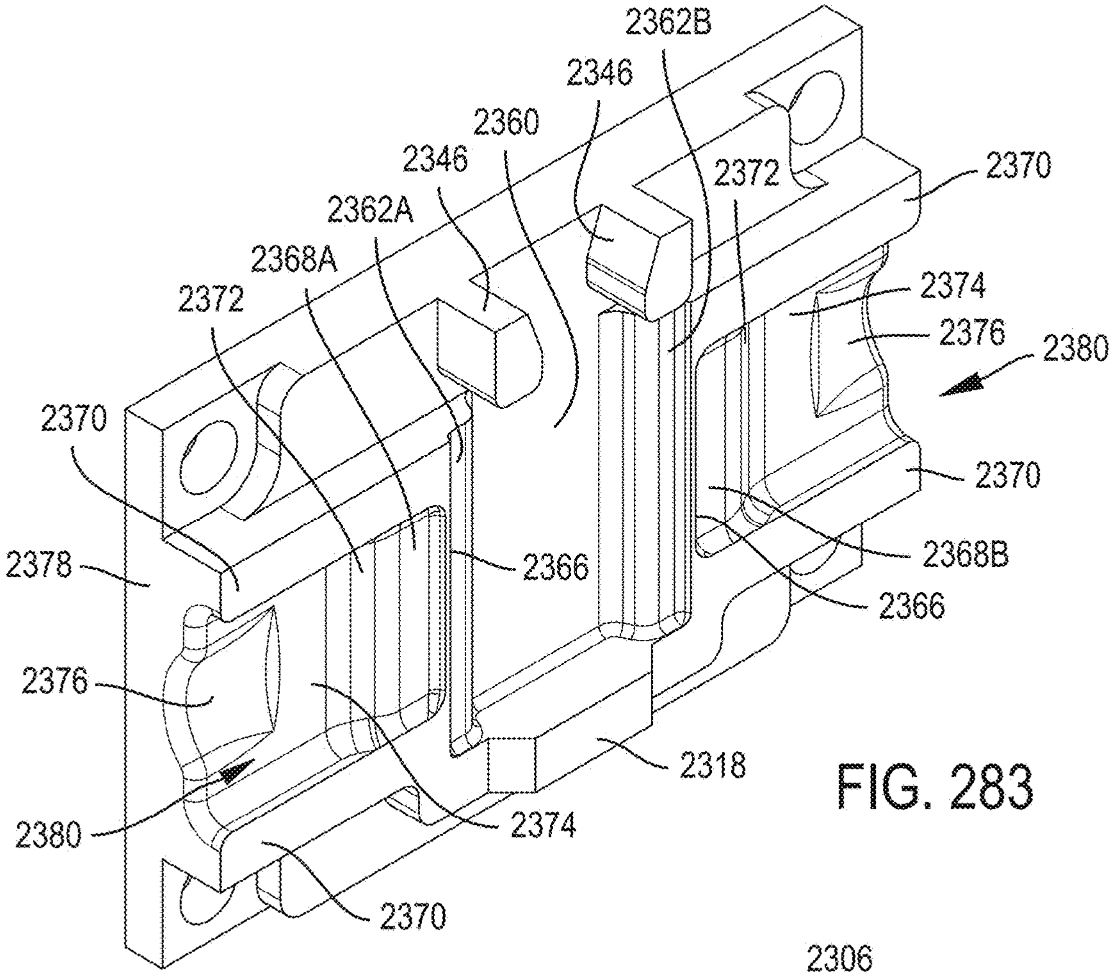
Figure 284:
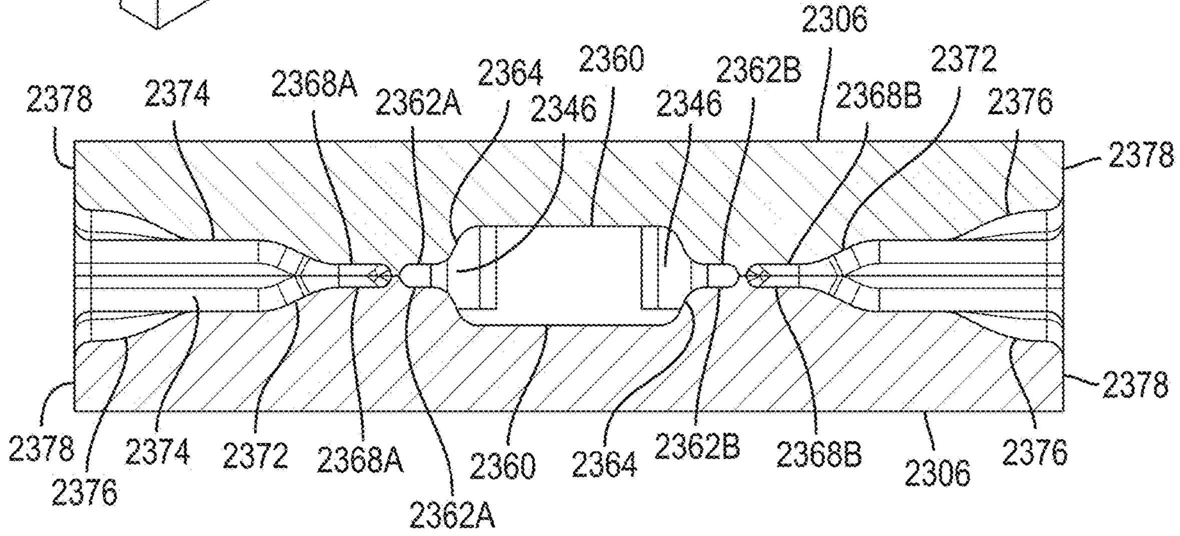
Figure 285A:
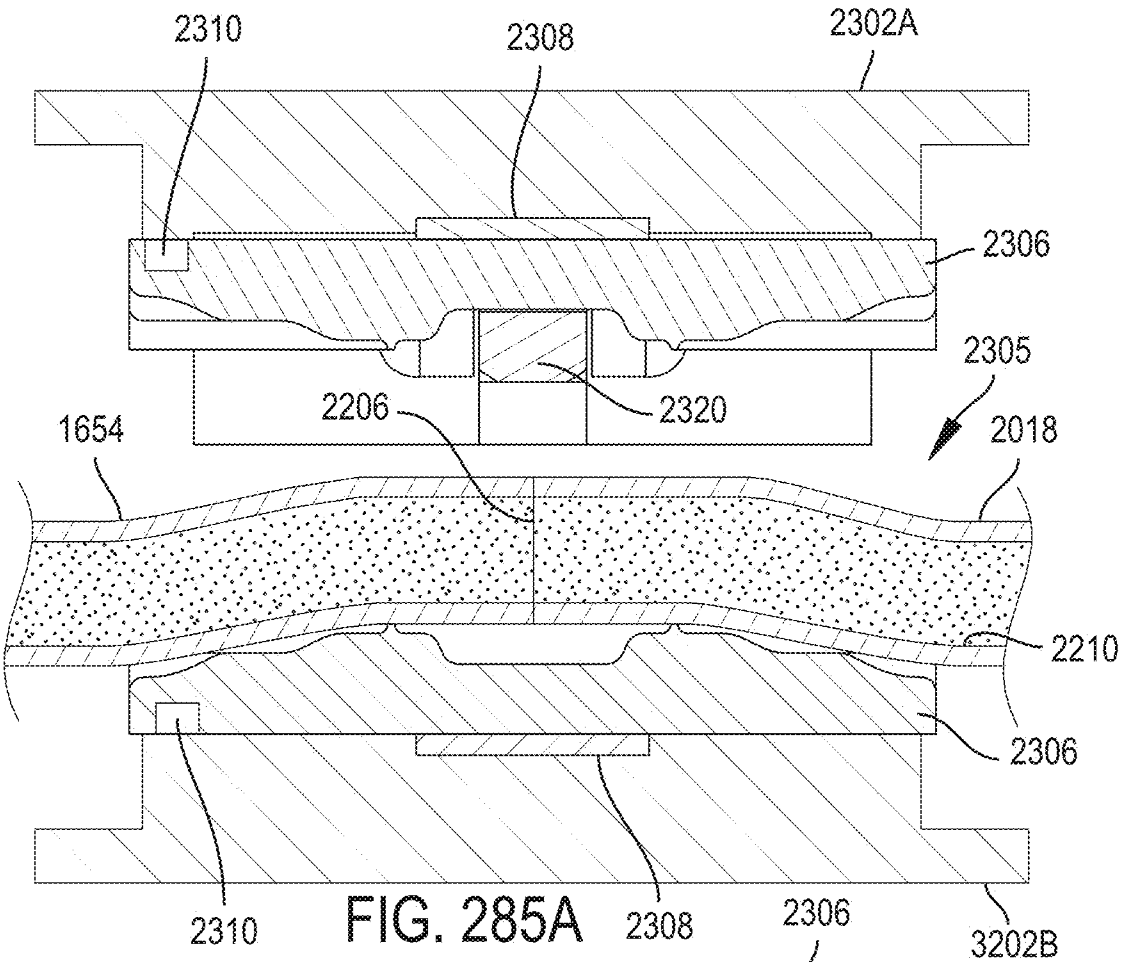
Figure 285B:
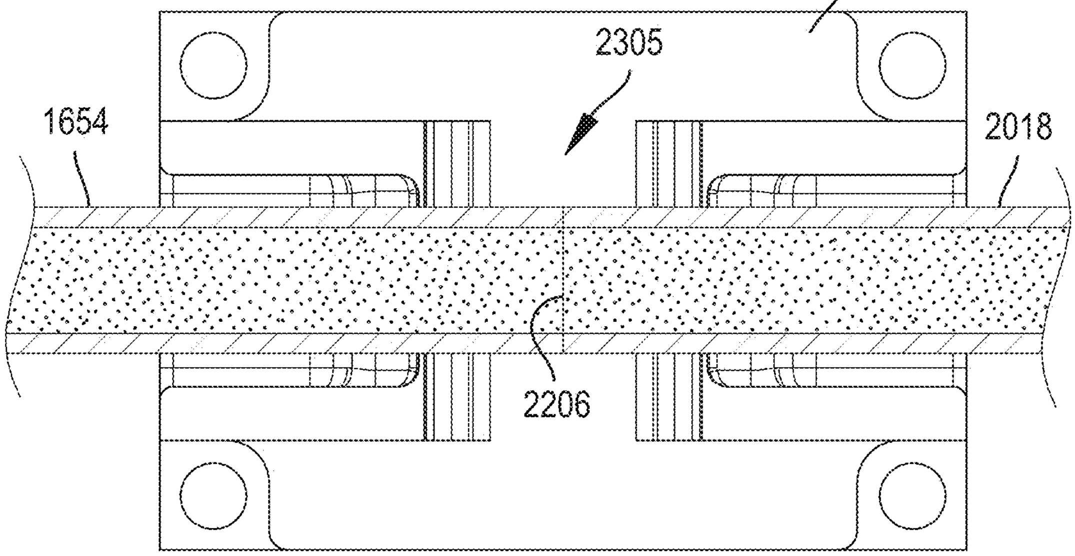
Figure 286A:
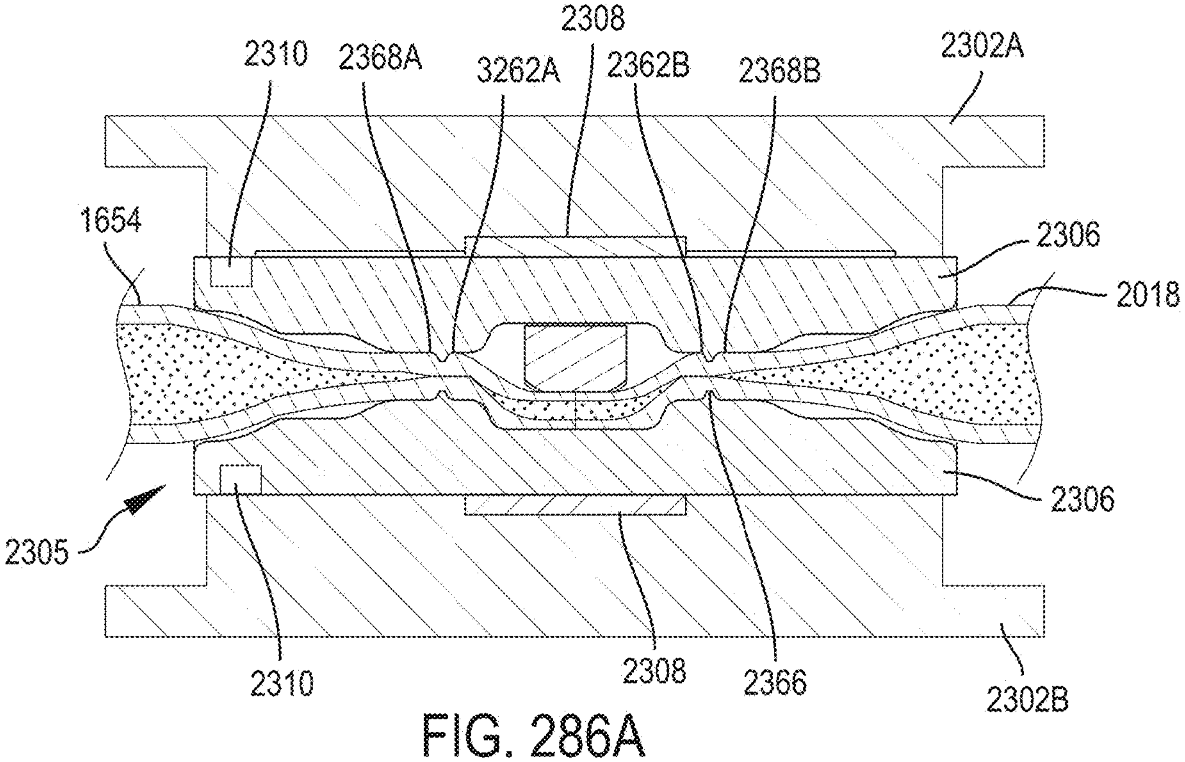
Figure 286B:
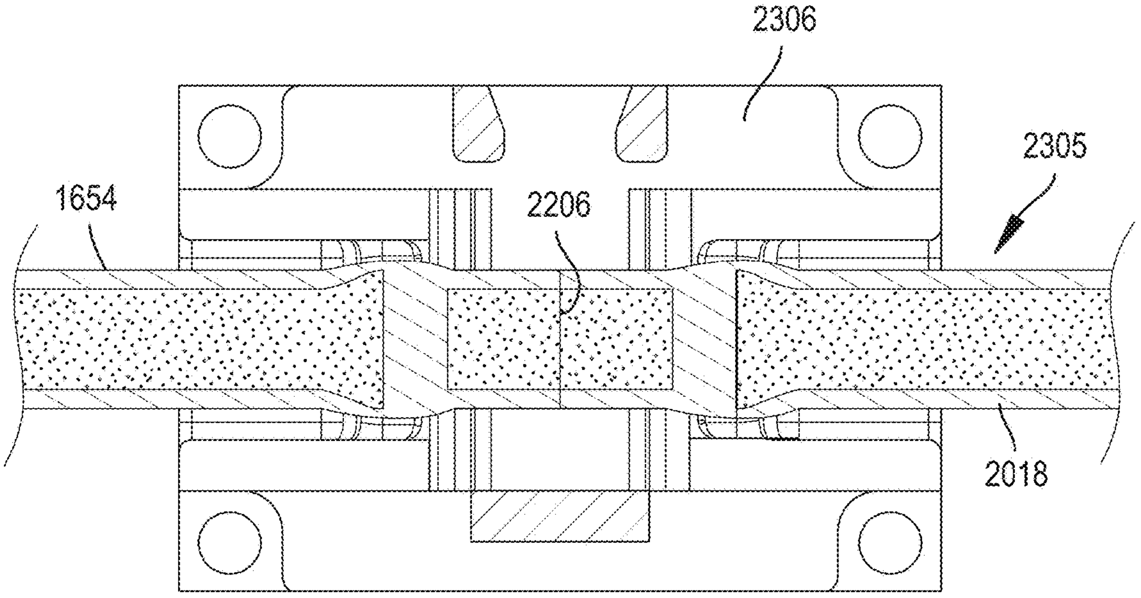
Figure 287A:
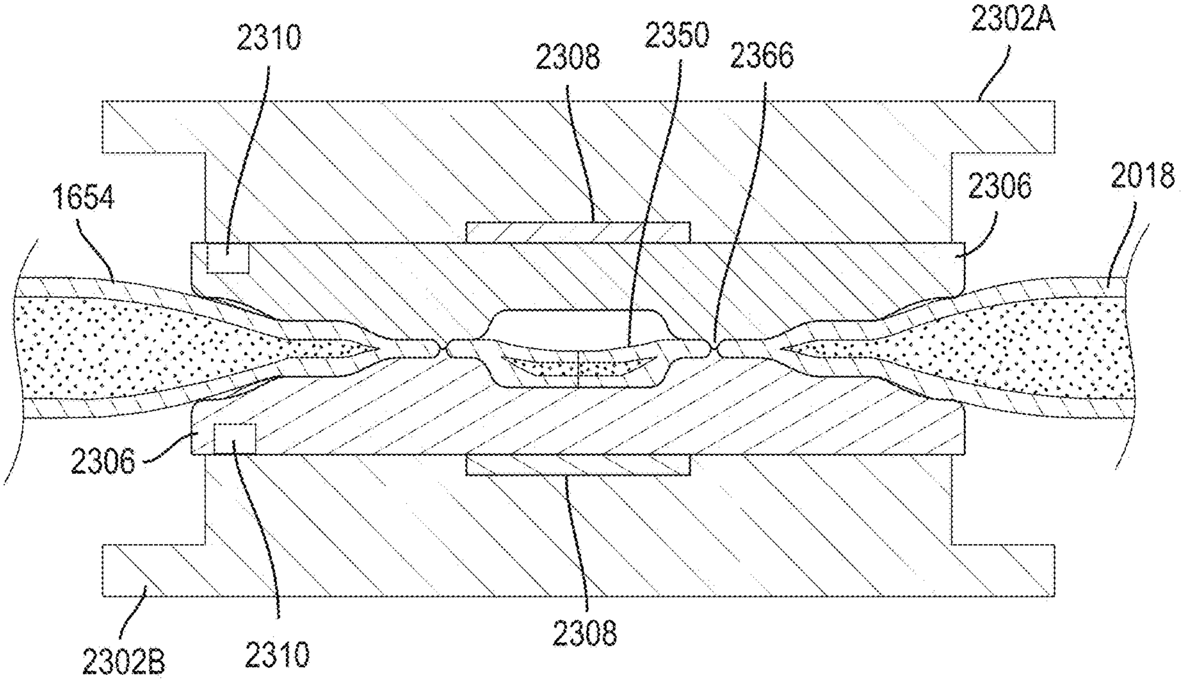
Figure 287B:
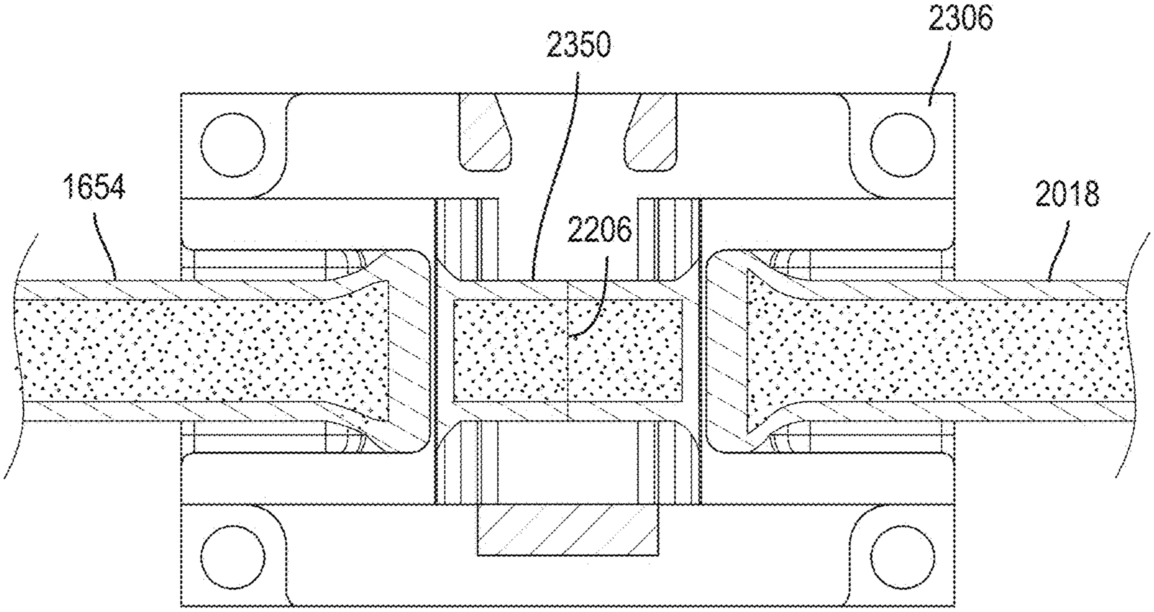
Figure 288:
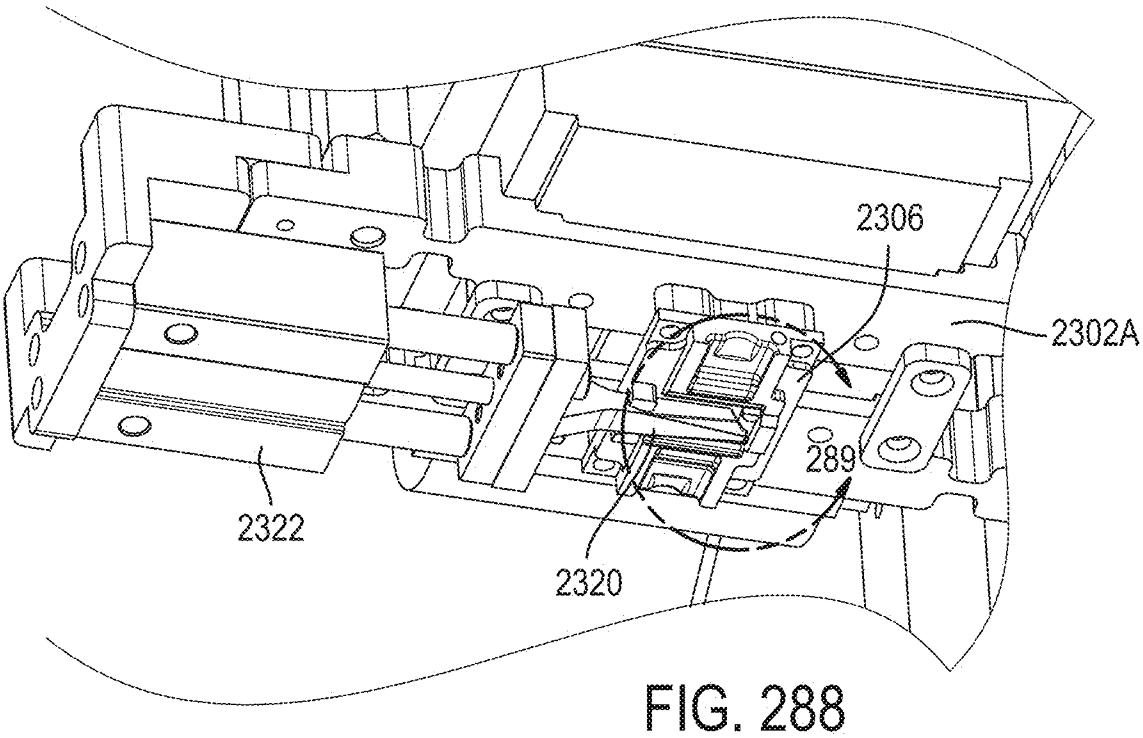
Figure 289:
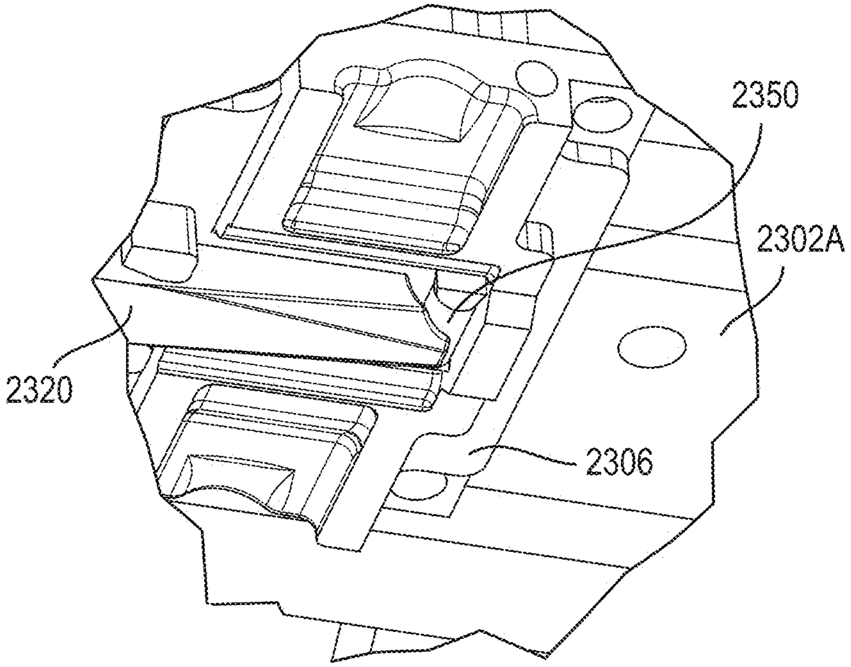
Figure 290:
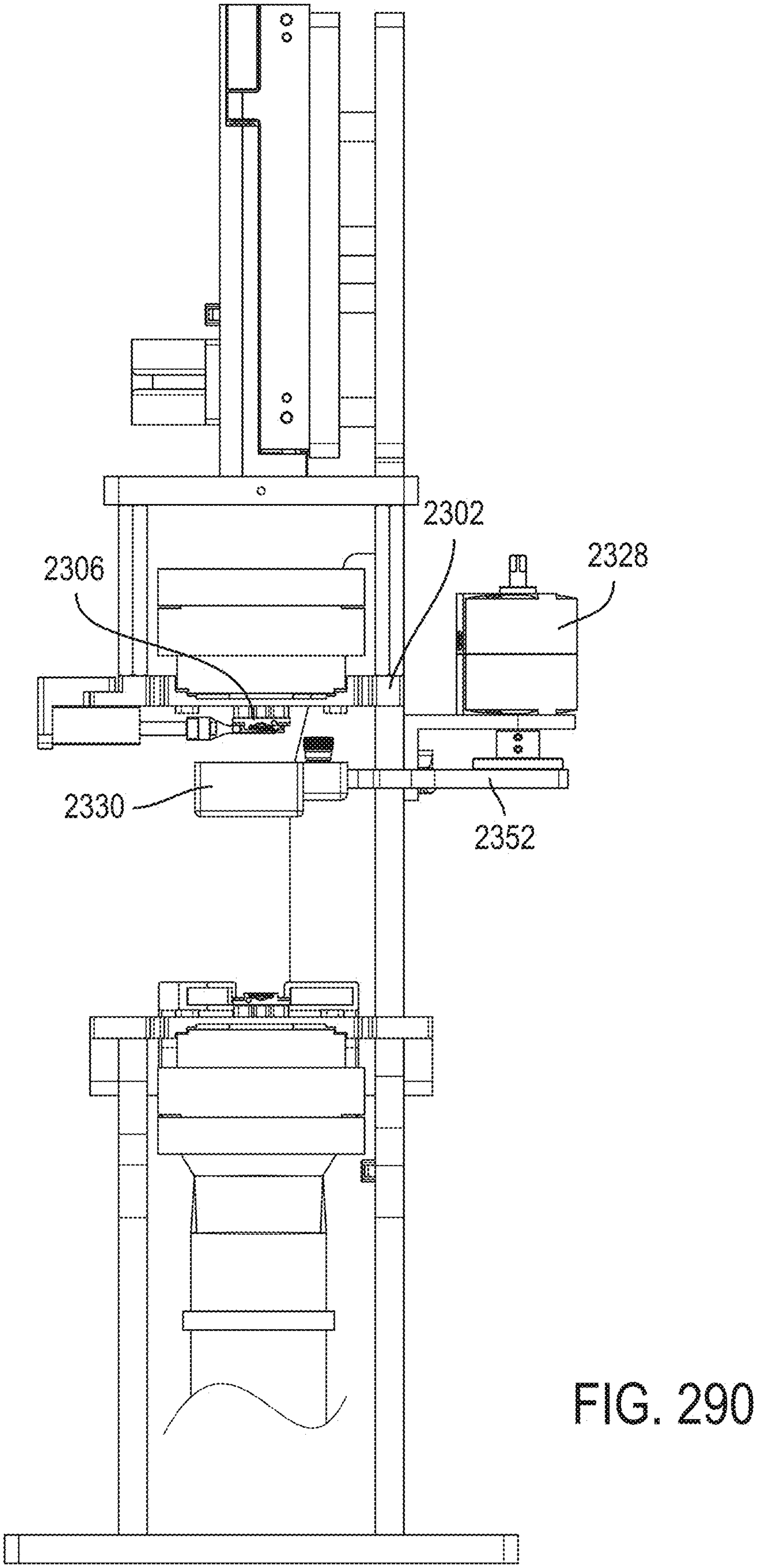
Figure 291:
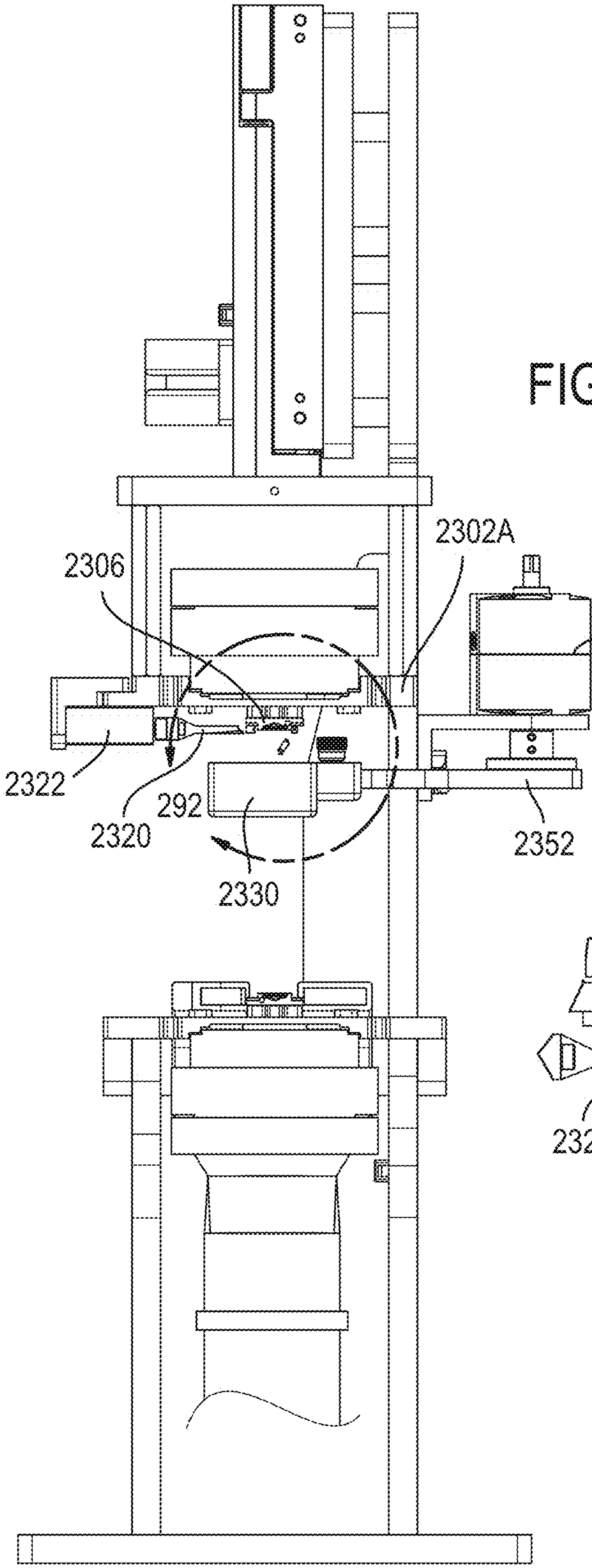
Figure 292:
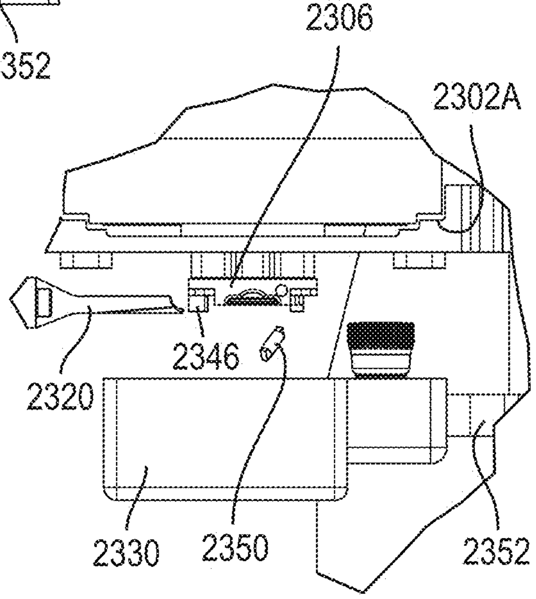

FIG. 200 depicts a perspective view of an example filling station;

FIG. 201 depicts another perspective view of an example filling station;

FIG. 202 depicts another perspective view of an example filling station;

FIG. 203 depicts a top down view of an example spike port which may be included in a filling station;

FIG. 204 depicts a block diagram of an example fluid circuit which may be included in an example system for producing and packaging a medical fluid;

FIG. 205 depicts a block diagram of an exemplary mixing circuit;

FIG. 206 depicts a cross-sectional view of an example mixing portion of a mixing circuit;

FIG. 207 depicts a top down view of an example constituent container;

FIG. 208 depicts a cross-sectional view of the example constituent container of FIG. 207 taken at the indicated cut plane of FIG. 207;

FIG. 209 depicts a top down view of an example inlet port which may be included in a constituent container;

FIG. 210 depicts a cross-sectional view of the example inlet port of FIG. 209 taken at the indicated cut plane of FIG. 209;

FIG. 211 depicts a cross-section view of an example inlet port in alignment with an inlet port receptacle of an example manifold;

FIG. 212 depicts a cross-sectional view of an example inlet port in a partially installed or unspiked position within an inlet port receptacle of an example manifold;

FIG. 213 depicts a cross-sectional view of an example inlet port in a fully installed or spiked position within an example inlet port receptacle of an example manifold;

FIG. 214 depicts a perspective view of a constituent container docked on an actuation assembly which may be operated to displaced the constituent container;

FIG. 215 depicts a flowchart detailing a number of example action which may be executed to generate a desired fluid;

FIG. 216 depicts a portion of an example mixing circuit including an example crystalline constituent dispenser;

FIG. 217 depicts a dosing manifold of which may be included in an example mixing circuit;

FIG. 218 depicts a perspective view of an example crystalline constituent dispenser;

FIG. 219 depicts the example crystalline constituent dispenser of FIG. 218 with a portion broken away to shown internal components of the crystalline constituent dispenser;

FIG. 220 depicts a perspective view of an example crystalline constituent dispenser;

FIG. 221 depicts the example crystalline constituent dispenser of FIG. 220 with a portion broken away to shown internal components of the crystalline constituent dispenser;

FIG. 222 depicts a perspective view of an exemplary paddle wheel which may be included an example crystalline constituent dispenser;

FIG. 223 depicts a perspective view of an example crystalline constituent dispenser;

FIG. 224 depicts the example crystalline constituent dispenser of FIG. 223 with a portion broken away to shown internal components of the crystalline constituent dispenser;

FIG. 225 depicts a side view of an example dispensing assembly which may be included in an example crystalline constituent dispenser;

FIG. 226 depicts a cross sectional view of the example dispensing assembly of FIG. 225;

FIG. 227 depicts a perspective view of an example dispensing disc which may be included within an example dispensing assembly of an example crystalline constituent dispenser;

FIG. 228A depicts a perspective view of an example dispensing assembly which may be included in an example crystalline constituent dispenser;

FIG. 228B depicts an exploded view of the example dispensing assembly shown in FIG. 228A;

FIG. 229A depicts a front view of another example crystalline constituent dispenser;

FIG. 229B depicts a perspective view of the example crystalline constituent dispenser of FIG. 229A with certain components removed;

FIG. 230 depicts a perspective view of an example port of a dosing manifold with an example outlet which may be included in a crystalline constituent dispenser docked thereon;

FIG. 231 depicts a cross sectional view of the example port and example outlet shown in FIG. 230;

FIG. 232 depicts a side view of another example dispensing assembly which may be included in a crystalline constituent dispenser;

FIG. 233 depicts a side view of an example dispensing assembly which may be included in a crystalline constituent dispenser;

FIG. 234 depicts a side view of an example dispensing assembly which may be included in a crystalline constituent dispenser;

FIG. 235 depicts a perspective view of an example tube welding assembly;

FIG. 236 depicts another perspective view of an example tube welding assembly;

FIG. 237 depicts a perspective view of an example conduit dispenser which may be included in a tube welding assembly;

FIG. 238 depicts an exploded view of an example conduit dispenser;

FIG. 239 depicts an exploded view of an example conduit feed assembly which may be included in a tube welding assembly;

FIG. 240 depicts a perspective view of components of an example tube welding assembly;

FIG. 241 depicts a perspective view of components of an example tube welding assembly;

FIG. 242 depicts a perspective view of an example occluder assembly which may be included in an example tube welding assembly;

FIG. 243 depicts a top down view of an example occluder assembly which may be included in an example tube welding assembly;

FIG. 244 depicts a perspective view of an example occluder assembly which may be included in an example tube welding assembly;

FIG. 245 depicts a perspective view of an example cutter assembly which may be included in an example tube welding assembly;

FIG. 246 depicts a cross sectional view of a piece of tubing being occluded by an example occluder assembly and an example cutter assembly;

FIG. 247 depicts a perspective view of components of an example tube welding assembly;

FIG. 248 depicts a perspective view of an example bag sealing assembly which may be included in a tube welding assembly;

FIG. 249 depicts an exploded view of an example jaw of an example bag sealing assembly;

FIG. 250 depicts a front view of an example bag having a fill port in which a sample aliquot is being isolated by a bag sealing assembly;

FIG. 251 depicts a front view of an example bag having a sample aliquot sealed within a fill port of the bag;

FIG. 252 depict a block diagram of another example system for producing and packaging fluid;

FIG. 253 depicts a perspective view of an example embodiment of the system shown in FIG. 252;

FIG. 254 depicts a top down view of an example embodiment of the system shown in FIG. 252;

FIG. 255 depicts a perspective view of an example bag carriage assembly;

FIG. 256 depicts a perspective view of another example embodiment of a bag feeder;

FIG. 257 depicts a perspective view of another example clip;

FIG. 258 depicts another perspective view of the clip shown in FIG. 257;

FIG. 259 depicts a perspective view of an example clip ejector assembly which may be included in a bag feeder;

FIGS. 260-261 depict view of an example bag feeder including the clip ejector assembly shown in FIG. 259;

FIG. 262 depicts an example embodiment of a fluid conduit dispenser and a portion of a dispenser displacement assembly;

FIG. 263 depicts a cross-sectional view of an example cap which may be included on an end of a filling conduit;

FIG. 264 depicts a block diagram of an example conduit welding station which may be included in a system for producing and packaging fluids;

FIG. 265 depicts an example welding assembly with jaws of the example welding assembly being in an open state;

FIG. 266 depicts an example welding assembly with jaws of the example welding assembly in a closed state;

FIG. 267 depicts an example welding assembly with jaws of the example welding assembly in a closed state and conduit occluders of the welding assembly being deployed;

FIG. 268 depicts a cross-sectional view of the example welding assembly shown in FIG. 267;

FIG. 269 depicts a cross-sectional view the example welding assembly of FIG. 267 with a cutting element deployed to cut through a conduit retained in the welding assembly;

FIG. 270 depicts a cross-sectional view of the example welding assembly of FIG. 267 with a cutting element deployed and one of the jaw units of each jaw shifted so as to align a filling conduit on one side of the cutting element with a port on another side of the cutting element;

FIG. 271 depicts a cross-sectional view of the example welding assembly of FIG. 267 with the cutting element retracted and a port joined to a filling conduit;

FIG. 272 depicts a cleaner assembly for cleaning a cutting element of a welding assembly;

FIGS. 273-274 depict block diagrams of an example weld opening station;

FIG. 275 depicts a perspective view of an example embodiment of a weld opener station;

FIG. 276 depicts a perspective view an example support plate which may be included in a weld opener station;

FIG. 277 depicts a block diagram of an example dissociation assembly for separating a fill conduit from a port of a bag;

FIG. 278 depicts a front view of an example dissociation assembly with the dies of the assembly in an open state;

FIG. 279 depicts a perspective view of a portion of an example dissociation assembly including a scrap retention element;

FIG. 280 depicts a perspective view of an example scrap retention element;

FIG. 281 depicts a front view of a portion of an example dissociation assembly in which the dies of the assembly are in a closed state and the scrap retention element is deployed;

FIG. 282 depicts a front view of a portion of an example dissociation assembly in which the dies of the assembly are in a closed state and the scrap retention element is retracted;

FIG. 283 depicts a perspective view of an example die;

FIG. 284 depicts a cross-sectional view of exemplary dies of an example dissociation assembly, the dies being in a closed state;

FIGS. 285A-285B depict view of a conduit disposed between two example dies;

FIGS. 286A-B depict view of a conduit compressed between two example dies so as to form occluded regions in the conduit on each side of a joint in the conduit;

FIGS. 287A-B depict views of the conduit in FIG. 286A-B after the example dies have been heated to create seals in the conduit at the occluded regions and after the dies have cut through a central region of the seals;

FIG. 288 depicts a perspective view of a portion of a welding assembly with a scrap conduit span held in place on an example die via a deployed scrap retention element;

FIG. 289 depicts a detailed view of the indicated region of FIG. 288;

FIG. 290 depicts a front view of an example dissociation assembly in which an example scrap container has been displaced under a die of the assembly;

FIG. 291 depicts a front view of an example dissociation assembly in which an exemplary scrap retention element has been retracted to allow a scrap conduit span to fall into an example scrap container; and FIG. 292 depicts a detailed view of the indicated region of FIG. 291.

These and other aspects will become more apparent from the following detailed description of the various embodiments of the present disclosure with reference to the drawings wherein:

DETAILED DESCRIPTION

Figure 1:
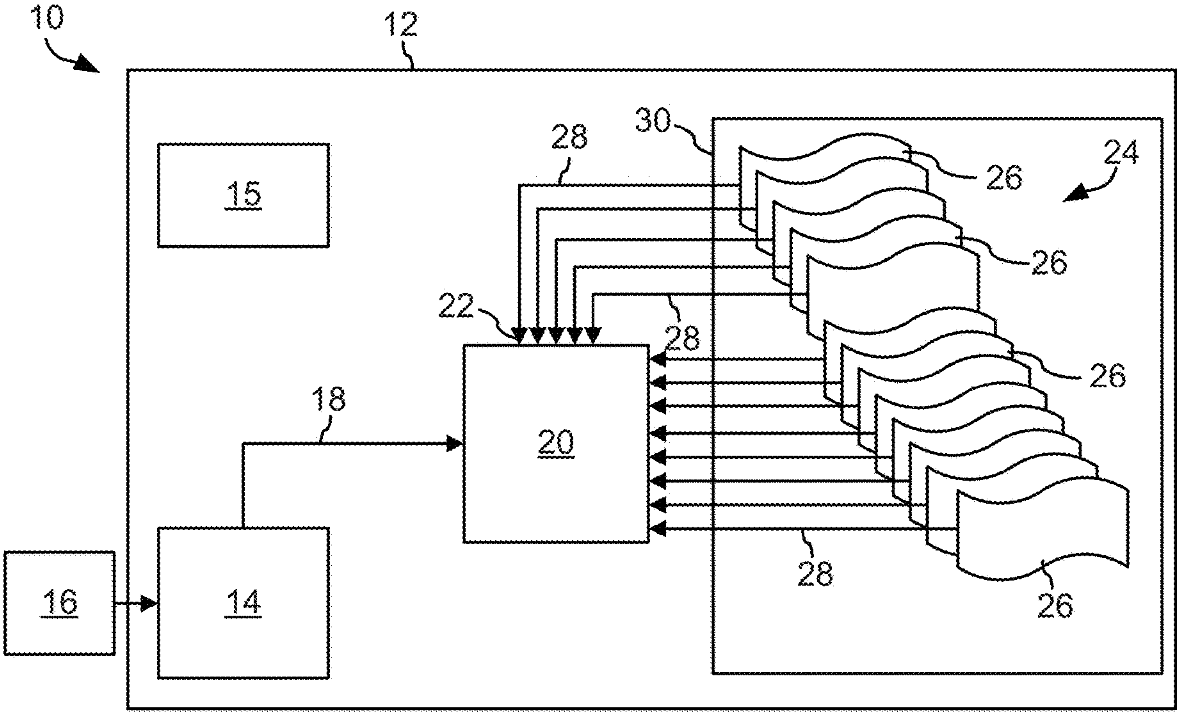
FIG. 1 depicts a diagrammatic example embodiment of a system for producing and packaging medical fluids.

Referring now to FIG. 1, a system 10 for producing and packaging medical fluids is shown. The system 10 includes an enclosure 12. The enclosure 12 may be a clean room of any suitable certification level. The enclosure 12 may also be a housing which may be placed inside of a clean room. In such embodiments, the enclosure 12 or a compartment thereof may be constructed to conform to a higher certification level than the surrounding environment. Additionally, within the enclosure 12 there may be compartments which conform to different clean room level standards.

Within the enclosure 12, a number of system 10 components may be housed. For example, a medical water production device 14 may be included within the enclosure 12 of the system 10. The medical water production device 14 may be or include any suitable water production device such as a filtration device (charcoal, ultrafilter, endotoxin removal filter, reverse osmosis, microfilter, depth filter, etc.), distillation device, deaeration device (distillation devices may double as such), UV light source, chemical treatment device, exchange resin, electrodeionization unit, etc. or combination thereof. In certain embodiments, the medical water production device 14 may be a distillation device such as that described in U.S. Pat. No. 9,308,467, entitled Water Vapor Distillation Apparatus, Method, and System, issued Apr. 12, 2016 which is incorporated by reference herein in its entirety. Alternatively, the medical water production device 14 may be a distillation device such as that described in application Ser. No. 16/370,038, entitled Water Distillation Apparatus, Method, and System, filed Mar. 29, 2019, which is incorporated by reference herein in its entirety. The medical water production device 14 may generate water which conforms to various compendial specifications or may generate water adhering to some non-compendial specification. The medical water production device 14 may, for example, produce USP (or another pharmacopeia) water for injection (WFI), highly purified water, low pyrogen water, etc.

In alternative embodiments, the medical water production device 14 may not be included in the enclosure 12. Instead, the medical water production device 14 may be in a separate enclosure within a clean room, or may in some embodiments be located in a non-clean room environment or a lower certification clean room environment than the rest of the system 10. The output of the medical water production device 14 may be plumbed from the outlet of the medical water production device 14 to the rest of the system 10. The medical water production device 14 may receive input water from any suitable source 16. In some examples, this source 16 may be a municipal water supply line. In alternative embodiments, the source 16 may be a reservoir of pre-treated (e.g. via filtration, UV, softened) water which the medical water production device 14 draws from. In some embodiments, the source 16 may be a large container or bladder. Where the system 10 produces a compendial fluid, the source 16 may conform to any requirements specified for acceptable sources which may be used to generate that compendial fluid. For example, the source may be EPA acceptable drinking water.

As the medical water production device 14 generates purified water, the water may be output to an outlet line 18 after being subjected to various quality testing. If any output water fails quality testing, the output water may be diverted to a discard location or recirculated to the input of the medical water production device 14 for further purification. The output line 18 of the system 10 may connect to a manifold 20. The manifold 20 may include fluid channels and one or more valve or actuator which selectively split or direct the purified water input flow into a plurality of separate outlet fluid channels. In some embodiments, the manifold 20 may be devoid of valves and instead passively furcate the incoming purified water. The manifold 20 may include a number of couplings. These couplings may couple to manifold interface elements 22 of a fill receiving set 24. The fill receiving set 24 may include at least one IV bag 26 and administration set 28. The manifold interface elements 22 may be luer fittings in some embodiments. In alternative embodiments, the manifold interface elements 22 may be quick connect fitting. In some embodiments, administration sets 28 may be bonded or fixedly attached to the manifold 20 (which may include port projections extending from the manifold 20). Manifolds 20 may also include barbed fittings over which the administration set 28 tubing is secured.

In the exemplary embodiment shown in FIG. 1, the fill receiving set 24 includes a plurality of IV bags 26 and administration sets 28. In such embodiments, the plurality of IV bags 26 and administration sets 28 may be bundled in a parcel or package 30 which facilitates their installation into the system 10. In some embodiments, the package 30 may act as a dispenser which, for example, allows the topmost bag 26 and administration set 28 to be collected by a robotic grasper of the system 10. Each fill receiving set 24 may include up to or above 50-100 bag 26 administration set 28 pairs (though anywhere from 1-50 pairs or greater than 100 pairs is also possible). The administration set 28 lengths may be chosen so as to be clinically useful, but not long enough to present an excessive impedance issue when filling in the event that the bags 26 are filled via the administration sets 28 attached thereto. In some embodiments, the administration set 28 may be about 0.75-2.5 meters (e.g. one meter). The manifold interface elements 22 may be connectors which are capable of interfacing with coupling elements on accessory tubing sets as well as the manifold 20. Such accessory tubing sets may include extension lines, multi-way connectors such as Y-sets, V-sets, and T-sets, or potentially various access ports.

As purified water is produced by the medical water production device 14, the water may be routed via the manifold 20 to each IV bag 26 of the fill receiving set 24. Each IV bag 26 may be filled to capacity (or a desired, preset, or prescribed amount below capacity) and then removed from the system 10. The administration set 28 attached to each bag 26 may be left in a primed state by the system 10 (e.g. where the bag 26 is filled through the administration set 28). In certain embodiments, the manifold interface elements 22 may be decoupled from the manifold 20 and capped by the system 10 via a multi-axis robotic manipulator. In some embodiments, a clamp may be applied to the administration set 28 or displaced to an actuating position on the set 28 before decoupling or during the decoupling operation. Alternatively, a seal may be generated in the administration set 28 tubing or other fill conduit and the tubing may be severed from the manifold 20. This seal may be generated via heat, dielectric or RF welding, or any other suitable process. In such embodiments, the administration set 28 may include a branch upstream of the seal location to allow access to contents in the bag 26. In alternative embodiments, a user may manually decouple the bags 26 and administration sets 28 from the rest of the fill receiving set 24.

The system 10 may also include a control system 15 including one or more controller. The control system 15 may govern operation of manifold actuators or valves, the medical water production device 14, any robotic graspers and manipulators, and may use sensor data to fill bags 26 to their desired volumes. Controllers which may be used in the control system 15 may include microprocessors, FPGAs, PLCs, etc. The control system 15 may be in data communication (wired or wireless) with various sensors, manipulators, and other hardware of the system 10.

Figure 2A:
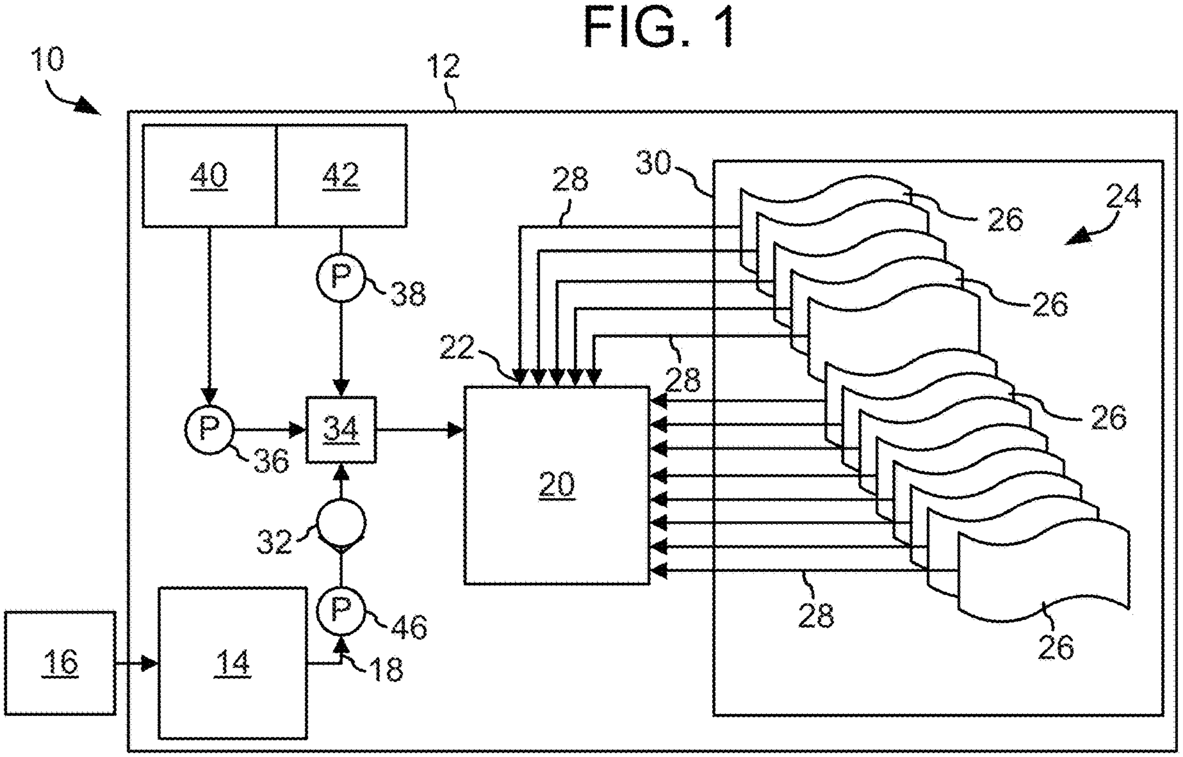
FIG. 2A depicts a diagrammatic example embodiment of a system for producing and packaging medical fluids.

Referring now to FIG. 2A, the system 10 may, in some embodiments, be configured to generate bags 26 having various types of solutions. The solutions may be colloid solutions or crystalloid solutions. Solutions produced may be isotonic, hypotonic, or hypertonic in relation to physiological norms. For example, solutions may include various salt solutions such as normal saline, half normal saline, or saline of any other concentration. Solutions may also include Ringer's solution, Hartmann's solution, sugar solutions (e.g. D5W), sugar saline solutions (e.g. D5NS, 2/3 D5W & 1/3 NS), Gelofusine, Dextran, Hetastarch, albumin, Ionosteril, Sterofundin ISO, Plasma-lyte, etc. In such embodiments, the system 10 may include receptacles for one or more bulk cartridges or reservoirs 40, 42 of concentrate or crystalline precursor. These bulk cartridges 40, 42 may communicate with fluid lines which lead to pumps 38, 36. The pumps 38, 36 may meter specific volumes of concentrates into the output of the medical water production device 14.

The medical water production device 14 output stream may also be pumped by a pump 46 to monitor the amount of fluid being mixed with any concentrate introduced from the bulk reservoir(s) 40, 42. In some examples, an accumulator or storage volume (not shown) may be included to maintain a supply of medical grade water such that solution may be produced at a rate faster than the output rate of the medical water production device 14 if commanded. This accumulator volume could be maintained within the medical water production device 14 in certain embodiments.

A mixing volume 34 may be included in the system 10 to ensure any concentrate and water are evenly mixed before progressing to the fill receiving set 24. This mixing volume 34 may have an interior including various baffles or obstacles which break up incoming flow and promote mixing of fluid within the mixing volume 34. The mixing volume 34 may also include an expanse of tubing which may present a long/and or tortuous path that encourages even mixing. A check valve 32 may also be included on the output line 18 from the medical water production device 14 to prevent any back flow of mixed solution to the medical water production device 14. Control of various valves 36, 38, 46 and pumps of the system 10 may be orchestrated via the control system 15.

Figure 2B:
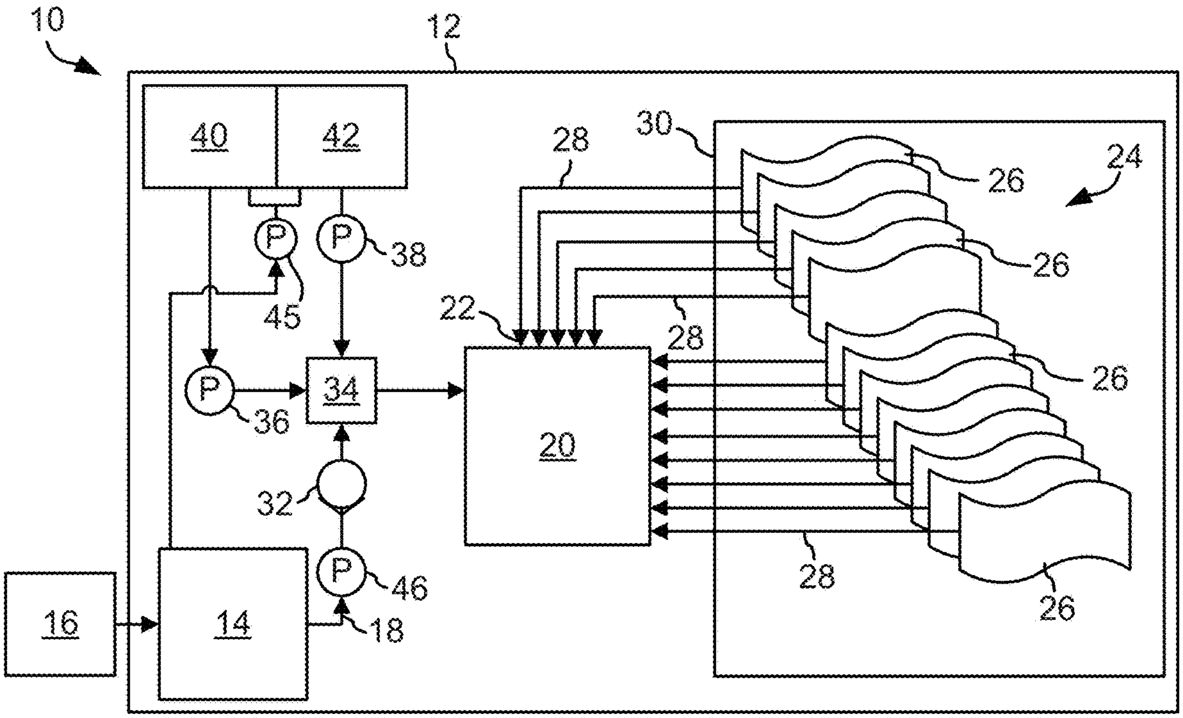
FIG. 2B depicts a diagrammatic example embodiment of a system for producing and packaging medical fluids.

In some embodiments, and as shown in FIG. 2B, the medical water production device 14 may have an output which may communicate with bulk cartridges 40, 42 containing concentrate in a crystalline form. The output of the medical water production device 14 may pass through the bulk cartridges 40, 42 and exit as a saturated or nearly saturated solution. A pump 45 may be provided to aid in delivery of the output stream of the medical water production device 14 through the bulk cartridges 40, 42. Fluid exiting the bulk cartridges 40, 42 may be subjected to composition monitoring (e.g. conductivity sensing, temperature sensing, polarimetry sensing, etc.) which may inform the control system 15 determined downstream mixing ratios effected by pumps 38, 36.

Figure 3:
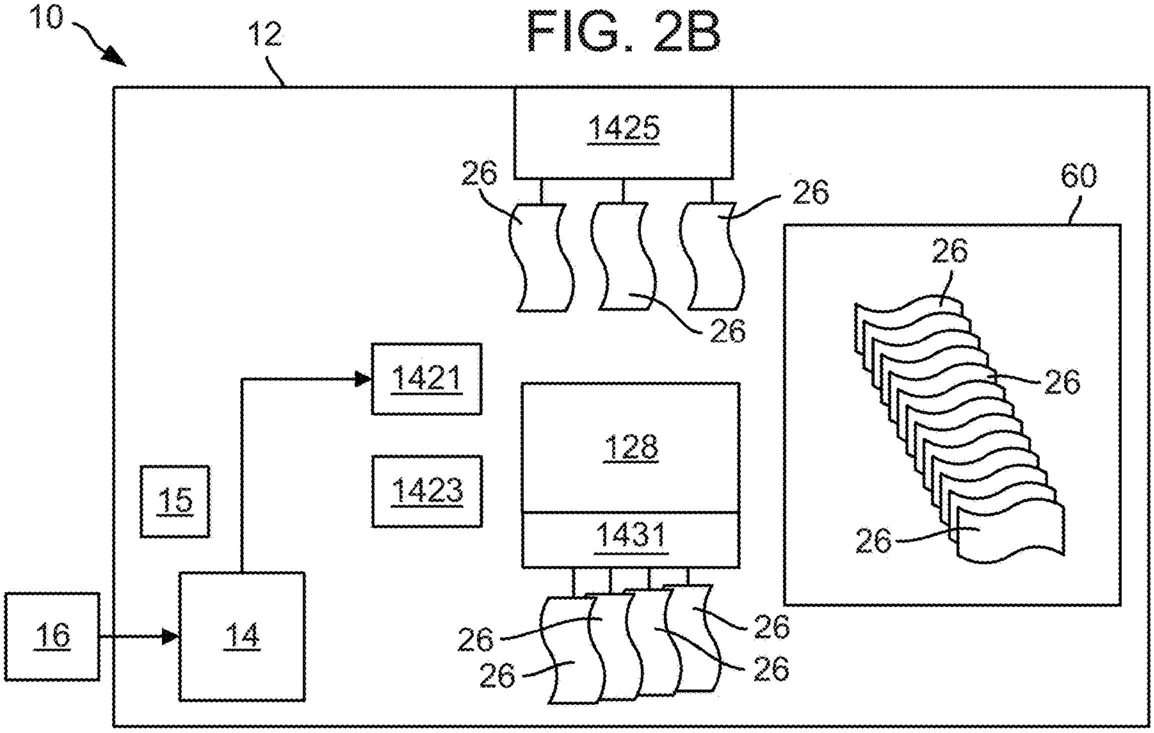
FIG. 3 depicts a diagrammatic example embodiment of a system for producing and packaging medical fluids.

Referring now to FIG. 3, a system 10 for producing and packaging medical fluids is shown. The system 10 is configured to fill individual bags 26 as opposed to filling through a fill receiving set 24. As the medical water production device 14 in FIG. 3 generates purified water, the water may be output to an outlet line 18 after being subjected to various quality testing. The output line 18 of the system 10 may connect to a filling nozzle or dispenser 1421. The dispenser 1421 may include a tapered outlet which may be introduced into an inlet of a bag 26 or other destination container. Alternatively, the dispenser 1421 may include a fitting (e.g. luer lock, quick connect, etc.) which mates with a fitting on a destination container.

In the exemplary embodiment shown in FIG. 3, the system 10 includes a plurality of IV bags 26 which may be included in a bag feeder 128. In such embodiments, the plurality of IV bags 26 may be included in a cartridge or dispenser such as a magazine 1431 (or, e.g., any clip 1700 described herein) which facilitates their installation into the system 10. In some embodiments, the magazine 1431 may act as a dispenser which, for example, allows the foremost bag 26 to be collected by a robotic manipulator 1423 of the system 10. Any suitable robotic manipulator 1423 may be included, for example, one or more multi-axis robotic arm may be included. Each magazine 1431 may hold, for example, 10-50 bags 26 though magazines 1431 having a capacity for a greater or lesser number of bag 26 may also be used.

In some embodiments, bags 26 may be provided in an over pack 60 which may be a sealed bag, pouch, or blister pack in certain embodiments. The over pack 60 may be cleaned (e.g. with 70% isopropyl alcohol or another suitable agent) and introduced into the enclosure 12. Individual bags 26 may then be withdrawn from the over pack 60 manually or in an automated fashion (via a robotic manipulator 1423) and installed in a magazine 1431 included in the system 10. One or more pre-loaded magazine 1431 full of bags 26 may also be provided in an over pack 60. Pre-loaded magazines 30 may be removed from the over pack 60 and installed in the bag feeder 128 as needed. In alternative embodiments, bags 26, magazines 1431, and any other consumable components may be introduced to the enclosure 12 via an alpha port and beta container arrangement (see, e.g., FIG. 111).

In some embodiments, various protective caps or films may be included over some components of the bags 26. For example, a film or cap may be included on ports of the bags 26. This may facilitate establishment of aseptic connections if manipulation of the bags 26 after being removed from the over pack 60 is needed to install bags 26 into the system 10. The caps or film may be removed shortly before connection or installation to the system 10. Alternatively, the film or cap may be pierced through during filling. In other embodiments, bags 26 may be introduced into an enclosure 12 with their ports in a sealed state. The ports may be opened (e.g. cut) to gain access to the interior volume of the bags 26.

As purified water is produced by the medical water production device 14, the water may be output by the dispenser 1421 to each IV bag 26. The robotic manipulator 1423 may collect bags 26 from the bag feeder 128 (to which a magazine 1431 or clip 1700 may be docked) and displace them to the dispenser 1421 for filling. Each IV bag 26 may be filled to capacity or some other desired volume and then removed from the system 10 or placed in a quarantine 1425 while various testing on fluid output from the dispenser 20 is completed. In some embodiments, a seal may be generated in the fill conduit leading to the bag 26. This seal may be generated via heat, dielectric or RF welding, installation of a stopper or other sealing member, or any other suitable process.

Figure 4A:
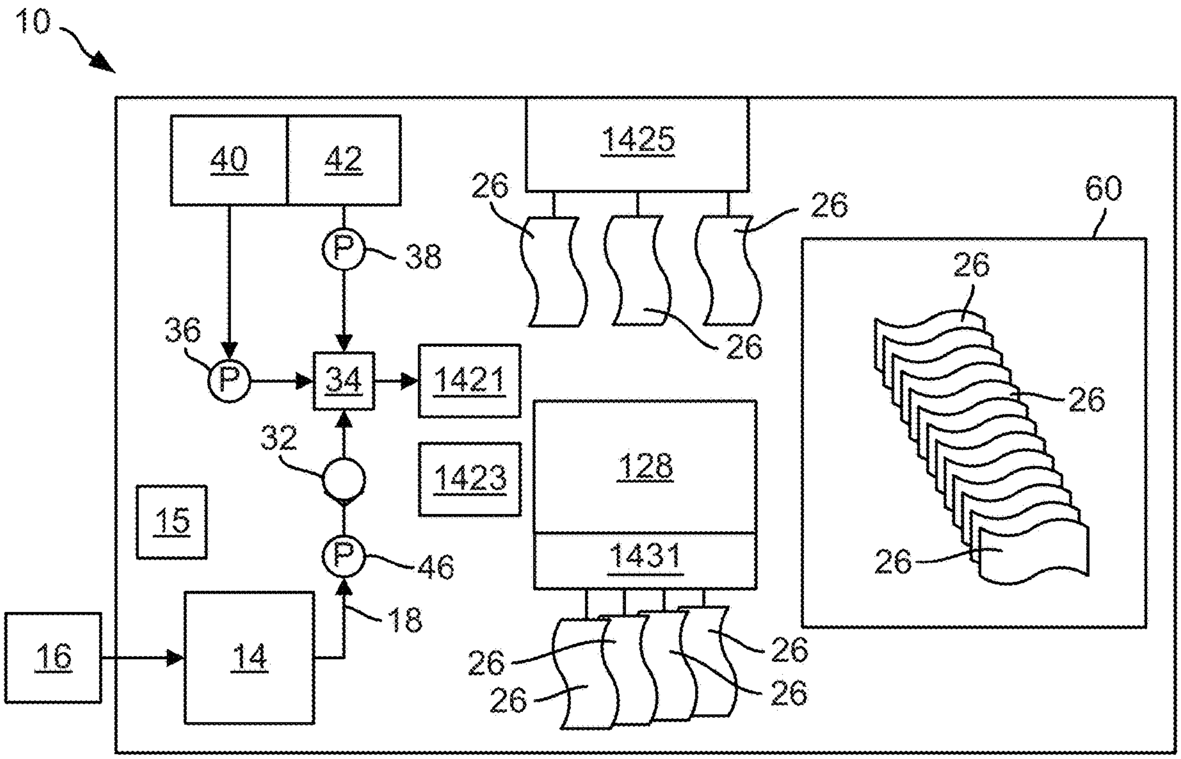
FIG. 4A depicts another diagrammatic example embodiment of a system for producing and packaging medical fluids.
Figure 4B:
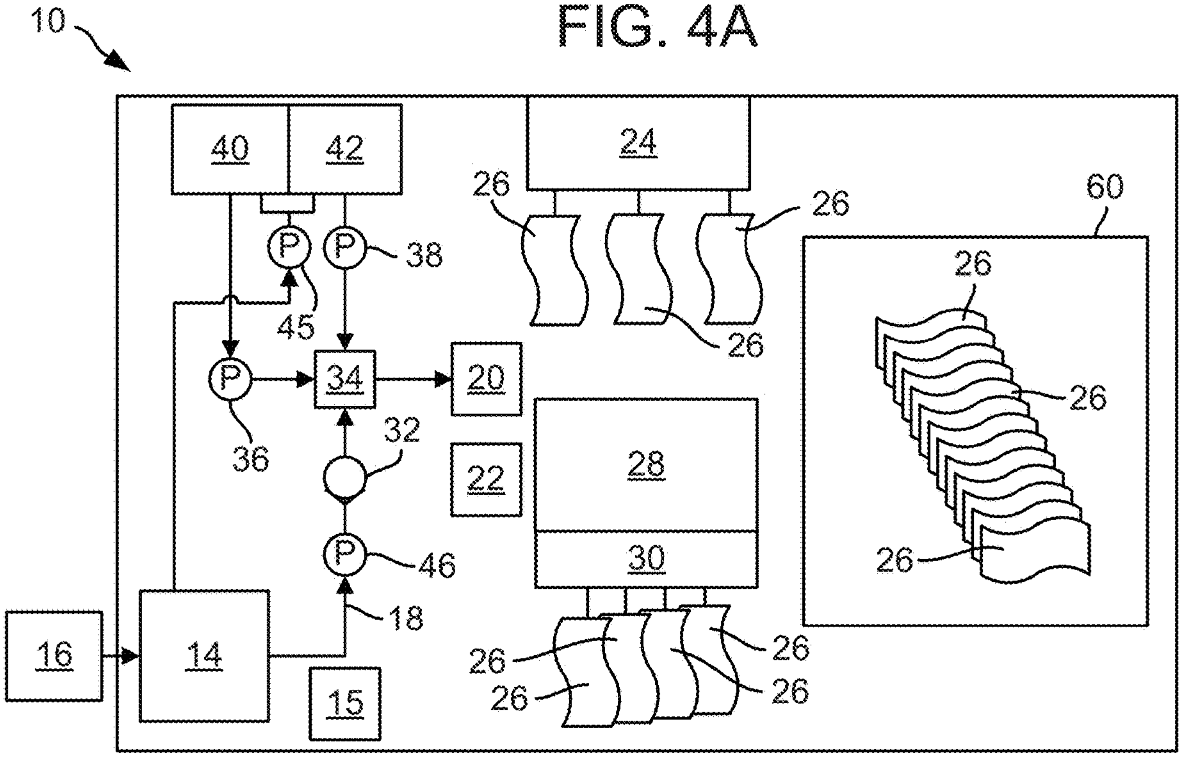
FIG. 4B diagrammatic example embodiment of a system for producing and packaging medical fluids.

Referring now to FIG. 4A, another system 10 for producing and packaging medical fluids is shown. As described in relation to FIG. 3, the system 10 is configured to fill individual bags 26 as opposed to filling through a fill receiving set 24. The example system 10 in FIG. 4A is configured to generate bags 26 having various types of solutions. The system 10 in FIG. 4A includes components described in relation to FIG. 2A to accomplish mixing operations in order to generate the solution. FIG. 4B depicts another system 10 for producing and packing medical fluids which is configured to fill individual bags 26. This system 10 includes components described above in relation to FIG. 2B in order to generate various types of solutions to fill the bags 26 with. Any mixing circuit (see, e.g., FIGS. 204-205) described herein may be used to generate solution.

Figure 5A:
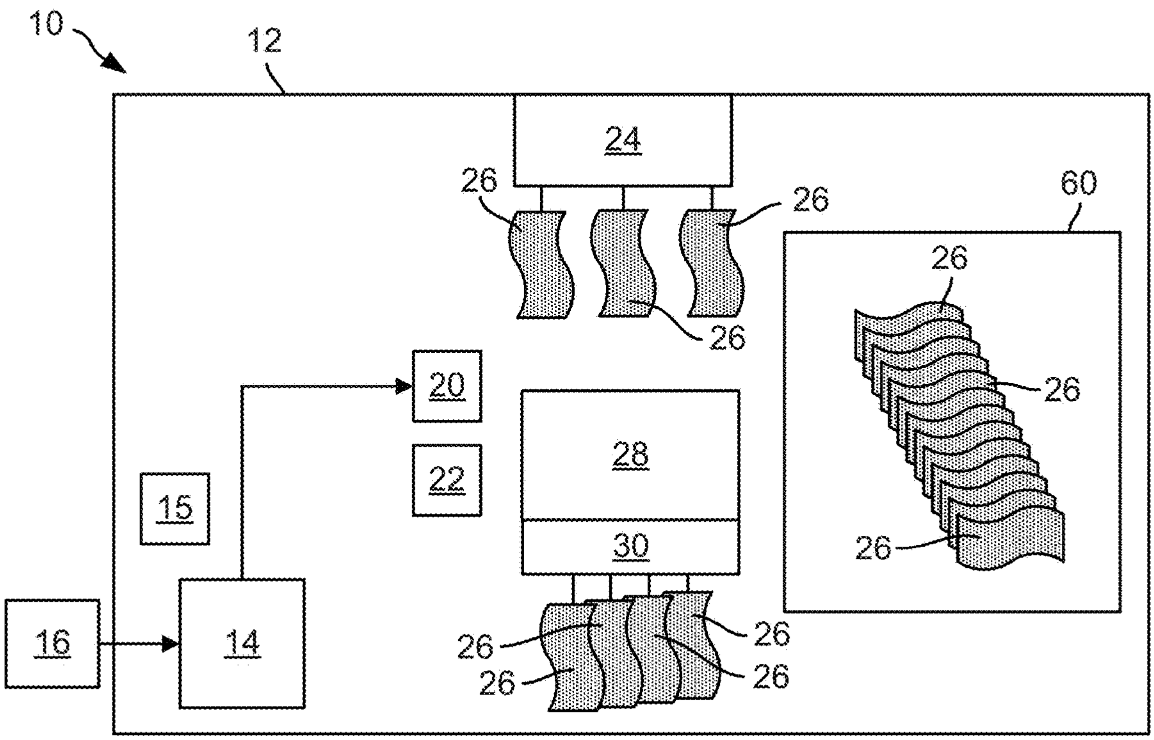
FIG. 5A diagrammatic example embodiment of a system for producing and packaging medical fluids.
Figure 5B:
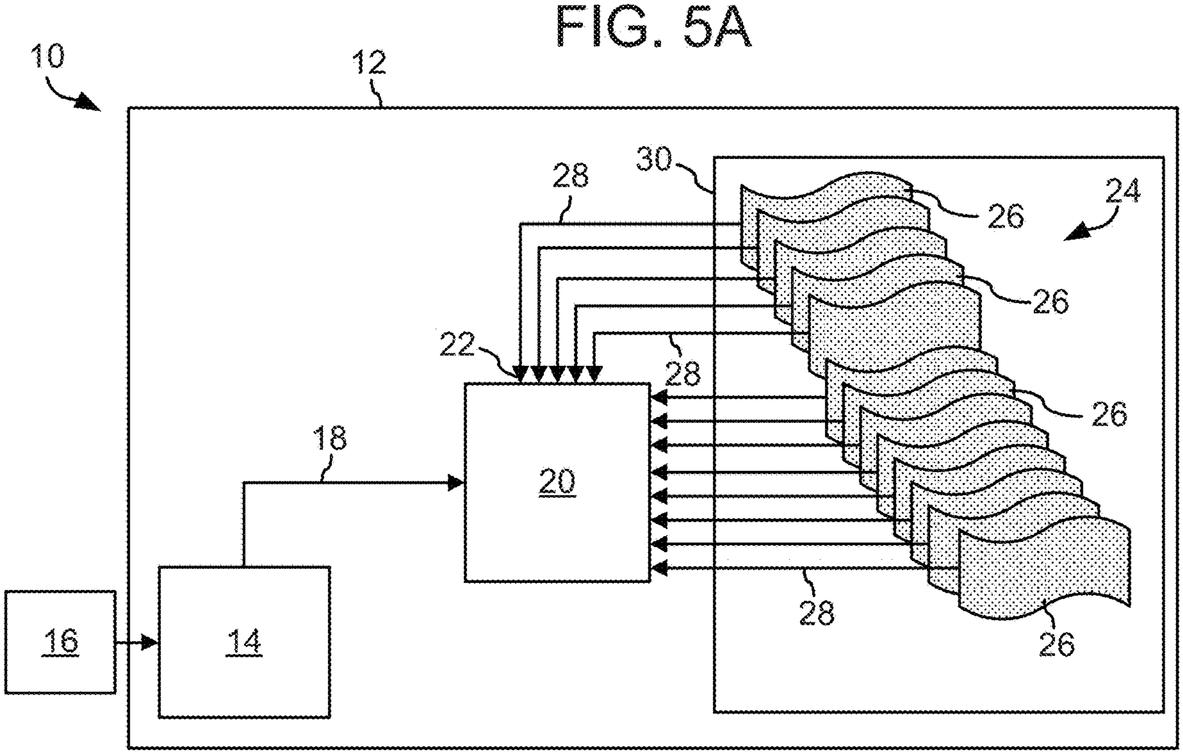
FIG. 5B depicts a diagrammatic example embodiment of a system for producing and packaging medical fluids.

In other embodiments and referring now to FIGS. 5A and 5B, bulk reservoirs 40, 42 may not be used. Instead, the bags 26 may enclose an appropriate amount of concentrate (depicted as a stipple pattern in each bag 26). This concentrate may be prepackaged into the bags 26. As fluid from the medical water production device 14 flows into the bags 26, the amount of concentrate may be sufficient to generate the desired final solution concentration. The concentrate may be provided in the form of a liquid in some embodiments. In alternative embodiments, the concentrate may be a powder or lyophilized drug. In still other embodiments, the concentrate may be included in an ampoule or similar structure provided within each bag 26. Where ampoules are used, the ampoule may be interruptible or frangible so as to allow access to the material contained within the ampoule. The ampoule may be mechanically breakable by the system 10 or shattered by ultrasonic waves produced by the system 10 in some embodiments. Lighter and/or less bulky concentrate forms may be used when possible. For example, a crystalline solid may be used instead of a saturated solution, though both are possible.

Where various systems 10 are described herein including mixing circuits 348 or bulk reservoirs 40, 42 and other mixing components, the fluid mixing components may be omitted and bags 26 including prepackaged concentrate may alternatively be used. Additionally, bags 26 including prepackaged concentrate may be used in systems 10 described herein including mixing circuits 348 or bulk reservoirs 40, 42 and other mixing components. Thus, for example, a system 10 may produce saline and bags 26 may include a prepackaged concentrate in order to produce a desired solution (e.g. D5NS where bags 26 include prepackaged crystalline dextrose).

Figure 6:
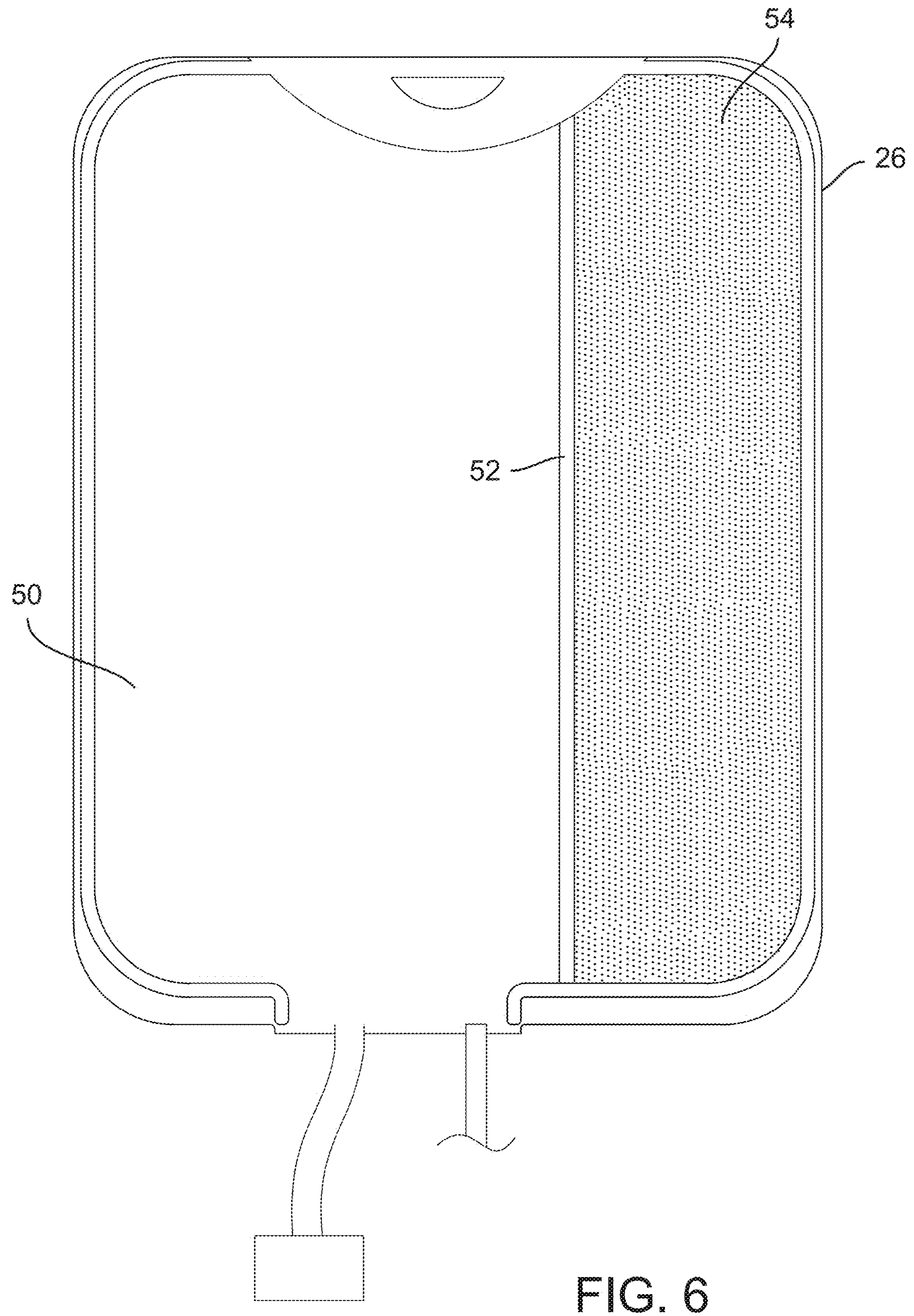
FIG. 6 depicts a top down view of a multi-compartment bag containing a concentrate contained therein.

Referring now also to FIG. 6, in certain embodiments the bag 26 may be a multi-chamber bag 26. One chamber 50 may be empty and may be adjacent at least one concentrate chamber 54 containing liquid, lyophilized, crystalline, or otherwise powdered, concentrate (depicted as stipple pattern in chamber 54). The chambers 50, 54 may be separated from communication with one another via a seal 52 or seals 52. The seal(s) 52 may be user or machine interruptible. For example, the seal(s) 52 may include a frangible or the seal(s) 52 may be peelable. Depending on the embodiment, the seal(s) 52 between chambers 50, 54 may be defeated by a user or by the system 10 during production of the bag 26. In some examples, the seal(s) 52 may be maintained after production of the bag 26 until a point more temporally proximate usage of the bag 26. This may be done, for example, in cases where the mixed solution has a relatively short shelf life. Where a seal 52 is broken by a component of the system 10, the seal 54 may be broken before or after filling of the bag 26 with water from the medical water production device 14. The system 10 may include a shaker, vibrator, mechanical agitator, or other component which aids in mixing the concentrate with any water introduced to the bag 26. In some embodiment, the entry port to the bag 26 may include a structure which encourages water entering the bag 26 to swirl or turbulently mix any concentrate included in the bag 26. Where a seal is peelable, it may be generated by altering a process characteristic during seal formation. For example, a lower heat, power, welding time, etc. than that used to form the peripheral seal of the bag 26 may be employed to make the peelable seal. In certain examples, the system 10 may include a set of rollers or similar pressure applicators which may operate on the bag 26 to disrupt any peelable seals.

Where bags 26 are provided with some form of concentrate therein, the bags 26 may be coded so as to be easily identifiable by human, machine, or both. Bags 26, may for example be color coded (color A=saline, color B=ringer's, color C=sugar solution, and so on). Color coding may not be applied to the entirety of the bag 26. A seam of the bag 26 may be color coded or the bag 26 may include a stripe, block, or zone of color coding. Locations of the color coding or the shape of a zone of color coding may also differ across bags 26. The bags 26 may also include a machine readable indicia such as a bar code, data matrix, wirelessly interrogatable tag, etc. In some embodiments, the bags 26 may also be color coded by volume or color coded by various set characteristics. For example, administration set 28 having a burette, injection port, etc. may have different color coding than those without.

In some embodiments, the bags 26 may be differentiated on the basis of a human or machine observable feature other than color. For example, in some embodiments, the bags 26 or a portion thereof may additionally or instead have different geometries such as an elongate shape, square, cylindrical, etc. Any shape having a round or polygonal cross-section may be used. Locations of compartments within the bag 26 may also differ in a visually differentiable way and compartment locations may depend on the concentrate held therein. For example, a first concentrate may be located in a corner compartment or the bag 26. A seal defining such a compartment may run from a side of the bag 26 and extend to another side of the bag 26 which extends at an angle which is substantially perpendicular thereto. A second concentrate may be stored in a compartment 54 running along a side of the bag 26 defined by a seal 52 extending the length or width of the bag 26 parallel to an edge of the bag 26 (see e.g. FIG. 6). Any bags 26 of the type described in U.S. application Ser. No. 16/384,082, filed Apr. 15, 2019, entitled Medical Treatment System and Methods Using a Plurality of Fluid Line, which is hereby incorporated by reference herein it its entirety may be used.

Figure 7:
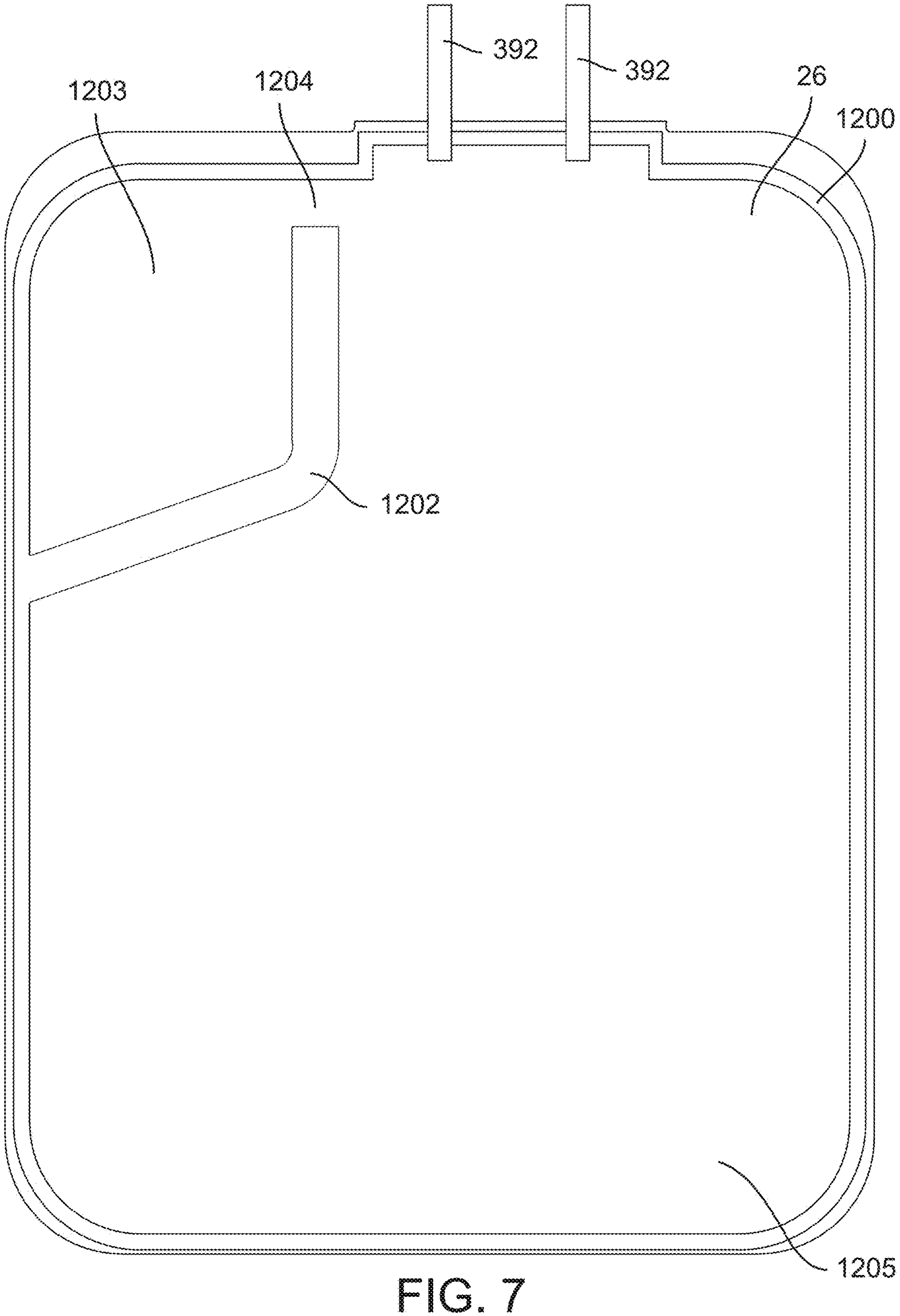
FIG. 7 depicts an exemplary bag having a partial barrier wall in its interior volume.

Referring now to FIG. 7, an exemplary bag 26 is depicted. The bag 26 may be filled with any of the fluids described herein by any of the systems 10 described herein. Any of a wide range of medical fluids may be contained within the bag 26. Though the example bag 26 may be used in any of a variety of scenarios, the bag 26 shown in FIG. 7 includes features which may be well suited to applications where the fluid contained the bag 26 is mixed and packaged on site at or near the intended point of use. For example, the bag 26 may be filled by a system 10 within a hospital, clinic, dialysis clinic, surgery center, or other medical practice institution where the solution is to be used. Alternatively, the bag 26 may be filled by a system 10 in a military field hospital or at a site of a disaster relief operation. The example bag 26 includes features which may allow an aliquot of fluid to be isolated therein from a volume of fluid filled into the bag 26 for delivery to a patient. This aliquot may be created from or be representative of the fluid which was filled into the bag 26. Such bags 26 may be used in embodiments where the system 10 fills bags 26 individually. Alternatively, such bags 26 may be included in a fill receiving set 24.

As the aliquot associated with the bag 26 is isolated from all other fluid filled into the bag 26, the aliquot may be accessed discretely without also accessing the main volume which may be filled with fluid intended for administration to a patient. This may allow a sample of fluid which is compositionally representative of fluid in the main volume to be extracted from the isolated aliquot for testing. The main volume of fluid filled into the bag 26 may remain undisturbed by the sampling conducted on the aliquot. Thus, the aliquot may allow for sampling of fluid in the bag 26 without the need for the entire bag 26 to be compromised or discarded. As a result, it may be possible to test each bag 26 before the bags 26 are cleared for use. Additionally, this may allow for certain testing which is difficult or not feasible to conduct as the bag 26 is filled to be performed after the bags 26 are filled. Testing which requires an incubation or wait period, for example, may be performed on fluid sampled from the aliquot isolated within the bag 26. After filling, bags 26 may be held in a quarantine until this testing is completed. Once testing indicates that the fluid in the bags 26 meets predefined acceptability criteria, the bag 26 may be released for use.

As shown in FIG. 7, the example bag 26 includes two ports 392. These ports 392 may be sealed into a peripheral seal 1200 which defines the interior volume of the bag 26. The ports 392 may provide fluid communication into and out of the bag 26 for filling and delivery of fluid in the bag 26. One may, for example, be a filling access which is sealed after filling. The other may be a delivery port which can be spiked to access the fluid in the bag 26 when it is needed for delivery to a patient. Where the bag 26 is included as part of a fill receiving set 24, the filling port 392 may be connected to a manifold 20.

As shown, the bag 26 includes a partial barrier wall 1202. The partial barrier wall 1202 may substantially section off a portion 1203 the interior volume of the bag 26 from the remainder of the interior volume or main volume 1205 of the bag 26. The partial barrier wall 1202 may, however, be broken by at least one gap or interrupt region 1204. The gap region 1204 may provide a fluid pathway between the sectioned off portion 1203 of the bag 26 and the remainder of the interior volume 1205 of the bag 26. As the bag 26 is filled, both main volume 1205 of the bag 26 and the sectioned off portion 1203 may receive fluid. As the gap region 1204 keeps the sectioned off portion 1203 in fluid communication with the main volume 1205, the fluid which fills into the sectioned off portion 1203 and the main volume 1205 should be compositionally the same.

Figure 8:
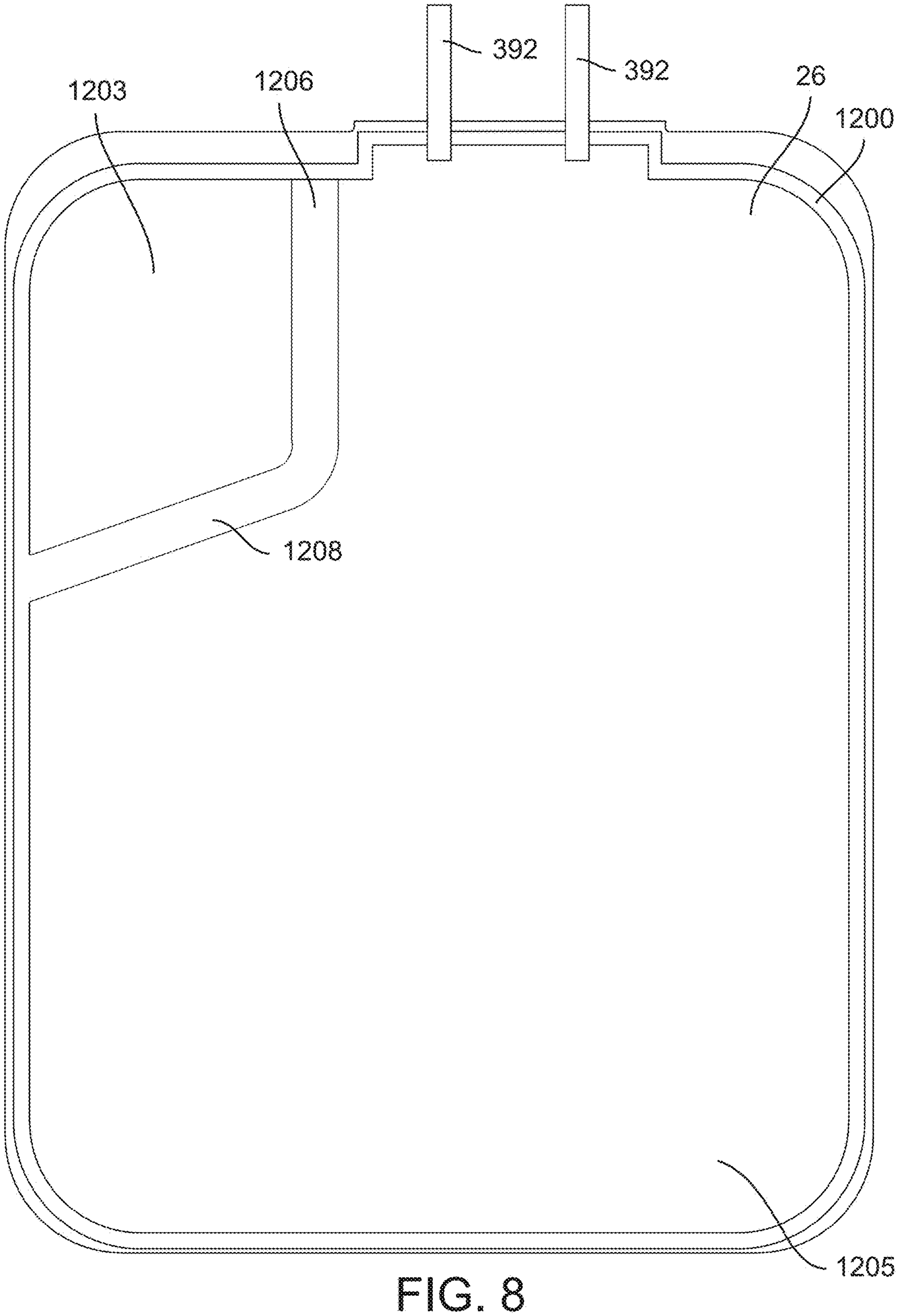
FIG. 8 depicts an exemplary bag having an isolated aliquot of fluid sectioned off from its main volume by a seal.

Referring now also to FIG. 8, once the bag 26 has been filled, a seal may be created in any gap regions 1204 breaking up the partial barrier wall 1202. This may generate a complete barrier wall 1206 which totally isolates the main volume 1205 of the bag 26 from the sectioned off portion 1203. This may be accomplished by heat sealing (or otherwise sealing) the bag 26 material together at the at least one gap region 1204. Thus an aliquot of fluid may be segregated from the main volume 1205 of the bag 26. As this aliquot is generated from the same initial interior volume of the bag 26 as the main volume 1205, the aliquot may be referred to as an internal aliquot.

The partial barrier wall 1202 may be generated within the bag 26 such that when the bag 26 is filled and at least one interrupt or gap region 1204 is sealed, the internal aliquot will have a desired nominal volume of fluid contained therein. Likewise, the partial barrier wall 1202 may be disposed such that the main volume 1205 within the bag 26 has a nominal capacity volume when the bag 26 is filled and the gap region 1204 is sealed. The internal aliquot may be sized to contain a volume of fluid sufficient for any intended sampling.

As shown in FIG. 8, the completed barrier wall 1206 may be positioned and shaped so as to encourage fluid contained in the main volume 1205 of the bag 26 to be directed toward the ports 392 when fluid in the bag 26 is delivered. In the example, the sectioned off portion 1203 of the bag 26 is located in a corner of the bag 26 on a side of the bag 26 proximate the ports 392. The completed barrier wall 1206 includes a sloped segment 1208 which slants towards the ports 392. Thus, when the bag 26 is hung (e.g. for gravity feed based delivery), fluid may be inhibited from being trapped or pocketed along regions of the complete barrier wall 1206. This may help to ensure that all of the fluid filled into the main volume 1205 of the bag 26 is able to be delivered without requiring user intervention to reposition the bag 26. In other embodiments, the completed barrier wall 1206 may include rounded features which aid in directing fluid toward the ports 392. In alternative embodiments, the interior aliquot may be generated at a side of the bag 26 opposing that which includes the ports 392 or in a corner of the bag 26 distal to those adjacent the ports 392.

Figure 9:
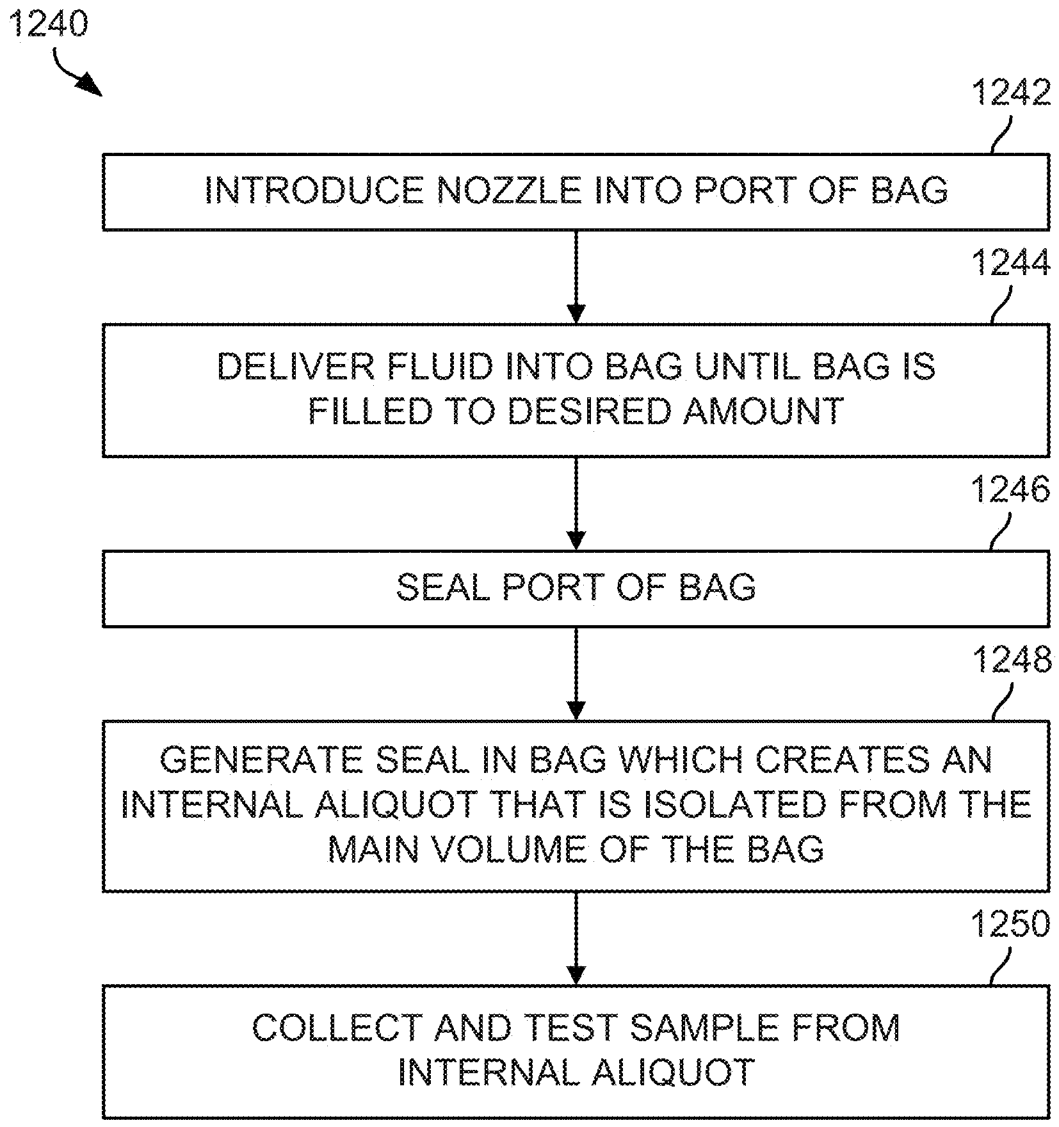
FIG. 9 depicts a flowchart detailing a number of example actions which may be executed to package fluid within a bag.

Referring now to FIG. 9, a flowchart 1240 depicting a number of example actions which may be executed to package fluid within a bag 26 is shown. In block 1242, a filling nozzle may be introduced into a port 392 of a bag 26. Fluid may be delivered through the filling nozzle into the interior volume of the bag 26 in block 1244. The bag 26 may be filled until a desired volume of fluid has been transferred into the interior of the bag 26. In block 1246, the nozzle may be removed from the port 392 and the port 392 may be sealed. Where the bag 26 is included as part of a fill receiving set 24, a nozzle may not be used. Instead, the port 392 of the bag 26 may receive fluid from a manifold 20. When the desired amount has been filled into the bag 26, the port 392 may be sealed and the bag 26 may be served from the manifold as described elsewhere herein.

In block 1248, a seal may be generated within the bag 26. This seal may create an internal aliquot within the interior volume of the bag 26 that is isolated from the main volume of the bag 26. In block 1250, a sample of fluid from the internal aliquot may be collected and tested. Where the bag 26 is included as part of a fill receiving set 24, a nozzle may not be used. Instead, the port 392 of the bag 26 may be filled through a manifold 20. When the desired amount has been filled into the bag 26, the port 392 may be sealed and the bag 26 may be served from the manifold as described elsewhere herein.

Figure 10:
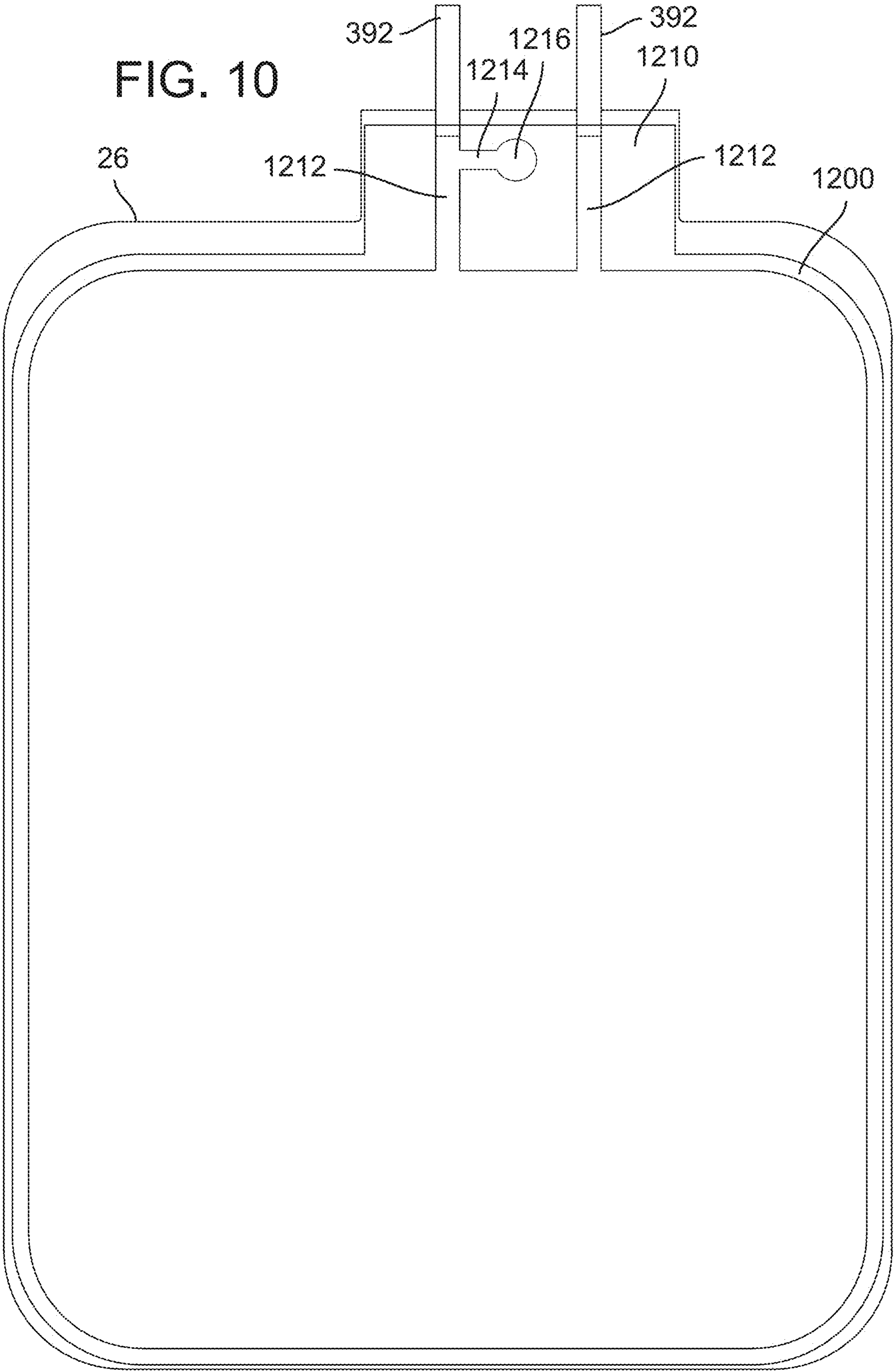
FIG. 10 depicts another example bag having a sampling reservoir disposed in an open region of its peripheral seal.

Referring now to FIG. 10, another exemplary bag 26 is depicted. As shown, the bag 26 includes two ports 392. These ports 392 may be sealed into a peripheral seal 1200 which defines the interior volume of the bag 26. In the example embodiment, the peripheral seal 1200 includes an enlarged section 1210 where the ports 392 are coupled into the bag 26. The enlarged section 1210 may have a width which is greater than the rest of the peripheral seal 1200 and may have one or more features defined therein. These features may be defined by leaving select areas open or unsealed when the enlarged section 1210 of the peripheral seal 1200 is formed.

In the example embodiment, the ports 392 may not extend all the way through the enlarged section 1210. As shown, the ports 392 extend partially into the enlarged section 1210 and are aligned with channels 1212. The channels 1212 may be unsealed regions which are defined during the formation of the enlarged portion 1210 of the peripheral seal 1200. The channels 1212 may extend from the terminal end of the ports 392 to the interior volume of the bag 26. Thus, the ports 392 in combination with their respective channels 1212 may provide fluid communication into and out of the bag 26 for filling and delivery of fluid in the bag 26. One pair may, for example, be a filling access which is sealed after filling and receives fluid from a filling nozzle 1421 or manifold 20. The other may be a delivery flow path which can, for instance, be spiked to access the fluid in the bag 26 when it is needed for delivery to a patient.

Figure 11:
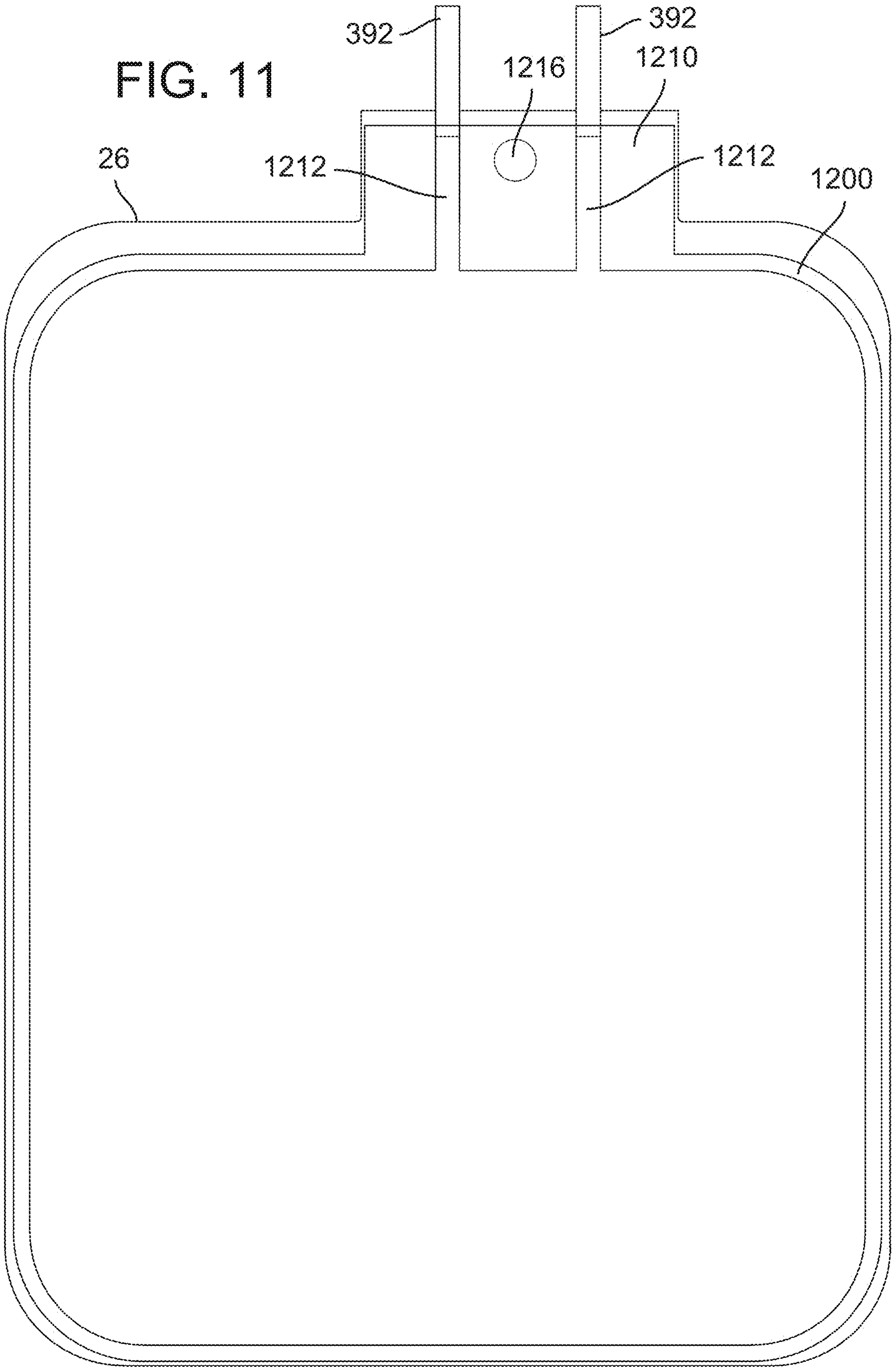
FIG. 11 depicts the example bag of FIG. 4 with the sampling reservoir isolated out of fluidic communication with the remainder of the bag.

As shown, one of the channels 1212 includes a branch 1214. The branch 1214 may extend to a sampling reservoir 1216 which is included within the enlarged portion 1210 of the peripheral seal 1200. The sampling reservoir 1216 and branch 1214 may again be defined as open regions during the formation of the enlarged portion 1210 of the peripheral seal. As the bag 26 is filled, the branch 1214 and the sampling reservoir 1216 may be in communication with the interior volume of the bag 26. Thus, when the bag 26 has been filled, fluid within the sampling reservoir 1216 and the interior volume of the bag 26 may be in communication and should be compositionally the same. Once the bag 26 is full, and referring now to FIG. 11, the sampling reservoir 1216 may be isolated from the interior volume of the bag 26. In certain examples, this may be accomplished by heat sealing (or otherwise sealing) the branch 1214 or a portion thereof closed. Thus, as above, an internal aliquot of fluid may be segregated within the bag 26.

Figure 12:
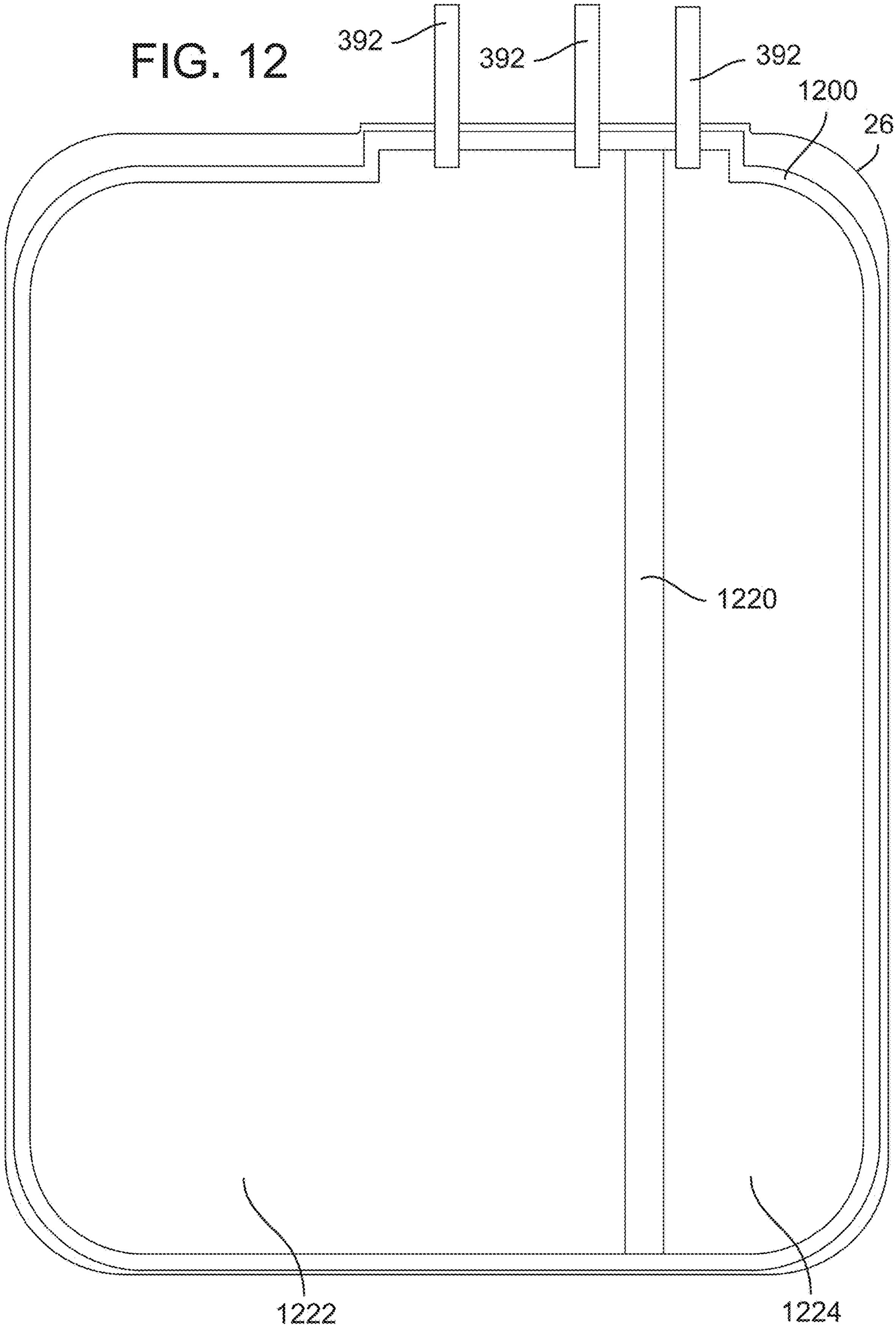
FIG. 12 depicts an exemplary bag with a first compartment and a second compartment.

Referring now to FIG. 12, another exemplary bag 26 is depicted. As shown, the bag 26 includes three ports 392. These ports 392 may be sealed into a peripheral seal 1200 of the bag 26. The bag 26 may also include an interior seal 1220. The interior seal 1220 in conjunction with the peripheral seal 1200 may define to a first interior compartment 1222 and a second interior compartment 1224. The compartments 1222, 1224 may have different volume capacities. The interior seal 1220 may extend between two of the ports 392 such that one of the compartments 1222, 1224 is accessible via a single port 392 and the other of the compartments 1222, 1224 is accessible via the remaining two ports 392. The compartment 1222, 1224 accessible via only one port 392 may be, but need not necessarily be, the smaller of the compartments 1222, 1224. In the example embodiment, the second compartment 1224 has a smaller capacity than the first compartment 1222.

The smaller volume compartment 1224 may be filled through the port 392. The port 392 leading to the small volume compartment 1224 may then be sealed. The smaller compartment 1224 may thus be filled to contain an isolated sample aliquot which may be drawn from to conduct various testing. The larger compartment 1222 may contain the medical fluid preparation that is intended for delivery to a patient. The larger compartment 1222 may be filled through one of the ports 392 which is then sealed. The other port 392 communicating with the larger compartment 1222 may be used for delivery of fluid. As the sampling aliquot in the small compartment is filled into a compartment which is fluidically isolated from the fluid to be delivered to the patient, the aliquot may be referred to as an external aliquot. Both compartments 1222, 1224 may be filled at the same time from a filling line which is branched. Thus the fluid in the external aliquot should be compositionally representative of the fluid in the larger compartment 1222.

The interior seal 1220 may be positioned and shaped so as to inhibit fluid contained in the larger compartment 1222 of the bag 26 to from being pocketed away from the ports 392 when fluid in the larger compartment 1222 is administered via a gravity feed. In the example, the internal seal 1220 is a vertical seal which extends along the length of the bag 26 in a direction substantially parallel to the axes of the ports 392. In alternative embodiments, the interior seal 1220 may include slanted portions similar to those shown in FIG. 8. Rounded contours which aid in directing fluid toward the ports 392 may also be used in other embodiments.

Figure 13:
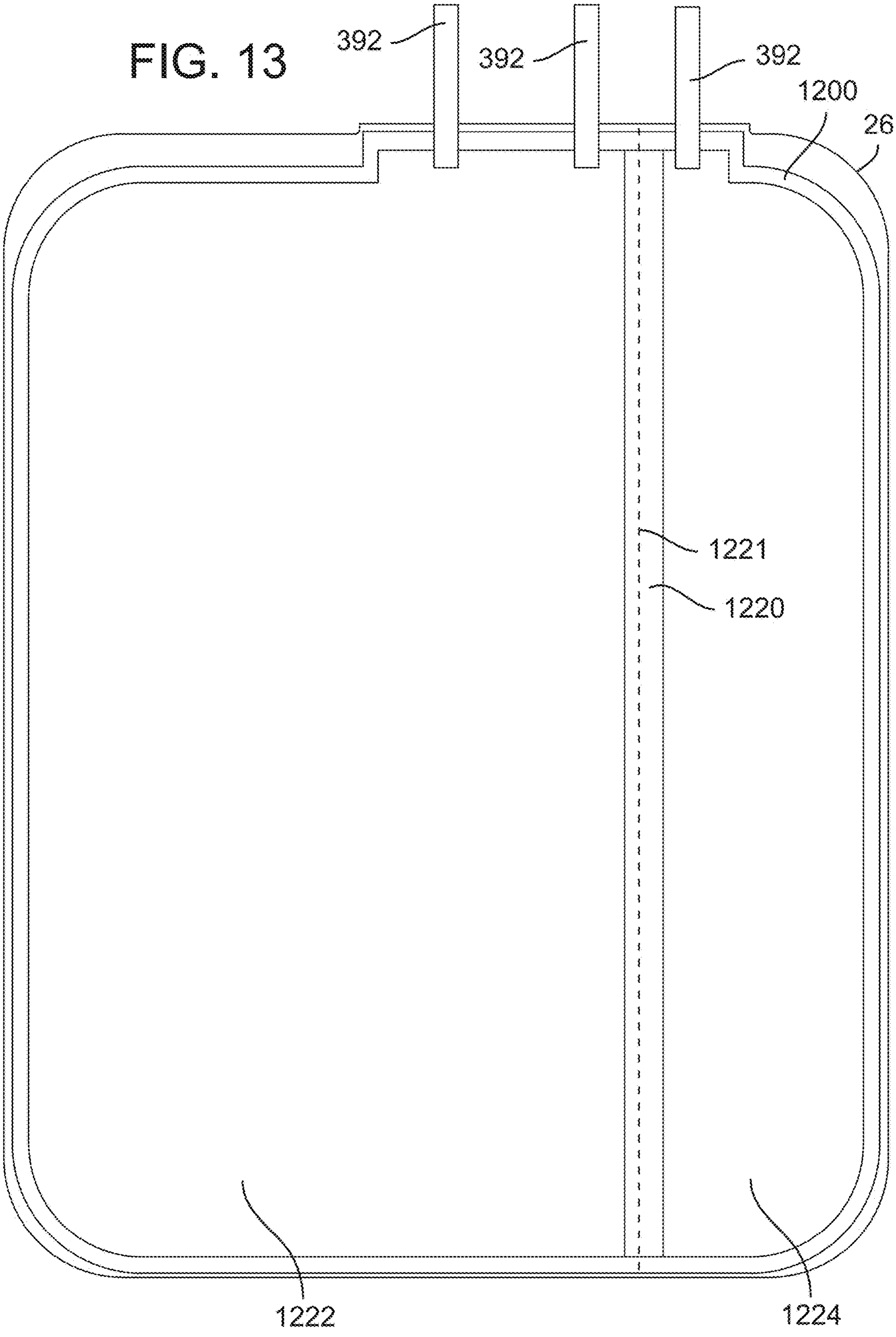
FIG. 13 depicts an exemplary bag with a seal having a perforation therein.

In certain examples, and referring now primarily to FIG. 13, the internal seal 1220 may be constructed with a perforation 1221 therein. The perforation 1221 may extend along the entire length of the internal seal 1220 and allow for the external aliquot filled into the bag 26 to be separated from the bag 26 after filling. In bags 26 where a perforation is present, each compartment 1222, 1224 of the bag 26 may include corresponding (e.g. matching) unique identifiers which may be machine and/or human readable. Any suitable identifier may be used such as any of those described herein. This may allow any testing done on the external aliquot which was separated from the bag 26 to be associated with the remaining, but now separate portion of the bag 26. Perforations 1221 which allow isolated aliquots to be separated from a bag 26 may be included in other bag 26 embodiments. For example, the partial barrier wall 1202 described in relation to FIG. 7 and FIG. 8 may include a perforation 1221. Additionally, the seal generated when the gap regions 1204 in the partial barrier wall 1202 are filled in to generate the complete barrier wall 1206 may include perforations 1221. This may allow the internal aliquot to be separated from the remaining portion of the bag 26 are isolation.

Figure 14:
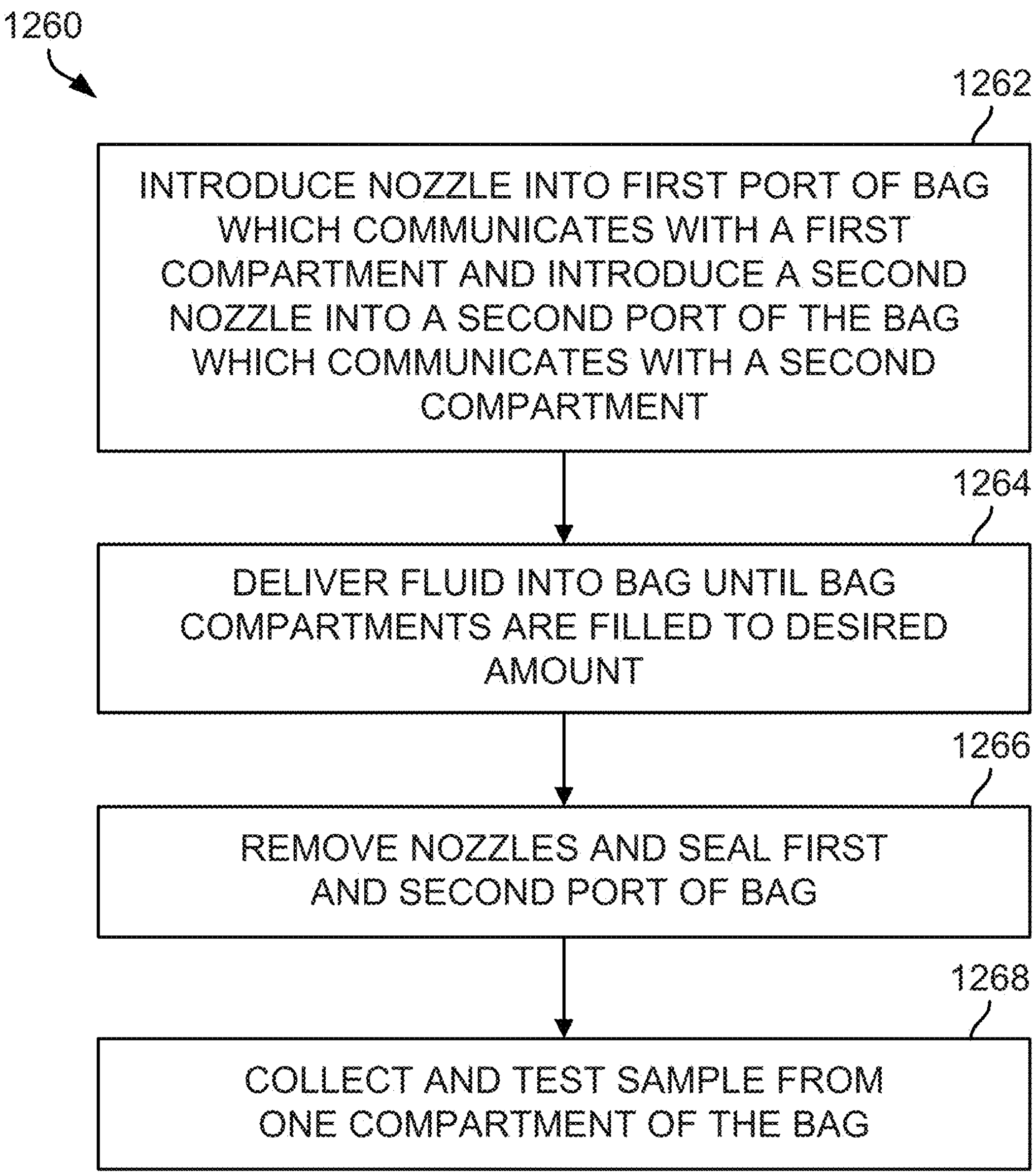
FIG. 14 depicts another flowchart detailing a number of example actions which may be executed to package fluid within a bag.

Referring now to FIG. 14, a flowchart 1260 detailing a number of example actions which may be executed to package fluid within a bag 26 is shown. In block 1262, a nozzle may be introduced into a first port 392 of a bag 26 which may communicate with a first compartment in the bag 26. A second nozzle may also be introduced into a second port 392 of the bag 26 which communicates with another compartment of the bag 26 in block 1262. Fluid may be delivered into the bag 26 until the bag 26 compartments are filled to a desired amount in block 1264. In block 1266, the nozzles may be removed from the first and second ports 392 and the first and second port of the bag 26 may be sealed. This may create a first compartment which may be in communication with a third port through which the contents of the first compartment may be administered. This may also create an external aliquot of fluid in the second compartment (e.g. the smaller compartment) which may be used for testing. In block 1268, a sample from the external aliquot may be collected and tested. Where the bag 26 is included as part of a fill receiving set 24, nozzles may not be used. Instead, the ports 392 of the bag 26 may receive fluid through a manifold 20. When the desired amount has been filled into the bag 26, the port 392 may be sealed and the bag 26 may be served from the manifold 20 as described elsewhere herein.

Figure 15:
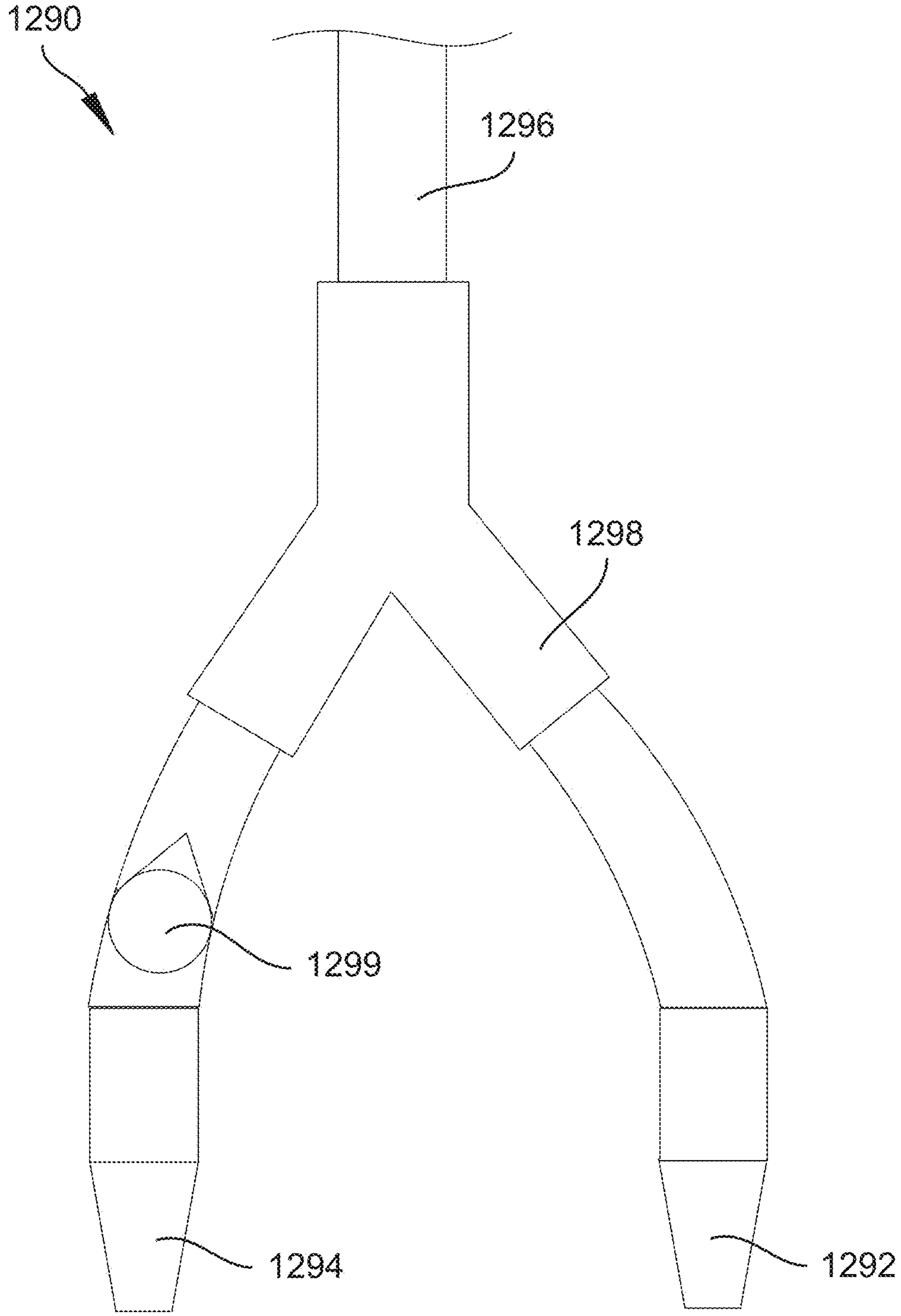
FIG. 15 depicts an example filling nozzle.

Referring now also to FIG. 15, an example filling implement 1290 is depicted. As shown, the filling implement 1290 includes a first filling nozzle 1292 and a second filling nozzle 1294. Such a filling implement 1290 may be utilized to fill a bag 26 such as that shown in FIG. 12. The filling implement 1290 includes a common line 1296 and a furcation 1298 which branches fluid flowing in the common line 1296 to each of the first and second nozzles 1292, 1294. Each of these nozzles 1292, 1294 may deliver fluid into separate compartments included in a bag 26. The second nozzle 1294 may be associated with an unpowered valve which halts flow into the associated compartment when that compartment reaches capacity. In the example embodiment a check valve 1299 is depicted. As the compartments of the bag 26 may be of differing sizes, one compartment may completely fill prior to the large compartment. Once the smaller of the compartments has filled, the pressure in that compartment may begin to build (relevant seals in the bag 26 may be constructed sufficiently soundly to withstand this pressure). The check valve 1299 may then actuate and prevent further flow into the smaller compartment after it is filled to capacity.

Figure 16:
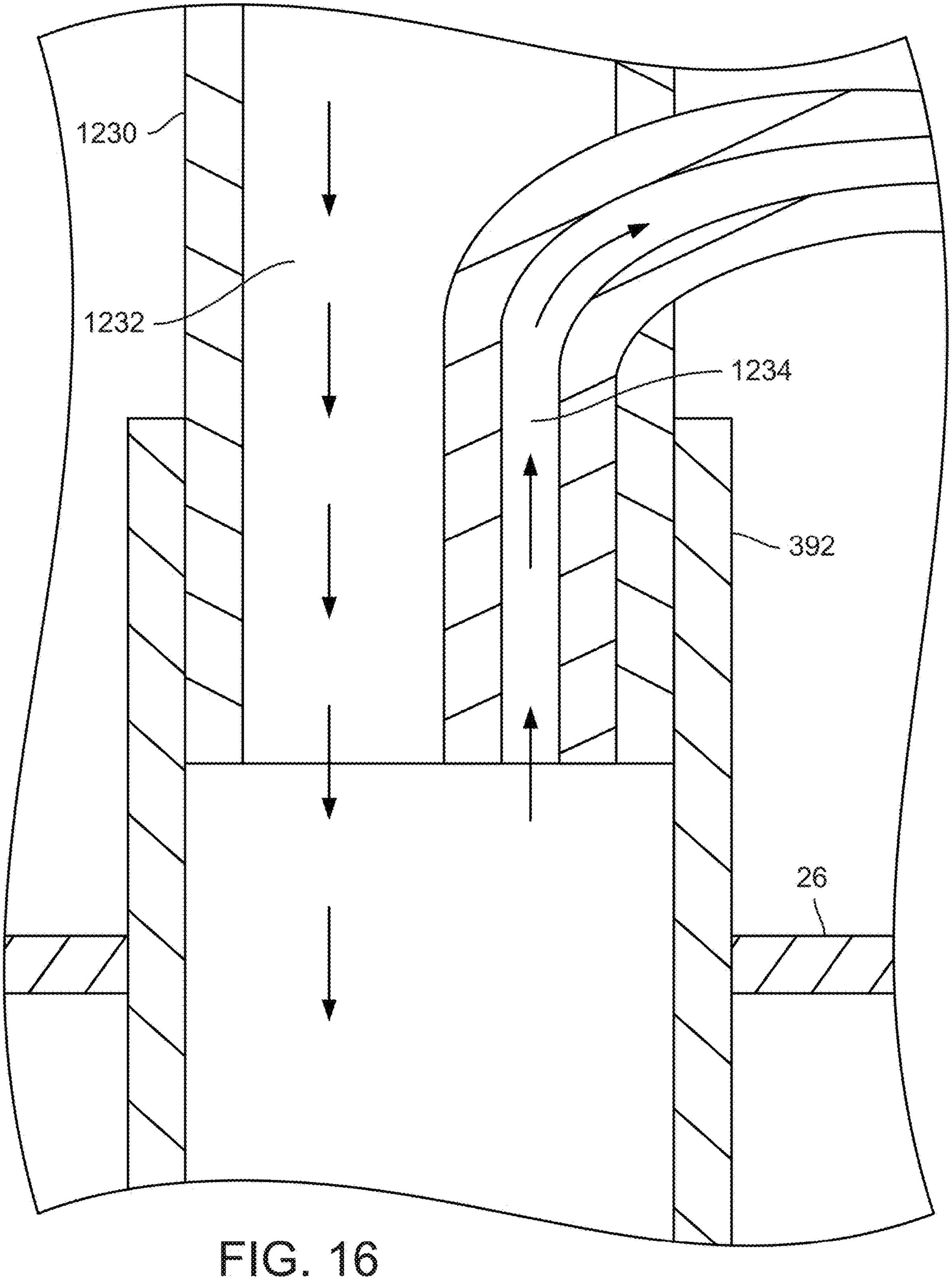
FIG. 16 depicts an example multi-lumen filling nozzle which may be used to fill a bag and collect an aliquot of fluid for sampling.

Referring now to FIG. 16, in some embodiments the filling nozzle 1230 may include features which may allow an aliquot of fluid to be isolated from the fluid filled into the bag 26. This aliquot may be created as fluid is filled into the bag 26. In certain examples, the aliquot may be collected by overfilling the bag 26 and collecting fluid which flows out of the bag 26 after the bag 26 has been filled to its capacity during the filling operation.

As shown, a filling nozzle 1230 may be inserted into a port 392 of a bag 26. The filling nozzle 1230 may include a first lumen 1232 and a second lumen 1234. The first lumen 1232 may be in fluid communication with a fluid source and may receive fluid which is pumped or otherwise delivered from the fluid source. Fluid from the fluid source may exit the first lumen 1232 and fill the bag 26. The second lumen 1234 may extend out of the filling nozzle 1230 and may be in communication with an aliquot collection reservoir. As fluid in excess of the capacity of the bag 26 is ejected out of the first lumen 1234, this overfilling may cause fluid in the bag 26 to be pushed out through the second lumen 1234. The fluid pushed out of the bag 26 through the second lumen 1234 should be compositionally the same as the rest of the fluid in the bag 26. Thus, the fluid passing to the aliquot collection reservoir during the period of overfilling may be representative of the contents of the bag 26 when tested.

In an alternative embodiment, the bag 26 may include two ports 392. The bag 26 may be overfilled through a first of the ports 392 and the second of the ports 392 may be in communication with an aliquot collection reservoir. After the bag 26 is filled to its capacity, additional fluid may cause fluid within the bag 26 to be force out of the bag 26 through the second port 392 and into the aliquot collection reservoir. The aliquot collection reservoir may be separated from the bag 26 and the second port 392 may be closed with a spikeable access or septum. The filling nozzle may be removed from the first port 392 and the first port 392 may be sealed. As the fluid pushed into the aliquot collection reservoir was displaced from the interior volume of the bag 26, the fluid should be compositionally the same as the rest of the fluid in the bag 26 and testing performed on a sample from the aliquot should be representative of the bag 26 contents.

Figure 17:
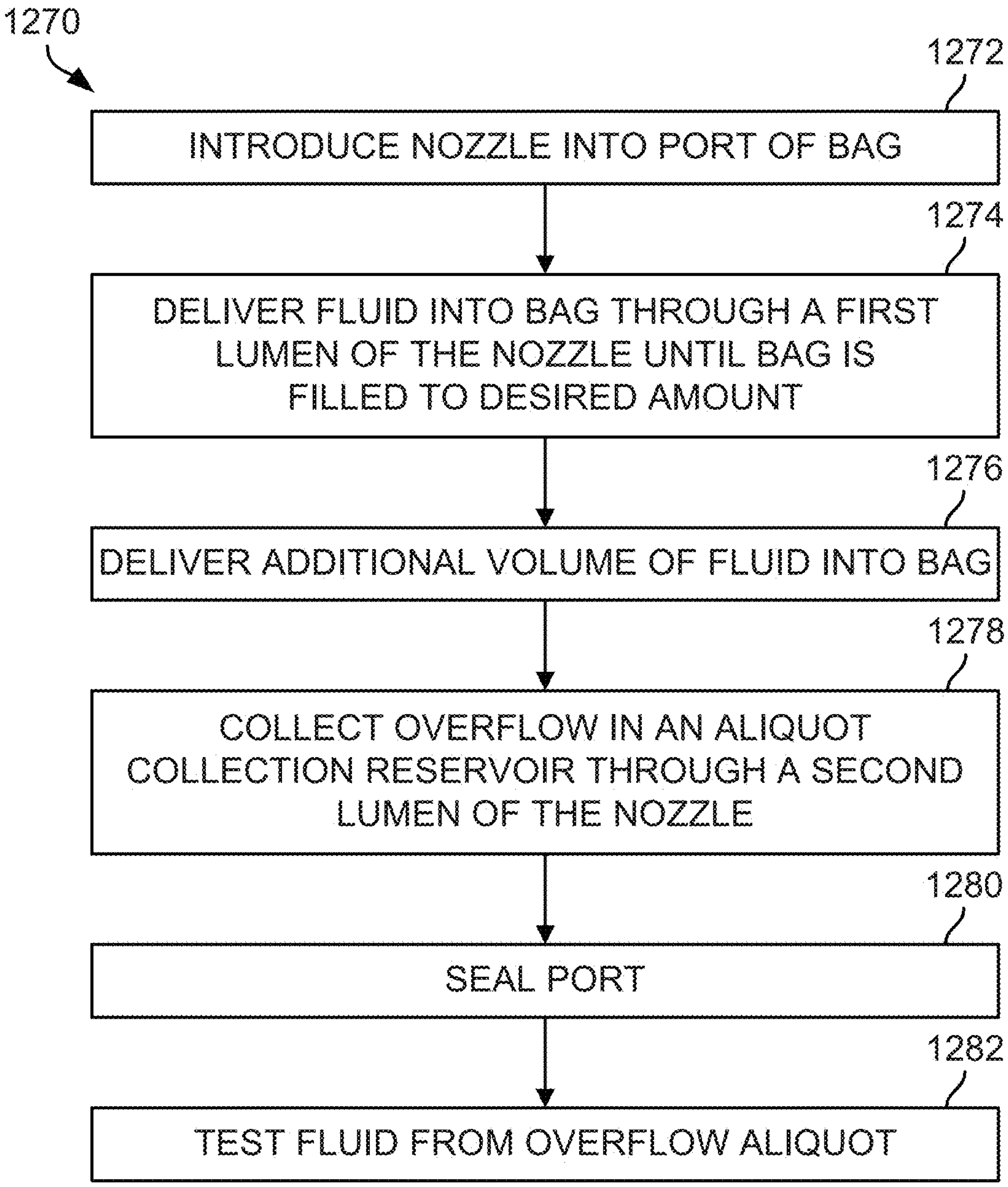
FIG. 17 depicts another flowchart detailing a number of example actions which may be executed to package fluid within a bag.

Referring now to FIG. 17, a flowchart 1270 detailing a number of exemplary steps which may be executed to package fluid within a bag 26 is shown. As shown, in block 1272, a nozzle 1230 may be introduced into a port 392 of the bag 26. In block 1274, fluid may be delivered into the bag 26 through a first lumen 1232 of the fill nozzle 1230 until the bag is filled to a desired amount. In block 1276, an additional volume of fluid may be delivered to the bag 26 through the first lumen 1232 of the nozzle 1230. In block 1278, the overflow out of the bag 26 may be collected in an aliquot collection reservoir through a second lumen 1234 in the nozzle 1230. In block 1280, the nozzle 1230 may be removed from the port 392 and the port 392 may be sealed closed. In block 1282, fluid from the overflow aliquot may be tested.

Figure 18:
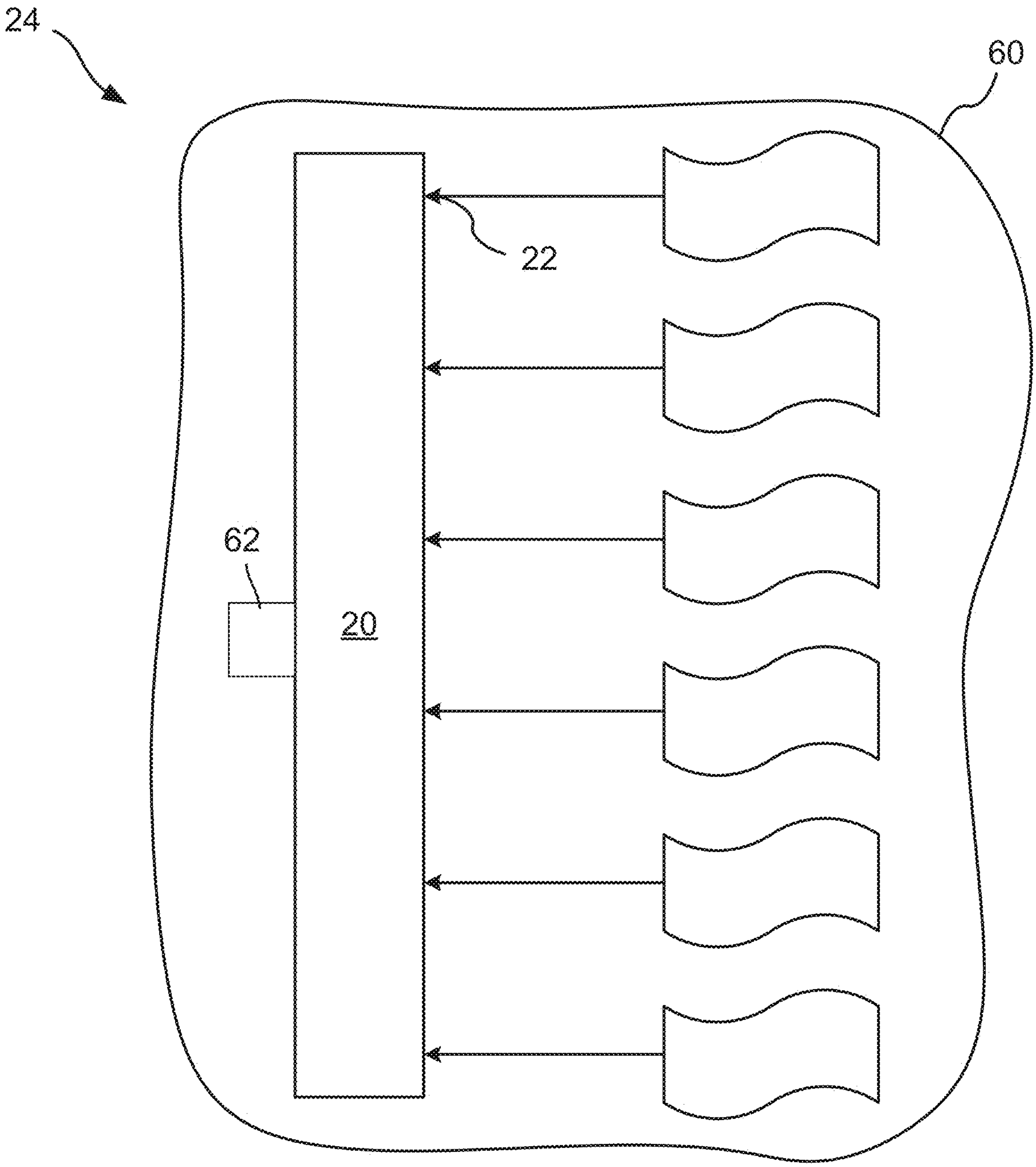
FIG. 18 depicts a diagrammatic example of a fill receiving set.

Referring now to FIG. 18, an example fill receiving set 24 is depicted. As shown, the fill receiving set 24 includes a plurality of bags 26 and administration sets 28. The manifold interface elements 22 of each administration set 28 are attached to a manifold 20 which is included as part of the fill receiving set 24. This attachment may be performed in a controlled sterile environment before placement of the bags 26, administration sets 28 and manifold 20 into an over pack 60. The over pack 60 may be a sealed bag or blister pack in certain embodiments. The entirety of the bags 26, administration sets 28 and manifold 20 may all be sterilized via an appropriate method perhaps after packaging within the over pack 60. Gamma sterilization, ethylene oxide, and/or electron beam sterilization may, for example be used. The over pack 60 may maintain a sterile environment which protects the fill receiving set 24 from contamination during storage. Any fill receiving set 24 described herein may be sterilized as outlined above. Embodiments which fill bags 26 individually may also receive bags 26 and perhaps a dispenser (e.g. bag magazine) within an over pack 60 sterilized as described above. Stopper dispensers described elsewhere herein may be similarly sterilized and provided in an over pack 60. Any other consumables described herein which replaced during operation of the system 10 may be provided sterilized in an over pack 60.

In some embodiments, various protective caps or films may be included over some components of the fill receiving set 24. For example, a film or cap may be included on any couplers on the manifold 20 that are not pre-connected to another component. This may facilitate establishment of aseptic connections if manipulation of the bags 26 and administration sets 28 after being removed from the over pack 60 is needed to install fill receiving set 24 into the system 10. The cap or film may be removed shortly before connection or installation to the system 10.

In some embodiments, the manifold interface elements 22 of the administration sets 28 may not be pre-connected to the manifold 20. The system 10 may make any necessary connections in an automated manner. This may be accomplished as described in U.S. application Ser. No. 16/384,082, filed Apr. 15, 2019, entitled Medical Treatment System and Methods Using a Plurality of Fluid Line, which is hereby incorporated by reference herein it its entirety.

In embodiments where the system 10 makes connections in an automated fashion, each of the manifold interface elements 22 may include a cap which may be removed by the system 10. In such embodiments, the system 10 may include a drivable sled upon which the manifold interface elements 22 may be installed. A second sled which includes cap retainers or graspers may also be included. The second sled may displace toward the first sled to couple with the caps. The second sled may then be displaced from the first sled to remove the caps from the administration sets 28. The second sled may then retract out of a displacement path of the first sled. The first sled may be advanced toward the manifold 20 to seat the manifold interface elements 22 on couplers of the manifold 20. In some embodiments, the administration sets 28 or another filling conduit may include a piercable septum which maintains a sterile barrier for the interior volume of the associated bag 26 and administration set 28. In such embodiments, the manifold 20 couplers may include piercing members such as spikes or needles and the action of the first sled may result in the piercing members being driven through and into sealing engagement with the piercable septums to facilitate filling.

The manifold 20 may also include a coupler 62 for establishing fluid communication with the output of a medical water production device 14. In some embodiments, this coupler 62 may include a cap and may be driven into a piercing member (e.g. spike or needle) communicating with the output from the medical water production device 14 in the manner described above. In other embodiments, the coupler 62 may be a luer fitting. By providing the manifold 20 within the over pack 60 with the manifold interface elements 22 pre-connected to the manifold 20, only a single connection may be made to place the bags 26 and administration sets 28 in communication with the output stream of the medical water production device 14. This eliminates a need to make a number of aseptic connections. This may be particularly desirable in embodiments where a fill receiving set 24 includes a large amount of bags 26 and administration set 28.

Each of the bags 26 may be the same volume bag 26 in certain embodiments. The bags 26 may, however, be filled to a volume that is smaller than capacity if desired. This may allow for uniformity and simplicity in the system 10. There would not be a need to stock many different fill receiving sets 24 (mini-bag, 250 ml, 500 ml, 1 liter, and so on). In some embodiments, there may be two types of sets 24. One type of set 24 may include bags 26 which are a largest volume size bag of bags 26 intended to be used for relatively small fluid volumes. These bags may accommodate any fill volume from very small volumes up to some first maximum volume (e.g. 500 ml). Other maximum capacity cutoffs may be used. The other type of set 24 may include large volume size bags which can accommodate any fill volume in a range of high volume preparations up to a second maximum volume higher than the first maximum volume. The volume in a particular bag 26 as the bag 26 is filling may be determined by at least one of a scale, flow meter, and/or a fluid transfer monitoring system such as that described in in U.S. application Ser. No. 16/384,082, filed Apr. 15, 2019, entitled Medical Treatment System and Methods Using a Plurality of Fluid Line, which is hereby incorporated by reference herein it its entirety.

In some embodiments, the system 10 may include a printer or labeling component which may provide an indication of the fill volume of the bag 26 directly on the bag 26 or administration set 28. Alternatively, where the bag 26 may include a unique identifier, the system 10 may communicate with a database which associates the fill volume with that unique identifier. Through a communications network, the unique identifier may be looked up (e.g. via a barcode or data matrix scanner) to query the database for the bag's 26 fill volume. Where a printer or labeling component is included, the printer or labeler may also document any information which may be required by law or regulation on the bag 26.

The bag 26 may be filled to a specific amount less than the intended total administration volume in certain instances. One instance where this may be done is when there is an intention to inject a volume of drug into the bag 26. In such instances, the bag 26 may be filled so as to contain an appropriate amount of diluent to generate a solution at administration concentration. For example, if a patient is prescribed one liter of drug preparation at a certain concentration, the bag 26 may be deliberately under filled by an amount equal to the volume of concentrated drug to be injected in order to generate the correct concentration solution for that patient. The system 10 may communicate with a physician order entry system and the control system 15 may determine the proper fill volume based on the prescription the bag 26 is being generated for.

Fill receiving sets 24 may also exist for certain types of drugs. For example, a fill receiving set 24 constructed with or outfitted for use with light sensitive drugs (e.g. amphotericin B, nitroglycerin, etc.). In such embodiments, the administration sets 28 and bags 26 may be made of a light blocking material or may be fitted with light blocking covers or sleeves. In some instances, material used to form the lines or bags 26 may include a light blocking layer (e.g. of amber or green material).

In certain examples, a plurality of fill receiving sets 24 having different characteristics (e.g. bag size) may be concurrently installed in the system 10. The system 10 may fill a bag 26 from an appropriately sized fill receiving set 24 depending on the order that the system 10 is fulfilling. In such embodiments, the fill receiving set 24 may include an indicium (e.g. barcode, data-matrix, RFID, etc.) which may be read by the system 10 to allow the system 10 to determine the type of set 24 installed.

Figure 19A:
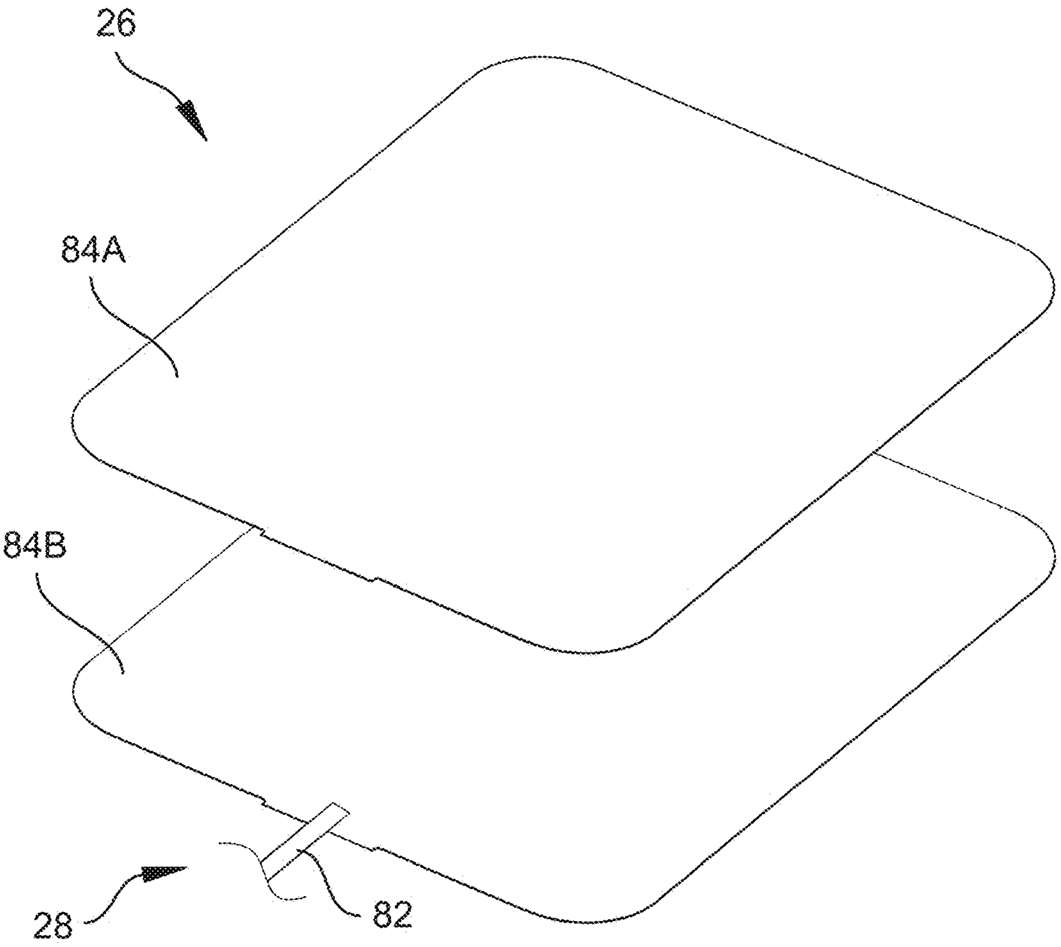
FIG. 19A depicts an exploded view of an example bag having an administration set.
Figure 19B:
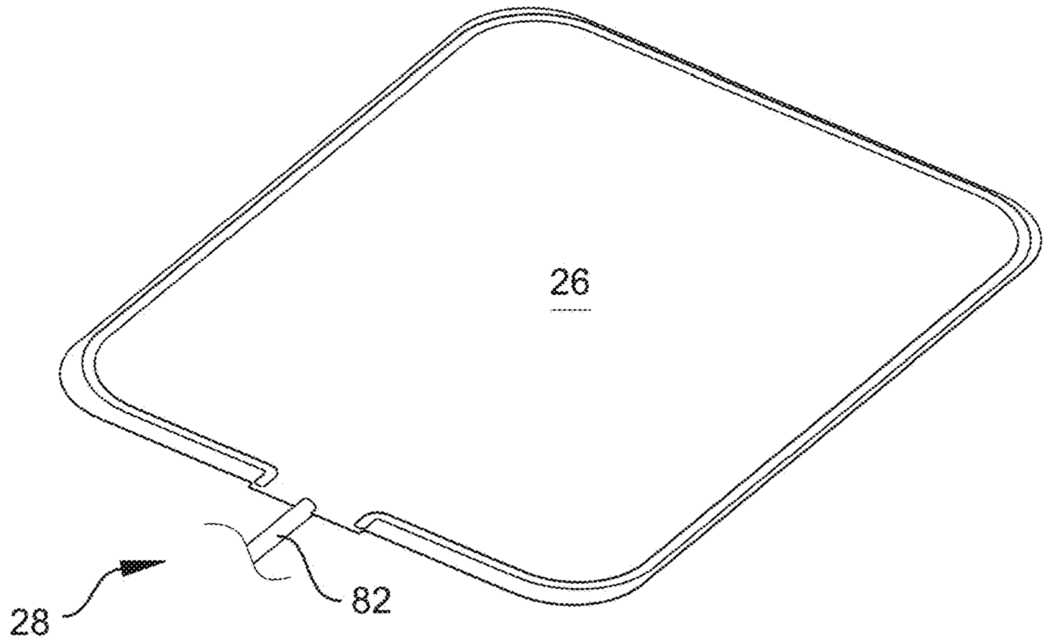
FIG. 19B depicts a top down view of an example bag having an administration set.

Referring now to FIGS. 19A-19B, the bags 26 and administration sets 28 included in a fill receiving set 24 may be integrated with one another. This may be desirable as it may allow for the administration set 28 to come pre-primed in certain embodiments. Additionally, it would remove the need to spike a bag 26. As a typical bag 26 can be difficult to hold and spike, an integrated set could make bags 26 more user friendly and remove an aseptic connection procedure that is performed during set up. The administration set 28 may be integrated into the bag 26 in a manner similar to that used to incorporate spike ports, injection ports, etc. into the peripheral seal of IV bags.

A bag 26 may, for example, be constructed of two separate sheets 84A, B of flexible material. The sheets 84A, B may be joined at their periphery via any suitable type of sealing method including solvent bonding, RF welding, heat sealing, adhesive, ultrasonic welding, etc. The sheets 84A, B may be made of any suitable material or laminate of materials. Tubing 82 may be similarly constructed. Layers of the laminate may be chosen and ordered to achieve desired objectives. For example, vapor or gas impermeable layer(s)

or other barrier layer(s), bonding layer(s), solution compatible layer(s), and reinforcing or durability increasing layer(s) may be included. The materials chosen may be informed by intended sterilization method, weight, optical clarity, durometer, flexibility, heat resistance, lubriciousness, elastic modulus, required materials thicknesses, ease of molding (e.g. molding fittings to end of tubing), strength, propensity to kink, light blocking ability, dielectric/polar properties, etc. Materials which may be used to construct the bags and tubing are provided in Table 1 below:

| | | |
|---|---|---|
| Polymers | Homopolymers | Hydrocarbon copolymers |
| Polyesters | Polybutadiene | Polyamides |
| Styrene | Polyvinylchloride | polyolefins |
| Polypropylene | Propylene ethylene copolymer | Polyethylene copolymers |
| LDPE, VLDPE, ULDPE | MDPE | HDPE |
| Silicone | Cross-linked polyethylene | Synthetic Rubber |
| Thermoplastic Rubbers | Rubber | Latex |
| Fluoropolymers | Nylon | Plastics free of phthalate plasticizers or free of DEHP |
| Ethylene vinyl acetate | Polyether block amide | Thermoplastic Polyurethane |
| Plastics containing polar molecules | RF weldable polyolefin | |

Where the sheets 84A, B are of a multilayer construction they may be formed in extrusion lamination or co-extrusion processes for example. The tubing 82 of the administration set 28 may be made as a multi-layer construction (e.g. extrusion) of different materials. Where dissimilar materials are used an adhesive layer may be present in certain embodiments. The outer layer of the tubing 82 may have a lower melting point range than at least the inner layer(s) of the tubing 82. The melting point range of the outer layer of the tubing 82 may overlap with that of the bag 26 material. During construction, the tubing 82 may be compressed between the sheets 84A, B and heated in a welding process. The outer layer of the tubing 82 may be joined to the bag 26 and the inner layer may maintain a patent lumen which allows flow in and out of the bag 26 as shown in FIG. 19B. In alternative embodiments, the bag 26 may be blow molded. In such embodiments, the tubing 82 may be attached at the periphery in a similar welding process.

Figure 20:
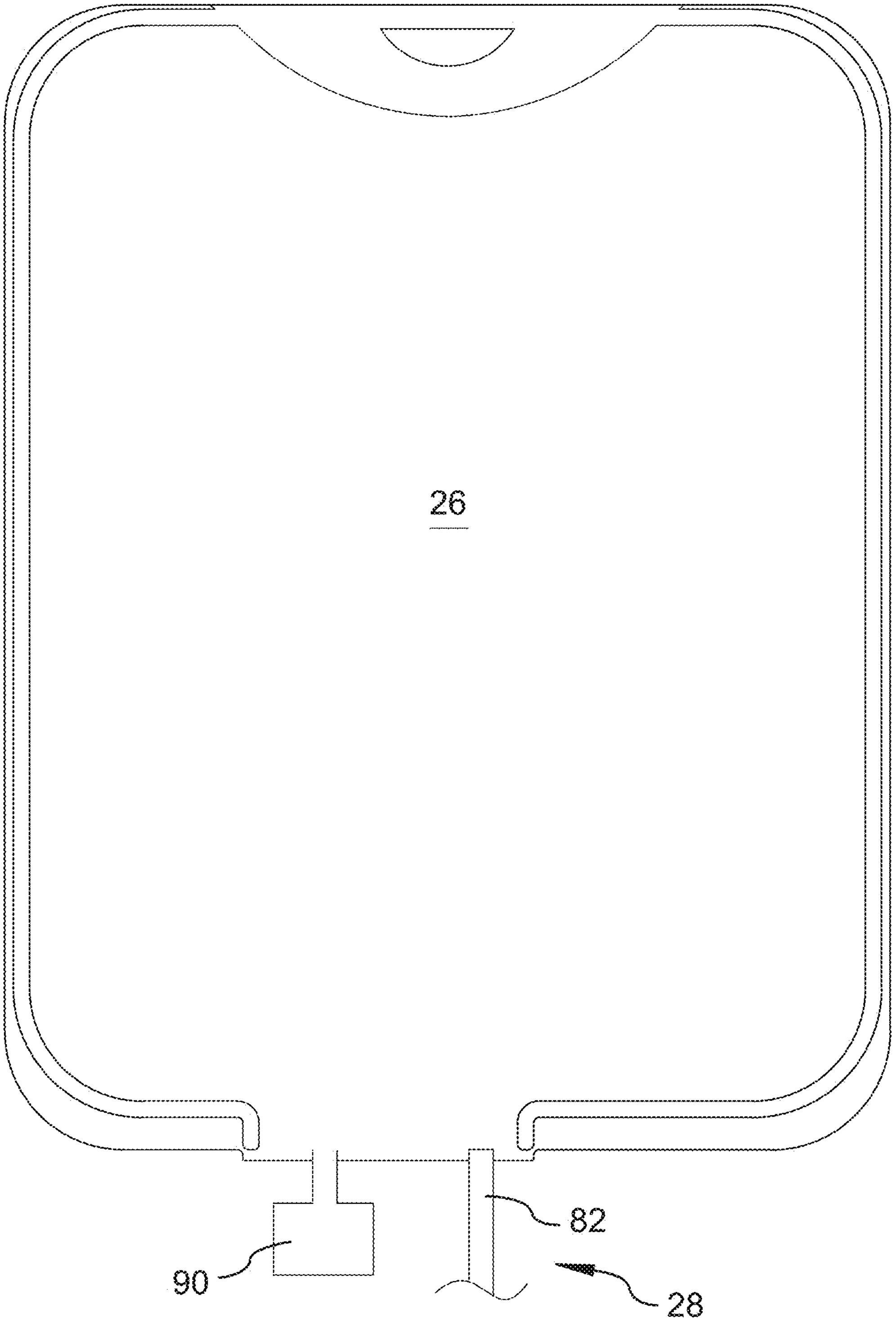
FIG. 20 depicts a top down view of another example bag.
Figure 21:
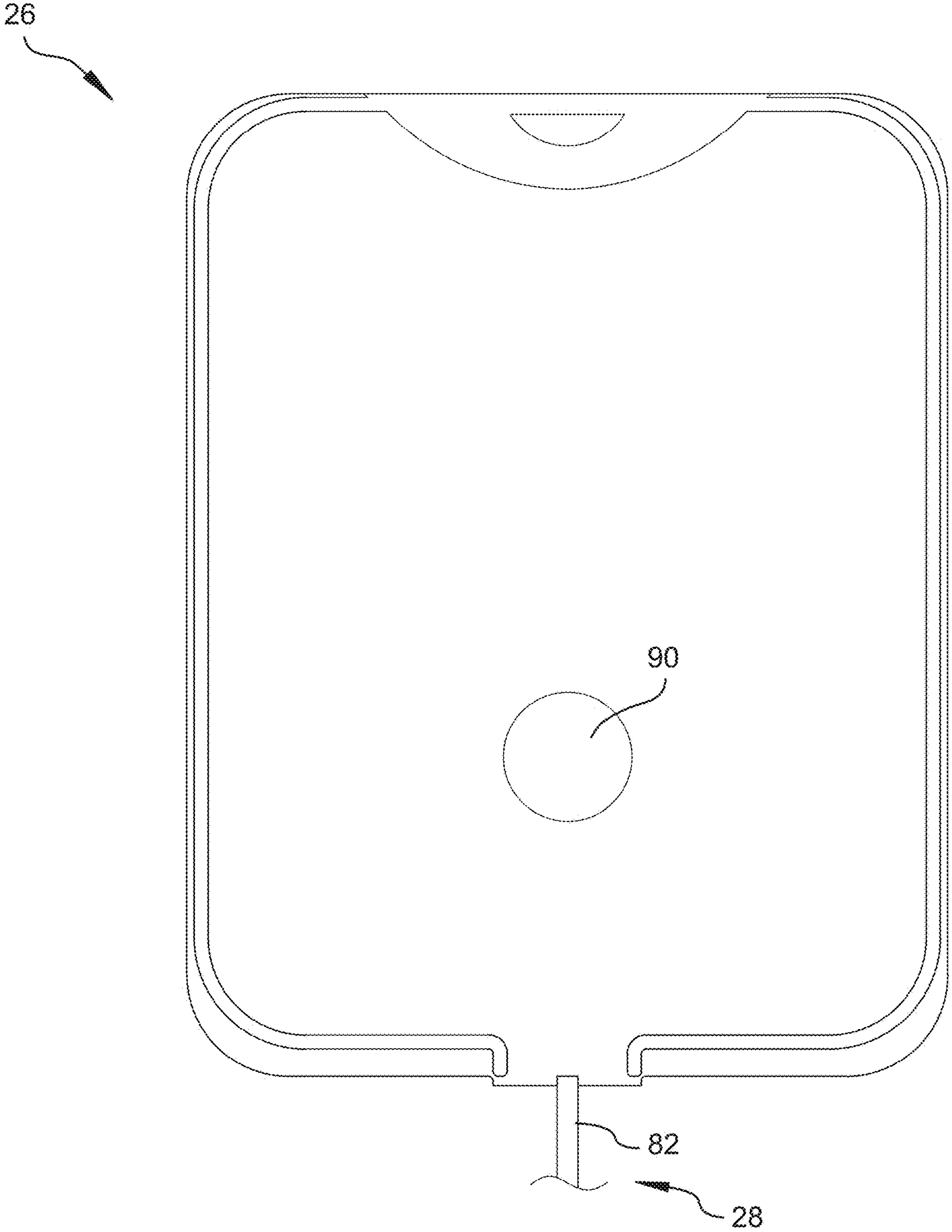
FIG. 21 depicts a top down view of another example bag.

FIG. 20 depicts another example bag 26. The exemplary bag 26 in FIG. 20 includes an administration set 28. The bag 26 also includes an example filling port 90. The example filling port 90 may interface with either a manifold 20 or may directly interface with an output of a medical water production device 14. The filling port 90 may be integrated into the bag 26 as described above for the tubing 82 and may include a self-sealing septum, plug, cap, or similar sealing arrangement. This sealing member may be installed after the filling process has completed. Alternatively, a sealing member may not be used and a welded seal may be formed instead. The filling port 90 may also be used as an injection port which may allow for addition of medication into the bag 26 as desired. In other embodiments, the fill port 90 may be located in a side of the bag 26 where the administration set 28 is not attached. The fill port 90 may also be included in a face of one of the panels which are joined together to form the bag 26 as shown in FIG. 21.

Figure 22A:
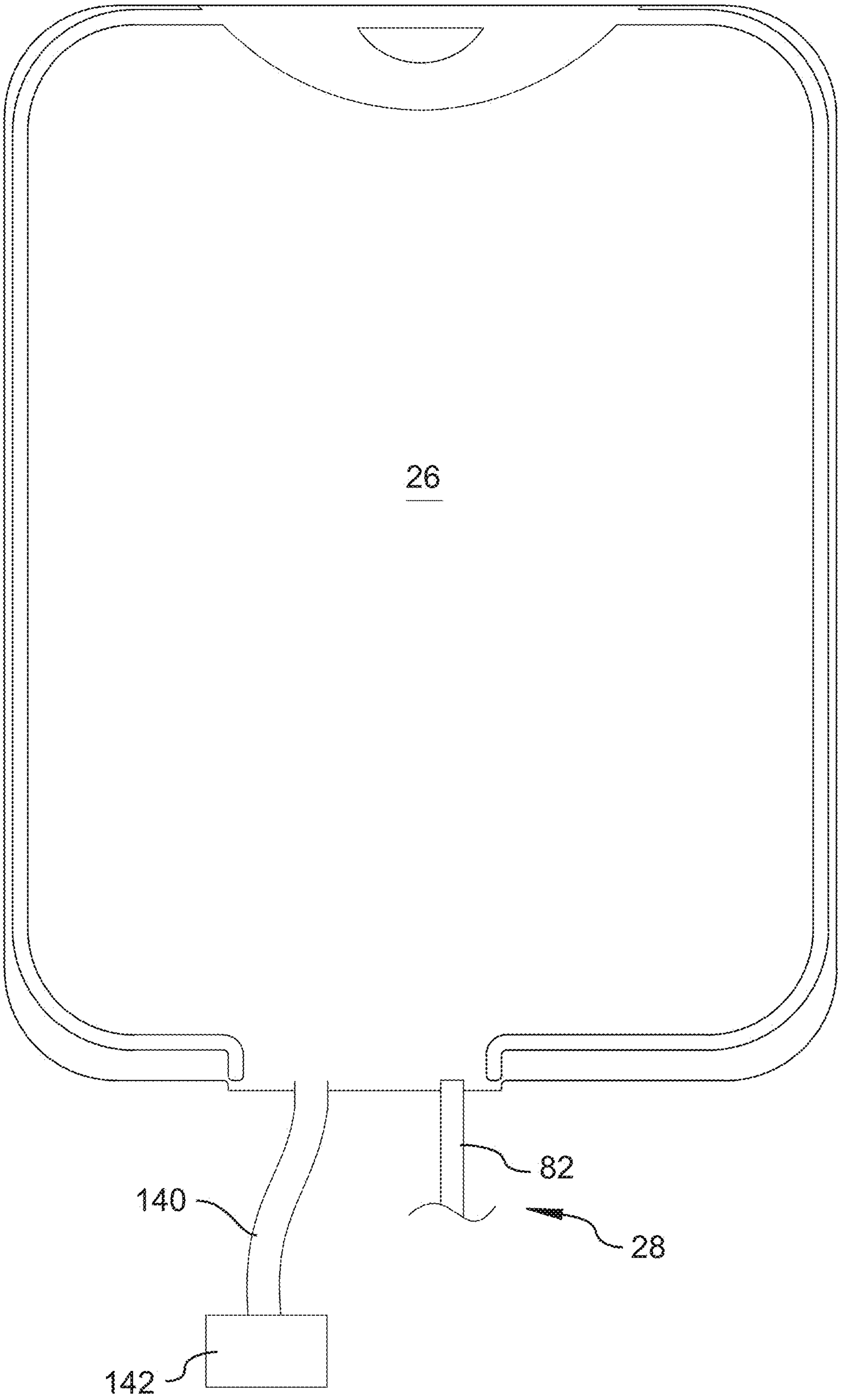
FIGS. 22A-22F depict views of a bag including an administration set and a filling line which is in various stages of being sealed closed.

FIG. 22A depicts an alternative bag 26 design in which the administration set 28 is integrated into the bag 26 as discussed elsewhere herein, but is accompanied by a separate filling line 140. The filling line 140 may be integrated into the bag 26 similarly to the administration set 28. The filling line 140 may include a coupler 142 which interfaces with the system 10 to receive a fluid stream during filling. The coupler 142 may be located on a portion of the filling line 140 which is sacrificial and removed after filling. In some embodiments, the coupler 142 may be molded into and form part of this portion of the line. The coupler 142 may be a luer fitting in some examples. In other embodiments, a piercable septum as described above may be included.

Figure 22B:
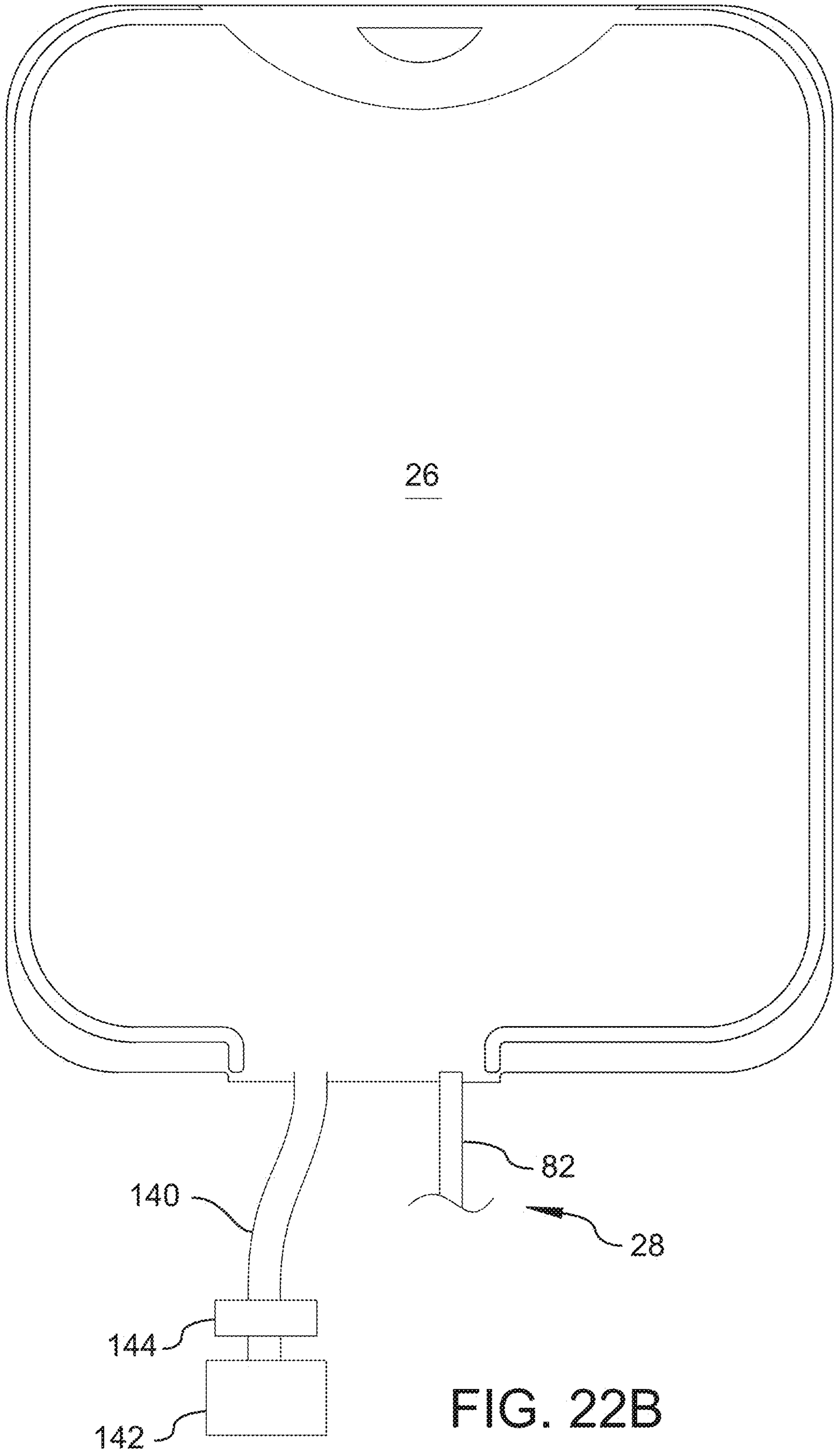
Figure 22C:
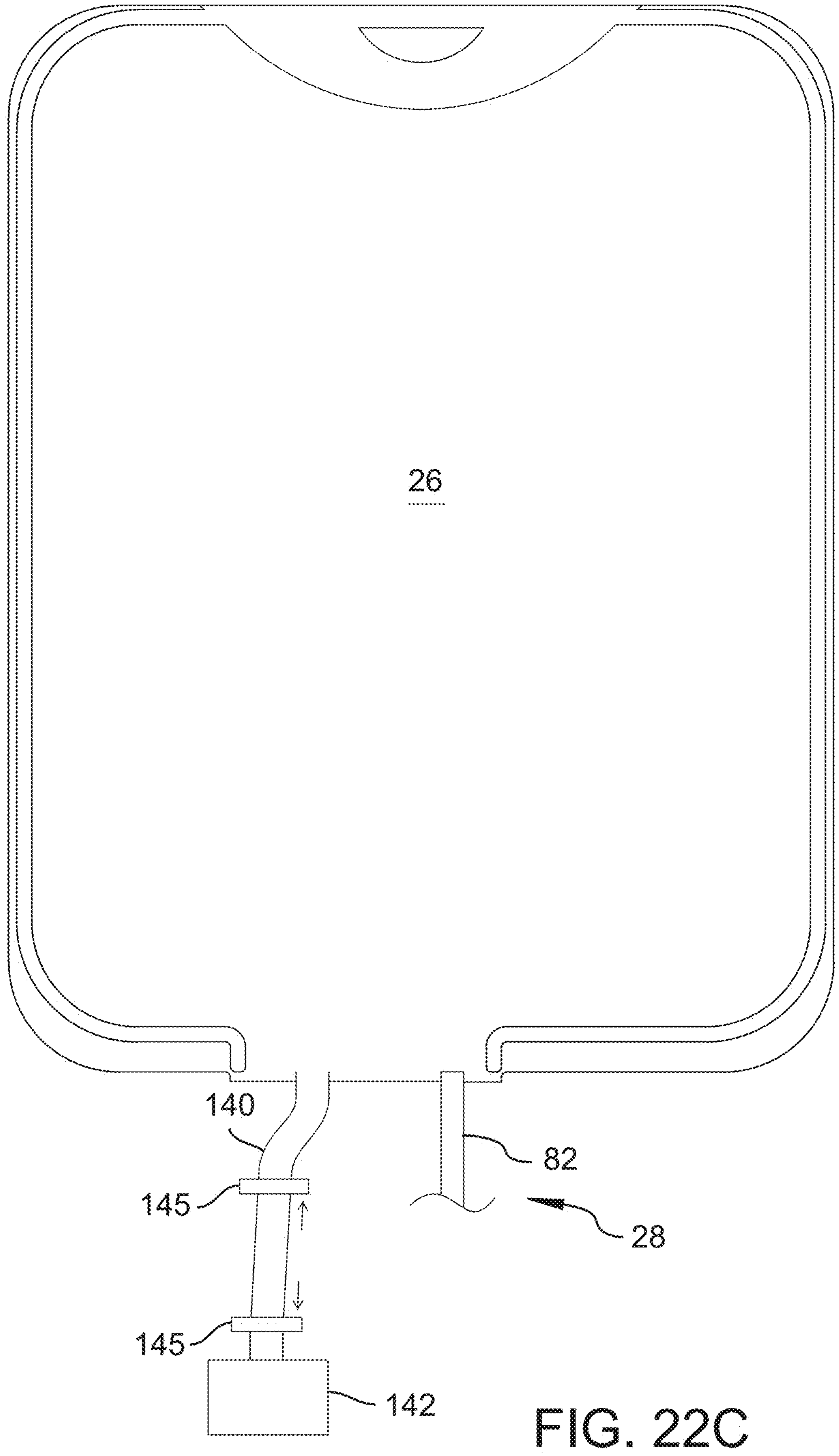
Figure 22D:
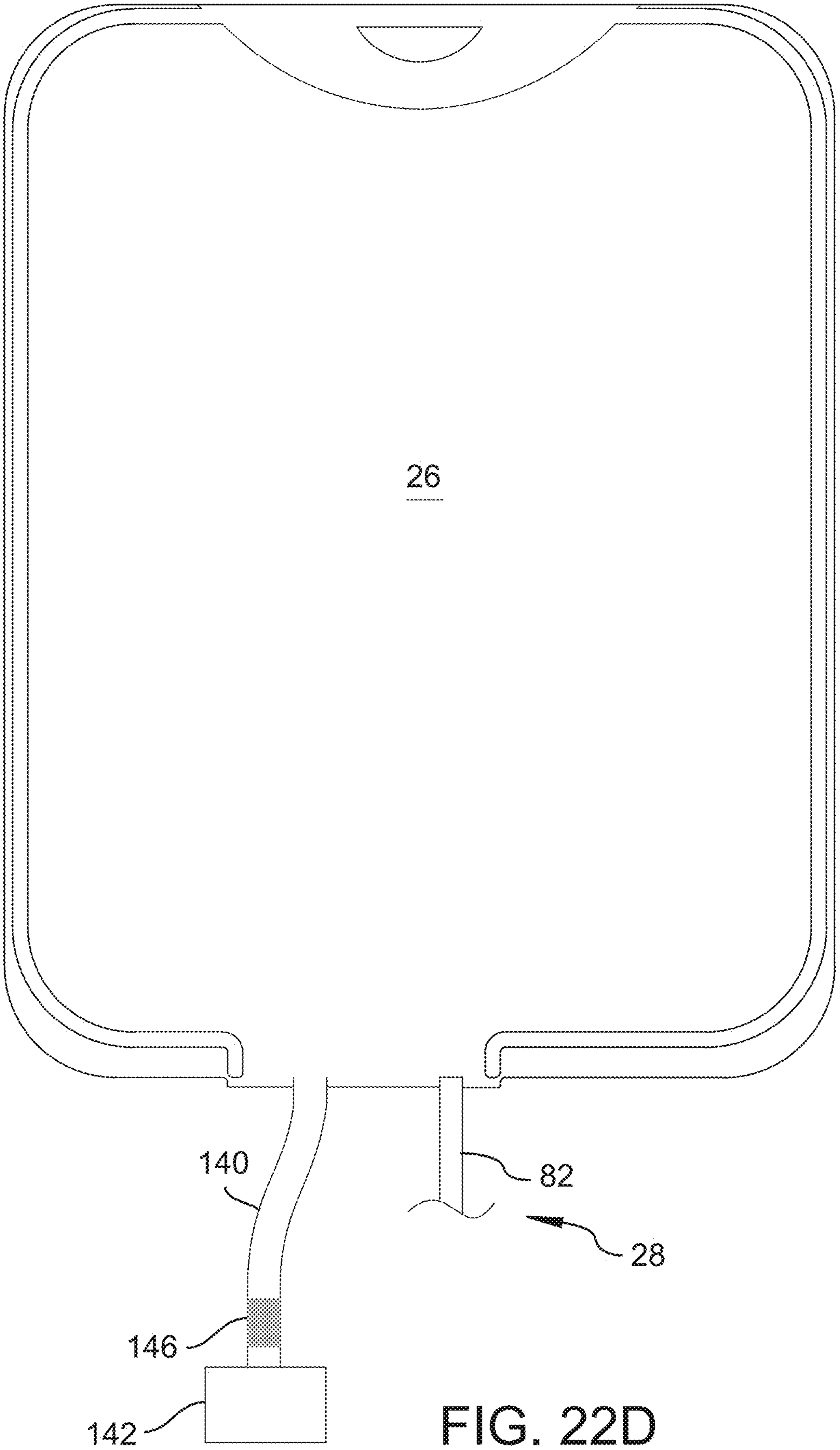
Figure 22E:
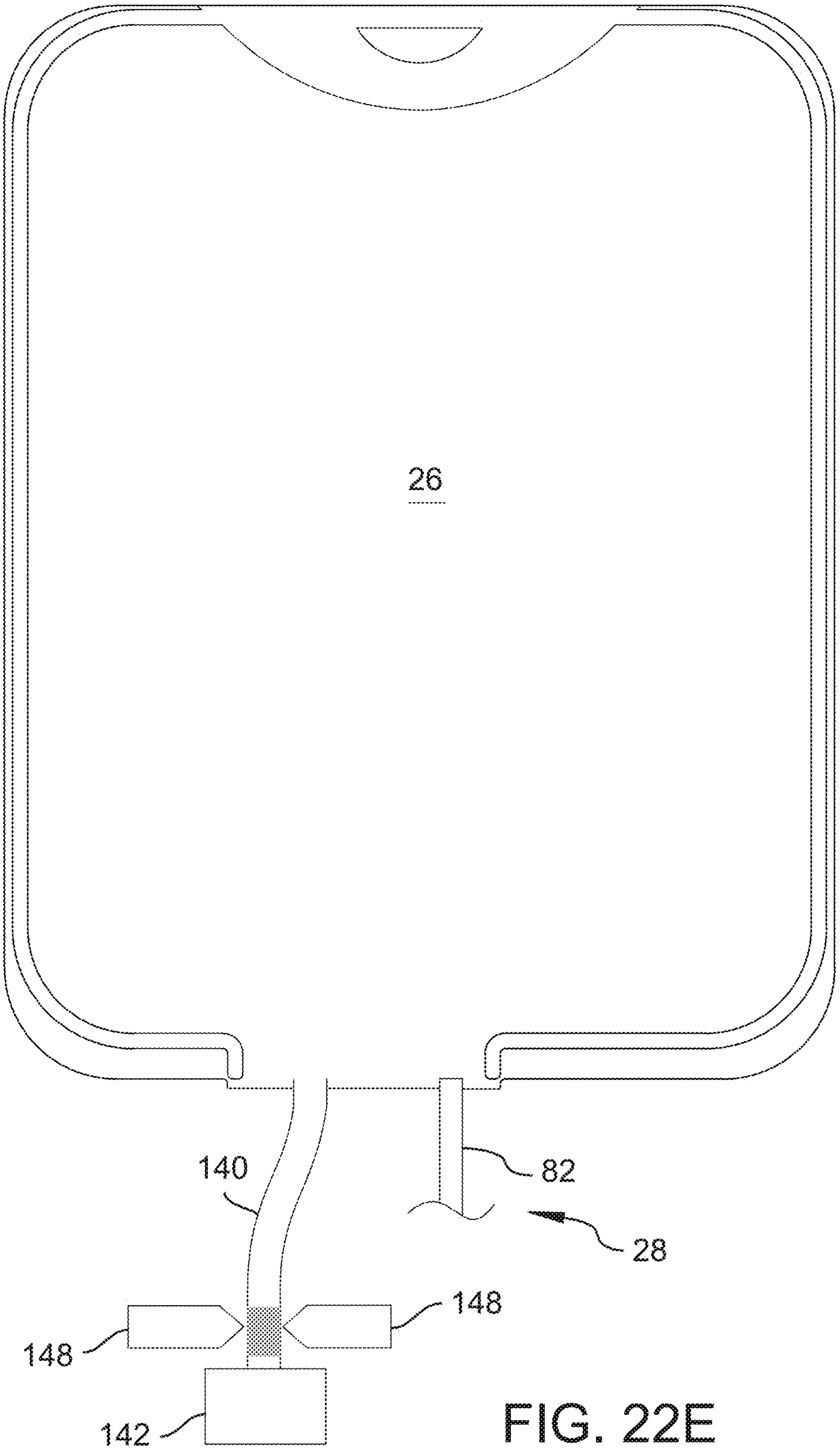
Figure 22F:
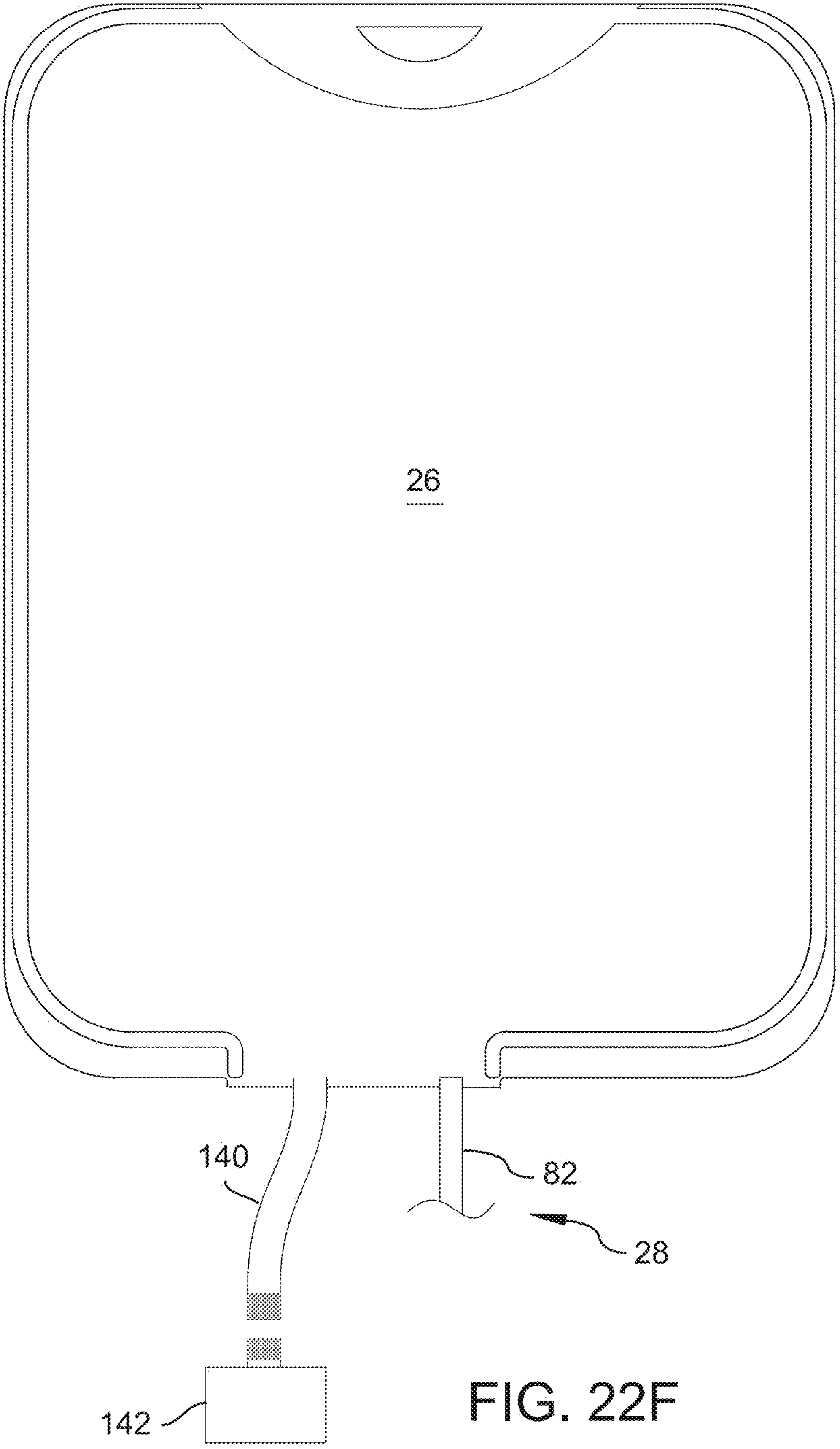

As shown in FIGS. 22B-D, after filling the bag 26 through the filling line 140, the system 10 may generate a seal 146 (indicated by shading in FIG. 22D) in a segment of the filling line 140. This may be produced via an RF weld or similar process or via a tube sealer assembly 906 such as that shown and described in relation to FIG. 248 may be used. The seal 146 may be formed via a RF welding dies/bars 144 of the system 10. In some embodiments a roller or squeegee assembly 145 may be used prior to introduction of the welding dies 144. The roller or squeegee assembly 145 may press against the filling line 140 and a pair or rollers or squeegees of the assembly 145 may be displaced in opposing directions to push liquid out of the weld area 145 as shown in FIG. 22C. The welding dies 144 may then be introduced to form the seal in the filling line 140. The roller or squeegee assembly 145 may or may not remain present as the seal is generated. Once the seal 146 has been formed, a cutting element 148 (see, FIG. 22E) may separate the sacrificial end of the filling line 140 from the rest of the rest of the filling line 140. This may result in a sealed portion of filling line 140 extending from the bag 26 as shown in FIG. 22F. Preferably, the sealed portion of the filling line 140 may be kept to a minimal length in order to limit the volume of fluid which may become isolated from the administration set 28 as the bag empties. In certain examples, the seal 146 may be extended to the peripheral edge of the bag 26.

Figure 23:
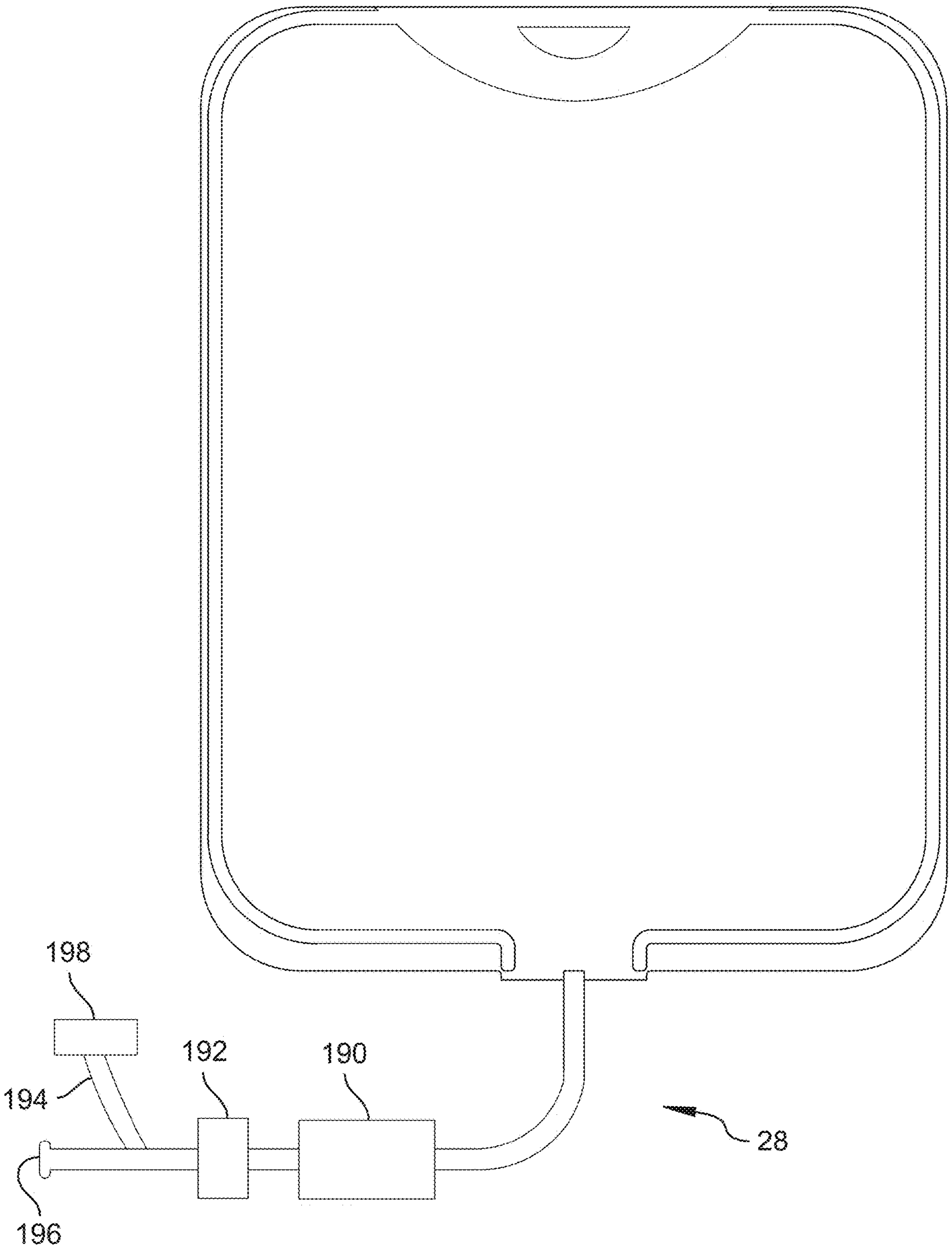
FIG. 23 depicts a top down view of another example bag.

Referring now to FIG. 23, another bag 26 design is depicted. As shown, the bag 26 includes an administration set 28 which is integrated to the bag 26 as described elsewhere herein. The administration set 28 includes a drip chamber 190, a roller clamp 192 (though another type of clamp or no clamp may be included), and a Y-site 194 (or other type of furcation). The bag 26 may be filled through a fill port 196 attached to the Y-site 194. Once the bag 26 has been filled, the portion of the branch from the Y-site 194 leading to the fill port 196 may be sealed (e.g. by high frequency weld) and the fill port 196 may be cut off the administration set 28 as described elsewhere herein. During administration, the remaining branch of the Y-site 194 may include an administration port 198 which includes a lumen that remains patent after sealing and removal of the other branch off the Y-site 194. This administration port 198 may be connected to a cannula line or the like to administer the contents of the bag 26. In such embodiments, the cannula line may include a check valve to prevent backflow. The ports 196, 198 may include luer fittings in some embodiments. This type of bag 26 and administration set 28 may come pre-primed. Before use, a user may hold the bag 26 and set 28 such that the administration set 28 is vertically above bag 26. The drip chamber 190 may be squeezed as needed to displace fluid in the drip chamber 190 into the bag 26. Air within the bag 26 may then be sucked into the drip chamber 190 as the drip chamber 190 restores to its normal shape. This may create the air space in the drip chamber 190 used to operate the drip chamber 190 and visualize drop formation during flow rate setting.

Figure 24:
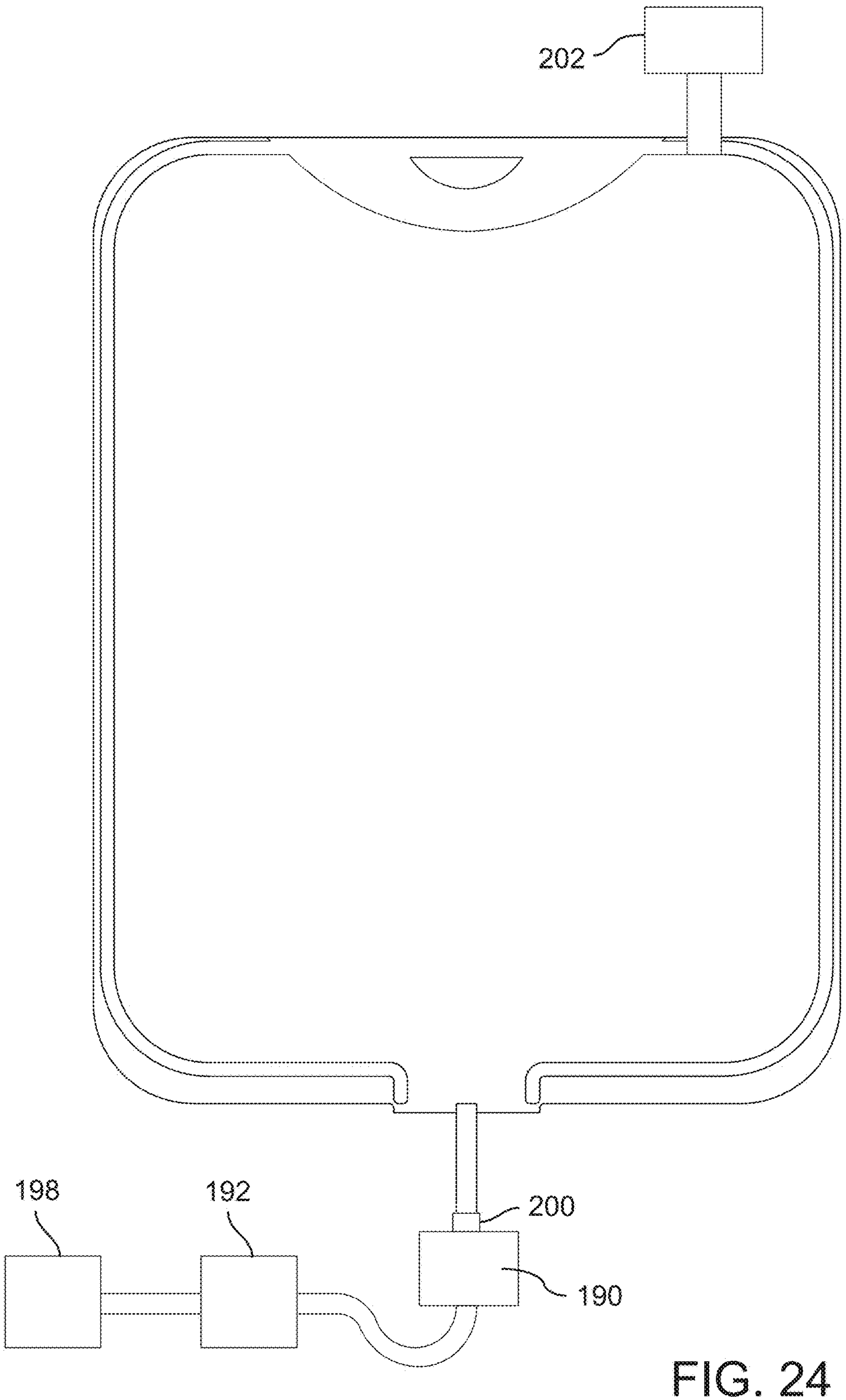
FIG. 24 depicts a top down view of yet another example bag.

Referring now to FIG. 24, another example bag 26 and administration set 28 are shown. As shown, this bag 26 and administration set 28 do not include the Y-site 194 (see, e.g., FIG. 23). Instead, the administration set 28 includes the administration port 198. The drip chamber 190 is attached to a frangible or breakable barrier 200 which may be broken by a user prior to administration such that the user may prime the administration set 28. The bag 26 may include a fill access 202 on another portion of the bag 26 which interfaces with the output of the medical water production device 14 or a manifold 20. Once filled, this access may be welded closed and a portion of it may be cut from the bag 26. This process may be similar to that shown for the bag 26 shown in FIGS. 22A-22F. Alternatively, a fill access 202 may be provided in a form of a Y-site 194 (see, e.g., FIG. 23) which is disposed upstream of the drip chamber 190. In some embodiments, an injection port may also be included in the bag 26. Such an injection port may be included in a side panel of the bag 26 or may attach at an edge of the bag 26 (e.g. adjacent the attachment point of the administration set 28).

Figure 25A:
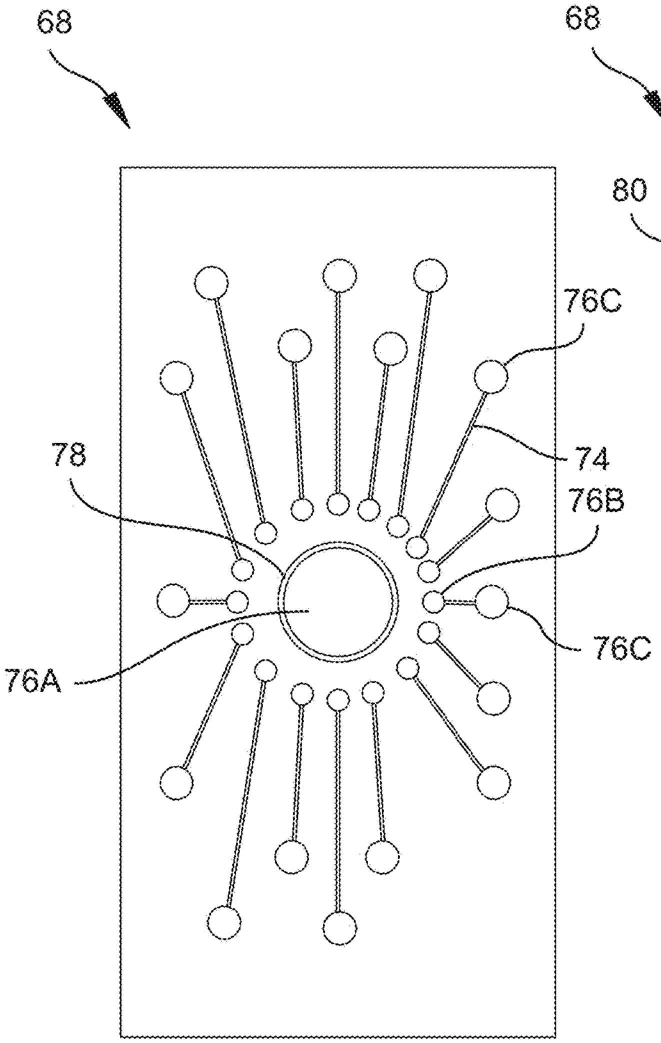
FIGS. 25A-C depict views of an example manifold.
Figure 25B:
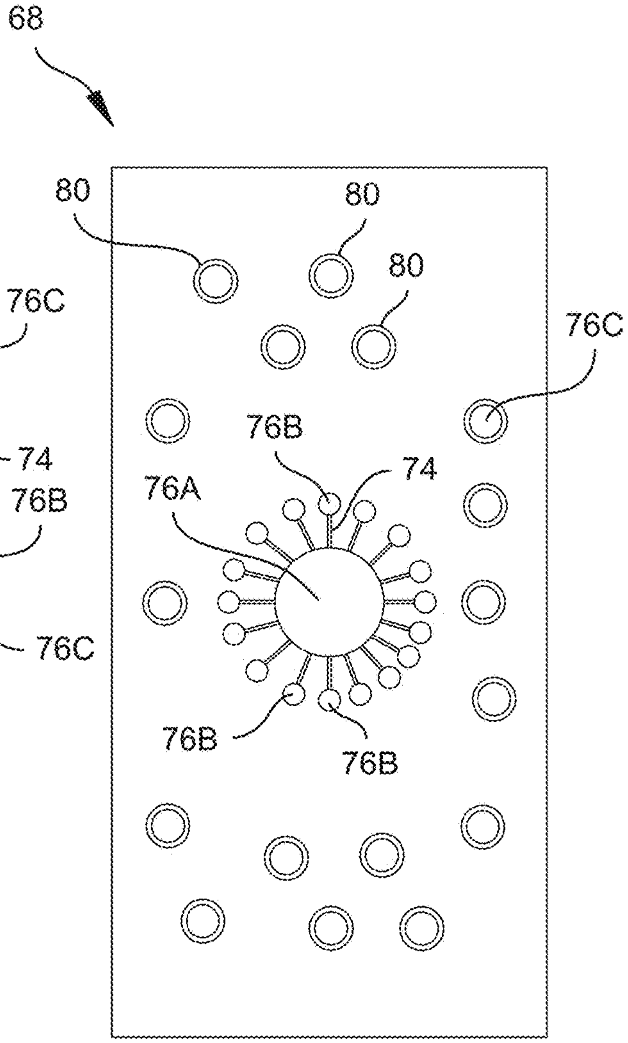
Figure 25C:
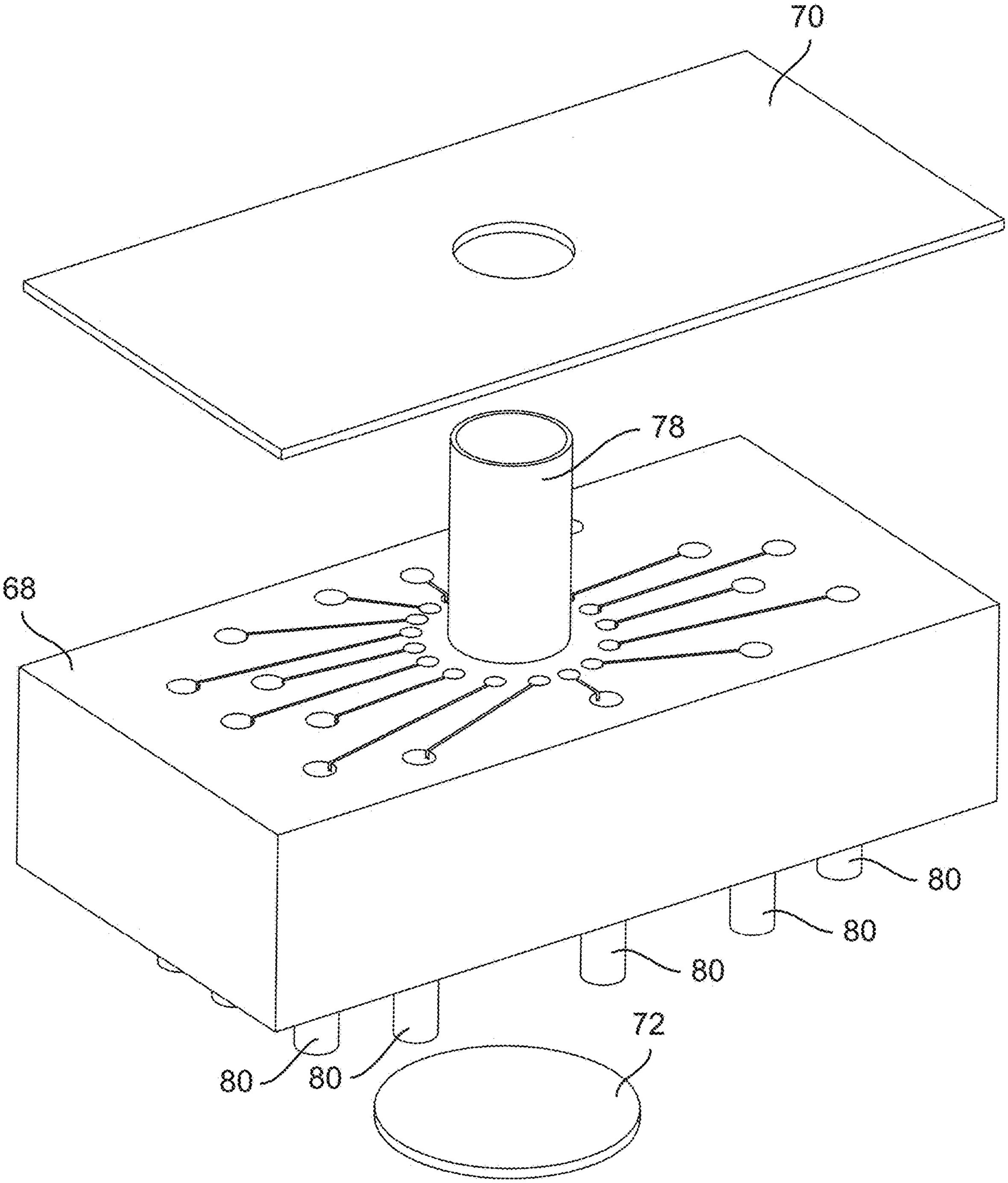

Referring now to FIGS. 25A-C, an exemplary manifold 20 is shown. A manifold 20 included in the fill receiving set 24 may be a single use component. Alternatively, the manifold 20 may be returned to a manufacturer or brought to another location after use and cleaned to allow it to be used in another fill receiving set 24. In embodiments where the manifold 20 is a single use component, it may be designed to be simple to manufacture and not unnecessarily expensive. For example, the manifold 20 may be constructed of an injection molded block 68 of material including a number of flow paths 74. These flow paths 74 may be open on one side. As best shown in FIG. 25C, a plate or plates 70, 72 may then be attached to the block 68 to cover any open portions of the flow paths 74. These plates may be attached in any suitable manner including via heat, solvent bonding, welding, fasteners (and perhaps gaskets), adhesives, etc. In certain embodiments, the plates 70, 72 may be laser welded onto the block 68 and the block 68 may be made of a material selected at least in part for its ability to absorb a laser welding wavelength (e.g. may be black). The plates 70, 72 in this embodiment may be clear to allow the laser to pass through to the block 68. The laser weld may seal around the peripheries of any flow paths 74 included in the manifold 20. Though described as plates 70, 72 use of flexible film covers in place of at least one of the plates 70, 72 is also conceived in some examples.

Referring primarily to FIGS. 25A and 25B which depict opposing faces of a block 68 of an example manifold 20, the block 68 may include a number of pass-throughs 76A-C in communication with the fluid paths 74. The block 68 may also include a number of fittings or couplers 78, 80. The couplers 78, 80 may be luer fittings in some example embodiments. If necessary, plates 70, 72 may include orifices through which the couplers 78, 80 may extend (see, e.g. FIG. 25C). In other embodiments, the plates 70, 72 may include the couplers 78, 80. Coupler 78 may be used to form a connection to the output of the medical water production device 14. The coupler 78 may surround a pass through 76A which leads to the opposing side of the block 68. The pass-through 76A associated with the coupler 78 may be in fluid communication with a number of flow path 74 segments on the opposing side of the block 68. These flow path 74 segments may each extend to their own pass-through 76B. In the example, the flow paths 74 extend radially from pass-through 76A. Any desired routing scheme may be used in alternative embodiments. The pass-throughs 76B each extend through the block 68 to a flow path 74 segment on the side of the block including coupler 78. These flow path segments 74 in turn extend to another pass through 76C which extends through the block 68. Each pass-through 76C extends to a coupler 80 on the opposing side of the block 68. Each of the couplers 80 may couple with a manifold interface element 22 of an administration set 28 included in the fill receiving set 24. Alternatively, any manifold interface elements 22 described herein may be included on another filling access such as fill access 202 of FIG. 24 or filling line 140 of FIG. 22A-F.

Figure 26:
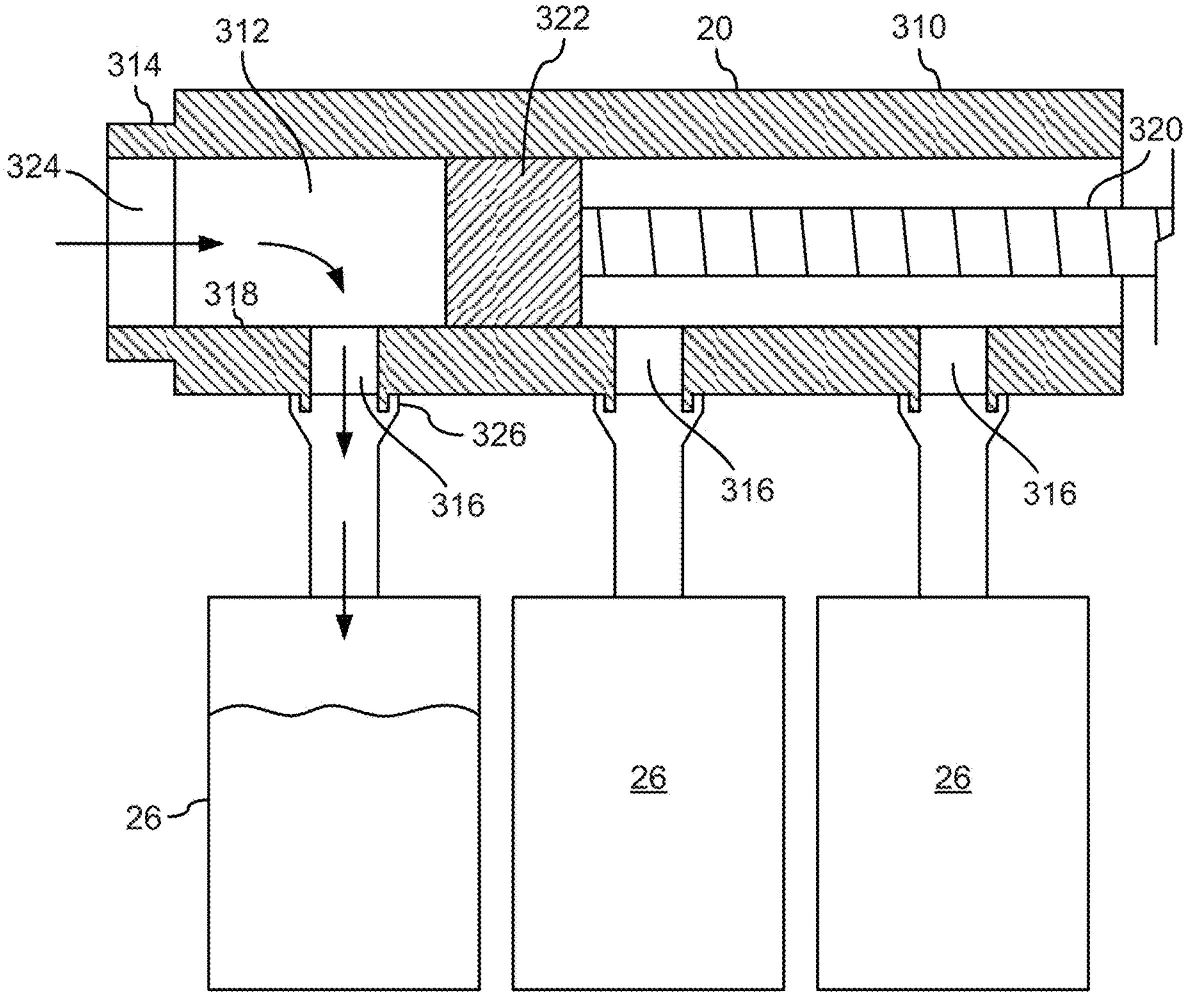
FIG. 26 depicts a view of an example fill receiving set including another example manifold.

A fill receiving set 24 including another example of a manifold 20 is depicted in FIG. 26. The manifold 20 may include a block 310. The block 310 may include a flow channel 312 therethrough. The block 310 may also include a connector interface 314 for coupling an inlet 324 of the manifold 20 with a dispenser for medical water or a medical fluid mixture (e.g. the output of medical water production device 14 or mixing volume 34). The flow channel 312 may include a number of branches 316 which extend from the fluid channel 312 wall 318 to ports 326 on a face of the block 310. A displaceable seal may be included within the fluid channel 312. In certain examples a displaceable rod 320 may be provided within the fluid channel 312. The displaceable rod 320 may include a sealing section 322 which may be made of or clad with a complaint material (rubber, silicon, various elastomers, etc.). Alternatively, the sealing section 322 may include one or more o-rings or raised complaint sections. The sealing section 322 may press against the wall 318 of the fluid channel and form a seal between the wall 318 and the displaceable rod 320 such that fluid on one side of the sealing section 322 may not pass to the other side of the sealing section 322. The displaceable rod 320 may be a plunger 330 (see, e.g. FIG. 27) in some embodiments. The displaceable rod 320 may also be a threaded rod or lead screw 332 (see, e.g., FIG. 29) in various examples. The actuator used to govern displacement of the displaceable rod 320 may be selected based on the type of displaceable rod 320 used.

The displaceable rod 320 may be actuated along the extent of the flow channel 312 to place various branches 316 into communication with the inlet 324. This may allow for bags 26 to be filled serially (one, two, or three, and so on at a time). In the example shown in FIG. 26, a bag 26 is in fluid communication with the inlet 324 such that fluid entering the manifold 20 may be directed to that bag 26. The sealing section 322 of the displaceable rod 320 prevents flow of incoming fluid to any other bags 26 coupled to ports 326 of the manifold 20. After the first bag 26 has been filled, the bag 26 may be sealed from the fluid channel 312 and removed from the manifold 20. This may be accomplished with welding dies 144 and perhaps a roller or squeegee assembly 145 similarly to as described in relation to FIGS. 22A-F. The displaceable rod 320 may then be displaced along the fluid channel 312 to place a next bag 26 or bags 26 into fluid communication with the inlet 324 for filling and the process may be repeated. Though only three bags are shown, any number of bags 26 may be included on a manifold 20.

Additionally, in certain embodiments, a manifold 20 may include multiple flow channels 312 each associated with a displaceable rod 320 (e.g. all extending parallel or generally parallel to one another). This may allow filling of bags 26 in communication with different flow channels 312 in a parallel manner or independently from one another. Where bags 26 associated with different flow channels 312 are filled in parallel, the displaceable rods 320 of the various flow channels 312 may be coupled so as to move in a coordinated manner with one another (perhaps in a 1:1 ratio for example). A system 10 may also fill bags 26 of multiple manifolds 20 where multiple manifolds 20 may be installed in the system 10 at the same time.

Figure 27:
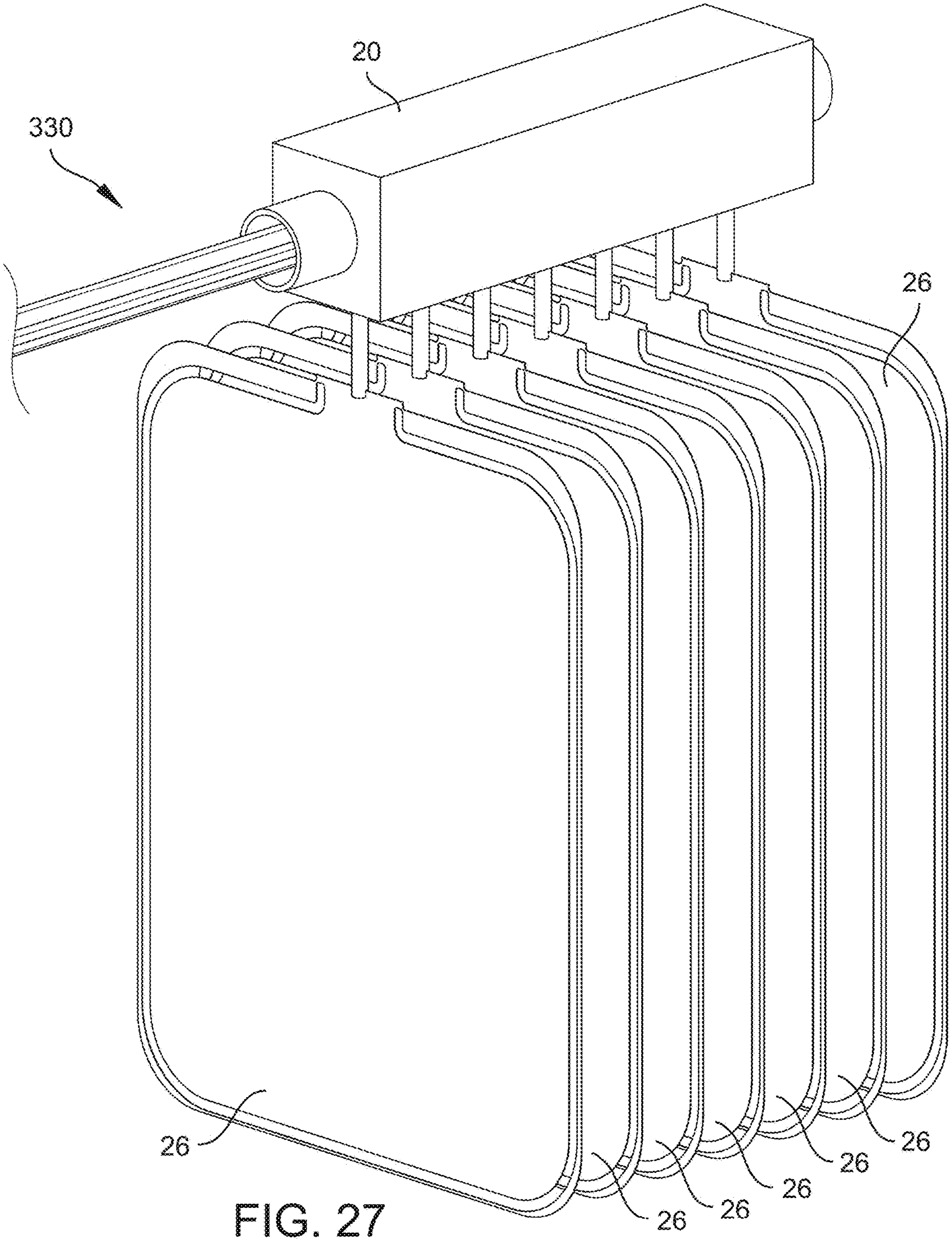
FIG. 27 depicts a perspective view of an example fill receiving set.
Figure 28:
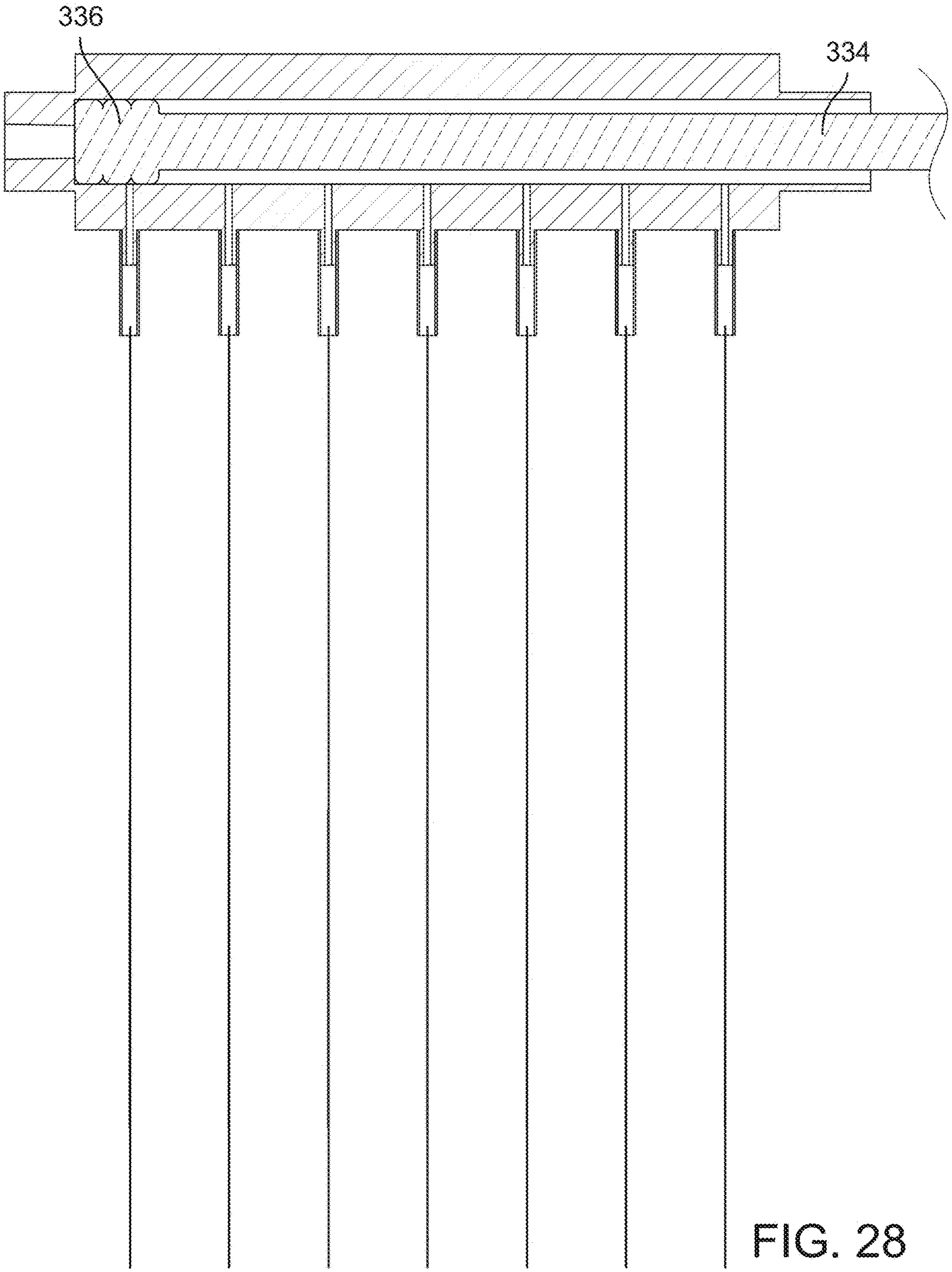
FIG. 28 depicts a cross sectional view of an example fill receiving set.
Figure 29:
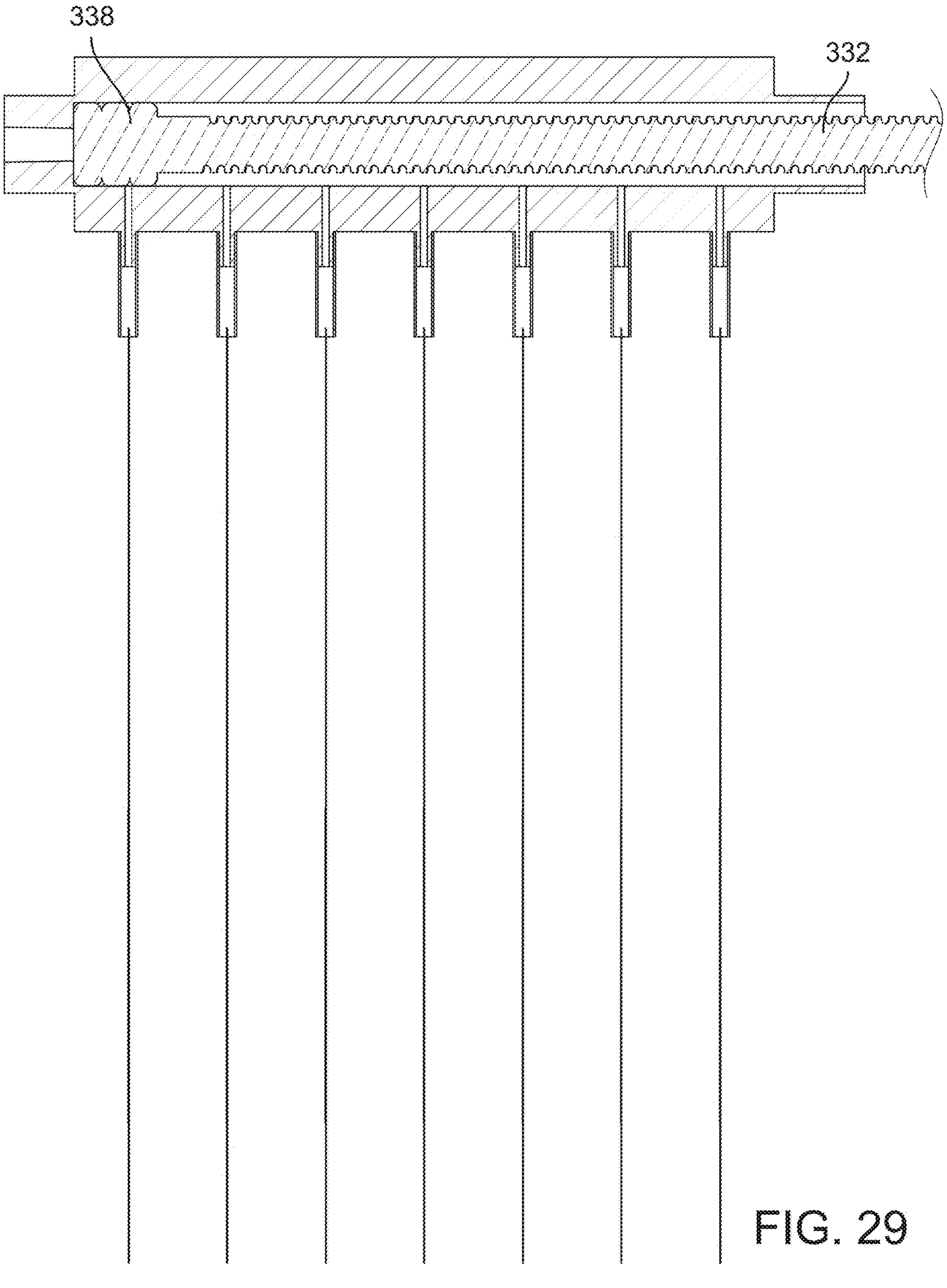
FIG. 29 depicts a cross sectional view of another example fill receiving set.
Figure 30:
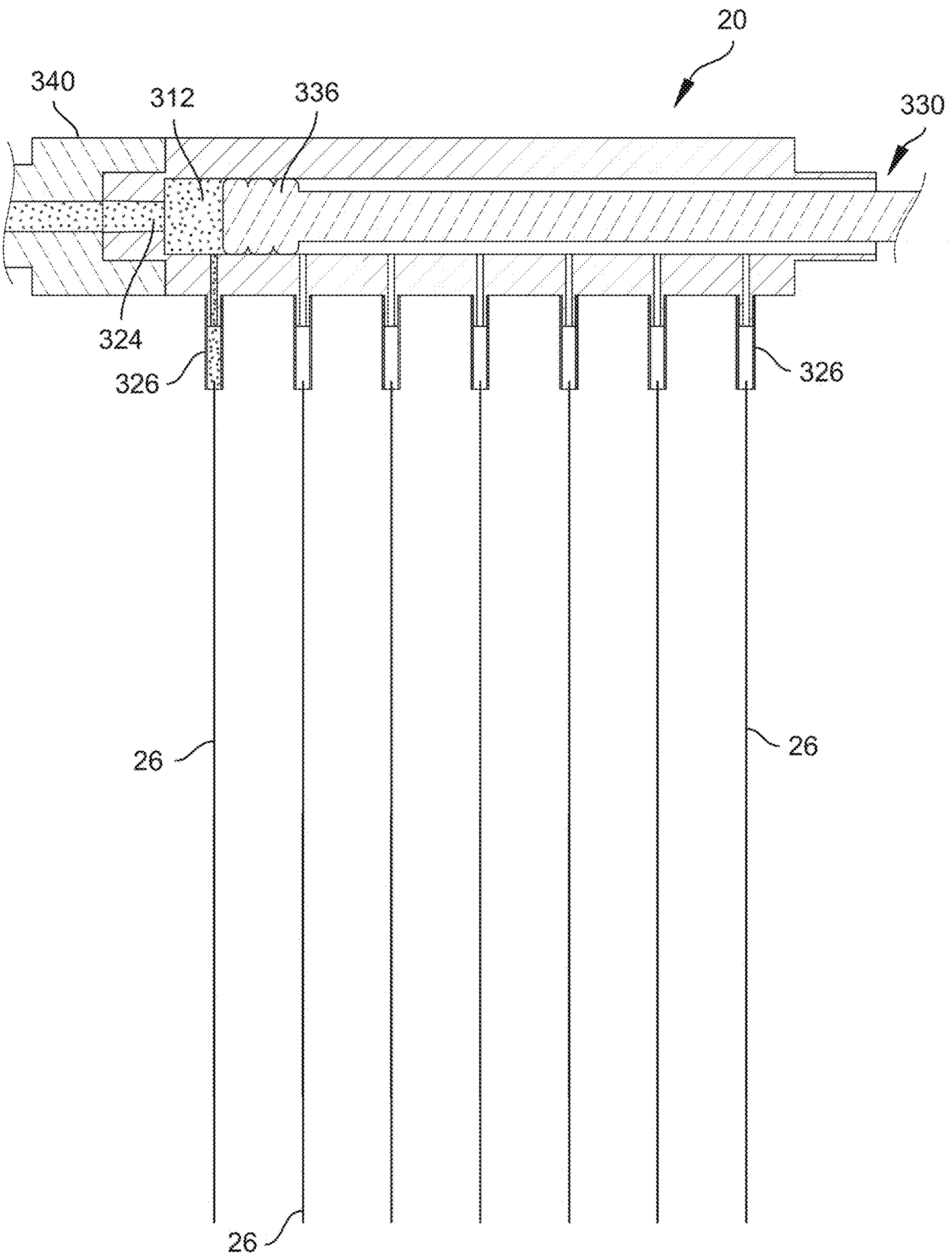
FIG. 30 depicts a cross sectional view of a bag of an example fill receiving set being filled with fluid.

With reference to FIG. 27 and FIG. 28, an example manifold 20 is shown. In the example manifold 20 the displaceable rod 320 is depicted as a plunger 330. The plunger 330 includes a plunger stem 334 and a plunger head 336 which acts as a sealing section 336. An example including a lead screw 332 as the displaceable rod 320 is shown in FIG. 29. The lead screw 332 may also include a sealing head section 338 at a terminal end thereof which is disposed within the manifold 20. Though not shown, the bags 26 associated with the port 326 of the manifold 20 may include various accesses. In addition to the line extending from each bag 26 to the manifold 20, each bag 26 may also include one or more of an administration set 28, spike ports, injection ports, or any other accesses shown herein. Though it may be the case in some examples, not all bags 26 attached to the manifold 20 need be identical. Some bags 26 may include different accesses or have different maximum fill volumes for example. Where a variety of different manifolds 20 may be used with a system 10, the manifolds 20 may include an identifier which includes information as to the type of manifold 20 being installed or information regarding the bags 26 included on the manifold 20. This identifier may be machine readable such as a barcode, data matrix, RFID, or any other suitable identifier. Information collected from this identifier may be used by the control system 15 in order to control filling of the bags 26 included on the manifold 20.

Referring now to the progression of FIGS. 30-33, an exemplary filling sequence is depicted. Though the manifold 20 shown includes a plunger 330, other displaceable rods 320 (e.g. lead screws, plunger with rack and pinion arrangement) may be similarly displaced through such a filling sequence. The plunger 330 may be provided with its plunger head 336 disposed within the interior of the flow channel 312 of the manifold 20. The plunger 330 may be initialized in a position against or proximal to the inlet 324 of the manifold 20 (see, e.g. FIG. 28). The manifold 20 may be coupled to a dispenser 340 to place the flow channel 312 in fluid communication with a medical fluid supply. The coupling may be made aseptically and via a threaded fitting (such as a luer lock), barbed fitting, quick connect, magnetic coupling, or any other suitable method. In some embodiments, steam may be ejected to cleanse the connector interface 314 before coupling occurs.

Figure 31:
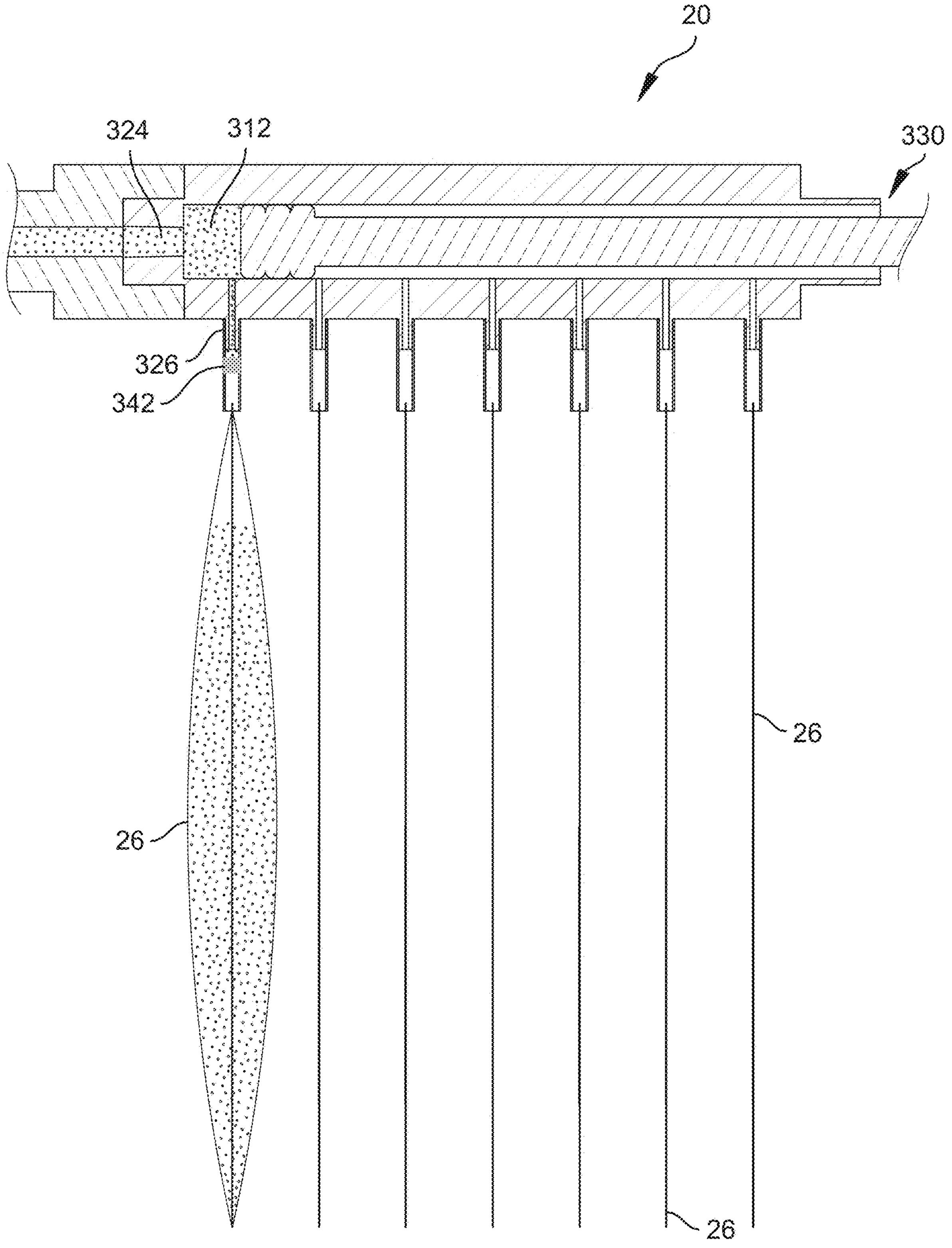
FIG. 31 depicts a cross sectional view of an example fill receiving set with a filled bag which has been sealed out of fluid communication with the fill receiving set.

An actuator (not shown) may withdraw the plunger 330 a distance out of the fluid channel 312. By displacing the plunger 330 away from the inlet 324, a port 326 or selected plurality of ports 326 may be placed into communication with the inlet 324. In the example shown in FIG. 30 only a single port 326 is placed into communication with the inlet 324. Fluid may then be transferred through the flow channel 312 into the bag(s) 26 in communication with the port or ports 326. This is depicted representationally via stippling in FIG. 30. Fluid transfer may be halted once the bag 26 or bags 26 have been filled to the desired amount as shown in FIG. 31.

As shown, each bag 26 may be connected to a port 326 via a flow path. The ports 326 in this example include projecting fittings (e.g. barbed fittings) onto which tubing providing the flow path is coupled. The flow path may include a sealable region which may, for example, be welded to close the flow path to fluid flow. Thus a seal 342 may be generated at the sealable regions to isolate the bag 26 from the rest of the manifold 20. The seal 342 may be created as described elsewhere herein (see, e.g. FIGS. 22A-F). The displacement of the plunger 330 may be tracked by a sensing arrangement to ensure the correct port 326 or ports 326 are in communication with the inlet 324 at a given time. Sensing arrangements may include or include combinations of linear potentiometers, encoders, hall effect sensor arrays monitoring the location of a magnet on the plunger 330, etc. The fill level of each bag 26 may be monitored via a scale upon which the bags 26 rest.

Figure 32:
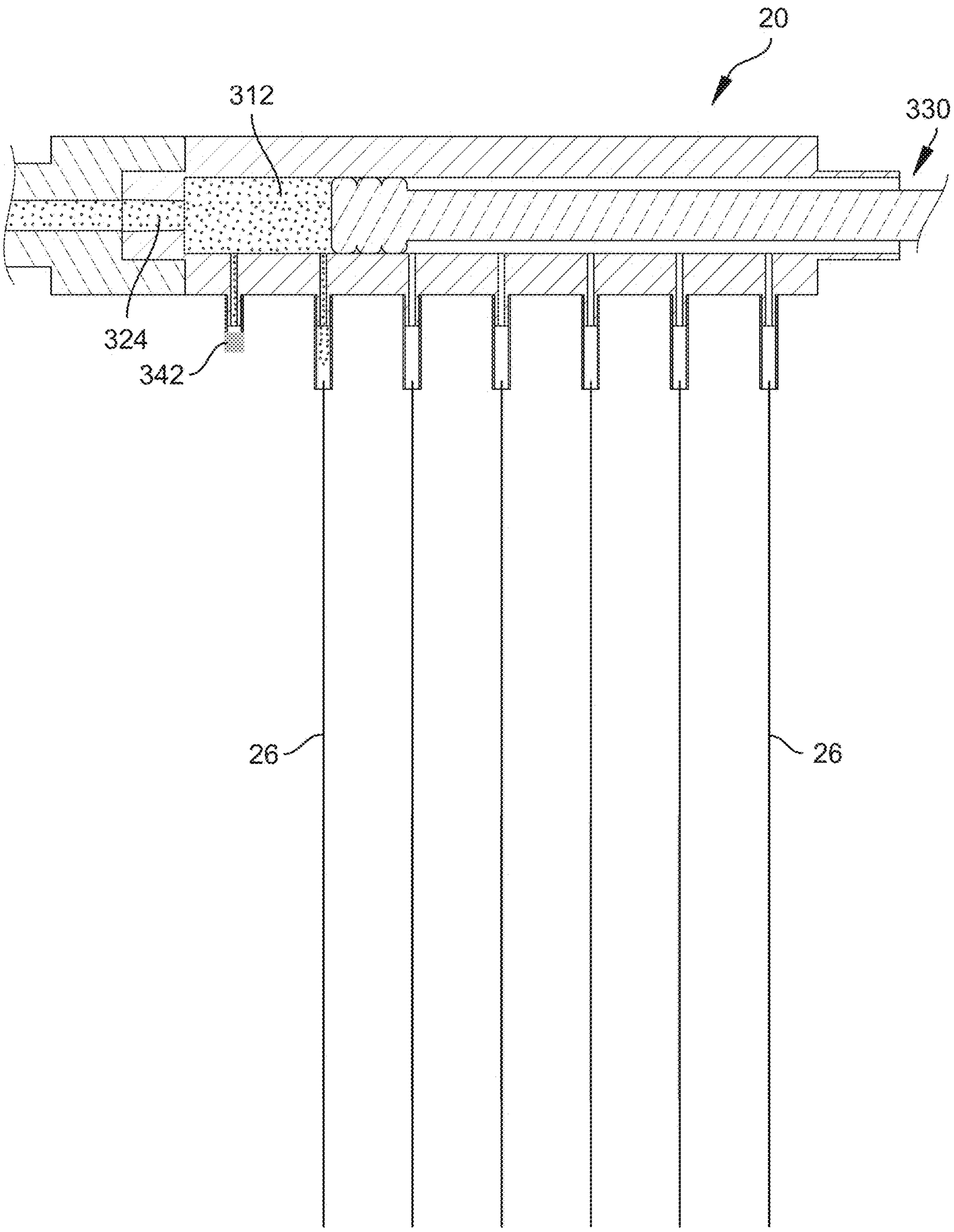
FIG. 32 depicts a cross sectional view of an example fill receiving set with a bag having been cut from the fill receiving set.
Figure 33:
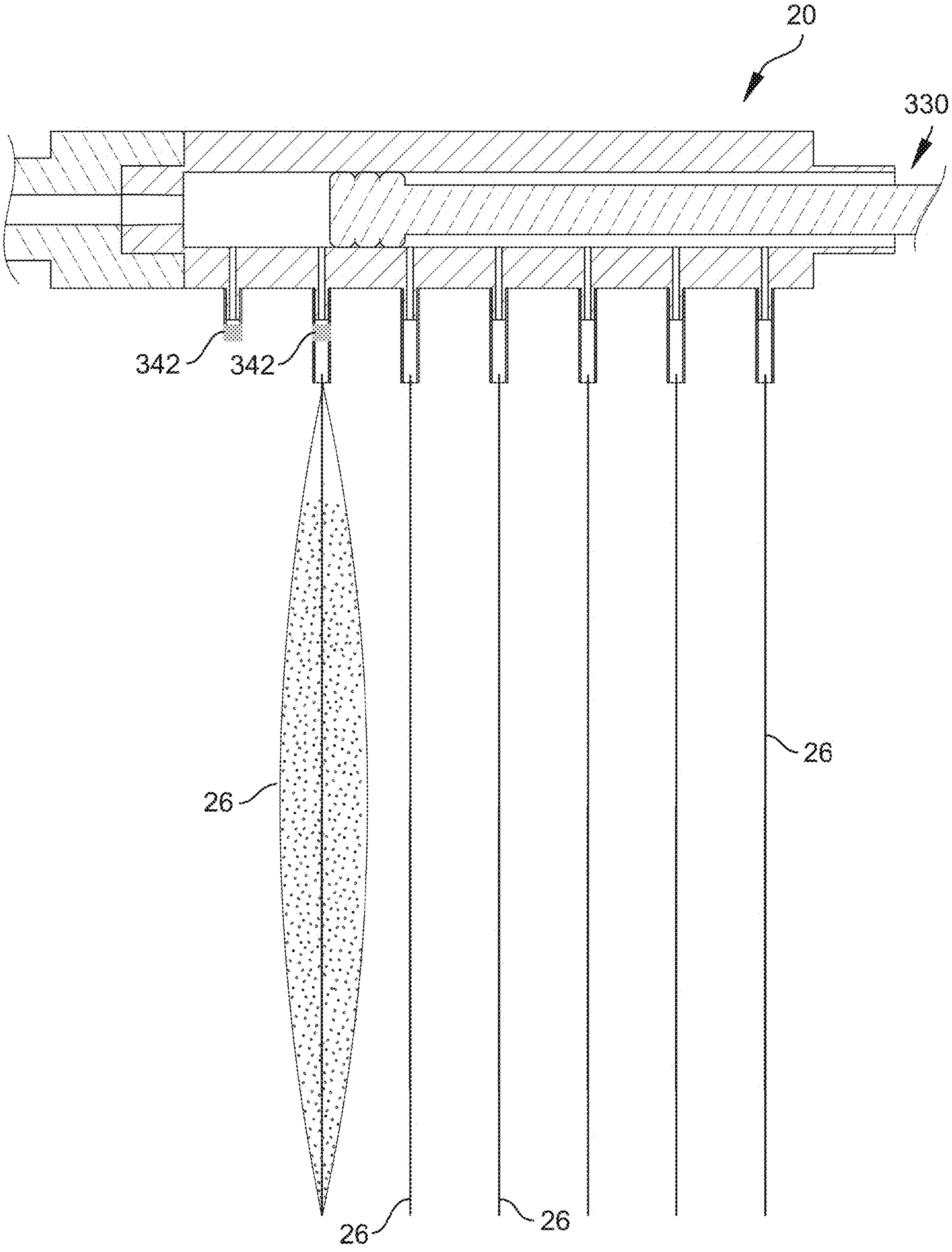
FIG. 33 depicts a cross sectional view of an example fill receiving set with a bag of the fill receiving set being filled with fluid.

Filled bags 26 may be removed from the manifold 20 after a seal 342 has been created. As shown in FIG. 32, a bag 26 has been removed from the manifold 20. A portion of the seal 342 may serve to close the port 326 from which the bag 26 was removed. As shown in FIG. 32, the plunger 330 may be withdrawn to a location more distal to the inlet 324 to place an additional bag 26 or bags 26 in communication with the inlet 324. Fluid may be transferred to fill the bag 26 or bags 26 until filled to a desired amount and a seal 342 may be formed as shown in FIG. 33. This may repeat until each bag 26 on the manifold 20 has been filled and removed from the manifold 20.

Figure 34:
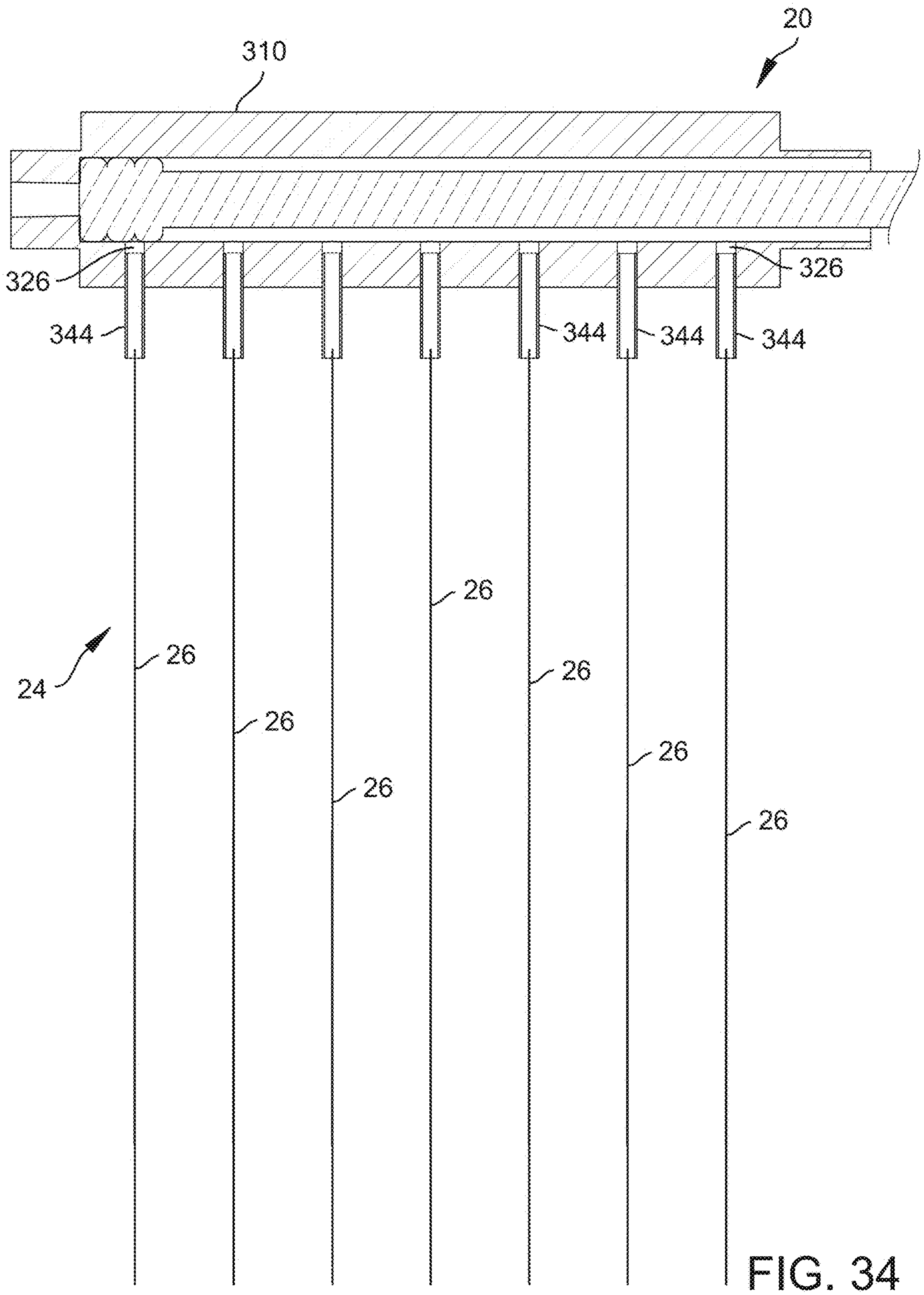
FIG. 34 depicts a cross section view of an example fill receiving set.

Referring now to FIG. 34, a fill receiving set 24 including another manifold 20 is shown. The manifold 20 is similar to that depicted and described in relation to FIGS. 28-33, however, the bags 26 are coupled to the manifold 20 in an alternative manner. As shown, the ports 326 include no fitting or projection extending away from the manifold 20 to which the flow path to each bag 26 couples. Instead, the fluid lines 344 providing the flow path to the bags 26 are inserted into the orifices in the block 310 forming the ports 326. The fluid lines 344 may be retained in the ports 326 via solvent bonding, adhesive, threaded coupling, or via any other suitable manner.

Figure 35:
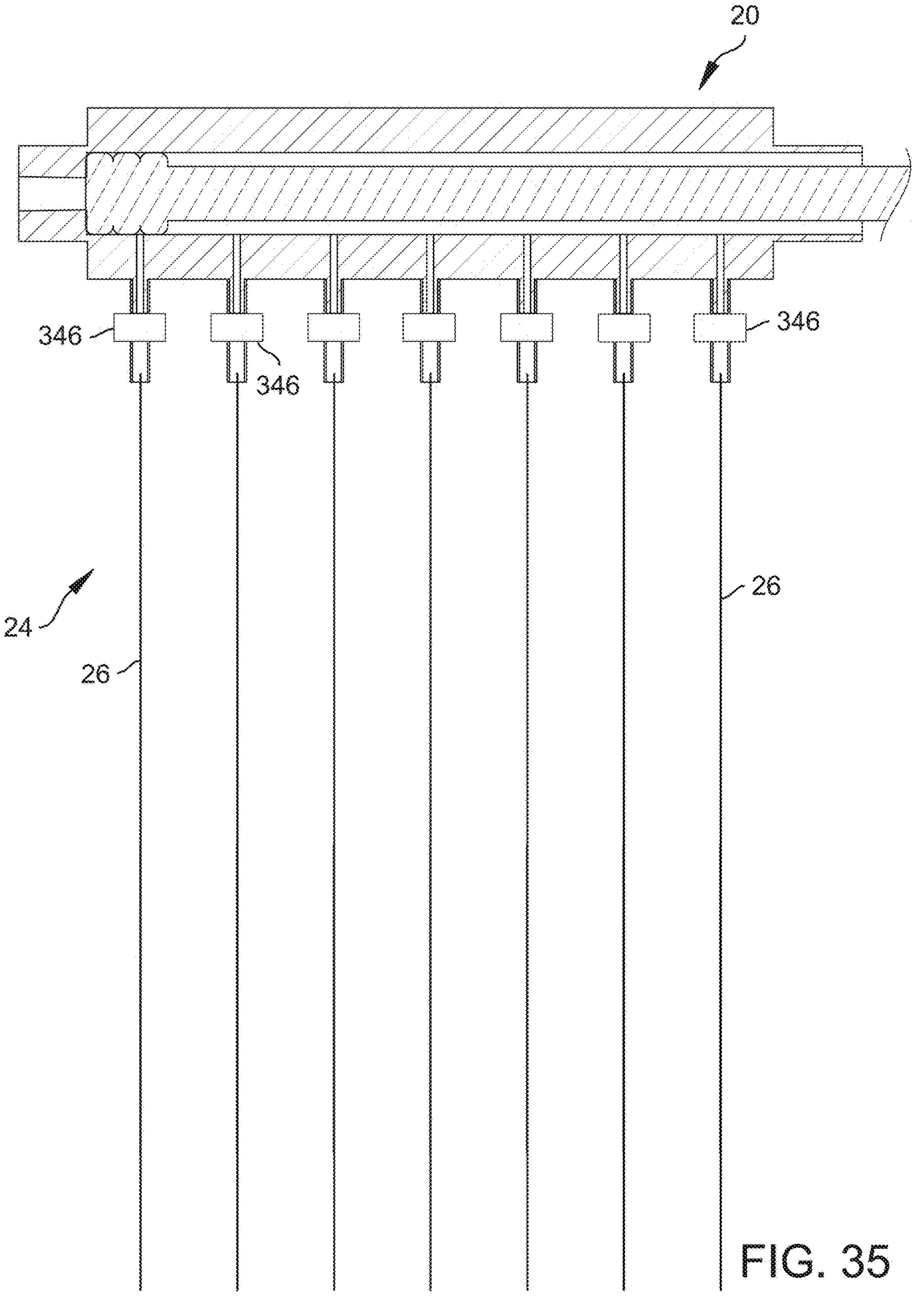
FIG. 35 depicts a cross sectional view of an example fill receiving set.

In other embodiments, the flow path between the manifold 20 and each bag 26 may include a disconnect fitting 346 as shown in FIG. 35. The disconnect fitting 346 may allow for a bag 26 to be removed from the fill receiving set 24 without the need for a separate sealing operation. In some embodiments, self-sealing aseptic disconnect fittings may be used. In such embodiments, the fittings may be selected so as to allow for the manifold 20 to be sterilized after all bags 26 thereon have been filled. This may allow the manifold 20 to be reused.

Figure 36:
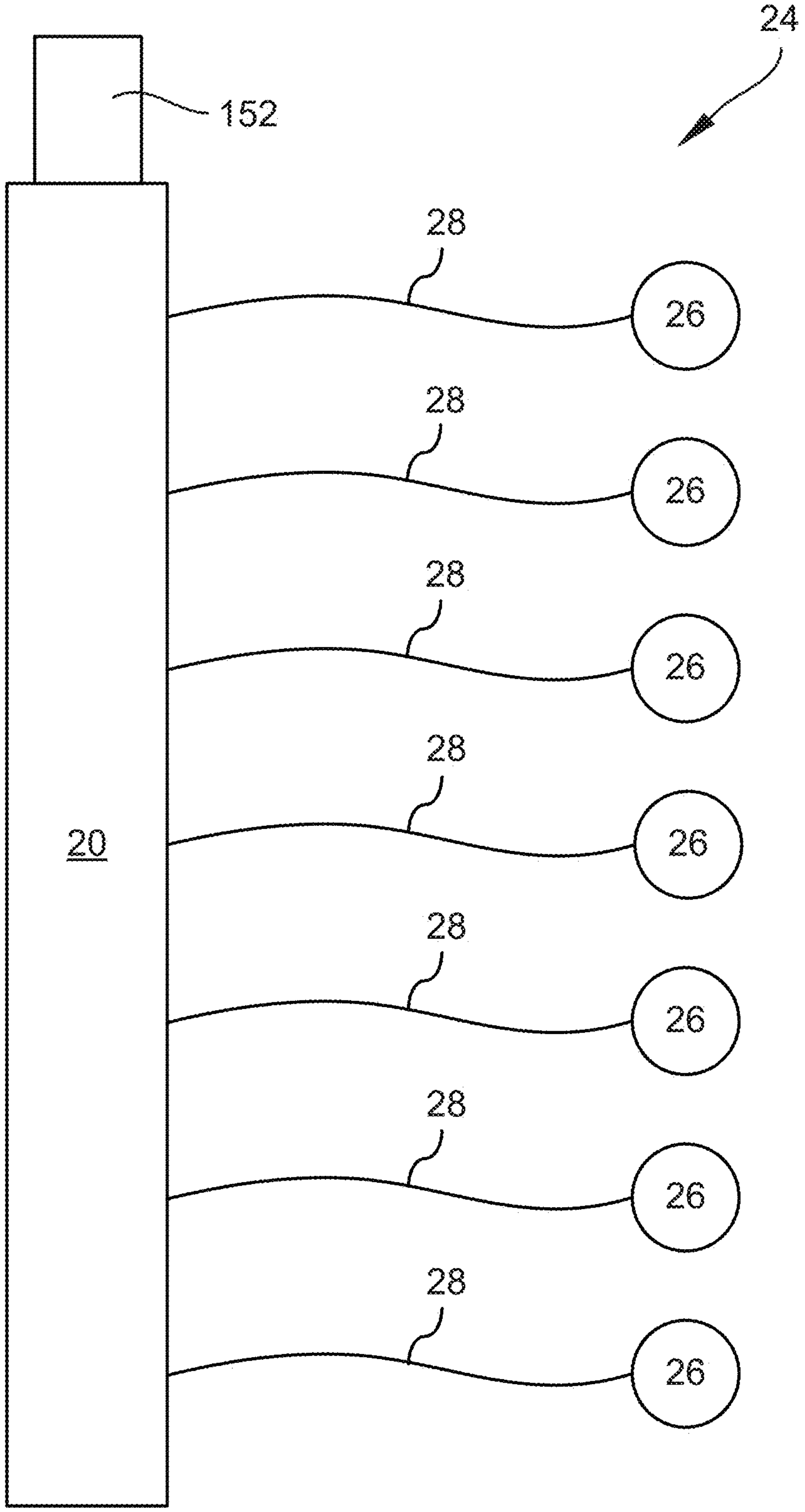
FIG. 36 depicts a diagrammatic view of an example fill receiving set.
Figure 37:
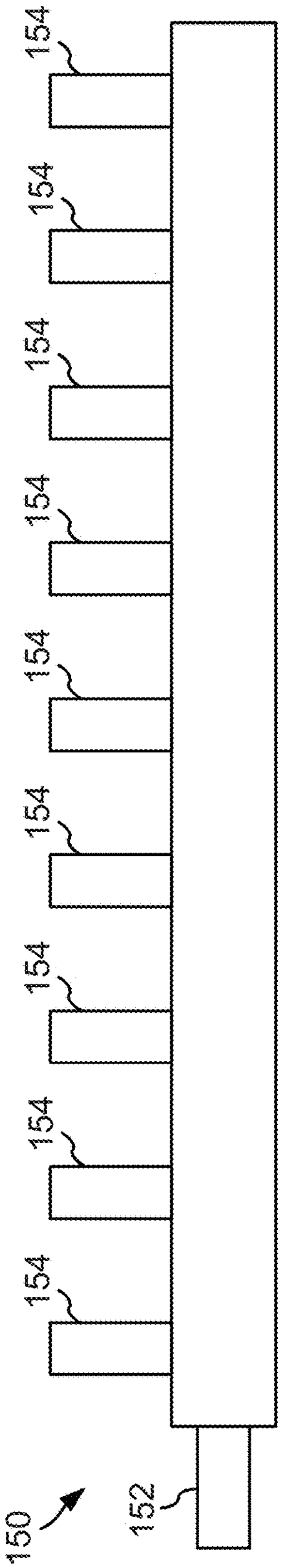
FIG. 37 depicts a top down view of an example manifold of an example fill receiving set.
Figure 38:
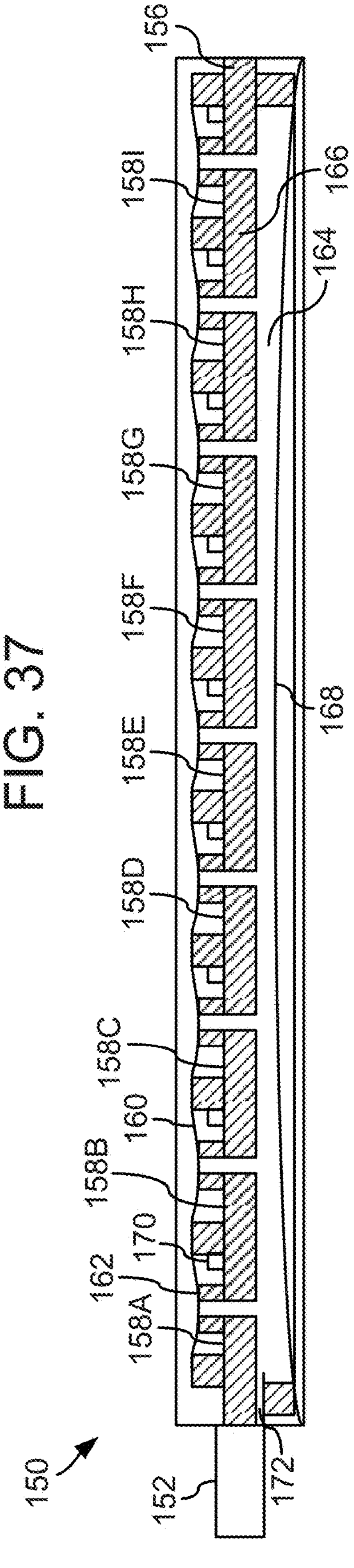
FIG. 38 depicts a cross sectional view of an example manifold of an example fill receiving set.

Referring now to FIG. 36-38, aspects of another example fill receiving set 24 are shown. As shown in FIG. 36, the fill receiving set 24 may include a manifold 20 which is pre-connected to a number of administration sets 28 which have been integrated into individual bags 26. As with other embodiments described herein, other filling conduits may be coupled to the manifold 20 in place of the illustrative administration sets 28. The manifold 20 in the example embodiment may be a cassette 150 which is installed into the system 10. The cassette 150 may include a fluid introduction port 152 which may connect to the fluid output stream from the medical water production device 14. The cassette 150 may also include a number of couplers 154 (e.g. luer fittings) which may couple to manifold interface elements 22 on each of the sets 28 (or fill lines 140, accesses 202, or other filling conduits).

As best shown in the cassette 150 cross-section depicted in FIG. 38, the cassette 150 may include a rigid body 156 which may be injection molded in certain examples. The rigid body 156 may include a number of valve stations 158A-I which may be overlaid by a flexible membrane 160. In alternative embodiments, multiple flexible membranes may be included. For example, each valve station 158A-I may be covered by a dedicated flexible membrane. The flexible membrane 160 shown may be actuated (typically pneumatically, though mechanically or hydraulically are also feasible) against and away from the valve seats 162 of each valve station 158A-I in order to open and close the valves 158A-I. In the example illustration, all of the valves stations 158 A-I are shown in a closed configuration. The cassette 150 also includes a fluid bus 164 on the opposing side of the cassette 150 mid body 166. The fluid bus 164 is in communication with the fluid introduction port 152 through a pass-through 172 in the sidewall of the cassette 150. A second flexible membrane 168 is included on this side of the cassette 150 to seal the fluid bus 166. This second flexible membrane 168 may be replaced by a plate such as the laser welded plates described elsewhere herein. The fluid bus 164 may be placed into communication with desired valve stations 158A-I by displacing the first flexible membrane 160 away from the valve seat 162 of the desired valve station(s) 158 A-I. As shown, each valve station includes a pass-through 174 which leads from the valve station 158A-I to the fluid bus 164. This may establish a flow path from the fluid bus 164 to the valve station 158 A-I. The valve station 158 A-I may also include an opening to the coupler 154 of the cassette 150 allowing for fluid to flow from the fluid bus 164 through the valve station 158 A-I and out of the cassette 150 to a bag 26 and administration set 28 attached to the associated coupler 154. This may allow for bags 26 to be filled one by one (or two by two and so on). In some embodiments, each valve station 158 A-I may be associated with more than one coupler 154. This may be desirable where bags 26 are filled in multiples at a time.

Figure 39A:
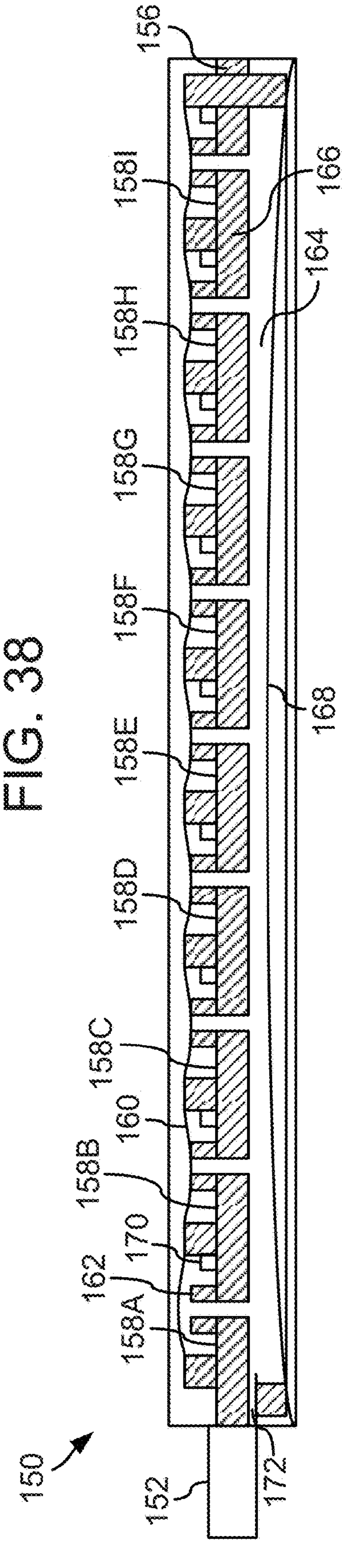
FIG. 39A-C show a progression of valve actuations of an example manifold which may be used to fill bags of an example fill receiving set.
Figure 39B:
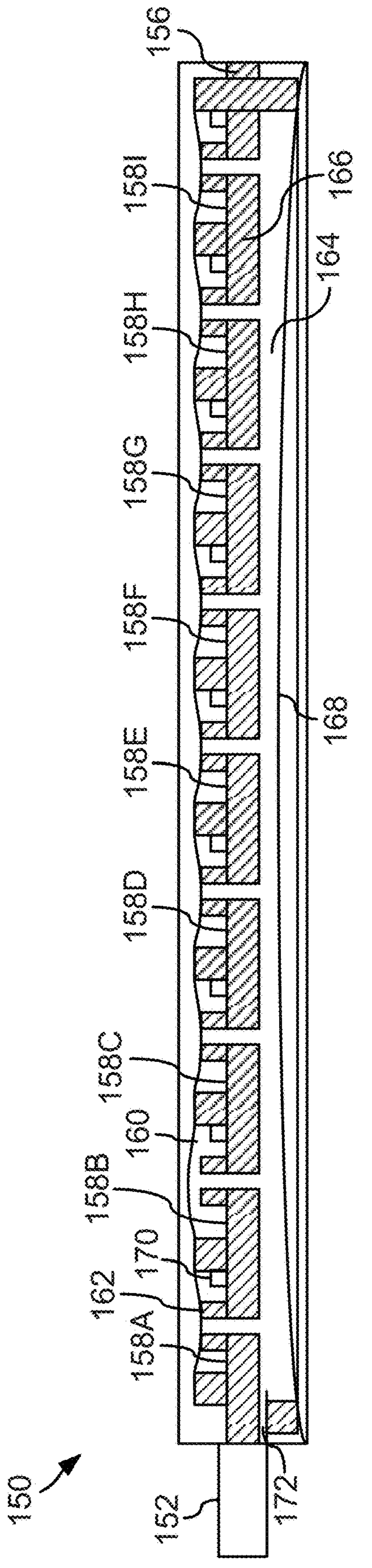
Figure 39C:
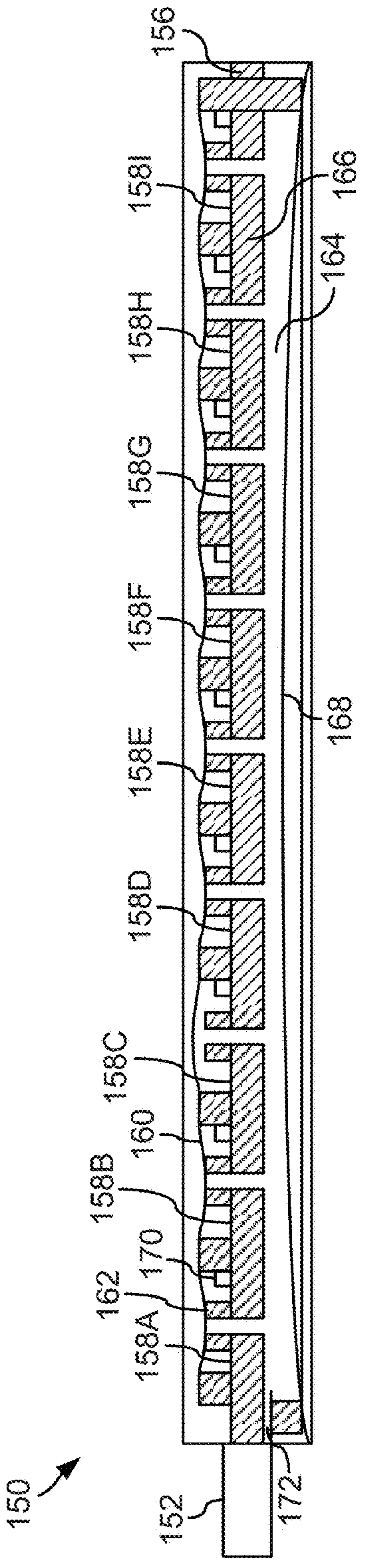

FIGS. 39A-C show a progression of valve actuations which may be used to fill bags 26 attached to the cassette 150. The bags 26 may be filled in any order, but are shown here as being filled in sequence by opening valve stations 158 A-I in a left to right manner. As shown, the leftmost valve station 158A may be opened to fill the associated bag 26. Once full, the bag 26 may be removed from the cassette 150 as described elsewhere herein. The valve station 158A may then be closed. The adjacent valve station 158B may then be opened to fill its attached bag 26. That bag 26 and the attached administration set 28 (or other filling access) may be removed (e.g. sealed and cut, disengaged from a cooperating quick connect, etc.) from the cassette 150. Valve station 158B may then be closed. Then the next valve station 158C may be opened, and its associated bag 26 may be filled and removed. The process may continue until all bags 26 have been filled. The number of bags 26 being filled and thus the number of valve stations 158A-I open at a given time may be determined by the flow rate output of the medical water production device 14. It may be desirable that the system 10 output a certain number of bags per unit time. If the system 10 were to fill, for example, fifty bags 26 at a time with a low flow rate output there would be a certain downtime before bags 26 become available. By filling bags 26 one by one (or some appropriate number of multiples at a time), the system 10 may provide a steady output of bags 26 at the same flow rate output.

Figure 40:
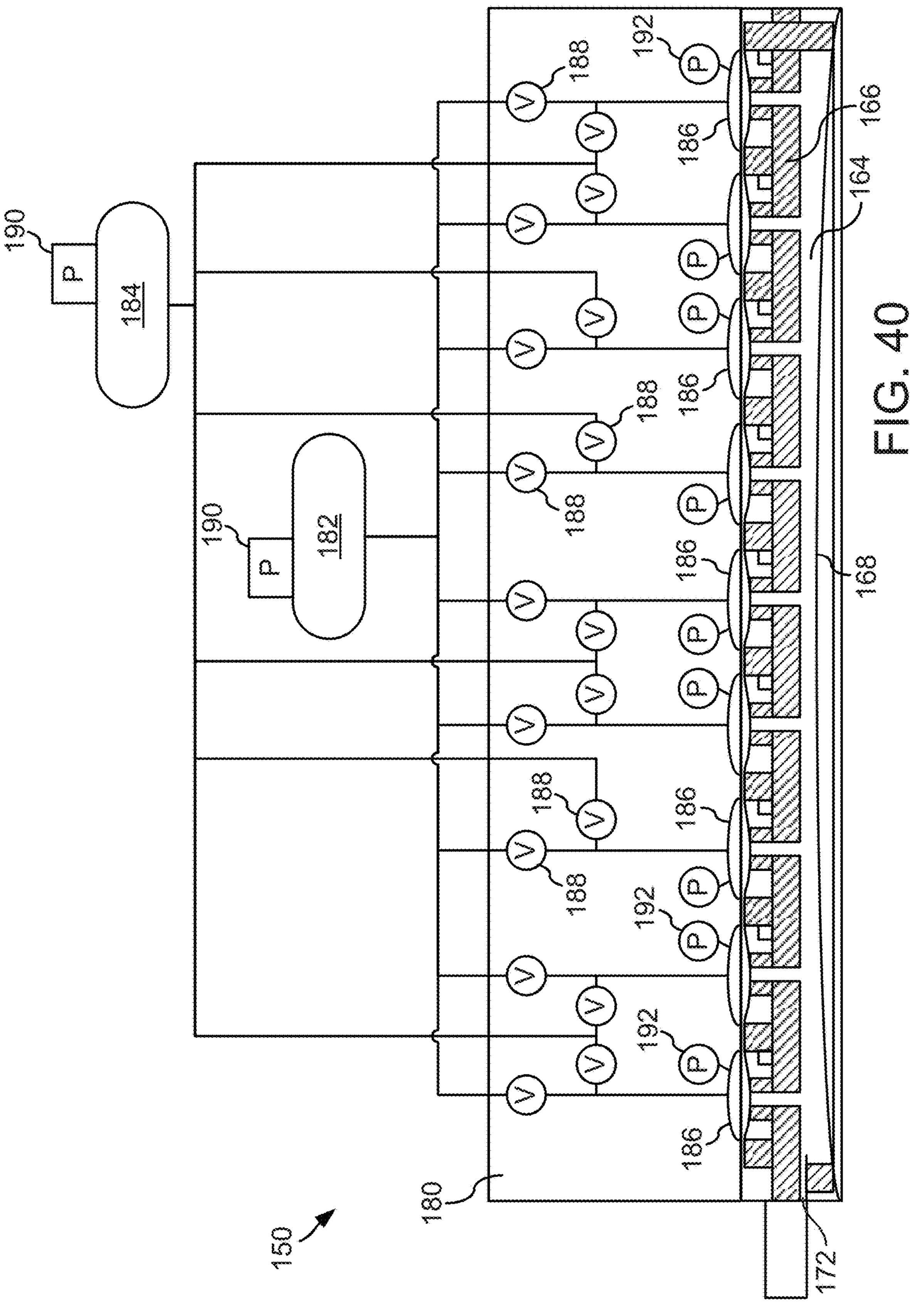
FIG. 40 depicts an actuation block of for a manifold of an example fill receiving set.

As shown in FIG. 40, the cassette 150 may interface with an actuation block 180 included in the system 10. The actuation block 180 may be made of metal (or another material which is robust, dimensionally stable, heat stable, and/or non-porous) and be subjected to a hot steam or venting stream from the medical water production device 14 before the cassette 150 is placed against the actuation block 180. The flexible membrane 160 on the cassette 150 may be covered by an overlay which keeps the surface of the flexible membrane 160 sterile prior to application against the actuation block 180. This overlay may be removed by the system 10 or an operator. In some embodiments, the cassette 150 may be pressed against the actuation block 180 by closure and latching of a door of the system 10. In other embodiments, a piston or plate may be pressed against the side of the cassette 150 including the fluid bus 164 to force the cassette 150 against the actuation block 180 and ensure good seals are made by the flexible membrane 160 around the valve stations 158 A-I. This may be done via inflation of a bladder, rotation of a leadscrew or cam, actuation of a scissor jack, linear actuator, or any other actuator which can apply a sufficient force.

As shown, the actuation block 180 includes a number of pressure pathways. These pressure pathways may individually be placed into selective communication with either a positive pressure source 182 or negative pressure source 184 (pneumatic for example) to open and close the valve stations 158A-I of the cassette 150. Each control chamber 186 may be selectively placed into fluid communication with the positive pressure source 182 or negative pressure source 184 by operation of valves 188 associated with each control chamber 186. In the example embodiment, each control chamber 186 is associated with a valve controlling application of positive pressure and a valve controlling application of negative pressure. In alternative embodiments a single valve may be utilized to toggle between positive of negative pressure application. In such embodiments, the valve may be designed to apply positive pressure in a fail state. The positive and negative pressure sources 182, 184 may be reservoirs which are maintained to a particular pressure set point by a pump (not shown). The pressure sources 182, 184 may be monitored by one or more pressure sensors 191 which may inform operation of the pumps maintaining the pressure sources 191 at the pressure set point. In some embodiments, each control chamber 188 may also be in fluid communication with a pressure sensor 192. This pressure sensor 192 may be monitored as a check that pressure is being applied to a valve chamber 158 A-I of the cassette 150 as expected. In some embodiments, the medical water production device 14 may output product at a pressure above ambient. In such embodiments, negative pressure may not be used. Instead, the pressure of the product water may be used to displace the flexible member 160 to open the valve stations 158A-I. The positive pressure used to close the valve stations 158A-I may be chosen so as to be sufficiently higher than the medical water production device 14 output pressure so as to maintain robust closure of the valve stations 158A-I.

Figure 41A:
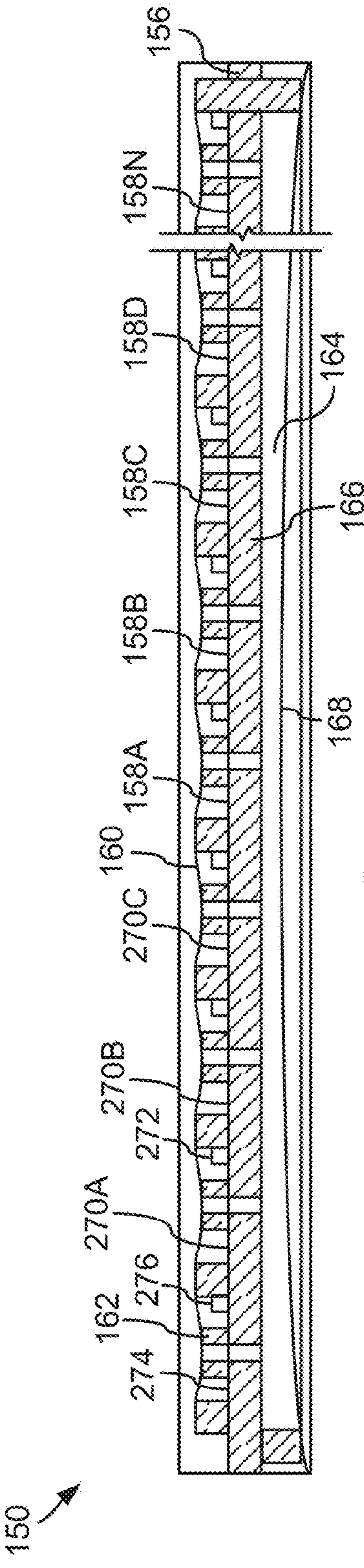
FIG. 41A-41F depict a progression of valve actuations which may be executed to pump fluid from a concentrate supply inlet through an example manifold.
Figure 41B:
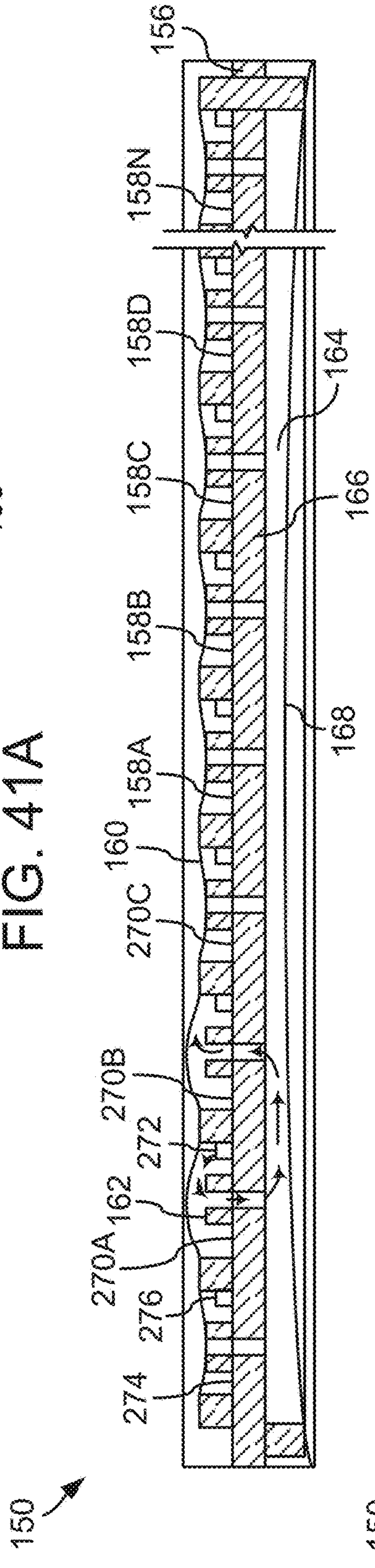
Figure 41C:
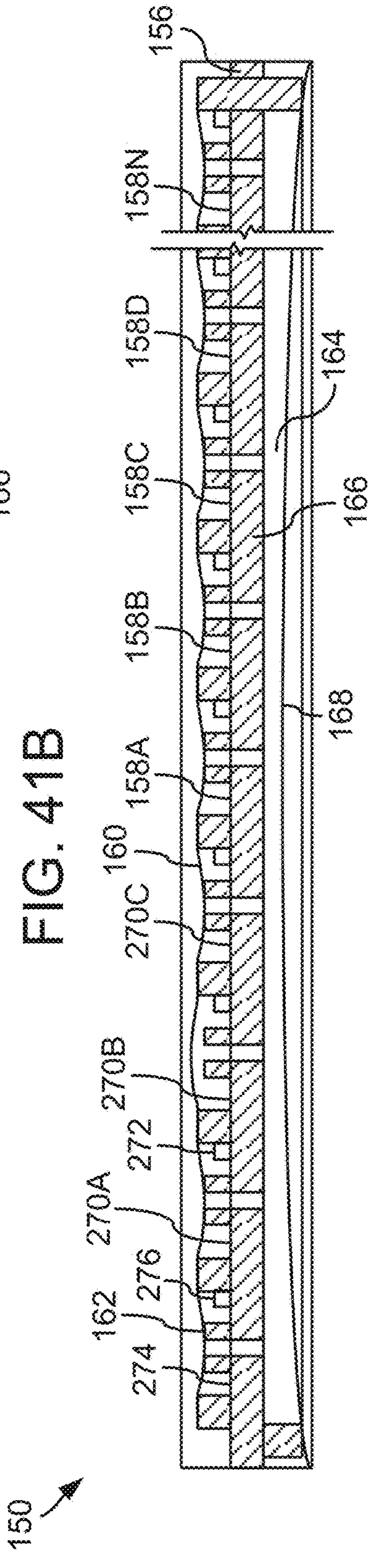
Figure 41D:
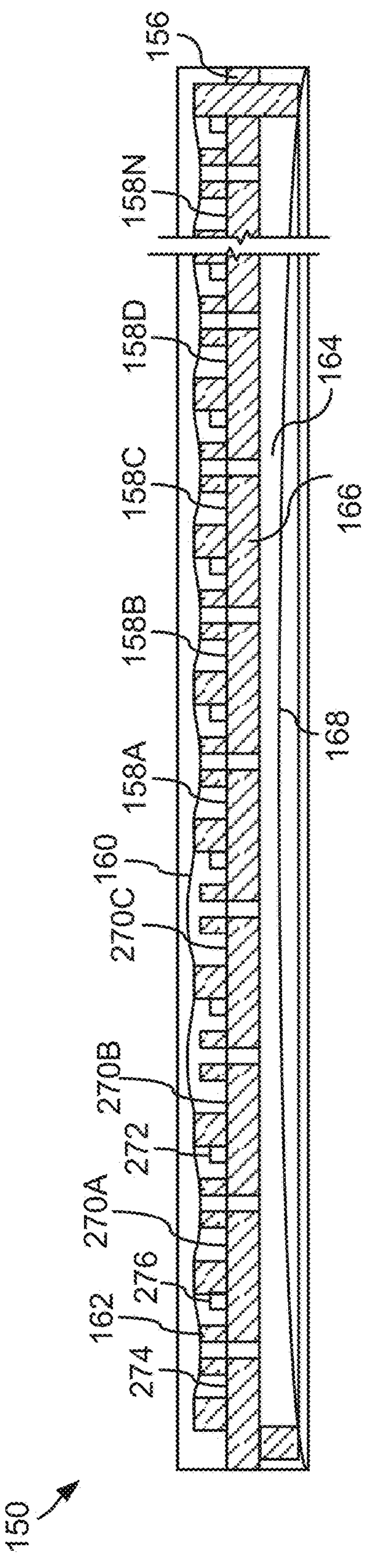
Figure 41E:
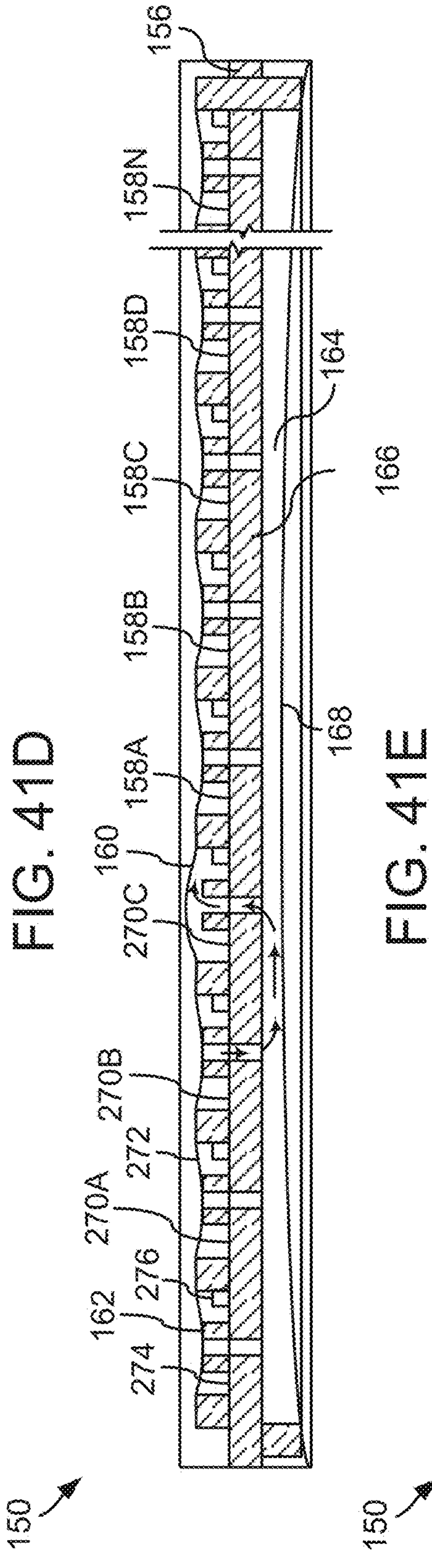
Figure 41F:
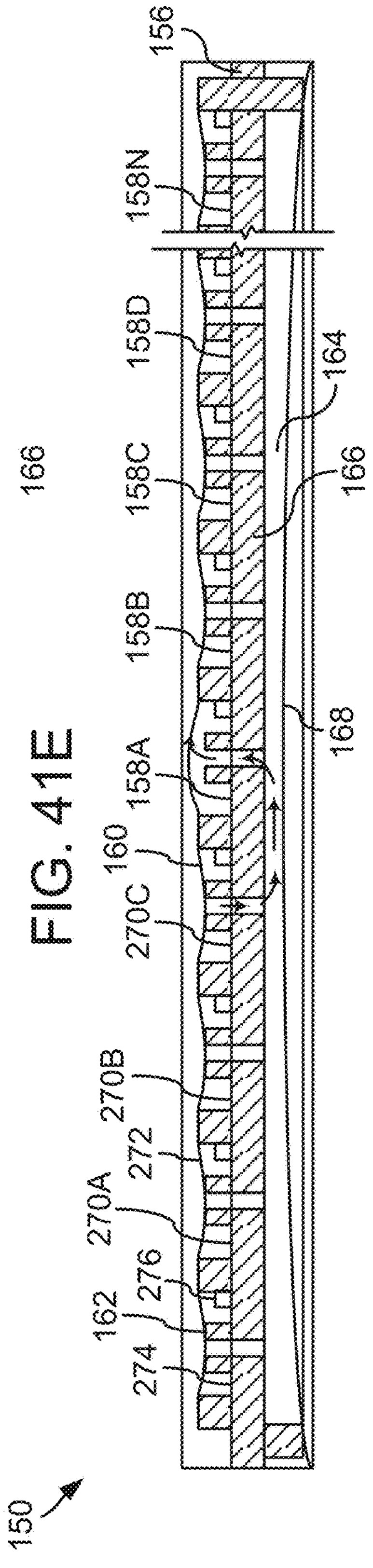
Figure 42:
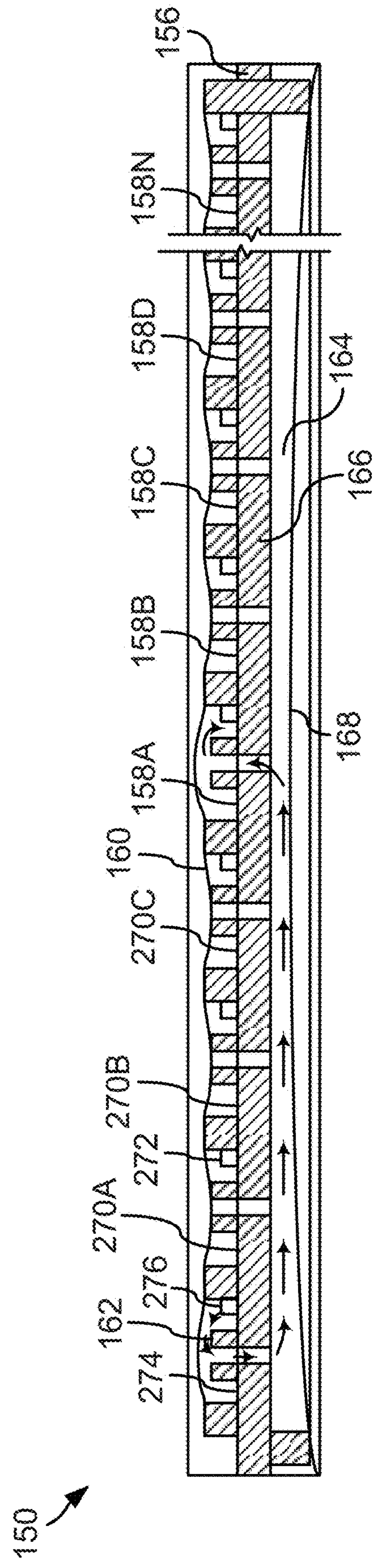
FIG. 42 depicts a volume of fluid being transferred to a bag through an example manifold.

Once a bag 26 has been filled it may be removed from the cassette 150 (or any other manifold 20) in a variety of ways. For example, a welded seal may be made on the tubing of the administration set 28 (or a filling port 140 or access 202). The bag 26 and a portion of the administration set 28 may then be cut from the manifold 20. This may be similar to as described above in relation to FIG. 22A-F. Alternatively, the tubing of the administration set 28 may be pinched or otherwise occluded and the administration set 28 decoupled from the cassette 150. The administration set 28 may then be plugged by a cap or similar element. In some examples, each administration set 28 may include a slide clamp. When installed in the system 10, the slide clamp may interface with an actuator which is commanded to displace once a bag 26 attached to the administration set 28 has been filled to the appropriate amount. Displacement of the actuator may drive a narrow section of the slide clamp toward the tubing such that the narrow section of the slide clamp occludes the tubing of the administration set 28.

Where the system 10 is configured to mix various fluids, and referring now to FIGS. 41A-42, a cassette 150 may include a number of valve type pumping stations 270A-C. Via coordinated actuation of valve type pumping stations 270A-C, small volumes of fluid can be pumped through the cassette 150. Referring to the progression of FIGS. 41A-41F, three valve type pumping stations 270A-C of the cassette 150 may be actuated to pump fluid from a concentrate supply inlet 272 included in the cassette 150 in small volumes. Though the three valve type pumping stations 270A-C are shown as adjacent to one another, this is done to provide a streamlined example. Other configurations with additional and/or non-adjacent valve type pumping stations 270A-C may be constructed.

As shown in FIG. 41B, a first and second valve station 270A and 270B may be opened to perform a fill operation of a valve type pumping station. These valve stations 270A-B may be opened in sequence or at substantially the same time. This may cause fluid flow 278 into these valve stations 270A-B from the concentrate supply inlet 272. Once the valve fill is complete, the filled valve station 270B may be isolated by closing the first valve station 270A as shown in FIG. 41C. Thus the second valve station 270*b* may serve as an intermediary holding volume during valve based fluid pumping.

The third valve station 270C may then be opened to establish fluid communication between the second and third valve station 270B, 270C as shown in FIG. 41D. A valve pump stroke may then be executed by closing the second valve station 270B as shown in FIG. 41E. This will transfer a valve pump stroke volume to the third valve station 270C from the intermediary holding volume. The third valve station 270C may then be closed, as shown in FIG. 41F, to pump the valve pump stroke volume toward a valve station 158A-N associated with a bag 26 attached to the cassette 150. Alternatively, the third valve station 270C may be omitted and fluid may be transferred to the desired valve station 158A-N as the second valve station is closed. This may be repeated as is desired until a target volume of concentrate has been transferred. Greater volumes per valve pumping sequence may be achieved by utilizing a plurality of valve stations as an intermediary holding volume. Further description of such an arrangement is provided in U.S. application Ser. No. 16/384,082, filed Apr. 15, 2019, entitled Medical Treatment System and Methods Using a Plurality of Fluid Line, which is hereby incorporated by reference herein it its entirety.

Once a desired volume of concentrate has been transferred via valve based pumping strokes, and referring now primarily to FIG. 42, a volume of water may be transferred to a bag 26 to dilute the concentrate to a final concentration. The final concentration may be a concentration which is ready be administered to a patient. The final concentration may also be defined so as to allow for addition of a volume of another medication to make a final medicament preparation which is then administered to the patient. In the example embodiment, a water inflow valve station 274 is included at an extreme end of the cassette 150. The water inflow valve station 274 may communicate with a water inlet 276 and when open may establish a flow path from the water inlet 276 through the fluid bus 164 to a desired valve station 158A-N and the associated bag 26. By positioning the water inflow valve station 274 at the end of the cassette 150, the water flow through the bus 164 may also serve to flush any concentrate remaining in the bus 164 to the desired bag 26. In some embodiments, a number of valve pumping strokes using water may be performed by any valve stations (e.g. intermediate holding volume stations) which are not dedicated to a particular concentrate to flush these station.

The volume of concentrate to be flushed from the valve station(s) and/or fluid bus 164 may be accounted for in any volume targets when pumping concentrate into the bag 26 via valve pump strokes. The full volume of concentrate defined for a particular bag 26, may thus not be transferred into that bag 26 until after the flush has concluded.

Figure 43:
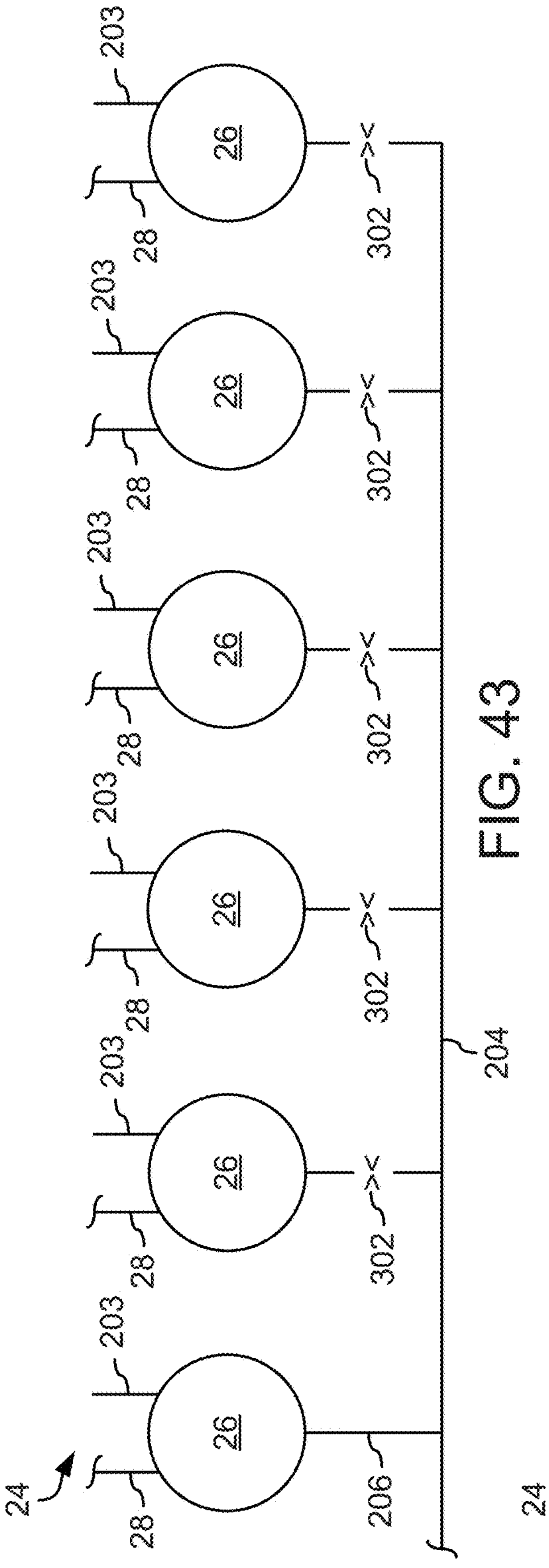
FIG. 43 depicts a diagrammatic example of another exemplary fill receiving set.

FIG. 43 depicts another alternative fill receiving set 24. As shown, there is a main line 204 which may interface with the output of the medical water production device 14. Bags 26 may branch off the main line 204 in series via a number of lines 206. The lines 206 may be attached to the main line 204 at T-junctions in some embodiments. Alternatively, the main line 204 may include a number of coupler fittings to which a cooperating element of a line 206 may couple to. The fill receiving set 24 may be arranged so as to act as the manifold 20. The lines 206 to the bags 26 may be kept closed by an occluder arrangement acting on the lines. Alternatively, the main line 204 may be occluded upstream of each branch point to a line 206 leading to one of the bags 26. In certain examples the lines 206 may be closed off via a pinch clamp 302 which may be mechanically actuated at the command of the control system 15. Bags 26 may be filled one by one and cut from the main line 204 after sealing as described elsewhere herein (see, e.g., FIGS. 22A-F). Once a bag 26 has been filled and severed from the fill receiving set 24, the pinch clamp 302 on the another bag 26 (e.g. the adjacent bag) may be opened to allow for filling of that bag 26. This may repeat until all bags 26 in a fill receiving set 24 have been filled and severed from the main line 204. In some embodiments, more than one bag 26 may be filled at a time. The lines 206 to the bags 26 may be constructed in the same manner as any of the lines or accesses described above and may include any of the features described elsewhere herein. For example, the bags 26 may include an additional administration line (not shown) similar to FIGS. 22A-F and FIG. 24 or Y-site similar to FIG. 23. Drip chambers 190 may also be included. In the example shown in FIG. 43, the lines 206 are included as filling lines and the bags 26 include additional attached accesses to their interior volumes such as an administration set 28 and injection port 203.

Figure 44:
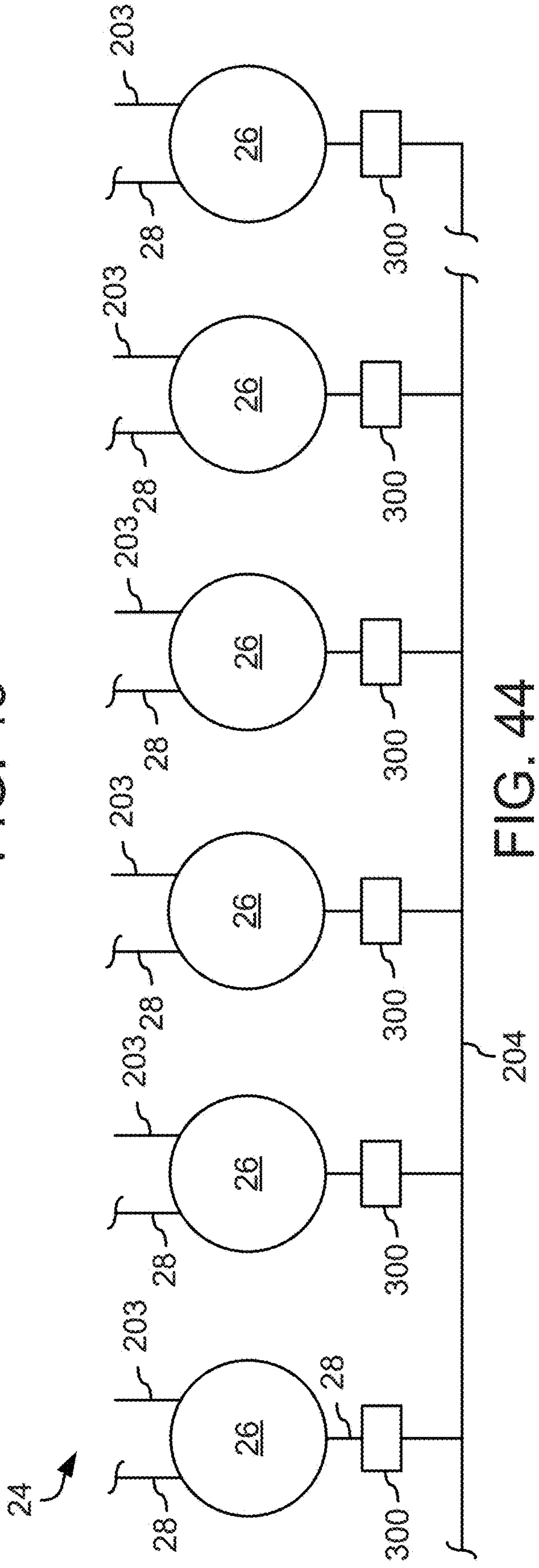
FIG. 44 depicts another diagrammatic example of an exemplary fill receiving set.

In some embodiments and referring now primarily to FIG. 44, pinch clamps 302 may not be used. Instead, each line 206 extending from the main line 204 may have a slide clamp 300 which, when installed in the system 10, is in an occluding position on the line 206 or upstream the point at which each line 206 branches from the main line 204. The slide clamps 300 may be displaced to a flow permitting position on the line to allow for filling of each bag 26. In some embodiments, the slide clamps 300 may be held stationary in a block and the lines 206 may instead be displaced to bring the lines 206 into a flow permitting segment of the slide clamps 300. After filling, the lines 206 may then be occluded by displacing either the line 206 or slide clamp 300 to bring the line 206 into a flow prohibiting portion of the slide clamp 300 to occlude the line 206. The same process may be used where the slide clamps 300 are in place on the main line 204. Once a bag 26 has been filled to the desired amount, the lines 206 may be decoupled from the main line 204 and capped or sealed.

Figure 45:
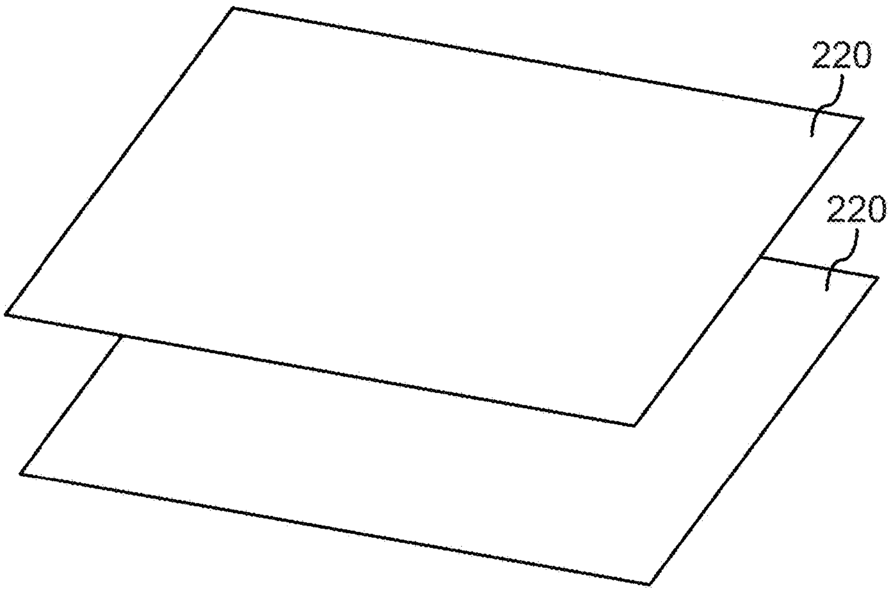
FIG. 45 depicts a number of layers of material which may be used to construct a fill receiving set.
Figure 46:
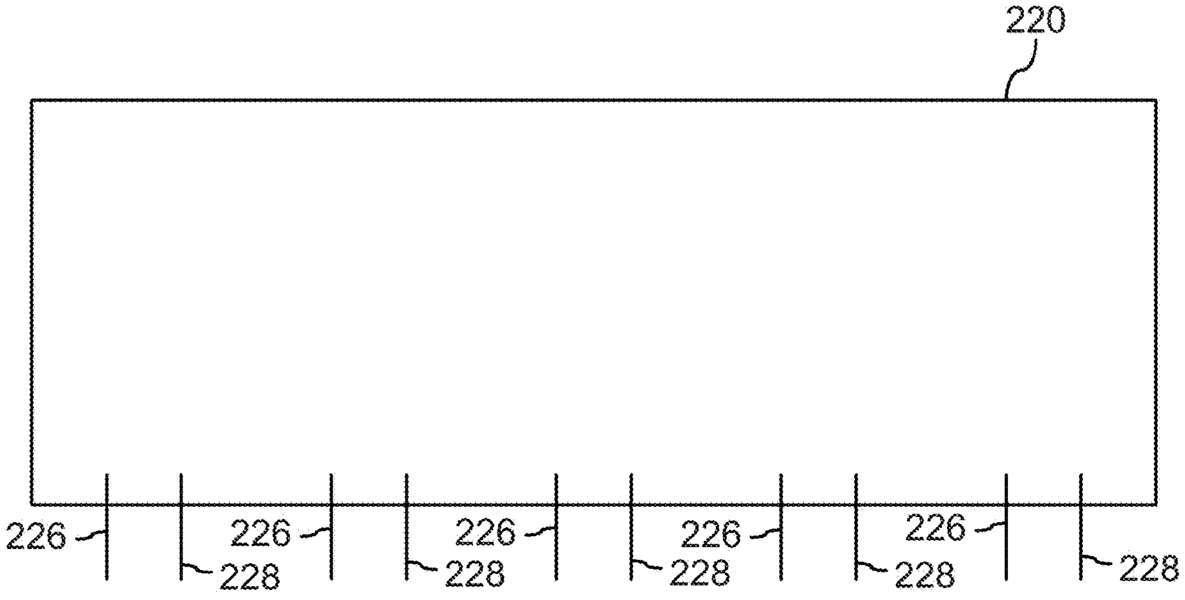
FIG. 46 depicts access elements of a fill receiving set placed between layers of fill receiving set material.

Referring now to FIG. 45, in certain embodiments, a fill receiving set 24 may be constructed from two layers of material. For example, the fill receiving set 24 may be constructed from a bonded sheet 220 or sheets of material. Where multiple sheets 220 are used, they may be laid atop one another. Where a single sheet 220 is used, the sheet 220 may be a continuous sheet of material folded upon itself to create a multi-layer starting material. As shown in FIG. 46, access elements 226, 228 may be placed between the sheets 220 or between layers of the folded over sheet 220 at regular intervals. For example, access elements 226 may be an injection port and access element 228 may be an administration set 28. In the example embodiment, there are only four sets (pairs in this example) of access element shown, however, the number of access element 226, 228 sets may be selected to match the number of bags 26 in the fill receiving set 24. In some embodiments each set of access elements 226, 228 may include more than two access elements. In other embodiments only a single access element may be included for each bag 26.

Figure 47:
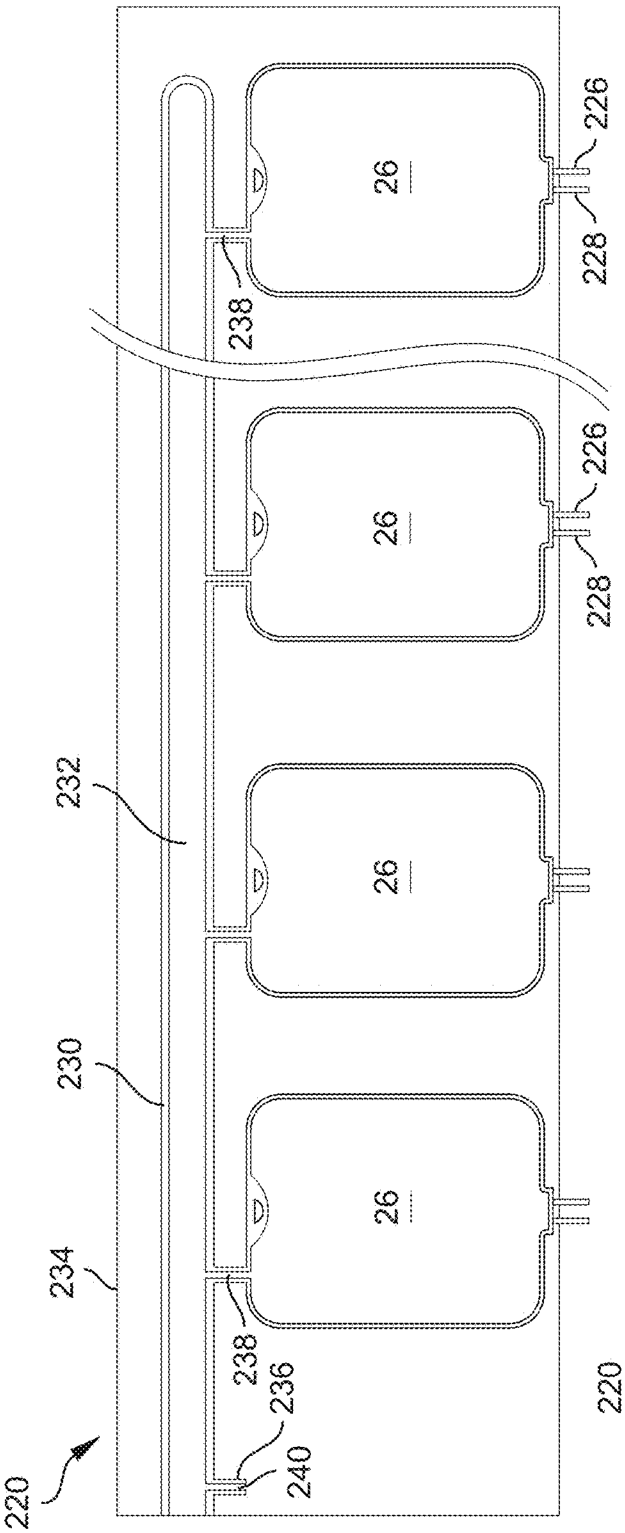
FIG. 47 depicts a seal formed between layers of material which defines an example fill receiving set.

Referring now to FIG. 47, a seal 230 may be formed to attach the sheets 220 or portions of the folded over sheet 220 to one another and form the fill receiving set 24. This may be done via a welding process such as an RF welding process. The materials selected for each sheet may include RF weldable materials and may be polar plastics such as PVC. For example, layers of the sheets 220 or folded over sheet 220 which are adjacent one another prior to welding may be made of such material. During construction of the fill receiving set 24, a portion of the sheets 220 or sheet 220 may be welded and the sheet material may be indexed to a next portion of the sheet 220. This portion may be welded and indexed and so on. The number of bags 26 formed in each welding operation may be less than the total number for bags 26 in a fill receiving set 24. In some embodiments, 1-4 or more bags 26 may be formed at a time. It may be preferable that the number of bags 26 in the fill receiving set 24 is an even multiple of the number of bags 26 formed per welding operation. As shown, the seal 230 may be formed so as to create a flow path 232 in a bus portion 234 of the fill receiving set 24 as well. The interior volume of each bag 26 may be in fluid communication with the bus portion 234 via an offshoot 238 from the flow path 232 to each bag 26. In the example, offshoots 238 all extend off the bus portions 234 in the same direction. In some embodiments, offshoots 238 may extend from opposing sides of the bus portion 234 such that bags 26 are disposed on each side of the bus portion 234.

When formed, the bags 26, bus portion 234, and offshoots 238 may all be flat with substantially little to no interior volume. During filling, the sheet material may displace so as to allow the bags 26 to fill and to provide lumens at the bus portion 234 and offshoots 238. As a result, a hold up volume of air should not be present in the bus portion 234 and offshoots 238 and thus is not transferred into the bags 26 during filling. In some embodiments, a vacuum may be pulled on the flow path to ensure a minimal amount of air is present in within the features formed by the seal 230.

The welding and indexing process may repeat until the whole sheet 220 has been welded to form the fill receiving set 24. When the sheet or sheets 220 is/are indexed, the welding die may extend over at least a portion of an overlap region in the previously created weld. This may assure that the seal 230 is formed hermetically over entire length of the fill receiving set 24. In some embodiments, the access element 226, 228 pairs may be introduced between the sheet 220 or sheets 220 each time an indexing occurs. As shown in FIG. 47, bags 26 may be formed close to one another so as to minimize waste of sheet 220 material.

Figure 48:
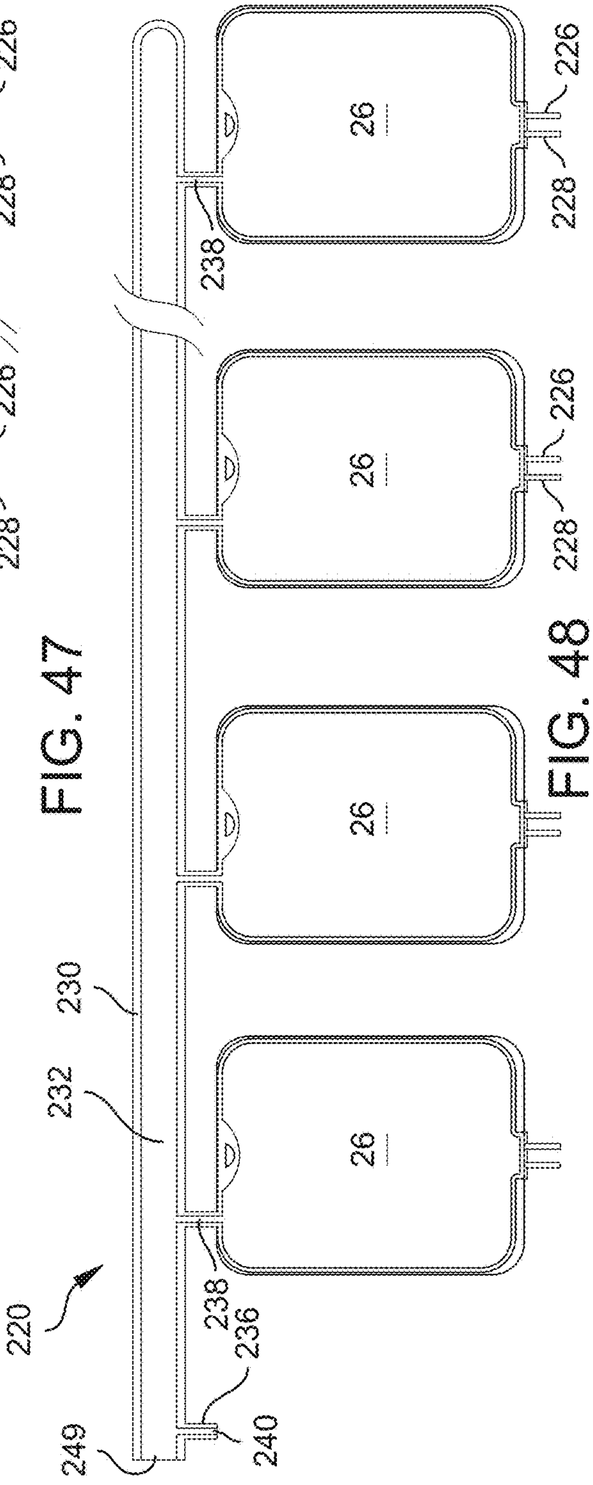
FIG. 48 depicts an example fill receiving set.

After being indexed from a welding station, the sheet 220 or sheets 220 may be cut as shown in FIG. 48 at a cutting station. A section of the sheet 220 or sheets 220 may be cut at the same time another section is welded. The cutting station may include a cutting die which is advanced into the folded sheet 220 or sheets 220 to cut out the bags 26. The excess material may be separated from the fill receiving set 24. A port 236 may be included in a terminal end of the fill receiving set 24. An offshoot 240 from the flow path 232 may extend through the port 236 to the environment. The port 236 may be located adjacent an inlet opening 249 to the flow path 232 in the fluid bus 234. In certain embodiments, a fitting may be coupled to the opening 249 to facilitate connection to a dispensing member.

Figure 49:
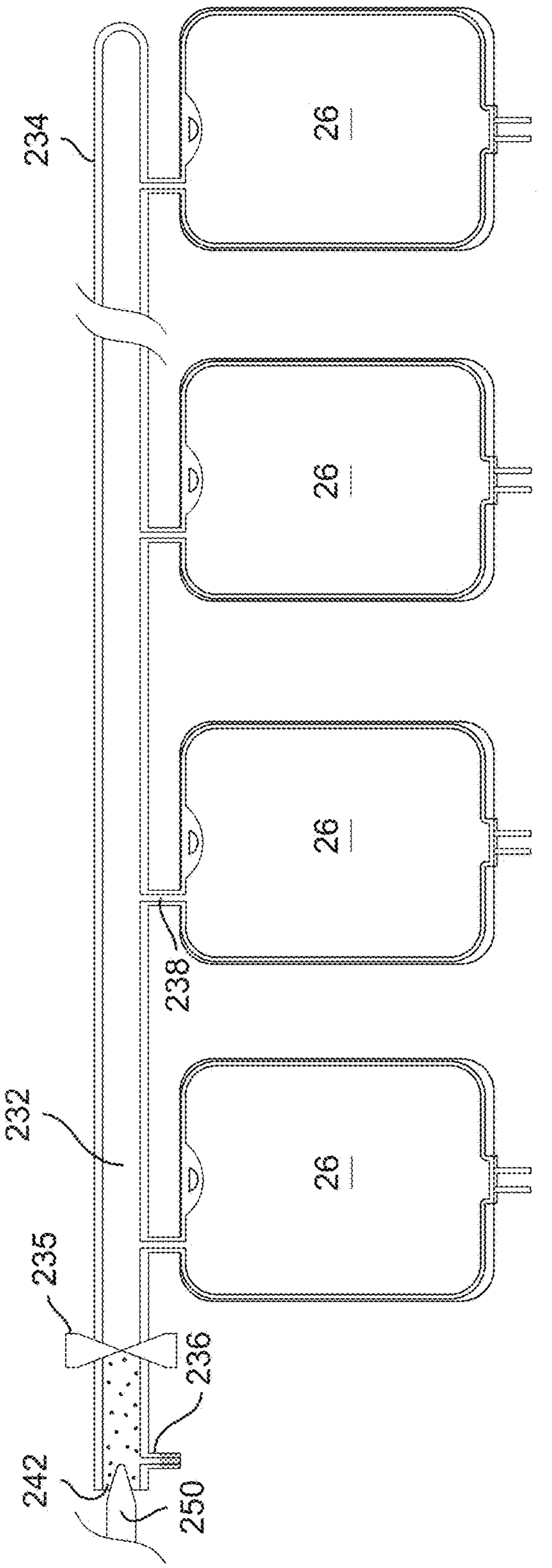
FIG. 49 depicts an example fill receiving set having with steam being supplied to a portion of the fill receiving set.

Referring now to FIG. 49, when installed in the system 10 a dispensing member 250 may be received in opening 249 or a fitting affixed thereto. This may be done by user manipulation of the bus portion 234 of the fill receiving set 24, though this coupling may also be made in automated fashion. Where manual user manipulation is utilized, the interaction between the user and the fill receiving set 24 may occur through a glovebox arrangement. Additionally, an occluder 252 may close the flow path 232 upstream of the first offshoot 238 to a bag 26. The dispensing member 250 may initially output a steam stream into the flow path 232. This may cleanse the flow path. The steam may be provided by venting a stream (e.g. purified, but yet uncondensed water vapor, perhaps a compendial steam such as pure steam) from the medical water production device 14 where the medical water production device 14 is a distillation device. The steam may exit the flow path 232 through the offshoot 240 leading through port 236. After a suitable amount of steam cleansing, the port 236 may be sealed by, for example, an RF seal 254 as shown in FIG. 50.

Figure 50:
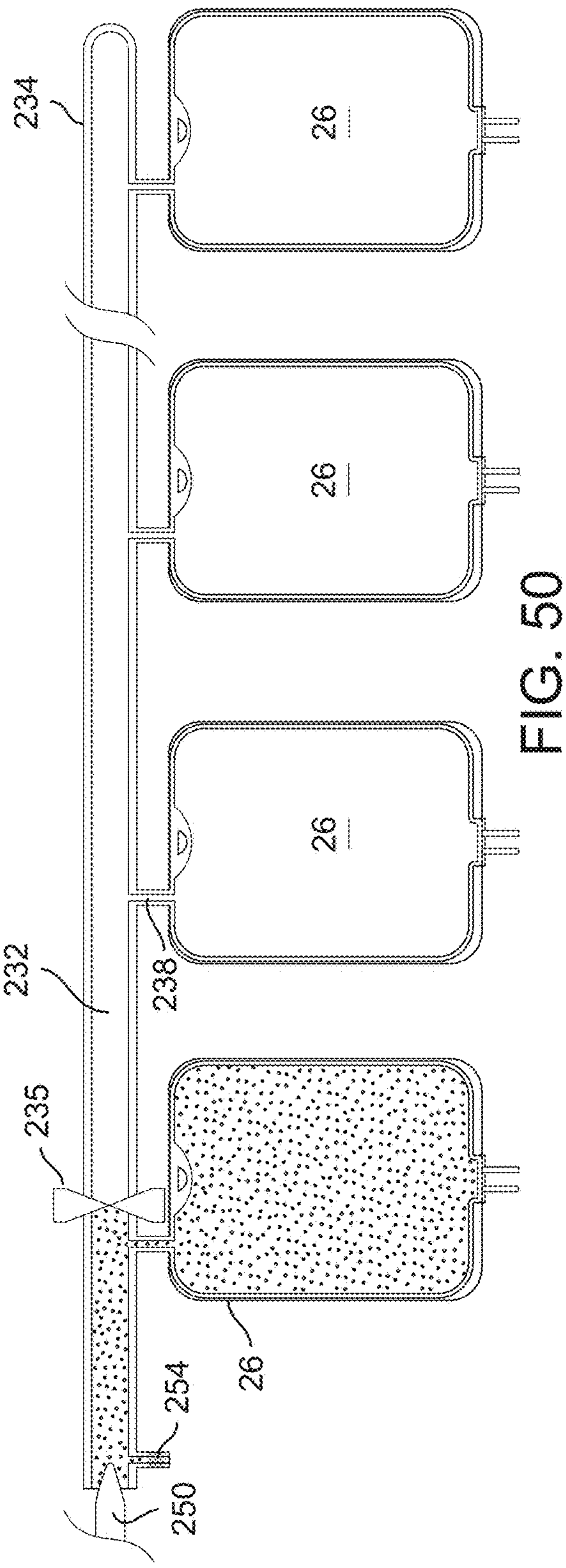
FIG. 50 depicts a bag being filled through an example fill receiving set.

As shown in FIG. 50, the dispensing member 250 (or in some embodiments, a second dispensing member which has been coupled to the opening 249 after removal of the steam dispenser) may output a medical water flow to the flow path 232 of the bus portion 234. Where a mixture of fluid is provided to the bag 26, the mixture may be output by the dispensing member 250. The occluder 252 may be advanced downstream of the first offshoot 238 to a bag 26. This may place the interior volume of at least one bag 26 into fluid communication with the opening 249. In some embodiments, the occluder 252 may be displaced to a location on the flow path 232 intermediate the first and second offshoots 238 to bags 26 as is shown in FIG. 50. In other embodiments, the occluder 252 may be displaced so as to place multiple bags 26 into fluid communication with the opening 249. An output of medical water or a mixture from the dispensing member 250 may fill the bag 26 to an appropriate amount (e.g. as sensed by a scale or volume displacement sensing arrangement) and the dispensing may be halted. The volume dispensed to a given bag 26 may be order specific and chosen based on an amount of diluent needed for a particular medication order. This may be computed by the control system 15 which may be in communication with a pharmacy order entry system and receives orders therefrom.

Figure 51:
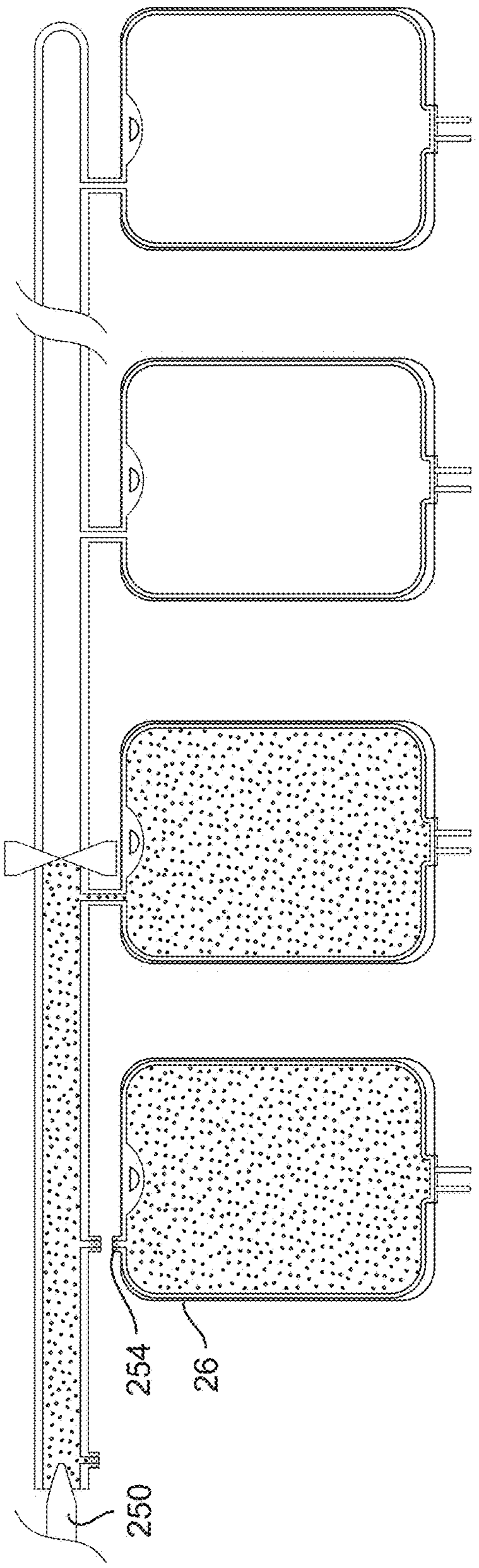
FIG. 51 depicts an example fill receiving set with a first bag of the set being filled and severed from the set and a second bag of the set being filled with fluid.
Figure 52:
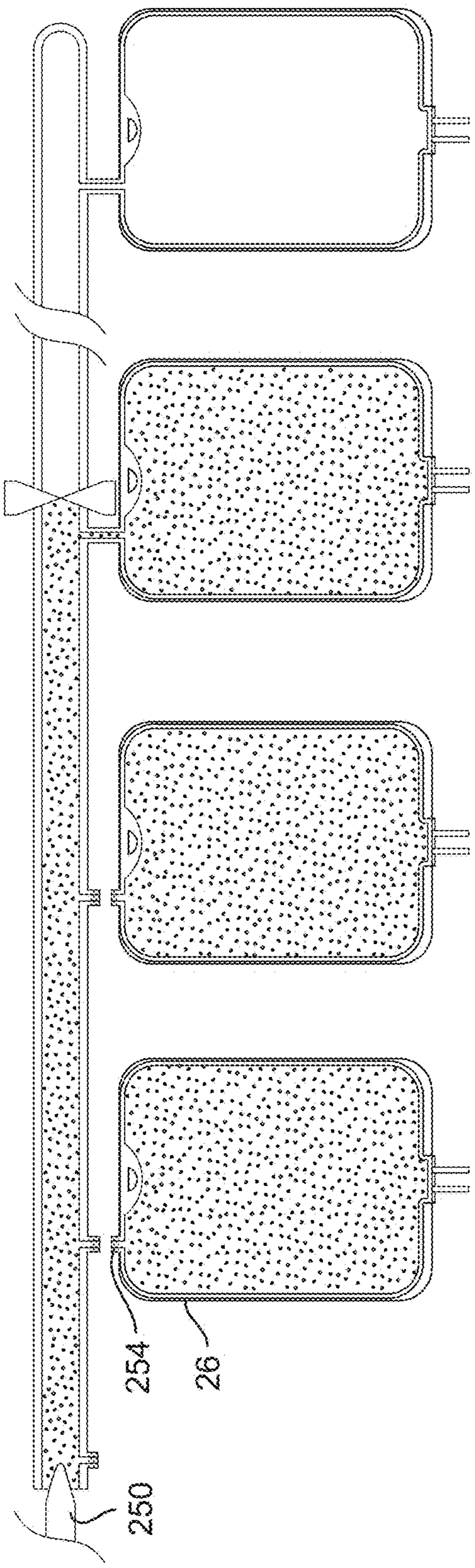
FIG. 52 depicts an example fill receiving set with a first and second bag of the set being filled and severed from the set and a third bag of the set being filled with fluid.

As shown in FIG. 51, a seal 254 may be generated to close the offshoot(s) 238 to any filled bag(s) 26 and the filled bag(s) 26 may be cut from the bus portion 234. The seal may be created via an RF weld and the sealing process may, for example, be performed as described in FIGS. 22A-22F. Alternatively the seal may be generated similarly to as described in relation to FIGS. 235-251. The occluder 252 may be advanced so as to place the interior volume of an additional bag 26 or bags 26 into fluid communication with the opening 249. The dispensing member 250 may then output medical water or a medical fluid mixture as described above to fill the bag 26 or bags 26. As shown in FIG. 52, this may continue until all bags 26 included in a fill receiving set 24 have been filled. As mentioned elsewhere herein, the fill receiving set 24 may include several dozen bags 26 (e.g. 50-100).

Figure 53:
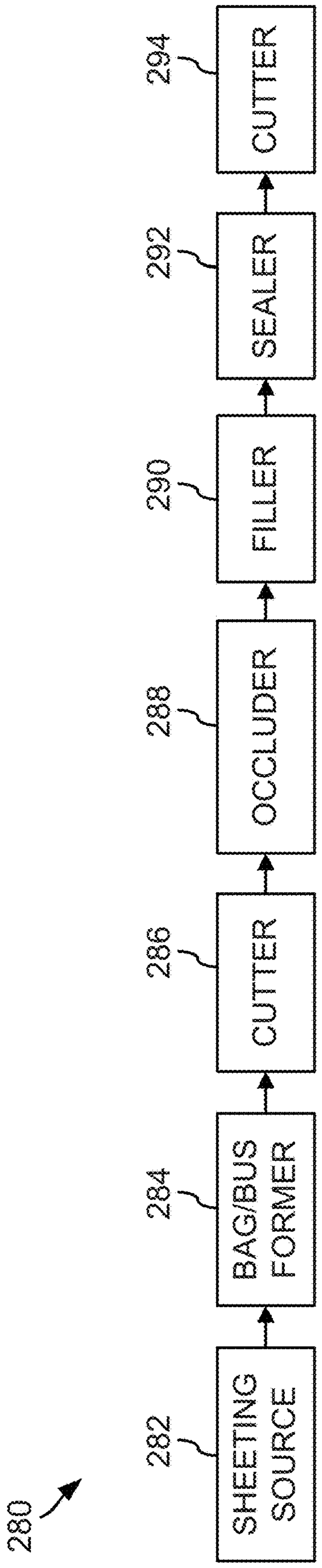
FIG. 53 depicts a block diagram of an example fill receiving set production and filling system.

Referring now also to FIG. 53, the welding, cutting and filling of bags 26 may be a continuous process on a production line 280 in certain embodiments. In such examples, a sheet or sheeting 220 may be drawn from a sheeting source 282 in a continuous manner. The sheeting source 282 may be a large roll, spool, carton, or the like. The sheeting 220 may first be drawn into a bag/bus former component 284 of the production line 280. As mentioned elsewhere, the bag/bus former 284 may be a plastic welder such as an RF welder. Sheeting 220 may be indexed through the bag/bus former 284 such that one or more bag is formed in the sheeting 220 at a time. The formed portion of the bag 26 and bus 234 may be cut from the sheeting 220 at a cutter station 286 of the production line 280. As mentioned elsewhere, this cutter station may include a die cutter. A filling station 290 may fill one or more of the cut out bags 26 with an occluder 288 of the production line 280 blocking off any downstream bags 26 and unformed sections of the sheeting 220. Filled bags 26 may be sealed off from the bus 234 at a sealing station 292 of the production line 280. The sealing station 292 may include an RF welder and may include rollers or squeegees as mentioned elsewhere herein. After sealing a bag 26 from the bus 234, the bag 26 may be cut from the bus 234 by a bag severing station 294 of the production line 280.

In alternative examples, the production line 280 may form and cut the bags 26 and bus 234 from an amount of sheeting 220. The production line 280 may not, however, fill the bags 26 and cut them from the bus 234. In such examples, unfilled bags 26 still attached to the bus 234 may be provided as a fill receiving set 24 to an institution or medical facility having filling, occluding, sealing, and bag severing components. This may help to minimize the amount of floor space needed at the medical facility. In such embodiments, the production line 280 may include a packaging station which applies an over pack around the fill receiving set 24.

Figure 54:
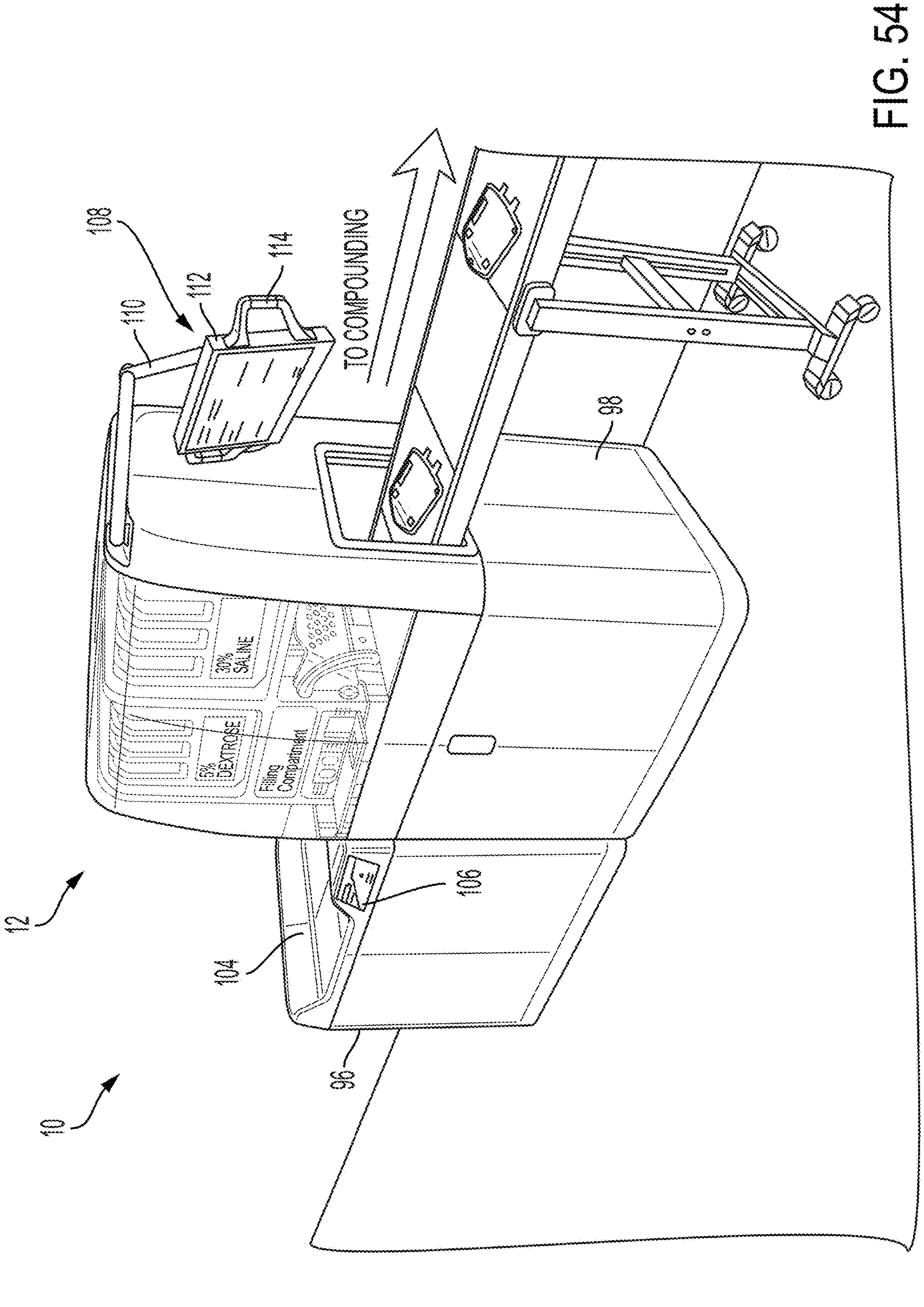
FIG. 54 depicts a perspective view of an example system for producing and packaging medical fluids.
Figure 55:
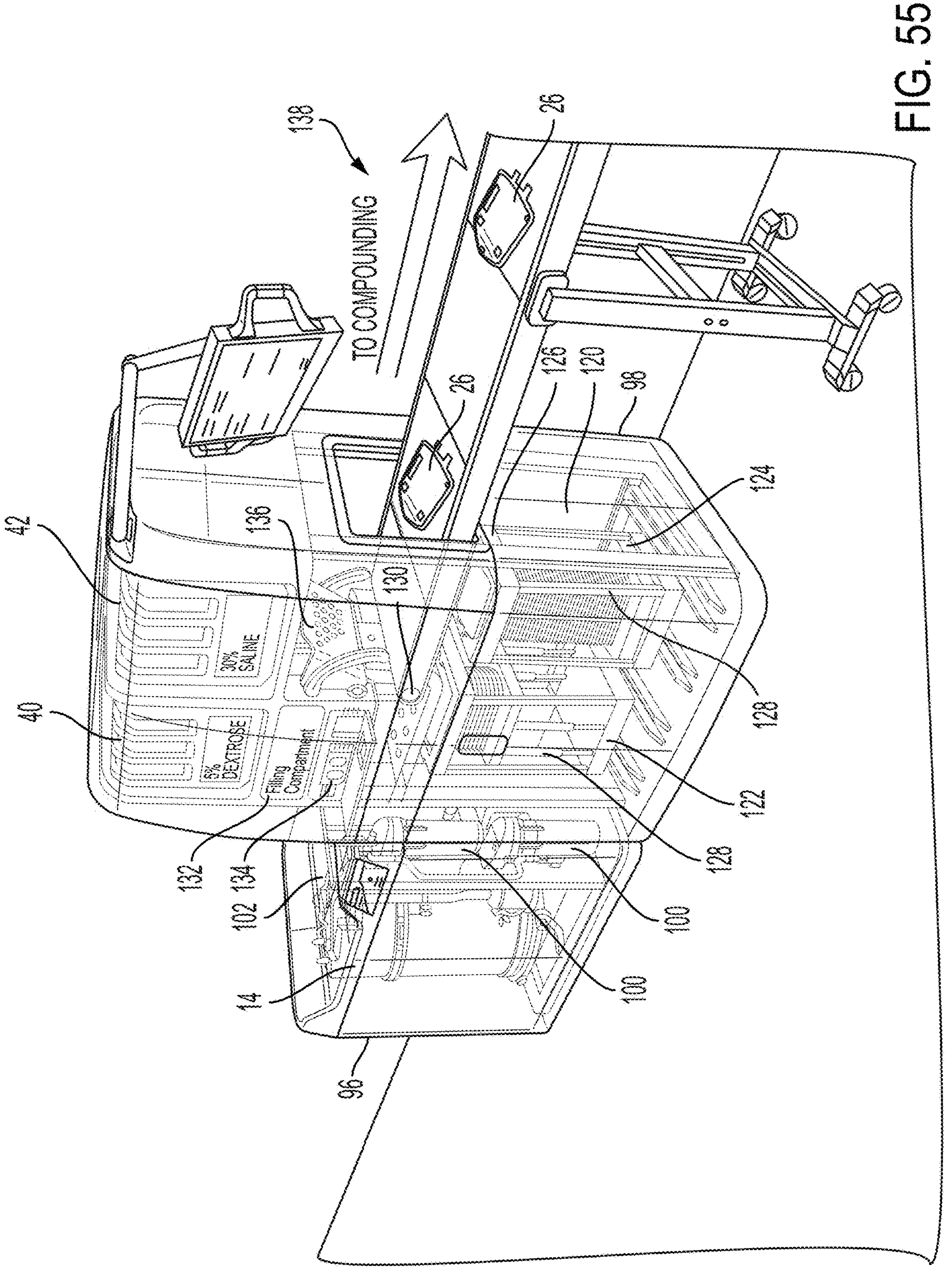
FIG. 55 depicts a perspective view of the example system in FIG. 54 with portions of the enclosure depicted as transparent to reveal various internal components of the system.

Referring now to FIGS. 54-55, an example system 10 for producing and packaging medical fluids is shown. As shown, the system 10 is placed in a clean room environment. The system 10 includes an enclosure 12. In the example embodiment, the enclosure is partitioned into a first section 96 and a second section 98. As is best shown in FIG. 55 (which depicts the system 10 of FIG. 54 with portions of the enclosure 12 being transparent), the first section 96 may house a medical water production device 14. In alternative embodiments, the medical water production device 14 may be in a non-clean room (or less stringent clean room) environment with its output plumbed to the clean room. In the example embodiment, the medical water production device 14 is shown as a distillation device which receives water that has been pretreated by a number of filters 100 (e.g. charcoal filters and/or reverse osmosis filters). The first section 96 may include a partition 102 which serves to divide the first section into a hot compartment and a cool compartment. The partition 102 and walls of the first section 96 of the enclosure 12 may include insulation as appropriate to prevent electronics and surfaces elsewhere in the system 10 from being subjected to high temperatures during distillation. The first section 96 may also be topped with a work surface 104 designed to be easily cleanable. For example, the work surface shown in FIG. 54 has rounded corners which minimize the possibility that areas may get missed during cleaning. The work surface 104 may be used to open fill receiving sets 24 or packages of individual bags 26 and manipulate them as needed to get them ready for installation into the system 10 for filling. The first portion 96 of the enclosure 12 may also include a user interface 106 such as a touch screen GUI. This user interface 106 may be used to interact with the medical water production device 14. The user interface 106 may also provide visual guidance in the form of tutorials (e.g. for wipe down and cleaning of the work surface 104 or other system 10 components or for preparation of a fill receiving set 24). The user interface 106 may also be used for interacting with the medical water production device 14 and allow for changing of settings and/or display of notifications, alerts, alarms, and other messages related to operation of the medical water production device 14.

The second portion 98 of the enclosure also includes a user interface 108. In the example embodiment, the user interface 108 is included on an articulated boom 110. The boom 110 may include a number of joints which may allow for the user interface 108 to be displaced by a user to a convenient location. The bezel 112 of the user interface 108 may include easily graspable handles which may facilitate displacement of the user interface 108. The user interface 108 may, for example, be a touch screen GUI.

The user interface(s) 106, 108 may be used to interact with the components of the system 10 which fill a fill receiving set 24 or, in the example shown, individual bags 26. The user interface(s) 106, 108 may also be used to interact with various medical systems of a hospital, urgent care center, surgery center, or similar institution. Such systems 10 may include a physician order input system, pharmacy order entry system, medical record system, continuous quality improvement system, drug error reduction system, inventory systems, laboratory systems, drug administration libraries, etc. Certain example medical systems which may interface with the system 10 are described in further detail in U.S. application Ser. No. 14/137,421, entitled Computer-Implemented Method, System, and Apparatus for Electronic Patient Care, filed Dec. 20, 2013 which is hereby incorporated by reference herein in its entirety. Such systems may track usage of the system 10 for producing and packaging medical fluids and manage orders sent to the system 10. These other medical systems may also monitor production from the system 10 and perform analysis against actual bag 26 usage within an institution (bag storage time, solution usage by care area, demand per day of week, etc.). Bags 26 may include or be associated with unique identifiers to facilitate data collection for this purpose. These identifiers may be read before or during administration to indicate that the fluid has been used and perhaps where within an institution the fluid is being used. This may allow for better inventory management and minimize storage cost and storage space demand. It may help to allow the system 10 to run as a part of a “just in time” inventory management system. Additionally, it may allow for an additional check to make sure that the fluid being used is the correct fluid (correct volume, concentration, dose, no contraindications, etc.) for a particular patient. Software updates for the system 10 may be provided via these other medical systems as well.

In some instances, the user interface 108 may be used for user credentialing; ensuring only trained or qualified users may operate the system 10 for producing and packaging medical fluids. This may be accomplished via biometrics, face recognition, pass code input, etc. which is checked against a database of approved users or pass-codes. Where biometrics are used, the user interface 106, 108 or another portion of the system 10 may be equipped with appropriate sensors (e.g. a camera, fingerprint scanner, etc.)

As best shown in FIG. 55, the second portion 98 of the enclosure 12 may include a storage volume or bay 120. The storage bay 120 may house at least one bag feeder 128 which is ready to be filled. In the example embodiment, two bag feeders 128 are stowed within the bay 120. The bag feeders 128 are installed into the system 10 via roll carts 122. The bag feeders 128 may include a biased platform 124. The bags 26 may be placed on the platform 124 in a stack. In alternative embodiments, the bags 26 may be included in a fill receiving set 24 and may be filled via a manifold 20 such as those described elsewhere herein. The bag feeders 128 may also include a top face 126 which may include an orifice through which the bags 26 may be pushed. As a bag 26 is removed from the stack (e.g. by a robotic manipulator, robotic flipper, or vacuum grasper) the biased platform may advance toward the top face of the bag feeder 128. This may ensure that another bag 26 is available for retrieval from the stack until bag feeder 128 has been completely depleted. As shown, the bias members for the platform 124 are depicted as springs, however, pneumatic, hydraulic or other means of displacing the platform 124 may be used in alternative embodiments.

In the example embodiment, a vacuum grasper 130 is included to pick up the bags 26 and displace them to a filling station or dispenser. In other embodiments, a filling nozzle assembly may be displaced to the topmost bag 26 and coupled to a fill port on the bag 26. In embodiments where the bags 26 are filled through the administration set 28, the filling nozzle may couple with an access included on the administration set 28. The bags 26 may be transferred to a filling compartment 132 of the system 10 for filling. In other embodiments, particularly those in which the administration set 28 or other conduit is integrated into the bag 26, a flipper may be used. The flipper may include a paddle member which follows underneath the path of the administration set 28 tubing or other conduit to easily get under and separate the bag 26 from the adjacent bag 26. The flipper may then transport the bag 26 to the filling station. Any suitable vision or sensing system may additionally or alternatively be used to aid in collection and transport of bags 26 off of the stack.

When the connection between the fill nozzle and bag 26 or administration set 28 is made the coupling members may be cleaned. For example, a venting port from a distillation device serving as the medical water production device 14 may be positioned to eject hot vapor on the coupling on the coupling surfaces. Alternatively, the vented hot vapor may pass through the filling nozzle and be ejected at the bag 26 or set's 28 coupling.

Where it is desired to fill the bags 26 with a compendial fluid such as WFI, the fluid may be provided from the medical water production device 14. In embodiments where the system 10 is arranged to fill the bags 26 with mixed fluid (if desired) the system 10 may include bulk reservoirs 40, 42. For purposes of example, the bulk reservoirs 40, 42 are respectively labeled as 5% Dextrose and 30% Saline. Any other suitable bulk reservoirs 40, 42 may be utilized and the contents of the reservoirs 40, 42 would depend on the solutions one desires to produce. Where the solution is a multi-component solution (e.g. Ringer's) bulk reservoirs 40, 42 for various constituents of the solution may be used. Alternatively, a single bulk reservoir 40, 42 containing concentrate of a mixture of all of the necessary components for that solution may be used. The system 10 may include a pumping apparatus 134 which meters fluid to send to the bag 26. The fluids may be metered so as to achieve a desired end concentration of fluid in a given bag 26. In certain examples, the pumping apparatus 134 may be a cassette based pumping apparatus. One such example apparatus is described in U.S. application Ser. No. 16/384,082, filed Apr. 15, 2019, entitled Medical Treatment System and Methods Using a Plurality of Fluid Line, which is hereby incorporated by reference herein it its entirety. Where the system 10 fills bags 26 with mixed fluid, the system 10 may include a sensing manifold. The sensing manifold may include conductivity and temperature probes which monitor the composition. Other types of composition sensors may also be used. For example, the system 10 may include spectrometers, turbidity meters, pH probes, sensors such as polarimeters for monitoring chiral properties of fluid components, dissolved ion sensors, dissolved oxygen sensors, Redox potential sensors, refractometers, TOC sensors, etc. Similar sensors may also monitor the output from the medical water production device 14 or be integrated therein. Other sensors such as bioburden sensors may also be included. Data from any mixture quality sensors may be sent to the control system 15 of the system 10 for analysis. Data may be compared to predetermined acceptable limits or thresholds for a given fluid type. Such sensors may also be used as a redundant check in addition to water quality testing done by the medical water production device 14. In embodiments where the system 10 is equipped to mix various fluids, it may be desirable to take a quality reading before expending concentrates into the fluid stream from the medical water production device 14. The sensors described above, or sensors in another sensing manifold, may check the quality of WFI water output from the medical water production device 14.

Once a bag 26 has been filled, it may be sealed and then exit the filling compartment 132 to be passed along to a bucket 136 or similar holder which places the bag 26 onto a conveyer assembly 138. The conveyer assembly 138 may pass bags 26 to a bin or similar storage location which may serve to hold the bags 26 until they are needed for administration. Alternatively, the conveyer assembly 138 may convey the bags 26 to a compounding area where additional medications are introduced to the bag 26 in an automated or manual fashion. In some embodiments, the conveyer assembly 138 may pass bags 26 to one or more automated and/or human inspection stations. Bags 26 may be conveyed to a quarantine station in which they reside until cleared for use in certain embodiments.

In some examples, a sensing assembly may be included to monitor bags 26 which are produced by the system 10. This sensing assembly may include visual sensors, for example, which image the bag 26. A processor may perform an image analysis and screen out bags 26 which may have defects. For example, the processor may flag bags 26 which have visible particulate, have an improper color, leaks, excessive air, and other concerns of interest.

Figure 56:
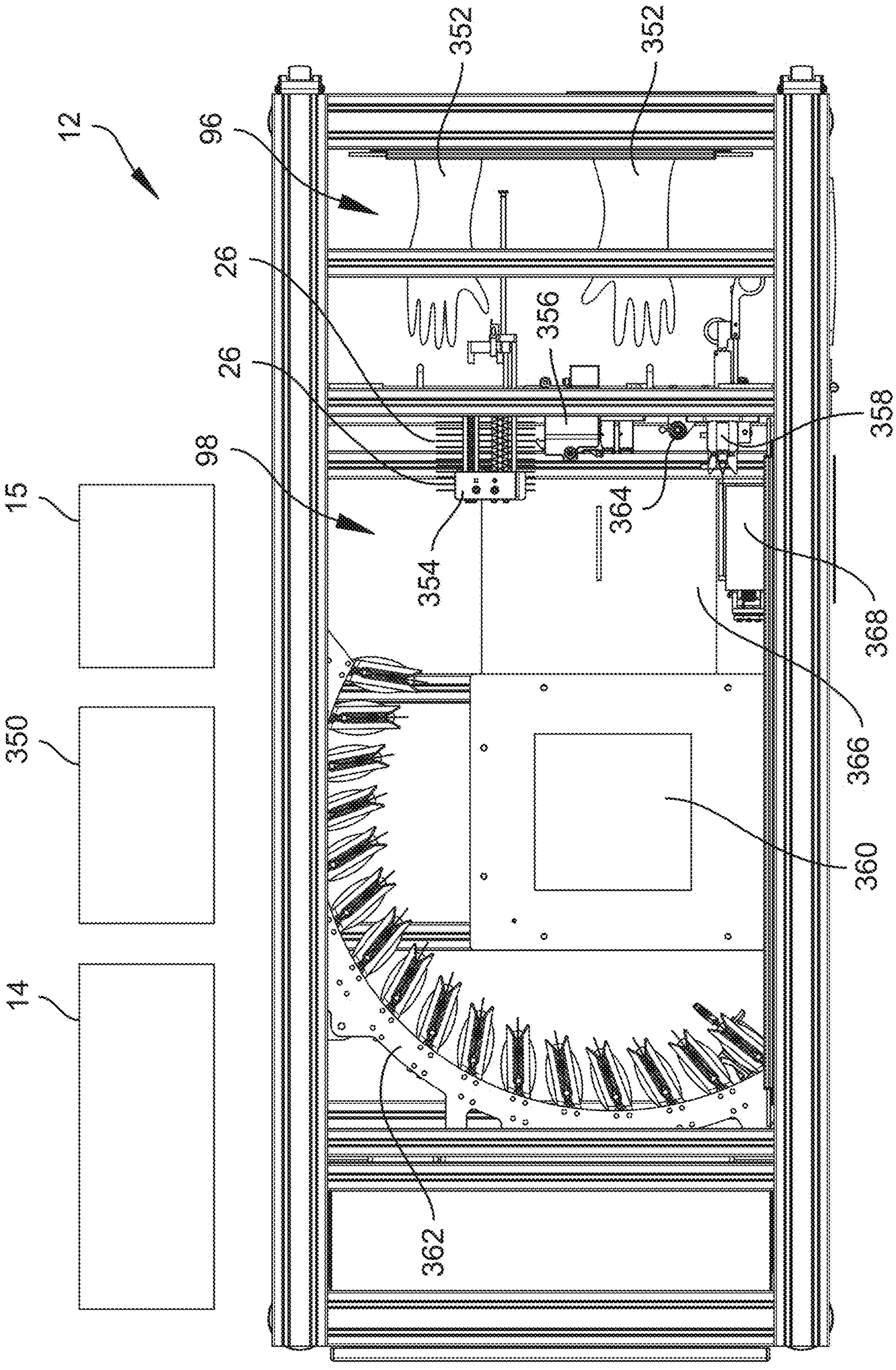
FIG. 56 depicts a top down view of another example system for producing and packaging medical fluids.

Referring now to FIG. 56, a top down view of another example system 10 for producing and packaging medical fluids is shown. The system 10 may include a medical water production device 14 such as any of those described herein. The system 10 may also include a mixing circuit 348 and a sensor suite 350 which may monitor the quality of purified water produced by the medical water production device 14 as well as mixed fluid generated in the mixing circuit 348. The sensor suite 350 may include any number of different types of water quality sensors. Any water quality sensors described herein may be included. The mixing circuit 348 and sensor suite 350 may be the example mixing circuit 348 and sensor suite 350 described in relation to FIG. 204 or FIG. 205.

The system 10 also includes an enclosure 12. The enclosure 12 may provide a clean room environment for the components of the system 10 contained therein. The enclosure 12 itself may also be contained within a clean room environment. In such embodiments, the enclosure 12 may be maintained at a higher clean room standard than the room in which it is located. In some embodiments, the enclosure 12 may be held at positive pressure by a blower system (not shown in FIG. 56, see e.g. item 600 of FIG. 177). In the example embodiment, the enclosure 12 is partitioned into a first section 96 and a second section 98. Each of these sections may be held at slightly different positive pressures. For example, the first section 96 may be held at a first pressure which is positive with respect to the surrounding environment. The second section 98 may be held at a pressure higher than the first pressure. Filling of bags 26 may occur in the most stringently controlled environment of the system 10. Various filters such as HEPA filters may be included to help ensure any air blown into the enclosure 12 to maintain positive pressure is clean.

The first section 96 may be an antechamber which may be utilized for preparing various consumables used by the system 10. For example, a stock of bags 26 or magazines 30 preloaded with bags 26 may be kept in the antechamber during use. Stopper magazines 466 (see, e.g. FIG. 74A) may also be stocked within the antechamber. Sampling vials 532 (see, e.g., FIG. 103) may also be kept in stock within the antechamber. This may help to minimize the need to access the interior of the enclosure 12 during operation of the system 10. Various racks, shelving, hangers, compartments, or holders may be included to aid in organizing component stocks. The first section 96 may also include certain testing equipment that may be used to verify bags 26 have been filled according to predefined criteria. For example, the first section 96 may include an endotoxin or pyrogen tester such as an Endosafe nexgen-PTS available form Charles River Laboratories, Inc. of Wilmington Massachusetts. Additionally, any sampling ports in the fluid circuit may be accessible via the antechamber. The first section 96 may be constructed as a glove box and include at least one pair of glove interfaces 352 which may be used to interact with components in the antechamber.

The second section 98 may include a bag feeder 354, filling station 356, and a sealing station 358. Bags 26 may be loaded into the bag feeder 354 by a user via the gloved interfaces 352. Alternatively, fill receiving sets 24 may be used. In the example shown, a bulk container or cartridge of individual bags 26 or preloaded bag dispensers (e.g. magazines) may be held in the antechamber and bags 26 may individually be installed in the bag feeder 354. In certain embodiments, a plurality of bag feeders 354 each holding different bag 26 types having different fill capacities may be included. A robotic arm 360 including a grasper may collect a bag 26 from the bag feeder 354 and displace the bag 26 to the filling station 356. Fluid may be dispensed into the bag 26 at the filling station 356. This fluid may be purified water such as WFI water, or a mixture of fluid generated at a mixing subsystem similar to those described in relation to FIG. 2A and FIG. 2B. Bags 26 may also include a concentrate as described above in relation to FIGS. 5A-6 for example. From the filling station 356, the robotic arm 360 may displace the filled bag 26 to a sealing station 358. An access to the interior volume of the bag 26 may be sealed closed at the sealing station 358 (e.g. via stoppering, RF welding, etc.).

From the sealing station 358, the bag 26 may be moved to a quarantine repository 362 included within the second section 98 of the enclosure 12. As bags 26 are filled and sealed they may remain in the quarantine repository 362 for some period of time. For example, prior to the first bag 26 being stored within the quarantine repository 362, a sampling vial 364 may be brought to the filling station 356. A volume of fluid may be dispensed to the vial 364. The vial 364 may then be brought to a tester such as the pyrogen (e.g. endotoxin) tester described above. Once the quarantine repository 362 is full or after a certain number of bags 26 have been placed in the quarantine repository 362, another vial 364 of fluid may be collected at the filling station 356 and a second test at the tester may be run. Both the pre and post quarantining tests may be required to pass in order for the control system 15 to allow release of the bags 26 from the quarantine repository 362.

Once the bags 26 have been released from quarantine, the bags 26 may be labeled. In the example embodiment, the second section 98 of the enclosure 12 includes a labeler 366. The labeler 366 may be any suitable labeler 366 such as a thermal printer. A thermal ribbon transfer type printer may be particularly desirable in certain embodiments. The labeler 366 may generate and facilitate application of a label to each of the bags 26 produced by the system 10. The labels may be adhered to the bag 26 via an adhesive backing. The label may include information required by any relevant statues or regulations as well as identifying characteristics, tracking information, computer readable indicia, corresponding patient information, instructions for use, etc. Bags 26 may then be expelled from the enclosure 12 through an output 368 which may include a chute which has a gated or doored entry. Bags 26 may exit the enclosure 12 through the output and be ejected into a container or conveyer (neither shown in FIG. 56) disposed at the outlet of the output 368.

Figure 57:
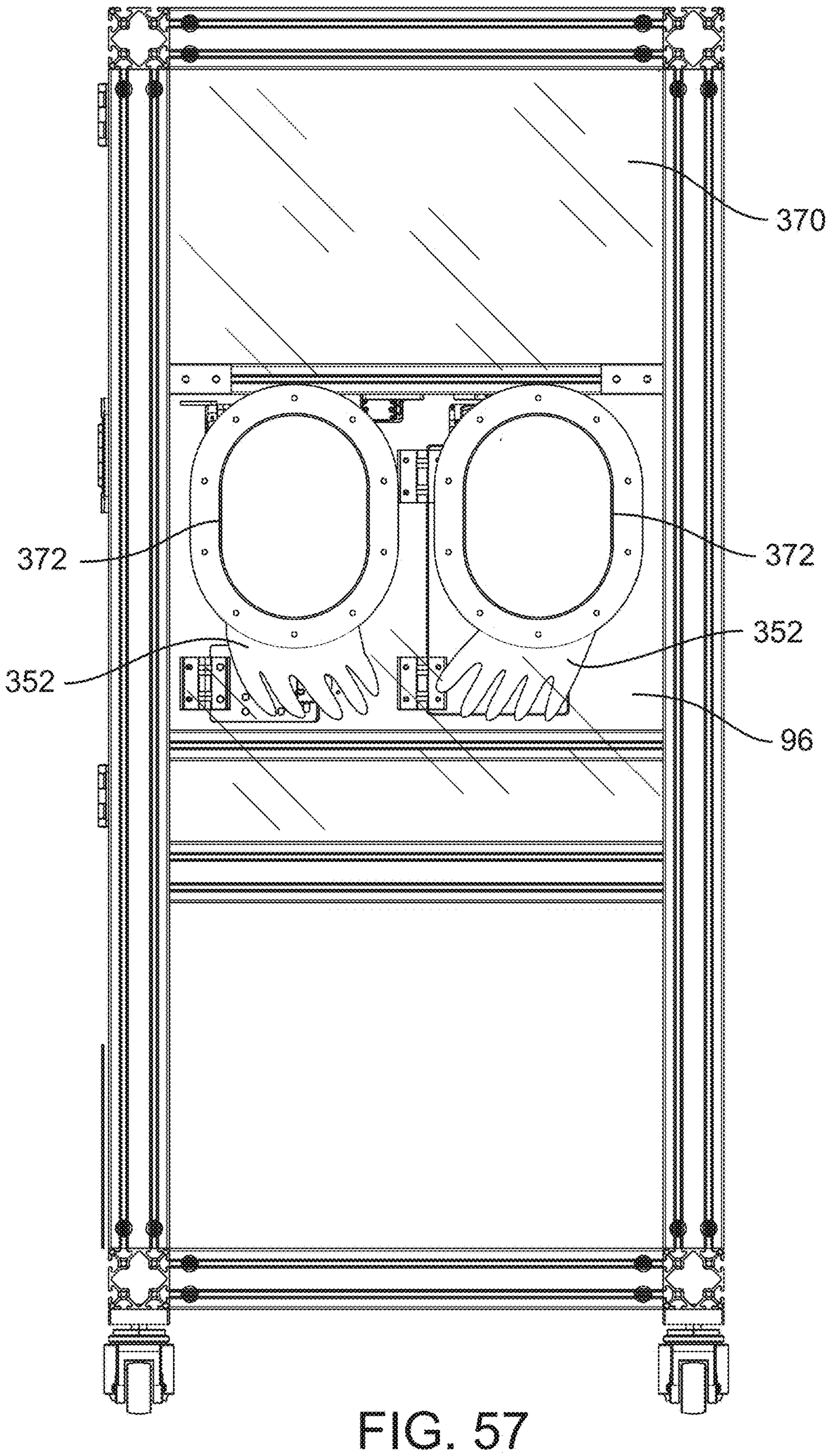
FIG. 57 depicts a side view of the example system shown in FIG. 56.

Referring now to FIG. 57, a side view of the enclosure 12 depicted in FIG. 56 is shown. As shown, a side panel 370 of the first section 96 of the enclosure 12 is depicted as transparent to allow for viewing of the interior of the antechamber. As shown, the side panel 370 may include ports 372. The glove interfaces 352 may be mounted into the ports 372 in a fluid tight manner. The glove interfaces 352 may be mounted at a height which is comfortable for an average standing or seated user. The glove interfaces 352 may provide a sterility barrier through which a user may manipulate various components of the system 10 within the enclosure 12.

Figure 58:
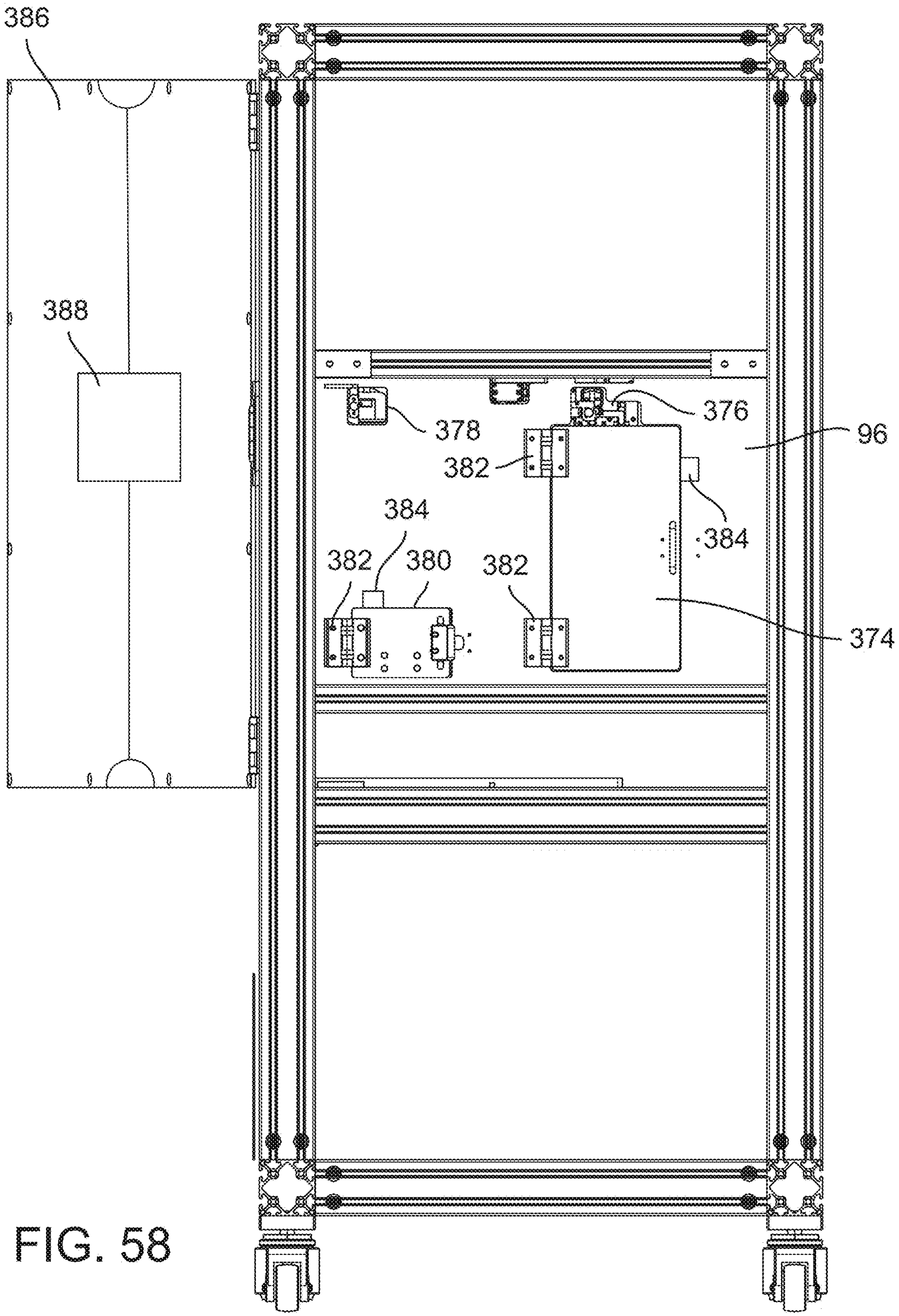
FIG. 58 depicts another side view of the example system shown in FIG. 56.

Referring now also to FIG. 58, a side view of the example enclosure with the side panel 370 and glove interfaces 352 removed is depicted. A number of access openings from the first section 96 to second section 98 of the housing 12 may be included. These access openings may include a bag loading door 374, a bag feeder port 376, a sealing station port 378 and a vial access door 380. The bag feeder port 376 may allow access to a portion of the bag feeder 354 to allow the bag feeder 354 to be opened such that bags 26 or a preloaded dispenser of bags 26 such as a magazine may be loaded into the bag feeder 354. The bag feeder door 374 may be opened so as to allow bags 26 to be passed from the first section 96 to the second section 98 of the enclosure 12 as they are loaded into the bag feeder 354 The sealing station port 378 may provide an opening through which a magazine (e.g. containing a supply of stoppers) may be installed in the sealing station 358. The vial access door 380 may allow for vials to be introduced and withdrawn from the second section 98 of the enclosure 12 for sample collection and testing. All interaction with these components may be via the glove interfaces 352. Any doors may include clean room appropriate hinges 382. In certain embodiments, hinges 382 may be detent hinges which tend to hold the attached door in a prescribed position and resist inadvertent displacement therefrom. Such hinges may also assist the attached door in reaching the prescribed position once the door has been rotated to within a range of the prescribed position. For example, detent hinges which tend to hold the attached door closed may be used. Any door may be paired with at least one respective position sensor 384. The position sensors 384 may detect whether the doors are in an open or closed state. Any suitable type of sensor may be used, however, inductive or magnetic sensors 384 may be preferred in certain embodiments. An antechamber door 386 may also be provided and may include a lockable latch mechanism 388 which may be used to hold the antechamber door 386 in a closed position. The antechamber door 386 may be paired with at least one position sensor 384 similar to those described above. A control system 15 of the system 10 may monitor the output from the door position sensors 384 and may generate a user interface notification when a door is open. The control system 15 may also prohibit certain actions in the event that a door is open. For example, filling of bags 26 may be prohibited in the event that a door is left open.

Figure 59:
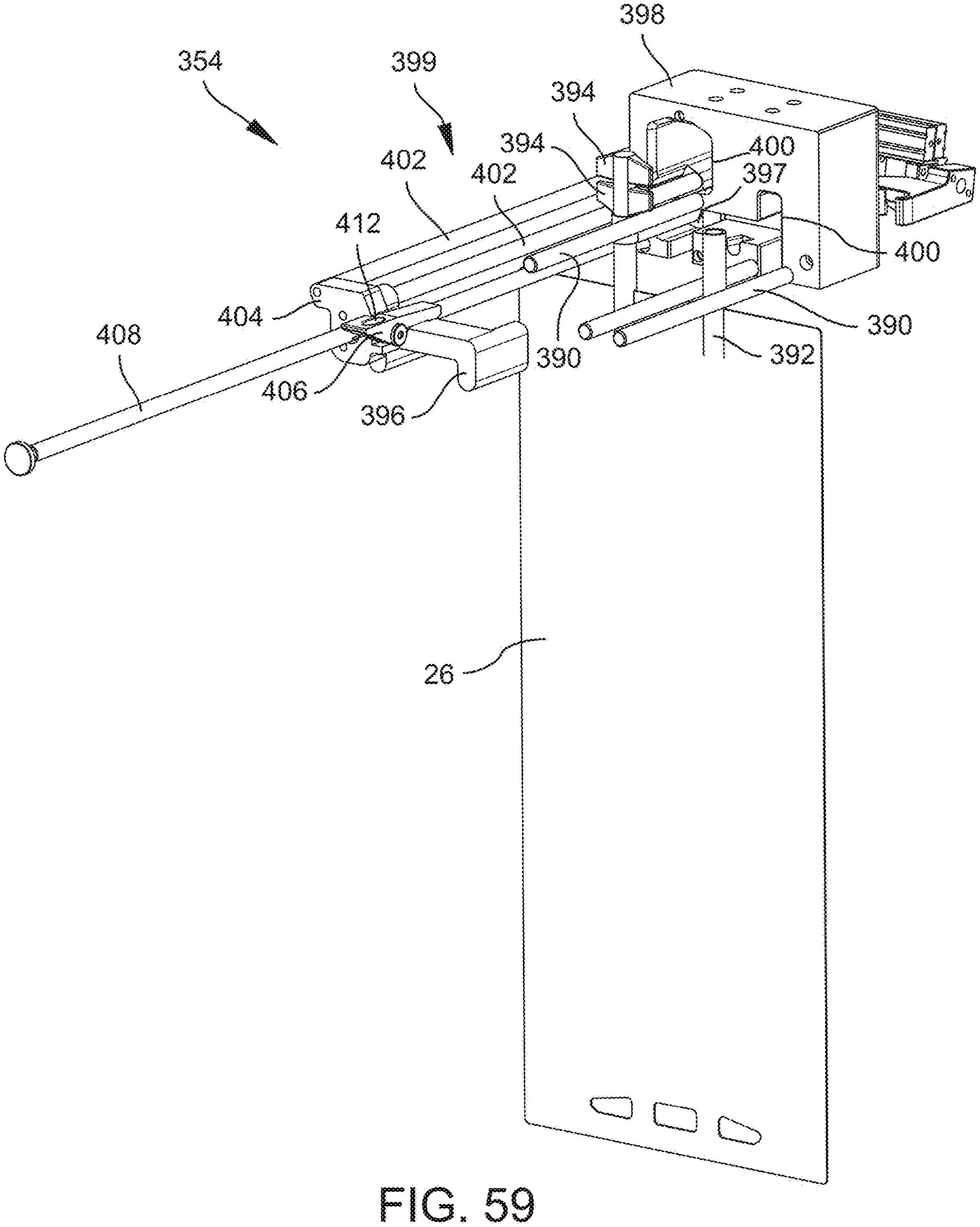
FIG. 59 depicts a perspective view of an example bag feeder.

Referring now to FIG. 59, an example embodiment of a bag feeder 354 is depicted. As shown, the bag feeder 354 may include a magazine portion 399 and a housing block 398. In some embodiments, the magazine portion 399 may be separable from the housing block 399. In such embodiments, the magazine portion 399 may be provided in a pre-loaded state and coupled to the housing block 398 to ready the bag feeder 354 for use. In the example embodiment, the magazine portion 399 is integrated with and fixed to the housing block 398. The magazine portion 399 may be opened and loaded with bags 26 by a user and may advance bags 26 through the bag feeder 354 as system 10 consumes bags 26. In some embodiments, stripper clips or magazine chargers may be provided so as to facilitate loading of the magazine portion 399. Where preloaded magazine portions 399 or stripper clips are used, these items may come clean and sterilized within an over pack 60 which is doffed once the magazine or stripper clip has entered the antechamber and is ready for use. Alternatively, consumable component such as bags 26 or magazine portions 399 may be transferred into the enclosure via an alpha port and beta container arrangement as described in relation to FIG. 111.

The magazine portion 399, in the example embodiment, includes a number of guides 390. The guides 390 may be sized to accept tubing or ports 392 extending from the bags 26. In the example embodiments, one of the ports 392 includes fins 394 which may rest atop one of the guides 390 so as to allow the bag to hang from the guides 390. In the example, the guides 390 are constructed as pairs of rails which extend parallel to one another. A slot may be present between the rails making up each of the guides 390 and may have a width sufficient to accept the port 392 of the bag 26. The exemplary guides 390 extend from the housing block 398. The housing block 398 may include channels 400 for the ports 392 to pass through as bags 26 are fed into the second section 98 of the enclosure 12.

In some embodiments, a blocking plate 405 (see the embodiment in FIG. 64) may be included between the guides 390. This may aid in preventing a user from misloading bags 26 in the bag feeder 354 by preventing ports 392 from being displaced into the space between the guides 390. In some embodiments a straightener member 407 (see the embodiment in FIG. 64) may also be included. The straightener member 407 may extend parallel to the guides 390 and be positioned so as to block bags 26 from hanging in the guides 390 in a crooked orientation. The straightener member 407 may be spaced from a guide 390 a distance which is at least equal to the distance from a port 392 of the bag 26 to the nearest side edge of that bag 26.

The magazine portion 399 of the bag feeder 354 may also include a feed plate 396. The feed plate 396 may be coupled to the housing block 398 via a bias member 401 (best shown in FIG. 64) which urges the feed plate 396 toward the housing block 398. The bias member 401 may be constant force spring in various examples. A pair of standoffs 402 may also extend from the housing block 398. The standoffs 402 may be coupled to a feed plate retainer 403. In the example embodiment a latch plate 404 which may include a latch 406 is shown. The feed plate 396 may be coupled to a plunger 408 which may be pulled via the glove interfaces 352 to retract the feed plate 396. The latch 406 may interface with the feed plate 396 to retain the feed plate 396 in a retracted position where it is spaced a distance from the guides 390. This may allow a user to load bags 26 into the magazine portion 399. In alternative embodiments, a magnetic latching arrangement similar to that described in relation to FIG. 73 may be used in place of the latch 406.

Figure 61:
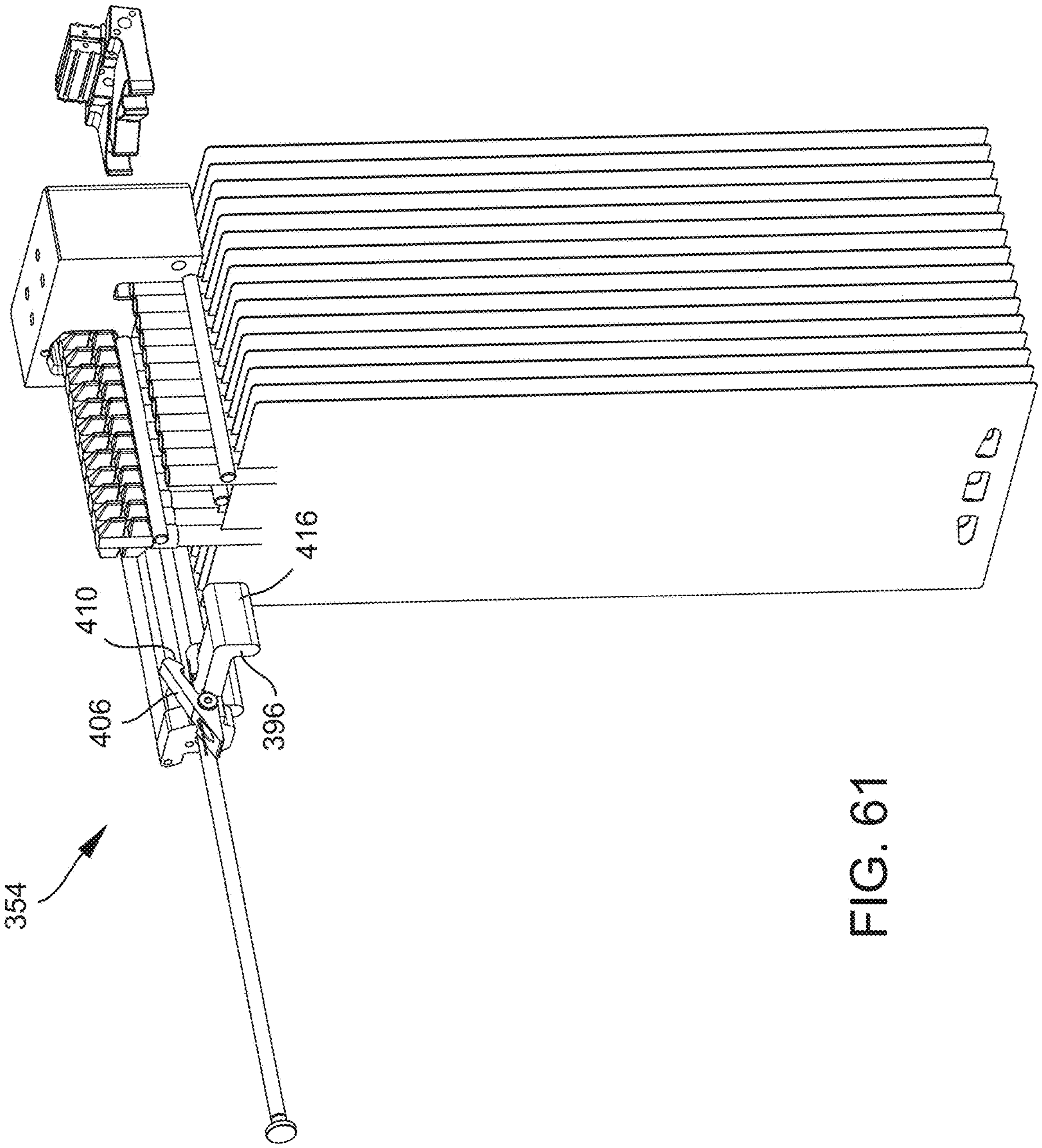
FIG. 61 depicts a perspective view of an example bag feeder with a feed plate being released from a loading position.

In some embodiments, the latch 406 may be biased toward a latching position (e.g. via a torsion spring). When the feed plate 396 is withdrawn via the plunger 408 the latch 406 may be pushed out of the way and automatically displace into a latching engagement with the feed plate 396 when the feed plate 396 has been withdrawn to a predefined open position. The latch 406 may include a sloped or ramped face 410 (see, e.g. FIG. 61) which may facilitate movement of the latch 406 out of an obstructing orientation as the feed plate 396 is withdrawn into contact with the latch 406. The latch 406 may also include a depression 412 which may aid in operation of the latch 406 through the glove interface 352.

Figure 60:
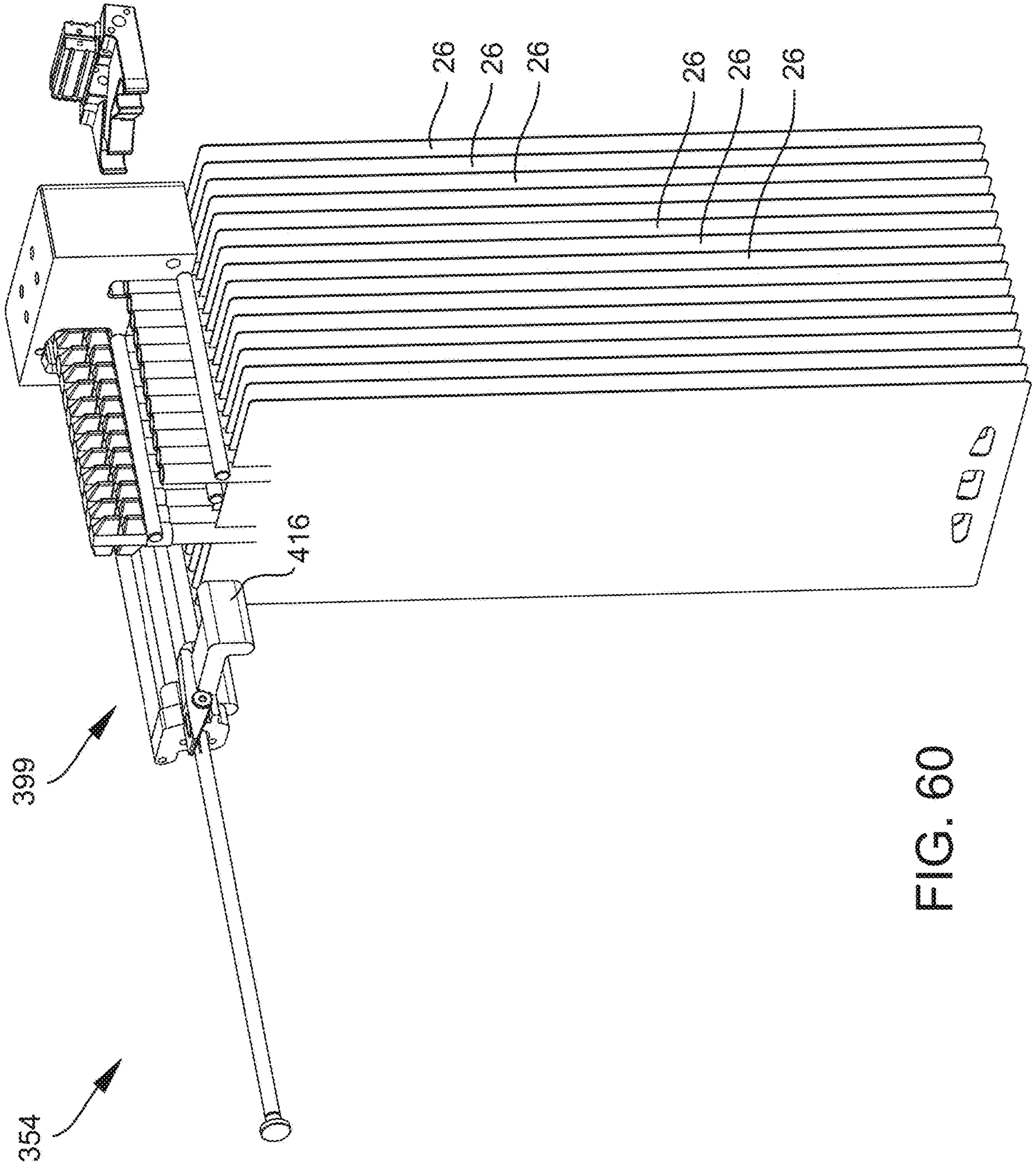
FIG. 60 depicts a perspective view of an example bag feeder fully loaded with bags.

Referring now to FIG. 60, the exemplary bag feeder 354 of FIG. 59 is shown fully loaded with bags 26. In the example embodiments, the bag feeder 354 has a capacity of sixteen bags 26, however, a greater or lesser number of bags 26 may be capable of being installed in alternative embodiments. Once full, and referring now also to FIG. 61, the latch 406 may be displaced out of engagement with the feed plate 396. The exemplary feed plate 396 may then, under force exerted by a bias member 401 (best shown in FIG. 64) connecting the feed plate 396 to the housing block 398, displace into contact with the last bag 26 in the bag feeder 354.

Figure 62:
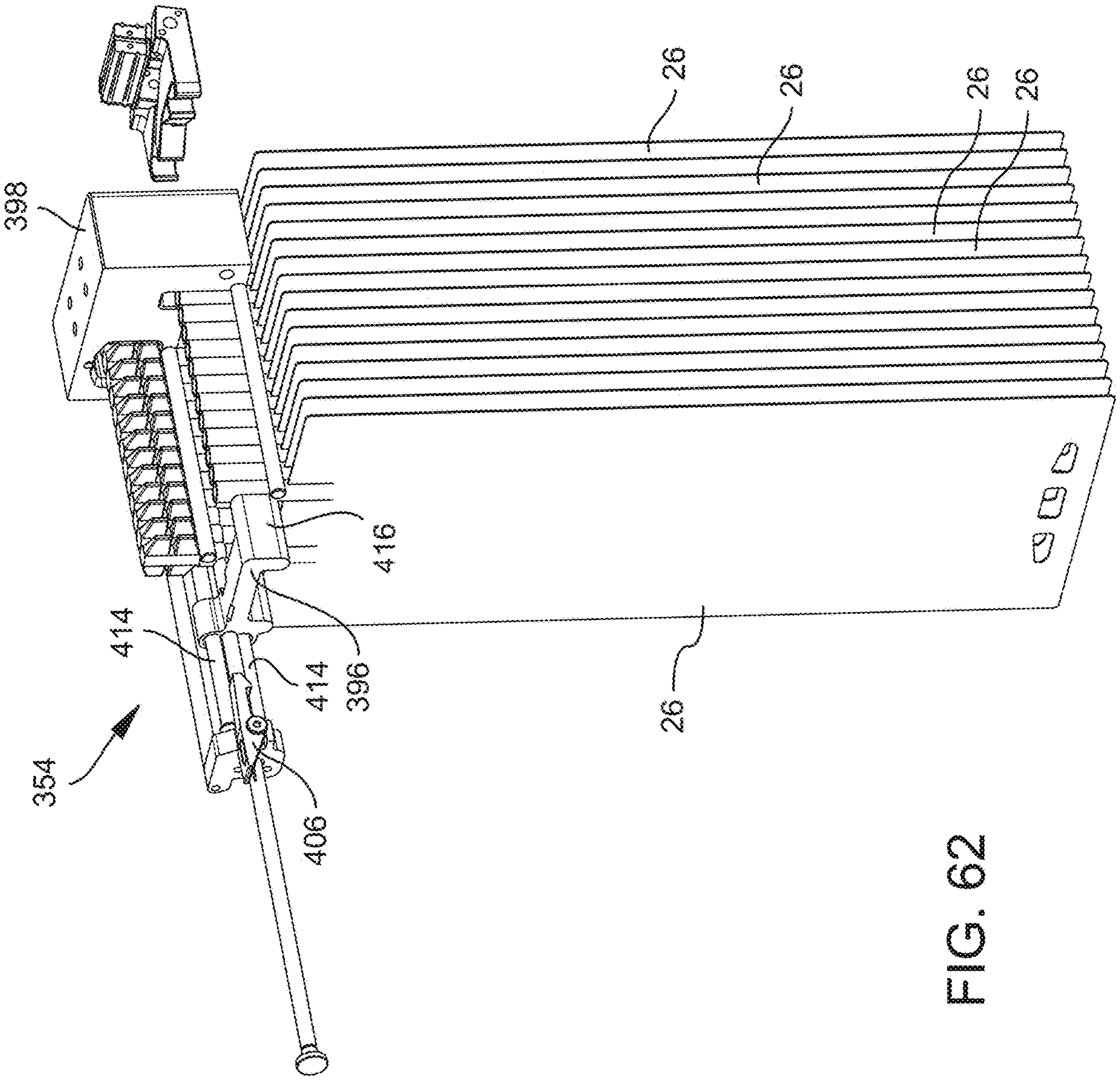
FIG. 62 depicts a perspective view of an example bag feeder with a feed plate of the bag feeder biased against ports of bags installed in the bag feeder.

Referring now to FIG. 62, the feed plate 396 is shown in position against the last bag 26 installed in the bag feeder 354. As shown, the feed plate 396 may slide along two elongate members 414. At least one of the elongate members 414 may also act as one of the rods forming one of the guides 390. The feed plate 396 may also include projections 416 which may be spaced so as to press against the ports 392 of the bags 26. This may help to ensure that the bags 26 are held in a compact and space efficient manner within the bag feeder 354. The projections 416 may be sized so as to fit within the slots of each guide 390. Additionally, the projections 416 may ensure that the last bag 26 loaded into the magazine portion 399 can advance an appropriate distance through the channels 400 in the housing block 398 when the feed plate 396 is displaced to the end of its displacement range along the elongate members 414. The feed plate 396 may be at an end of its displacement range when it is drawn up against a stop face 397 (see FIG. 59) of the housing block 398. The projections 416 may extend a distance which is at least equal to a distance from the stop face 397 to the retention pins 420 in some examples. In other examples the projections 416 may extend a distance which is equal to a distance from the stop face 397 to the retention pins 420 minus a percentage of the diameter of a port 392.

Figure 63:
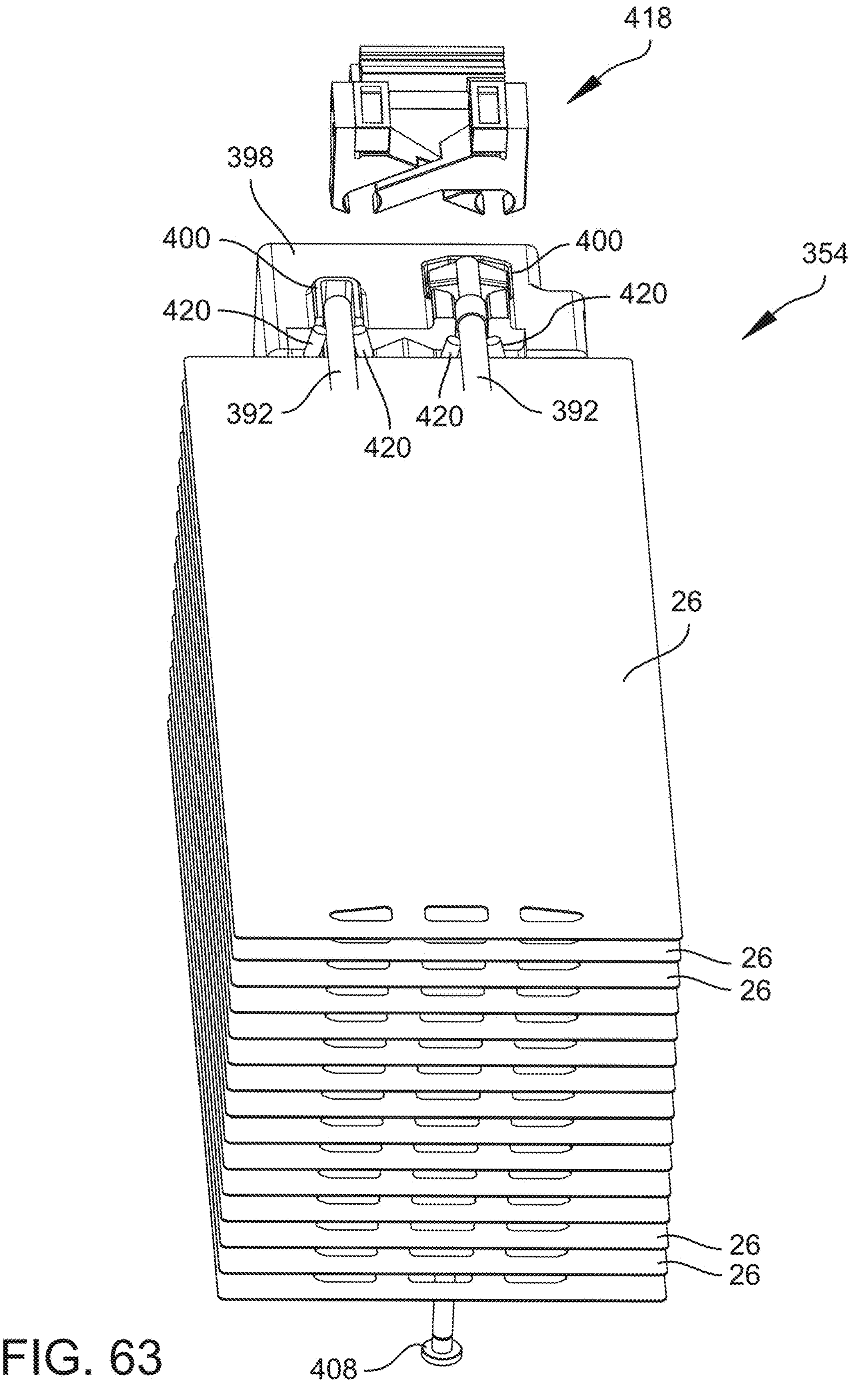
FIG. 63 depicts a bottom front perspective view of an example bag feeder having retention pins which hold bags in place within the bag feeder.

Referring primarily to FIG. 63, a gripper or grasper 418 attached to the robotic arm 360 (not shown for sake of illustration, see, e.g., FIG. 56) of the system 10 may collect bags 26 from the bag feeder 354 as needed. As shown, each of the guides 390 may be associated with one or more retention pins 420. The retention pins 420 may hold the foremost bag 26 in the bag feeder 354 against the force exerted by the feed plate 396. In the example embodiments, two retentions pins 420 on opposing sides of each channel 400 are included. The example retention pins 420 may be disposed to protrude into the path of bags 26 transiting through the channels 400 of the housing block 398 and obstruct passage of the ports 392 attached to each bag 26. In some embodiments, the retention pins 420 may be disposed at a 10-20° (e.g. 15°) angle with respect to the axis of the guides 390.

Figure 64:
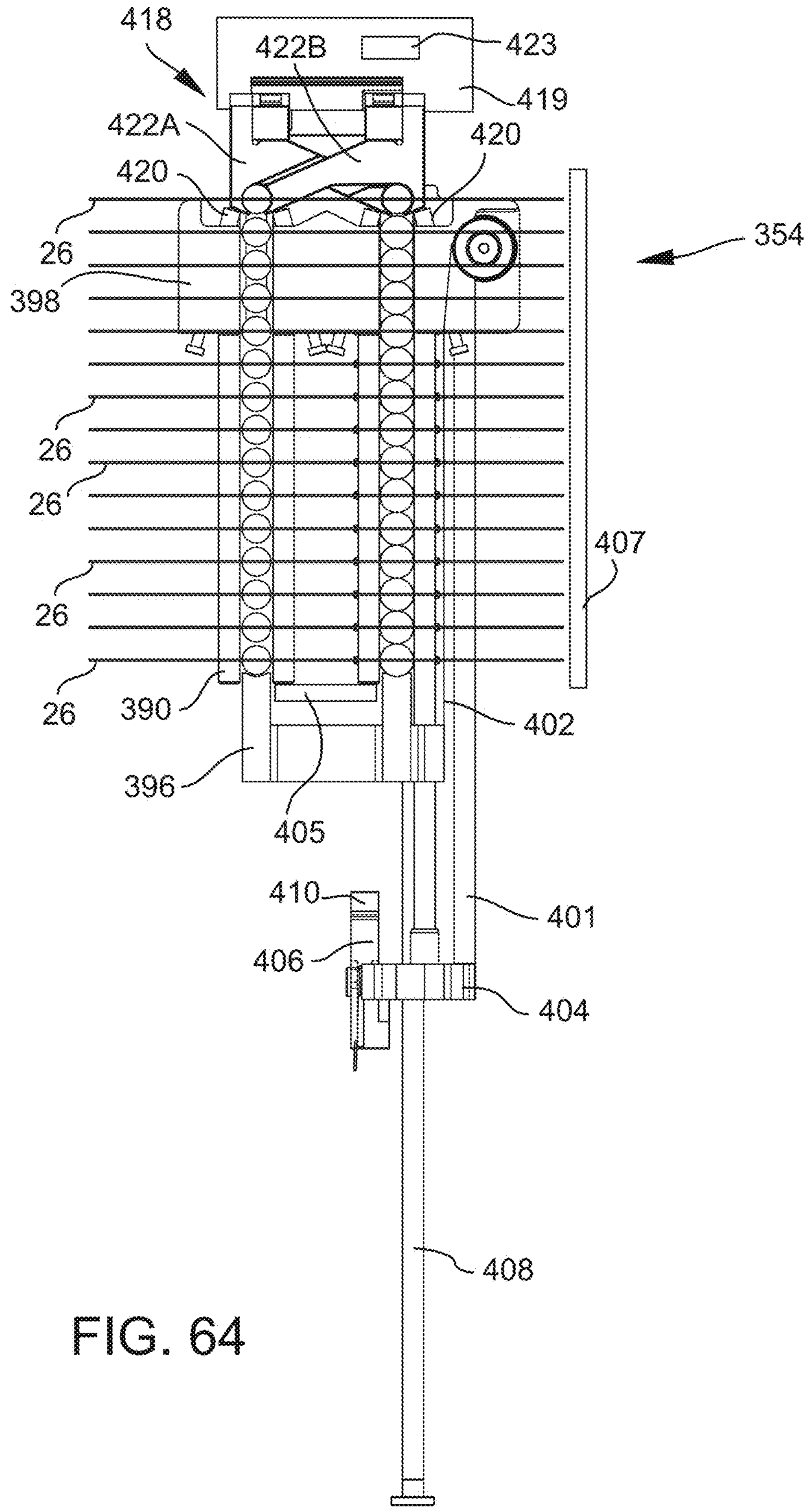
FIG. 64 depicts a bottom up view of an example bag feeder and an example grasper which has advanced to the bag feeder to retract retention pins of the bag feeder and collect a bag.

The retention pins 420 may be biased to an obstructing position, but may be displaceable to a withdrawn position where the retention pins 420 are at least partially pressed into the housing block 398 and out of interference with the transit path of the bags 26. In certain embodiments and as shown in FIG. 64, the grasper 418 may be configured such that, when open, the jaws 422A, B of the grasper 418 may be appropriately spaced so as to actuate the retention pins 420 from the obstructing position to the withdrawn position when the grasper 418 is advanced toward the bag feeder 354. When the grasper 418 is displaced to the bag feeder 354, the jaws 422A, B may press the retention pins 420 into a retracted state. The jaws 422 A, B may support the fin 394 of the port 392 on the bag 26 such that the bag 26 does not fall when the retention pins 420 are retracted. The force exerted by the feed plate 396 may aid in pushing the foremost bag 26 into the grasper 418 jaws A, B. The coefficient of friction of the grasper 418 material and the ports 392 under the force exerted by the feed plate 396 may be sufficient to hold the bag 26 in place prior to closure of the jaws 422A, B. Similar retention pins 420 may be incorporated into the bag feeder 28 described in relation to FIGS. 54-55.

Figure 65:
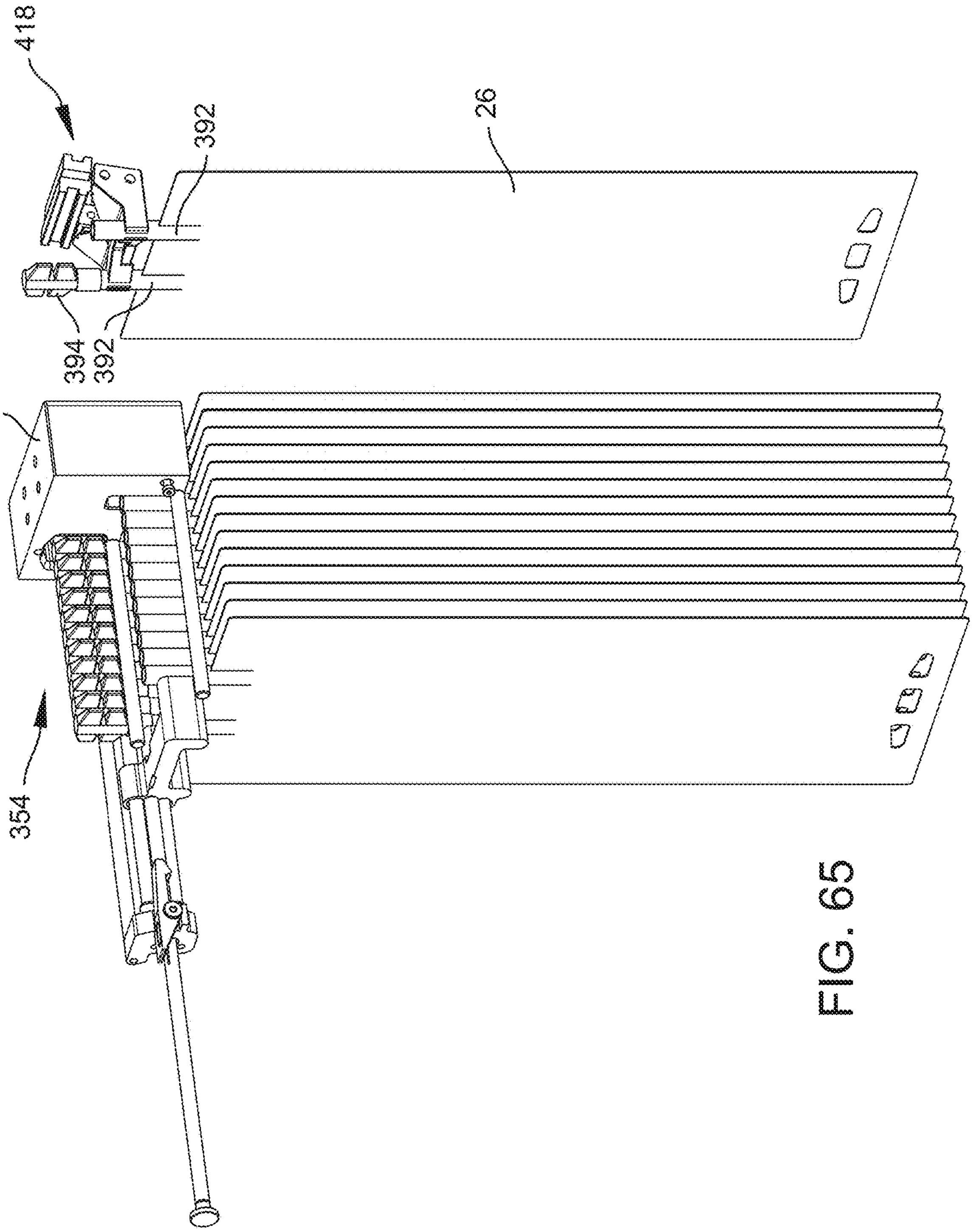
FIG. 65 depicts a perspective view of an example bag feed and an example grasper which is holding a bag collected from the bag feeder.

The grasper 418 may include a driver 419 which includes one or more actuator for displacing the jaws 422A, B. Additionally, a jaw position sensor 423 may be included. The jaw position sensor 423 may monitor the location of the jaws 422A, B via a magnetic field based sensor such as an inductive or hall effect sensor. The control system 15 of the system 10 may check the output of the jaw position sensor 423 to determine whether a bag 26 has been properly grasped by the grasper 418. In some embodiments, control system 15 may compare the position output of the jaw position sensor 423 to a predefined range of acceptable positions. In the event that the jaws 422A, B are displaced to an extreme of their displacement range (e.g. have fully closed) the control system 15 may deduce that the grasper 418 has missed the bag 26. If the jaws 422A, B displace outside of the predefined range, but not to an extreme of the displacement range, the control system 15 may deduce that the grasper has improperly grasped (e.g. only partially grasped a segment of a port 392 as opposed to closing around the port 392 as shown in FIG. 65). When the control system 15 determines that the position output of the jaw position sensor 423 is out the predefined range, the control system 15 may command the grasper 418 to retry. There may be a cap on the number of allowed retries before the control system 15 may generate an error. Though the jaw position sensor 423 may be monitored when a bag 26 is retrieved from a bag feeder 354, the control system 15 may also perform this check any other time a bag 26 is grasped 418 within the system 10.

Referring now primarily to FIG. 65, once the jaws 422A, B are closed around the ports 392, the foremost bag 26 may be removed from the bag feeder 354 and displaced to, for example, a filling station 356 by the robotic arm 360 (only the gripper 418 of the robotic arm 360 is shown for ease of illustration). The feed plate 396 may advance under the force of the bias member 401 (best shown in FIG. 64) attaching it to the housing block 398. Additionally, the retention pins 420 may be urged back to an obstructing position as the gripper 418 is displaced away from the bag feeder 354. Thus the next bag 26 in the bag feeder 354 may be advanced and ready for collection by the gripper 418.

Figure 66:
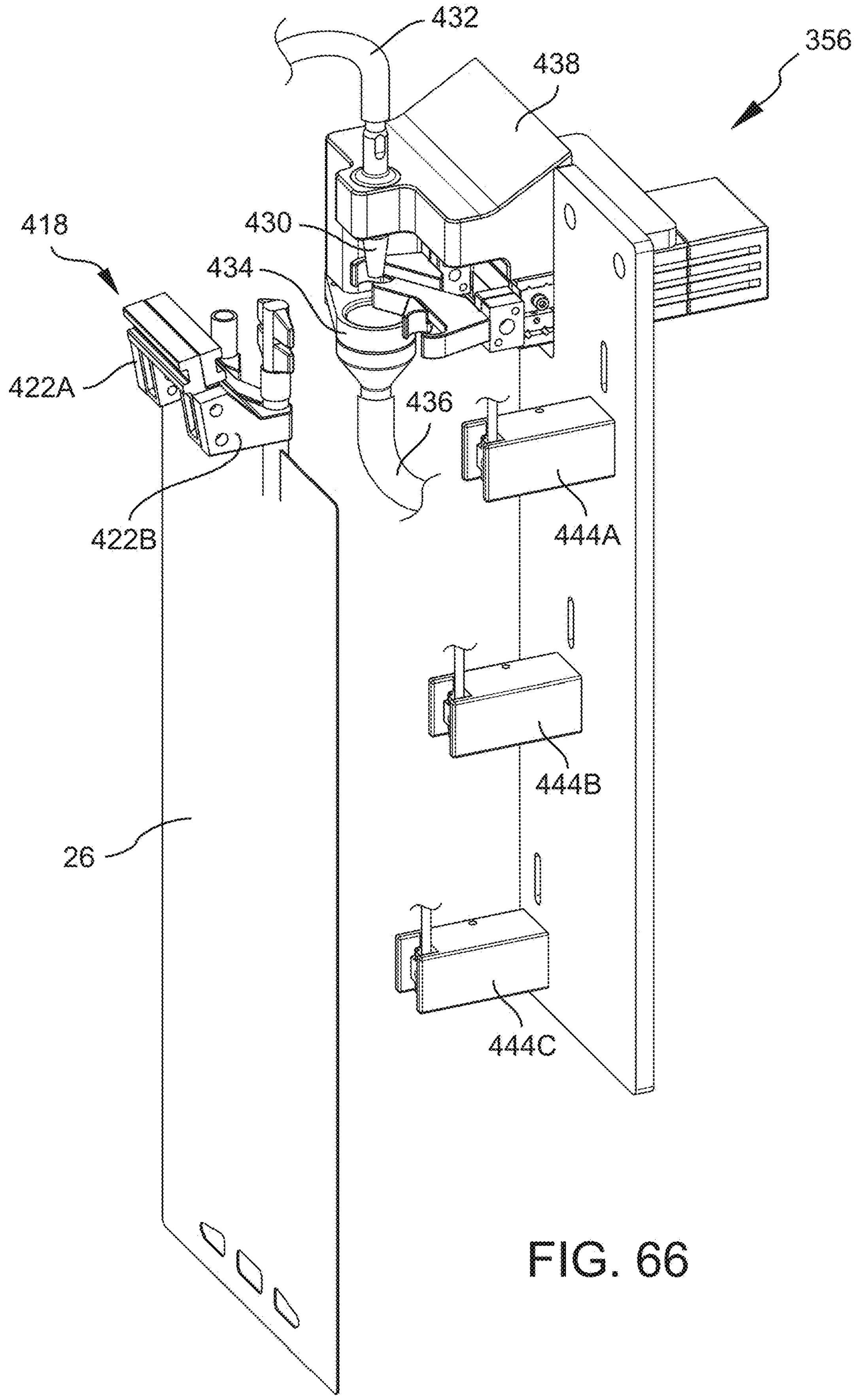
FIG. 66 depicts a perspective view of an exemplary bag filling station.

Referring now to FIG. 66, an exemplary filling station 356 is depicted. As shown, a filling station 356 may include a fill nozzle 430 which may be connected to a fluid input line 432. The fluid input line 432 may carry purified water or a mixed fluid (e.g. saline) that has passed through the sensor suite 350 and deemed to be acceptable. The fill nozzle 430 may be disposed above and in alignment with a drain 434. The drain inlet 434 may include a tapered funnel like opening which leads to a drain conduit 436. As shown, the drain conduit 436 has a larger diameter than the fluid input line 432. In the example, the drain conduit 436 diameter may be three times that of the fluid input line 432. This may help to ensure that the drain conduit 436 has the capacity to carry undesired flow or drips from the fill nozzle 430.

The fill station 354 may also include a back plate 442 which extends from a fill station housing block 438. The back plate 442 may include a number of mounting points for bag characteristic sensors 444A, B, C. The bag characteristic sensors 444A-C may be any suitable sensor capable of collecting data on differentiating traits of various bags which may be utilized with the system 10. The bag characteristic sensors 444A-C may sense presence or absence of bag 26 material, color, shape, size, etc. Preferably, the bag characteristic sensors 444A-C are sufficient to identify at least the volume of the bag 26 in place at the filling station 356.

In the exemplary embodiment, the bag characteristic sensors 444A-C are positioned so as collect information sufficient to determine the type of bag 26 being docked on the filling station 356. The exemplary bag characteristic sensors 444A-C may, for instance, be beam break or reflection based sensors which can determine the presence or absence of bag material in their vicinity. In the example embodiments, a bag presence detector 444B is included and may determine whether a bag 26 has been docked in the fill station 354. The bag presence detector 444B may be mounted on the back plate 442 in a position where it may detect any of a variety of types of bags 26 (e.g. mini-bag to a liter or more capacity) which may be used in the system 10. The filling station 356 may be inhibited from dispensing liquid via the control system 15 in the event that the bag presence detector 444B does not detect a bag 26 is in place at the fill station 356. A bag width detector 444A may be included and mounted at a location on the back plate 442 where it may detect whether the width of a bag 26 is greater than a certain value. The width detector 444A may be placed more proximal the filling nozzle 430 so as to ensure any bag 26 with a width greater than a threshold width value (regardless of its length) will be picked up by the width detector 444A. A bag length detector 444C may be mounted on the back plate 442 in a location where it may detect whether the bag 26 is longer than a certain value. The bag length detector 444C may be disposed most distal to the fill nozzle 430.

Based on the data collected by the bag characteristic sensors 444A-C, the control system 15 may determine the type of bag 26 docked in the filling station 356. The control system 15 may, for example, determine the intended fill volume of the bag 26 based on data collected from the bag characteristic sensors 444A-C and ensure that the bag 26 is not overfilled. A look-up table or the like may be used to determine the intended bag 26 fill volume based on the output of each of the bag characteristic sensors 444A-C. Other embodiments may include additional bag characteristic sensors 444A-C. For example, certain embodiments may include additional width or length detectors 444A, C to provide additional data related to bag 26 dimensions. In some embodiments each bag characteristic sensor 444A-C may be accompanied by a redundant sensor.

Figure 67:
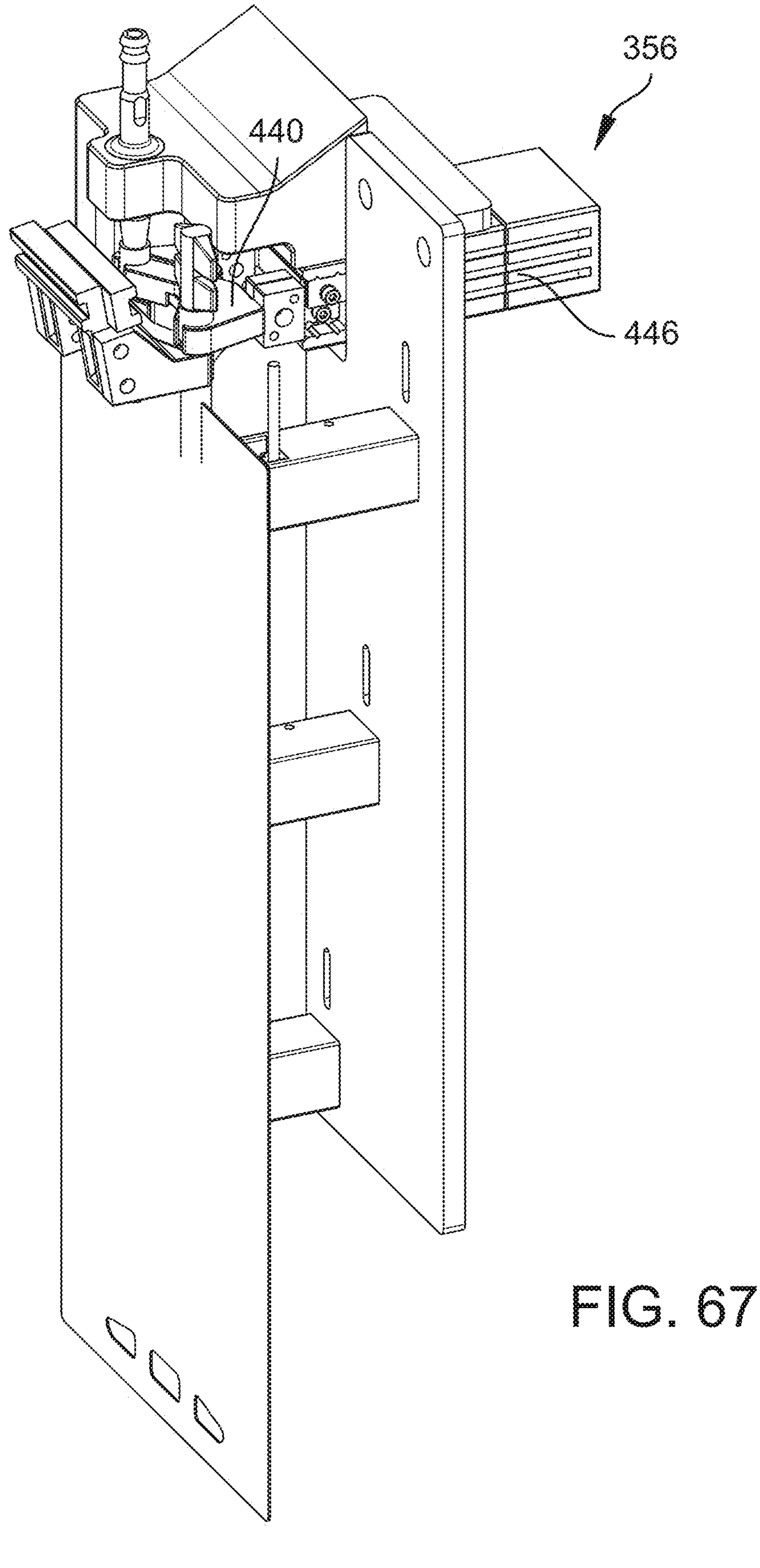
FIG. 67 depicts perspective view of an exemplary bag filling station with an unfilled bag being docked at the filling station.

In the example embodiment, the drain inlet 434 and attached drain conduit 436 may be pivotally or otherwise displaceably coupled to the fill station housing block 438. As a bag 26 is introduced to the filling station 356 with the grasper 418, the jaws 422A, B of the grasper 418 may drive the drain inlet 434 and drain conduit 436 to a retracted position. As shown in FIG. 67, the filling station 356 may include a fill station grasper 440. The fill station grasper 440 may be opened by a grasper driver 446 to accept the ports 392 of the bag 26 and driven closed once the robotic arm 360 (see, e.g., FIG. 56) has displaced to preprogrammed bag 26 docking coordinates. Coordination of the fill station grasper 440 and the robotic arm 360 may be orchestrated by the control system 15.

Figure 68:
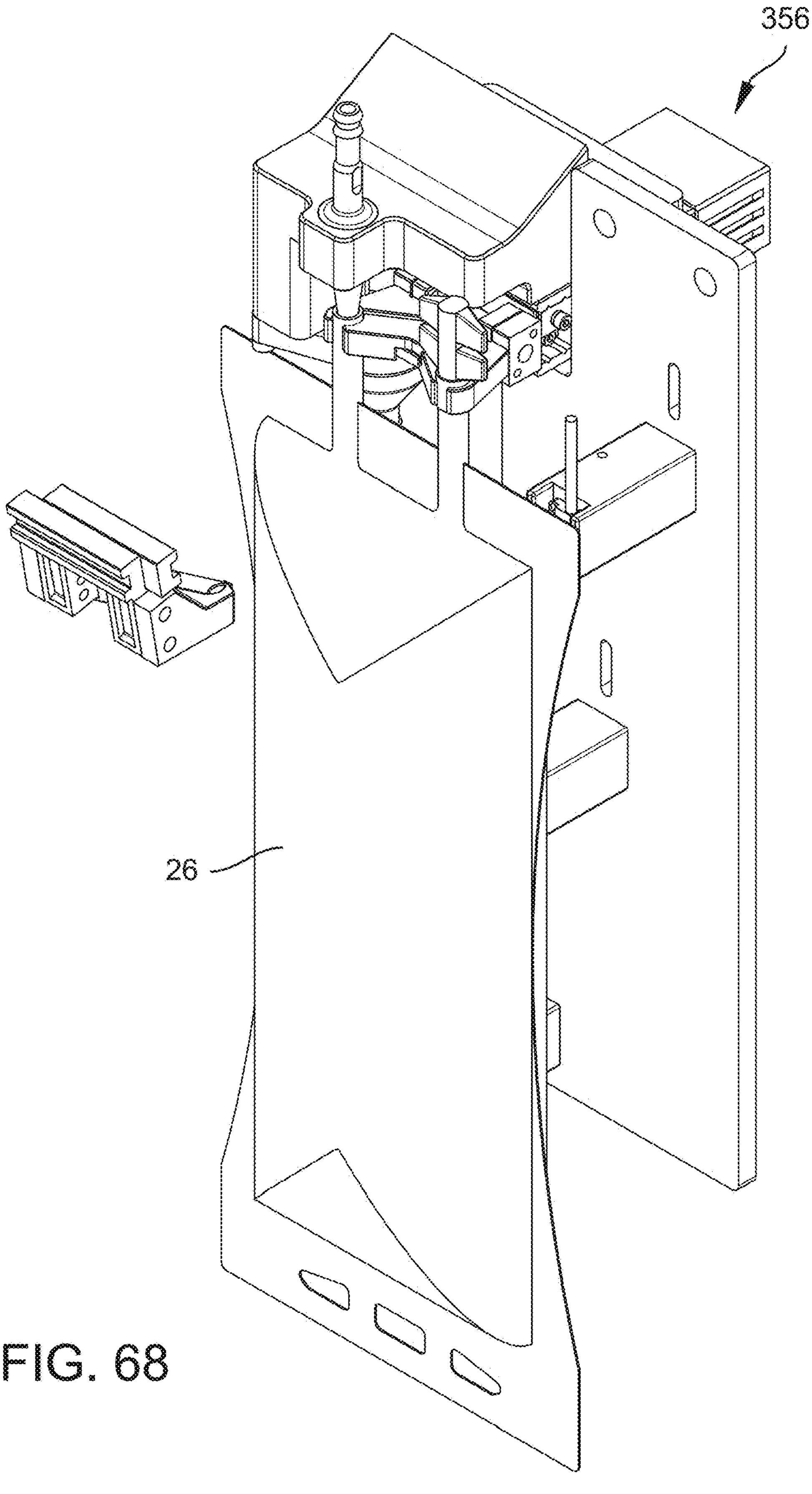
FIG. 68 depicts a perspective view of an exemplary bag filling station having a filled bag docked at the filling station.
Figure 69:
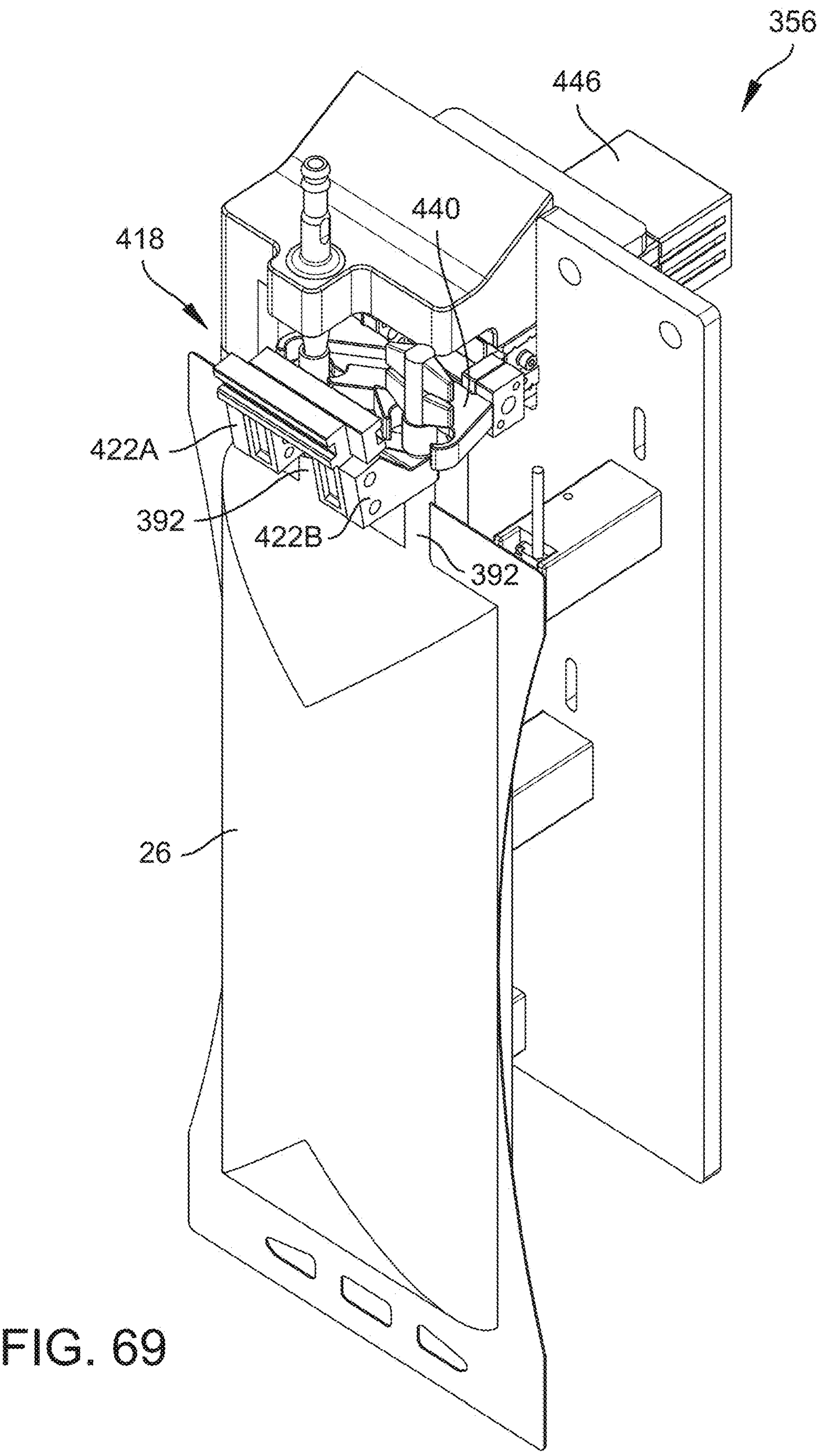
FIG. 69 depicts a perspective view of an exemplary bag filling station and an example grasper which has been advanced to the filling station to collect a filled bag from the filling station.

As shown in FIG. 68, the grasper 418 attached to the robotic arm 360 (see, e.g., FIG. 56) may be displaced away from the filling station 356 during filling of a bag 26. The grasper 418 may be used to perform other operations within the enclosure 12 as the bag 26 docked on the filling station 356 is filled. For example, the grasper 418 may be used to retrieve, label, and dispense finished bags 26 from the quarantine repository 362 while a bag 26 is being filled at the filling station 356. Once a bag 26 has been filled to the desired amount (e.g. as indicated by one or more flow meter in the sensor suite 350 or mixing circuit 348), the grasper 418 may return and collect the filled bag 26 from the fill station 354. As shown in FIG. 69, the jaws 422A, B of the grasper 418 may be actuated closed around the ports 392 of the filled bag 26 and the fill station grasper 440 may be driven open by the grasper driver 446. In certain embodiments, the robotic arm 360 may not be displaced away from the fill station 356 under various circumstances. For example, where a small 100 mL bag 26 is to be filled, the robotic arm 360 may stay in place as the fill time for the bag 26 should be miniscule. Where a large bag 26 (e.g. a few liters) is filled, the grasper 418 may be displaced away from the fill station 356 as the fill time may have a duration which would allow the robotic arm 360 to complete one or more other task.

Figure 70:
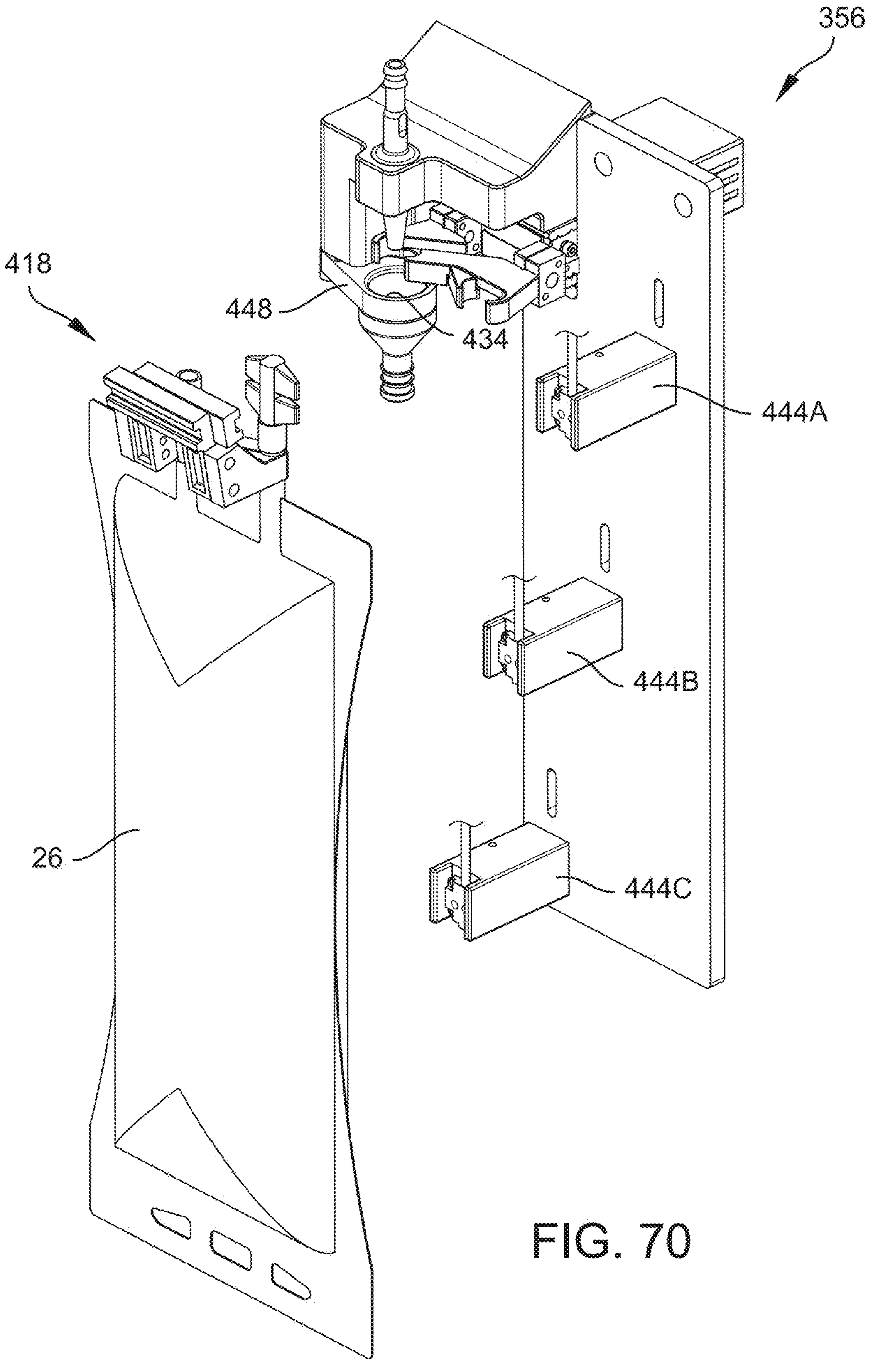
FIG. 70 depicts a perspective view of an example grasper holding a filled bag as well as a filling station with a pivotal drain inlet which is aligned with a filling nozzle of the filling station.

Referring now to FIG. 70, the grasper 418 may remove the filled bag 26 from the filling station 356. The filled bag 26 may be brought to the sealing station 358 after retrieval from the filling station 356. As shown, the drain inlet 434 may automatically return into alignment with the filling nozzle 430 when the bag 26 is collected from the filling station 356. A bias member (see. e.g., torsion spring, bias member 454 of FIG. 71B) may be included to facilitate this automatic return of the drain inlet 434 to an aligned position in line with the fill nozzle 430.

Figure 71A:
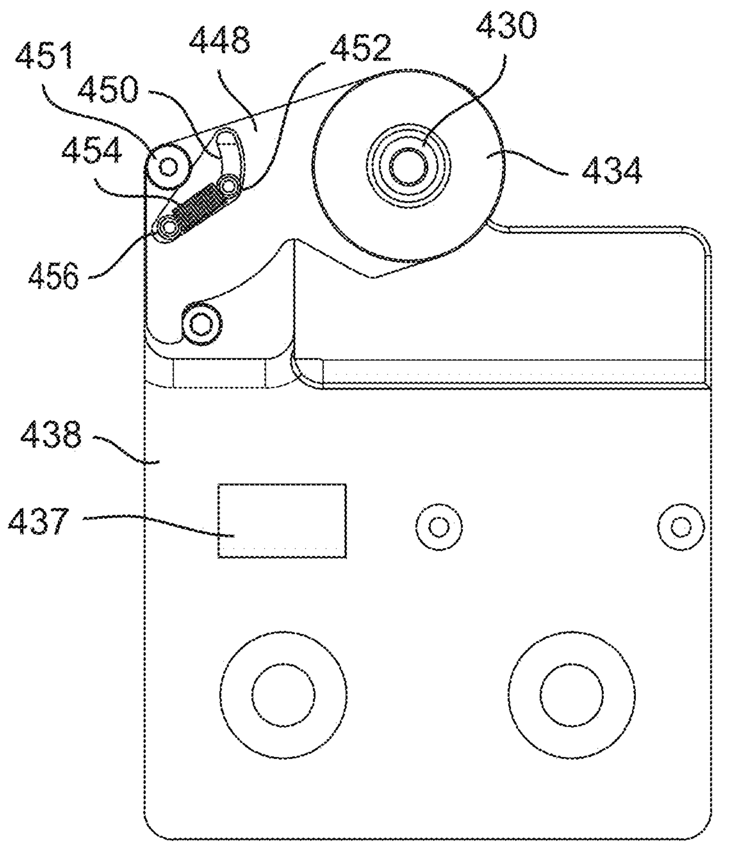
FIGS. 71A-B depict top down views of a portion of a filling station have a biased drain inlet.
Figure 71B:
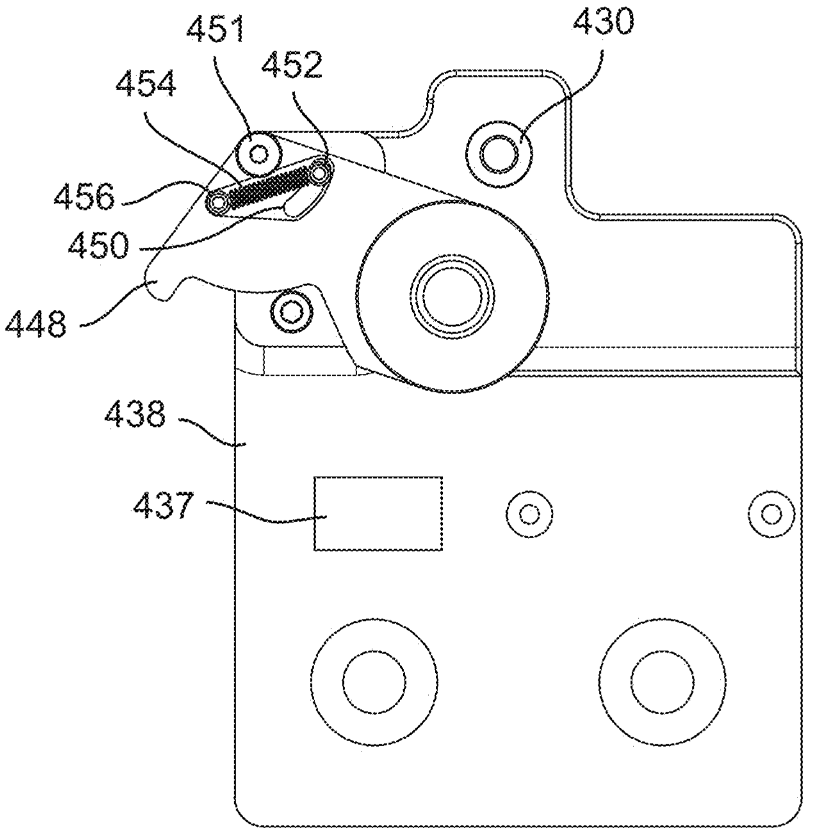

Referring now also to FIGS. 71A and 71B, the drain inlet 434 may be attached to a flange 448 which may pivotally mount the drain inlet 434 to the filling station housing block 438. Flange 448 and drain inlet 434 may pivot between a retracted position and an aligned position as described above. The flange 448 and drain inlet 434 may be biased to the aligned position by a bias member. In the example embodiment, the flange 448 may include a track 450 within which a pin 452 extending from the filling station housing block 438 is disposed. As the pin 452 within the track 450 is attached to the filling station housing block 438, the pin 452 may remain stationary. At least one bias member 454 may be coupled to the pin 452 as well as to a mount pin 456 included on the flange 448. The mount pin 456 may be displaceable with the flange 448 and drain inlet 434. In the example, one bias member 454 is depicted and is shown as an extension spring, though other types of bias members 454 may be used in alternative embodiments. As shown, when the drain inlet 434 is displaced, the track 450 may ride along the stationary pin 452. The distance between the mount pin 456 and the stationary pin 452 may increase and the bias member 454 may be extended (see, e.g., FIG. 71B). As the bias member 454 restores (e.g. after the bag 26 has been filled and removed), the track 450 may ride along the pin 452 until the distance between the two pins 452, 456 is minimized or the bias member 454 returns to a resting state. As shown, this may automatically pivot the drain inlet 434 back to an aligned state with respect to the fill nozzle 430 (see, e.g., FIG. 71A). In alternative embodiments, the pivot pin 451 coupling the flange 448 to the housing block 438 may be paired with a torsion spring which serves as the bias member 454. In such embodiments the extension spring may be omitted.

As shown, the filling station 356 may include a drain inlet sensor 437. The drain inlet sensor 437 may monitor the location of the drain inlet 434. The drain inlet sensor 437 may be any suitable sensor, for example a magnetic field sensor such as an inductive sensor or hall effect sensor. In some embodiments, the drain inlet 434 or flange may include a magnetic or metallic body which is monitored by the drain inlet sensor 437. The drain inlet sensor 437 may alternatively be an optical sensor. The control system 15 may receive an output signal from the drain inlet sensor 437 and ensure that the drain inlet 434 is disposed in an expected position. For example, the control system 15 may verify that the drain inlet 434 returns to an aligned state with respect to the filling nozzle 430 after a bag 26 has been filled and removed. Additionally, the control system 15 may check the output of the drain inlet sensor 437 to ensure that the drain inlet 434 is in the aligned state under the filling nozzle 430 prior to commanding a flush of the filling nozzle 430 or a disinfect of the fluid circuit. During disinfection, hot purified water may be delivered through the fluid circuit and discarded through the filling nozzle 430 into the drain inlet 434.

Figure 72:
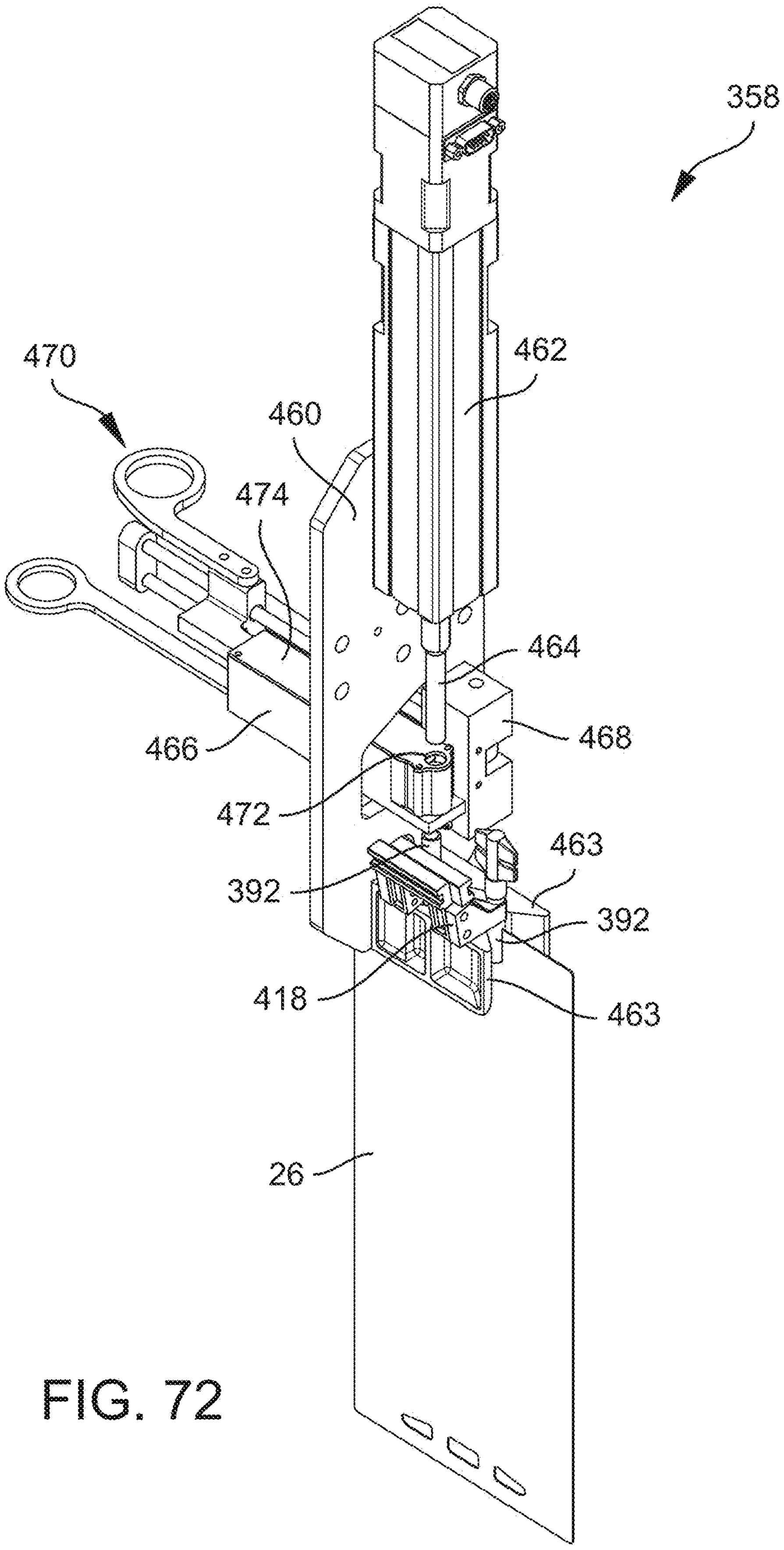
FIG. 72 depicts a perspective view of an example sealing station having a stopper dispenser installed therein.

Referring now to FIG. 72, an example embodiment of a sealing station 358 is shown. As shown, the sealing station 358 may include a base plate 460. A ram driver 462 may be mounted to the base plate 460. The ram driver 462 may effect displacement of a ram 464 which may drive a stopper into a port 392 of a bag 26. In some embodiments, the ram driver 464 may be capable of exerting at least 100 lbs of force against a stopper 476 during stoppering of bags 26. A rest 463 may be attached to the base plate 460. A grasper 418 holding a bag 26 may be docked on a docking face (e.g. top face) of the rest 463 during sealing of the bag 26 so as to buttress the grasper 418 against the force exerted by the ram driver 462. In the example embodiment, the rest 463 is depicted as a metal shelf though any suitable material may be used. In the example, two rests 463 are shown. The rests 463 may also act as guides. As shown, the two rests 463 may be spaced apart by a gap which may allow a bag 26 to be positioned between the rests 463. A bag 26 may be displaced into this gap to aid in positioning of the bag 26 port 392 in alignment with the axis of displacement of the ram 464.

A stopper dispenser which in the example embodiment which is depicted as a stopper magazine 466 is also included in the example sealing station 358. The stopper magazine 466 may dock into a magazine receptacle 468 in the sealing station 358. The stopper magazine 466 may include an opening 472 which is aligned and sized to allow passage of the ram 464 when the stopper magazine 466 is in place at the magazine receptacle 468. A follower assembly 470 may be included to automatically advance stoppers through the stopper magazine 466 as stoppers are dispensed.

Figure 73:
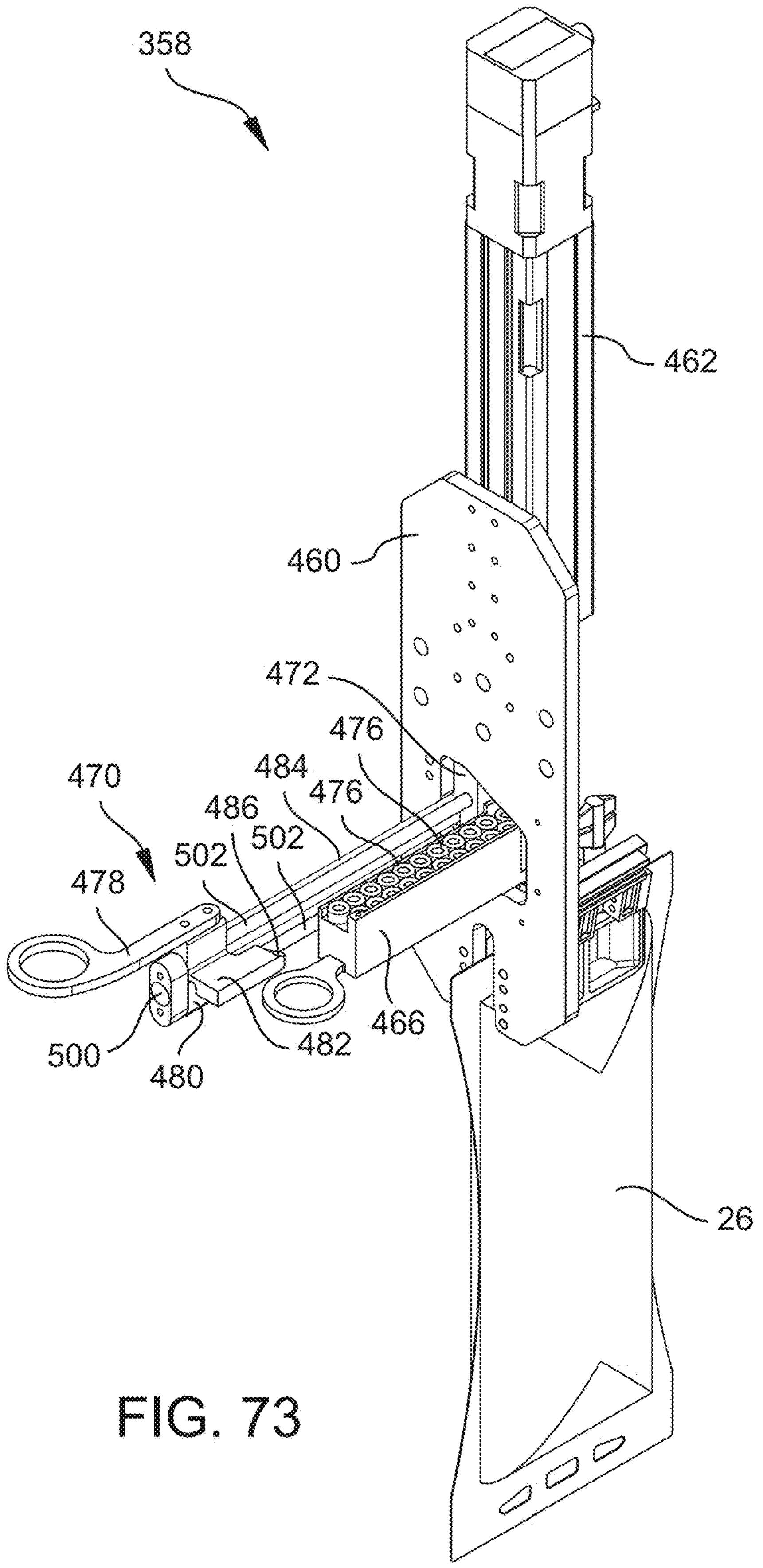
FIG. 73 depicts a perspective view of an example sealing station having an example follower assembly which is disposed in a retracted position.

Referring now to FIG. 73, in the example embodiment, the stopper magazine 466 may be provided in a preloaded state. The stopper magazine 466 may be packaged clean and sterile within an over pack 60 which is opened in the antechamber of the system 10. In the example embodiment, the stopper magazine 466 has a capacity of 22 stoppers 476, however, in other embodiments, the capacity of the stopper magazine 466 may be less or may be greater. In the example embodiment, a cover plate 474 (see, e.g. FIG. 72) has been removed so as to shown the stoppers 476. After removing the stopper magazine 466 from its over pack 60, the stopper magazine 466 may be docked onto the magazine receptacle 472. In certain embodiments, the magazine receptacle 472 may accept a variety of different stopper magazine 466 varieties. For example, certain embodiments may have a magazine receptacle 472 capable of accepting any of the stopper magazines 466 shown and described herein. This may allow a user to use stopper magazines 466 of differing capacities as desired. In some embodiments, the stopper magazine 466 may not be a removable magazine. Instead, a fixed magazine may be included which is loaded manually or with the assistance of a speed loader while in place on the base plate 460 by an operator of the system 10.

To load the example stopper magazine 466 into the sealing station 358, the follower assembly 470 may be retracted by the user. As shown, the follower assembly 470 may include a handle 478. The handle 478 may allow a user to easily pull the follower 482 of the follower assembly 470 into a loading state via the gloved interface 352. In some embodiments, a latch similar to that shown in FIG. 59 may be included to retain the follower assembly 470 in the open state. When the follower assembly 470 is in a loading state, the follower 482 may be displaced to a point where sufficient clearance is present to mate the stopper magazine 466 in place on the magazine receptacle 472.

The handle 478 may be coupled to a follower block 480. The follower block 480 may include a follower 482. The follower block 480 may be coupled to the magazine receptacle 472 via a bias member 484. In the example embodiment, the bias member 484 is depicted as a constant force spring, however, in other embodiments, other types of bias members 484 may be used. The bias member 484 may exert a force against the follower block 480 which maintains the follower 482 in intimate contact with the last stopper or stoppers 476 in the stopper magazine 466. The follower block 480 may displace along one or more follower guides 502 which constrain movement of the follower 482 along a prescribed path. In the example embodiment an end block 504 is included on the end of the guides 502 most distal to the magazine receptacle 472. The end block may include a magnet 500. The magnet 500 may interact with a metallic portion of the follower block 480 so as to retain the follower assembly 470 in an open position while loading of the stopper magazine 466 occurs.

The example stopper magazine 466 is shown as a multi-column magazine. The follower 482 includes a staggering projection 486 which extends from the stopper contacting portion of the follower 482. The staggering projection 486 may aid in ensuring orderly feeding of stoppers 476 as the stopper magazine 466 depletes. The staggering projection 486 may encourage stoppers 476 in one column to be offset from stoppers 476 in an adjacent column. This may aid in preventing jamming and facilitate movement of a single stopper 466 from the multiple columns to the opening 472 (see, e.g., FIG. 72) in the stopper magazine 466.

Figure 74A:
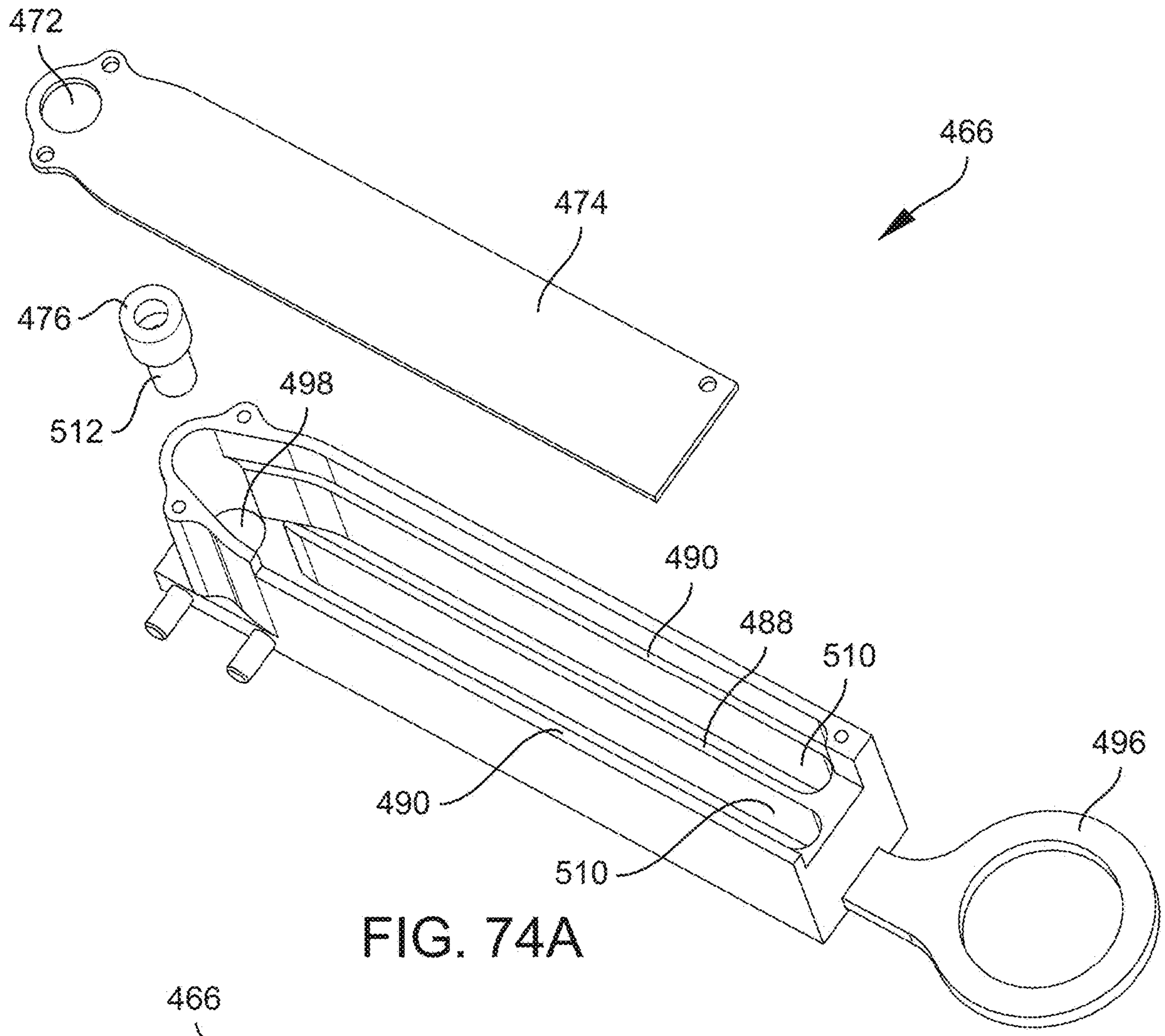
FIGS. 74A-B depict perspective views of an example stopper dispenser.
Figure 74B:
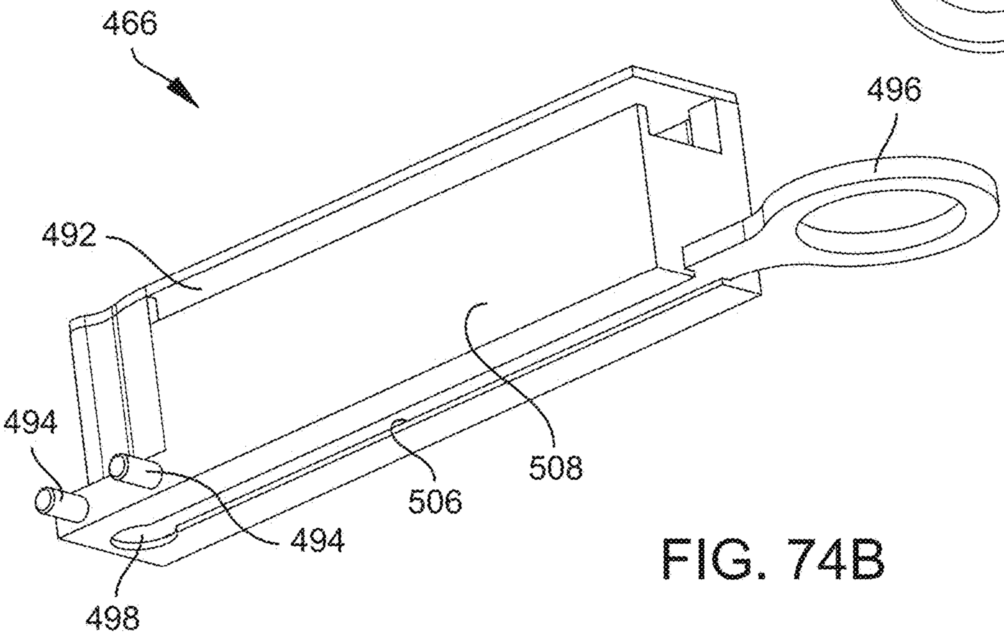

Referring now also to FIGS. 74A and 74B, views of the example stopper magazine 466 are shown. As shown, the stopper magazine 466 may include a magazine body 508. The magazine body 508 may include a number of stopper troughs 510 recessed therein. A divider wall 488 may separate and partially define each trough 510. The stopper magazine 466 may also include ridges 490 which flank each trough 510. Any divider wall(s) 488 and the ridges 490 may be at an even height with one another. In some examples, the stoppers 476 may include sections of varying diameter. The ridges 490 and dividing wall 488 may have a height which is selected such that a step region 512 on the stopper 476 where the stopper 476 transitions to a larger diameter may ride along the top face of the ridges 490 and the dividing wall 488. As shown, the stopper magazine 466 may also include a slit 492. The slit 492 may allow for passage of a portion of the follower assembly 470 including the follower 482 to pass into the stopper magazine 466 and displace within the stopper magazine 466.

In the example embodiment, the stopper magazine 466 includes mating features which may facilitate mounting of the stopper magazine 466 onto the magazine receptacle 472. In the example embodiment, two mounting or mating pins 494 are included in the stopper magazine 466. These mating pins 494 may be received in alignment holes within the magazine receptacle 472. In certain embodiments, the mating pins 494, a portion of the alignment holes, or both may be magnetic. This may allow a stopper magazine 466 to be magnetically coupled into place in the magazine receptacle 472. The magazine receptacle 472 may also include a magazine sensor 473 (see, e.g., FIG. 77B). A hall effect or inductive sensor which may register proper mating of the stopper magazine 466 in the magazine receptacle 472 may be used in some examples. Other types of sensors such as micro switches, optical sensors, button type sensors, etc. may also be used to monitor whether a stopper magazine 466 is mounted in the magazine receptacle 472. In some embodiments, a magnetic body for sensing by a magnetic magazine sensor 473 may be include elsewhere in a stopper magazine 466. In some embodiments, the control system 15 of the system 10 may not allow displacement of the ram 464 unless the magazine sensor 473 indicates a stopper magazine 466 is mounted in the magazine receptacle 472.

Referring now also to FIGS. 75-77B, a stopper magazine 466 may include a blocking element which inhibits premature release of stoppers 476 from the stopper magazine 466. The example stopper magazine 466 includes a displaceable handle 496. The displaceable handle 496 may include a loop, flange, or similar feature which allows a user to easily pull on the displaceable handle 496 through the glove interfaces 352 of the system 10. The displaceable handle 496 may be coupled to an outlet cover 498 (see, e.g. FIG. 74A). The outlet cover 498 may block exit of stoppers 476 from the stopper magazine 466. The displaceable handle 496 may be integral with the outlet cover 498 (best shown in FIG. 74B) or may be coupled thereto via a linkage. When the user displaces the displaceable handle 496, the outlet cover 498 may be displaced or withdrawn away from a blocking position allowing passage of stoppers 476 out of the stopper magazine 466. The displaceable handle 496 may be displaced along a guide slot 506 included in the body 508 of the stopper magazine 466. In some embodiments, the displaceable handle 496 may be completely removed from the stopper magazine 466 before use.

Figure 75:
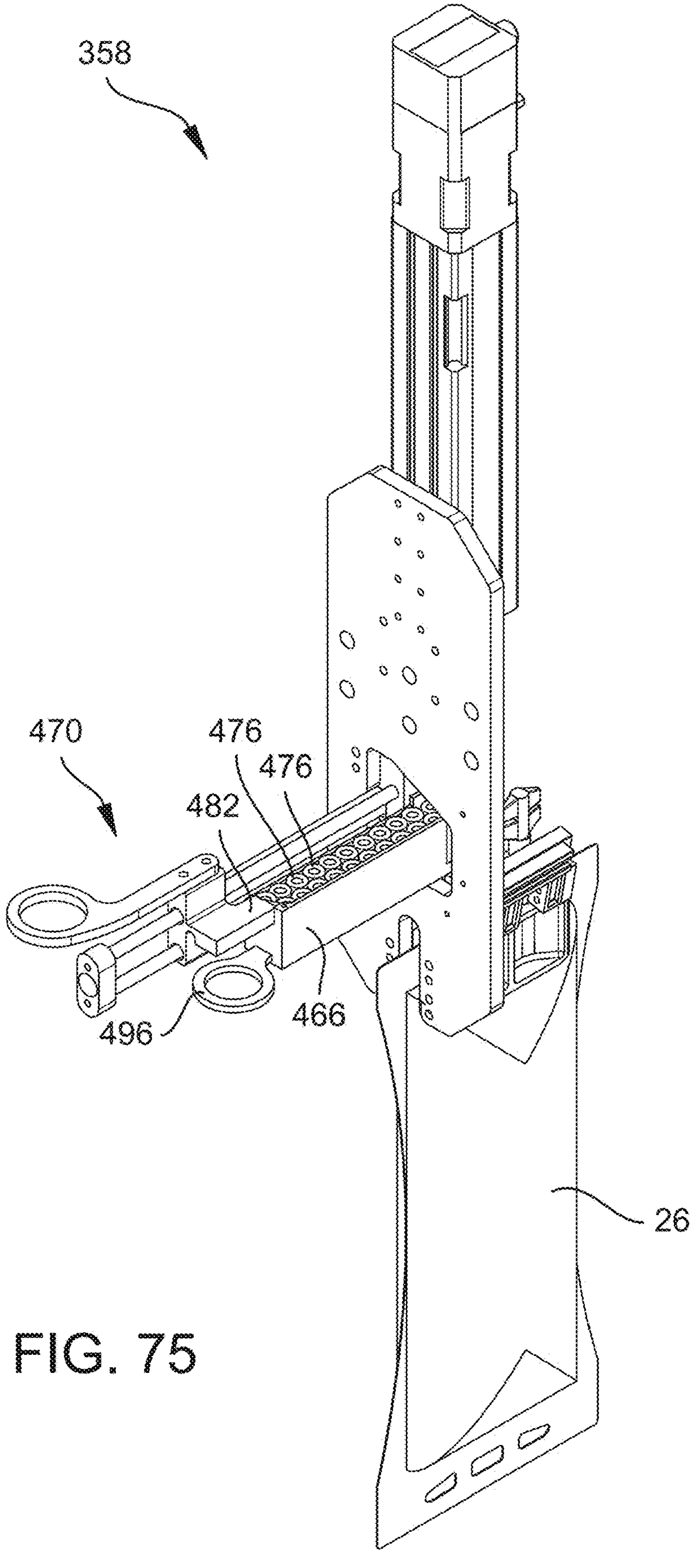
FIG. 75 depicts a perspective view of an example sealing station having an example follower assembly which is biased into contact with stoppers in an example stopper magazine.
Figure 76:
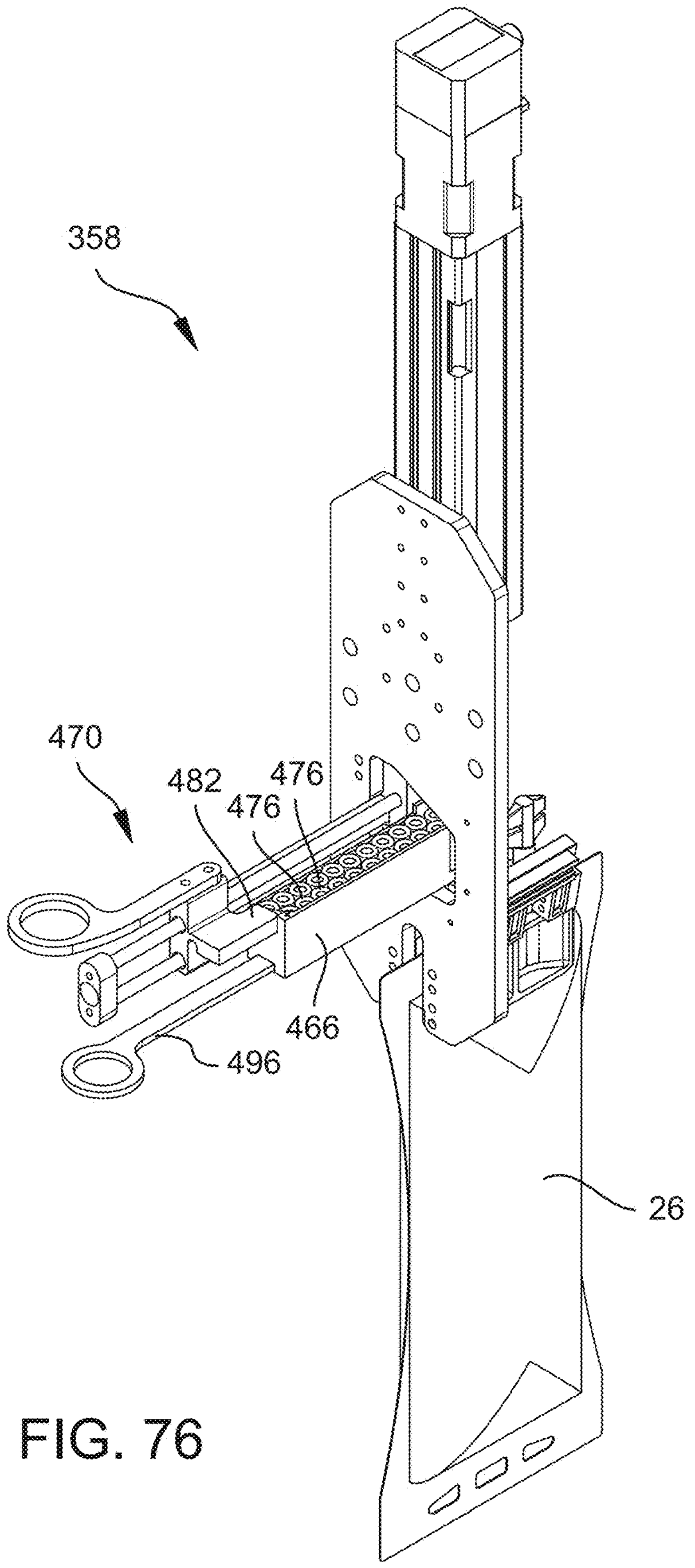
FIG. 76 depicts a perspective view of an example sealing station having an example stopper dispenser installed therein with a cover of the dispenser displaced to expose an exit port of the stopper dispenser.
Figure 77A:
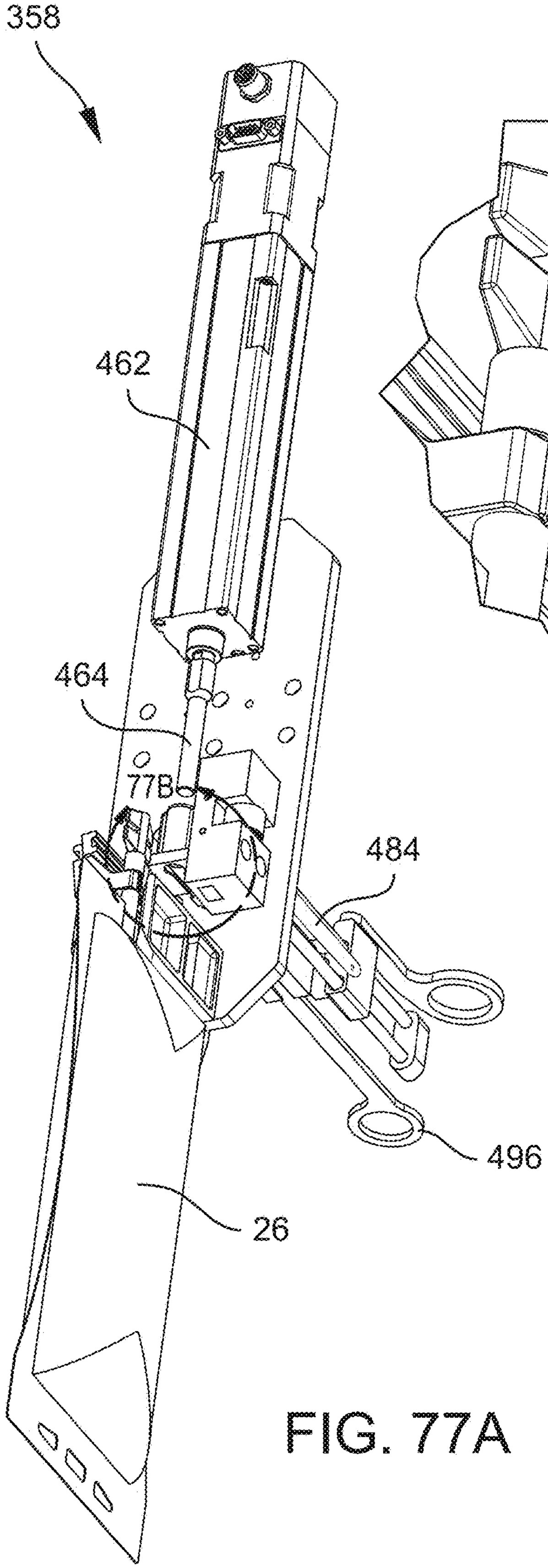
FIG. 77A depicts a perspective view of an example sealing station having an example stopper dispenser installed in a dispenser receptacle of the sealing station.
Figure 77B:
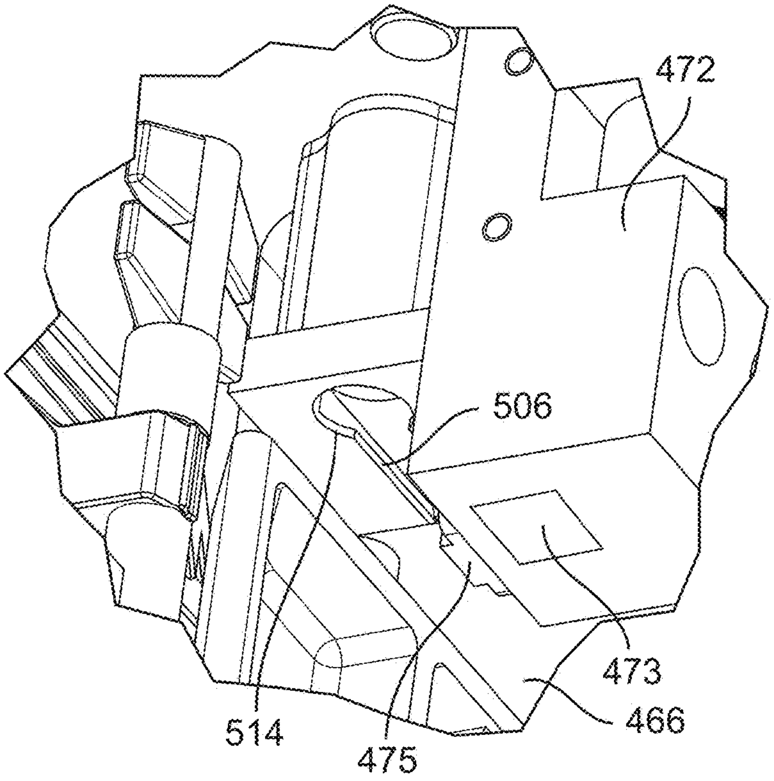
FIG. 77B depict a detailed view of the indicated region of the FIG. 77A.

In operation, and as shown in FIG. 75, the user may position the follower 482 against the stoppers 476 within the stopper magazine 466 prior to actuation of the outlet cover 498 to the withdrawn state. Thus, when the outlet cover 498 and displaceable handle 496 are displaced as depicted in FIG. 76-77A, the stopper 476 aligned with the exit port 514 from the stopper magazine 466 may be frictionally retained within the stopper magazine 466 via the application of force exerted through the follower 482 via the bias member 484. Only the head portion of this stopper 476 may be frictionally held in place against the stopper magazine 466. The stem portion of the stopper 476 may be out of contact with the stopper magazine 466. With the follower 482 deployed against the stoppers 476 and the outlet cover 498 withdrawn, the sealing station 358 may be considered to be in a ready state.

Figure 78:
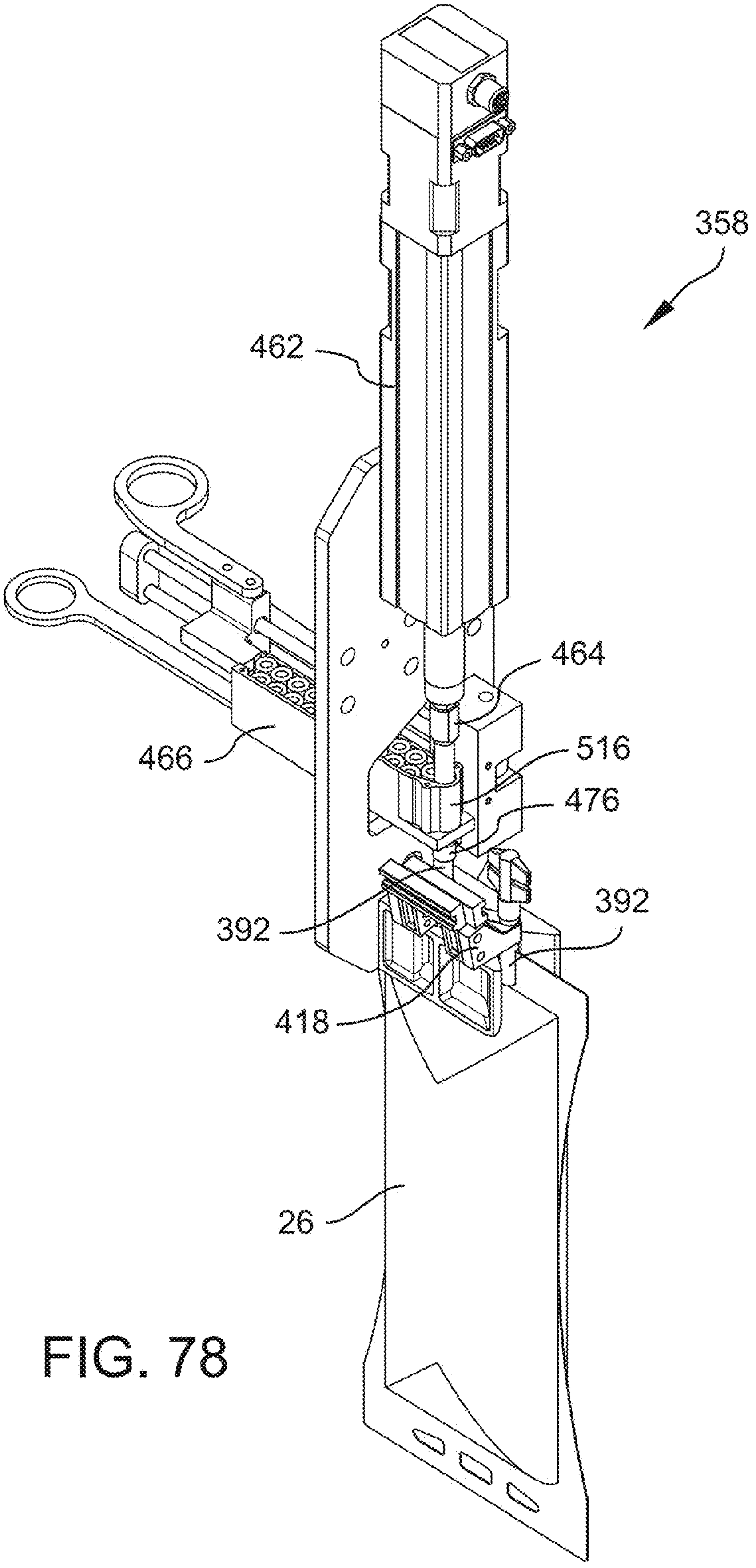
FIG. 78 depicts a perspective view of an example sealing station with an example ram of the sealing station advanced into an example stopper dispenser to drive a stopper from the dispenser into a port of a bag in place at the sealing station.

Referring now to FIG. 78, when the sealing station 358 is in a ready state, the robotic arm 360 may displace a bag 26 to the sealing station 358 via the gripper 410. The gripper 410 may align the port 392 of the bag 26 to be sealed under the exit port 514 of the stopper magazine 466. The control system 15 may command the ram driver 462 to displace the ram 464 through the opening 472 of the stopper magazine 466. The ram 464 may contact the head portion of the stopper 476 and the stopper 476 may begin to displace along with the ram 464. In the example embodiment, the driven stopper 476 may travel along a guide portion 516 of the stopper magazine 466 as it is displaced toward the port 392 of the bag 26. This guide portion 516 may ensure that the stopper 476 displaces substantially in line with the axis of the port 392. The stem or smaller diameter portion of the stopper 476 may enter the port 392 of the bag 26 prior to the stopper 476 displacing beyond the guide portion 516 of the stopper magazine 466. The ram 464 may continue to be driven by the ram driver 462 until the step 512 of the stopper 476 is against the top of the port 392. In certain embodiments, the ram 464 may be displaced until at least a threshold amount of the stem or small diameter portion stopper 476 is within the port 392. For example, the stopper 476 may be driven until at least 75% of the stem is within the port 392. The control system 15 may monitor position feedback from the ram driver 462 to determine the travel distance of the stem portion of the stopper 476 into the port 392.

As mentioned above, in some examples, the control system 15 may prohibit displacement of the ram 464 unless a magazine sensor 473 (see, e.g., FIG. 77B) registers a stopper magazine 466 is properly loaded into the sealing station 358. In certain embodiments, the control system 15 may also monitor data from a bag detection sensor. In some embodiments a port detection sensor 475 which monitors for the presence of a port 392 of a bag 26 may, for example be used. The port detection sensor 475 may be an optical sensor such as a reflectivity based sensor. Such a sensor may for example monitor an intensity of reflection of light emitted from the sensor. The port detection sensor 475 may detect whether a port 392 of a bag 26 is in a proper location for stoppering. The control system 15 may prohibit displacement of the ram 464 unless the port detection sensor 475 indicates that a port 392 is in proper position.

Figure 79:
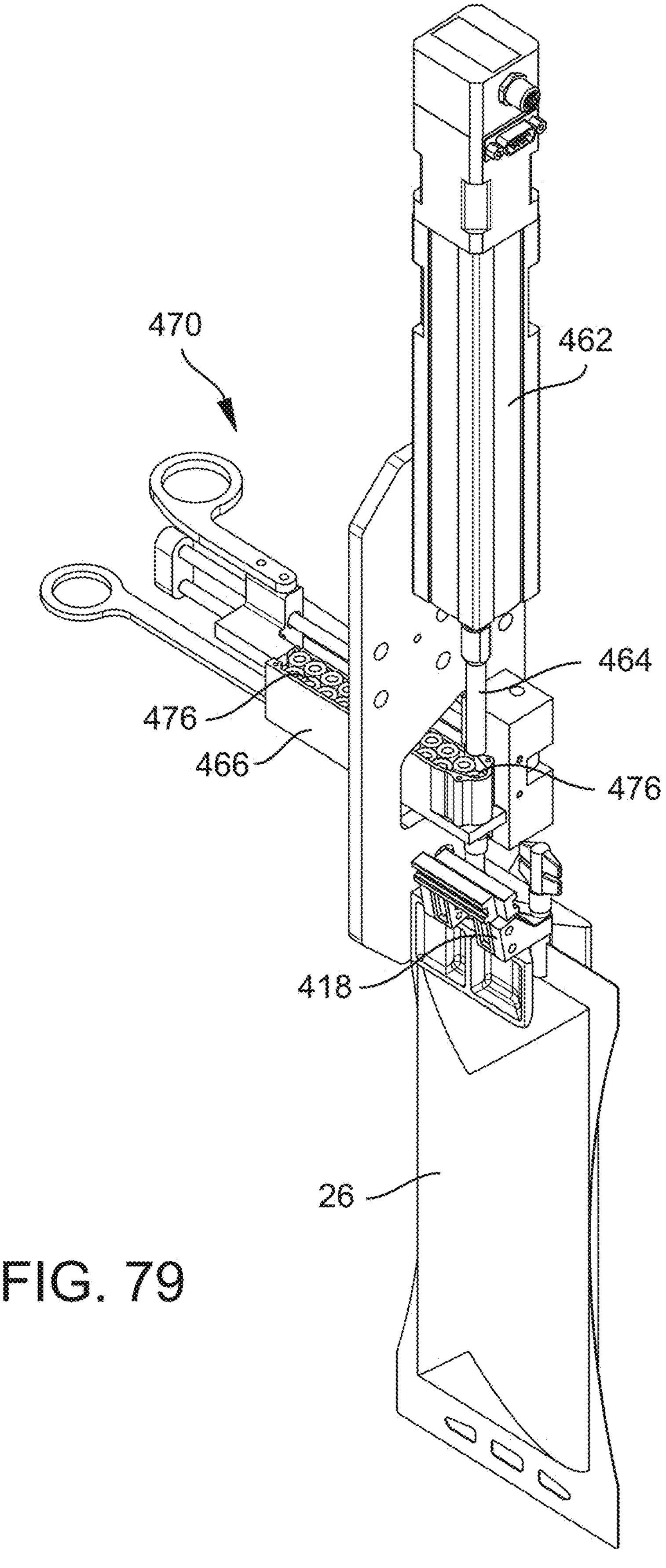
FIG. 79 depicts a perspective view of an example sealing station with an example ram of the sealing station in a retracted position and a stopper advanced into alignment with the exit port of an example stopper dispenser via an example follower assembly.
Figure 80:
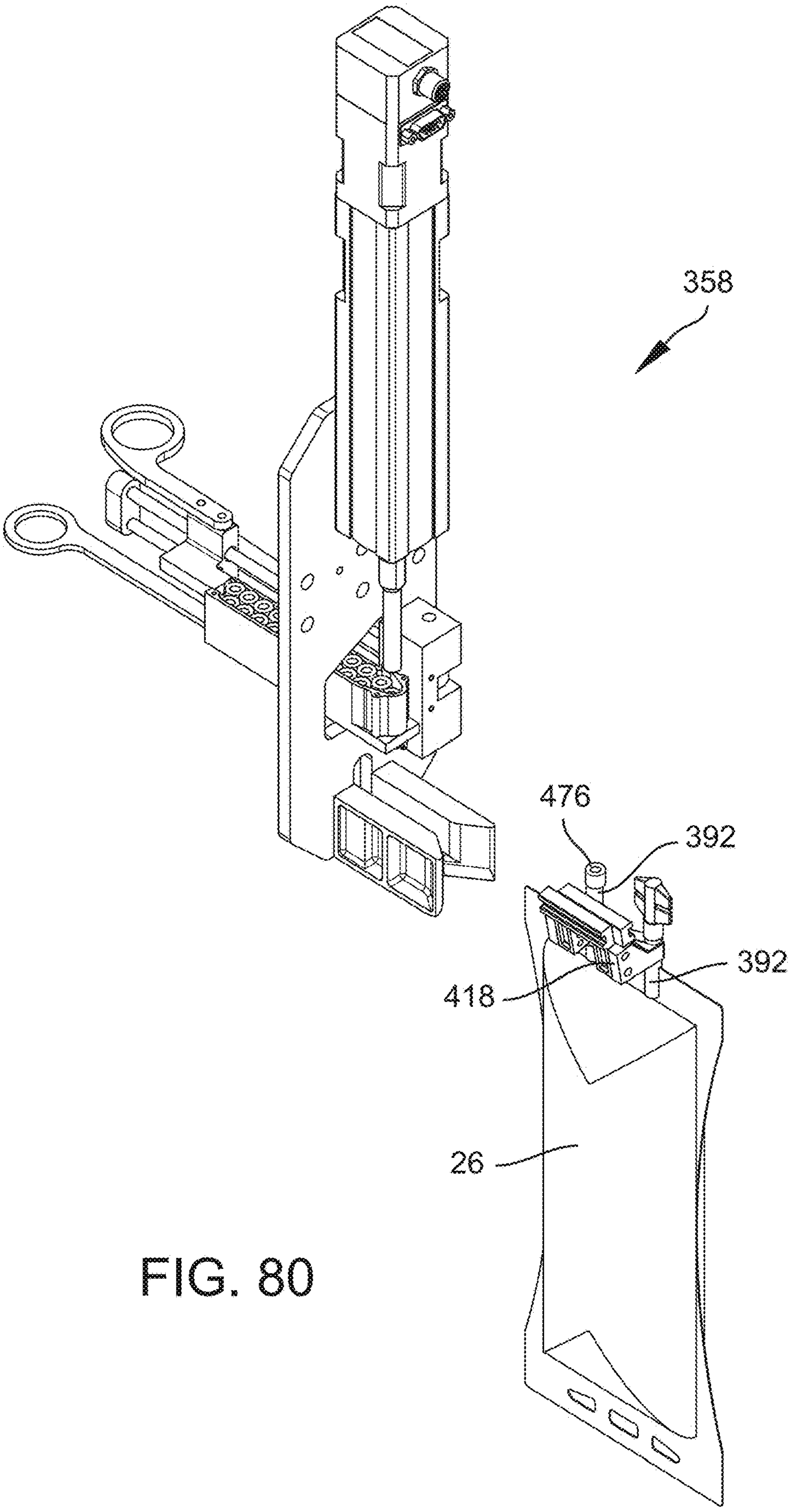
FIG. 80 depicts a perspective view of an example sealing station and an example grasper which has collected a sealed bag from the sealing station.

Referring now to FIG. 79, once the stopper 476 is in sealing engagement with the port 392, the ram 464 may be withdrawn. The control system 15 may command the ram driver 462 to withdraw the ram 464 and the follower assembly 470 may automatically advance stoppers 476 in the stopper magazine 466 such that the next stopper 476 in the stopper magazine 466 is aligned with the exit port 514 of the stopper magazine 466. As shown in FIG. 80, the sealed bag 26 may then be displaced from the sealing station 358 to a quarantine repository 362.

Figure 81A:
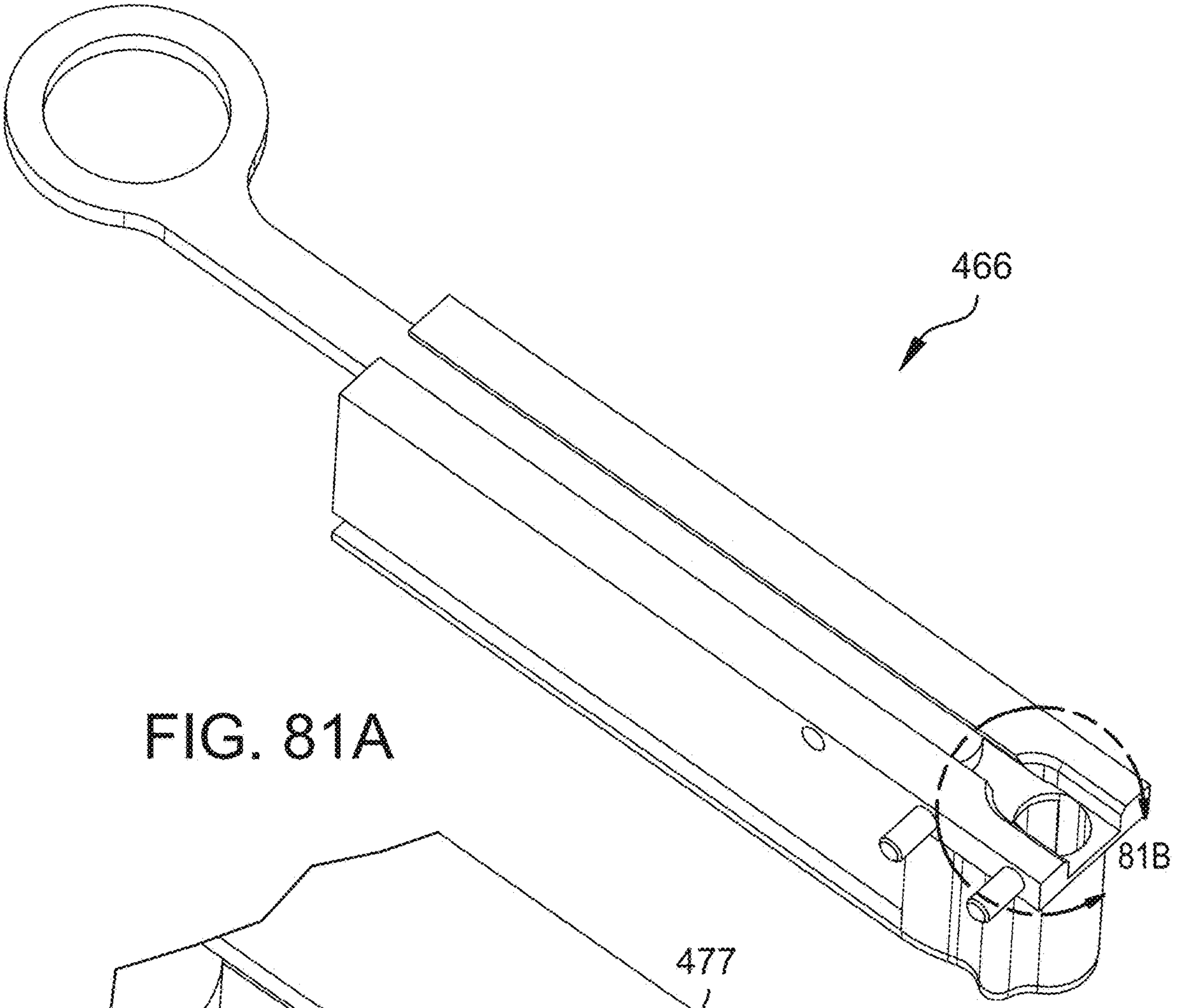
FIG. 81A depicts a perspective view of an example stopper dispenser having an exit port with a chamfered port opening.
Figure 81B:
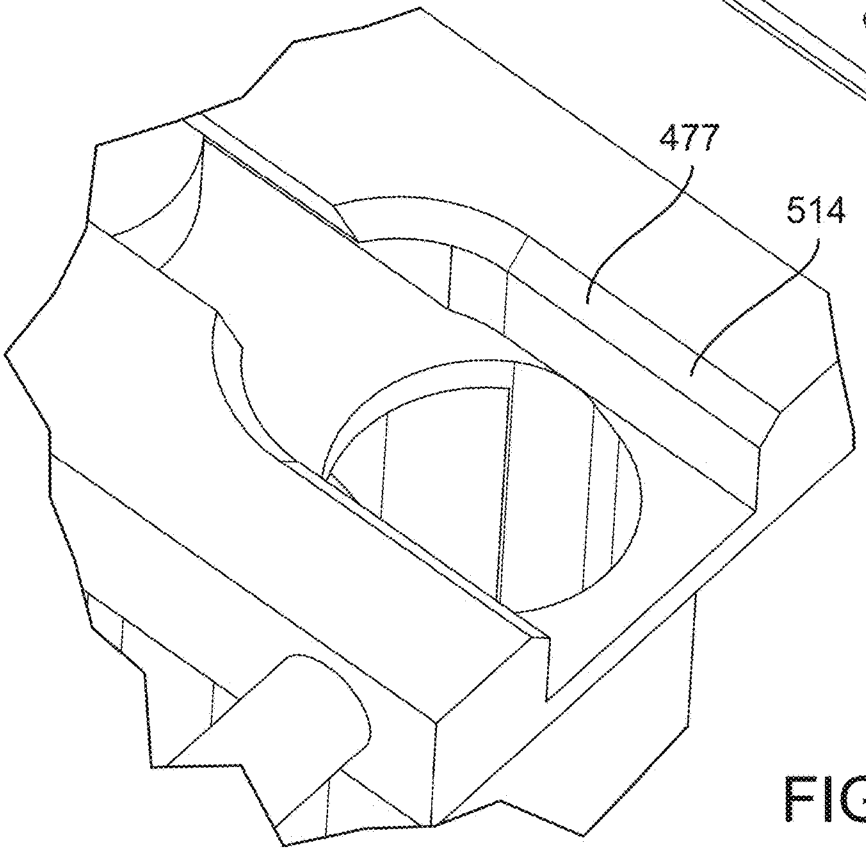
FIG. 81B depicts a detailed view of the indicated portion of FIG. 81A.

Referring now to FIGS. 81A-81B, in some embodiments, a sealing station 358 may accept a different stopper magazine 466 or may be designed to accept a variety of stopper magazines 466 having different styles, capacities, or containing different stopper 476 types and sizes. Single column magazines, drum type magazines, or any other suitable type of stopper magazine 466 may for example be used. A modified version of the stopper magazine 466 shown in FIGS. 74A and 74B is depicted in FIGS. 81A-81B. As shown, the exit port 514 of stopper magazine 466 is an elongate shape which extends all the way to the front end of the stopper magazine 466. The elongate shape may allow for greater alignment tolerances as stoppers 476 are displaced out of the exit port 514. Additionally, the walls of the exit port 514 may include a guide portion disposed at a portion of the exit port 514 wall adjacent the exterior face of the magazine body 506. The guide portion may include chamfer 477 or fillet in some embodiments which is applied to the edge where the exit port 514 and exterior face of the magazine body 506 meet. Such a chamfered exit port 514 may be included on any of the stopper magazines 466 described herein.

Figure 81C:
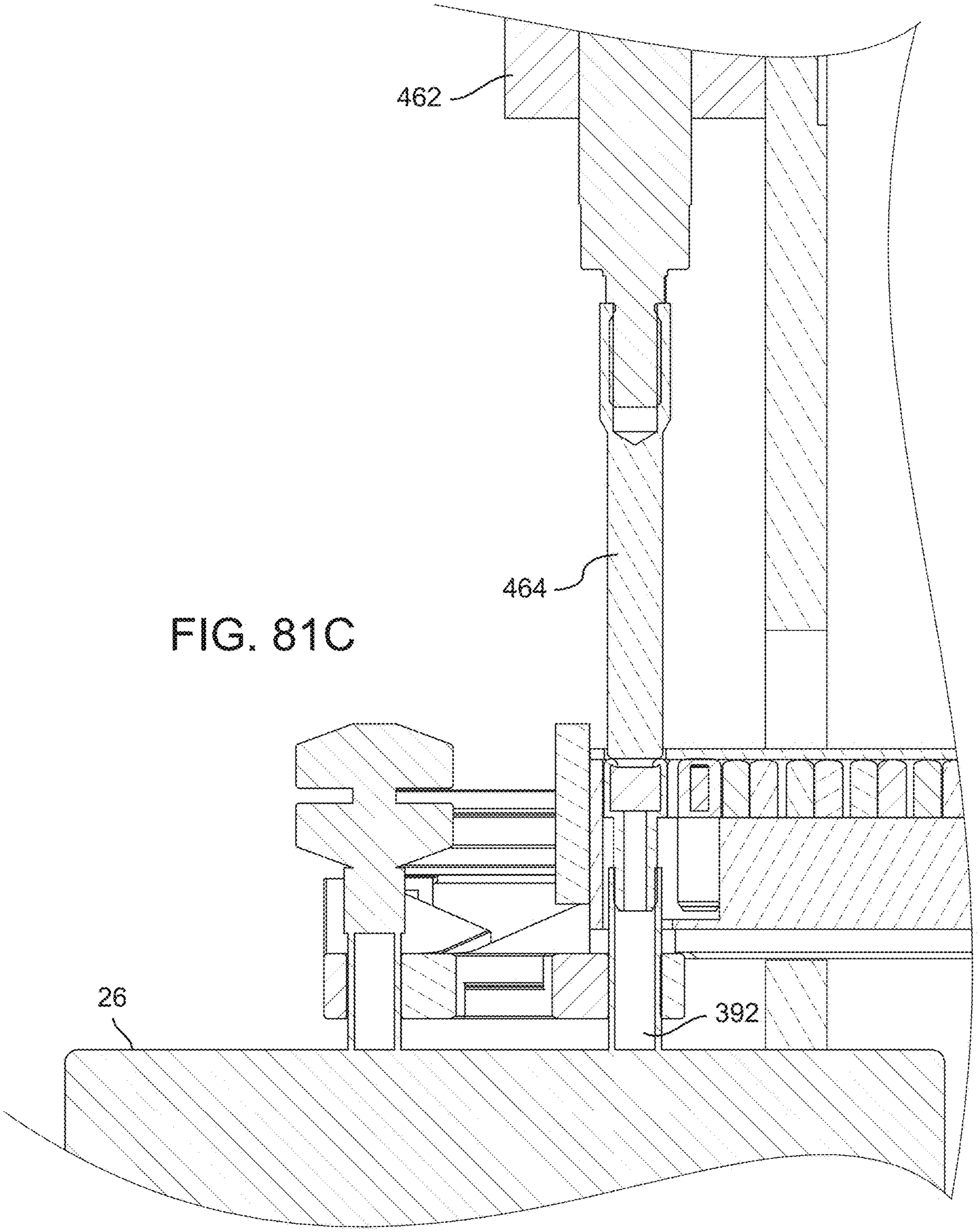
FIG. 81C depicts a cross sectional view of an example sealing station with the stopper dispenser of FIGS. 81A-B installed therein and a port of a bag advanced partially over a portion of a stopper held in the dispenser.

Referring now to FIG. 81C, in certain embodiments, the port 392 of the bag 26 may be displaced into the stopper magazine 466 exit port 514 prior to sealing of the port 392. The chamfer 477 on the exit port 514 of the stopper magazine 466 may be designed to facilitate this action. As shown in FIG. 81C, the ram 464 may be driven into the stopper magazine 466 until the ram 464 contacts the stopper 476 which is in line with the exit port 514. The ram 464 may be parked in this position and the grasper 418 may raise the bag 26 such that the stopper 476 is partially installed (e.g. no more than 25-35%) into the port 392. The ram 464 may block the stopper 476 from being pushed upward as this occurs. The chamfer 477 on the exit port 514 of the stopper magazine 466 may funnel or direct the port 392 of the bag 26 into alignment with the stem or smaller diameter section of the stopper 476. Once the stopper 476 is partially installed in the port 392, the ram 464 may then be actuated by the ram driver 462 to complete installation of the stopper 476 into the port 392 to seal the bag 26.

Figure 82A:
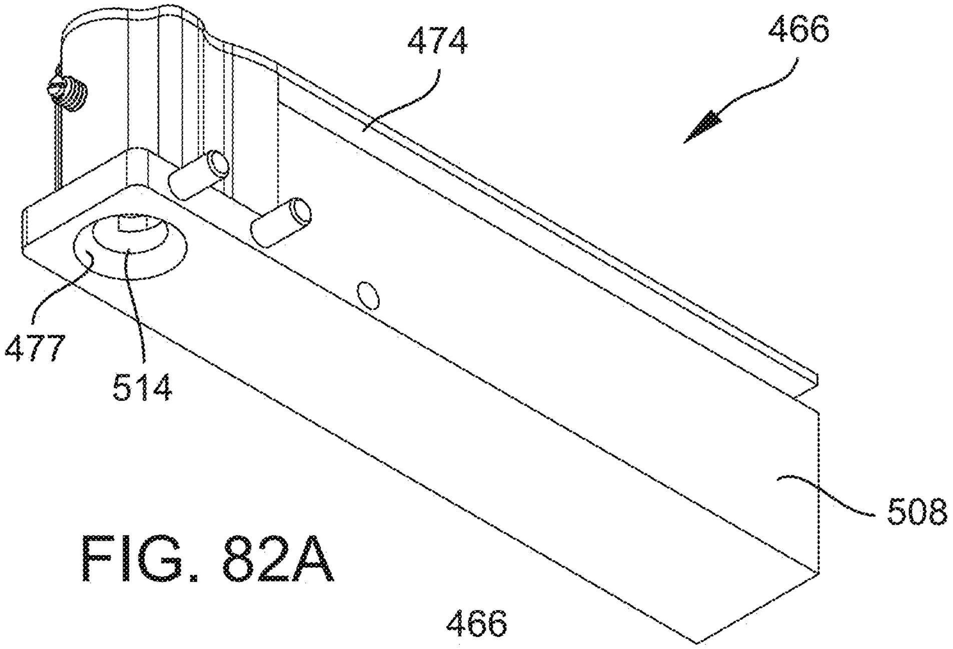
FIGS. 82A-C depict views of another example stopper dispenser having an exit port with a chamfered port opening and an exit port detent member.
Figure 82B:
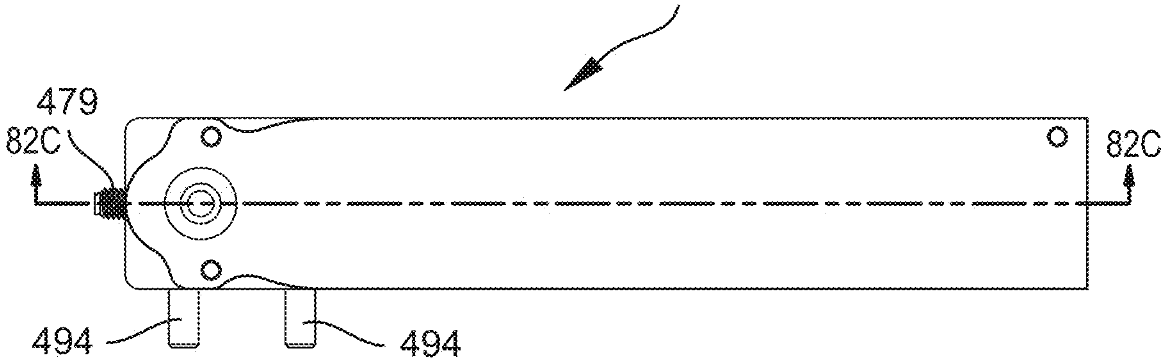
Figure 82C:
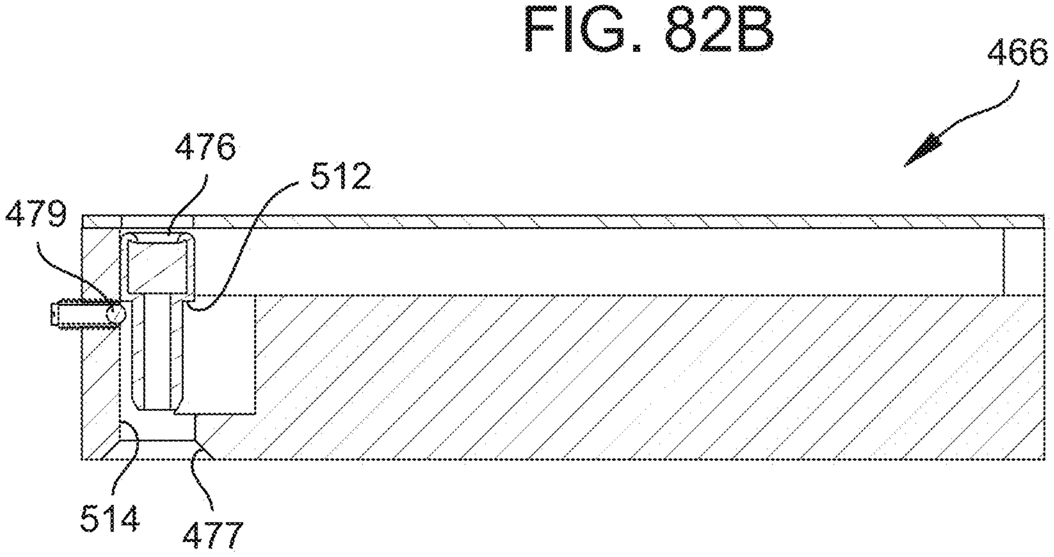

Referring now to FIGS. 82A-C views of another exemplary stopper magazine 466 are shown. As shown, the example stopper magazine 466 includes an exit port 514 with a chamfer 477. As above, the chamfer 477 may funnel or direct the port 392 of the bag 26 into alignment with the stem or smaller diameter section of the stopper 476. Additionally, as best shown in FIG. 82C, a detent member 479 may be included in the wall of the exit port 514. Such detent members 479 may be included in any of the stopper magazines 466 described herein. The detent member 479 in the example embodiment include a ball type detent. The detent member 479 may be a barb, bump, or other protuberance in alternative embodiments. The detent member 479 may project into the exit path of a stopper 476 traveling through the exit port 514. The step region 512 of a stopper 476 may catch on the detent member 479 aiding in retaining the stopper 476 within the stopper magazine 466. As shown best in FIG. 82A, embodiments including a detent member 479 may omit a displaceable handle 496 coupled to an outlet cover 498 (see, e.g. FIG. 74B) and the accompanying guide track 506 (see, e.g. FIG. 74B).

Figure 83:
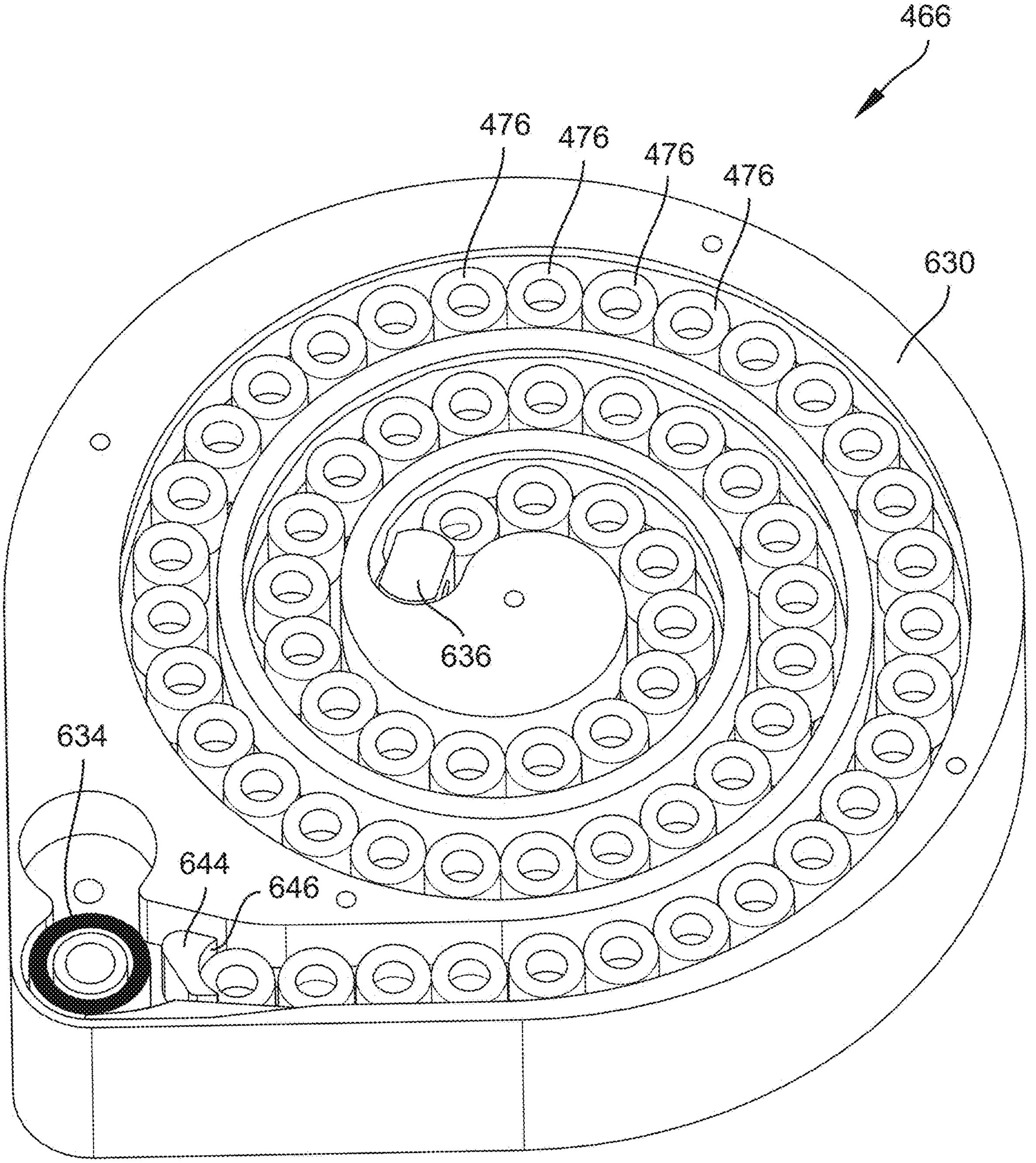
FIG. 83 depicts a perspective view of another example stopper dispenser with a cover plate of the example stopper dispenser removed.

Referring now to FIG. 83, an exemplary drum type stopper magazine 466 is depicted. The stopper magazine 466 may include a drum body 630. The drum body 630 may include a spiral trough or track 632 which may have a depth sufficient to accept stoppers 476 therein. The stopper magazine 466 may also include a bias member such as a constant force spring 634. The constant force spring 634 may be connected to a follower 636 that may be placed behind the last stopper 476 in the stopper magazine 466. The stopper magazine 466 may also include a removable cover member (not shown) which may be placed on the stopper magazine 466 to enclose the stoppers 476 within the stopper magazine 466. The example drum type stopper magazine 466 has a capacity of 64 stoppers 476. In other embodiments, the capacity may be higher (e.g. up to 100 or more) or lower (e.g. 50 or less).

Figure 84:
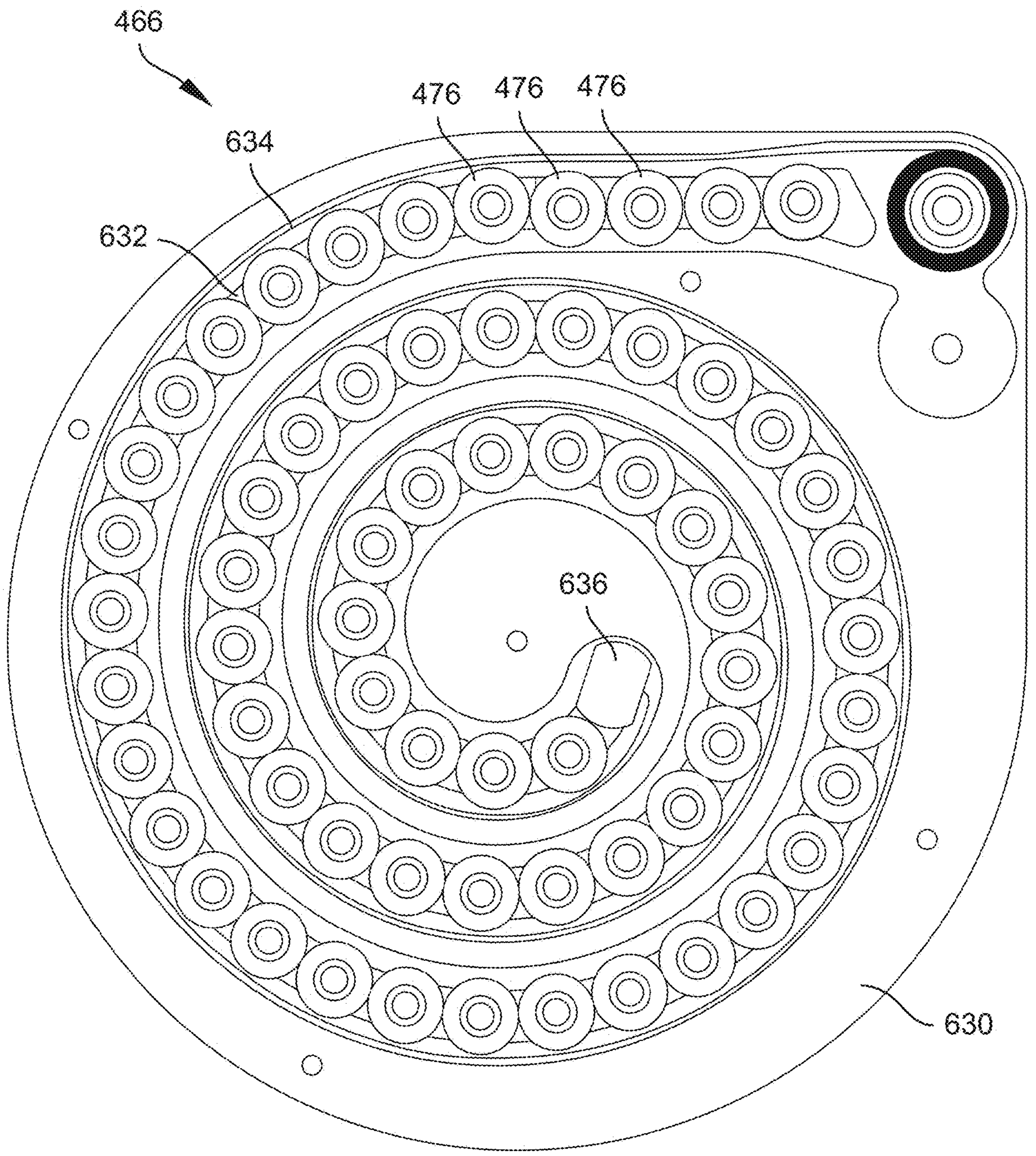
FIG. 84 depicts a top down view of an example stopper dispenser which is filled with stoppers.
Figure 85:
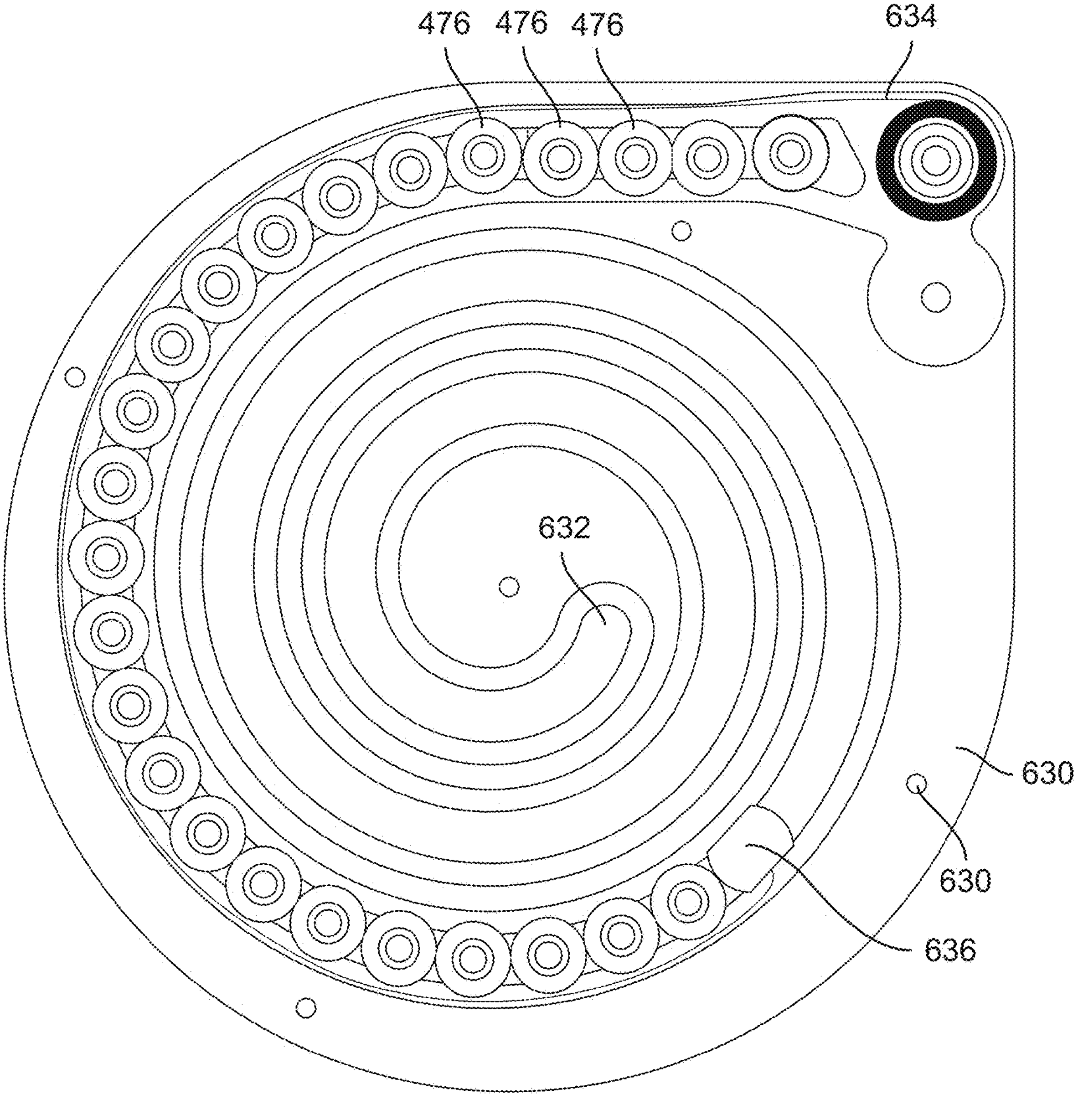
FIG. 85 depicts a top down view of an example stopper dispenser which has been partially emptied of stoppers.
Figure 86:
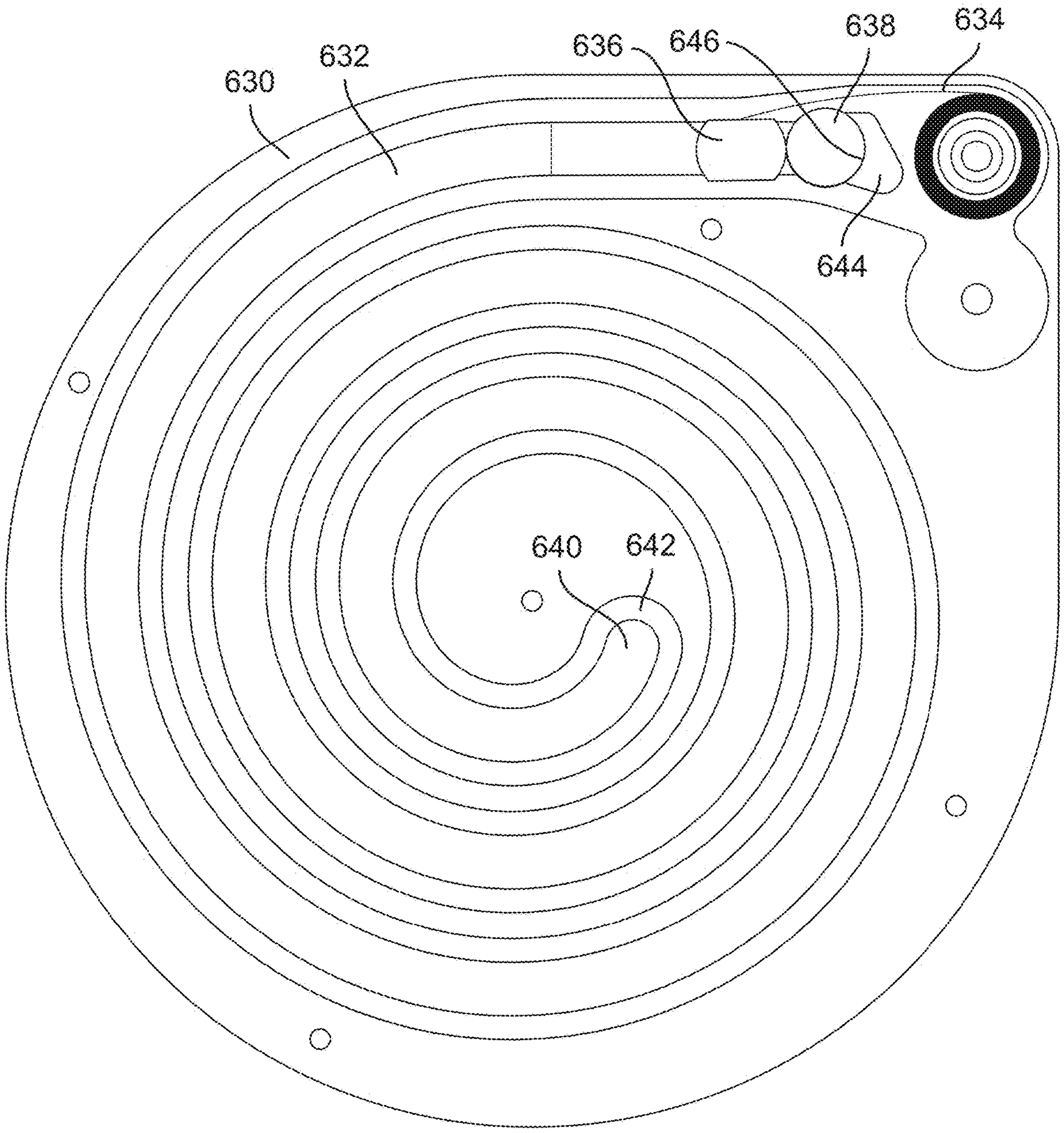
FIG. 86 depicts a top down view of an example stopper dispenser which is emptied of stoppers.

Referring now to FIGS. 84-86, as the stopper magazine 466 is depleted, the constant force spring 634 may pull the follower 636 along the spiral path 632 of in the drum body 630. This may in turn advance the remaining stoppers 476 in the stopper magazine 466. As shown, the spiral path 632 may include a trough portion 640. The trough portion 640 may accept the stem or small diameter section of each of the stoppers 476. Thus the trough portion 640 may act as a guide for the stoppers 476 as they are displaced along the spiral path 632. The follower 636 may be sized to ride along the trough 640 in certain embodiments and thus the trough portion 640 may also act as a follower guide during operation. The trough portion 640 may be flanked on each side by a ledge 642 upon which the step region 512 of the stoppers 476 may rest.

The stopper magazine 466 is shown empty in FIG. 86. As shown, the exit port 638 for the stoppers 476 may be sized to substantially match the dimensions of the head or larger diameter portion of the stoppers 476. Additionally, the exit port 638 may be at least partially surrounded by a guide wall 644. The guide wall 644 may be positioned in front of the exit port 638 so as to prevent the constant force spring 634 from advancing stoppers 476 beyond the exit portion 638. The guide wall 644 may also have a guide face 646 with a curvature which helps to position the head portion of the stoppers 476 in alignment with the exit port 638.

Though not shown in FIG. 86, mating pins 492 (see, e.g., FIG. 74A) may be included. The mating pins 492 may aid in mounting of the stopper magazine 466 in the magazine receptacle 472. The mating pins 492 may also allow for a magazine sensor 473 to detect the presence of the stopper magazine 466 at the magazine receptacle 472.

Figure 87:
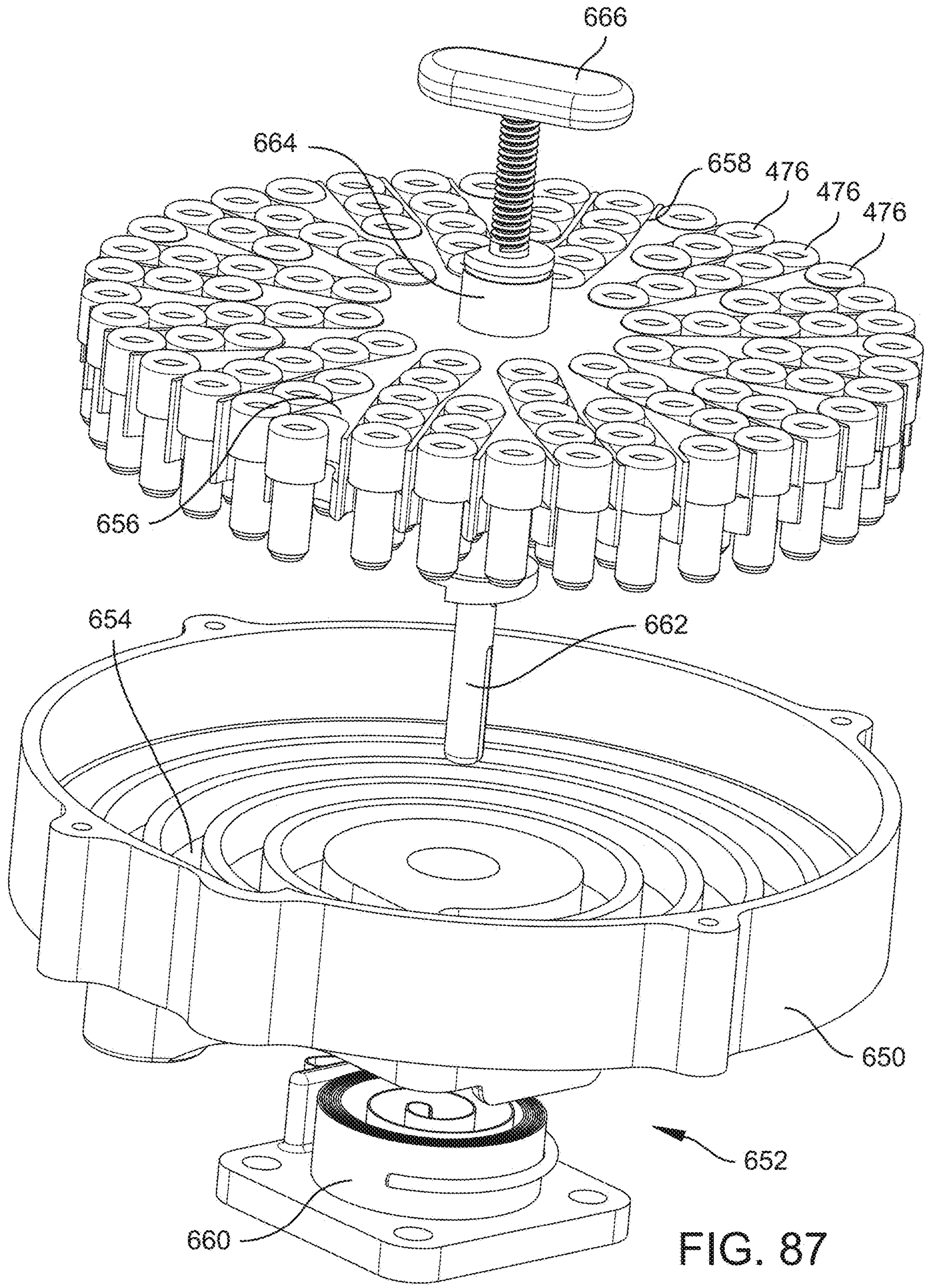
FIG. 87 depicts an exploded view of another example stopper dispenser.

Referring now to FIG. 87, an exploded view of another example stopper magazine 466 is depicted. As shown, the stopper magazine 466 in FIG. 87 is a drum type magazine. The stopper magazine 466 may include a drum body 650 with a spiral trough or track 654 formed therein. A rotor element 656 may also be included and may include a number of flutes 658 which extend therethrough. The flutes 658 may be sized to accept stoppers 476 therein. A bias assembly 652 may also be included in the example stopper magazine 466. In the example embodiment, the biasing assembly 652 may include a torsion spring or a wound spring 660 as in the example embodiment. A portion of the wound spring 660 may be attached to a spindle 662 included in the bias assembly 652 which extends through the drum body 650 and the rotor 656. Typically, the wound spring 660 may be included within a housing which is not depicted in FIG. 87 to better show the wound spring 660. The spindle 662 may include a keyed segment 664 which interfaces with the rotor 656. In the example embodiment, the keyed segment 664 is "D" shaped and may ensure that the rotor 656 rotates in tandem with the spindle 662. In other embodiments, the keyed segment 664 may have a different cross sectional shape such as a square shape or star shape. In operation, a user may grasp a knob 666 attached to the spindle to rotate the spindle 662. This may cause the wound spring 660 to store energy which may be used to turn the rotor 656 and advance stoppers 476 along the spiral track 654. The stopper magazine 466 may also include a removable cover member (not shown) which may be placed on the stopper magazine 466 to enclose the stoppers 476 and rotor 656 within the stopper magazine 466. As in other stopper magazine 466 embodiments, mating pins 492 (see, e.g., FIG. 74B) may be included to aid in mounting and detection of the stopper magazine 466 in the magazine receptacle 473.

Figure 88:
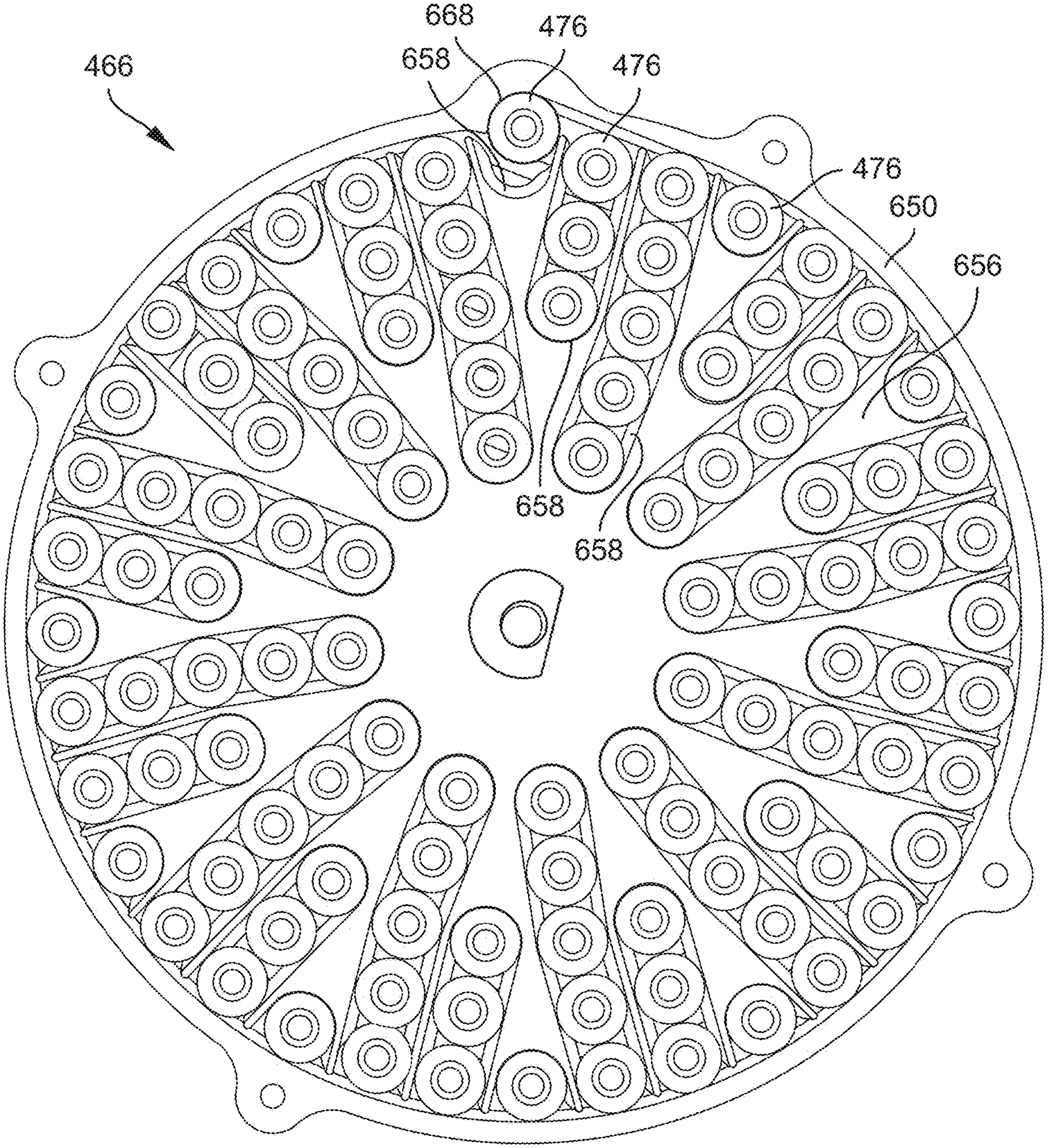
FIG. 88 depicts a top down view of an example stopper dispenser which is filled with stoppers.

Referring now to FIG. 88, top down view of the example stopper magazine 466 of FIG. 87 is depicted. As shown, the stopper magazine 466 is fully loaded with stoppers 476. The example stopper magazine 466 has a capacity of 108 stoppers 476 in the example embodiment, though as with other stopper magazines 466 described herein, the capacity may be lower or greater depending on the embodiment. As shown, the flutes 658 are of different lengths and extend toward the center of the rotor 656 from the periphery of the rotor 656. This variety of different length flutes 658 may increase the space efficiency of the stopper magazine 466 and allow for a large number of stoppers 476 to be loaded into the stopper magazine 466.

Figure 89:
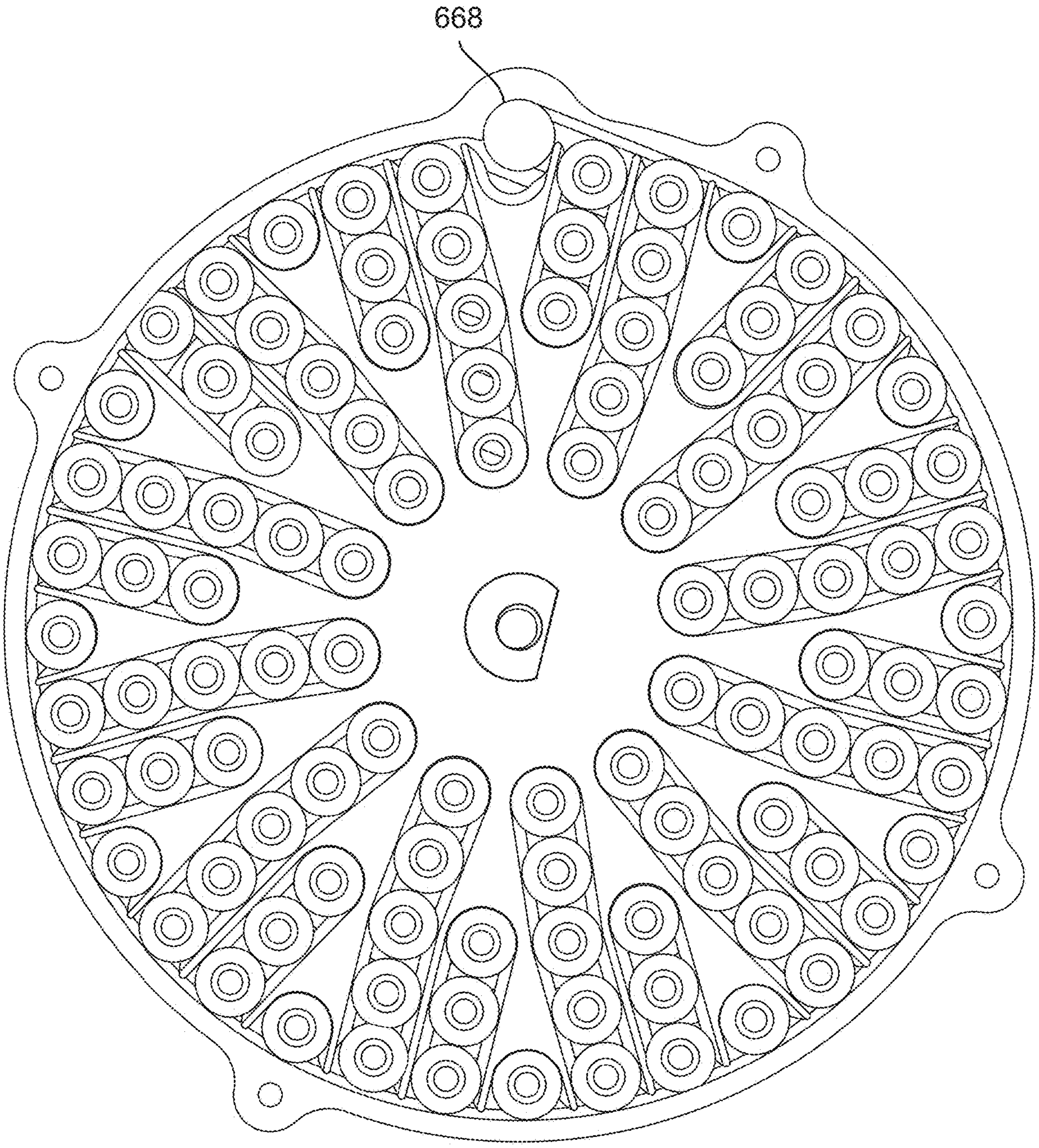
FIG. 89 depicts a top down view of an example stopper dispenser with the stopper in line with the exit port of the dispenser having been dispensed.
Figure 90:
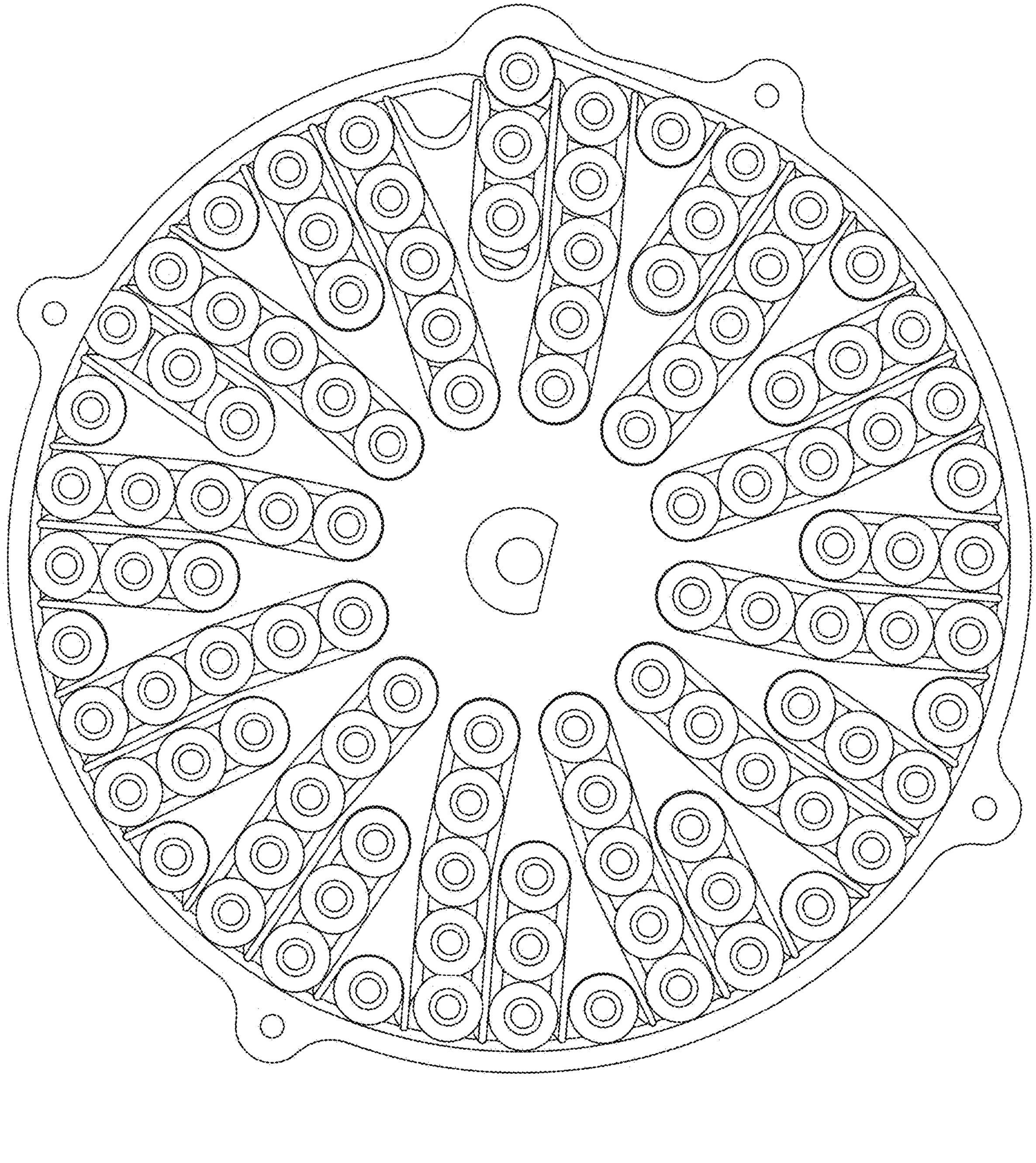
FIG. 90 depicts a top down view of an example stopper dispenser which has been rotated under force of a bias member to advance a stopper into alignment with the exit port of the dispenser.

Still referring to FIG. 88, a stopper 476 is depicted at the exit port 668 of the stopper magazine 466. The edge of the flute 658 in which the stopper 476 was disposed may press against the head portion of the stopper 476. As the bias assembly 652 of the stopper magazine 466 may be preloaded as the stopper magazine 466 is operated, the flute 658 may exert a force against the stopper 476 which is sufficient to frictionally retain the stopper 476 against the wall of the exit port 668. Additionally, the stopper 476 at the exit port 668 may present an interference to the wall of the flute 658 which inhibits the rotor 656 from displacing under the force of the bias assembly 652. When the stopper 476 is driven out of the stopper magazine 466 by a ram 464 or the like (see, FIG. 89), the interference may be removed and the rotor 656 may be free to rotate. The rotor 656 may displace pushing the stoppers 476 along the spiral track 654 of the drum body 650 as shown in FIG. 90. This may advance a next stopper 476 into the exit port 668 which may again present an interference to further displacement of the rotor 656.

Figure 91:
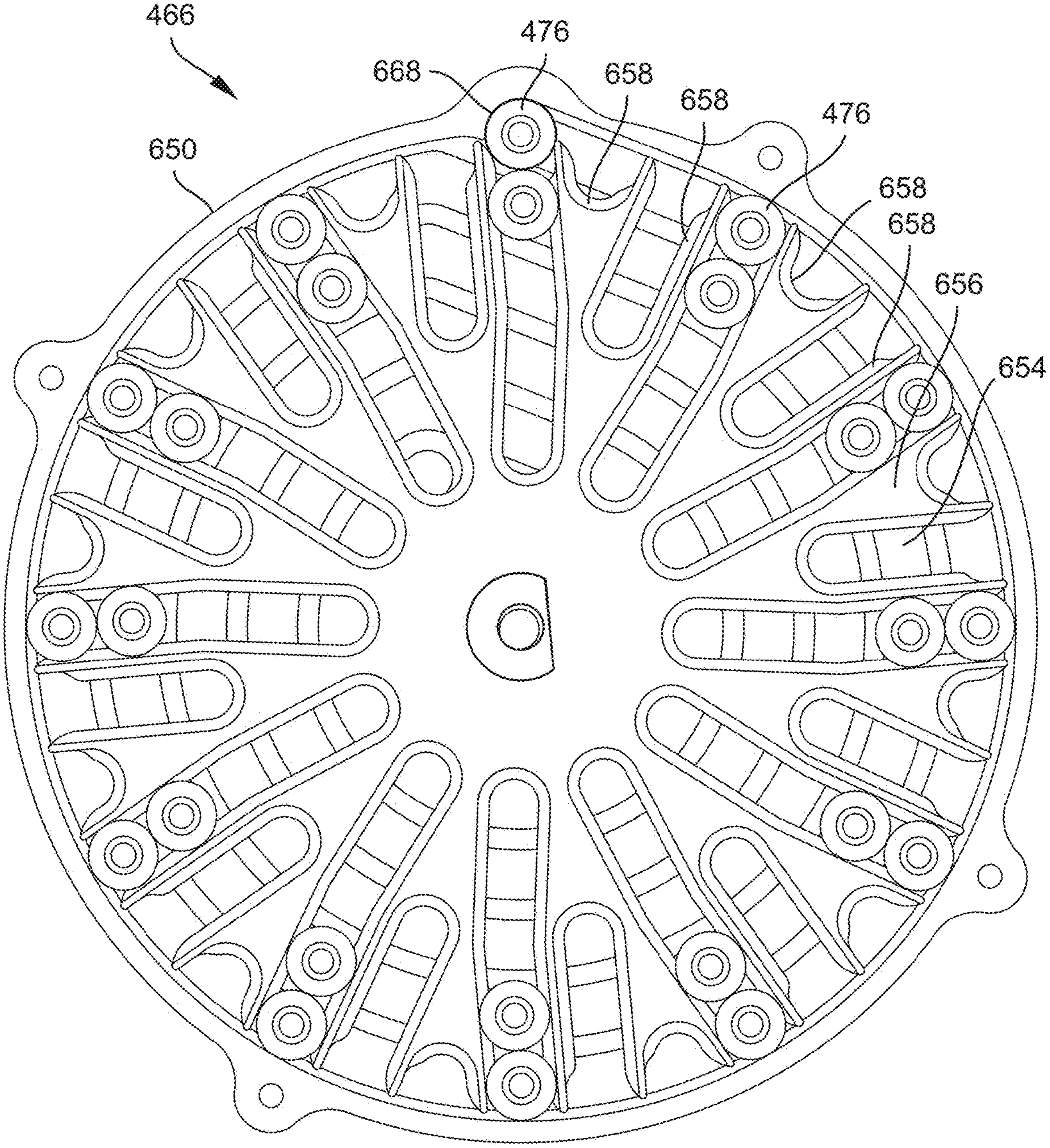
FIG. 91 depicts a top down view of an example stopper dispenser which is partially emptied of stoppers.
Figure 92:
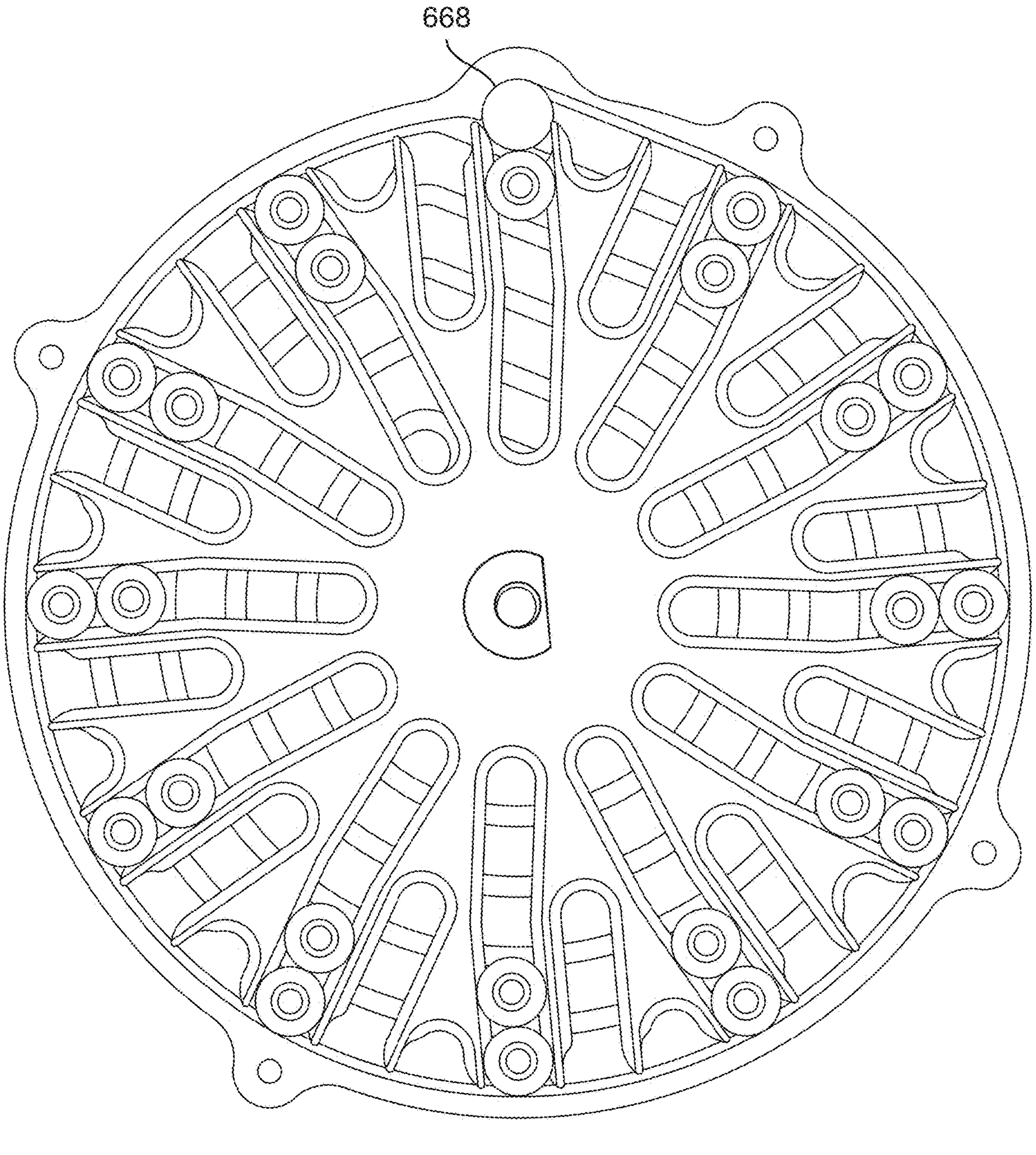
FIG. 92 depicts a top down view of an example stopper dispenser with the stopper in line with the exit port of the dispenser having been dispensed.
Figure 93:
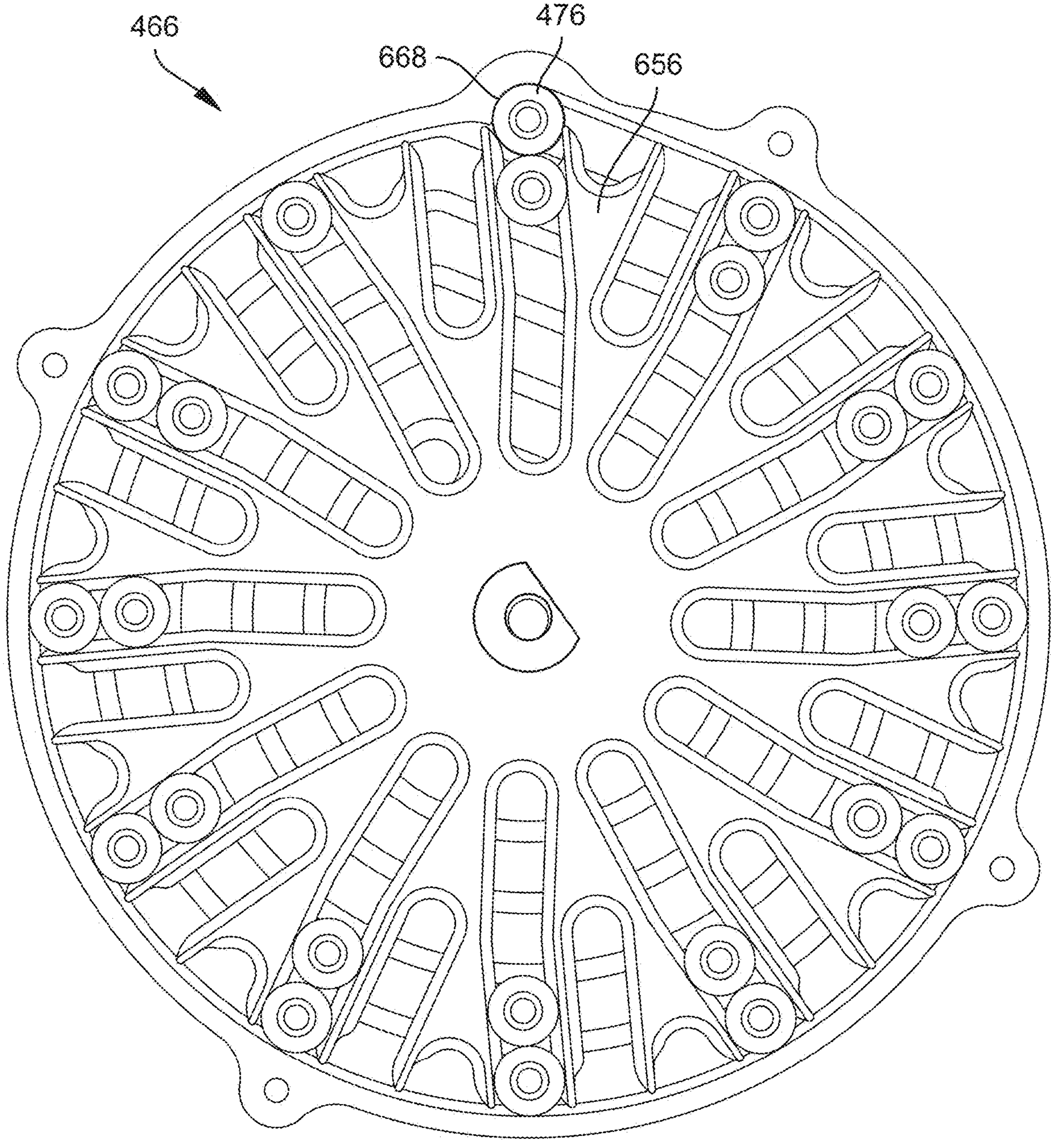
FIG. 93 depicts a top down view of an example stopper dispenser which has been indexed to advance a next available stopper into alignment with the exit port of the dispenser under force of a bias member.

Referring now to FIG. 91, as the stopper magazine 466 depletes, smaller flutes 658 of the rotor 656 may be emptied of stoppers 476. The exemplary stopper magazine 466 is arranged to automatically index to the next available stopper 476 and will automatically skip any empty flutes 658. In the example shown in FIG. 91, the stopper 476 at the exit port 668 is separated from the next available stopper 476 by two empty flutes 658. When the stopper 476 is discharged from the exit port 668 (see FIG. 92), the rotor 656 may be free to advance until the next stopper 476 enters into alignment with the exit port 668 and presents an interference to further movement of the rotor 656 as shown in FIG. 93. Thus the stopper magazine 466 may automatically index to the next stopper 476 even when the rotational displacement needed is variable. It should be noted that in other embodiments, other rotor drive assemblies in additional to the bias assembly 652 shown may be utilized. For example, a motorized displacement assembly may be included in place of the bias assembly 652. In such examples, the control system 15 may track the number of stoppers 476 dispensed from the magazine 466 and use this count to ensure that the motorized displacement assembly drives the rotor 656 an amount appropriate to advance the next stopper 476 to the exit port 668.

Figure 94:
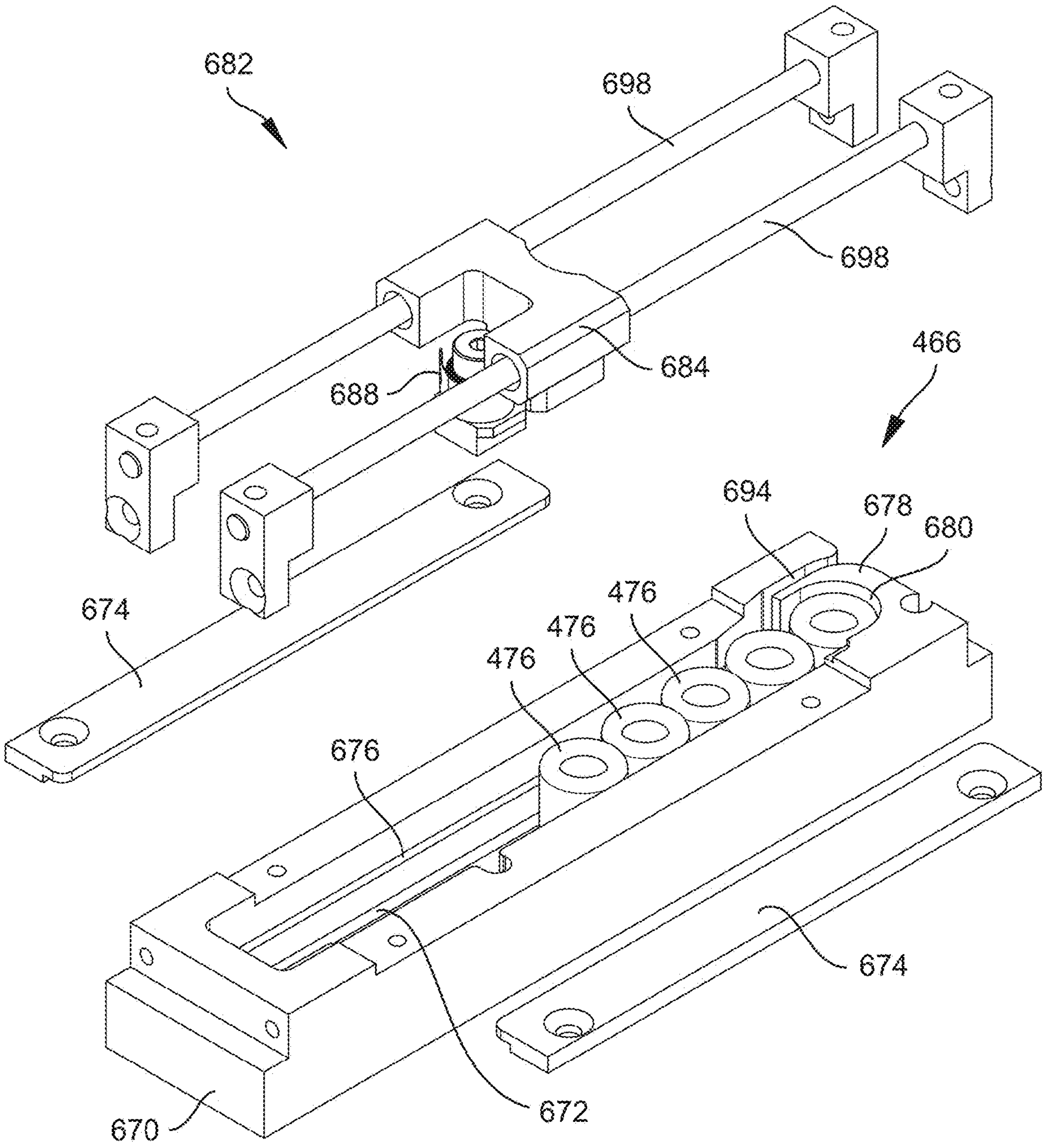
FIG. 94 depicts an exploded view of another example stopper dispenser.

Referring now to FIG. 94, an exploded view of another stopper magazine 466 is shown. As shown, the stopper magazine 466 may include a magazine body 670. The magazine body 670 may include a trough 672. The trough 672 may accept the stem or smaller diameter section of each of the stoppers 476. Thus the trough portion 672 may act as a guide for the stoppers 476 as they are displaced toward the exit port 690 (see, e.g., FIG. 95) of the stopper magazine 466. The trough portion 672 may be flanked on each side by a ledge 676 upon which the step region 512 of the stoppers 476 may rest. In the example embodiment, the stopper magazine 466 may also include two plates 674 which may attach to the magazine body 670 on opposite sides of the trough 672. The plates 674 may partially overhang the trough 672. The overhanging portion of these plates 674 may ensure that stoppers 476 do not fall out of the stopper magazine 466 during shipment or as the stopper magazine 466 is handled. Additionally, the exit port 690 may be at least partially surrounded by a guide wall 678. The guide wall 678 may be positioned in front of the exit port 690 so as to prevent stoppers 476 from advancing beyond the exit port 690. The guide wall 644 may also have a guide face 680 with a curvature which helps to position the head portion of the stoppers 476 in alignment with the exit port 690.

Figure 95:
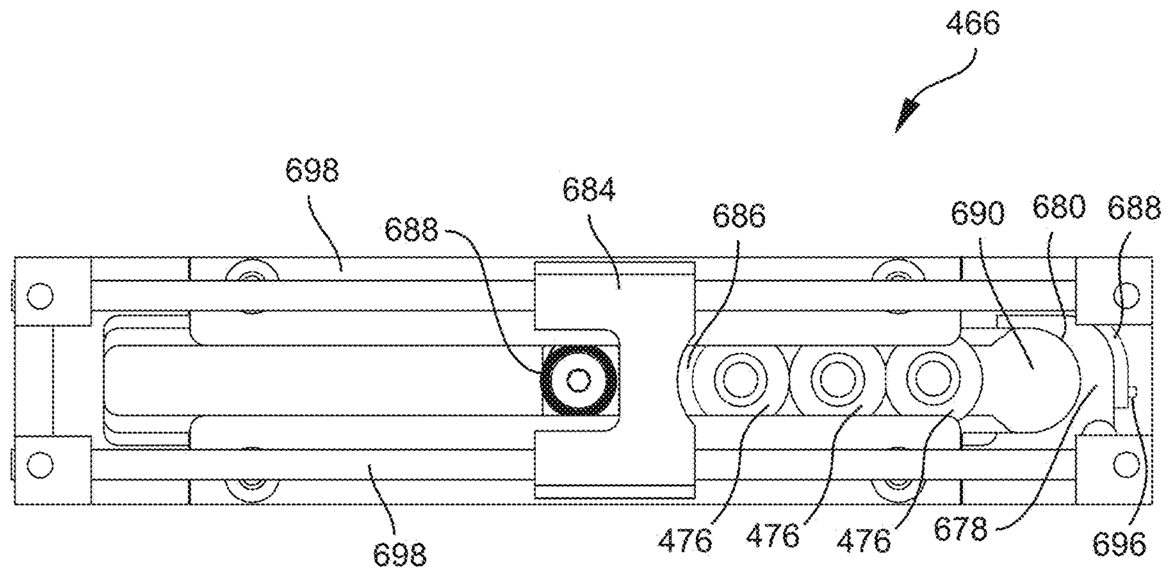
FIG. 95 depicts a top down view an example stopper dispenser with the stopper in line with the exit port of the dispenser having been dispensed.
Figure 96:
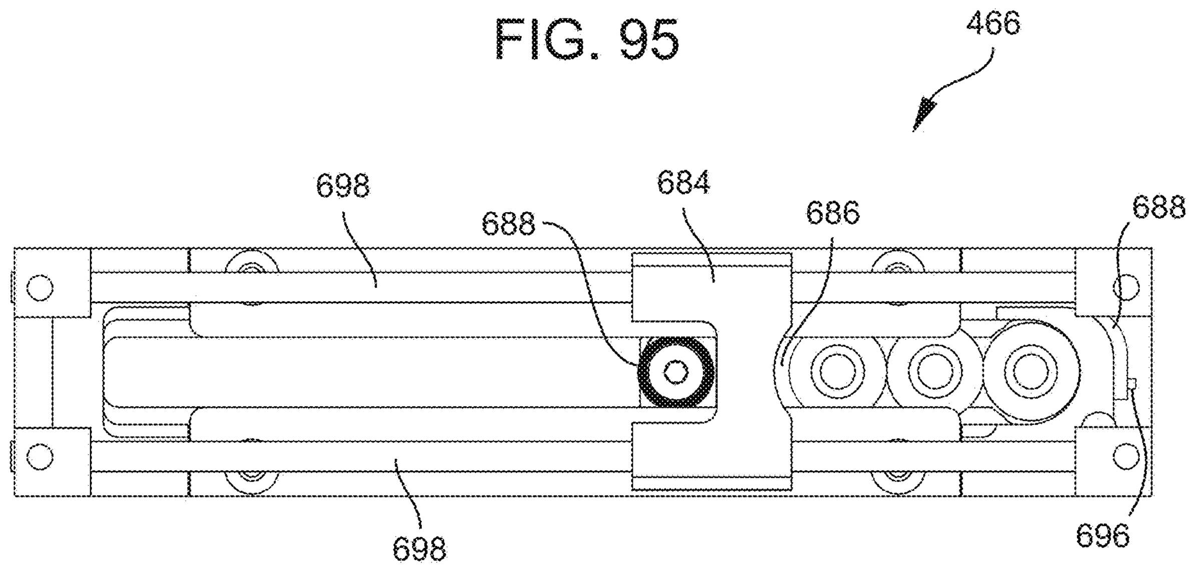
FIG. 96 depicts a top down view of an example stopper dispenser with a stopper advanced into alignment with an exit port of the dispenser via a bias force exerted on an example follower block of the dispenser.

Referring now also to FIGS. 95 and 96, the stopper magazine 466 may also include a follower assembly 682. The follower assembly 682 may include a follower block 684 which includes a follower 686. The follower 686 may include a stopper contacting face which has an arcuate shape that cradles the head or larger diameter portion of the stoppers 476. A bias member 688 may also be included in the follower assembly 682. In the example embodiment, the bias member 688 is shown as a constant force spring which is mounted to a mounting block 692 attached to the follower block 684. As shown best in FIG. 94, the magazine body 670 may include a routing channel 694 which allows an end of the constant force spring to be feed through the magazine body 670 to a mounting point on an external face of the guide wall 678. As shown in FIG. 95, for example, the end of the constant force spring may be coupled to the external face of the guide wall via a fastener 696. When a stopper 476 is dispensed out the exit port 690 of the magazine body 670, the bias member 688 may exert a force on the follower block 684 that displaces the follower block 684, follower 686, and any remaining stoppers 476 in the stopper magazine 466 toward the exit port 690. This may advance the next stopper 476 into alignment with the exit port 690. The follower assembly 682 in the example embodiment also includes two guide rails 698. The guide rails 698 may extend parallel to one another on opposing sides of the trough portion 672. These guide rails 698 may extend through the follower block 684 and guide displacement of the follower block 684 as stoppers 476 are dispensed from the stopper magazine 466. As in other stopper magazine 466 embodiments, mating pins 492 may be included to aid in mounting and detection of the stopper magazine 466 in the magazine receptacle 473.

Figure 97:
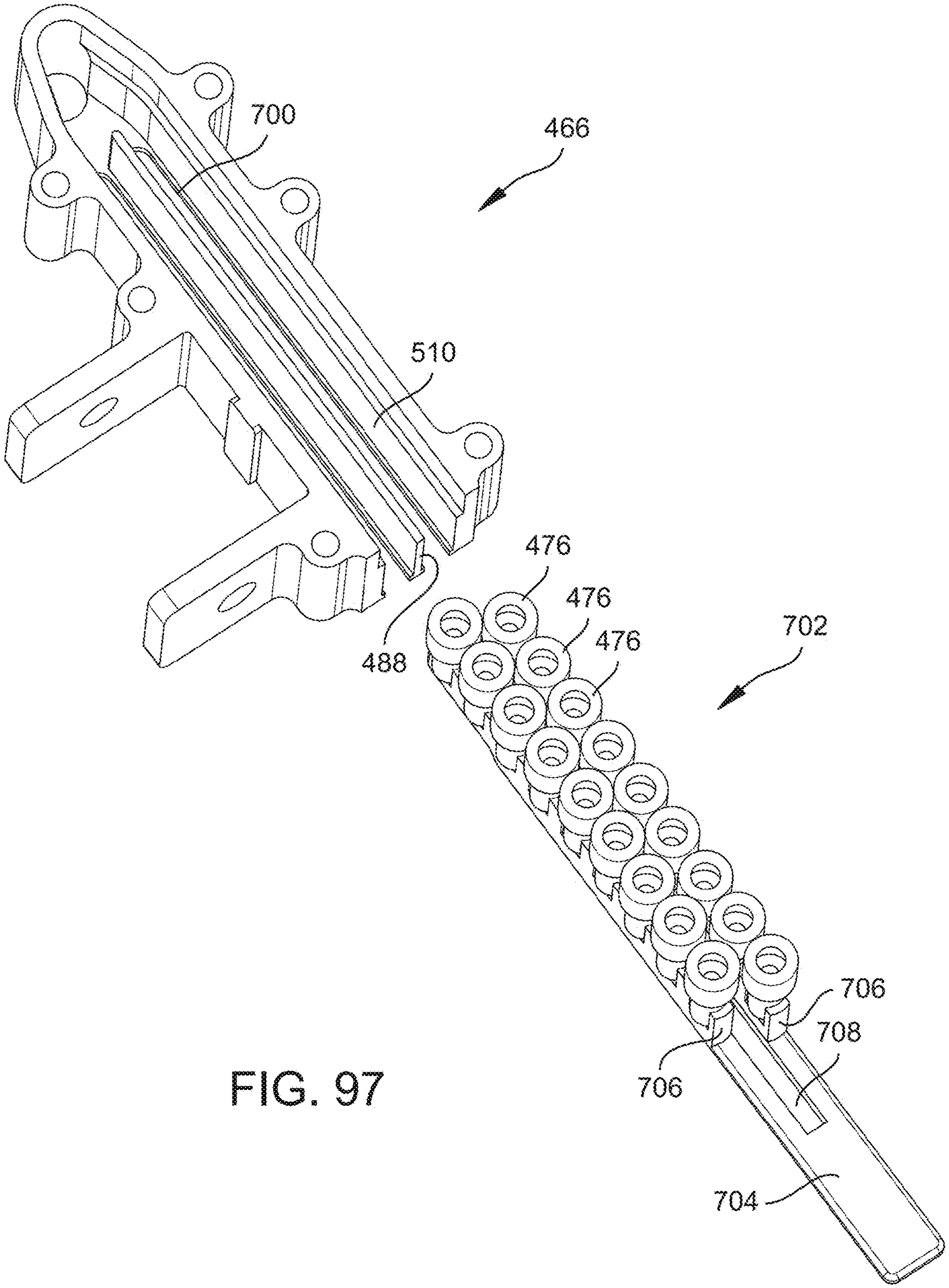
FIG. 97 depicts a perspective view of an example stopper dispenser and example speed loader.
Figure 98:
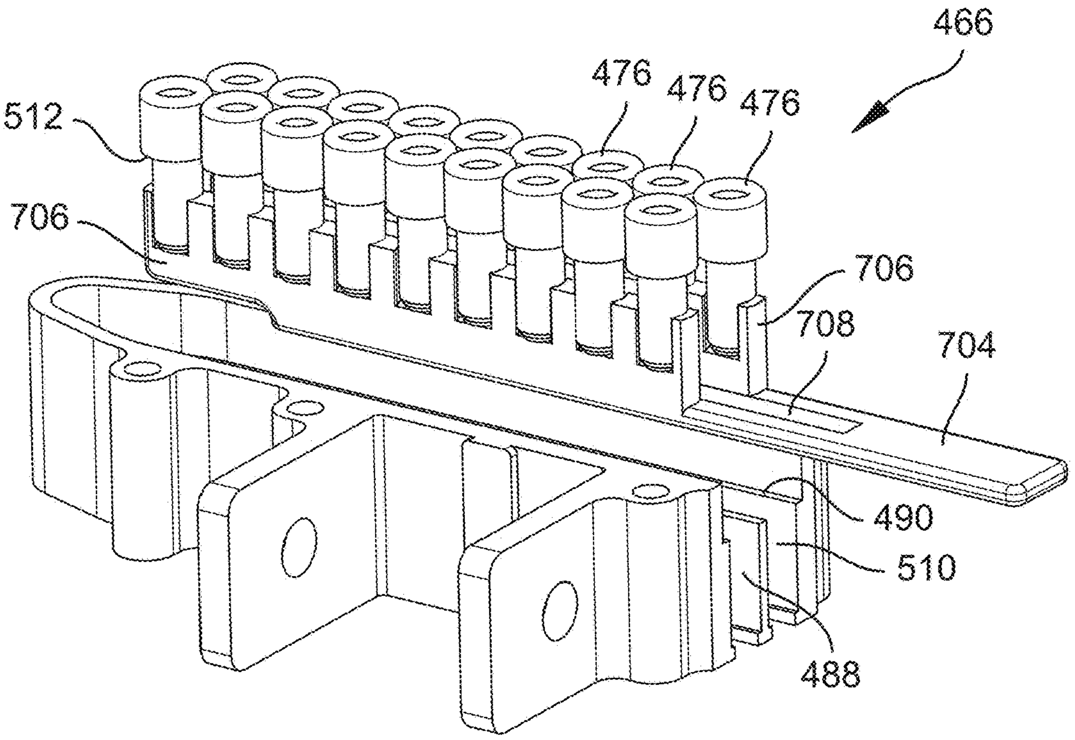
FIG. 98 depicts a perspective view of an example stopper dispenser and example speed loader.
Figure 99:
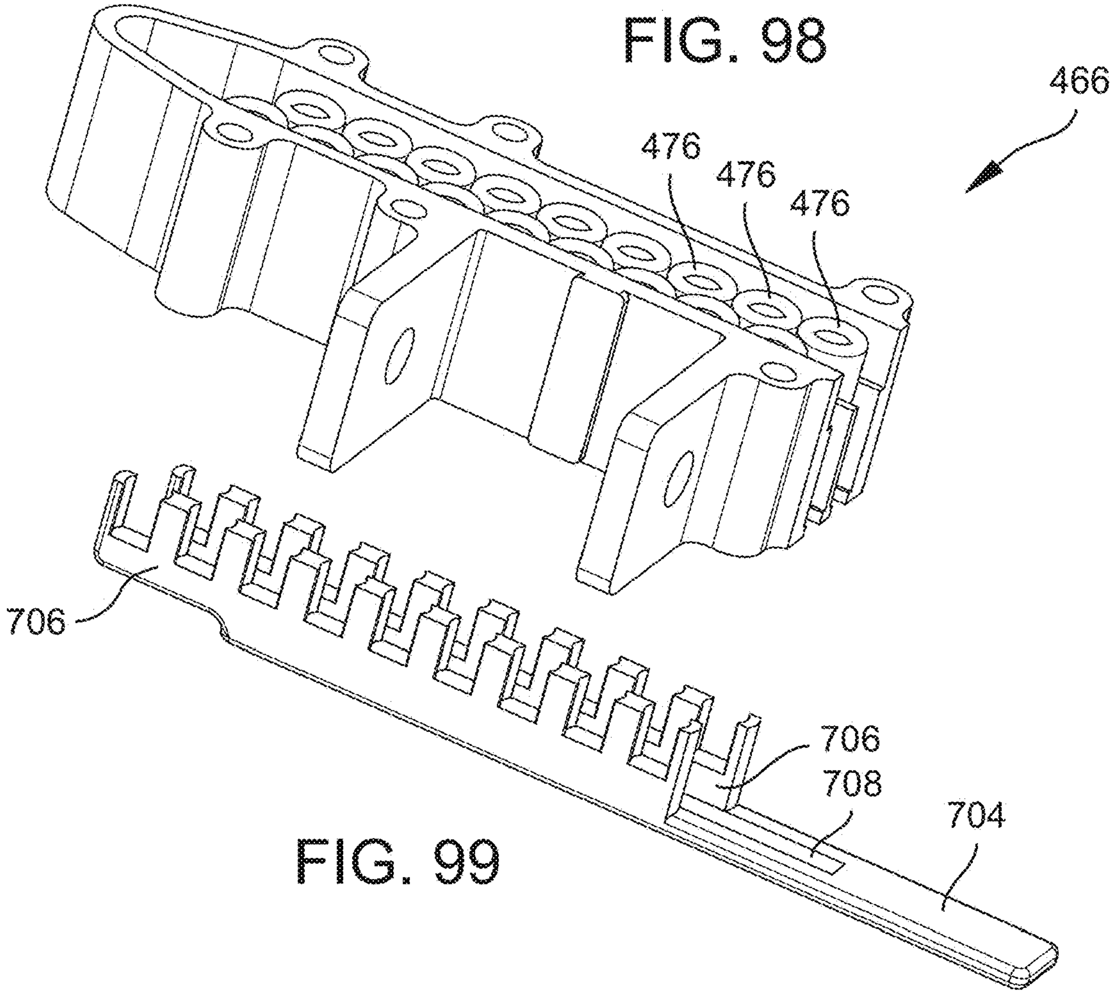
FIG. 99 depicts a perspective view of an example stopper dispenser which has been filled with stoppers by an example speed loader.

Referring now to FIGS. 97-99, yet another exemplary stopper magazine 466 is depicted. As shown, the stopper magazine 466 is similar to that shown in FIG. 74A, however, the stopper magazine 466 includes a slot 700 which extends through the bottom of each of the stopper troughs 510. These slots 700 may allow the stopper magazine 466 to be loaded with a speed loader 702. The speed loader 702 may include a plate 704 having stopper rack 706 which may hold a number of stoppers 476. The stopper rack 706 may define the spacing of the stoppers 476 on the speed loader 702. In the example embodiment, when stoppers 476 are placed into the stopper rack 706, the stoppers 476 may be arranged in a staggered double column type configuration appropriate for the stopper magazine 466. The speed loader 702 may be provided clean and sterile within an over pack. A user may maintain a stock of speed loaders 702 within the antechamber of the system 10 and the stopper magazine 466 may remain in place or may be integrated into the sealing station 358. As needed, speed loaders 702 may be opened and used to refill the stopper magazine 466 during bag 26 sealing operations.

Referring now primarily to FIGS. 98 and 99, to load stoppers 476 into the stopper magazine 466, the speed loader 702 may be positioned in alignment with an opening in the stopper magazine 466 and introduced into the stopper magazine 466. As in FIG. 74A, the magazine may include divider wall 488 which may separate and partially define each trough 510. The stopper magazine 466 may also include ridges 490 which flank each trough 510. The divider wall 488 and the ridges 490 may be at an even height with one another. The height may be selected such that a step region 512 on the stopper 476 where the stopper 476 may catch on the top face of the ridges 490 and dividing wall 488 so as to allow each stopper 476 to hang in its respective stopper trough 510. The plate 704 of the speed loader 702 may include a slit 708 which may allow the dividing wall 488 to pass through the plate 704 as the speed loader 702 is lowered. As the plate 704 is lowered, the top face of the ridges 490 and dividing wall 488 may begin to support the stoppers 476. At this point, the plate 704 may displace relative to the stoppers 476. The plate 704 may continue to be lowered until the stopper rack 706 portion of the plate 704 passes through the slots 700 in the stopper troughs 510 and the stoppers 476 are completely separated from the rack 706. The plate 704 may then be discarded and a follower assembly (e.g. follower assembly 470 of FIG. 72) may be displaced into contact with the stoppers 476 so as to allow stoppers 476 in the stopper magazine 466 to automatically advance as they are dispensed from the stopper magazine 466.

Figure 100:
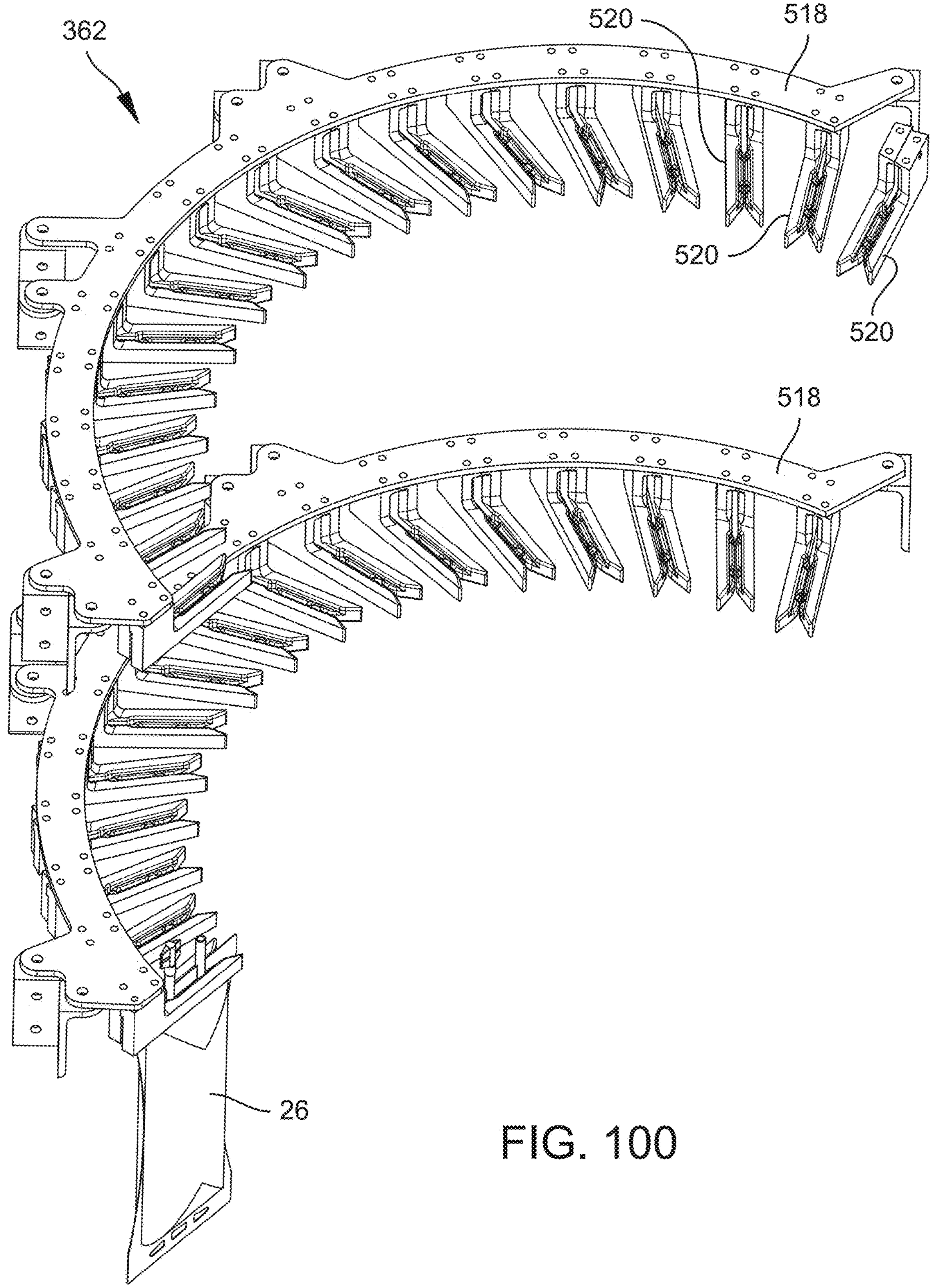
FIG. 100 depicts a perspective view of an example quarantine repository.

Referring now to FIG. 100, an exemplary quarantine repository 362 is depicted. As shown, a quarantine repository 362 may include a number of racks 518. In the example embodiment two racks 518 are shown. In other embodiments a greater number of racks 518 or only a single rack 518 may be included. Each rack 518 may include a number of holders 520 which may support a filled and sealed bag 26. Only one bag 26 is depicted in place on a holder 520 in FIG. 100. In the example embodiment, 17 holders 520 are included on each rack 518. Other embodiments may include less holders 520 on each rack 520 or may include a greater number of holders on each rack 520.

Figure 101:
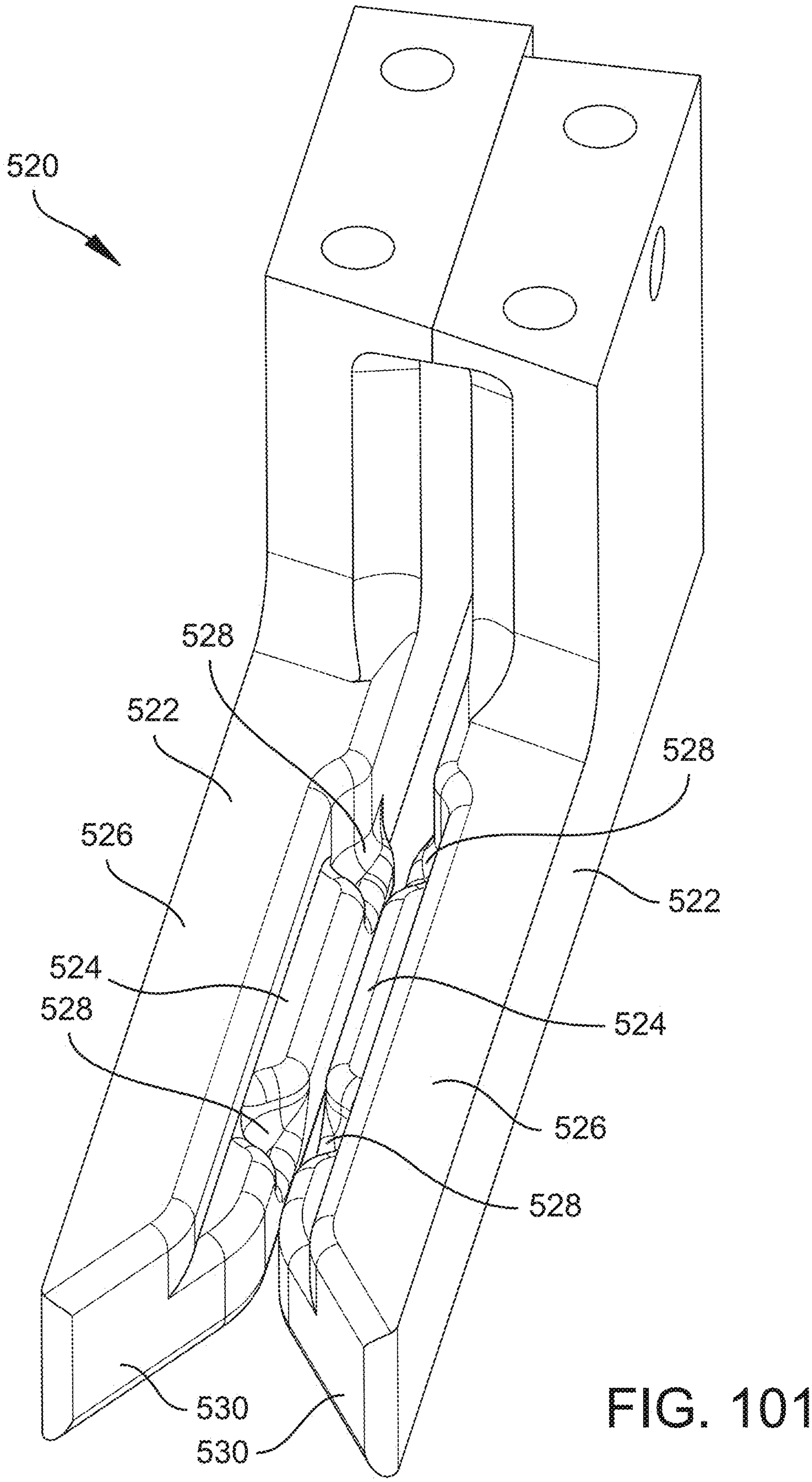
FIG. 101 depicts a perspective view of an example holder which may be included in a quarantine repository.

FIG. 101 depicts an example holder 520. The holder 520 may include a set of arms 522. Each of the arms 522 may substantially be a mirror image of the other. As shown, the arms 522 each include a ledge 524 which is recessed with respect to the top face 526 of that arm 522. As shown, each of the ledges 524 also includes a set of depressions 528. The depressions 528 may be spaced from one another a distance equivalent to the spacing of the ports 392 of the bags 26. Each arm 522 also includes a ramped face 530 at the terminus of the arm 522 most distal to the mounting portion of the arm 522 to the rack 518. The ramped faces 530 may act as a guide which helps direct the bag 26 into a small gap which may be present between each of the arms 522. The robotic arm 360 may advance a bag 26 to each of the holders 520. As the bag 26 is displaced into the holder 520, the two arms 522 may resiliently splay apart to aid in accepting the bag 26. The bag 26 may be guided into the holder 520 such that the ports 392 rest in the depressions 528 in each arm 522. As the ports 392 have a diameter which is larger than the gap between the arms 522, the bag 26 may be unable to slip through the holder 520. Thus, the two arms 522 may form a cradle for the bag 26. As shown, edges of the ledges 524 and depressions 528 may be rounded so as to prevent contact of the bag 26 with any sharp faces.

Figure 102:
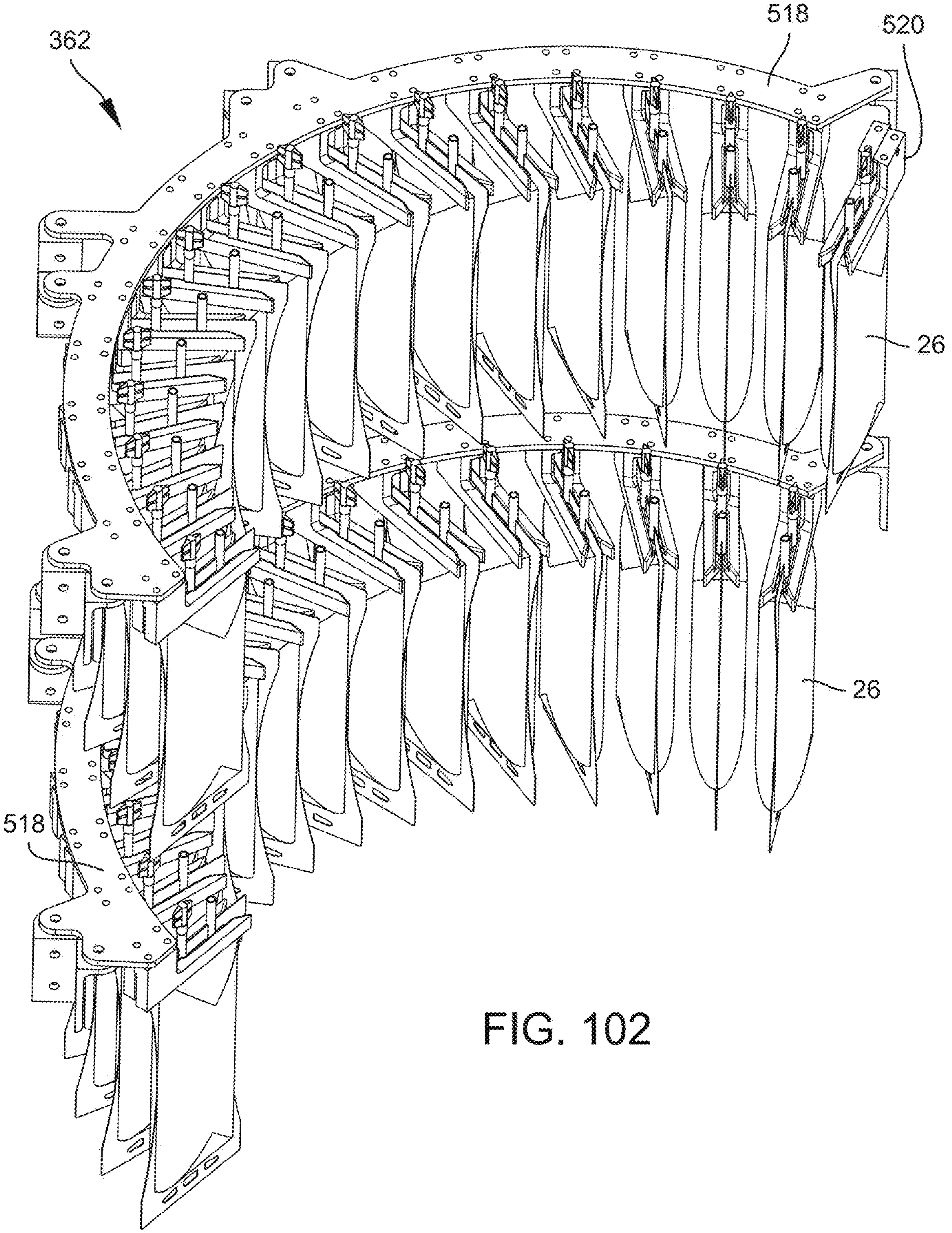
FIG. 102 depicts a perspective view of an example quarantine repository which has been filled to capacity with bags.

Referring now to FIG. 102, the quarantine repository 362 may be completely filled with bags 26 in certain embodiments. In other embodiments, the quarantine repository 362 may be stocked with bags 26 in a manner which depends on the type of bags 26 being used. For example, when bags 26 filled to greater than some predetermined volume are being generated, the control system 15 may command the robotic arm 360 to place bags 26 at every other holder 520. This may mitigate the potential for the quarantine repository to become overcrowded and make hanging of additional bags 26 problematic. Where bags 26 filled to a lesser volume than the predetermined volume are being generated, every holder 520 may be populated with a filled bag 26.

Figure 103:
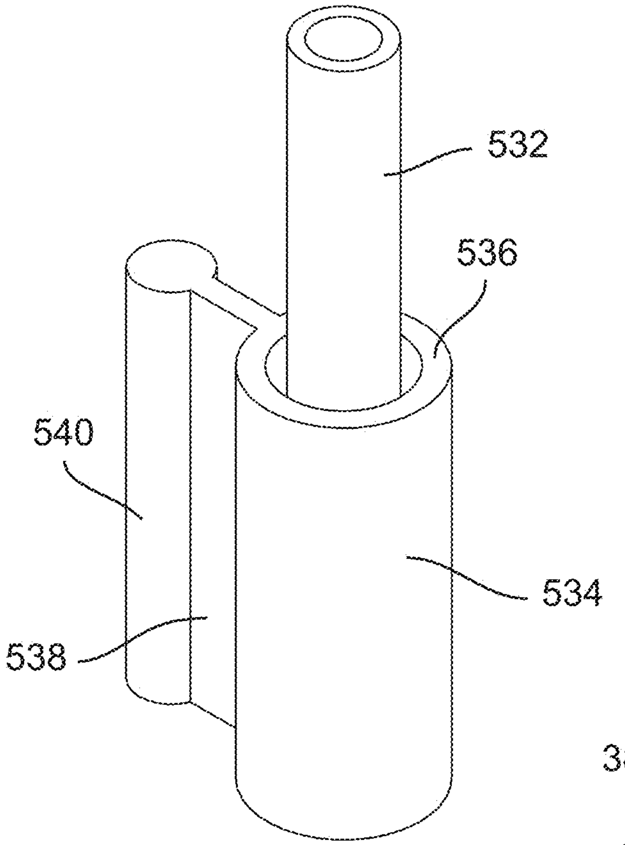
FIG. 103 depicts a perspective view of an example sampling fixture having a vial installed therein.
Figure 104:
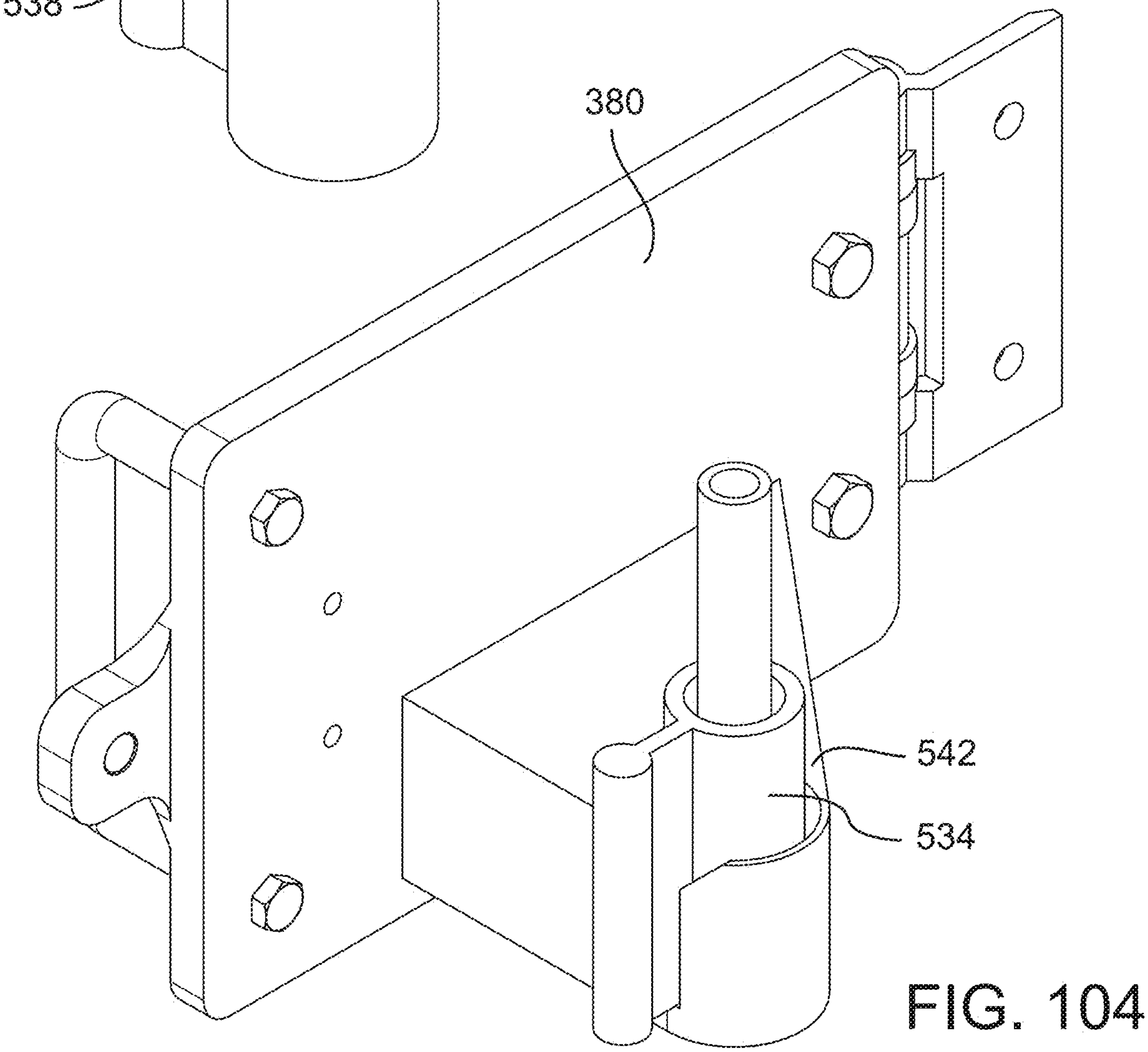
FIG. 104 depicts a perspective view of an example vial access door and example sampling fixture with a vial installed therein.

Referring now also to FIGS. 103 and 104, the bags 26 may remain in the quarantine repository 362 while one or more test is completed. In certain embodiments, a test which monitors for pyrogens may be conducted prior to release of the bags 26 from the quarantine repository 362. For example, the control system 15 may generate a notification on its user interface that a test is due. A user may place a vial 532 in a sampling fixture 534 which may then be passed into the second section 98 of the enclosure 12 via a vial access door 380. The vial 532 may be treated in a depyrogenation oven prior to use and may be provided in an over pack 60 which is only to be opened within the antechamber of the enclosure 12. The sampling fixture 534 may include a cupped portion 536 within which the vial 532 may be placed. To introduce the vial 532 into the second section 98 of the enclosure 12, the vial access door 380 may be opened such that the user may access a receptacle 542 attached to the side of the vial access door 380 which faces the second section 98 of the enclosure 12. The sampling fixture 534 may be docked into the receptacle 542 and the vial access door 380 may again be closed.

The sampling fixture 534 may have an offshoot 538 which includes an enlarged segment 540. The enlarged segment 540 may be shaped so as to mimic the dimensions of a port 392 of a bag 26. This may allow the grasper 418 on a robotic arm 360 to collect the sampling fixture 534 and displace it around the second section 98 of the enclosure 12. The robotic arm 360 may displace the sampling fixture 534 and vial 532 to the filling station 356 and the control system 15 may command an aliquot of fluid to be dispensed into the vial 532. The robotic arm 360 may then return the sampling fixture 534 and vial 532 to the receptacle 542 of the vial access door 380. The vial access door 380 may again be opened by the user and the vial 532 may be removed and installed in a pyrogen testing apparatus such as an endotoxin monitor.

Typically, the bags 26 may be held in the quarantine repository 362 until at least a first and second pyrogen test are completed and indicate a pyrogen content below a predefined amount (e.g. some predefined EU/mL threshold). The first pyrogen test may be a pyrogen test on a fluid sample collected before any bags 26 currently in the quarantine repository 362 had been filled. The second test may be a pyrogen test on a sample of fluid collected after all of the bags 26 in the quarantine repository 362 have been filled. In some embodiments, this second test may double as the first test for a next grouping of bags 26 to be filled by the system 10. In some embodiments, additional pyrogen testing may be conducted.

In alternative embodiments, a pyrogen test may be made after each rack 518 of the quarantine repository 362 is filled to capacity. This may be desirable as the pyrogen test may take some time (e.g. ~15 minutes) to complete. This may allow the system 10 to continue filling bags 26 as pyrogen testing is completed. One rack 518 may be tested while a second rack 518 is filled. By the time the second rack 518 is filled with bags 26, the pyrogen testing for the first rack 518 may have completed and the bags 26 may be ready for labeling and dispensing from the system 10. This may help to increase efficiency of the system 10 as there may not be a down time while the pyrogen test is completed where filling of bags 26 must be halted in order to free up space in the quarantine repository 362.

Figure 105:
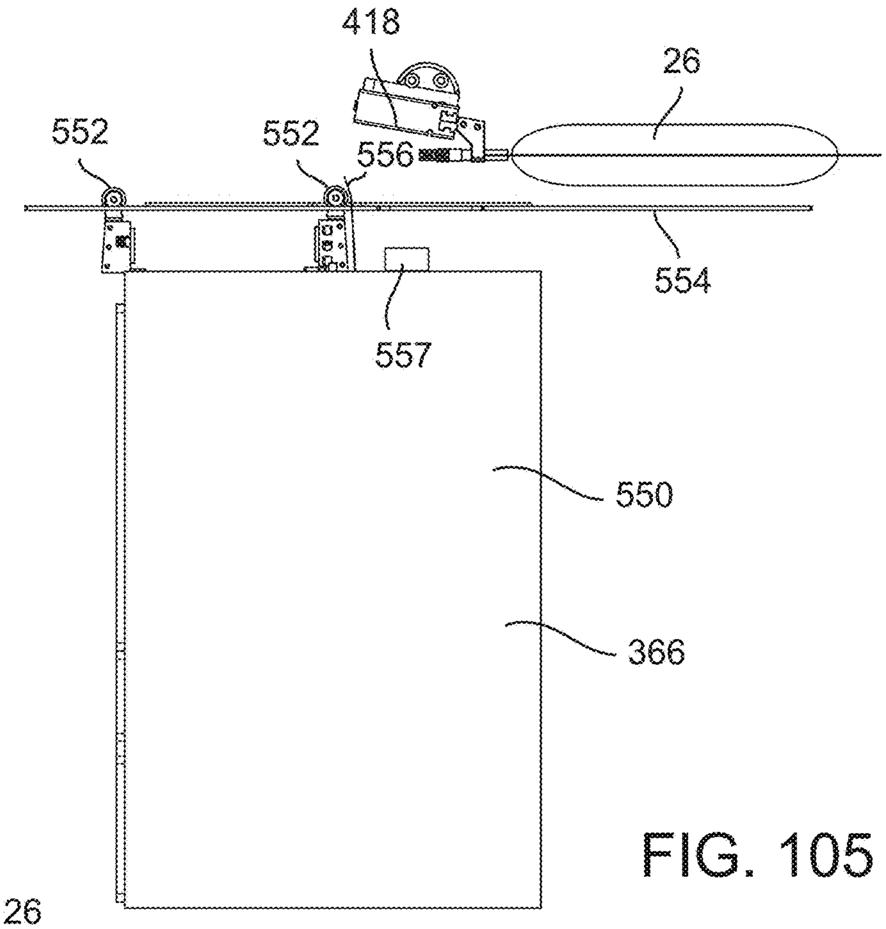
FIG. 105 depicts a side view of an example labeling assembly and a bag being displaced to the labeling assembly by a robotic grasper.
Figure 106:
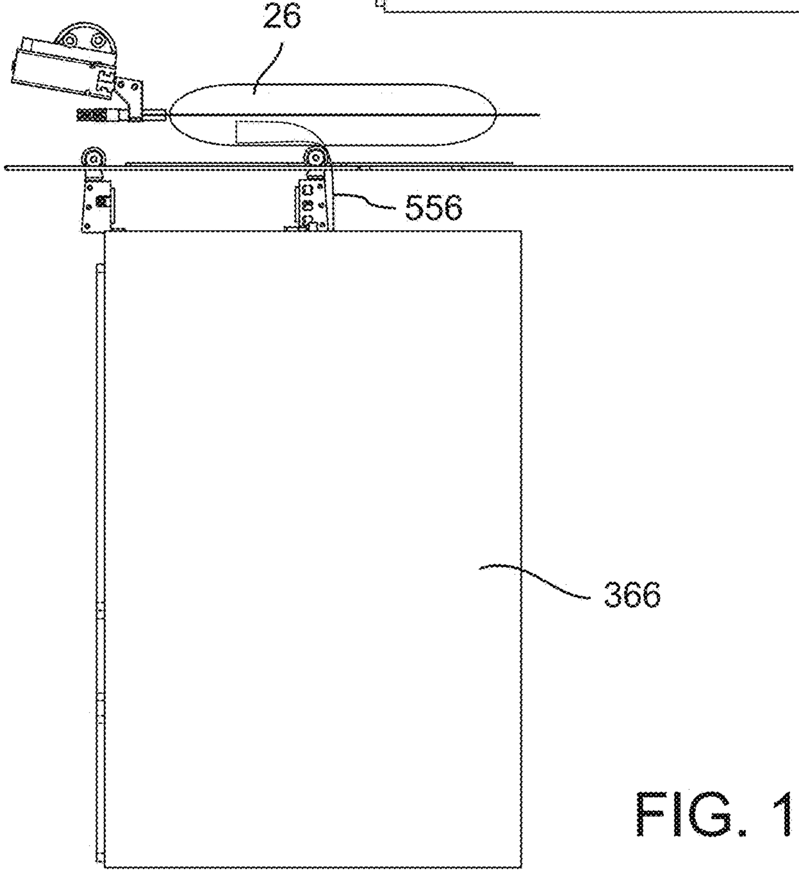
FIG. 106 depicts a side view of an example labeling assembly with a bag in the process of being labeled.
Figure 107:
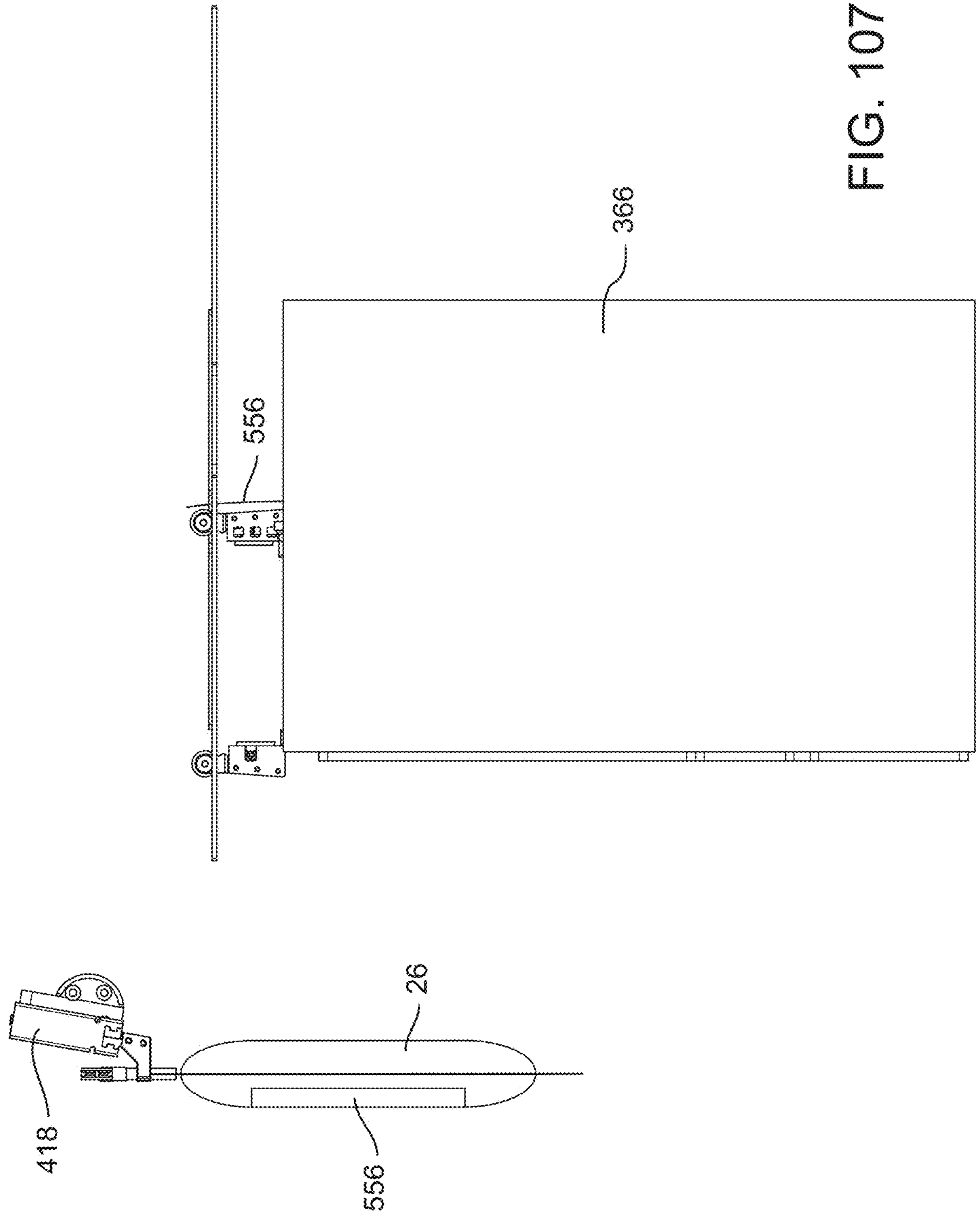
FIG. 107 depicts a side view of an example labeling assembly with a grasper holding a bag which has been labeled at the labeling assembly.

Referring now to FIGS. 105-107, before bags 26 are dispensed from the system 10, the bags 26 may be labeled. FIG. 105 depicts an example labeler 366. The labeler 366 may generate labels which may be adhered to each bag 26 by via adhesive. The labeler 366 may be a thermal transfer ribbon type labeler in certain embodiments. As shown, the labeler 366 may include a housing 550 which may enclose a supply of blank labels and the various printing components of the labeler 366. The labeler 366 may also include one or more roller 552. The robotic arm 360 (only the gripper 418 of the robotic arm 360 is shown in FIG. 105 for ease of illustration) may displace a bag 26 to the labeler 366 once, for example, a lot of bags 26 in the quarantine repository 362 have passed testing. The bag 26 may be pulled across a plate 554 including a feed slot through which a label 556 extends. The label 556 may adhere to the surface of the bag 26 and the bag 26 may be pulled across the rollers 552. The weight of the bag 26 and its contents may help to couple the label 556 securely to the bag 26 as the bag 26 displaces over the rollers 552.

A label sensor 557 (see FIG. 56) may be included to monitor for the presence of a label 556. The control system 15 may receive an output signal from the label sensor 557 and analyze the signal to determine whether a label 556 was applied to the bag 26. Additionally, the control system 15 may analyze the signal to ensure that a label 556 is present before displacing the bag 26 to the labeler 336 for application a label 556. Thus the control system 15 may analyze the label sensor 557 to determine whether a label supply in the labeler 366 is empty or an error state is present. The control system 15 may generate a label supply empty notification or labelling error based on data received from the label sensor 557

Figure 108:
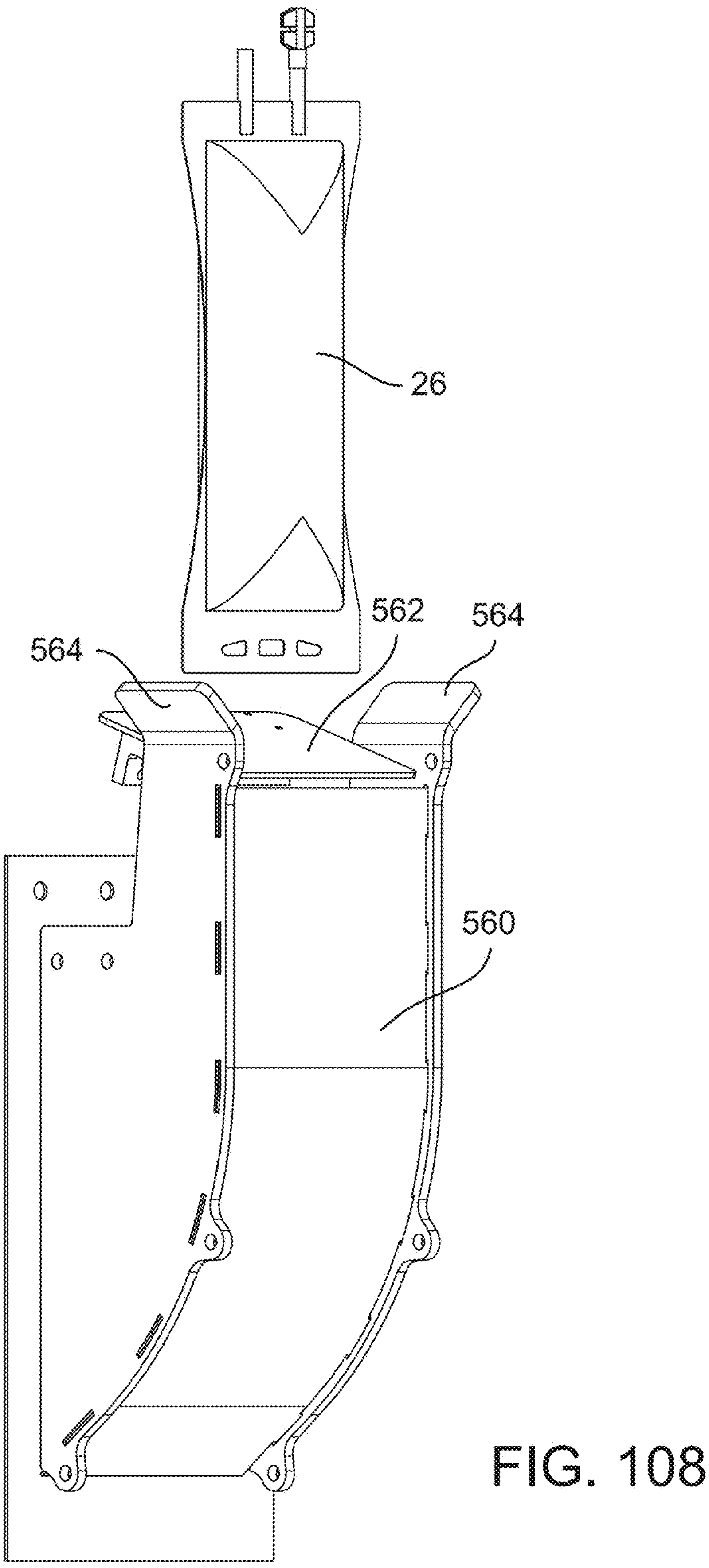
FIG. 108 depicts a perspective view of an example output chute which may be included in a system.
Figure 109:
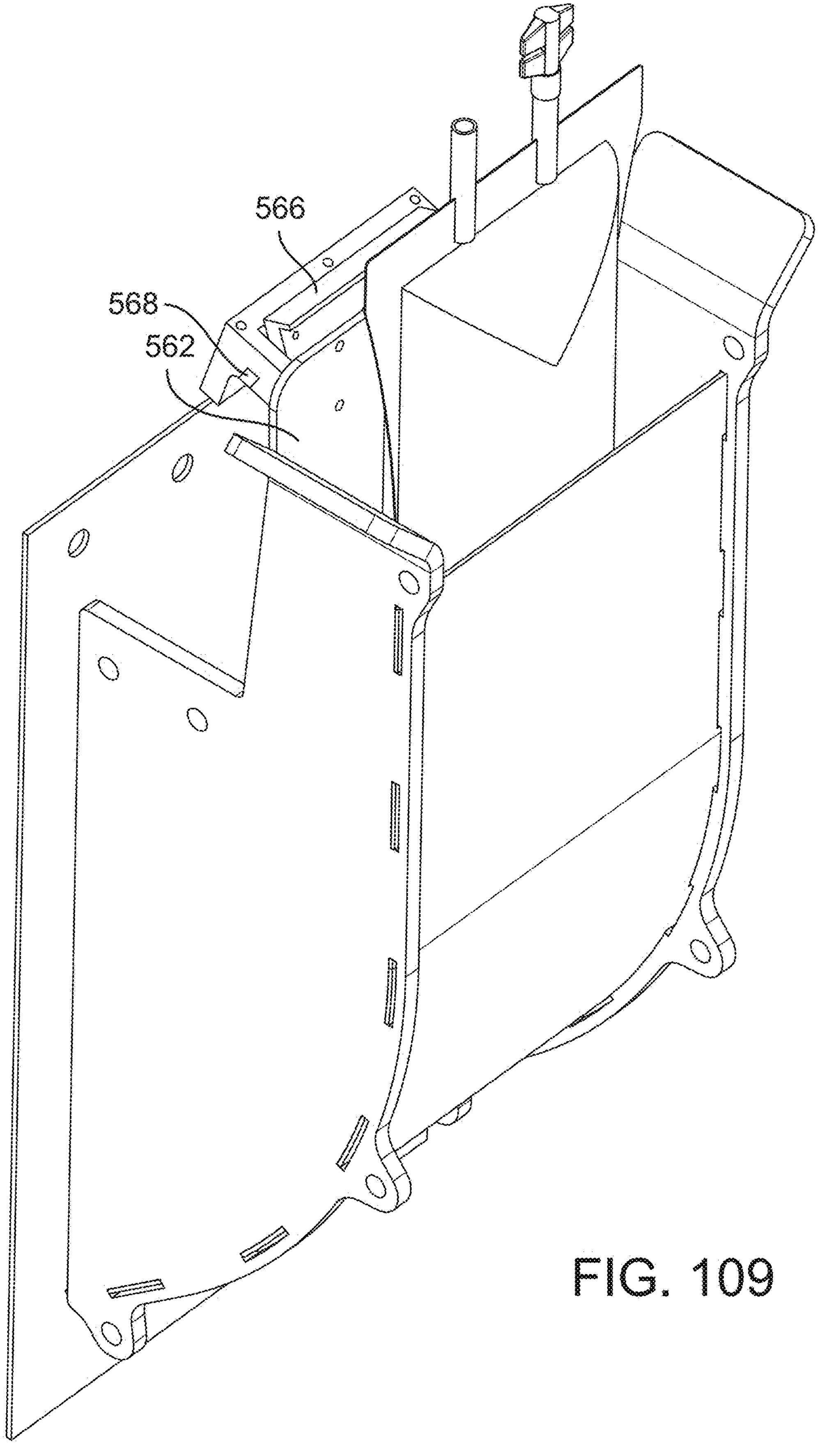
FIG. 109 depicts a perspective view of a bag being deposited in an example output chute.
Figure 110:
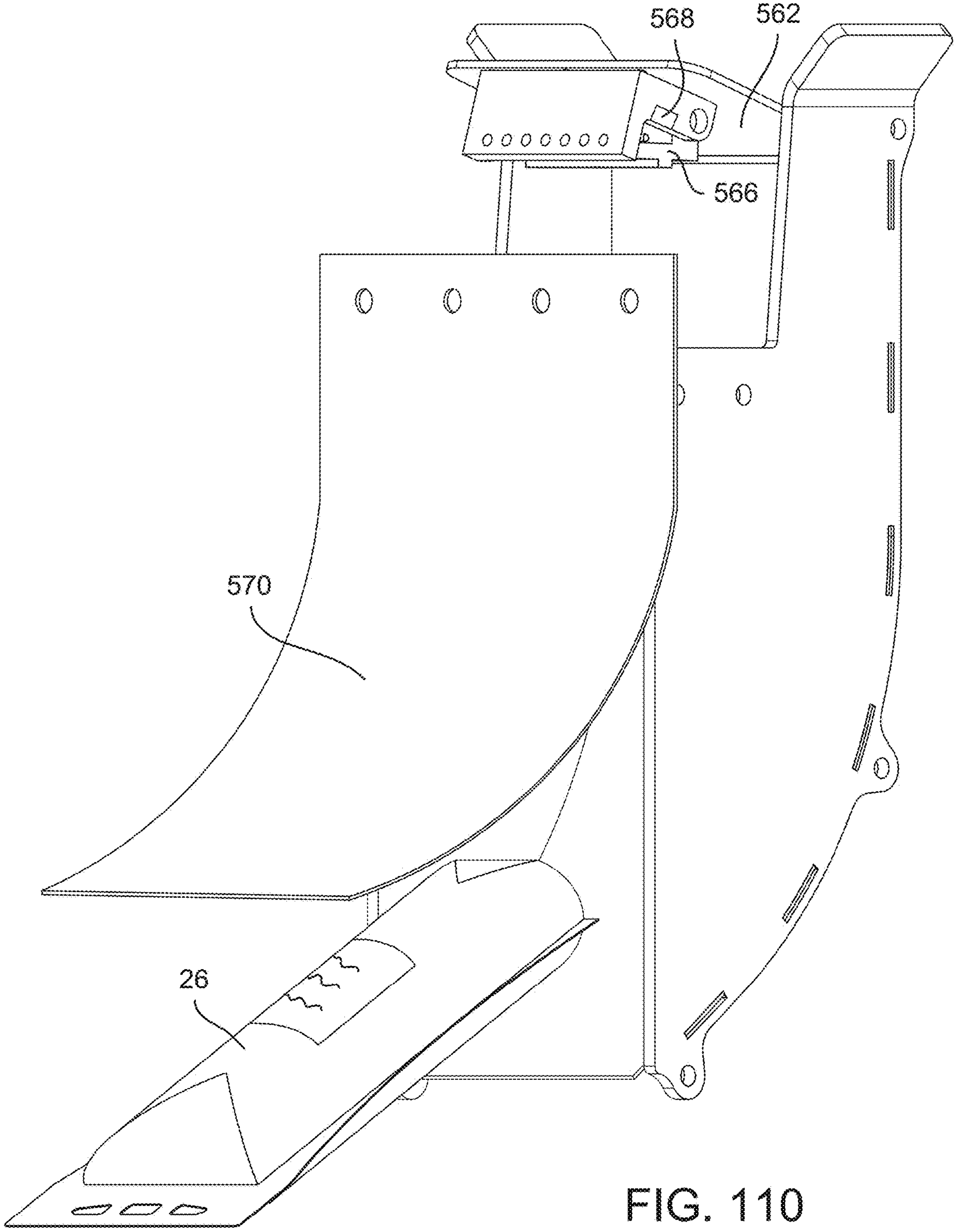
FIG. 110 depicts a perspective view of a bag exiting an example output chute.

Once labeled, and referring now to FIGS. 108-110, the robotic arm 360 may displace the bag 26 to an outlet of the enclosure 12. In the example shown in FIGS. 108-110 the outlet is shown as a chute 560. The chute 560 may include a top opening which is cover by a door flap 562. Additionally, the chute 560 may include funneling arms 564 which may help direct bags 26 into the chute 560 as they are dropped by the grasper 418 of the robotic arm 360. When bags 26 are dropped into the chute 560, the door flap 562 may be rotated out of the way by the weight of the bag 26. A bias member such as a torsion spring may be included to return the door flap 562 to a closed orientation. As best shown in FIGS. 109 and 110, the door flap 562 may be attached to a sensing projection. As the door flap 562 is displaced, the sensing projection 566 may displace so as to allow a door sensor 568 to pick up the movement of the door. Any suitable sensor may be used. For example, the door sensor 568 may be an optical sensor such as a beam interrupt sensor or reflection based sensor. The door sensor 568 may alternatively be a magnetic based sensor such as a hall effect sensor. The door flap 562 may include a magnet in such embodiments. A micro switch or button which is mechanically actuated by displacement of the sensing projection 566 as the door flap 562 is displaced may also be used in certain examples. An encoder may monitor displacement of the pivot pin on which the door flap 562 is mounted. Other types of sensing arrangements are also possible. As the bag 26 travels along the chute 560, the bag 26 may push open an exit flap 570 as it is delivered out of the enclosure 12. The exit flap 570 may be a rigid hinged door or may be a flexible piece of material as depicted in FIG. 110.

The control system 15 of the system 10 may monitor the door sensor 568 to ensure that the system 10 is operating as expected. For example, when the control system 15 commands the robotic arm 360 to release a bag 26 into the chute 560, the control system 15 may check to ensure that the door sensor 568 registers that the door flap 562 has opened. The control system 15 may also check to ensure that the door sensor 568 indicates that the door flap 562 has returned to a closed state. In the event that the door sensor 568 does not indicate that the door flap 562 has opened when a bag 26 is released, the control system 15 may generate a notification or alert on a user interface of the system 10. The control system 15 may also generate a notification in the event that the door flap 562 does not close. The notification may indicate to the user to check that there are no items blocking the exit flap 570 and causing bags 26 to back up in the chute 560 for example.

In the event that a bag 26 is deemed to be unacceptable, the bag 26 may be dispensed from the enclosure 12 without a label 556. For example, where the bag 26 is in the quarantine repository 362, the bag 26 may be retrieved from the quarantine repository 362 and dispensed unlabeled 556. During filling of the bag 26 at the filling station 356, when composition sensors indicate that the fluid filled into the bag 26 does not conform to a predefined target composition range, the bag 26 may be sealed and dispensed from the enclosure 12 outlet. No label 556 may be applied. In alternative embodiments, a label 556 may be generated from the bag 26 which conspicuously indicates that the bag 26 is not to be used. For example, a label 556 reading "NOT FOR HUMAN USE" or the like may be generated and applied to the bag 26 before dispensing.

Figure 111:
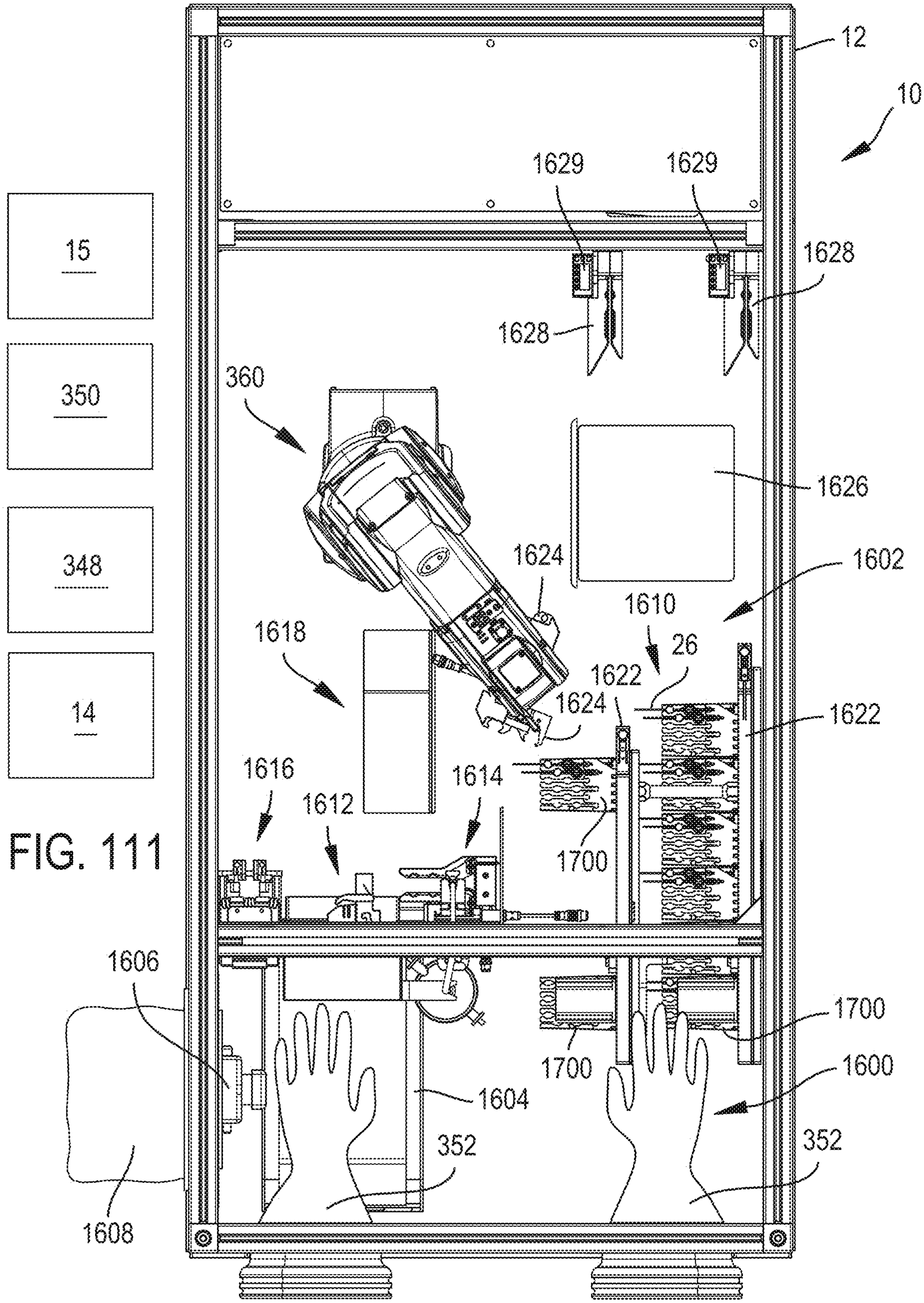
FIG. 111 depicts a top down view of another example system for producing and packaging medical fluids.

Referring now to FIG. 111, a top down view of another example system 10 for producing and packaging medical fluids is shown. The system 10 may include a medical water production device 14 such as any of those described herein. The system 10 may also include a mixing circuit 348 and a sensor suite 350 which may monitor the quality of purified water produced by the medical water production device 14 as well as mixed fluid generated in the mixing circuit 348. The sensor suite 350 may include any number of different types of water quality sensors. Any water quality sensors described herein may be included. The mixing circuit 348 and sensor suite 350 may be the example mixing circuit 348 and sensor suite 350 described in relation to FIG. 204 or FIG. 205.

The system 10 also includes an enclosure 12. The enclosure 12 may provide a clean room environment for the components of the system 10 contained therein. The enclosure 12 itself may also be contained within a clean room environment. In such embodiments, the enclosure 12 may be maintained at a higher clean room standard than the room in which it is located. In some embodiments, the enclosure 12 may be held at positive pressure by a blower system (not shown in FIG. 111, see, e.g., item 600 of FIG. 177). Various filters such as HEPA filters may be included to help ensure any air blown into the enclosure 12 to maintain positive pressure is clean.

The enclosure 12 may include an antechamber 1600. The antechamber 1600 may be constructed as a glove box and include at least one pair of glove interfaces 352. The glove interfaces 352 may provide a sterility barrier through which a user may manipulate various components of the system 10 within the enclosure 12. The antechamber 1600 may be utilized for preparing various consumables used by the system 10 and collecting and handling waste or spent consumables. Holders 1604 or various racks, shelving, hangers, compartments, and the like may be included in an antechamber 1600 to aid in organizing component stocks or retain waste produced by the system 10. Sampling ports in the fluid circuit may be accessible via the antechamber 1600 in certain examples.

An antechamber 1600 may include a transfer port 1606. The transfer port 1606 may be mounted in a side wall of a portion of the enclosure 12 which forms the antechamber 1600. The transfer port 1606 may be a sterile rapid transfer port which may allow for components to be provided into the enclosure 12 and removed from the enclosure 12 while maintaining environmental control of the enclosure 12. In certain examples, the rapid transfer port may be an alpha port which may interface with any of a variety of beta containers 1608 (rigid vessels, flexible bags, partially flexible containers). These containers may be pre-filled with consumables and sterilized. After connection to the alpha port, consumables may be removed from the beta containers 1608. The beta containers 1608 may then be filled with waste to allow for waste to be transferred out of the enclosure 12. Empty sterile beta containers 1608 may also be connected to an alpha port as needed to allow for removal of waste. A rapid transfer port may be used in other embodiments of systems 10 for producing and packaging medical fluids such as those described in relation to FIG. 56 or FIG. 177.

The enclosure 12 may also include a packaging section 1602. A packaging section 1602 may include a bag dispensing assembly 1610, a port opening station 1612, filling station 1614, sealing station 1616, and a labeling station 1618. Clips 1700 filled with bags 26 may be loaded into the bag dispensing assembly 1610 by a user via the gloved interfaces 352. Alternatively, as in other embodiments described herein, fill receiving sets 24 may be used in certain examples. In certain embodiments, and as shown in FIG. 111, a plurality of bag feeders 1622 may be included in the bag dispensing assembly 1610, though any embodiment described herein may alternatively be outfitted with only a single bag feeder 1622. Multiple bag feeders 1622 may allow for more bags 26 to be held in a bag dispensing assembly 1610. In some embodiments, each bag feeder 1622 may be stocked with different bag 26 types or bags 26 having different fill capacities. A robotic arm 360 including at least one grasper 1624 may collect a bag 26 from a clip 1620 of the bag dispensing assembly 1610 and displace the bag 26 to the port opening station 1612. The robotic arm 360 may, for example, be a 5 or 6 axis robotic arm though any suitable number of axes may be used. The bag 26 may be provided empty with each port of the bag 26 in a sealed state. One of the ports of the bag 26 may be cut open at the port opening station 1612 to provide a flow path into the interior volume of the bag 26.

Once opened, the bag 26 may then be moved to the filling station 1614 by the robotic arm 360. Fluid may be dispensed into the bag 26 at the filling station 1614. This fluid may be purified water such as WFI water, or a mixture of fluid generated at a mixing subsystem similar to those described in relation to FIGS. 2A-2B or FIG. 204 and FIG. 205. Bags 26 may also include a concentrate as described above in relation to FIGS. 5A-6 for example. From the filling station 1614, the robotic arm 360 may displace the filled bag 26 to a sealing station 1616. An access to the interior volume of the bag 26 may be sealed closed at the sealing station 1616 (e.g. via stoppering, RF welding, thermal welding, etc.). In certain examples and as shown in FIG. 111, the sealing station 1616 may include a tube sealing assembly 906 such as that shown and described in FIGS. 248-249. Where such a tube sealing assembly 906 is used, cutter inserts (see, e.g., FIG. 249) may not be included in the tube sealing assembly 906.

From the sealing station 1616, the bag 26 may be displaced to the labeling station 1618. The labeling station 1618 may print a label directly on the bag 26 or on a medium which may be adhered or otherwise affixed to the bag 26. The label may include information required by any relevant statues or regulations as well as identifying characteristics, tracking information (e.g. lot number), computer readable indicia, corresponding patient information, instructions for use, logos, etc. Bags 26 may then be expelled from the enclosure 12 through an output assembly 1626. The output assembly 1626 may include a slide or chute (see, e.g., FIG. 110) which may direct bags 26 out of the enclosure 12. In some embodiments, a conveyer may be included and may receive bags 26 dispensed by the output assembly 1626.

In some examples, the packaging section 1602 of the enclosure 12 may also include one or more bag retainer 1628. As fluid is packaged into bags 26, certain steps of the packaging process may take longer than others. For example, it may take a relatively long period of time to fill a bag 26 at the filling station 1614 particularly if the bag 26 has a large interior volume. Thus, it may be advantageous to fill a first bag 26 while a previously filled bag 26 is progressed through other stations in the packing section 1602. To optimize throughput, the robotic arm 360 may, for example, temporarily place the previously filled bag 26 in a bag retainer 1628 so that another bag 26 may be collected from the bag dispensing assembly 1610, opened at the port opening station 1612, and brought to the filling station 1614. The robotic arm 360 may then retrieve the previously filled bag 26 from the bag retainer 1628 and displace that bag 26 to at least one other station while the other bag 26 is being filled. Each bag retainer 1628 may be paired with at least one sensor 1629 which may monitor for the presence or absence of a bag 26 in the associated bag retainer 1628.

In certain embodiments, various sensing on fluid filled into the bags 26 may have a latency period which is in excess of the time required to fill the bag 26. For example, a TOC monitor 724 on a slip stream may take some time to update and the bag 26 may be completely filled prior to the control system 15 receiving the update. The bag 26 may be held in quarantine on a bag retainer 1628 until data from the sensor is received and the bag 26 is cleared for use. In the event that the data indicates that the bag 26 should be discarded, the bag 26 may be sealed and, for example, conspicuously labeled "NOT FOR HUMAN USE" or the like before being ejected from the enclosure 12.

Figure 112:
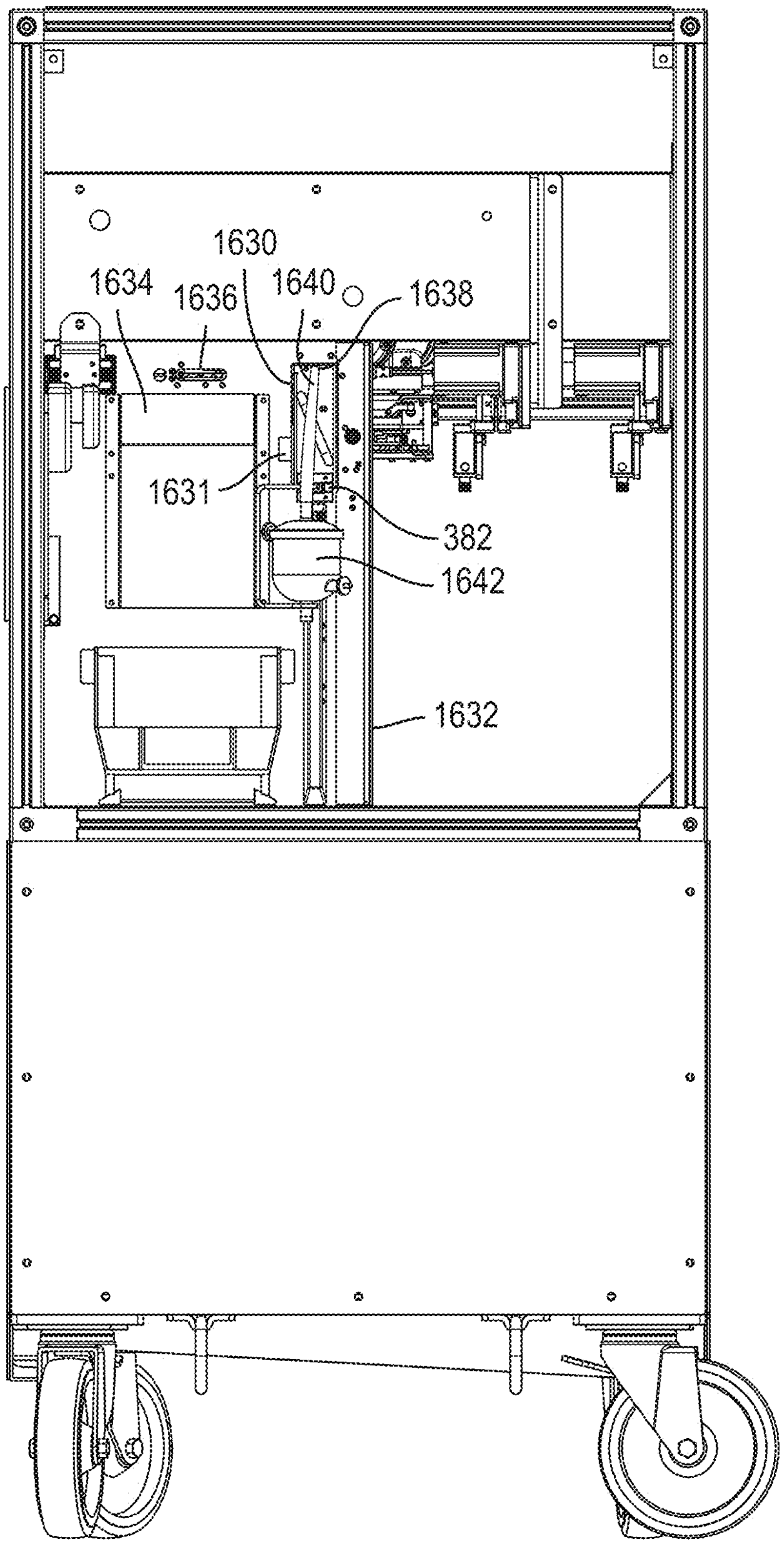
FIG. 112 depicts a side view of the system shown in FIG. 111.

Referring now to FIG. 112, a side view of the enclosure 12 depicted in FIG. 111 is shown. As shown, the side panel of the antechamber 1600 including the gloved interfaces 352 is removed to provide an unobstructed view of the interior of the antechamber 1600. A number of access openings from the antechamber 1600 to packing section 1602 of the enclosure 12 may be included. These access openings may include a fill station door 1630, a bag dispensing passage 1632, a waste chute 1634, and a cutting cartridge orifice 1636. The bag feeders 1622 may extend from the antechamber 1600 into the packaging section 1602 though the bag dispensing passage 1632. A loading end or antechamber end of each of the bag feeders 1622 may be disposed within the antechamber 1600. Clips 1700 filled with bags 26 (see, e.g. FIG. 111) may be loaded into the bag feeders 1622 via the glove interfaces 352 (see, e.g., FIG. 111) and passed into the packaging section 1602 of the enclosure 12 via the bag feeders 1622.

The fill station door 1630 may be opened to allow access to a fill nozzle 1910 (see, e.g., FIG. 167) of the system 10. The fill nozzle 1910 and/or the supply line 1640 attached thereto may be part of a fluid supply set which may be periodically replaced during use. A sterilizing filter 1642 (e.g. 0.2 micron filter) may be disposed on the supply line 1640 in various embodiments and may form part of the fluid supply set. The fluid supply set may be replaced every new lot of bags 26 filled by the system 10 in certain examples. Alternatively, the fluid supply set may be replaced when the lifetime of the sterilizing filter 1642 elapses.

The fluid supply set may provide a fluid communication path between a mixing circuit 348 of the system 10 and the interior of the enclosure 12. The fill station door 1630 may include clean room appropriate hinges 382. In certain embodiments, hinges 382 may be detent hinges which tend to hold the attached door 1630 in a prescribed position and resist inadvertent displacement therefrom. Such hinges may also assist the attached door 1630 in reaching the prescribed position once the door 1630 has been rotated to within a range of the prescribed position. For example, detent hinges which tend to hold the attached door 1630 closed may be used. The fill station door 1630 may also include a port 1638. The port 1638 may allow a supply line 1640 to be passed from the antechamber 1600 into the packaging section 1602 so that fluid may be provided to the fill nozzle 1910.

A fill station door sensor 1631 may also be included and may monitor the position of the door 1630. The door sensor 1631 may be any suitable type of sensor such as a magnetic sensor (the door 1630 may include a metal body), inductive sensor, microswitch, etc. The control system 15 may prevent operation of the robotic arm 360 in the event that the door 1630 is registered as open by the door sensor 1631. This may ensure that a user's hand is not extended through the door 1630 and in the potential path of a portion of the robotic arm 360. Additionally, the control system 15 may inhibit use of at least the fill station 1614. This may ensure that the door 1630 is always in a closed state when bags 26 are filled which may in turn ensure that the filling nozzle 1910 (see, e.g., FIG. 167) is in an expected position within the enclosure 12.

The waste chute 1634 may allow for waste generated in the packaging section 1602 to be quickly passed from the packaging section 1602 to the antechamber 1600. The robotic arm 360 (see, e.g., FIG. 111) may, for example, drop emptied clips 1700 (see, e.g., FIG. 111) into the waste chute 1634 after removing them from a bag feeder 1622. Additionally, pieces of bag 26 ports 1654 cut at the cutting station 1612 (see, e.g., FIG. 111) may fall into the waste chute 1634 such that they are directed into the antechamber 1600. A waste holder 1604 is shown in position under the waste chute 1634 in FIG. 112 to collect articles falling from the waste chute 1634.

The cutting station 1612 (see, e.g., FIG. 111) may accept a cutting cartridge 1800 (see, e.g., FIG. 159) which may be periodically replaced during use of the system 10. As bag 26 ports are cut at the cutting station 1612, the cutting element in the cutting cartridge may eventually dull. The cutting cartridge orifice 1636 may allow for cutting cartridges to be installed and removed from the cutting station 1612.

Figure 114:
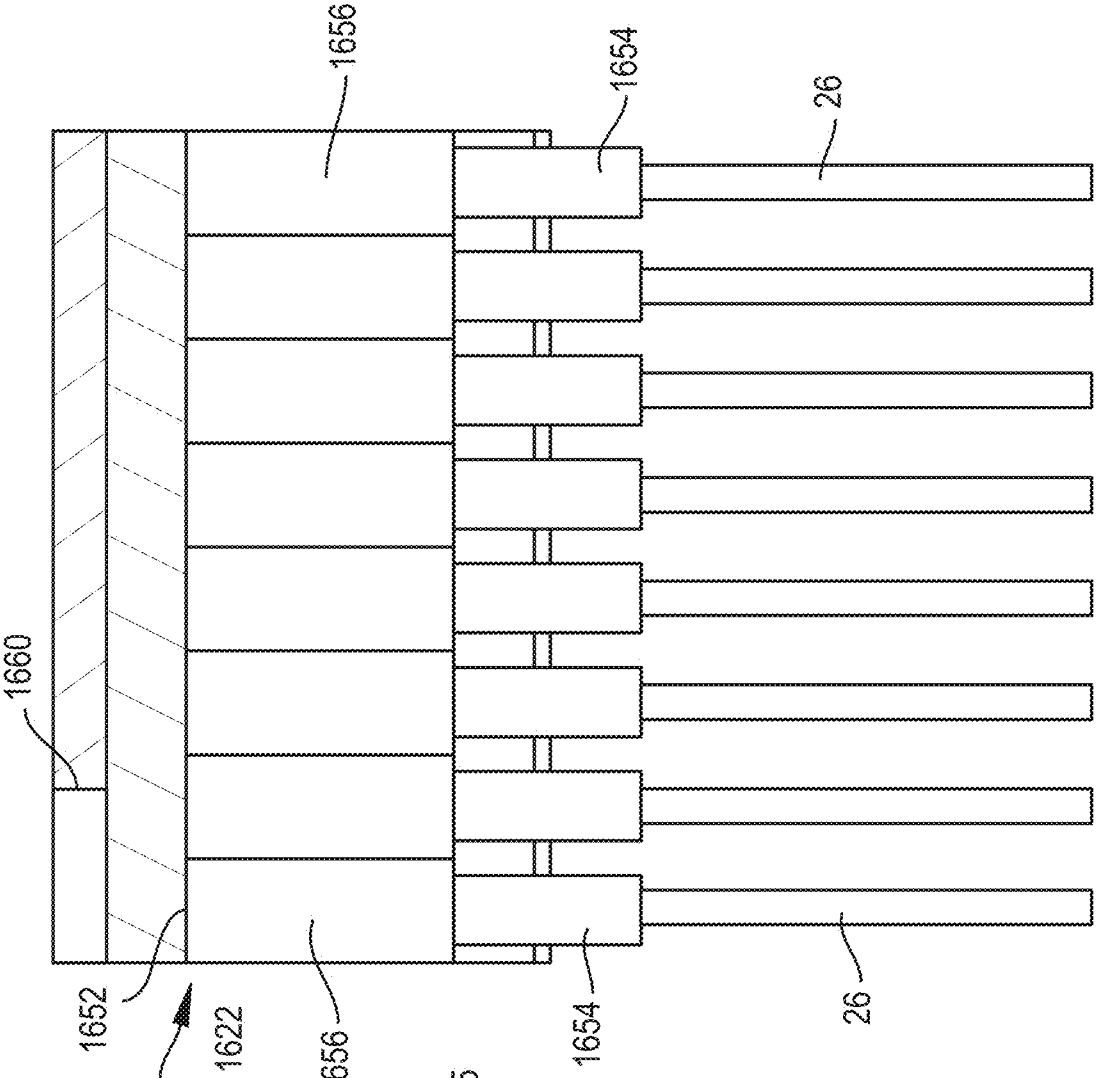
Figure 113:
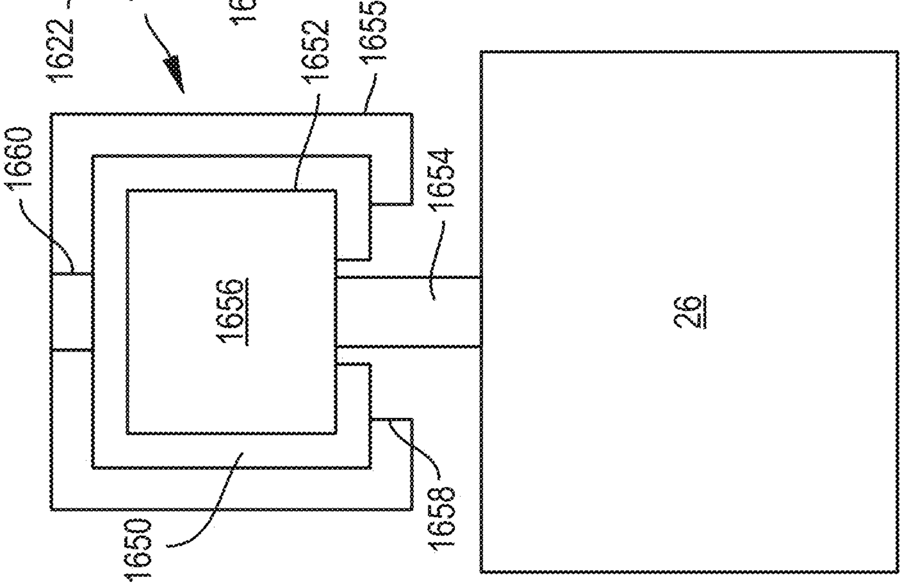

Referring now to FIGS. 113-114, views of an example bag feeder 1622 are shown. FIG. 113 depicts a front view of the example bag feeder 1622 while FIG. 114 depicts a side view of the example bag feeder 1622 with a portion of the bag feeder 1622 cut away. As shown, the example bag feeder 1622 may include a guide tube 1650. The guide tube 1650 may be provided filled with bags 26. The filled guide tube 1650 may be inserted into a housing 1655 and replaced when fully depleted of bags 26.

The guide tube 1650 may include an interior channel 1652. In bag feeders 1622 including guide tubes 1650, the interior channel 1652 may extend along at least a portion of the length of the guide tube 1650. In the example embodiment, the interior channel 1652 extends along the entire length of the guide tube 1650. Each bag 26 may include a number of ports 1654. At least one of the ports 1654 may include an enlarged section 1656. The interior channel 1652 may be sized to accept the enlarged section 1656. A passage 1658 may extend from an exterior face of the guide tube 1650 to the interior channel 1652. The passage 1658 may provide a slot though which the portion of the port 1654 connecting the body of the bag 26 to the enlarged portion 1656 of the port 1654 may extend. The passage 1658 may have a width larger than the portion of the port 1654 connecting the bag 26 to the enlarged portion 1656 of the port 1654, but smaller than the width dimension of the enlarged portion 1656. Thus, the enlarged portion 1656 may be unable to pass through the passage 1658 and the bag 26 may hang from the guide tube 1650. The length of the guide tube 1650 and interior channel 1652 may be selected such that the bag feeder 1622 may accommodate a desired number of bags 26. Though various examples of bag feeders 1622 shown herein may be depicted as having a certain bag 26 capacity, as would be understood by those skilled in the art, these embodiments may be modified to adjust the bag 26 capacity.

Figure 121:
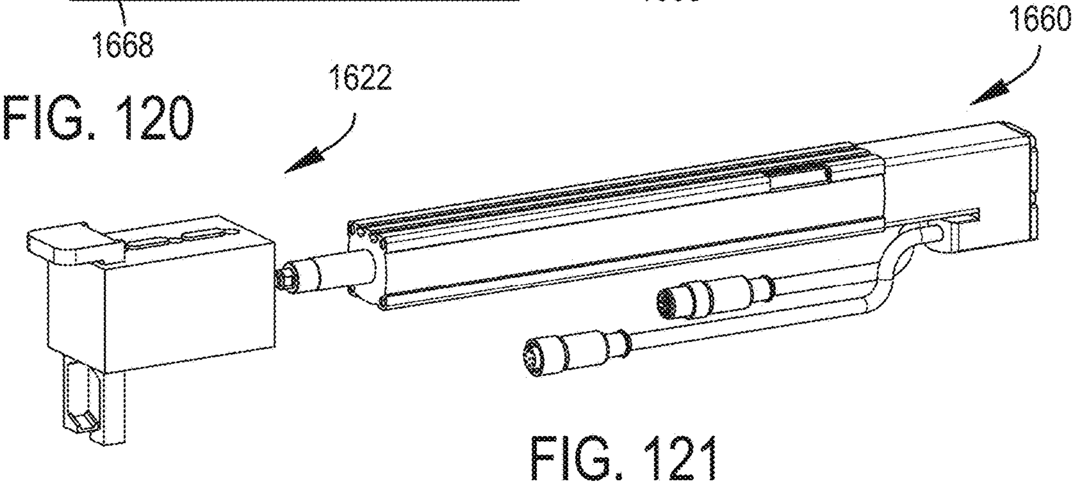

Still referring to FIGS. 113-114, a bag feeder 1622 may also include an advancement assembly 1660. The advancement assembly 1660 may displace the enlarged portions 1656 of the port 1654 along the interior channel 1652 of the guide tube 1650 to feed bags 26 toward an output of the bag feeder 1622. As a foremost bag 26 is removed from the bag feeder 1622, the advancement assembly 1660 may displace the enlarged portions 1656 of the ports 1654 such that the next bag 26 in the bag feeder 1622 is moved to the output of the bag feeder 1622. The advancement assembly 1660 may include, though is not limited to including, a spring biased follower assembly (see, e.g. feed plate 396 of FIG. 59) or an electromechanical actuator (see, e.g., FIG. 121).

Figure 115:
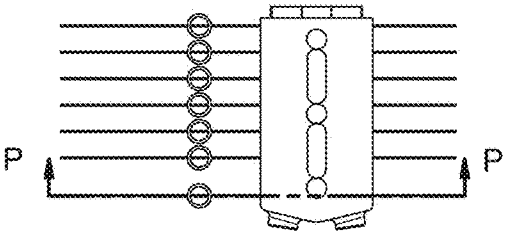
Figure 117:
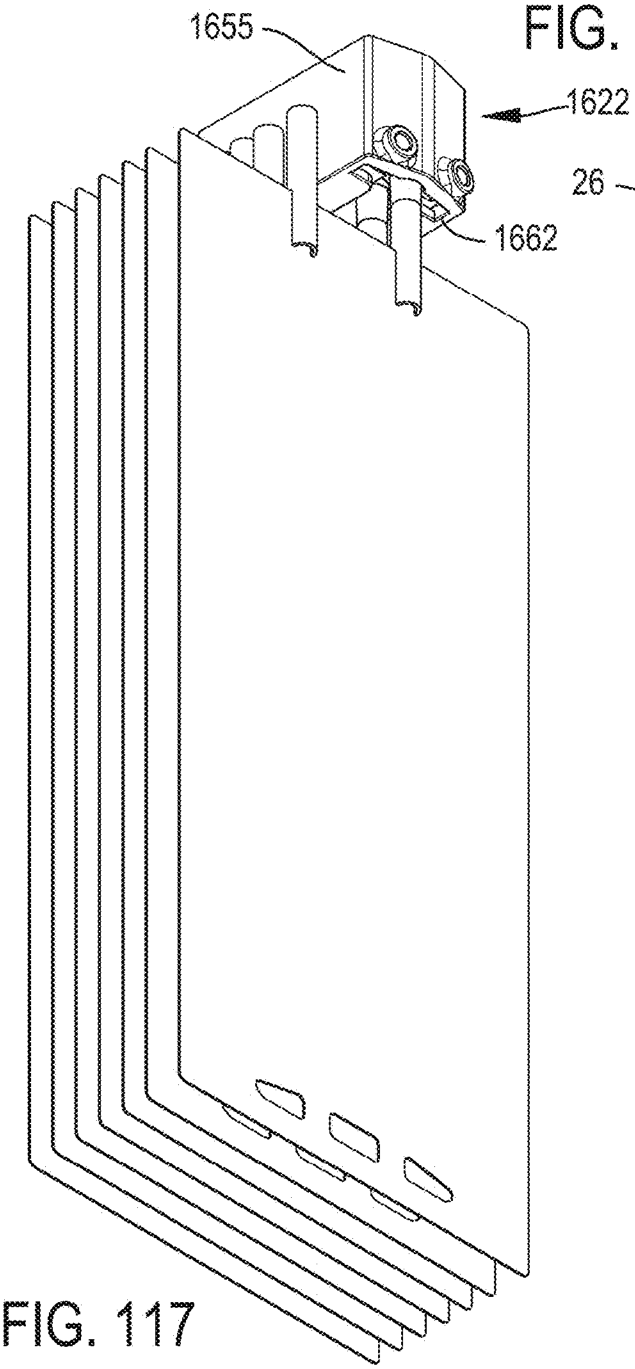
Figure 116:
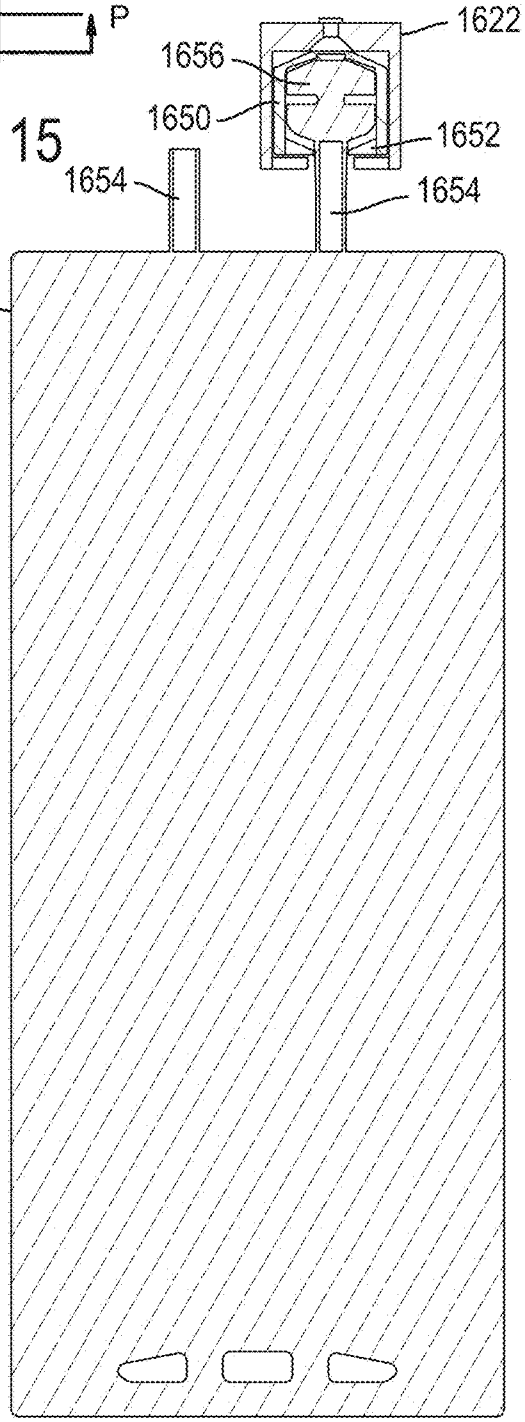
Figure 118:
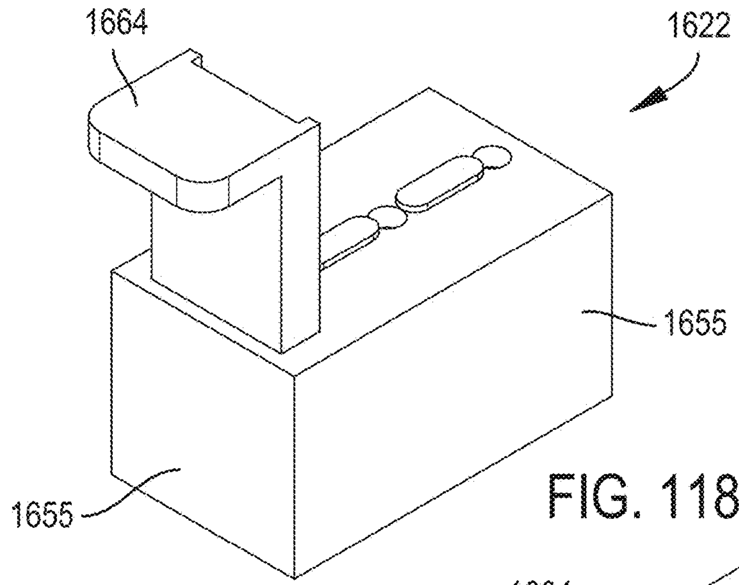
Figure 119:
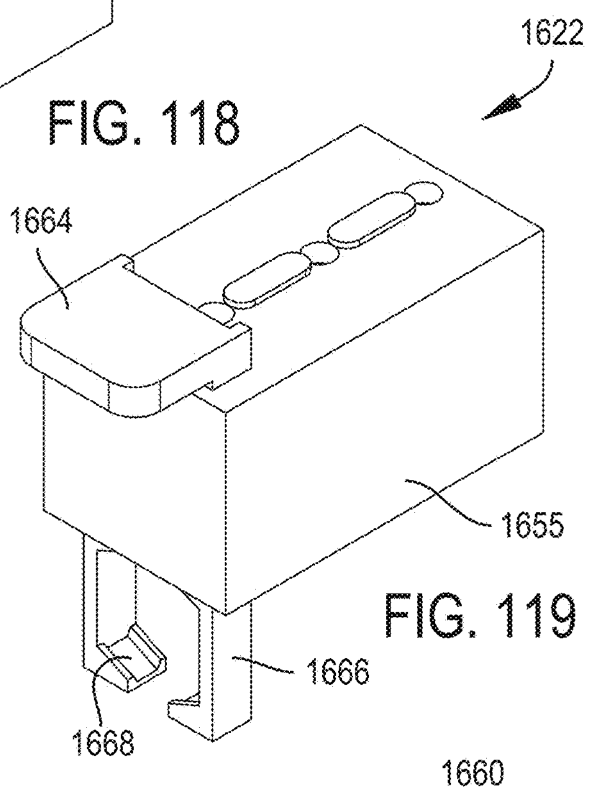
Figure 120:
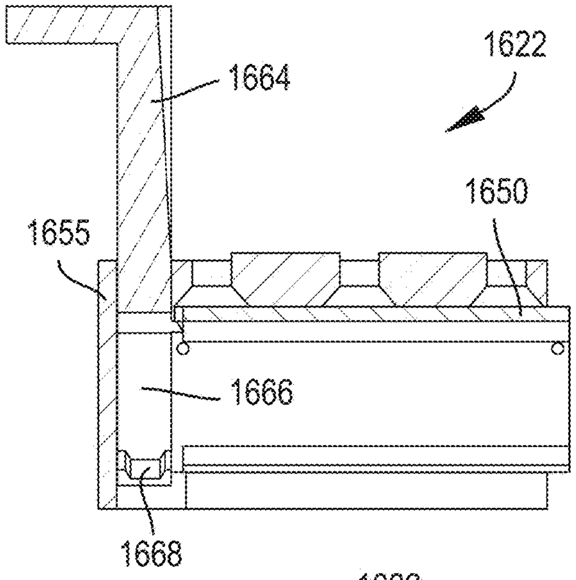

Bags 26 may be removed from the output of the bag feeder 1622 in a variety of ways. Referring now also to FIGS. 115-117, for example, the enlarged portion 1656 of a port 1654 at the output of the bag feeder 1622 may be frictionally retained in the bag feeder 1622. This may be due to a bias force exerted by an advancement assembly 1660 or via pressure exerted on the enlarged portions 1656 of the ports 1654 via an electromechanical actuator of an advancement assembly 1660. As shown best in FIG. 117, an output slot 1662 may be included in the bag feeder 1622. The output slot 1662 may extend from an exterior face of the guide tube 1650 to the interior channel 1652 and may be disposed at an angle (e.g. substantially perpendicular) with respect to the interior channel 1652. The housing 1655 may also include an opening in the area of the output slot 1662. A pulling force sufficient to overcome the friction holding the port 1654 in place at the output slot 1662 may be exerted on a portion of the bag 26 to displace the enlarged portion 1656 of the port 1654 through the slot 1656. This may free the bag 26 from the bag feeder 1622. The next bag 26 in the bag feeder 1622 may then be displaced to the output slot 1662 of the bag feeder 1622 via the advancement assembly 1660.

As shown in FIGS. 115-117, the bag feeder 1622 may include a housing 1655. In some embodiments, guide tubes 1650 may be provided pre-loaded with bags 26. Pre-loaded guide tubes 1650 may be introduced into an enclosure 12 (see, e.g., FIG. 111) of the system 10 via a rapid transfer port 1606 (see, e.g. FIG. 111). The pre-loaded guide tubes 1650 may be placed into the housing 1655 and bags 26 may be dispensed from the bag feeder 1622 until the guide tube 1650 is emptied. The empty guide tube 1650 may be removed from the housing 1655 and replaced by a new full guide tube 1650.

Referring now also to FIGS. 118-121, in other embodiments, a bag feeder 1622 may include an ejector 1664 disposed at the output of the bag feeder 1622. The ejector 1664 may have a displacement range from a channel aligned position (see, e.g. FIG. 118 and FIG. 120) to a presenting position (see, e.g., FIG. 119). Enlarged portions 1656 of ports 1654 advanced through a guide tube 1650 of a bag feeder 1622 may be displaced into a receptacle 1666 of the ejector 1664. When in the channel aligned position, the receptacle 1666 may be aligned with and form an extension of the interior channel 1652 of the guide tube 1650 (see FIG. 120). The receptacle 1666 may include a trough 1668 recessed into a portion of the receptacle 1666. A section (e.g. bottom edge) of an enlarged portion 1656 of a port 1654 may seat into the trough 1668 so as to loosely retain the enlarged portion 1656 in placed within the receptacle 1666. The ejector 1664 may then be actuated from the channel aligned position to the presenting position (see FIG. 119). This may, for example, be done by an electromechanical ejector actuator 1686 (see, e.g., FIG. 121). The bag 26 may be displaced along with the ejector 1664. In the presenting position, the entirety of the receptacle 1666 and thus the entirety of the enlarged portion 1656 of the port 1654 may be disposed below the housing 1655. To remove the bag 26 from the bag feeder 1622, the enlarged portion 1656 of the port 1654 may be lifted out of the trough 1668 and displaced out of the ejector 1664. Once removed, the ejector 1664 may be actuated back to the channel aligned position and an advancing assembly 1660 (shown in FIG. 121 as a linear electromechanical actuator) may be powered to drive a next enlarged portion 1656 of a port 1654 into the receptacle 1666.

In the example embodiment, the ejector 1664 shown in FIGS. 118-121 may be displaced in a direction parallel to the axis of the port 1654. Typically, this may result in the bag 26 being lowered out of the guide tube 1650. In other embodiments, the displacement direction of an ejector 1664 may differ. For example, in some embodiments, the ejector 1664 may displace in a direction other than parallel to the axis of the port 1654. The direction of ejector 1664 displacement may be informed based on spatial constraints within an enclosure 12.

Figure 122:
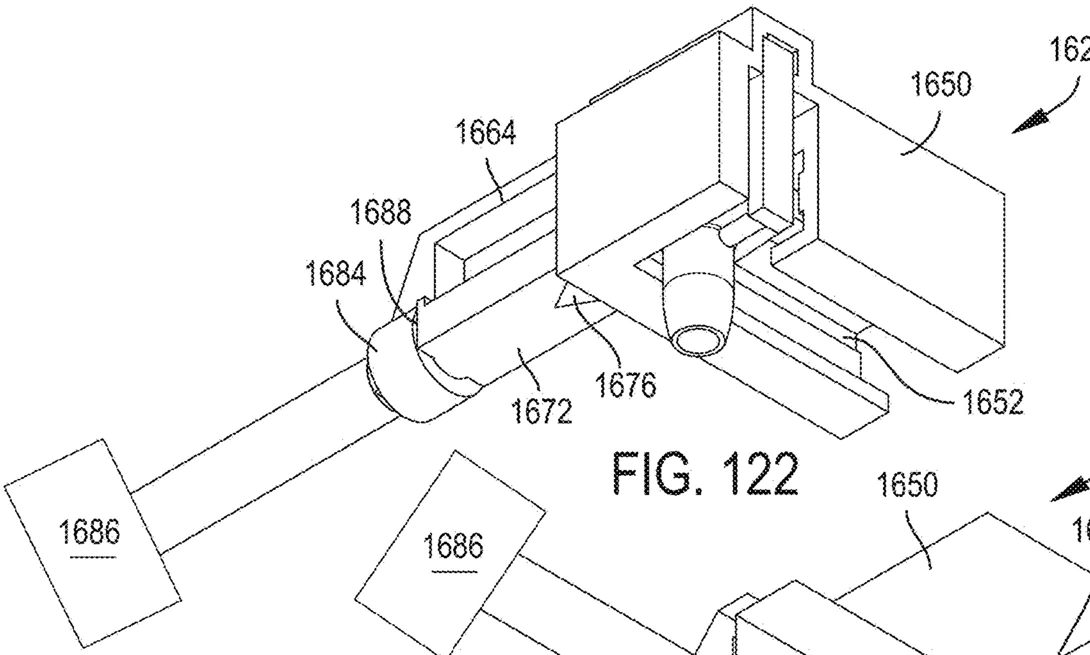
Figure 123:
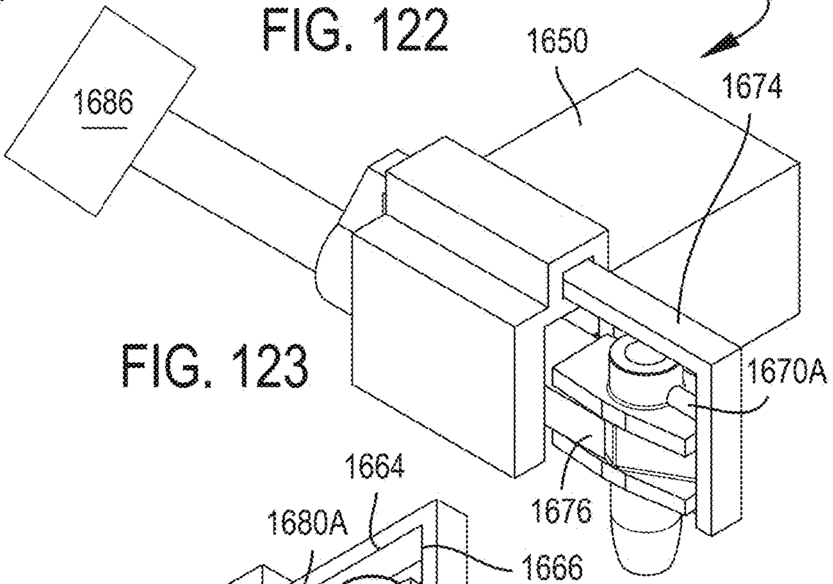
Figure 124:
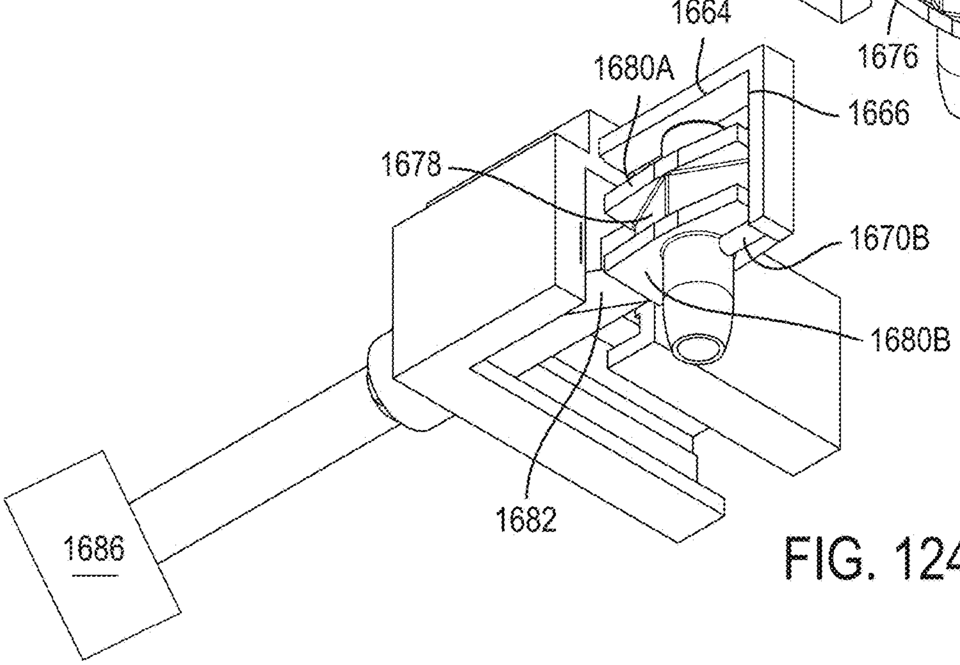

Another bag feeder 1622 including an ejector 1664 which displaces along a displacement range running perpendicular to the axis of the port 1654 is shown in FIGS. 122-124. In FIGS. 122-124, enlarged portions 1656 of ports 1654 (bag 26 and remainder of port 1654 not shown in FIGS. 122-124) may displace along an interior channel 1652 of a guide tube 1650 as described above. Upon reaching the ejector 1664, the enlarged portion 1656 of a port 1654 may enter a receptacle 1666 in the ejector 1664. Though shown as part of the guide tube 1650, in alternative embodiments, the ejector 1664 may be included as part of a housing 1655 within which a guide tube 1650 may be installed.

The receptacle 1666 may include first and second shelf members 1670A, B. When an enlarged portion 1656 enters the receptacle 1666 it may be disposed at least partially in between each of the shelf members 1670A, B. The ejector 1664 may then be actuated from a channel aligned position (see, e.g., FIG. 122) to a presenting position (see, e.g. FIG. 123). In the example embodiment, the ejector 1664 includes a ram element 1672 and a boom 1674 to which the receptacle 1666 is attached. The ram element 1672 may displace through a slide bearing 1684 of the boom 1674 via an actuator 1686. In a first stage of actuation, the ram element 1672 may be displaced into contact with the enlarged portion 1656 of the port 1654 disposed between the shelf members 1670A, B. In a second stage, the ram element 1672 may be further actuated and the boom 1674 may be displaced along with the enlarged portion 1656 of the port 1654 until the ejector 1664 has reached the presenting position (see FIG. 123). In the presenting position, the entirety of the receptacle 1666 and the enlarged portion 1656 of the port 1654 may be disposed external to the guide tube 1650.

In the example embodiment, the ram element 1672 includes a head 1676 which may mate with and capture a region of the enlarged portion 1656 of a port 1654. In the example embodiment, the enlarged portion 1656 includes two opposing end panels 1680 A, B which overhang a wedge shaped wall 1678 disposed between the two end panels 1680A, B. The head 1676 of the ram element 1672 includes a notch 1682 in the shape of the Latin character "V". The wedge shaped wall 1678 may seat into the notch 1682 as the ram element 1672 is actuated and the end panels 1680A, B may prevent movement of the enlarged portion 1656 of the port 1654 along the axis of the port 1654. Other male and female mating geometries for the enlarged portion 1656 of the port 1654 and the head 1676 of the ram element 1676 may respectively be used in alternatively examples.

Once the ejector 1664 is in the presenting position, the bag 26 may be grasped (e.g. by a robotic grasper) and the ram element 1672 may be displaced in a reverse direction (see, e.g. FIG. 124). This may free the enlarged portion 1656 of the port 1654 from the head 1676 of the ram element 1672 and allow the bag 26 to be removed from the bag feeder 1622. Displacement of the ejector 1664 back to the channel aligned position may be a two stage process. In a first stage, the ram element 1672 may be further retracted until a wall 1688 of the ram element 1672 abuts against the slide bearing 1684 of the boom 1674. In the second stage, the ram element 1672 may continue to be retracted and the wall 1688 may push against the slide bearing 1684 to drive the boom 1674 in tandem with the ram element 1672. Retraction of the ram element 1672 may halt when the ejector 1664 has been returned to the channel aligned position.

Figure 125:
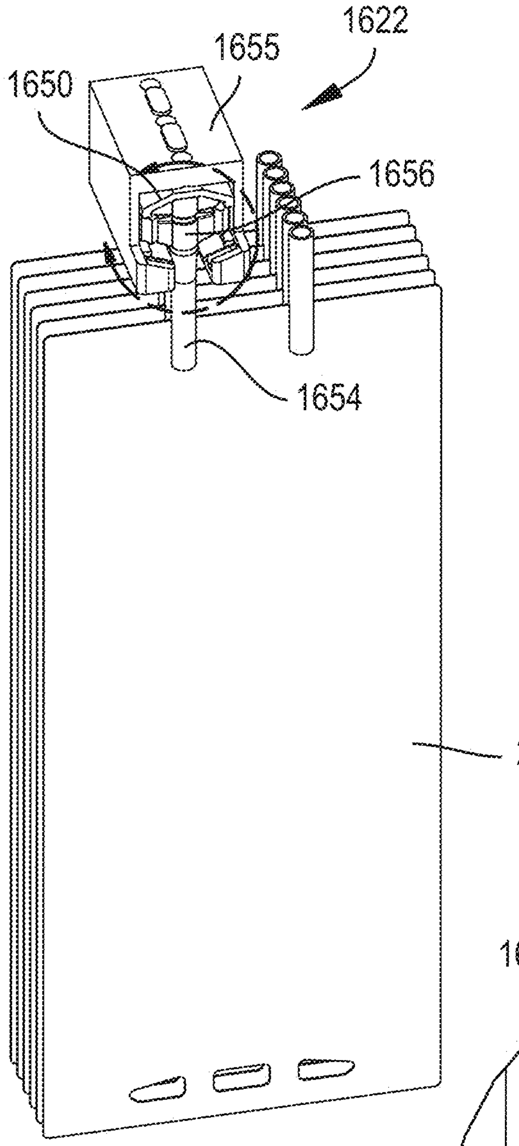
Figure 126:
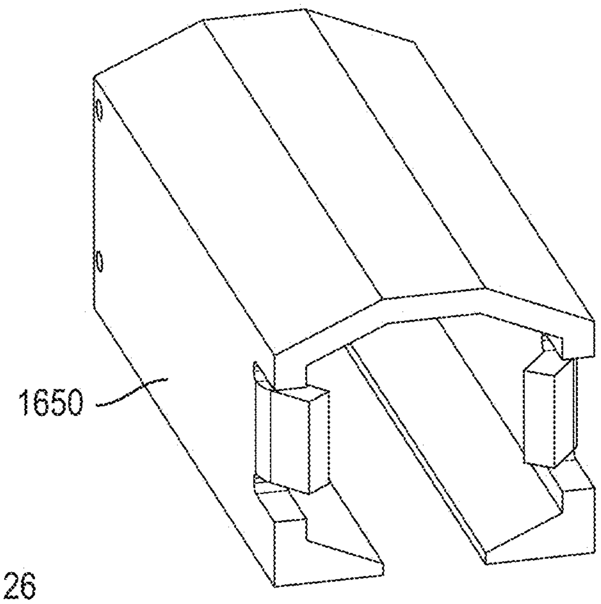
Figure 127:
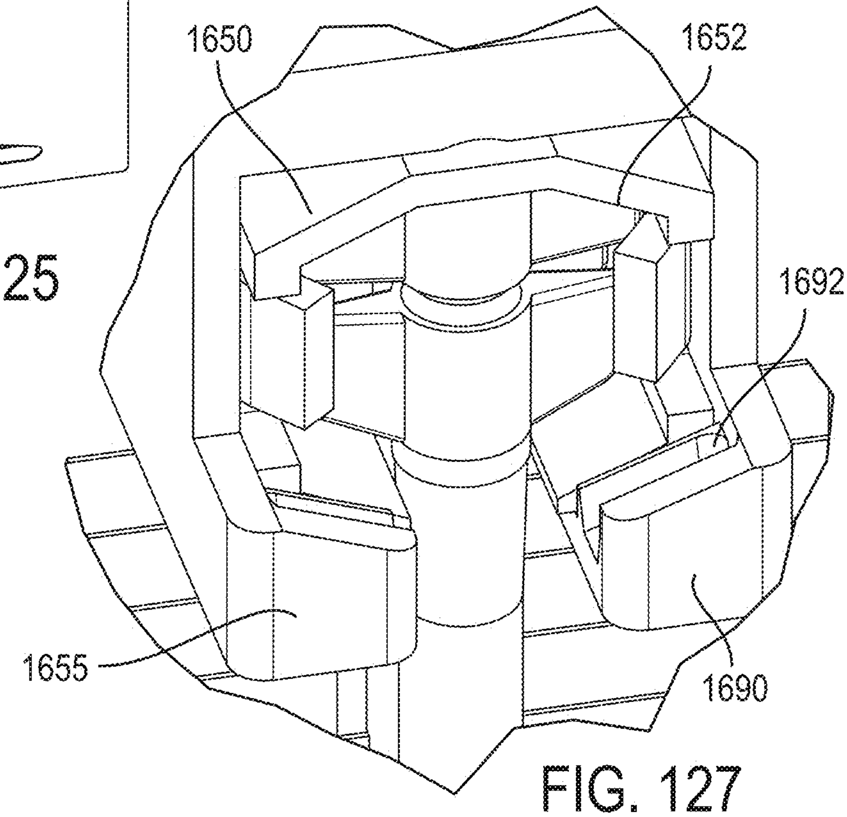

Still another embodiment of a bag feeder 1622 is shown in FIGS. 125-127. As with other exemplary bag feeders 1622 described above, the bag feeder 1622 may include a guide tube 1650. In the example shown in FIGS. 125-127, the guide tube 1650 may be disposed within a housing 1655 which surrounds at least a portion of the guide tube 1650. The guide tube 1650 may include an interior channel 1652 through which enlarged portions 1656 of ports 1654 may be advanced by an advancement assembly 1660 (see, e.g., FIG. 121). The guide tube 1650 may include two cantilevered retention projections 1694 which may extend into the interior channel 1652 from the wall of the guide tube 1650. The cantilevered projections 1694 in the example embodiment are disposed in opposition to one another and extend toward one another from the wall of the guide tube 1650. The cantilevered projections 1694 may obstruct passage of enlarged portions 1656 of ports 1654 when the enlarged portions 1656 are advanced within the interior channel 1652 to the location of the cantilevered projections 1694. Powering of an advancement assembly 1660 (see, e.g., FIG. 121) may exert a force on enlarged portions 1656 of ports 1654 within the interior channel 1652. This force may press the enlarged portion 1656 most proximal to the cantilevered projections 1694 against the cantilevered projections 1694. When the force reaches a threshold, the cantilevered projections 1694 may deflect to an unobstructing position and/or the enlarged portion 1656 of the port 1654 may deflect around the cantilevered projections 1694. This may permit passage of the enlarged portion 1656 through the cantilevered projections 1694 and into an output region of the bag feeder 1622.

The output of the bag feeder 1622 may include a receptacle 1690. In the example, the receptacle 1690 is defined in the housing 1696 of the bag feeder 1622. The receptacle 1690 may include a trough 1692 within which a section (e.g. a bottom face) of the enlarged portion 1656 of a port 1654 of a bag 26 may seat. When an enlarged portion 1656 of a port 1654 of a bag 26 is disposed in the receptacle 1690, the bag 26 may hang from the receptacle 1690. To collect the bag 26 from the bag feeder 1622, the bag 26 may be lifted out of the trough 1692 and displaced from the receptacle 1690. The advancement assembly 1660 may then be powered to drive a next bag 26 through the cantilevered projections 1694 and into the receptacle 1692.

Figure 129:
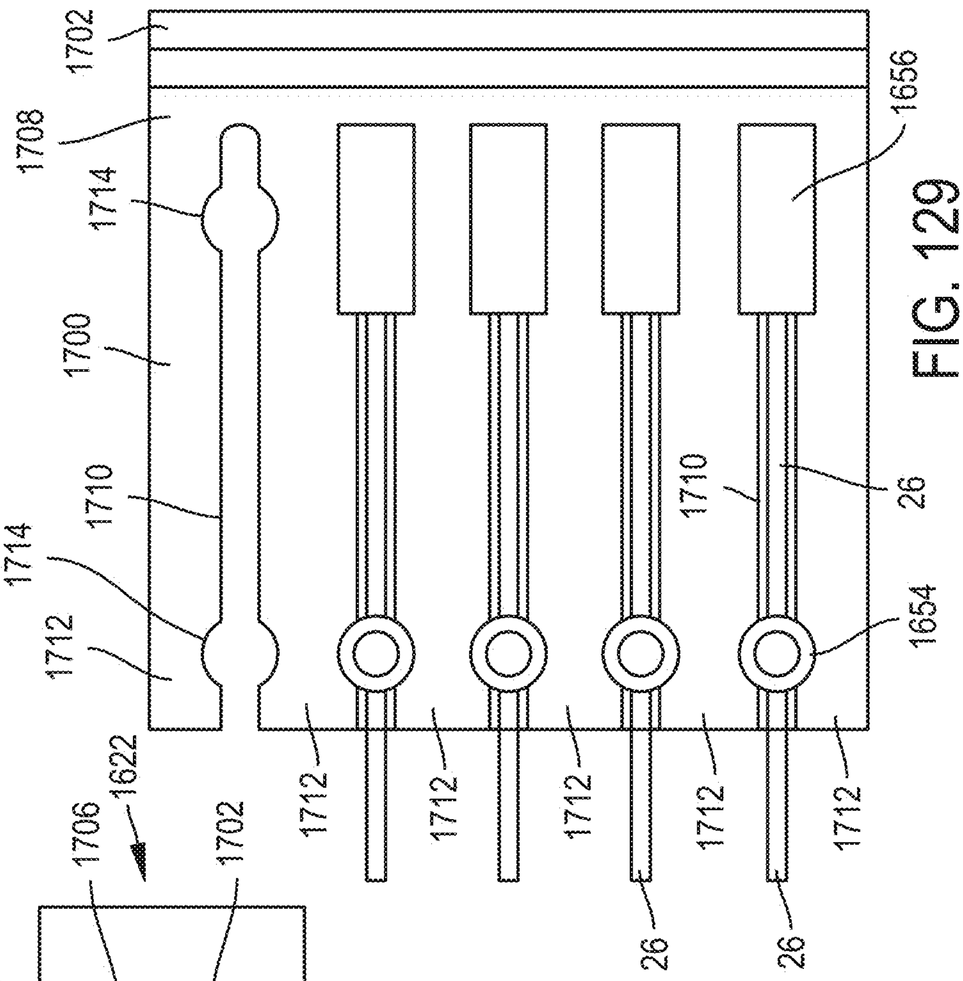
Figure 128:
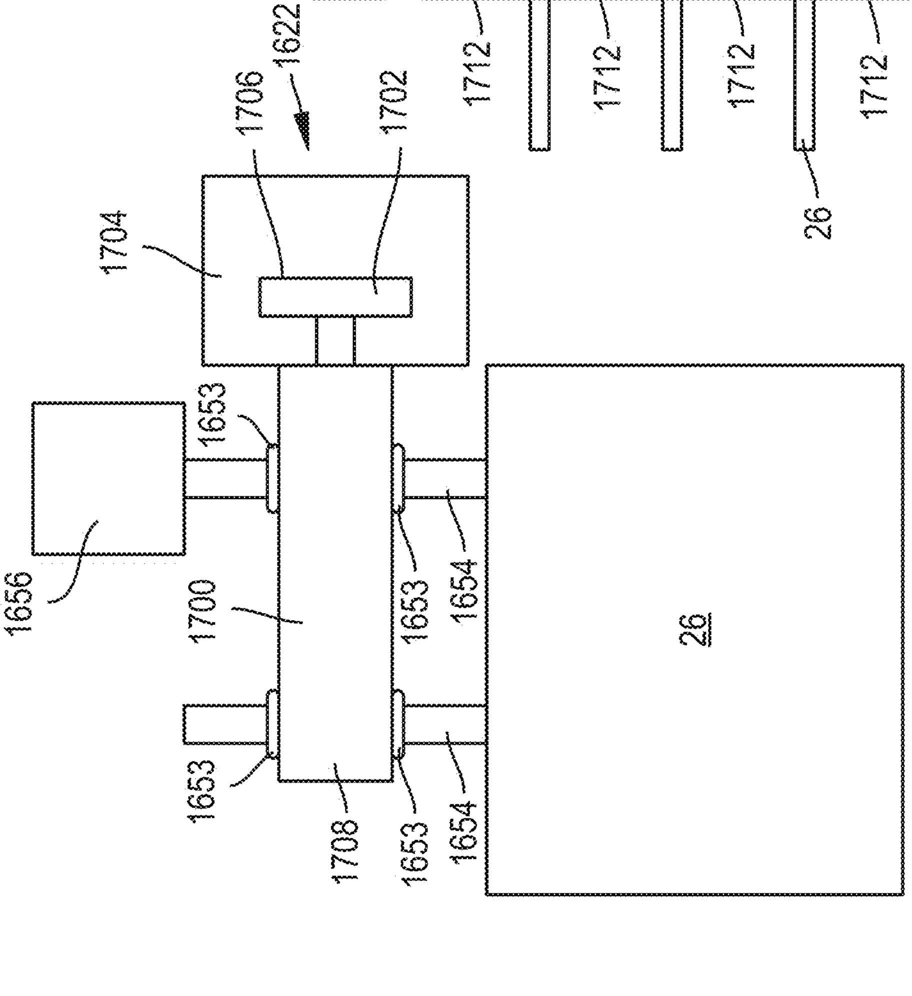

Referring now to FIGS. 128-129, in some examples, a bag feeder 1622 may be arranged to accept pre-loaded clips 1700 which are filled with bags 26. In such examples, the bag feeder 1622 may include at least one guide body 1704. The at least one guide body 1704 may be an elongate member which may, for example, extend from the antechamber 1600 (see, e.g., FIG. 111) to the packaging section 1602 (see, e.g., FIG. 112) of a system 10. The guide body 1704 may define a track 1706 which may extend along the length of the guide body 1704. Where more than one guide body 1704 is included, a portion of the track 1706 may be included in each of the guide bodies 1704. Each clip 1700 may include a rail 1702 which projects from a main body 1708 of the clip 1700 and interfaces with the track 1706. The rail 1702 may be a dovetail rail or may be a rail having a cross section in the shape of the Latin character “T” in certain examples. The track 1706 may be a dovetail or “T” shaped slot in the guide body 1704. Any other suitable mating geometries for the rail 1702 and track 1706 may be used in alternative embodiments.

In certain embodiments, the rail 1702 may be provided on a guide body 1704 and the track 1706 may be provided on each clip 1700. The locations (whether on the clip 1700 or guide body 1704) and shape of rails 1702 and tracks 1706 shown in relation to clips 1700 described herein are merely exemplary. Where, for example, a dovetail rail 1702 and track 1706 are shown, a “T” shaped rail 1702 and track 1706 could be used instead (the reverse is also possible). Additionally, where the track 1706 is depicted as a feature the guide body 1702 and the rail 1702 is depicted as a feature the clip 1700, the track 1706 and rail 1702 could be provided on the clip 1700 and guide body 1704 respectively in alternate embodiments.

Clips 1700 may be provided fully loaded with bags 26 and may be provided in sterile packaging. Pre-loaded clips 1700 may be introduced into an enclosure 12 via rapid transfer port 1606 and loaded onto guide bodies 1704 via glove interfaces 352. As clips 1700 are loaded into an antechamber 1600 side of a guide body 1704, clips 1700 already on the guide body 1704 may be pushed toward the packaging side of the guide body 1704. The clips 1700 may be consumables which are disposed of after being emptied of bags 26. A robotic grasper 1624 (see, e.g., FIG. 111) may remove clips 1700 from the packaging side of the guide body 1704 once all bags 26 have been removed from a clip 1700. Spent clips 1700 may be dropped in a waste chute 1634 (see, e.g., FIG. 111) to remove them from the packaging section 1602.

Clips 1700 may hold any suitable number of bags 26. In the example shown, the clip 1700 is arranged to hold five bags 26. Other clips 1700 may hold anywhere from 1-100 bags 26. Certain clip 1700 embodiments may hold 10-15 or 20-25 bags 26. Though various clips 1700 shown and described herein may be illustrated as holding a certain number of bags 26, as would be apparent to one skilled in the art, these clips 1700 may be modified to have a larger or smaller bag 26 capacity than illustrated.

To hold bags 26 in place on a clip 1700, a clip 1700 may include a plurality of retention receptacles 1710. In the example shown, the retention receptacles 1710 are niches or slots which extend to an edge of clip 1700 and create channel through the main body 1708 of the clip 1700. Each retention receptacle 1710 may engage with a portion of a bag 26 to retain the bag 26 in place on the clip 1710. In the example clip 1700, the retention receptacles 1710 engage with a span of the ports 1654 of each bag 26. In other embodiments, the retention receptacles 1710 may engage with the enlarged portion 1656 of a port 1654 or the body of the bag 26 itself to hold the bag 26 in place on the clip 1700. In the example embodiment, the retention receptacles 1710 are defined as slots formed between cantilevered members 1712 of the clip 1700. Each of the retention receptacles 1710 may include a set of notches 1714 which may be spaced so as to accept ports 1654 of the bags 26. The number of notches 1714 may be equal to the number of ports 1654 included on a bag 26 intended for use with that clip 1700. The notches 1714 may be slightly smaller than the ports 1654. Thus, when bags 26 are installed into each of the retention receptacles 1710, the ports 1654 may be slightly compressed and frictionally retained within the notches 1714. In some embodiments, the ports 1654 may include raised nodes 1653. The raised nodes 1653 may be disposed on at least one side of the main body 1708 of the clip 1700 when a bag 26 is installed in a retention receptacle 1710. This may aid in ensuring that a bag 26 is not inadvertently removed from the clip 1700. The nodes 1653 may also aid in locating bags 26 within the retention receptacles 1710.

As the ports 1654 may be held between two opposing cantilevered members 1712, the cantilevered members 1712 may resiliently deflect as a bag 26 is pulled out of a retention receptacle 1710. This may allow each retention receptacle 1710 to temporarily widen to allow for removal of a bag 26. Likewise, resilient deflection of the cantilevered members 1712 may facilitate installation of the bags 26 into the retention receptacles 1710. The cantilevered members 1712 may tend to snap back to a less stressed state once the ports 1654 enter into the notches 1714. Thus, bags 26 may be automatically captured within the retention receptacles 1710 once properly positioned.

Figure 130:
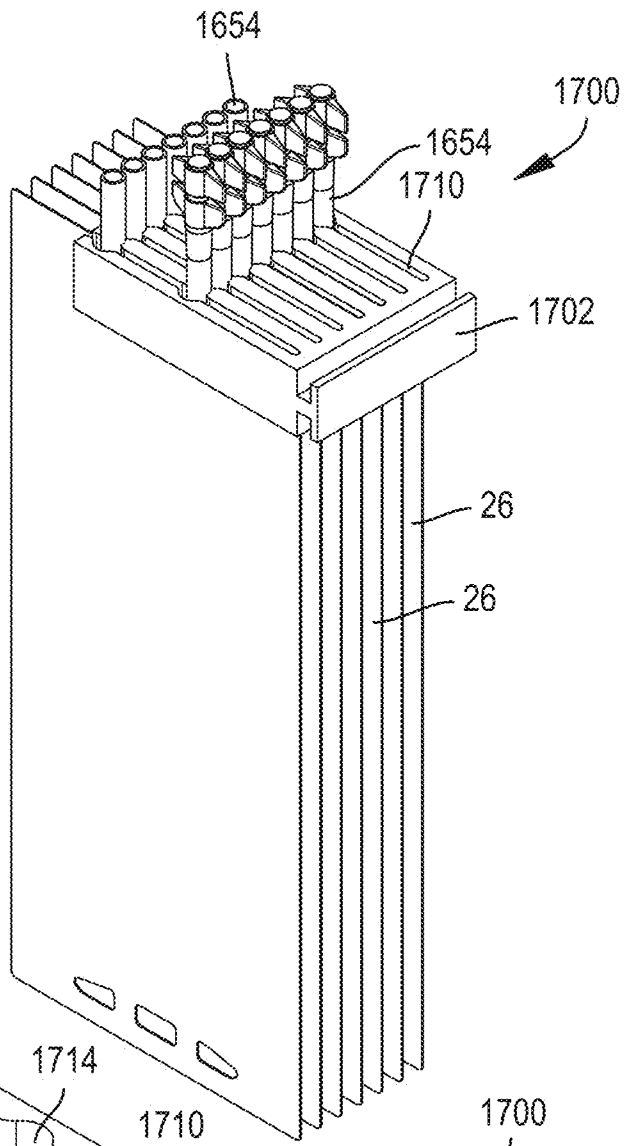
Figure 131:
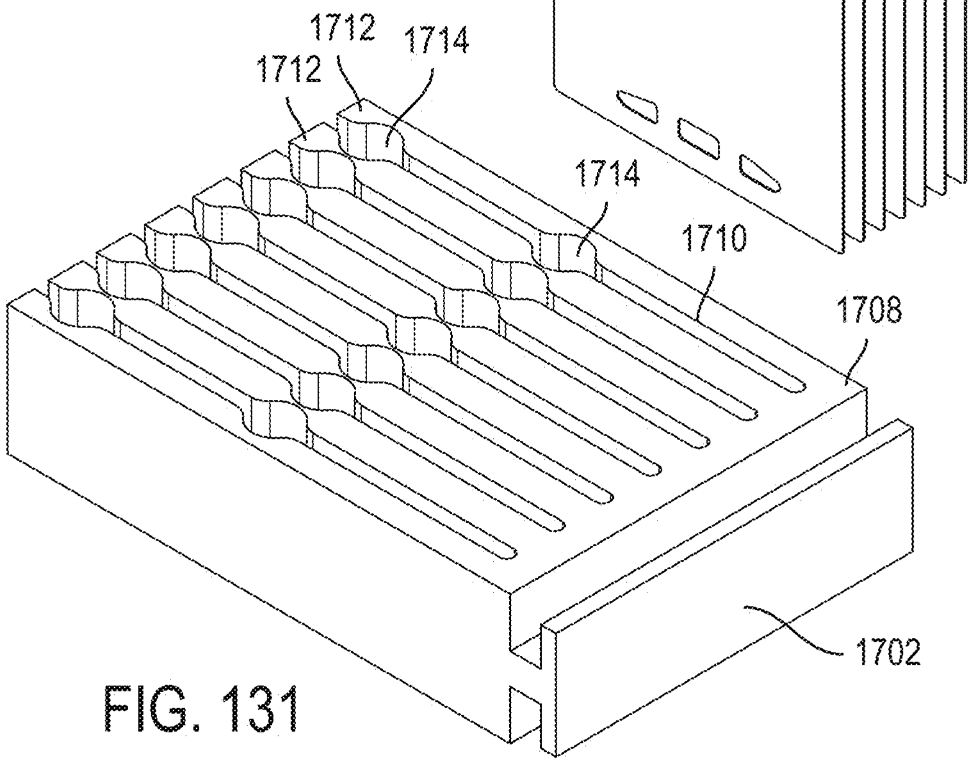

Referring now to FIGS. 130-131 an example clip 1700 is shown loaded with bags 26 (FIG. 130) and empty (FIG. 131). The example clip 1700 includes a rail 1702, which in the example embodiments, has a “T” shaped cross-section. The main body 1708 of the clip 1700 includes a number of retention receptacles 1710. The retention receptacles 1710 are defined between opposing cantilevered members 1712. Each of the retention receptacles 1710 includes a set of notches 1714 sized to accept ports 1654 of a bags 26. The example clip 1700 is arranged to hold seven bags 26 though the clip 1700 may be modified to hold any suitable number of bags 26 in alternative embodiments.

Figure 132:
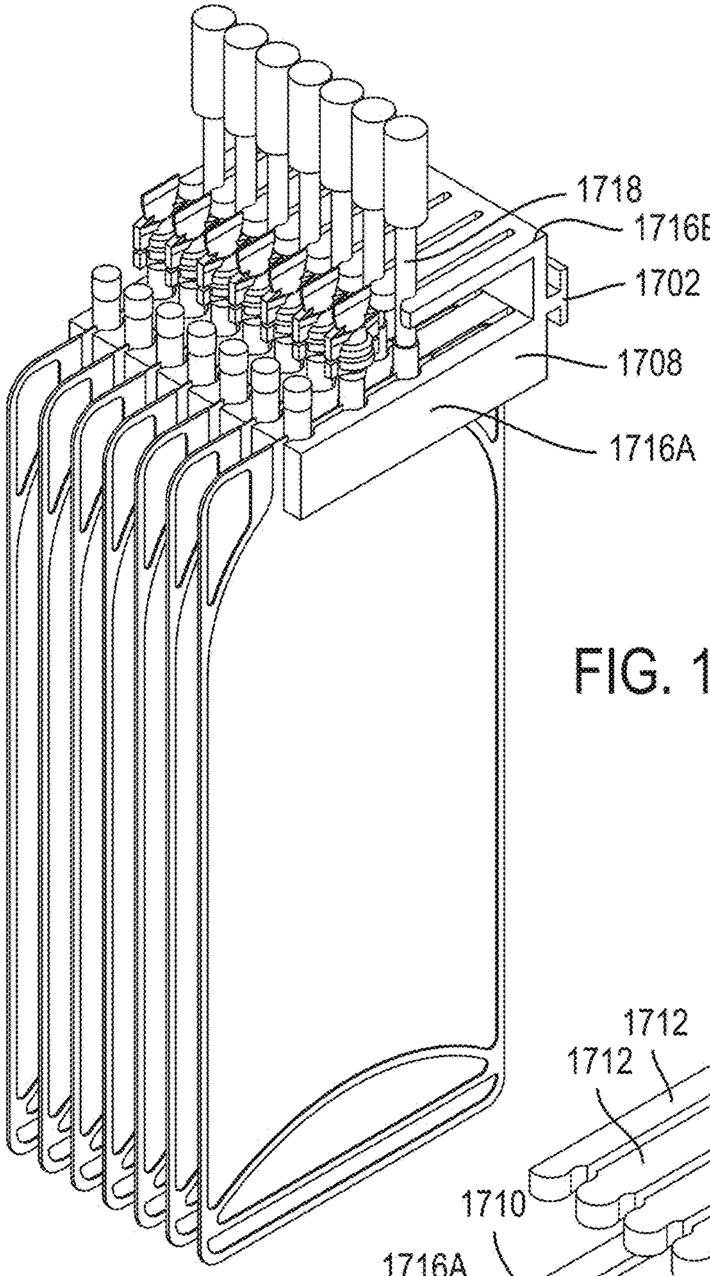
Figure 133:
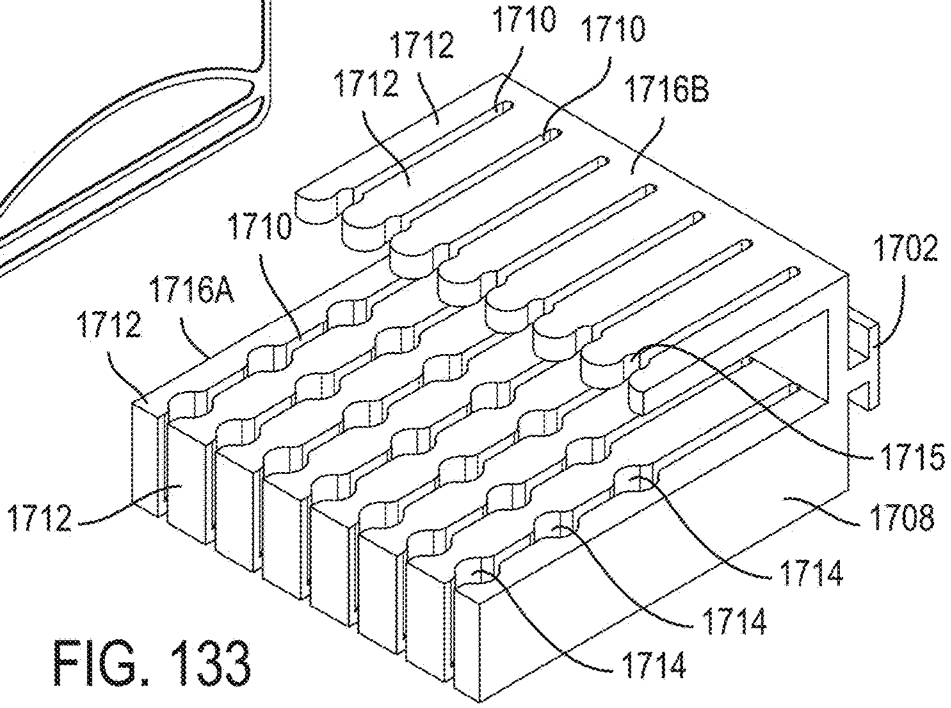

Another example clip 1700 including a rail 1702 is depicted in FIGS. 132-133. As in FIGS. 132-133, various clip 1700 embodiments may include a main body 1708 which is divided into a plurality of tiers 1716A, B. In the example embodiment, only two tiers 1716A, B are shown, however, alternative embodiments may include a greater number of tiers. Each of the tiers 1716A, B may include a set of retention receptacles 1710 which are defined between opposing cantilevered members 1712. The retention receptacles 1710 of the first tier 1716A may include a set of notches 1714 which may accept and compress ports 1654 of bags 26 to frictionally retain bags 26 in place on the clip 1700. The notches 1714 may also provide a form fit which may hold bags 26 in place on the clip 1700. The exemplary bags 26 shown in FIGS. 132-133 include three ports 1654. The retention receptacles 1710 of the first tier 1716A each include a corresponding set of three notches 1714 which may each capture a portion of one of the ports 1654.

Depending on the bag 26 used, some ports 1654 of a bag 26 may be longer than others. The example bags 26 shown in FIG. 132 each include one port 1654 having an extended span 1718 that projects a distance beyond the terminal end of the bag’s 26 other ports 1654. Other bag 26 varieties may include multiple ports 1654 with extended spans 1718. When retained in a clip 1700, extended spans 1718 (which may be constructed of a flexible tubing) may tend to droop or bend beyond their capture point in the retention receptacle 1710 of the first tier 1716A. The retention receptacles 1710 of the second tier 1716B (and any additional tiers) may include at least one support notch 1715 within which a region of an extended span 1718 may be captured (see FIG. 132). This may allow extended spans 1718 of ports 1654 to be constrained to known positions at multiple points along their length. Thus, the second tier 1716B (and any additional tiers) may act as a support tier which may prevent extended spans 1718 of ports 1654 disposed above the first tier 1716A from bending or flopping about during use. This may aid in ensuring that ports 1654 do not bend into approach or egress pathways of a robotic arm 360 (see, e.g., FIG. 111) or gantry as bags 26 are collected from a clip 1700. It may also help to ensure that ports 1654 of different bags 26 do not become entangled when in place on a clip 1700.

Figure 134:
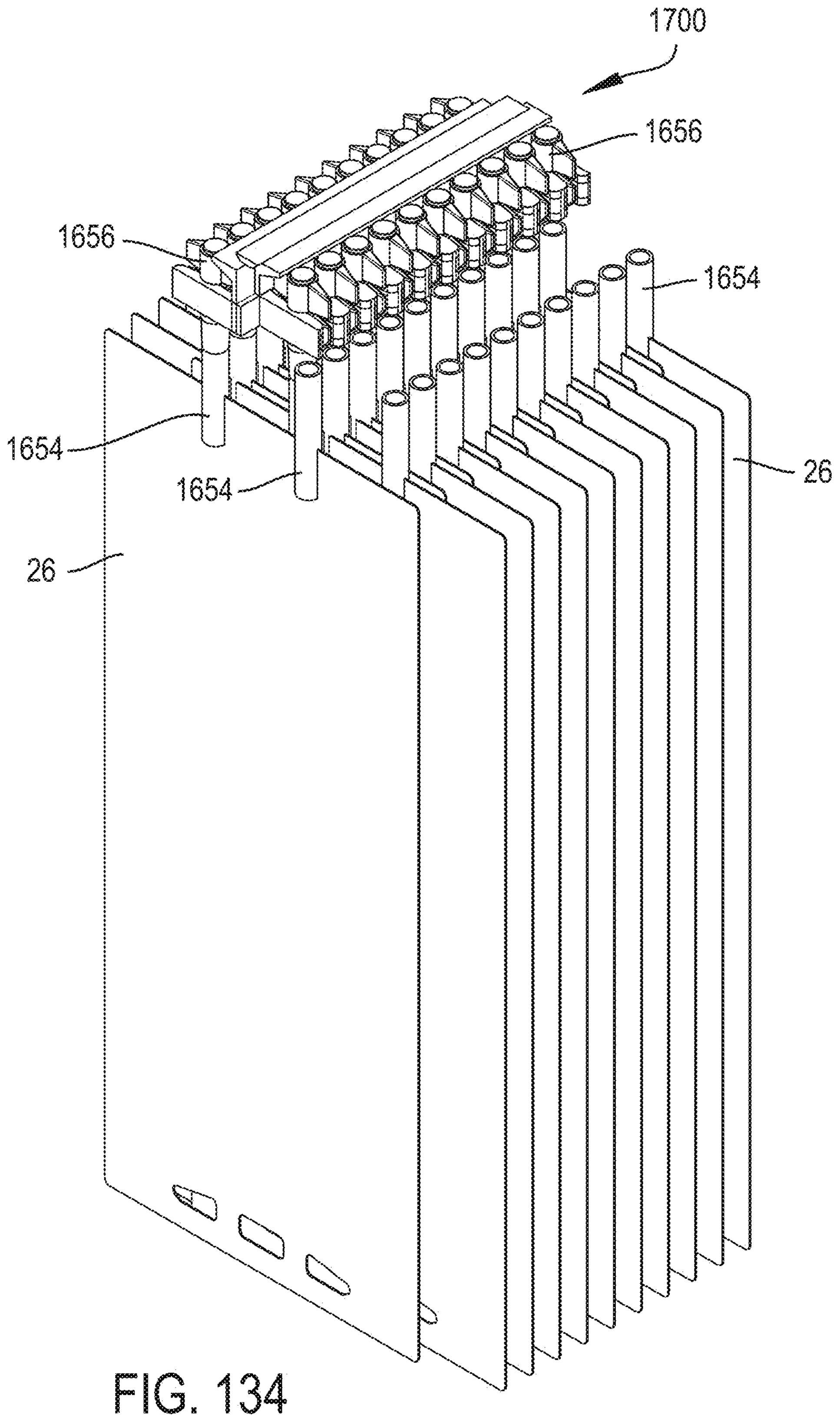
Figure 135:
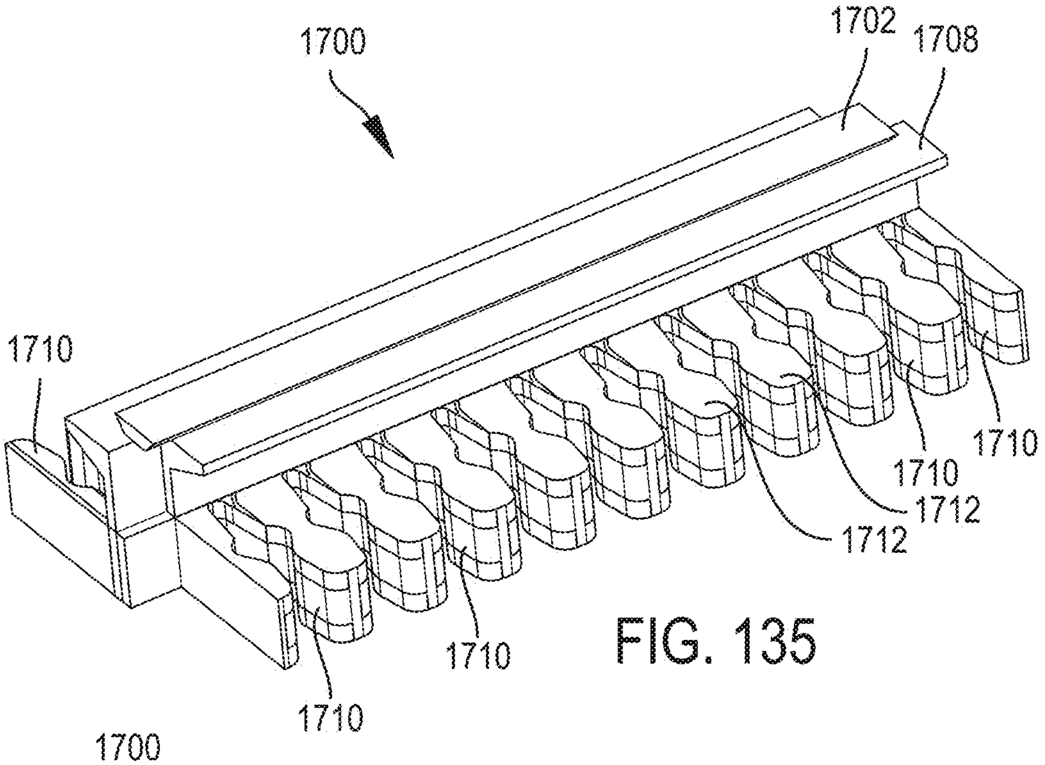
Figure 136:
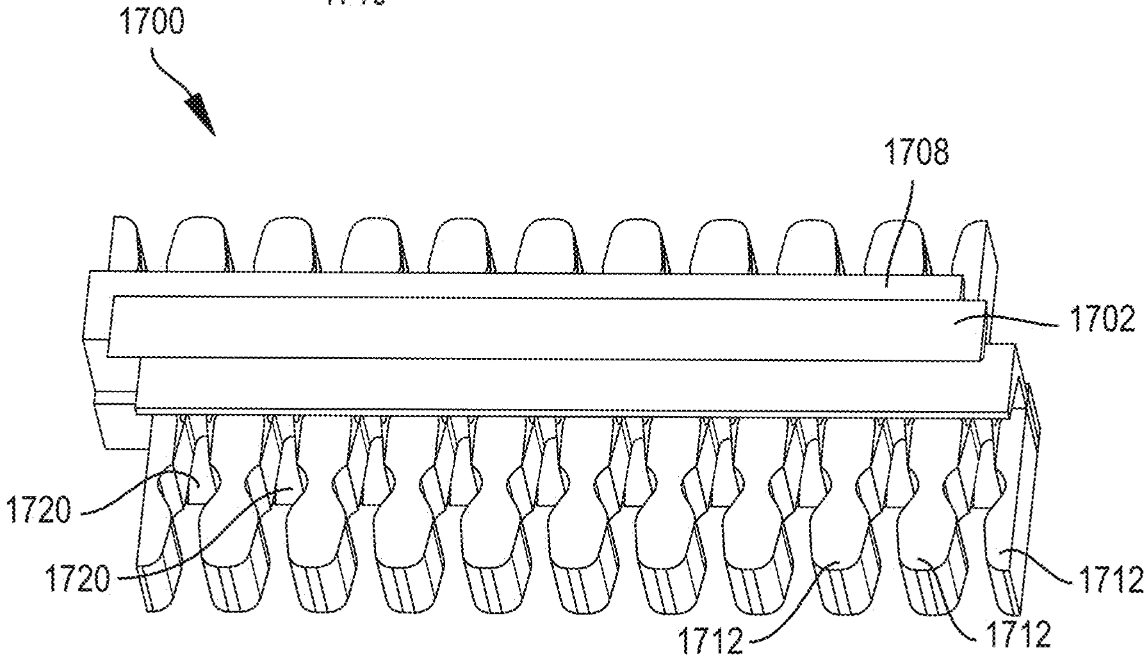

Referring now to FIGS. 134-136, yet another embodiment of a clip 1700 is depicted. The clip 1700 is shown loaded with bags 26 in FIG. 134 and empty in FIGS. 135-136. As shown, the clip 1700 may include a main body 1708. A rail 1702 may project from the main body 1708. In the example embodiment, the rail 1702 is depicted as a dovetail rail. Retention receptacles 1710 may be included on opposing sides of the main body 1708. In alternative embodiments, only one side of the main body 1708 may include retention receptacles 1710. Each of the retention receptacles 1710 may be defined between sets cantilevered members 1712. As shown, the retention receptacles 1710 may each accept and may frictionally retain an enlarged portion 1656 of a port 1654 of a bag 26. The cantilevered members 1712 may resiliently deflect apart as an enlarged portion 1656 is installed into or removed from a retention receptacle 1710. This may facilitate installation of bags 26 into and removal of the bags 26 from the clip 1700.

In some examples, the retention receptacles 1710 may also include a shelf 1720. Shelves 1720 may extend from the main body 1708 into a bottom portion (portion of each retention receptacle 1710 most distal to the rail 1702) of each of the retention receptacles 1710. The surface of the enlarged portion 1656 of a port 1654 most proximal to the body of the bag 26 may partially rest upon the shelf 1720 of a retention receptacle 1710 when the bag 26 is retained by the receptacle 1710.

The retention receptacles 1710 on a first side of the main body 1708 may be offset with respect to the retention receptacles 1710 on the opposing second side of the main body 1708. In the example embodiment, retention receptacles 1710 on a first side of the clip 1700 may be disposed opposite cantilevered members 1712 of the second side of the clip 1700. With the offset arrangement of retention receptacles 1710, a bag 26 retained on a first side of the clip 1700 may be disposed between the bags 26 held by two adjacent retention receptacles 1710 on the opposing side of the clip 1700 (best shown in FIG. 134). Ports 1654 of bags 26 retained on the first side of the clip 1700 may also be staggered out of alignment with the ports 1654 of bags 26 retained on the second side of the clip 1700. Since the ports 1654 may be the thickest section of the unfilled bags 26, staggering ports 1654 of adjacent bags 26 may allow for spacing between adjacent bags 26 retained on the clip 1700 to be minimized. This may increase the number of bags 26 which may be retained on a clip 1700 of a given length.

Figure 137:
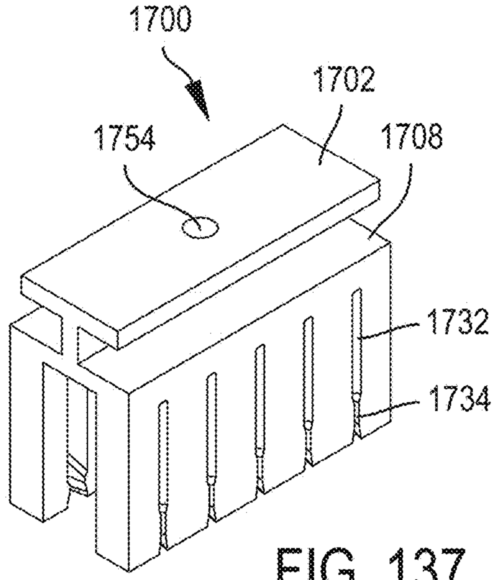
Figure 138:
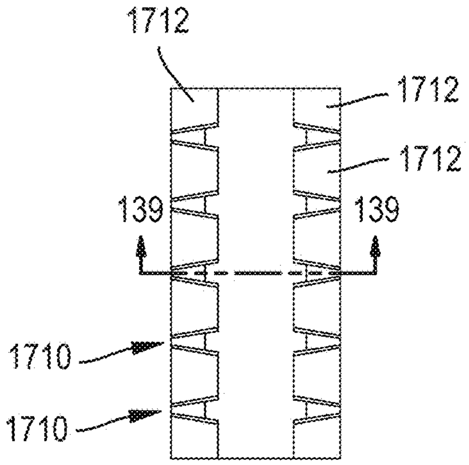
Figure 139:
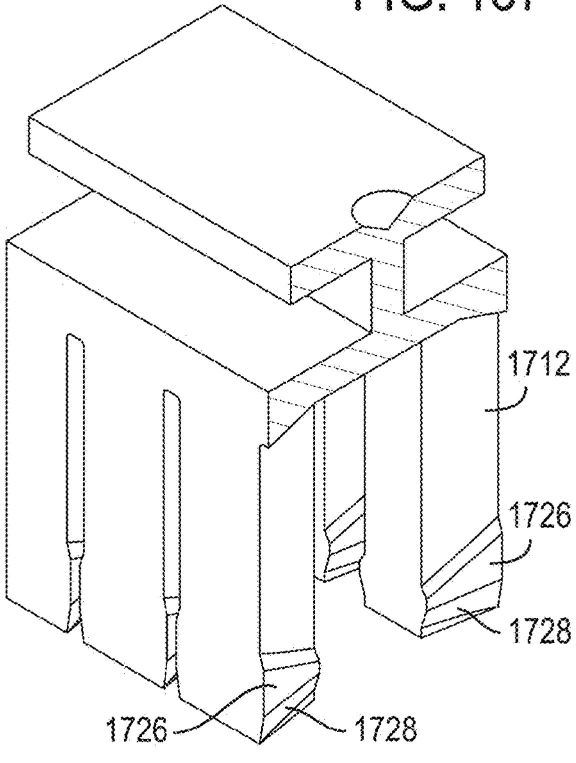

Referring now to FIGS. 137-139, another example clip 1700 is depicted. As shown, the example clip 1700 includes a main body 1708 which is in the form of a plate. A "T" shaped rail 1702 extends from a first side of the main body 1708. A plurality of retention receptacles 1710 extend from an opposing second side of the main body 1708. Each retention receptacle 1710 may be defined by sets of opposed cantilevered members 1712. Each set of cantilevered members 1712 may accept and frictionally retain a region of an enlarged section 1656 of a port 1654 therebetween.

The retention receptacles 1710 may include a wide region 1732 and a narrow region 1734. The wide region 1732 may receive the enlarged section 1656 of a port 1654 when a bag 26 is retained within a retention receptacle 1710. The narrow region 1734 may be disposed more proximal to the body of the bag 26 (e.g. underneath the enlarged section 1656) than the enlarged section 1656 when an enlarged section 1656 of a port 1654 is captured in the retention receptacle 1710. The narrow region 1734 may be narrower than a width of the enlarged portion 1656 of a port 1654 when the cantilevered members 1712 are in an undeflected state. The narrow region 1734 may thus aid in preventing inadvertent removal of a bag 26 from a retention receptacle 1710. When a pulling force in excess of a threshold is exerted on a bag 26, the cantilevered members 1712 defining the retention receptacle 1710 may splay apart to allow passage of the enlarged section 1656 of the port 1654 through the narrow region 1734 of the retention receptacle 1710.

As shown, each of the cantilevered members 1712 may include a first ramp segment 1726 and a second ramp segment 1728 at their unsupported ends. The first ramp segment 1726 and second ramp segment 1728 may slope in opposite directions. The first and second ramp segments 1726, 1728 of opposing cantilevered members 1712 may cooperate to form the narrow region 1734 of the retention receptacle 1710. In some examples, a substantially flat raised segment (not shown) may extend between the first and second ramp segments 1726, 1728 to lengthen the narrow region 1734 of each retention receptacle 1710. As an enlarged portion 1656 of a port 1654 is introduced into a retention receptacle 1710, the enlarged portion 1656 may be displaced against the second ramp sections 1728 of the cantilevered members 1712. The second ramp sections 1728 may help to guide the enlarged portion 1656 into the retention receptacle 1710 and facilitate spreading of each set of cantilevered members 1712 to permit passage of the enlarged section 1656 through the narrow region 1734 of the retention receptacle 1710. Once an enlarged portion 1656 of a port 1654 is advanced into the wide region 1732 of a retention receptacle 1710, each set of cantilevered members 1712 may resiliently restore to an undeflected state. The first ramp sections 1726 may similarly aid in facilitating spreading of sets of cantilevered members 1712 as a bag 26 is pulled from a retention receptacle 1710. In some embodiments, the first ramp sections 1726 may be replaced with a ledge or barb (see, e.g., FIG. 140). This may increase the amount of pulling force needed to remove a bag 26 from a retention receptacle 1710.

An alternative embodiment of the clip 1700 of FIGS. 137-139 is shown in FIG. 140. In FIG. 140, in addition to the retention receptacles 1710, a support arm 1722 extends from the second side of the main body 1708. The support arm 1722 may include a number of locating projections 1724 on the end of the support arm 1722 most distal to the main body 1708. The locating projections 1724 may extend into and at least partially around the terminal ends of ports 1654 of bags 26 retained on the clip 1700. The locating projections 1724 may thus constrain the ends of ports 1654 not engaged by the retention receptacle 1710 to a known location. This may prevent ports 1654 from becoming entangled or bending into approach or egress pathways of a robotic grasper 1624 on a robotic arm 360 (see, e.g., FIG. 111) or gantry. Additional support arms 1722 with locating projections 1724 may, though need not necessarily, be included where bags 26 include additional ports 1654 in order to constrain such ports 1654 to a known location.

Referring now to FIG. 141, in some examples, a bag feeder 1622 may include a conveyer assembly 1740. Where a conveyer assembly 1740 is included, the conveyer assembly 1740 may include a belt 1742. The belt 1742 may be constructed of a flexible material. Displacement of the belt 1742 may be powered by a set of motors 1744 which rotate pulleys 1746 over which the belt 1742 is routed and tensioned. The belt 1742 may be driven via friction or may be positively driven by the pulleys 1746. The example in FIG. 141 shows a frictional belt 1742 driving arrangement. A positively driven belt 1742 is shown, for example, in relation to FIG. 142. At least two pulleys 1746 may be included in the conveyer assembly 1740. Three are shown in the example bag feeder 1622 depicted in FIG. 141.

A number of docking bodies 1748 may be coupled to the belt 1742. The docking bodies 1748 may be spaced at even intervals along the belt 1742 though need not necessarily be in all examples. The docking bodies 1748 may be coupled to the belt 1742 in any suitable manner (e.g. via mechanical fasteners such as screws or rivets). Each of the docking bodies 1748 may include a track 1750 which may interface with a rail 1702 of a clip 1700. The track 1750 may, for example, be a slot having a dovetail shaped cross section or a cross-section in the shape of the Latin character "T" (shown).

Each of the docking bodies 1748 may also include a detent pin 1752. The detent pin 1752 may project into the track 1750. The detent pin 1752 may, for instance, be spring biased to project into the track 1750. As a clip 1700 is installed into a docking body 1748, the clip 1700 may be advanced along the track 1750 until the detent pin 1752 reaches a recess 1754 (see, e.g., FIG. 137) defined on a surface of the clip 1700. The detent pin 1752 may seat into the recess 1754 and provide resistance to further advancement of the clip 1700 along the track 1750. This may provide a tactile cue to a user loading the docking body 1748 that the clip 1700 has been correctly installed. In some embodiments, the action of the detent pin 1752 snapping into the recess 1754 may also generate an audible clicking noise which may provide an audible cue to the user. Additionally, the detent pin 1752 may help to constrain the clip 1700 in a known position on the docking body 1748. To remove a clip 1700 from a docking body 1748 a force sufficient to overcome the engagement of the detent pin 1752 in the recess 1754 may be applied and the clip 1700 may subsequently be slid out of the docking body 1748.

In the example embodiment shown in FIG. 141, the clips 1700 depicted are those shown in FIGS. 137-139 although any clip 1700 including a rail 1702 may be used. Though the docking bodies 1748 each include a track 1750 in the example embodiment, in alternative examples, the docking bodies 1748 may include a rail 1702. In such examples, clips 1700 may include cooperating tracks which may interface with the rails 1702.

As the belt 1742 is driven, a docking body 1748 and any clip 1700 installed thereon may be displaced along a displacement path. The displacement path may be dictated by the location of pulleys 1746 of the conveyer assembly 1740. A portion of the displacement path may be disposed in the packaging section 1602 (see, e.g., FIG. 111) of the enclosure 12 (see, e.g., FIG. 111). A portion of the displacement path may also be disposed within the antechamber 1600 section (see, e.g., FIG. 111) of the enclosure 12 (see, e.g., FIG. 111). Thus, docking bodies 1748 may transit into the antechamber 1600 to be loaded with filled clips 1700 as the belt 1742 is driven. After being loaded with filled clips 1700, the belt 1742 may be driven to advance the docking bodies 1748 into the packaging section 1602 so as to present the bags 26 on the clips 1700 for collection by a robotic grasper 1624 of a robotic arm 360 (see, e.g., FIG. 111) or gantry of the system 10. Docking bodies 1748 may be returned to the antechamber 1600 so that spent clips 1700 may be removed from the docking bodies 1748.

Another example of a bag feeder 1622 including a conveyer assembly 1740 is depicted in FIG. 142. As shown in FIG. 142, the conveyer assembly 1740 may include a belt 1742 which is teethed. The belt 1742 may be routed around a number of pulleys 1746. At least one of the pulleys 1746 may be teethed. In the example, a toothed pulley 1746 is coupled to an output shaft 1756 of a drive motor 1744 of the conveyer assembly 1740. Such a positive drive conveyer assembly 1740 may be desirable as it may facilitate indexing of clips 1700 to desired locations as the belt 1742 is driven.

Referring now also to FIGS. 143, another embodiment of a clip 1700 is depicted. The clip 1700 may include a main body 1708 which is divided into a plurality of tiers 1716A, B. The first tier 1716A includes a set of retention receptacles 1710 which are defined between opposing cantilevered members 1712. The retention receptacles 1710 of the first tier 1716A may each include a set of notches 1714 which may accept and compress ports 1654 of bags 26 to frictionally retain bags 26 in place on the clip 1700. The notches 1714 may also provide a form fit which may hold bags 26 in place on the clip 1700. The retention receptacles 1710 of the first tier 1716A each include a set of three notches 1714 which may each capture a portion of one port 1654 of a bag 26. The notches 1714 of each retention receptacle 1710 are staggered out of line with respect to the notches 1714 of adjacent retention receptacles 1710. As mentioned above, this may allow for a greater number of bags 26 to be retained on the clip 1700.

The second tier 1716B may include a number of cradles 1760. A region of an extended span 1718 (see, e.g., FIG. 132) of a port 1654 may be captured in each cradle 1760. This may allow extended spans 1718 of ports 1654 to be constrained to known positions at a desired point along their length. Thus, the second tier 1716B may act as a support tier which may prevent extended spans 1718 of ports 1654 disposed above the first tier 1716A from bending or flopping about during use.

Still referring to FIGS. 142-143, the example clip 1700 also includes a rail 1702. The rail 1702 may interface with a track 1706 defined by at least one guide body 1704 of the bag feeder 1622. In the example embodiment, the bag feeder 1622 includes two guide bodies 1704. Each of the guide bodies 1704 includes a recess which defines a portion of the track 1706. The guide bodies 1704 may extend along and flank each side of the belt 1742 of the conveyer assembly 1740 along a portion of the conveyer assembly 1740. The teeth of the belt 1742 may displace along a path between the two guide bodies 1704 as the belt 1742 is driven.

As shown, the clip 1700 may include at least one toothed projection 1762. When the rail 1702 of the clip 1700 is installed into the track 1706 formed by the guide bodies 1704, the toothed projection 1762 of the clip 1700 may project into a space between the guide bodies 1704. The teeth of the belt 1742 may engage with the toothed projection 1762 of the clip 1700 and as the belt 1742 is driven and may displace the clip 1706 along the track 1706.

Yet another clip 1700 embodiment is depicted in FIGS. 144-146. As shown, the clip 1700 may include a main body 1708 including a number of retention receptacles 1710. The retention receptacles 1710 may be formed as slots which may extend through the main body 1708 of the clip 1700. Each of the retention receptacles 1710 may include at least one well 1764 which is recessed into, but does not extend through the main body 1708. The wells 1764 may each be sized to accept a port 1654 of a bag 26. Additionally, the end of the ports 1654 proximal the body of the bag 26 may rest on the bottom surface of the wells 1764. In other embodiments, the retention receptacles 1710 may include port 1654 retaining notches 1714 which extend through the main body

1708. Likewise, where other clips 1700 herein may be shown as having notches 1714, these notches 1714 may be replaced with wells 1764 in alternative embodiments.

Each of the retention receptacles 1710 may be partially defined by a set of cantilevered arms 1766A, B. The cantilevered arms 1766A, B may form portions of opposing sidewalls of each of the retention receptacles 1710. In the example embodiment, the cantilevered arms 1766A, B each extend in opposing directions from a central portion of the retention receptacle 1710. The cantilevered arms 1766A, B may resiliently deflect in opposing directions as bags 26 are installed into or removed from the retention receptacles 1710. Deflection of the cantilevered arms 1766A, B may allow for the retention receptacles 1710 to temporarily widen such that ports 1654 of the bags 26 may be displaced into or out of the wells 1764 of the retention receptacles 1710. The cantilevered arms 1766A, B may each resiliently restore to an undeflected state when the ports 1654 of a bag 26 are properly seated into the wells 1764. The cantilevered arms 1766A, B may also automatically restore to an undeflected state when ports 1654 of a bag 26 have been displaced clear of a retention receptacle 1710 during removal of a bag 26 from the clip 1700.

The clip 1700 embodiment shown in FIGS. 144-146 includes a plurality of toothed projections 1762. These toothed projections 1762 may engage with teeth of a belt 1742 of a conveyer assembly 1740 (see, e.g., FIG. 142) when the rail 1702 of the clip 1700 is installed within a track 1706 of a bag feeder 1622. This may allow the clips 1700 to be advanced and indexed along a track 1706 of a bag feeder 1622 as a belt 1742 of a conveyer assembly 1740 of a bag feeder 1622 is driven.

Referring now to FIGS. 147-148, another exemplary clip 1700 is depicted. The clip 1700 may be divided into a plurality of tiers 1716A, B. The first tier 1716A includes a number of retention receptacles 1710 and may be defined in a main body 1708 of the clip 1700. The main body 1708 may also include a wall portion 1768 which extends from the first tier 1716A in the direction of the second tier 1716B. The wall portion 1768 of the main body 1708 is disposed at an angle perpendicular to the first tier 1716A in the example embodiment. The second tier 1716B may be coupled to the wall portion 1768. The second tier 1716B and wall portion 1768 may, for example, include a set of complimentary interlocking projections 1770A, B which may be coupled together via interference fit (though adhesive, ultrasonic welds, fasteners, solvent bonding, etc. may be used in alternative examples). In other embodiments, the clip 1700 may be constructed as a single monolithic component (e.g. injection molded).

The retention receptacles 1710 in the first tier 1716A may be defined between opposing cantilevered members 1712. Each of the retention receptacles 1710 may include a set of notches 1714. The notches 1714 may accept and compress ports 1654 of bags 26 to frictionally retain bags 26 in place on the clip 1700. The notches 1714 may also provide a form fit which may hold bags 26 in place on the clip 1700. The notches 1714 of adjacent retention receptacles 1710 may be staggered out of line with respect to one another. As mentioned above, this may allow for a greater number of bags 26 to be retained on the clip 1700. As with the embodiment described in relation to FIGS. 142-143, the second tier 1716B may include a number of cradles 1760. A region of an extended span 1718 of a port 1654 may be captured in each cradle 1760 and constrained to a known position. Thus, the second tier 1716B may act as a support tier which may help to hold extended spans 1718 of ports 1654 in place on the clip 1700.

The example clips 1700 may each include a rail 1702. As shown, the rail 1702 of the clip 1700 includes a toothed projection 1762. The rail 1702 may include cantilevered arm 1772 formed by a notch 1774 which may be cut into a portion of the rail 1702. The toothed projection 1762 may be disposed on an unsupported end of a cantilevered arm 1772.

Referring now also to FIGS. 149-150, an example bag feeder 1622 (the same as that shown in FIG. 111) including a conveyer assembly 1740 is depicted. The example conveyer assembly 1740 includes a motor 1744, a belt 1742, and a set of pulleys 1746. The exemplary bag feeder 1622 shown in FIGS. 149-150 may accept clips 1700 (four shown in FIGS. 149-150) of the type described in relation to FIGS. 147-148. The rail 1702 of each clip 1700 may interface with a track 1706 defined by at least one guide body 1704 of the bag feeder 1622. In the example embodiment, the bag feeder 1622 includes two guide bodies 1704. Each of the guide bodies 1704 includes a recess which defines a portion of the track 1706. One of the guide bodies 1704 may be formed as a section of a cover (removed in FIG. 150) which may house the belt 1742 and pulleys 1746 of the conveyer assembly 1740. The belt 1742 may extend into a portion of the track 1706. The belt 1742 may extend into the portion of the track 1706 formed by the guide body 1704 included as part of the cover.

As best shown in FIG. 150, when a clip 1700 is disposed in the track 1706, the toothed projection 1762 of the clip 1700 may engage with the teeth of the belt 1742. As the conveyer motor 1744 is powered, a toothed pulley 1746 of the conveyer assembly 1740 may be rotated and the belt 1742 may be positively driven. As the belt 1742 displaces, the engagement of the teeth of the belt 1742 and the toothed projections 1762 of the clips 1700 may cause the clips 1700 to be advanced along the track 1706. The cantilevered arm 1772 of each clip 1700 may resiliently deflect upon installation of a clip 1700 into the track 1706. As the cantilevered arm 1772 attempts to restore to an undeflected state, the cantilevered arm 1772 may act as a bias member which may urge the toothed projection 1762 against the belt 1742. Thus, the cantilevered arm 1772 may aid in ensuring robust engagement of the toothed projection 1762 with the teeth of the belt 1742. Other clip 1700 embodiments including toothed projections 1762 may have their toothed projections disposed on cantilevered arms 1772 as well.

The example bag feeder 1622 may also include a stop assembly 1780. The stop assembly 1780 may be disposed at a packaging end 1784 of the track 1706 which may be located in a packaging compartment 1602 of an enclosure 12. The stop assembly 1780 may include a displaceable gate member 1782. The gate member 1782 may be displaced between a blocking position (see FIG. 149) and an open position (see FIG. 150). In the open position, the packaging end of the track 1706 may be accessible by a grasper 1624 (see, e.g., FIG. 111) such that the grasper 1642 may grasp and displace empty clips 1700 out of the track 1706. In the blocking position, the gate member 1782 may obstruct access to the packaging end of the track 1706. This may ensure that clips 1700 are not accidentally advanced out of the track 1706.

A control system 15 may keep an accounting of the number of bags 26 remaining on a clip 1700. Each clip 1700 may include a predefined number of bags 26 when full or the number of bags 26 on a clip 1700 may be collected from an identification tag 1558 (described in greater detail in relation to FIG. 214) associated with each clip 1700. When a clip 1700 at the packaging end of the bag feeder 1622 has been emptied, the gate member 1782 may be displaced via an actuator in certain embodiments. The control system 15 may command powering of the actuator to displace the gate member 1782 from the blocking to the open position after a clip 1700 has been emptied to allow for removal of the clip 1700 via a robotic grasper 1624 (see, e.g., FIG. 111) for example.

In other embodiments, the gate member 1782 may be displaced via a robotic grasper 1624 of the system 10. In such examples, when the grasper 1624 is displaced to the bag feeder 1622 along a predefined clip removal path, a portion of the grasper 1624 may contact and displace the gate member 1782 to the open position. A clip 1700 may be grasped and removed by displacing the grasper away from the bag feeder 1622. In the event that the grasper 1624 is not displaced to the bag feeder 1622 substantially along the predefined clip removal path, the gate member 1782 may remain in the blocking position.

In some examples, the gate member 1782 may be biased to the blocking position by a bias member 1781 included in the stop assembly 1780. Any suitable bias member 1781 may be used. A constant force spring is depicted in FIG. 149 and FIG. 150. Alternatively, an extension spring attached to the gate member 1782 and a stationary portion of the stop assembly 1780 may be used. As the gate member 1782 is raised, the extension spring may stretch. As the extension spring restores to a more relaxed state, the gate member 1782 may be urged to the blocking position.

The stop assembly 1780 may also include a gate sensor 1786. The gate sensor 1786 may monitor the positon of the gate member 1782. The gate sensor 1786 may be any suitable sensor. For example, the gate sensor 1786 may include ultrasonic sensors, optical sensors, beam interrupt sensors, magnetic sensors (the gate member 1782 may include at least one magnet or metal body), inductive sensors, etc.

Once a clip 1700 has been emptied, the control system 15 may command a robotic grasper 1624 (see, e.g., FIG. 111) to grasp the empty clip 1700 and remove the clip 1700 form the bag feeder 1622. The control system 15 may issue this command upon receipt of a data signal from the gate sensor 1786 that the gate member 1782 is in the open position. Additionally, the control system 15 may prevent powering of the motor 1744 when the gate sensor 1786 indicates that the gate member 1782 is in the open position.

The bag feeder 1622 may include a position sensing assembly. The position sensing assembly may have a number of position sensors 1778 which may monitor the location of any clips 1700 installed in the track 1706. The position sensing assembly may output at least one signal which alters in relationship to the position of clips 1700 along the track 1706. Additionally, the conveyer motor 1744 may include a motor encoder which may output a data signal indicative of a position of an output shaft of the conveyer motor 1744. Any suitable position sensors 1778 may be used. For example, the position sensors may be optical sensors, ultrasonic sensors, beam interrupt sensors, magnetic sensors (the clips 1700 would each include at least one magnet), etc. A control system 15 of the system 10 may govern operation of the conveyer motor 1744 based at least in part on data signals received from the position sensors 1778 and/or motor encoder. The control system 15 may analyze data received from the position sensors 1778 and/or motor encoder to index clips 1700 to desired positions on the track 1706. For example, once an empty clip 1700 has been removed from the packaging end of the track 1706, the control system 15 may command the motor 1744 to advance clips 1700 along the track 1706 such that the next clip 1700 is indexed to the packaging end of the track 1706.

Once a bag 26 has been collected by a grasper 1624, the bag 26 may be displaced to a port opening station 1612 (see, e.g., FIG. 111). At the port opening station 1612, a port 1654 of the bag 26 may be aligned with a cutting element. To cut open the port 1654, the cutting element may be actuated into the port 1654 or may be stationary in other examples. Where the cutting element is actuated, the cutting element may be displaced along a displacement axis via a linear actuator. Alternatively, the cutting element may be rotated about a pivot axis and swung into the port 1654 by a rotary actuator. Where the cutting element is stationary, the port 1654 may be displaced against the cutting element via displacement of the grasper 1624 (see, e.g., FIG. 111) holding the bag 26. The cutting element may be included in a replaceable cartridge which may swapped out periodically during use.

Referring now to FIGS. 151-152, a port opener assembly 1840 is depicted. A port opener assembly 1840 such as that shown in FIGS. 151-152 may be positioned at a port opening station 1612 (see, e.g., FIG. 111) in an enclosure 12 (see, e.g., FIG. 111). As shown, a port opener assembly 1840 may include a base 1880. The base 1880 may accept a cutting cartridge 1800 which may be periodically replaced as the system 10 is used. The cutting cartridge 1800 may include a blade element 1810 and a blade housing 1890. The blade housing 1890 may include a set of spring arms 1892. The spring arms 1892 may each include a blade engaging end 1894 which may be enlarged with respect to the remainder of the spring arms 1892. The blade element 1810 may include a set of notches 1896. The blade engaging ends 1894 of the spring arms 1892 may lock (e.g. snap fit) into the notches 1896 of the blade element 1810.

The example port opener assembly 1840 shown in FIGS. 151-152 also includes an actuator 1882. The actuator 1882 may be powered to generate linear displacement of an output shaft 1884. The output shaft 1884 may displace within a channel 1886 of the blade housing 1890. A portion of the blade element 1810 may also be disposed within the channel 1886. The spring arms 1892 may bias the blade element 1810 into contact with an end of the output shaft 1884.

Via powering of the actuator 1882, the blade element 1810 may be displaced between a concealed position (see FIG. 151) and a deployed position (see, FIG. 152). When the output shaft 1884 is displaced toward the blade housing 1890, the blade element 1810 may be driven toward the deployed state and the spring arms 1892 may deflect into a stressed state. As the blade element 1810 is driven toward the deployed position, the blade element 1810 may extend into an aperture 1898 of the blade housing 1890. Any port 1654 present in the aperture 1898 may be severed by the blade element 1810 as the blade element 1810 reaches the deployed position.

As the output shaft 1884 is retracted, the spring arms 1892 may restore to a less stressed state. As the spring arms 1892 restore, they may drive the blade element 1810 back into the blade housing 1890. Thus, the blade element 1810 may be returned to the concealed position by the spring arms 1892 as the output shaft 1884 retracts. Additionally, the aperture 1898 may be sized such that the severed portion of the port 1654 may fall through the aperture 1898. The base 1880 may include a similar opening 1888 in line with the aperture 1898. As the blade element 1810 is retracted out of the aperture, the severed portion of the port 1654 may, for example, pass through the aperture and into a waste chute 1634 (see, e.g. FIG. 112). In some embodiments, the aperture 1898 may include a funnel contour to aid in directing the cut portion of the port 1654 through the aperture 1898.

Referring now to FIGS. 153-156, another example port opener assembly 1840 and cutting cartridge 1800 are depicted. A port opener assembly 1840 such as that shown in FIGS. 153-154 may be positioned at a port opening station 1612 (see, e.g., FIG. 111) in an enclosure 12 (see, e.g., FIG. 111). As shown, a port opener assembly 1840 may include a holder 2400. The holder 2400 may accept a cutting cartridge 1800 which may be periodically replaced as the system 10 is used. The holder 2400 may include a slot 2402 within which the cutting cartridge 1800 may be installed. The holder 2400 may be coupled to a rotary actuator which in the example embodiment is depicted as a stepper motor 2404. The stepper motor 2404 may include an output shaft 2406 to which an arm 2408 may be coupled. The arm 2408 may swing about the axis of the output shaft 2406 as the stepper motor 2404 is powered. The arm 2408 may include a pin 2410.

The cutting cartridge 1800 may include a blade element 1810 and a blade housing 1890. The blade housing 1890 may be formed of a first body 2420A and a second body 2420B. The first and second body 2420A, B may be coupled together in any suitable manner. In the example embodiment, the first body 2420A includes integral pins 2422 which may interference fit, be adhered, solvent bonded, etc. into holes 2424 of the second body 2420B. The blade housing 1890 may include a number of guide slots 2426, 2428. The first guide slot 2428 may extend through the entirety of the blade housing 1890 and may be arcuate. The second guide slot 2426 may be present in the first body 2420A and may also be arcuate. The blade element 1810 may be captured between the first and second body 2420A, B and displaceable within the blade housing 1890.

One of the first and second body 2420A, B may include at least one spring arm 2412. The spring arm 2412 may be integrally formed with a portion of the blade housing 1890. As shown, the spring arm 2412 may include a blade engaging end 2414. A projection 2416 which may extend through a receiving hole 2418 of the blade element 1810 may be included on the blade engaging end 2414 of the spring arm 2412. When assembled (see FIG. 155), the projection 2416 may be partially disposed within the second guide slot 2426. At least one of the first and second body 2420A, B may include a pivot body 2430. A notch 2432 of the blade element 1810 may accept the pivot body 2430. The blade element 1810 may pivot about the pivot body 2430 from home position against a stop wall 2438 of the blade housing 1890 to a deployed position in which the blade element 1810 extends into an aperture 2434 extending through the blade housing 1890. The spring arm 2414 may bias the blade element 1810 to the home position. As the blade element 1810 is displaced between the home position and the deployed position, the projection 2416 may displace along the second guide slot 2426. This may help to constrain motion of the blade element 1810 to a desired swing path.

As the stepper motor 2404 is powered, the arm 2408 may be swung. The pin 2410 of the arm 2408 may traverse along the first guide slot 2428 and may press against a portion of the blade element 1810. This may cause the blade element 1810 to pivotal displace within the blade housing 1890 about the pivot body 2430 toward the deployed position. Additionally, it may cause the spring arm 2412 to become stressed. As the pin 2410 displaces toward the terminal end of the guide slot 2428, the blade element 1810 may be advanced into the aperture 2434 causing any port 1654 tubing in the aperture 2434 to be cut. The stepper motor 2404 may then be powered to drive the pin 2410 in the opposing direction. As mentioned above, the spring arm 2412 may urge the blade element 1810 back to the home positon as the pin 2410 is retracted.

As shown, there may be a wall 2436 surrounding the aperture 2434 on at least one of the first and second bodies 2420A, B. The wall 2436 may prevent a severed end of a port 1654 from falling and resting on a surface of the blade housing 1890. The wall 2436 may instead direct the severed end of the port 1654 such that the severed end falls through the aperture 2434 and out of the cutting cartridge 1800. As a severed portion of a port 1654 exits the aperture the severed portion of the port 1654 may, for example, fall into a waste chute 1634 (see, e.g. FIG. 112).

Referring now to FIGS. 157-159 an exemplary cutting cartridge 1800 with a stationary blade element 1810 is depicted. Cutting cartridges 1800 may be introduced into an enclosure 12 (see, e.g., FIG. 111) of a system 10 through a rapid transfer port 1606 (see, e.g., FIG. 111). The cutting cartridge 1800 may be installed into a port opening station 1612 (see, e.g., FIG. 111) of a system 10 via a gloved interface 352 (see, e.g., FIG. 111) included in the enclosure 12. Cutting cartridges 1800 may be replaced periodically as the system 10 is operated. For example, the cutting cartridge 1800 may be replaced after a fixed number of bags 26 have been opened with the cutting cartridge 1800.

As shown, an example cutting cartridge 1800 may include a cartridge body 1802. The cartridge body 1802 include a first body portion 1804A and a second body portion 1804B. The first and second body portions 1804A, B may be substantially planar and may be coupled to one another in any suitable manner (e.g. adhesive, welding, solvent bonding, etc.). In the example shown in FIGS. 157-159, a number of molded pins 1806 may be included in one of the first and second body portions 1804A, B. The pins 1806 may couple (e.g. interference fit, snap fit, etc.) into apertures of the other of the first and second body portions 1804A, B. Any suitable type of fastener may be used in alternative embodiments.

A number of pegs 1824A-C may project off the cartridge body 1802 and may be molded into each of the first and second body portions 1804A, B or may be installed into a hole in the first and second body portions 1804A, B. The pegs 1824A-C may act as guide elements which may aid in installing a cartridge body 1802 into a receiving slot 1854 (see, e.g., FIG. 160) of a port opener assembly 1840 (see, e.g., FIG. 160). The pegs 1824A-C may also aid in retaining the cutting cartridge 1800 within the port opening assembly 1840. A notch 1827 may be included in a side of the cutting cartridge 1800. Each of the first and second body portions 1804A, B may include a depression 1808. The depression 1808 may provide an ergonomic grasping area at which a user may grasp the cutting cartridge 1800. A sidewall 1820 adjacent the depressions 1808 may also include a recessed region 1822 which may further facilitate grasping of the cutting cartridge 1800.

The cartridge body 1802 may also include a slot 1812 which extends from a sidewall 1816 of the cartridge body 1802 and through the entirety of the cartridge body 1802. The slot 1812 may extend from a sidewall 1816 opposite the sidewall 1820 including the recess 1822. The slot 1812 may include a tapered region 1814 near the sidewall 1816 over which the width of the slot 1812 increases with proximity to the sidewall 1816. The slot may also include a wide region 1818 at an end of the slot 1812 opposite the sidewall 1816. A blade element 1810 may be fixedly retained between the first and second body portions 1804A, B of the cutting cartridge 1800. The blade element 1810 may span across the width of the slot 1812 intermediate the tapered region 1814 and the wide region 1818. The blade element 1810 may be disposed at a diagonal with respect to the slot 1812.

The cutting cartridge 1800 may be provided with a cover coupled into place on the cartridge body 1802 which blocks access to the blade element 1810. In the example embodiment, a blade clip 1826 is coupled into place on the cartridge body 1802. As shown, the clip 1826 may include a first arm 1828A and a second arm 1828B. The arms 1828A, B may have a width equal to or greater than the width of the slot 1812 at the location of the blade element 1810. Thus, the arms 1828A, B may block access to the blade element 1810 when the blade clip 1826 is installed on the cartridge body 1802. The blade clip 1826 may clip into placed around that blade element 1810 to retain the blade clip 1828 in place on the cartridge body 1802.

The arms 1828A, B may be coupled to one another by a bridge 1830 of material. An end of each arm 1828A, B on a first side of the bridge 1830 may be pinched together to cause spreading apart of the opposing ends of the arms 1828A, B. This may allow the clip 1826 to be removed from the cartridge body 1802. As shown, at least one of the ends of the arms 1828A, B proximal the blade element 1810 may include a projection 1832. The projection 1832 may extend from the arm 1828A, B toward the opposing arm 1828A, B a distance greater than a distance from the blade element 1810 to the arm 1828A, B including the projection 1832. The projection(s) 1832 may abut into a portion (e.g. backside) of the blade element 1810 in the event that a pulling force is exerted on the clip 1826. This may help to inhibit inadvertent dislodgement of the clip 1826 from the cutting cartridge 1800. Pinching of the arms 1828A, B may spread the ends of the arms 1828A, B proximate the blade element 1810 an amount sufficient to allow the projections 1832 to clear the blade element 1810.

As a port 1654 of a bag 26 is displaced into the slot 1812, the tapered region 1814 may help to guide the port 1654 into the slot 1812 in the event that the port 1654 is bent or bowed. As the port 1654 is advanced along the slot 1812, the port 1654 may contact the blade element 1810. The blade element 1810 may cause a sealed end of the port 1654 to be cut off as the port 1654 is further advanced into the blade element 1810. The wide region 1818 of the slot 1812 may provide an aperture through which the severed end of the port 1654 may pass. The wide region 1818 may be aligned over a catch which may direct the severed end into a waste chute 1634 (see, e.g., FIG. 112) of the enclosure 12.

Referring now to FIGS. 160-161, an example embodiment of a port opener assembly 1840 is depicted. A port opener assembly 1840 such as that shown in FIGS. 160-161 may be positioned at a port opening station 1612 (see, e.g., FIG. 111) in an enclosure 12 (see, e.g., FIG. 111). The port opener assembly 1840 may accept a cutting cartridge 1800 such as that described in relation to FIGS. 157-159. As shown, the port opener assembly 1840 may include a cartridge housing 1842. The cartridge housing 1842 may be defined by a first body portion 1844 and a second body portion 1846. The first and second body portions 1844, 1846 may be coupled together via one or more fastener (or adhesive, solvent bonding, weld, etc.). One of the first and second body portions 1844, 1846 may include a number of locating projection 1850 which may seat into locating wells 1852 of the other of the first and second body portions 1844, 1846. In some embodiments, each of the locating projections 1850 and locating wells 1852 may include a portion of a threaded bore. When the first and second body portions 1844, 1846 are assembled together, a fastener 1848 may be threaded into these threaded bores to couple the first and second body portions 1844, 1846 to one another. The cartridge body 1842 may include a main portion 1843 and a projecting portion 1845.

At least one of the first and second body portions 1844, 1846 may include a recess 1856. The recess(es) 1856 may form a receiving slot 1854 for a cutting cartridge 1800 when the first and second body portions 1844, 1846 are coupled to one another. The receiving slot 1854 may extend through the main portion 1843 of the cartridge housing 1842. The receiving slot 1854 may also extend within a portion of the projecting portion 1845.

A groove 1858 may be cut into one of the first and second body portions 1844, 1846. The groove 1858 may extend from a sidewall 1862 of the cartridge housing 1842. The groove 1858 may include a detent notch 1860 which may branch off of the groove 1858. An end of the groove 1858 opposite the sidewall 1862 may include a depression 1864. A spring loaded pin 1866 may extend at least partially into the depression. Though a spring loaded pin 1866 is shown, other embodiments may include another suitable bias member. For example, the spring loaded pin may be replaced by a molded spring arm which may be formed integrally with the body portion 1844, 1846.

The other of the first and second body portions 1844, 1846 may include a groove or alternatively a channel 1868 which extends through that body portion 1884, 1846. The channel 1868 may extend from the sidewall 1862 of the cartridge housing 1842 to a second detent notch 1868. When the first and second body portions 1844, 1846 are coupled to one another, the detent notches 1860, 1870 may be positioned in alignment with one another.

A pivot arm 1872 may be coupled to the cartridge housing 1842. The pivot arm 1872 may pivot about the axis of a pivot pin 1874 which extends through at least a portion of the cartridge housing 1842. The pivot arm 1872 may be biased, via a bias member 1876 (e.g. torsion spring) to a home orientation. The pivot arm 1872 may be pivoted from the home position (shown) toward a cavity 1875 in the cartridge housing 1842 and into an actuated position. The pivot arm 1872 may automatically be urged back to the home position by the bias member 1876. In some embodiments, the cartridge housing 1842 may include a projection or stop which may inhibit rotation of the pivot arm 1872 beyond the home position.

In some embodiments, the cartridge housing 1842 may include at least one pivot arm sensor 1877A, B. The pivot arm sensor(s) 1877A, B may generate an output signal which may change in relation to the pivotal location of the pivot arm 1872. Any suitable sensor type may be used. For example, an encoder or rotary potentiometer may monitor rotation of the pivot arm 1872 about the pivot pin 1872 or a magnetic or inductive sensor may monitor the position of a metallic body on the pivot arm 1872. As shown, the pivot arm sensors 1877A, B are depicted as a first and second microswitch. When the pivot arm 1872 is in the home position the microswitch forming the first pivot arm sensor 1877A may be depressed. When the pivot arm 1872 is in the actuated position, the microswitch forming the second pivot arm sensor 1877B may be depressed.

A sensor 1878 may also be coupled to the cartridge housing 1842. The sensor 1878 may be positioned to monitor the receiving slot 1854. In the example shown, the sensor 1878 is disposed along an edge of the receiving slot 1854. The sensor 1878 may monitor for the presence of a cutting cartridge 1800 in the receiving slot 1854. The sensor 1878 may also detect improper loading of a cutting cartridge 1800 into the receiving slot 1854. The sensor 1878 may generate a data signal indicative of the presence, absence, or improper loading of a cutting cartridge 1800 in the receiving slot 1854. Depending on the sensor 1878 used, the sensor 1878 may only sense presence or absence of a cutting cartridge 1800. The sensor 1878 may be any suitable sensor type. For example, the sensor 1878 may be, though is not limited to, a magnetic sensor (the cutting cartridge 1800 would include a magnetic or metallic body in such examples), inductive sensor, an ultrasonic sensor, a beam interrupt sensor, optical sensor, or microswitch. In some embodiments, the blade element 1810 of the cutting cartridge 1800 may be a metallic body and the sensor 1878 may be configured to sensor the presence and/or position of the blade element 1810.

Referring now to FIGS. 162-163, when a cutting cartridge 1800 is installed in the receiving slot 1854, the pegs 1824A-C may displace along the groove 1858 and channel 1868 of the receiving slot 1854. The groove 1858 and channel 1868 may act as guides which may direct a cutting cartridge 1800 along a desired path as the cutting cartridge 1800 is installed into the port opener assembly 1840. Peg 1824C of the cutting cartridge 1800 may displace into and depress the spring loaded pin 1866 of the cartridge body 1842. Once the spring loaded pin 1866 is depressed, the cutting cartridge 1800 may then be shifted to displace pegs 1824A, B toward the detent notches 1860, 1870. The cutting cartridge 1800 may then be released. As the spring loaded pin 1866 restores from the depressed state, the cutting cartridge 1800 may be pressed backwards and the pegs 1824A, B may seat into engagement with the detent notches 1860, 1870 (best shown in FIG. 163).

In the example embodiment, the sensor 1878 may be a beam break sensor. The beam of the sensor 1878 may not be broken until the cutting cartridge 1800 is fully installed into the receiving slot 1854. The notch 1827 may ensure that the beam has clearance as the cutting cartridge 1800 is being advanced into the receiving slot 1854. The notch 1827 of the cutting cartridge 1800 may, for example, provide clearance for the beam of the sensor 1878 until the pegs 1824A, B are in engagement with the detent notches 1860, 1870. Once the pegs 1824A, B are urged into engagement with the detent notches 1860, 1870, the notch 1827 may pass out of alignment with the beam. At this point, the cartridge body 1802 may to interrupt the beam of the sensor 1878 such that the sensor 1878 may register that the cutting cartridge 1800 is properly installed in the receiving slot 1854.

To remove a cutting cartridge 1800, the cutting cartridge 1800 may be pressed into the receiving slot 1854 such that the peg 1824C again depresses the spring loaded pin 1866. This may move pegs 1824A, B out of engagement with the detent notches 1860, 1870. The cutting cartridge 1800 may be shifted to displace pegs 1824A, B toward the channel 1868 and groove 1858. The cutting cartridge 1800 may then be extracted from the receiving slot 1854.

Referring now to FIGS. 164, an example port opening station 1612 is depicted. A grasper 1624 of a robotic arm 360 (see, e.g., FIG. 111) in which a bag 26 is held is shown approaching a port opening assembly 1840 of the port opener station 1612. As the grasper 1624 approaches, the robotic arm 360 may align a port 1654 of the bag 26 with the slot 1812 of the cutting cartridge 1800. Referring now also to FIG. 165, the robotic arm 360 may then displace the grasper 1624 such that the port 1654 of the bag 26 is positioned within the slot 1812 between the pivot arm 1872 of the port opening assembly 1840 and the blade element 1810 of the cutting cartridge 1800. In some examples, the grasper 1624 may be displaced under the pivot arm 1872 and then raised to displace the port 1654 into position.

Referring now also to FIG. 166, to open the port 1654, the robotic arm 360 (see, e.g., FIG. 111) may displace the grasper 1624 such that the port 1654 is driven into the blade element 1810 of the cutting cartridge 1800. As shown, the grasper 1624 may include a boom element 1900. The boom element 1900 may be a rigid member which is fixedly coupled to the grasper 1624. As the grasper 1624 drives the port 1654 toward the blade element 1810, an end of the boom element 1900 may contact a surface of the pivot arm 1872 of the port opening assembly 1840. The boom element 1900 may include a roller 1902 on the end of the boom element 1900 which contacts the pivot arm 1872. As the grasper 1624 advances the port 1654 into the blade element 1810, the boom element 1900 may press against the pivot arm 1872 and cause the pivot arm 1872 to rotate. The pivot arm 1872 may thus be displaced so as to closely follow behind the portion of the port 1654 which is to be severed in order to open the port 1654. As the port 1654 is cut, the pivot arm 1872 may press the port 1654 against the blade element 1810. Additionally, once the port 1654 has been cut open by the blade element 1810, the pivot arm 1872 may sweep the severed end of the port 1654 past the blade element 1810 to the cavity 1875 (see, e.g., FIG. 161) in the cartridge housing 1842. Once in the cavity 1875, the severed portion of the port 1654 may fall through the wide region 1818 of the slot 1812 and out of the port opening assembly 1840. In certain examples, the severed portion of the port 1654 may fall or be directed into a waste chute 1634 (see, e.g., FIG. 111) included in the enclosure 12 (see, e.g., FIG. 111) after passing out of the port opening assembly 1840.

As shown, the cartridge housing 1842 may include at least one opening 1873 through the cartridge housing 1842 into the cavity 1875. Where the enclosure 12 of the system 10 is positively pressurized, the opening may allow clean filtered air blown into the system 10 into the cavity 1875. This may aid in creating a draft which may tend to blow the severed end of a port 1654 downwardly through the wide region 1818 of the slot 1812 and out of the port opening assembly 1840.

Referring now to FIG. 167, once a port 1654 of a bag 26 has been opened at the port opening station 1612 (see, e.g., FIG. 111), the bag 26 may be displaced to a filling station 1614 of the system 10. As shown, a filling station 1614 may include a fill assembly 1908. The fill assembly 1908 may include a fill nozzle 1910 which may be coupled to a terminal end of a supply line 1912 that carries purified water or a mixed fluid (e.g. saline). The fill assembly 1908 may also include a drain assembly 1914. A funnel shaped drain inlet 1916 and drain line 1918 may be included in the drain assembly 1914. The drain inlet 1916 and drain line 1918 may pivot between a nozzle aligned position under the fill nozzle 1910 and a retracted position (shown) in which the drain inlet 1916 has been displaced so that a bag 26 may be placed in the fill assembly 1908. Example embodiments of drain assemblies are as described above in relation to FIGS. 71A-71B. The fill assembly 1908 may also include a bag sensing assembly 1920. The bag sensing assembly 1920 may include a number of a bag characteristic sensors 444A-C. Bag characteristic sensors 444A-C and sensing of bag 26 traits may be as described above with respect to FIG. 66.

Referring now to FIGS. 168-169, the fill assembly 1908 may include a grasper 1922. The grasper 1922 may be opened (FIG. 168) by a grasper driver 1924 to accept ports 1654 of a bag 26 and driven closed (FIG. 169) once the robotic arm 360 (see, e.g., FIG. 111) has displaced to preprogrammed bag 26 docking coordinates. Coordination of the grasper 1922 and the robotic arm 360 may be orchestrated by the control system 15 (see, e.g., FIG. 111). As a bag 26 is displaced into the fill assembly 1908, the opened port 1654 may be seated against the outlet of the fill nozzle 1910. As mentioned elsewhere herein, the robotic arm 360 (see, e.g., FIG. 111) may collect and displace other bags 26 to various stations of the system 10 as a bag 26 is filled at the fill station 1614.

The grasper 1922 shown in the example fill assembly 1908 includes a set of opposed jaws 1926A, B which may be displaced toward one another to capture ports 1654 of a bag 26 therebetween. In the example embodiment, the jaws 1926A, B include a first jaw tier 1928A and a second jaw tier 1928B. The first jaw tiers 1928A may capture the unopened ports 1654 of the bag 26. The second jaw tiers 1928B may be disposed more proximate the fill nozzle 1910 than the first jaw tiers 1928A. The second jaw tiers 1928B may close around the opened port 1654 at a point which is close the fill nozzle 1910. Thus, the second jaw tiers 1928B may serve to constrain the open port 1654 in alignment with the axis of the fill nozzle 1910 and help to ensure that the fill nozzle 1910 correctly seats into the opened port 1654.

Referring now to FIG. 170, an exemplary fill nozzle 1910 is depicted. As mentioned elsewhere herein, the fill nozzle 1910 may be included as part of a fluid supply set. The fluid supply set may be coupled to the output of a mixing circuit 348 and may be periodically replaced as the system 10 is used. The fluid supply set may include the supply line 1614 shown in FIGS. 167-169 and the sterilizing filter 1642 shown in FIG. 112 for example. A connector or fitting for coupling may also be included in a fluid supply set to facilitate coupling to an output of, for example, a mixing circuit 348 (see, e.g., FIG. 205).

The fill nozzle 1910 may include an inlet end 1930 and an outlet end 1934. The supply line 1640 (see, e.g., FIG. 167) may be coupled over the inlet end 1930. The inlet end 1930 may include at least one barb 1936 (two are shown in the example embodiment). The at least one barb 1936 may aid in retaining the supply line 1640 in place on the fill nozzle 1910. The fill nozzle 1910 may also include a midbody 1932. The midbody 1932 may be wider than the remainder of the fill nozzle 1910 and may be disposed between the inlet and outlet ends 1930, 1934 of the fill nozzle 1910. The change in width from the inlet and outlet ends 1930, 1934 to the midbody 1932 may be continuous as opposed to step-wise in certain examples. In the exemplary embodiment of FIG. 170, the midbody 1932 may include variable width transition spans at each end of the midbody 1932 which from the transition between the inlet and outlet ends 1930, 1934 and the midbody 1932. In the example embodiment, the midbody 1932 includes a rounded end 1938 and an opposing tapered end 1940 for the variable width transition spans. The midbody 1932 may include a series of ribs 1942, ridges, bumps, nubs, or other texturing to facilitate grasping by a user through a glove interface 352 (see, e.g. FIG. 111).

Referring now also to FIGS. 171-172C, the fill nozzle 1910 may be installed within a nozzle dock 1944. The nozzle dock 1944 may include a stationary body 1946 and a clasping body 1948. The stationary body 1946 may be retained in a fixed position within the enclosure 12 (see, e.g., FIG. 111) when bags 26 are being filled. The clasping body 1948 may be displaceable along an axis with respect to the stationary body 1946 between a clasping position (shown in FIG. 171) and an open position (see, FIG. 172A). The clasping body 1948 may be biased to the clasping position by at least one bias member 1952.

A fill nozzle 1910 may be captured within the nozzle dock 1944 at two capture points. The clasping body 1948 may receive a portion of the fill nozzle 1910 and the stationary body 1946 may receive another portion of the fill nozzle 1910. When the clasping body 1948 is in the clasping position, a portion of the fill nozzle 1910 may be captured by the clasping body 1948 and a portion of the fill nozzle 1910 may be captured by the stationary body 1946.

As shown, a portion of the nozzle dock 1944 is broken away in FIG. 171. The clasping body 1948 may displace along guide projections 1950 included on each side of the stationary body 1946. The clasping body 1948 may be coupled to the stationary body 1946 via fasteners 1954. The fasteners 1954 may extend through bores 1958 (only one shown in FIG. 171) in the stationary body 1946, through an associated one of the guide projections 1950, and into threaded engagement with holes in the clasping body 1948. A bias member 1952 may be captured between an end of each bore 1958 and a head 1956 of each fastener 1954. As the clasping body 1948 is displaced to the open position, the fasteners 1954 may be displaced in tandem as they are threadedly engaged with the clasping body 1948. The head 1956 of each fastener 1954 may cause the associated bias member 1952 to become stressed (compressed in the example embodiment) as the head 1956 displaces along the bore 1958. When the clasping body 1948 is released, the bias members 1952 may restore to a less stressed state urging the fasteners 1954 and clasping body 1948 to return to the clasping position.

The stationary body 1946 and clasping body 1948 may each include a notch 1960. The notches 1960 in the stationary body 1946 and the clasping body 1948 may each lead to a transition span receptacle. In the example shown, the stationary body 1946 may include a tapered recess 1962 to which the notch 1960 in the stationary body 1946 extends. The clasping body 1948 may include a rounded recess 1964 to which the notch 1960 in the clasping body 1948 extends.

As shown in the progression of FIGS. 172A-172C, to install a fill nozzle 1910 into the nozzle dock 1944, the inlet end 1930 may be introduced into the notch 1960 in the clasping body 1948 and the rounded end 1938 of the midbody 1932 may be seated into the rounded recess 1964. The clasping body 1948 may be pulled to the open position (FIG. 172A). The fill nozzle 1910 may then be rotated such that the outlet end 1934 passes into the notch 1960 in the stationary body 1946 (FIG. 172B). The rounded end 1938 of the midbody 1932 and rounded recess 1964 within which it is disposed may act as a ball and socket type interface to facilitate rotation of the fill nozzle 1910. The clasping body 1948 may then be released and the bias members 1952 may return the clasping body 1948 to the clasping position. As the clasping body 1948 is urged toward the clasping position, the tapered end 1940 of the midbody 1932 may seat into the tapered recess 1962 of the stationary body 1946. When the clasping body 1948 reaches the clasping position, the fill nozzle 1910 may be clasped in place within the nozzle dock 1944 (FIG. 172C). The interaction of the rounded end 1938 with the rounded recess 1964 and the tapered end 1940 with the tapered recess 1962 may cause the fill nozzle 1910 to self-center within the nozzle dock 1944 under the bias force of the bias members 1952. As the stationary body 1946 may be fixedly mounted within an enclosure 12 (see, e.g., FIG. 111), this self-centering may ensure that the outlet end 1934 of the fill nozzle 1910 is reliably and repeatably located in a known position. This may facilitate displacement of a port 1654 of a bag 26 into engagement with the outlet end 1934 via a robotic arm 360

(see, e.g., FIG. 111) while imposing minimal burden on a user as a fluid supply set is replaced. The midbody 1932 may have a length which prevents the bias members 1952 to from returning to a fully relaxed state. Thus, the bias members 1952 may be somewhat stressed when fill nozzle 1910 is installed. This may help to ensure that the fill nozzle 1910 remains centered in the nozzle dock 1944 during use.

As shown in FIGS. 171-172C, the nozzle dock 1944 may also include at least one dock sensor 1966 (see also FIG. 173). The at least one dock sensor 1966 may monitor the position of the clasping body 1948. The at least one dock sensor 1966 may also monitor for the presence and/or proper installation of a fill nozzle 1910 within the nozzle dock 1944. A control system 15 of the system 10 may receive data signals from the at least one dock sensor 1966 and may inhibit filling of bags 26 in the event that the clasping body 1948 is not in the clasping position and/or when a fill nozzle 1910 is not properly seated within the nozzle dock 1944. The control system 15 may also base a fluid supply set replacement schedule on data from the at least one dock sensor 1966. For example, when the control system 15 receives an indication that a fill nozzle 1910 has been installed, a counter (e.g. number of bags 26 which can be filled before replacement of fill nozzle 1910) may be reset.

Referring now to FIGS. 173-174, in certain embodiments, the nozzle dock 1944 may not include a clasping body 1948 which is displaceable with respect to a stationary body 1946 of the nozzle dock 1944. Instead the nozzle dock 1944 may include a main body 1921 from which two nozzle cradles 1923 project. Each of the nozzle cradles 1923 may be immobile and may not displace with respect to one another. Each of the nozzle cradles 1923 may include a notch 1960. As with the embodiment described in relation to FIGS. 171-172C, each of the notches 1960 may extend to a transition span receptacle. One of the transition span receptacles may be a rounded recess 1964 and the other may be a tapered recess 1962.

In such embodiments, the fill nozzle 1910 may include a first portion 1931 and a second portion 1933 which are displaceable with respect to one another. The first portion 1931 may include the inlet end 1930 and a portion of the midbody 1932. The outlet end 1934 may also be included as part of the first portion 1931. As shown, an intermediary conduit segment 1935 may connect the outlet end 1934 to the remainder of the first portion 1931. The second portion 1933 may include a portion of the midbody 1932. The second portion 1933 may include a pocket 1939. A retainer clip 1927 may be coupled into a notch on the outlet end 1934 and may inhibit separation of the first and second portion 1931, 1933. The midbody 1932 may include the same transition spans described above in relation to FIG. 170. In alternative embodiments, the retainer clip 1927 may be replaced by a press fit feature molded into the outlet end 1934.

The first portion 1931 and second portion 1933 may be biased apart from one another by at least one bias member 1937. In the example embodiment the bias member 1937 is depicted as a compression spring. The bias member 1937 may be disposed within the pocket 1939 of the second portion 1933 and may exert a bias force against the portion of the midbody 1932 included in the first portion 1931. When the bias member 1937 is in a relaxed state, the midbody 1932 portions of the first and second portion 1931, 1933 may be spread apart from one another by a distance. This distance may be controlled based on the location of the retainer clip 1927 on the outlet portion 1934 as the retainer clip 1927 may prevent displacement of the second portion 1933 beyond the location of the retainer clip 1927.

To install the fill nozzle 1910 in the nozzle dock 1944, inlet end 1930 may be introduced into the notch 1960 in the one of the cradles 1923. The rounded end 1938 of the midbody 1932 may be seated into the rounded recess 1964. The second portion 1933 of the fill nozzle 1910 may then be pressed against the first portion 1931 to decrease the distance between the first and second portion 1931, 1933 and compress the bias member 1927. This may allow the fill nozzle 1910 to be rotated such that the outlet end 1934 passes into the notch 1960 in the opposing cradle 1923. The rounded end 1938 of the midbody 1932 and rounded recess 1964 within which it is disposed may act as a ball and socket type interface to facilitate rotation of the fill nozzle 1910. The second portion 1933 may then be released and the bias member 1927 may urge the tapered end 1940 of the midbody 1932 into the tapered recess 1962 of that cradle. When the fill nozzle 1910 is so installed in the nozzle dock 1944, the bias member 1927 may not be in a completely relaxed state. The bias member 1927 may exert some pressure against the first and second portion 1931, 1933. The interaction of the rounded end 1938 with the rounded recess 1964 and the tapered end 1940 with the tapered recess 1962 may cause the fill nozzle 1910 to self-center due to this pressure. This self-centering may help to ensure that the outlet end 1934 of the fill nozzle 1910 is reliably and repeatably located in a known position.

Referring now to FIGS. 175 and 176, after a bag 26 has been filled and sealed (e.g. via tube sealing assembly 906 of FIGS. 248-249), the bag 26 may be displaced to a labeling station 1618. A labeling station 1618 may include a receiving bay 1970, a labeler 1972, and an actuator assembly 1974. The receiving bay 1970 may be a basket, bin or similar container into which a robotic arm 360 or gantry may lower a filled and sealed bag 26. The labeler 1972 may be any suitable labeler. In the example embodiment, a thermal transfer ribbon labeler 1972 is shown. A wall 1978 of the receiving bay 1970 may include a print aperture 1980. Printing components (e.g. a transfer ribbon and print head) of the labeler 1972 may access the receiving bay 1970 via the print aperture 1980. The actuator assembly 1974 may include at least one actuator 1982 which may be powered to displace a pressure plate 1976 coupled to an output shaft 1984 of the actuator 1982. Guide rods 1986 attached to the pressure plate 1976 which may displace along slide bearings 1988 may also be included in the actuator assembly 1974. Alternatively, the guide rods 1986 may be stationary and slide bearings 1988 may slide along the guide rods 1986.

Once a filled and sealed bag 26 has been displaced (e.g. lowered into, for example, the system 10 of FIG. 111) into the receiving bay 1970, the actuator assembly 1974 may be powered. This may drive the pressure plate 1976 against the bag 26 and press the bag 26 against the wall 1978 of the receiving bay 1970 including the print aperture 1980 (see FIG. 176). The guide rods 1986 may aid in ensuring that the pressure plate 1976 remains perpendicular to the axis of the output shaft 1984 and parallel to the wall 1978. With the bag 26 pressed against the wall 1978, the labeler 1972 may create a label for the bag 26. In the example embodiment, the labeler 1972 may print a label directly on the exterior surface of the bag 26. Pressure applied via the pressure plate 1976 of the actuator assembly 1974 may ensure that the exterior of the bag 26 is flat when labeling of the bag 26 occurs. The bag 26 may then be displaced to an output assembly 1626 (see, e.g., FIG. 111) which may include a slide or chute (see, e.g., output chute 560 of FIG. 108) and dispensed from the enclosure 12 (see, e.g., FIG. 111).

Referring now to FIG. 177, another exemplary system 10 for producing and packaging medical fluids is depicted. As shown, the system 10 may include a medical water production device 14 such as any of those depicted herein. The system 10 may also include a mixing circuit 348 for generating a specified solution (e.g. 0.9% saline). The system 10 may include a sensor suite 350 which may monitor the quality of purified water produced by the medical water production device 14 and may monitor the solution generated by the mixing circuit 348. The sensor suite 350 may include any number of different types of water quality sensors. Any water quality sensors described herein may be included. An example mixing circuit 348 and an example sensor suite 350 are described later in the specification.

The system 10 also includes an enclosure 12. The enclosure 12 may provide a clean room environment for the components of the system 10 contained therein. The enclosure 12 itself may also be contained within a clean room environment. In such embodiments, the enclosure 12 may be maintained at a higher clean room standard than the room in which it is located. In some embodiments, the enclosure 12 may be held at positive pressure by a blower system 600.

In the example embodiment, the enclosure 12 is partitioned into a first section 96 and a second section 98. Each of these sections may be held at slightly different positive pressures. For example, the first section 96 may be held at a first pressure which is positive with respect to the surrounding environment. The second section 98 may be held at a pressure higher than the first pressure. Filling of bags 26 may occur in the most stringently controlled environment of the system 10. Various filters such as HEPA filters may be included to help ensure any air blown into the enclosure 12 to maintain positive pressure is clean.

Referring now also to FIG. 178, the first section 96 may be an antechamber which may be utilized for preparing various consumables used by the system 10. For example, a stock of bags 26 may be placed in the antechamber. Stopper magazines 466 (such as any of those described herein) may also be stocked within the antechamber. Sampling vials 532 (see, e.g., FIG. 103) may also be kept in stock within the antechamber. This may help to minimize the need to access the interior of the enclosure 12 during operation of the system 10. The first section 96 may also include certain testing equipment that may be used to verify bags 26 have been filled according to predefined criteria. Sampling ports in the fluid circuit may be accessible via the antechamber as well.

The second section 98 may be constructed as a glove box type enclosure with gloved interfaces 352 which may be used to manipulate certain components of the system 10 within the enclosure 12. The second section 98 may include a filling subsystem 610 of the system. A filling subsystem 610 may include a bag retainer 602, filling station 356, and a sealing station 358. A bag 26 may be collected from the antechamber through a door 604 between the first section 96 and second section 98 of the enclosure 12 via the gloved interfaces 352. This bag 26 may be placed at the bag retainer 602. A robotic manipulator 606 including a grasper may collect the bag 26 from the bag retainer 602 and displace the bag 26 to the filling station 356. Fluid may be dispensed into the bag 26 at the filling station 356. This fluid may be purified water (e.g. WFI water), or a mixture of fluid generated at a mixing subsystem similar to those described in relation to FIG. 2A and FIG. 2B. Bags 26 may also include a concentrate as described above in relation to FIGS. 5A-6 for example. From the filling station 356, the robotic manipulator 606 may displace the filled bag 26 to a sealing station 358. An access to the interior volume of the bag 26 may be sealed closed at the sealing station 358 (e.g. via stoppering, RF welding, etc.).

As shown, the example embodiment includes a bag retainer 602 which may hold a single bag 26 at a time. In alternative embodiments, the bag retainer 602 may be replaced by a bag feeder 354 similar to that described above in relation to FIGS. 59-65 for example. Similarly, the bag feeder 354 shown in the example system 10 in FIG. 58 may be replaced by a bag retainer 602. A bag retainer 602 may be useful in implementations where only a small amount of bags 26 need to be produced or where a system 10 with a smaller footprint may be desired. A bag retainer 602 may further be useful in scenarios where the type of bag 26 filled by the system 10 is frequently changed.

Referring now to FIG. 179-180B, the bag retainer 602 may include a clasp 612 that may be pivotally attached to a base plate 614. The clasp 612 may be opened and a user may, via the gloved interfaces 352, hold a bag 26 in place at the bag retainer 602. The clasp 612 may then be closed against the base plate 614. The clasp 612 may frictionally retain a port 392 of the bag 26. In some embodiments, the clasp 612, base plate 614 or both the clasp 612 and base plate 614 may include a receptacle 616 which accepts a member 618 included on the port 392 to aid in retaining the bag 26 in place in the bag retainer 602. The clasp 612 may latch in place when in the closed position. This latching may be accomplished via a mechanical latch or may be accomplished via a magnet in one of the base plate 614 and clasp 612 and a metallic and/or magnetic body in the other of the base plate 614 and clasp 612. The bag retainer 602 may also aid in locating a port 392 of the bag 26 through which the bag 26 is to be filled in a fixed and known location. As shown, the bag retainer includes a locating pin 615 (see also FIG. 182). The bag 26 may be loaded into the bag retainer 602 such that the locating pin 615 is seated into the filling port 392. As the locating pin 615 is fixed, locating pin 615 may ensure that the filling port 392 is in a known location prior to retrieval of the bag 26.

Referring now to FIG. 181, with a bag 26 in place in the bag retainer 602, the control system 15 of the system 10 may displace a robotic manipulator 606 to the bag retainer 602. In the example embodiment, the robotic manipulator 606 may be displaceable about a number of axes. In the example embodiment, a first rail 622 defining a first axis along which the robotic manipulator 606 may be displaced is included. The robotic manipulator 606 may include a grasper 620 which may close around the ports 392 of the bag 26 to grasp the bag 26. The grasper 620 may be included on a second rail 624 defining a second axis along which the grasper 620 of the robotic manipulator 606 may be displaced. The second axis is substantially perpendicular to the first axis in the example embodiment.

As shown in FIG. 182, once the bag 26 has been grasped, the robotic manipulator 606 may displace the grasper 620 downward along the second rail 624 to pull the bag 26 free of the bag retainer 602. In some embodiments, the downward force exerted by the robotic manipulator 606 cause the clasp 612 of the bag retainer 602 to open. In other embodiments, the force may not open the clasp 612, but be sufficient to overcome any frictional forces holding the bag 26 in place within the bag retainer 602. The robotic manipulator 606 may then displace along the first rail 622 to move the bag 26 toward the filling station 356 as shown in FIG. 183.

Referring now to FIG. 184A, once the robotic manipulator 606 has displaced the bag 26 such that a port 392 of the bag 26 is in alignment with a filling nozzle 430, the control system 15 may command the robotic manipulator 606 to raise the grasper 620 toward the filling station 356. In the example shown, the fill nozzle 430 is also displaceable and the fill nozzle 430 may be displaced toward the port 392 while the grasper 620 of the robotic manipulator 606 is raised. The fill nozzle 430 may be tapered so as to help the fill nozzle 430 enter into the port 392 of the bag 26 as shown in FIG. 184A. Once the fill nozzle 430 is located within the port 392 the control system 15 may command the filling station 356 to dispense fluid into the bag 26. Though not shown in FIG. 184A, in some embodiments, the filling station 356 may include a set of bag characteristic sensors 444A-C such as those shown and described in relation to FIG. 66 for example. As described elsewhere herein, the control system 15 may determine a fill volume for the bag 26 based on data collected from the bag characteristic sensors 444A-C.

Referring now to FIG. 184B, the filling nozzle 430 may be included in a bias assembly 611 including a bias member 613 which exerts a force against the filling nozzle 430 that tends to press the filling nozzle 430 firmly into the port 392 of the bag 26. A bias assembly 611 may also be included in other filling stations 356 described herein such as that shown and described in relation to FIG. 66. As shown, the filling nozzle 430 is coupled (integral with in the example) an inlet fitting 617. In the example, a section of conduit 619 connects the inlet fitting 617 and filling nozzle 430. The conduit 619 may include a flange 621. A housing 623 (see FIG. 184A) including a main body 627 and an end cap 625 is also shown. The end cap 625 may include a passage through which the filling nozzle 430 may project, but too small for the flange 621 to pass through. When the conduit 619 and bias member 613 are housed within the housing 623, the bias member 613 may be loaded between an interior face of the housing 623 and the flange 621. The port 392 of the bag 26 may press the filling nozzle 430 into the housing 623 against the force exerted by the bias member 613 during filling. The restoring force of the bias member 613 may consequentially push the filling nozzle 430 robustly into the port 392. In the example, the bias member 613 is shown as a compression spring. In alternative embodiments, any suitable bias member 613 may be used.

Referring now to FIGS. 185-188, once the bag 26 has been filled, the bag 26 may be lowered away from the fill nozzle 430 by displacing the grasper 620 along the second rail 624. The fill nozzle 430 may also be raised. The robotic manipulator 606 may be displaced along the first rail 622 toward the sealing station 358. The sealing station 358 may include a support cradle 626. The support cradle 626 may help to locate and hold the port 392 of bag 26 during a sealing operation. In the example embodiment, the robotic manipulator 606 is displaced such that the bag 26 is moved slightly passed a position in which the port 392 to be sealed would be aligned with the ram 464 (FIG. 186). The grasper 620 may be displaced along the second rail 624 to raise the bag 26 toward the sealing station 358 (FIG. 187). The robotic manipulator 606 may then be displaced so as back track along the rail 622 and bring the port 392 into the support cradle 626. This may guide the port 392 into alignment with the ram 464.

Referring now to FIG. 189, an example support cradle 626 is depicted. As shown, the support cradle 626 may include a trough 760. The trough 760 may include a first portion 762A and a second portion 762B. The first portion 762A of the trough 760 may extend to a funneled opening 764 in a top face 766 of the support cradle 626. The funneled opening 764 may aid in directing stoppers 476 into the trough and into alignment with the axis of the port 392 of the bag 26 which is to be sealed. The first portion 762A may also be referred to as a stopper guide portion of the trough 760 and may be sized so surround the majority of the stopper 476 so as to guide the stopper 476 as the ram 464 translationally displaces the stopper 476 into the port 392. The second portion 762B of the trough 760 may locate the port 392 during the sealing process. As shown in FIG. 188, the port 392 may be displaced into the trough 760 in a direction which is generally perpendicular to the axis of the trough 760. The second portion 762B of the trough 760 may be flanked by contoured walls 768. The contoured walls 768 may aid in channeling the port 392 into the second portion 762B of the trough 760 as this perpendicular displacement occurs. The trough 760 of the example support cradle 626 may also include a ledge 770. The ledge 770 may form a stop surface which may catch on the step 516 of the stopper 476 as the stopper 476 is displaced into the port 392 of the bag 26. Two removal notches 772 flanking the trough 760 above the ledge 770 are also recessed into the support cradle 626. These notches 772 may allow the port 392 to easily displace out of the support cradle 626 once the stopper 476 is in place in the port 392.

Referring now also to FIG. 190, to seal the port 392 the control system 15 may command a ram driver 462 of the sealing station 358 to advance the ram 464 toward the port 392 of the bag 26 which is to be sealed. The ram 464 may drive a stopper 476 from the stopper magazine 466 into the port 392 to seal the port 392. As mentioned above, the funneled opening 764 and stopper guide portion 762A of the support cradle 626 may aid in ensuring that the stopper 476 cleanly enters into the port 392. The control system 15 may then command the ram driver 462 to retract the ram 464 and the robotic manipulator 606 may be actuated to remove the bag 26 from the sealing station 358. The control system 15 may then displace the robotic manipulator 606 to a drop off location for the bag 26 as shown in FIG. 191.

Referring now to FIG. 192, the filling subsystem 610 may include a directing chute 628 which aids in directing the bag 26 once released from the grasper 620. The robotic manipulator 606 may also include a guide plate 630. The guide plate 630 may ensure that as the bag 26 is released from the grasper 620, the bag 26 is directed onto the directing chute 628. Once the bag 26 has reached the bottom of the directing chute 628, the bag 26 may be manually labeled via the gloved interfaces 352 or placed in a quarantine repository 362 while various testing (e.g. the endotoxin testing described above) is completed.

Referring now to FIGS. 193-194, in certain embodiments, a system 10 may fill a plurality of bags 26 in parallel at the same time. The bags 26 may be provided in packets 1082 within a carrier 1080. The carrier 1080 may include a number of a number of compartments 1084 in which the packets 1082 may be held. In the example embodiment, the carrier 1080 includes six compartments 1084 and holds six packets 1082. In other embodiments, the number of compartments 1084 may differ. Preferably, the number of compartments 1084 may be selected such that a user may comfortably transport the carrier 1080 when all the bags 26 in the carrier are full. Different carriers 1080 for bags 26 of different volumes may be provided with carriers 1080 for smaller volume bags 26 having a greater number of compartments 1084. The carrier 1080 may, for example, be constructed of a plastic sheeting or a medical grade wax paper product. Such materials may be preferable where the carrier or packets 1082 may be filled within an enclosure 12 such as those described elsewhere herein. In other embodiments, cardstock may be used. The carrier 1080 may include a handle 1087 which may facilitate carrying by a user or grasping by a grasper 418 of a robotic arm 360.

Referring now primarily to FIGS. 195 and 196, each packet 1082 may include a cover flap 1086. The cover flap 1086 may include a passage 1088 through which a fill line 1090 may extend. The cover flap 1086 may be secured to a pouch portion 1092 of the packet 1082. A bag 26 may be provided in the pouch portion 1092. The pouch portion 1092 may be expandable so as to accommodate the increase in volume of the bag 26 as the bag 26 is filled. For instance, the side walls of the pouch portion may include bellows features. The packet 1082 is removed in FIG. 196 to reveal an exemplary bag 26. In the example embodiment, sections of hook and loop tape 1096 may be used to couple the cover flap 1086 to the pouch portion 1092 when the cover flap 1086 is in a closed position. Any other suitable coupling may be used. When retained to the pouch portion 1092, the cover flap 1086 may hold an administration set 1094 attached to the bag 26 in place with the packet 1082. A slide clamp 1098, roller clamp 1100, other occluding arrangement may be placed in an occluding state on the line of the administration set 1094 to prevent flow through the administration set 1094 when the bag 26 is filled. Alternatively, the administration set 1094 may include a frangible which prevents flow therethrough until broken by a user. The administration set 1094 may be any desired administration set 1094 and may include one or more of a drip chamber, burette, furcation (Y-site, T-site, etc.), luer locks, septum, etc.

Referring now to FIGS. 197 and 198, each of the fill lines 1090 extending from the packets 1082 may be coupled to a spiking adapter 1102. As best shown in FIG. 198, the spiking adapter 1102 may include a number of radial recesses 1104. The recesses 1104 may be recessed into the exterior side wall of the spiking adapter 1102. The number of recesses 1104 may be equal to the number of packets 1082 held by the carrier 1080. The recesses 1104 may be sized to accept and retain the terminal ends of the fill lines 1090 leading to each bag 26. The openings of the recesses may be sized to be smaller than the outer diameter of the fill lines 1090. Thus, the fill lines 1090 may be deformed as they are inserted into the recesses 1104 and resist inadvertent removal once contained therein. The spiking adapter 1102 may also include a number of projections 1106. The projections 1106 may facilitate grasping by a robotic grasper 418 or by the hand of a user. The recesses 1104 are spaced at regular angular intervals from one another on each side of the projections 1106. As shown, the terminal ends of the fill lines 1090 may include a seal member 1108. The seal member 1108 may be a septum which may be pierced to gain access to the lumen of the fill line 1090 and may self-seal once the piercing member is withdrawn. As shown, the radial recesses 1104 of the spiking adapter 1102 may ensure that the fill lines 1090 are straight immediately upstream of the sealing member 1108.

Referring now to FIG. 199A and FIGS. 1200-1202, a number of views of an example filling station 1110 which may accept a spiking adapter 1102 to fill bags 26 is depicted. A diagrammatic example of a filling station 1110 is shown in FIG. 199A. As shown, the fill station 1110 may include a source 1112. The source 1112 may communicate with a recirculation valve 1114 and an inlet valve 1116. The inlet valve 1116 may gate flow to a fluid pump 1118 which may be a diaphragm pump in certain examples. The fluid pump 1118 may deliver fluid from the source to a heater 1120 which may be an in line heater. An air pump 1122 may also be plumbed into the line leading from the fluid pump 1118 to the heater 1120. A check valve 1123 may be included to ensure liquid does not back flow into the air pump 1122. From the heater 1120, fluid may flow to a manifold 1124. The manifold 1124 may split flow into a number of different flow pathways leading to a spike port 1126. The spike port 1126 may also be connected to the recirculation valve 1114.

Fluid flowing from the source 1112 may be routed to the spike port 1126 to be delivered into fill lines 1090 of bags 26 which are disposed within a spiking adapter 1102. After a filling operation has completed, a cap 1130 of the spike port 1126 may be sealed closed and fluid enter the filling station 1110 may be recirculated while being heated by the heater 1120. The heater 1120 may maintain the temperature of recirculating fluid within a range of a predefined temperature set point. A control system 15 of the system 10 may continue to recirculate water within the filling station 1110 for a period of time sufficient to cause disinfection at the predefined temperature set point. This water may then be diverted to a drain destination 1128 through the inlet valve 1116. In certain embodiments, the heater 1120 may maintain the fluid at a temperature of 75-80° C. or higher during disinfection. Thus each time a connection to the spike port 1126 is formed, the spike port 1126 may have been freshly sterilized.

In an alternative embodiment, and referring now to FIG. 199B, an example filling station 1110 may include a source 1112 which communicates directly with an inlet valve 1116 which may double as a recirculation valve. The spike port 1126 may include connections which may allow for fluid to be recirculated through the spike port 1126 as described above or may allow flow through of fluid to the drain 1128. During disinfection, fluid may be directed through the heater 1120 and heated to within a range of a temperature set point. This water may be passed to the drain 1128 via a drain valve 1115 without recirculation.

Referring now also to FIG. 203, a top down view of an example spike port 1126 is depicted. As shown, the spike port 1126 may include a cup like recess 1132. The recess 1132 may include a number of spikes 1134. Each of the spikes 1134 may communicate with a line extending from the manifold 1124. The recess 1132 may be sized to accept a spiking adapter 1102. As shown, the spike port 1126 may include alignment channels 1136. The alignment channels 1136 may accept the projections 1106 of the spiking adapter 1102. The projections 1106 on the spiking adapter 1102 may be position such that when they are within the alignment channels 1136, the sealing members 1108 of the fill lines 1090 may be in line with respective spikes 1134 in the recess 1132. Other keying elements may also be used to aid in ensuring proper alignment. Pressing the spiking adapter 1102 into the recess 1132 may cause each of the spikes 1134 to penetrate a respective sealing member 1108 such that fluid may be delivered through the fill lines 1090 into the bags 26. As the radial recesses 1104 of the spiking adapter 1102 ensure that the fill line 1090 immediately upstream of each sealing member 1108 is straight, the spikes 1134 may be prevented from piercing into the side wall of the fill lines 1090. The spiking adapter 1102 and sealing members 1108 may be wiped down with a sanitizing agent prior to pressing of the spiking adapter 1102 into the recess 1132. For example, 70% isopropyl alcohol may be used. Additionally, the cap 1130 of the spike port 1126 may be maintained closed until a time directly prior to formation of the connection. This cap 1130 may also be cleaned with sanitizing agent prior to opening. Materials used to construct the fill conduits 1090 sealing members 1108, spiking adapter 1102 and spike port 1126 may be selected to be appropriate for the sanitizing agent used and temperatures present during disinfection of the filling station 1110.

As shown, the spike port 1126 may include a gasket member 1136 which surrounds the recess 1132. The gasket member 1136 may form a seal against the cap 1130 when the cap 1130 is in a closed position over the recess 1132. In some embodiments, a latch (not shown) may be included to maintain the cap 1130 in the closed orientation and ensure that a small amount of pressure is exerted between the cap 1130 and the gasket member 1136 and inhibit inadvertent opening of the spike port 1126. A recirculation port 1138 is also shown in FIG. 203. With the cap 1130 closed, the recirculation port 1138 may allow for fluid pumped into the recess 1132 via the spikes 1134 to be removed from the spike port 1126 and circulated back through the heater 1120. This may help to ensure that the fluid in the spike port 1126 is maintained at a desired temperature during a disinfection process. In certain embodiments, both a recirculation port 1138 and a drain port (not shown) may be included in the spike port 1126.

Referring now to FIG. 204, a schematic of an example fluid circuit 710 which may be utilized with any of the systems 10 shown herein is depicted. The mixing circuit 348 and sensor suite 350 (e.g. those mentioned with respect to FIG. 56 and FIG. 177) may be included in the fluid circuit 710. As shown, the fluid circuit 710 may draw water from a water source 16. The water source 16 may be any water source described herein. Fluid from the source 16 may be subjected to any of a variety of pre-treatment operations in certain embodiments. For example, filtration or chemical treatments may be performed prior to water passing to a medical water production device 14. In the example fluid circuit 710, fluid from the water source 16 may pass through a water softener 712. Fluid may be filtered through one or more carbon filter 714 (e.g. two identical carbon filters in series) after passing through the water softener 712. In some examples a coarse filter or sediment filter may be included upstream of the carbon filters 714. The filtered water passing out of the one or more carbon filter 714 may then be filtered through a reverse osmosis assembly 716. In some examples, the water may also be subject to deionization in an electrodeionization unit 717. Depending on the source water 16, one or more of the water softener 712, carbon filter 714, and reverse osmosis assembly 716 may be optional or may be omitted.

In the example fluid circuit 710, fluid may pass from the reverse osmosis assembly 716 to a temperature regulator 718. The temperature regulator 718 may include at least one of a chiller and a heater. For certain applications, the temperature regulator 718 may be omitted. The temperature regulator 718 may lower the temperature of incoming water or may be operated to lower the temperature of incoming water in the event that a temperature sensor (not shown) upstream of the temperature regulator 718 indicates that the incoming water temperature is above a predefined threshold. In some examples, the temperature regulator 718 may be bypassed when the incoming water temperature is below the predefined threshold. The incoming water may then flow to a medical water production device 14. The medical water production device 14 may be any of those described herein. For example, the medical water production device 14 may be a vapor compression distillation device is certain examples.

In the example embodiment, the output of the medical water production device 14 may include a quick connect fitting 720 which may be used to connect to a remainder of the flow circuit 710. As shown, fluid passing form the medical water production device 14 may be tested for one or more characteristic of interest. In the example embodiment, two conductivity sensors 722A, B may be used to collect redundant measurement of the conductivity of water produced by the medical water production device 14. The control system 15 of the system 10 may monitor the output of the conductivity sensors 722A, B to ensure that the water is suitable for the intended application. For example, the control system 15 may check to ensure that the water has a conductivity within the allowed range for water for injection (WFI) quality water. Acceptability threshold values for the conductivity sensors 722A, B (or other sensors in the fluid circuit 710) may be defined in a compendial standard or water monograph. In certain examples, the conductivity sensors 722A, B may be selected to have high resolution, accuracy, and reliability at low conductivity values. In certain embodiments, ultra-pure water conductivity sensors optimized for sensing low conductivity fluids may be used. The fluid circuit 710 may also include a total organic carbon (TOC) monitor 724. In the example embodiment, the TOC monitor 724 is shown as a receiving a slip stream of fluid which then flows to a drain 726. In other embodiments, the TOC monitor 724 may be in line and may not be located on a slip stream.

After initial sensing, fluid may pass to an inlet pressure sensor 728. The inlet pressure sensor 728 may include at least one pressure sensor which may sense a pressure of incoming water. In some embodiments, the inlet pressure sensor 728 may be paired with a sampling port or septum from which fluid may be extracted from the fluid circuit 710 for testing. From the inlet pressure sensor 728, water may flow to a divert manifold 730. The divert manifold 730 may allow the system 10 to divert water to the drain 726 in the event that water production at the medical water production device 14 exceeds current system 10 demand. Additionally, the divert manifold 730 may allow water which is measured to be outside of predefined sensing thresholds to be directed to drain 726. Water exiting the divert manifold 730 may flow to a pump 732 which may be operated to adjust the pressure of the water if needed. The control system 15 may check the reading from the inlet pressure sensor 728 prior to running the pump 732. For example, the control system 15 may verify that the inlet pressure is positive or positive beyond some threshold before running the pump 732. This may ensure that the pump 732 has water to pump before powering the pump 732. From the pump 732 water may proceed to an inlet manifold 734. In some embodiments, the pump 732 may include a bypass which allows fluid to recirculate to the pump 732 in the event that pressure downstream of the pump 732 is at a desired value. The inlet manifold 734 may include an additional conductivity sensor 736 which may again check that the conductivity of the water is within predefined limits. A pressure sensor 738 may also be included in the inlet manifold 734 and may provide feedback for a control loop used by the control system 15 to inform operation of the pump 732. The inlet manifold 734 may include a sampling port or septum in some examples.

From the inlet manifold 734, water may pass to a mixing circuit 348 of the fluid circuit 710. The mixing circuit 348 may include a number of flow pathways. For example, the mixing circuit 348 may include a WFI water pathway and at least one constituent pathway. The number of flow pathways in the mixing circuit 348 may depend on the type of solution being mixed or the types of solutions which the system 10 supports generation of. In certain embodiments, a flow path may be included for each constituent component of the solution. The exemplary system 10 is shown as a saline generating circuit and includes a saline flow path and a WFI water flow path.

With respect to the saline flow path, in the example embodiment, the mixing circuit 348 may include a crystalline constituent container 740. The crystalline constituent container 740 may be filled with sodium chloride. Other crystalline constituents may be used in other embodiments (e.g. sugar where D5NS or dialysate is produced). Fluid may enter the crystalline constituent container and pass through the sodium chloride contained therein to dissolve an amount of the sodium chloride. In various examples, fluid leaving the crystalline constituent container 740 may be saturated or near saturated. In some embodiments, the crystalline constituent container may also act as a reservoir 740 which may maintain a volume of solution therein. This may allow the system 10 to easily accommodate periods of high fluid demand. Fluid exiting the crystalline constituent container 740 may then pass through at least one filter. For example, a coarse filter may be included to help ensure the granular constituent does not exit the crystalline constituent container 740. In the example an ultrafilter 742 is also shown downstream of the crystalline constituent container 740. At least one conductivity sensor 744 may collect data on the concentration of sodium chloride in the fluid leaving the ultrafilter 742.

As shown, fluid leaving the inlet manifold 734 may also flow along a second WFI water flow path in FIG. 204. The second path may include a second ultrafilter 746. The saline fluid and water from the second path may be combined together in a mixing manifold 748. To generate a solution of the appropriate concentration, flow controllers 750A, B may be included in the fluid circuit 710. The flow controller 750A, B may meter volumes of fluid and control flow rates of fluid passing therethrough. The control system 15 of the system 10 may use data from the conductivity sensor 744 in the saline flow path to determine mixing ratios that may be executed via commands to the flow controllers 750A, B. Thus, the control system 15 may combine fluid from the saline flow path and WFI water flow path to achieve a solution of a target concentration such as 0.9% saline. In some embodiments, the mixing manifold 748 may be replaced by a mixing tank which may maintain a volume of fluid to help accommodate periods of increased demand.

The fluid may exit the mixing manifold 748 and travel along a tortuous and/or relatively long flow path to encourage mixing. The fluid may then pass a set of redundant conductivity sensors 752A, 752B. These conductivity sensors 752A, B may collect data on the conductivity of the solution leaving the mixing circuit 348 and the control system 15 may ensure that the conductivity is as expected for the solution that the system 10 is generating. From the conductivity sensors 752A, B the solution may pass to a particulate sensor 754 and a dispensing nozzle 756. The particulate sensor 754 is shown as feeding from a slip stream in FIG. 204, however in other embodiments, the particulate sensor 754 may be in line and upstream of the dispensing nozzle 756. The control system 15 may monitor data from the particulate counter to check that the generated fluid conforms to a predefined particulate limit. Fluid leaving the particulate counter may pass to the drain 726. If fluid is deemed to be acceptable, fluid may pass to the dispensing nozzle 756 and may be used to fill bags 26. Alternatively, if fluid is found unacceptable, fluid may be dispensed from the dispensing nozzle 756 into a drain (see, e.g. drain inlet 434 of FIG. 71A) and may be followed by a flush volume of solution.

Referring now to FIG. 205, an example embodiment of a mixing circuit 348 is depicted. The inlet manifold 734 shown in FIG. 204 is included as part of the mixing circuit 348 shown in FIG. 205. As shown, the mixing circuit 348 may receive fluid from a purified water inlet 1400. The purified water inlet 1400 may receive purified water from an output of a medical water production device 14. In some embodiments, one or more intermediate component (see, e.g., FIG. 204) may be included between the medical water production device 14 and the purified water inlet 1400. For example, at least one sensor (e.g. a TOC monitor 724) and/or a divert valve of divert manifold 730 may be included between the medical water production device 14 and the purified water inlet 1400.

Purified water may pass from the purified water inlet 1400 to a heater 1402. The heater 1402 may adjust the temperature of incoming water to a temperature within a predetermined range. In some embodiments, the heater 1402 may only be used in certain operational modes. For instance, the heater 1402 may only be utilized to adjust water temperature to at least a target set point during hot water disinfection of the mixing circuit 348. During a hot water disinfect, hot water (e.g. purified water at 80° C.) may be delivered through the various flow paths of the mixing circuit for a period of time (e.g. 20-60 minutes, in some specific examples 30 minutes).

From the heater 1402, water may pass to a flow sensor 1404 and a pressure sensor 1406. The flow sensor 1404 and pressure sensor 1406 may collect data used by the control system 15 to ensure that the pressure and flow of fluid into the mixing circuit 348 conform to expected values. A shutoff valve 1408 may be included downstream of the flow sensor 1404 and pressure sensor 1406 and allow flow through the mixing circuit 348 to be blocked off in the event that the control system 15 senses an error condition or fault. Downstream of the shutoff valve 1408, may be a purified water conductivity sensor 1410. The conductivity sensor 1410 may be an ultrapure water conductivity sensor optimized for sensing of low conductivity solutions.

In the example embodiment, the mixing circuit 348 is arranged to generate a saline solution. Fluid may flow from the purified water conductivity sensor 1410 to a saline portion 1414 of the mixing circuit 348 or a purified water portion 1412 of the mixing circuit 348. Alternative embodiments may include different or additional circuit portions. For example, in some embodiments, the mixing circuit 348 may include a dextrose portion of the mixing circuit 348 instead of or in addition (e.g. where D5NS is generated by the mixing circuit 348) to the saline portion 1414. The mixing circuit 348 may include a circuit portion for each constituent used to create a target end product.

The purified water portion 1412 of the mixing circuit 348 may include an ultrafilter 1416. The ultrafilter 1416 may serve to further purify or provide a redundant purification element which may ensure that the microbial and pyrogen content of the water is below prescribed values. One or more sensor 1415, 1417 may be included in the purified water portion 1412 of the mixing circuit. For example, one sensor 1415 may detect the presence of the ultrafilter 1416. Sensor 1415 may be a magnetic sensor which senses the presence of a metal body in the ultrafilter 1416. Any other suitable sensor may be used (e.g. optical, microswitch, etc.). Another of the sensors 1417 may sense the state of a lock 1413 which may engage the ultrafilter 1416 and lock the ultrafilter 1416 in place within the mixing circuit 348. Sensor 1417 may be a magnetic (e.g. Hall effect) sensor monitoring the location of a metal body on the lock 1413. Any other suitable sensor (e.g. optical, microswitch, etc.) may be used in other embodiments. The control system 15 may prohibit operation of the mixing circuit 348 in the event that the sensors 1415, 1417 indicate the ultrafilter 1416 is absent or is not locked into place.

The purified water portion 1412 of the mixing circuit 348 may also include a pressure sensor 1418 which may be disposed downstream of the ultrafilter 1416. The pressure sensor 1418 may collect data on fluid exiting the ultrafilter 1416. This data may be compared, via control system 15, to data from the pressure sensor 1406 to ensure that a pressure drop across the ultrafilter 1416 is within an expected range. The control system 15 may generate an error and toggle the shutoff valve 1408 in the event that the pressure drop falls outside of the expected range. In some examples, a user perceptible indication (e.g. text, image, animation, a combination thereof, etc. on a user interface) may also be generated by the control system 15 instructing the user to preform maintenance (e.g. replace the ultrafilter 1416). The control system 15 may also generate an indication if the control system 15 detects that the ultrafilter 1416 is not installed or not installed correctly. A purified water outlet valve 1444 may also be included in the purified water portion 1412. The purified water outlet valve 1444 may be a proportional valve in certain examples.

The saline portion 1414 of the mixing circuit 348 may be separated from the purified water conductivity sensor 1410 by a check valve 1420. The check valve 1420 may ensure that saline solution may not back flow out of the saline portion 1414 of the mixing circuit 348 into sections of the mixing circuit 348 intended to contain purified water. Downstream of the check valve 1420, the saline portion 1414 may include a constituent disposable inlet receptacle 1422, constituent disposable 1424, and a constituent disposable outlet receptacle 1426. An inlet of the constituent disposable 1424 may seal in place within the constituent disposable inlet receptacle 1422 and an outlet of the constituent disposable 1424 may seal in place within the constituent disposable outlet receptacle 1426. An example constituent disposable 1424 is further described in relation to FIGS. 207-208. As purified water flows into the disposable inlet receptacle 1422 and through the constituent disposable 1424, crystalline constituent contained in the constituent disposable 1424 may dissolve into the purified water. The fluid exiting the constituent disposable outlet receptacle 1426 may be a liquid concentrate which is saturated or nearly saturated. The liquid concentrate may be saline solution in various embodiments. In other examples, liquid concentrate could be, though is not limited to being, a sugar solution.

As shown, the mixing circuit 348 may also be outfitted with a set of drain ports 1430A, B. The drain ports 1430A, B may communicate with a respective one of the constituent disposable inlet receptacle 1422 and constituent disposable outlet receptacle 1426 as well as a drain destination for the system 10. The drain ports 1430A, B may allow for venting of gas from the mixing circuit 348 (e.g. upon installation and priming of a new constituent disposable 1424).

The constituent disposable inlet receptacle 1422, constituent disposable 1424, and a constituent disposable outlet receptacle 1426 may be placed between a set of bypass valves 1428A, B which may be actuated to redirect flow around the constituent disposable 1424 and through a disinfection flow path 1432 in certain scenarios. For example, the bypass valves 1428A, B may be actuated during hot water disinfection of the mixing circuit 348. This may prevent constituent in the constituent disposable 1424 from being consumed during disinfection of sections of the mixing circuit 348.

In some examples, a second disinfection flow path 1434 may be included. The second disinfection flow path 1434 may extend from the constituent disposable inlet receptacle 1422 to the constituent disposable outlet receptacle 1426. In embodiments including a second disinfection flow path 1434, the constituent disposable 1424 may have a partially installed position and a fully installed position. In the fully installed position, the constituent disposable 1424 may prevent flow through the second disinfection flow path 1434. In the partially installed position, fluid may be blocked from entering the constituent disposable 1424 and may instead flow through the second disinfection flow path 1434. As this occurs, the fluid may contact portions of an inlet and outlet (see, e.g. FIG. 208) of the constituent disposable 1424. Thus, upon partial installation of a new constituent disposable 1422, hot water may be passed through the second disinfection flow path 1434 to disinfect the inlet and outlet of the constituent disposable 1424 before use. The constituent disposable 1422 may be advanced to the fully installed position after such a disinfection occurs. The drain ports 1430A, B may allow fluid in the constituent disposable inlet receptacle 1422 and constituent disposable outlet receptacle 1426 a place to displace as a constituent disposable 1424 is advanced to the fully installed position.

As shown, the saline portion 1414 of the mixing circuit 348 may also include an ultrafilter 1436. The ultrafilter 1436 may serve to further purify or provide a redundant purification element which may ensure that the microbial and pyrogen content of the saline solution is below prescribed values. One or more sensor 1435, 1437 may be included in the saline portion 1414 of the mixing circuit 348. For example, one sensor 1435 may detect the presence of the ultrafilter 1436. Sensor 1435 may be a magnetic sensor which senses the presence of a metal body in the ultrafilter 1436. Any other suitable sensor may be used (e.g. optical, microswitch, etc.). Another of the sensors 1437 may sense the state of a lock 1433 which may engage the ultrafilter 1436 and lock the ultrafilter 1436 in place within the mixing circuit 348. Sensor 1437 may be a magnetic (e.g. Hall effect) sensor monitoring the location of a metal body on the lock 1433. Any other suitable sensor (e.g. optical, microswitch, etc.) may be used in other embodiments. The control system 15 may prohibit operation of the mixing circuit 348 in the event that the sensors 1435, 1437 indicate the ultrafilter 1436 is absent or is not locked into place.

The saline portion 1414 of the mixing circuit 348 may also include a pressure sensor 1438 which may be disposed downstream of the ultrafilter 1436. The pressure sensor 1438 may collect data on fluid exiting the ultrafilter 1436. This data may be compared, via control system 15, to data from the pressure sensor 1406 to ensure that a pressure drop across the ultrafilter 1436 is within an expected range. The control system 15 may generate an error and toggle the shutoff valve 1408 in the event that the pressure drop falls outside of the expected range. In some examples, a use perceptible indication (e.g. text, image, animation, a combination thereof, etc. on a user interface) may also be generated by the control system 15 instructing the user to preform maintenance (e.g. replace the ultrafilter 1436). The control system 15 may also generate an indication if the control system 15 detects that the ultrafilter 1436 is not installed or incorrectly installed.

A saline outlet valve 1440 and a saline solution conductivity sensor 1442 may also be included in the saline portion

1414. The saline outlet valve 1440 may be a proportional valve in certain examples. As the saline concentration in the saline portion 1414 downstream of the constituent disposable 1424 may be relatively consistent, the saline solution conductivity sensor 1442 may be placed upstream or downstream of the saline outlet valve 1440.

Fluid exiting the purified water portion 1412 and saline portion 1414 may be passed to a mixing portion 1446 of the mixing circuit 348. The purified water outlet valve 1444 and saline outlet valve 1440 may be operated by the control system 15 to adjust the ratio of purified water from the purified water portion 1412 and saline from the saline portion 1414 which is passed to the mixing portion 1446. The valves 1440, 1444 may be operated to ensure that the ratio is controlled to generate a target end product (e.g. 0.9% saline). The mixing path 1446 may include at least one of a mixing chamber, tortuous path, baffle, etc. to encourage thorough mixing of the saline concentrate and purified water. An example mixing path 1446 is described in relation to FIG. 206.

The control system 15 may adjust operation of the valves 1440, 1444 based on feedback from at least one of the saline solution conductivity sensor 1442 and a first and second mixture conductivity sensor 1448A, B downstream of the mixing portion 1446. After passing the mixture conductivity sensors 1448A, B, fluid may exit an outlet 1450 of the mixing circuit 348. In some embodiments, the outlet 1450 may be a quick connect fitting which may couple with a complimentary fitting on an end of a fluid supply set (further described in relation to FIG. 112). The fluid supply set may include a dispensing nozzle 1910 (see, e.g., FIG. 167) though which fluid may be delivered into a reservoir such as a bag 26. In some examples a 0.2 micron filter 1642 (see, e.g., FIG. 112) may be disposed between the outlet 1450 and the dispensing nozzle 1910.

The first and second mixture conductivity sensors 1448A, B may also be monitored by the control system 15 to determine that the mixture is well mixed and to ensure that both of the mixture conductivity sensors 1448A, B are functioning properly.

Referring now to FIG. 206, an example embodiment of a mixing portion 1446 of a mixing circuit 348 is shown. The mixing portion 1446 may be included in a manifold 1520 which includes various components and flow paths of the mixing circuit 348. The example view shown in FIG. 206 is a portion of a cross-section of a manifold 1520 of the mixing circuit 348 which is taken though a portion of the manifold 1520 including the mixing path 1446.

As shown, the mixing path 1446 may include an inlet region 1570. The mixing path 1446 may also include an intermediate region 1574 which may connect the inlet region 1570 to an outlet region 1576 of the mixing path 1446. The inlet region 1570 may be a wide bay-like region of the mixing path 1446. The inlet region 1570 may receive fluid from a purified water outlet channel 1572 and saline concentrate outlet channel (not shown) which place the valves 1440, 1444 (see, e.g., FIG. 205) into fluid communication with the mixing portion 1446 of the mixing circuit 348. The concentrate outlet channel may be disposed opposite the purified water outlet channel 1572 and in the portion of the manifold 1520 which has been cut away in FIG. 206. The inlet region 1570 may narrow as proximity to the intermediate region 1574 increases. The intermediate region 1574 may extend at a sharp (e.g. right) angle with respect to at least one wall of the inlet region 1570. The mixing path outlet 1576 may be a sensing well which is in communication with sensing components on at least one of the mixture conductivity sensors 1448A, B (see, e.g., FIG. 205).

A majority of the mixing which takes place in the mixing path 1446 may occur in the inlet region 1570 as the purified water and concentrate streams meet. Additional mixing may occur in the intermediate region 1574. The intermediate region 1574 may establish a tortuous path which encourages turbulent flow of fluid within the intermediate region 1574. This turbulent flow may aid in ensuring that fluid transferred through the mixing path 1446 is consistently well mixed. As shown, the intermediate region 1574 may include a series of baffles 1578. The baffles 1578 may furcate the mixing path 1446 into sets of separate furcated channels 1580A, B which reconverge into common flow channels 1582 in the spaces between the baffles 1578. In the example embodiment, the baffles 1578 have a diamond shaped cross-section. Thus, the furcated channels 1580A, B may each be divided into diverging portions and converging portions. As fluid flows along the mixing path 1446 the flow may split and diverge as it reaches each baffle 1578. Some turbulence may be engendered as the flow is split. In the example, the baffles 1578 furcate the flow such that the furcated channels 1580A, B extend at about 450 from the common flow channels 1582. The furcated channels 1580A, B may include a bend 1584 which redirects the flow toward the common channels 1582 between the baffles 1578. In the example embodiments, the bends 1584 each impose a sharp (e.g. about a 90° degree) redirection of flow along each of the furcated channels 1580A, B. The bend 1584 may be centrally located in each of the furcated channels 1580A, B. The furcated channels 1580A, B may reconverge into common channels 1582 extending between the baffles 1578 at about 45° angles.

In other embodiments, the angles may be adjusted from those shown in FIG. 206 by altering the shape of the baffles 1578. Similarly, the number of bends 1584 in each furcated channel 1580A, B may be altered by adjusting the cross-sectional shape of the baffles 1578. In certain embodiments, the baffles 1578 may have different cross-sectional shapes and may not necessarily be polygonal in cross-section (e.g. may be round shapes or may include rounded regions or curves). Some baffles 1578 may have a first cross-sectional shape while other baffles 1578 in the mixing path 1446 may have a second cross-sectional shapes (still other baffles 1578 may include third, fourth, and so on cross-sectional shapes).

The sharp redirection of flow at the bends 1584 of each furcated channel 1580A, B may generate turbulence as fluid flows along the mixing path 1446. Additionally, the rejoining of the furcated streams into common flow paths 1582 downstream of each baffle 1578 may cause turbulence. This turbulence may aid in ensuring that purified water and saline streams entering the mixing path 1446 via the valves 1440, 1444 (see FIG. 205) are uniformly and consistently mixed together before passing to the mixing path outlet 1576. As shown, flow entering the outlet portion 1576 from the intermediate portion 1574 is provided from the reconverging portion of furcated flow channels 1580A, B created by the baffle 1578 most proximal the outlet portion 1576. This may help to encourage still further mixing of fluid within the sensing well formed by the outlet portion 1576.

Referring now to FIGS. 207-208, an exemplary constituent cartridge or constituent disposable 1424 is depicted. The constituent disposable may be a bulk reservoir of constituent which may be used by the system 10 to generate a desired solution or solutions. The constituent disposable 1424 may include a housing 1460 and may be in the form of a canister. The housing 1460 may include a first end portion 1462 and a second end portion 1464. A side wall portion 1466 may be captured between the first and second end portions 1462, 1464. The end portions 1462, 1464 may be threaded, welded, bonded, or otherwise coupled to the opposing ends of the side wall portion 1466. Alternatively, a number of rods 1463 may extend between the end portions 1462, 1464 to couple the end portions 1462, 1464 together and sandwich the side wall portion 1466 therebetween. Together, the first and second end portions 1462, 1464 and the side wall portion 1466 may define a sealed interior volume. In the example embodiment, the housing 1460 has a round elongate shape which extends along a longitudinal axis of the constituent disposable 1424. In certain examples, the housing 1460 may be roughly cylindrical. The housing 1460 may have other shapes in alternative embodiments.

The interior volume may be at least partially filled with a solid (e.g. powdered, lyophilized, crystalline) constituent. Any desired constituent may be used and the constituent included in the constituent disposable 1424 may depend on the solution to be generated. The example embodiment is described in the context of sodium chloride solution generation, though the disclosure is not limited thereto. In other embodiments, the constituent may be, but is not limited to, crystalline sugars (e.g. dextrose), other salts (e.g. KCl, $CaCl_2$), Sodium Lactate, etc.), powdered drug (e.g. powdered antibiotic), etc. As the constituent disposable 1424 is used, the amount of solid constituent in the constituent disposable 1424 may deplete and eventually may be exhausted. Once a constituent disposable 1424 is emptied of constituent, the constituent disposable 1424 may be discarded and a new constituent disposable 1424 may be installed. In alterative examples, the constituent disposable 1424 may be returned to a manufacturer for cleaning, refilling, and sterilization.

The first end portion 1462 may include a coupling interface 1485 such as a receiving shoe allowing the constituent disposable 1424 to mate onto an actuator assembly of the system 10. The first end portion 1462 may also include an inlet port 1468 and an outlet port 1470. The inlet port 1468 and outlet port 1470 may extend from a main section 1471 of the first end portion 1462 along a plane which is perpendicular to the longitudinal axis of the constituent disposable 1424. In certain examples, the inlet port 1468 and the outlet port 1470 may extend parallel to one another. The inlet port 1468 and the outlet port 1470 may be in fluid communication with the interior volume of the constituent disposable 1424 respectively via an inlet flow path 1472 and an outlet flow path 1474.

As shown, a conduit 1476 may be coupled to the inlet flow path 1472. The conduit 1476 may extend through the interior volume of the constituent disposable 1424 to a point in the interior volume opposite the first end portion 1462. In the example embodiment, the conduit 1476 extends to a depression 1478 formed in the second end portion 1464 of the housing 1460. In the example embodiments, the depression 1478 is bowl like in shape and includes a central region 1480 where the depression 1478 is deepest. The outlet 1484 of the conduit 1476 may be positioned at the central region 1480 of the depression 1478. The conduit 1476 may direct purified water entering the constituent disposable 1424 through the inlet 1468 to a point at the bottom of the solid constituent (shown as dense stippling in FIG. 208). Thus, fluid may be required to pass though substantially the entire column of solid constituent in order to reach the outlet flow path 1474 of the constituent disposable 1424. This may help to ensure that the solution (shown as the less dense stippling in FIG. 208) is maximally saturated prior to exiting the constituent disposable 1424. Additionally, this may help to ensure that constituent in a constituent disposable 1424 is fully consumed over the life of the constituent disposable 1424. Directing the incoming fluid to a point opposite the outlet flow path 1474 may also aid in ensuring that the solution output from the constituent disposable 1424 is of relatively consistent concentration regardless of the amount of solid constituent remaining in the constituent disposable 1424.

The outlet 1484 of the conduit 1476 may include a number of side ports 1482. The side ports 1482 may help to prevent pocketing of solid constituent in various parts of the constituent disposable 1424 particularly as the amount constituent in the constituent disposable 1424 is low. This may help to ensure that the supply of solid constituent within the constituent disposable 1424 is able to be completely consumed before a replacement constituent disposable 1424 is needed.

As shown, a filter element 1486 may separate the interior volume of the constituent disposable 1424 from the outlet flow path 1474. The filter element 1486 may, for example, thread (as shown), snap fit, be solvent bonded, be coupled via adhesive, etc. into a receptacle 1488 defined in the first end portion 1462. The filter element 1486 may be a particulate filter which inhibits passage of undissolved solids from the interior volume into the outlet flow path 1474. The first end portion 1462 may also include a blow off port 1490. The blow off port 1490 may receive a relief valve 1492 which may allow fluid to exit the constituent disposable 1424 in the event that the constituent disposable 1424 becomes over pressurized.

Referring now to FIGS. 209-210, an example inlet port 1468 is depicted. Though an inlet port 1468 is shown in FIGS. 209-210, outlet ports 1470 may be constructed in the same manner. As shown, the inlet port 1468 may include a port body 1496. The port body 1496 may include a bore 1498 which extends through the port body 1496 substantially along a longitudinal axis of the port body 1496.

A first end 1500 of the port body 1496 may include a mating interface 1502. The mating interface 1502 may engage with a cooperating mating interface included in the first end portion 1462 of the constituent disposable 1424. In the example embodiment, the mating interface 1502 is a threaded interface. Any other suitable mating interface 1502 such as, but not limited to, a bayonet mount, press fit, etc. may be used. In alternative embodiments, the inlet port 1468 may be formed integral with the first end portion 1462 or fixedly coupled into place via welding, solvent bonding, etc.

A cover 1504 may be coupled to and may seal over a second end 1506 of the port body 1496. When a constituent disposable 1424 is fully assembled, the cover 1504 on the inlet and outlet ports 1468, 1470 may provide a barrier which keeps the interior volume of the constituent disposable 1424 out of communication with the surrounding environment. Thus, the cover 1504 may establish a sterility barrier. The barrier formed by the cover 1504 may be an interruptible barrier which may, for instance, be puncturable to gain access to the interior volume of a constituent disposable 1424. The cover 1504 may for example be constructed of one or some combination of foil, foam, and/or plastic. The cover 1504 may be attached to the second end 1506 of the port 1468 in any suitable manner. For example, the cover 1504 may be adhered via adhesive, may be heat staked, may be welded (e.g. ultrasonically), etc. The manner of attachment may be selected based on the material of the port body 1496 and the material(s) used to form the cover 1504.

The port body 1496 may be tiered and may include a wide region 1508 and a narrow region 1510. In the example embodiment, the wide region 1508 has a diameter which is greater than that of the narrow region 1510. The wide region 1508 may be adjacent to the first end 1500 of the port body 1496 and may be the portion of the port body 1496 most proximal to the main section 1471 (see, e.g. FIG. 207) of the first end portion 1462. The narrow region 1510 may be adjacent the second end 1506 of the port body 1496 and may form the portion of the port body 1496 most distal to the main section 1471 of the first end portion 1462. There may be a tapered region 1516 intermediate the wide region 1508 and narrow region 1510, though in other embodiments, a step wise change in width may be present between the wide region 1508 and narrow region 1510. Additionally, in some examples the narrow region 1510 may include a tapered segment 1518 adjacent the second end 1506 which narrows as distance to the second end 1506 decreases.

Each of the wide region 1508 and narrow region 1510 may include a recess 1512 formed in the exterior side wall of the port body 1496. The recesses 1512 may be provided in sections of the wide region 1508 and narrow region 1510 most proximal to the second end 1506 of the port body 1496. A gasket member 1514 may be placed in each of the recesses 1512. In the example embodiment, an o-ring is seated in each of the recesses 1512. In alternative embodiments, over molded compliant members may be used in place of the recesses 1512 and gasket member 1514.

Referring now also to FIG. 211, an inlet port 1468 of a constituent disposable 1424 and an inlet receptacle 1422 of a mixing circuit 348 (see, e.g., FIG. 205) are depicted. The inlet receptacle 1422 is shown for sake of brevity. It should be understood that the outlet receptacle 1426 may be constructed in the same manner and include the same features as the inlet receptacle 1422. As shown in FIG. 211, the inlet receptacle 1442 may be included as part of a manifold 1520 which may include various components of a mixing circuit 348. The inlet receptacle 1422 may define a cavity in the manifold 1520 which is sized to accept the inlet port 1468. Similarly to the inlet port 1468, the inlet receptacle 1422 may include a wide region 1530 and a narrow region 1532. The inlet receptacle 1422 may include an open end 1522 through which an inlet port 1468 may be advanced into the inlet receptacle 1422. The open end 1522 may include a taper which may cooperate with the tapered section 1518 of the inlet port 1468 to aid in guiding the inlet port 1468 into the inlet receptacle 1422. The inlet receptacle 1422 additionally may include a piercing member 1524. The piercing member 1524 may be disposed at an end of the inlet receptacle 1422 opposite the open end 1522. A flow lumen 1526 may extend through the piercing member 1524 and may place the inlet receptacle 1422 into fluid communication with a manifold flow path 1528 which extends away from the inlet receptacle 1422. This manifold flow path 1528 may, for example, extend to a bypass valve 1428A (see, e.g., FIG. 205). Any suitable piercing member 1524 may be included. In the example embodiment, the piercing member 1524 includes an angled piercing end. In other embodiments, the piercing member 1524, may for example include a conical piercing end. A drain port 1430A may also be provided and may be in communication with the inlet receptacle 1422.

Referring now also to FIG. 212, upon installation of a new constituent disposable 1424, the inlet port 1468 of the constituent disposable 1424 may be displaced a first distance into the inlet receptacle 1422 to a partially installed position. The outlet port 1470 would similarly be displaced into the outlet receptacle 1426 to a partially installed position at the same time. As shown in FIG. 212, in the partially installed position, the gasket element 1514 of the wide region 1508 of the port body 1496 may be compressed between the port body 1496 and the surface of the wide region 1530 of the inlet receptacle 1422. This may form a fluid tight seal between the inlet port 1468 and the inlet receptacle 1422 and serve to plug the open end 1522 of the inlet receptacle 1422. The inlet port 1468 may, however, be spaced from the piercing member 1524 such that the cover 1504 of the inlet port 1468 remains intact. Thus, with the inlet port 1468 in the partially installed position, fluid introduced into the inlet receptacle 1422 may be prevented from spilling out of the open end 1522 of the inlet receptacle 1422 and blocked from passing to the interior of the constituent disposable 1424 by the cover 1504. The partially installed position may also be referred to herein as an unspiked position.

A portion of the second disinfection flow path 1434 is visible in FIG. 212. The second disinfection flow path 1434 may connect the inlet receptacle 1422 and the outlet receptacle 1426 (see, e.g., FIG. 205). With the constituent disposable 1424 in the partially installed position, fluid delivered to the inlet receptacle 1422 through the flow lumen 1526 of the piercing member 1524 may flow through the second disinfection flow path 1434 to the outlet receptacle 1426. This fluid may then exit the outlet receptacle 1426 through the flow lumen 1526 in the piercing member 1524 of the outlet receptacle 1426. Each time a new constituent disposable 1424 is installed, the constituent disposable 1424 may be placed in the partially installed position. The control system 15 may then command passing of hot fluid through the inlet receptacle 1422, the second disinfection flow path 1434, and the outlet receptacle 1426 for a period of time. As shown, there may be a space between the narrow region 1510 of the port body 1496 and the wall of the inlet receptacle 1422 which may allow the hot fluid to contact the entire exterior surface of the narrow region 1510 (and the intermediate taper region 1516 in the example embodiment) of the port body 1496. Thus, when the constituent disposable 1424 is in the partially installed position, hot water may be used to disinfect the inlet and outlet ports 1468, 1470 of the constituent disposable 1424. The control system 15 may command flow hot water over the inlet and outlet ports 1468, 1470 for a predetermined period of time which may be selected based at least in part on the temperature of the hot water. In some embodiments, purified water at 60-95° C. (e.g. 80° C.) may be provided for 20-60 minutes (e.g. 30 minutes).

Referring now to FIG. 213, once disinfection of the inlet and outlet ports 1468, 1470 is completed, the constituent disposable 1424 may be displaced such that the inlet and outlet ports 1486, 1470 are advanced to a fully installed position within the respective inlet receptacle 1422 and outlet receptacle 1426. The inlet port 1468 is shown in the fully installed position in the inlet receptacle 1422 in FIG. 213. The outlet port 1470 may be in the same position in the outlet receptacle 1426 when in the fully installed position. As shown, in the fully installed position, the inlet port 1468 may contact the wall of the inlet receptacle 1422 from which the piercing member 1524 extends. The piercing member 1524 may puncture through a frangible region of the cover 1504 of the inlet port 1468 such that the flow lumen 1526 of the piercing member 1524 establishes fluid communication with the interior volume of the constituent disposable 1424. The inlet port 1468 and outlet port 1470 may be considered to be in a spiked state once in the fully installed position and punctured by the piercing members 1524. Thus, the fully installed position may be referred to herein as a spiked position. Once the inlet and outlet port 1468, 1470 are in the spiked state, fluid passing from the inlet receptacle 1422 to the outlet receptacle 1426 may be directed through the constituent disposable 1424 as described in relation to FIGS. 207-208. The gasket member 1514 of the narrow region 1510 of the port body 1496 may be compressed between the port body 1496 and the narrow region 1532 of the inlet receptacle 1422 so as to form a fluid tight seal. Thus, the second disinfection flow path 1434 may be sealed out of communication with the flow lumen 1526 of the piercing member 1524. This may prevent saline leaving the outlet 1470 of the constituent disposable 1424 from passing back to the inlet receptacle 1422 of the manifold 1520.

As a portion of the inlet receptacle 1422 and outlet receptacle 1426 become filled with fluid during disinfection of the partially installed inlet and outlet ports 1468, 1470, advancement of the inlet and outlet ports 1468, 1470 to the fully installed state may displace fluid. The drain ports 1430A, B may allow this fluid to displace along a drain conduit (not shown) to a drain destination in the system 10. In other embodiments, at least a portion of the inlet and outlet receptacles 1422, 1426 may include an at least partially displaceable wall. Such a wall may, for instance, be formed of or include a region of diaphragm material. The diaphragm material may displace or stretch to accommodate the displaced fluid. The piercing member 1524 may, for example, be mounted in a diaphragm body which may displace or include displaceable regions which move to accommodate the displaced fluid.

Referring now to FIG. 214, an example actuation assembly 1540 for a constituent disposable 1424 is shown. As shown, the actuation assembly 1540 may include a carriage assembly 1542 which may displace along a set of guide rails 1544. The guide rails 1544 may extend parallel to one another and through respective slide bearings 1546 included in the carriage assembly 1542. The carriage assembly 1542 may also include a mating interface 1548 to which the constituent disposable 1424 may be mounted. As shown, the mating interface 1548 includes mating block 1550 which may be docked within the coupling interface 1485 of the constituent disposable 1424. The mating interface 1548 may also include a lock assembly 1552. In the example embodiment, the lock assembly 1552 is depicted as a cam lock. The lock assembly 1552 may be actuated (e.g. manually via handle 1551) so as lock the constituent disposable 1424 in place on the mating interface 1548.

The actuation assembly 1540 may also include at least one sensor 1553, 1556, 1559. Sensor 1553 may be a lock assembly 1552 state sensor. This sensor 1553 may monitor the lock assembly 1552 and output a data signal to the control system 15 indicative of whether the lock assembly 1552 is in an open state or a locked state. Sensor 1553 may, for example, be a magnetic sensor which provides an output signal that changes as the position of a metal body 1547 on the mating interface 1548 is altered. Any other suitable sensor type may be used as well. For example, some embodiments may use a microswitch which is depressed when the lock assembly is in a locked state (or unlocked state). Other embodiments may include a potentiometer which changes resistance as the lock assembly transitions between the locked state and the unlocked state. An optical sensor could also be used in some examples. It should be understood that these sensor types are merely illustrative and other sensing arrangements could be used.

Sensor 1556 may be a constituent disposable presence sensor. The disposable presence sensor 1556 may generate a signal indicative of whether a constituent disposable 1424 is in place on the mating block 1550. The disposable presence sensor 1556 may be a magnetic sensor which may monitor the location of a metal body 1555 (see, e.g., FIG. 207) included on the constituent disposable 1424. Any other suitable sensor type may be used in alternative embodiments. For example, an optical sensor (e.g. beam break sensor) may be used and the metal body 1555 could then be omitted. Again, it should be understood that these sensor types are merely illustrative and other sensing arrangements could be used.

The actuation assembly 1540 may include an actuator 1554. The actuator 1554 may be powered, under direction of the control system 15, to translationally displace the carriage assembly 1542 along the guide rails 1544. When a constituent disposable 1424 is coupled to the carriage assembly 1542, the inlet port 1468 and outlet port 1470 of the constituent disposable 1424 may be aligned with the inlet receptacle 1422 and outlet receptacle 1426 of the mixing circuit 348 (see, e.g., FIG. 205). Displacement of the carriage assembly 1542 along the guide rails 1544 may drive the inlet port 1468 and outlet port 1470 into and out of the inlet port receptacle 1422 and outlet port receptacle 1426 of the manifold 1520.

The actuation assembly 1540 may include at least one position sensor which monitors the displacement of the carriage assembly 1542 along the guide rails 1544. Any suitable position sensor may be used. For example, a linear potentiometer which changes resistance in relation to the location of the carriage assembly 1542 along the guide rails 1544 may be used. In other embodiments, the actuator motor 1543 may include a built in encoder which may be used as the position sensor or may provide a second redundant position sensor. The control system 15 may govern operation of the actuator 1554 based on position data sensed by the position sensor. Thus, the actuator 1554 may be powered by the control system 15 to displace the constituent disposable 1424 into desired position such as a partially installed position (see, e.g., FIG. 212) and into a fully installed position (see, e.g., FIG. 213). Additionally, the actuator 1554 may displace the constituent disposable 1424 out of engagement with the inlet receptacle 1422 and outlet receptacle 1426 once the supply of constituent in the constituent disposable 1424 has been consumed. The actuator motor 1543 may be a stepper motor in certain examples. The actuator motor 1543 may also include a brake which may be engaged when the actuator motor 1543 is unpowered. The brake may prevent pressure in the constituent disposable 1424 and manifold 1520 from forcing the constituent disposable 1424 out of the inlet and outlet port receptacles 1422, 1426.

In some embodiments, a sensor assembly 1559 may be included to provide feedback when the carriage assembly 1542 is in a certain position along the guide rails 1544. This allows for the control system 15 to drive the carriage assembly 1542 to a home position which may be detected based on a change in the signal output by the sensor assembly 1559. The control system 15 may determine location of the carriage assembly 1542 based on encoder counts (e.g. from an encoder included in the motor assembly 1543) since the carriage assembly 1542 was detected to be in the home position by the sensor assembly 1559. The sensor assembly 1559 may include an optical sensor, magnetic sensor, inductive sensor, etc.

In some embodiments, the constituent disposable 1424 may include an identification tag 1558 (e.g. in place of metal body 1555). The identification tag 1558 may be or may store a unique identifier which is associated with the constituent disposable 1424 on which the identification tag 1558 is installed. For example, the identification tag 1558 may be a machine readable indicia. The identification tag 1558 may be an optically read identification tag 1558 such as barcode, data matrix, bokode, QR code, or the like. In other embodiments, the identification tag 1558 may be an RFID tag (active or passive, read-only or readable and writable). The actuation assembly 1540 may include an identification sensor 1560 which may read the identification tag 1558 on the constituent disposable 1424. The identification sensor 1560 may depend on the type of identification tag 1558 employed. For example, where a barcode is used, the identification sensor 1560 may be a barcode reader or imager. Where an RFID tag is used, the identification sensor 1560 may be an RFID interrogator. In alternative embodiments, the identification sensor 1560 may be included in a handheld reader such as a barcode scanning gun. In certain examples, the identification tag 1558 may store or encode additional information of interest for a particular constituent disposable 1424. For instance, an identification tag 1558 may include lot number information, size information (where constituent disposables 1424 of different volumes are available), constituent type information (where constituent disposables 1424 filled with different constituents are available), dry weight, shelf life, manufacturing date, etc.

Each time a constituent disposable 1424 is installed on the actuation assembly 1540, the control system 15 may analyze data received from the identification sensor 1560 to verify that the constituent disposable 1424 is acceptable for use. For example, the control system 15 may check the unique identifier of the constituent disposable 1424 against a list (e.g. database) of previously used unique identifiers. The control system 15 may inhibit use of a constituent disposable 1424 if it is determined that the unique identifier associated with the constituent disposable 1424 has already been used. The control system 15 may also check other information stored in the identification tag 1558 to ensure it is as expected. For example, the control system 15 may verify that a desired type of constituent is contained in the constituent disposable 1424 and inhibit use of the constituent disposable 1424 if the constituent type indicated in the identification tag 1558 does not match the desired constituent. Additionally, the control system 15 may check lot number and shelf life data stored on the identification tag 1558 against a database. In the event of an issue with a manufacturing lot of constituent disposables 1424, the lot number may be flagged in the database and the control system 15 may then inhibit use of constituent disposables 1424 identified as belonging to any flagged lot number. If the shelf life has elapsed, the control system 15 may similarly inhibit use.

Though described in relation to constituent disposable 1424, other constituent containers described herein may also include identification tags 1558 which may be sensed by an identification sensor 1560 of the system 10. Other consumables (e.g. bags 26) or containers/holders for consumables used by the system 10 (e.g. stopper dispensers 446, see, e.g., FIGS. 82A-C, clips 1700, cutting cartridges 1800, see e.g., FIG. 157, fill nozzles 1910 see, e.g., FIG. 167, etc.) may also include identification tags 1558 which may be sensed by identification sensors 1560 of the system 10. Alternatively, beta containers 1608 (see, e.g., FIG. 111) may include identification tags 1558 which may include information related to components stored inside the beta container 1608 as well as information related to the beta container 1608. In such examples, individual components within the beta containers 1608 may not include identification tags 1558. This may allow for, identification, reuse prevention, lot tracking, and differentiation between various types of these consumables and containers used by the system 10.

Referring now to FIG. 215, a flowchart 1300 detailing a number of example actions which may be executed to generate and package a desired fluid is shown. As shown, in block 1302 a control system 15 of the system 10 may receive a request to fill a bag 26. The control system 15 may determine a constituent mass (e.g. sodium chloride) to dispense for that bag 26. This mass may be a mass needed to generate a solution of a requested percent constituent by weight per unit volume (e.g. 0.9% saline). In block 1304, bag 26 information may be collected from a set of bag characteristic sensors 444A-C (see, e.g., FIG. 66). In block 1306, a first dispensing stage may commence. In this stage, the fluid delivered to the bag 26 may be entirely or predominately constituent concentrate. The constituent mass dispensed into the bag 26 may be tracked by reading from at least one conductivity sensor and a flowmeter or flow controller. Once, in block 1308, the desired constituent mass is dispensed into the bag 26, a second dispensing stage may commence in block 1310. In the second stage, WFI may be dispensed into the bag 26. The volume of WFI dispensed may be tracked by a flowmeter or flow controller. Once, in block 1312, the volume of WFI needed to generate the desired solution has been dispensed, dispensing may halt in block 1314. Also in block 1314, the bag 26 may be collected from the fill station 356. By delivering the constituent in the first stage, the second stage may be leveraged as a flush of the line leading to the filling nozzle. This may ensure that substantially all constituent concentrate in the line is dispensed into the bag 26. Thus, the control system 15 may not have to account for a hold up volume in the line when attempting to pump constituent concentrate in order to generate a fluid with a desired concentration. Additionally, after the bag 26 has been filled, a subsequent bag 26 may be filled with a different type of solution or may be filled with a solution of a differing concentration. This may be done without having to waste constituent concentrate in a purge of fluid in the line between bags 26.

Referring now to FIG. 216, in certain embodiments, a crystalline constituent container 740 which fluid flows through may not be included. Instead, a crystalline constituent dispenser 780 may be used. As shown, fluid may exit the inlet manifold 734 and pass to a dosing manifold 784. The dosing manifold 784 may also be in communication with a crystalline constituent dispenser 780. The crystalline constituent dispenser 780 may dispense the crystalline constituent into the dosing manifold 784 via a dispensing assembly 787. A motor 785 may be included to drive the dispensing assembly 878. From the dosing manifold 784, fluid may flow to a concentrate reservoir 782. Where a concentrate reservoir 782 is included, at least one conductivity sensor (e.g. conductivity sensor 744) of the constituent flow path of the mixing circuit 348 may be included in or be in communication with the interior volume of the concentrate reservoir 782.

Referring now also to FIG. 217, a cross sectional view of the example dosing manifold 784 in FIG. 216 is depicted. As shown, the dosing manifold 784 may include an interior cavity 786. The interior cavity 786 may be in communication with the inlet manifold 734 via a first port 788. The crystalline constituent dispenser 780 may be in communication with the interior cavity 786 via a second port 790. The axis of the second port 790 may be arranged to allow of gravity feed of constituent from the crystalline constituent dispenser 780 into the interior cavity 786. The interior cavity 786 may be constructed to generate specific flow patterns which may aid in encouraging vigorous mixing within the dosing manifold 784. In the example embodiment, the interior cavity 786 includes a baffle 792 which is in line with the axis of the first port 788. The baffle 792 may cause turbulent flow directly upstream of the second port 790 so as to encourage the crystalline constituent to quickly mix and dissolve upon introduction. The baffle 792 may also narrow the cross section of a section of the flow path from the first port 788 to the outlet 794 of the dosing manifold 784. This may generate a venturi effect which may cause flow where the second port 790 opens into the interior cavity 786 to be more rapid than elsewhere in the interior cavity 786. Thus, as constituent enters the dosing manifold 784 it may be inhibited from piling up at the entry point. In other embodiments, the interior cavity 786 may include a plurality of baffles 792. The interior cavity 786 may also include a funnel region 796 directly upstream of the outlet 794. The funnel region 796 may encourage the generation of a vortex in the interior cavity 786 which may further aid in dissolving the crystalline constituent dispensed from the crystalline constituent dispenser 780. In the example embodiment, a turbulence generator 798 is also disposed within the outflow conduit 800 from the dosing manifold 784. The turbulence generator 798 may provide an additional aid which may help to dissolve the crystalline constituent. In the example embodiment the turbulence generator 798 is an insert with helicoid flighting, though any insert which may encourage mixing may be used. In alternative embodiments, the outflow conduit 800 from the dosing manifold 784 may be a coil of tubing which increases the transit time of fluid in the outflow conduit 800 as it travels to a downstream component in the fluid circuit 710 (e.g. conductivity sensor 744).

Referring now to FIGS. 218 and 219, an example crystalline constituent dispenser 780 is depicted. A portion of the crystalline constituent dispenser 780 is broken away to reveal components of the dispensing assembly 787 in FIG. 219. As shown, the crystalline constituent dispenser 780 may include a constituent storage compartment 802. The storage compartment 802 may have an outlet 804 which may feed into the dispensing assembly 787. In the example embodiment, the dispensing assembly 787 includes a bore 806 within which an auger 808 is disposed. The auger 808 may be attached to a drive shaft 810. The drive shaft 810 may extend to a motor 785 which may be operated to cause rotation of the auger 808. As the auger 808 rotates, constituent may be advanced through the bore 806 toward an outlet 812 of the dispensing assembly 787. The outlet may communicate with the interior volume of a dosing manifold 784 via the second port 790 (see, e.g., FIG. 217) of the dosing manifold 784. The control system 15 may command rotation of the auger 808 based on data collected from the conductivity sensor (e.g. conductivity sensor 744 of FIG. 204 in order to generate a solution of a desired concentration.

Referring now to FIGS. 220-222, another embodiment of an example crystalline constituent dispenser 780 is depicted. Again, in FIG. 221 a portion of the crystalline constituent dispenser 780 is broken away to reveal components of the dispensing assembly 787. As shown, the crystalline constituent dispenser 780 may include a constituent storage compartment 802. The storage compartment 802 may have an outlet 804 which may feed into the dispensing assembly 787. In the example embodiment, the dispensing assembly 787 includes an interior void 814 within which a paddle wheel 816 is disposed. The paddle wheel 816 may be attached to a drive shaft 810 which may extend to a motor 785 that may be operated to cause rotation of the paddle wheel 816. Rotation of the paddle wheel 816 may cause volumes of constituent to be advanced from the storage compartment 802 to the outlet 812 of the dispensing assembly 787. The outlet 812 may communicate with the interior volume of a dosing manifold 784 via the second port 790 (see, e.g., FIG. 217) of the dosing manifold 784. The control system 15 may command rotation of the paddle wheel 816 based on data collected from the conductivity sensor (e.g. conductivity sensor 744 of FIG. 204) in order to generate a solution of a desired concentration.

Referring specifically to FIG. 222, the exemplary paddle wheel 816 is shown in isolation. As shown, the paddle wheel 816 includes a number of circular members 818 which are disposed orthogonal to one another. Though two circular members 818 are shown in FIG. 222, other embodiments may include a greater number. In the example embodiment, the two circular members 818 are disposed substantially perpendicular to one another.

Referring now to FIG. 223 and FIG. 224, another example dispensing assembly 787 is depicted. Again, in FIG. 224 a portion of the housing 1018 of assembly 787 is broken away to reveal components of the dispensing assembly 787. Though not shown, the dispensing assembly 787 may typically be attached to a constituent storage compartment 802 such as those shown and described above. The storage compartment 802 may feed into an inlet 1010 of the dispensing assembly 787. In the example embodiment, the dispensing assembly 787 includes an interior passage 1016 within which an impeller 1012 is disposed. The passage 1016 may be sized such that the impeller 1012 prevents constituent from displacing through the passage 1016 without rotation of the impeller 1012. The impeller 1012 may be attached to a drive shaft 810 which may extend to a motor 785 that may be operated to cause rotation of the impeller 1012. Rotation of the impeller 1012 may cause volumes of constituent to be advanced from the storage compartment 802 to the outlet 1014 of the dispensing assembly 787. The outlet 1014 may communicate with the interior volume of a dosing manifold 784 via the second port 790 of the dosing manifold 784. The control system 15 may command rotation of the impeller 1012 based on data collected from the conductivity sensor (e.g. conductivity sensor 744 of FIG. 204) in order to generate a solution of a desired concentration.

Referring now to FIGS. 225 and 226, in some embodiments, a disc 1020 with a number of spaced apart depressions 1022 may be used in place of an impeller 1012. The depressions 1022 may be evenly spaced about the disc 1020. In the example embodiment, the depressions 1022 are spaced at even angular increments of 72°. The depressions 1022 may be the same shape. In the example, the depressions 1022 are bowl like. In other embodiments, the depressions 1022 may be obround (see FIG. 227) or any other desired shape. As the disc 1020 is rotated (the disc 1020 may be coupled to a motor 785 driven drive shaft 810 similar to FIG. 223 for example), the depressions 1022 may be brought into alignment with an inlet 1024 of the dispensing assembly 787. Constituent may fill the depression 1022. As the disc 1020 is further rotated, the depression 1022 may pass the inlet 1024 and come into communication with the outlet 1026 of the dispensing assembly 787. The constituent may fall from the depression 1022. The outlet 1026 may communicate with the interior volume of a dosing manifold 784 via the second port 790 (see, e.g., FIG. 217) of the dosing manifold 784. The flat, depression 1022 free areas of the disc

1020 may close off the inlet 1024 and prevent any passage of constituent to the outlet 1026 when aligned over the inlet 1024.

Referring now to FIG. 228A and FIG. 228B, another example dispensing assembly 787 is depicted. This dispensing assembly 787 may be used in place of the dispensing assemblies described above. As best shown in FIG. 228B, the dispensing assembly 787 may include a rotatable disc 820. The rotatable disc 820 may include a number of apertures 822 which extend through the disc 820. The rotatable disc 820 may be installed within a housing 824. In the example embodiment, the housing 824 may include a first housing portion 826 and a second housing portion 828. The first housing portion 826 may include an inlet 830 which may extend from a storage compartment 802 of a crystalline constituent dispenser 780. The second housing portion 828 may include an outlet 832 which may be in communication with the interior volume 786 of a dosing manifold 784. The inlet 830 and the outlet 832 may be offset from one another. As the rotatable disc 820 is rotated, an aperture 822 of the disc 820 may come into alignment with the inlet 830 from the storage compartment 802. Constituent may fall into the aperture 822. The disc 820 may then be rotated toward the outlet 832. As the aperture 822 begins to rotate over the outlet 832, the constituent may exit the dispenser assembly 787.

In the example embodiment, the housing 824 includes an opening 831 which provides access to the edge of the rotatable disc 820. A driven wheel may be in contact with the edge of the disc 820 through the opening and may allow the rotatable disc 820 to be rotated as needed to form a desired solution. In alternative embodiments, the disc 820 may include a drive shaft 810 (see, e.g., FIG. 221) which may be driven by a motor to rotate the rotatable disc 820. In still other embodiments, the edge of the disc may be teethed and a drive wheel may be included to cause rotation of the rotatable disc 820.

Referring now to FIGS. 229A and 229B another exemplary crystalline constituent dispenser 780 is shown. As shown, the crystalline constituent dispenser 780 may include a first compartment 1350 and a second compartment 1352. The first compartment 1350 may be a constituent storage compartment 802 which contains a supply of crystalline constituent. The first compartment 1350 and second compartment 1352 may be separated by a dispensing assembly 787. In the example embodiment, the dispensing assembly 787 is driven through a drive shaft 810 by a motor 785. Any dispensing assembly 787 described herein may be used. The second compartment 1352 may be a mixing compartment which may be used in place of a dosing manifold 784. The second compartment 1352 may include a funnel region 796. As shown, the funnel region 796 includes a plurality of inlet ports 1354A, B. The inlet port 1354A, B may be quick connect fittings (e.g. push to connect) which couple to lines from a WFI water source. As shown, the inlets 1354A, B are positioned on opposite sides of the funnel region 796. The inlets 1354A, B are also oriented such that water entering the second compartment enters substantially tangentially with respect to the curve of the funnel region 796. Thus, as water is delivered into the second compartment 1352 under pressure, the tangential inflow of water may encourage formation of a vortex of fluid within the second compartment 1352. Additionally, the funnel region 796 may include a pair of conductivity sensors 1356 which may monitor the conductivity of fluid in the second compartment 1352.

In certain examples, water may be delivered through the inlets 1354A, B and into the second compartment 1352 in a first stage of a reservoir filling operation. This may establish a vortex of fluid in the second compartment. Filling of the second compartment may be halted in a second stage of a reservoir filling operation. The dispenser assembly 787 may be driven to begin to displace a desired amount of constituent from the first compartment 1350 into the second compartment 1352 during the second stage of the filling operation. The vortex may cause the crystalline constituent to rapidly dissolve. In a third stage of a reservoir filling operation, an outlet valve 1358 of the crystalline constituent dispenser 780 may be actuated open to allow fluid in the second compartment 1352 to begin exiting the crystalline constituent dispenser and flowing towards a reservoir such as a bag 26. As shown, a tortuous flow path 1360 is included between the funnel region 796 and the outlet valve 1358 to further encourage robust dissolution of the constituent. Also in the third stage an additional volume of fluid may be delivered into the second compartment 1352. The fluid delivered to the second compartment 1352 in the first and third stage may be desired fill volume of the reservoir (e.g. a bag 26). Preferably, the dispensing assembly 787 may be driven at a rate sufficient to dispense the desired amount of constituent into the second compartment 1352 prior to the end of the third stage. This may allow the additional volume of water delivered into the second compartment 1352 in the third stage to flush any constituent containing solution out of the second compartment 1352. In a fourth stage, a wait period may elapse with the outlet valve 1358 open to allow any fluid in the second compartment to pass out of the crystalline constituent dispenser 780 and into the reservoir.

Referring now to FIG. 230 and FIG. 231, in some embodiments, the crystalline constituent dispenser 780 may be at least partially disposable (the motor 785 may typically be reused). This may be desirable as the crystalline constituent dispenser 780 may be a dead end within the fluid path which may be hard to disinfect by circulation of hot water through the fluid circuit 710 (see, FIG. 204). Additionally, it may be difficult to back flow hot water through a crystalline constituent dispenser 780 as the dispensing assembly 787 may block communication from the outlet to the inlet of the crystalline constituent dispenser 780 when not being powered. The crystalline constituent dispenser 780 may come with its disposable components as part of a consumable sealed cartridge which is replaced by the user as a prior cartridge is depleted. FIGS. 230 and 231 depict an outlet 1030 portion of a dispensing assembly 787. A similar arrangement may be included as the outlet of any of the dispensing assemblies described herein. As best shown in FIG. 231, the outlet 1030 portion may include a seal member 1032. The seal member 1032 may be a film seal or similar pierceable barrier which seals the end of the crystalline constituent dispenser 780 which is coupled to the second port 790 of the dosing manifold 784. The opposite end of the crystalline constituent dispenser 780 may be attached to a closed storage compartment 802. Thus, the crystalline constituent dispenser 780 may be in a sealed state prior to use.

As shown, the second port 790 may include a retainer clip 1036. The outlet portion 1030 may include a flange 1038. The second port 790 may also include a puncturing member 1034. As the crystalline constituent dispenser 780 is mated to the second port 790, the clip 1036 may spread apart to allow passage of the flange 1038. The clip 1036 may be biased so as to close over the flange 1038 after the flange 1038 has been advanced passed the clip 1036. This may retain the crystalline constituent dispenser 780 on the dosing manifold 784. The puncturing member 1034 may puncture the sealing member 1032 as the outlet 1030 is coupled into the second port 790. Gasketing members 1040 such as o-rings may be included to ensure that a seal to the surrounding environment is generated. As shown, the outlet 1030 includes a baffle 1042 which may direct or limit the flow of constituent into the dosing manifold 784. Additionally, the puncturing member 1034 may include a number of perforations 1044. The perforations 1044 may limit the flow of constituent into the dosing manifold 784. This may help to ensure that a constant flow of constituent is provided to the dosing manifold 784 as opposed to discrete boluses which may be output by certain dispensing assemblies 787.

As shown, the second port 790 may also include a recirculation port 1046. The recirculation port 1046 may allow for a fluid line to be connected to the second port 790 during a disinfect with hot water. When it is desired to run a disinfect, the crystalline constituent dispenser 780 may be removed and a cap (not shown) may be installed on the second port 790 to seal the opening. Hot water may then be circulated through the second port 790 via the line attached to the recirculation port 1046.

Referring now to FIG. 232-234, yet another example dispenser assembly 787 is depicted. This dispensing assembly 787 may be used in place of the dispensing assemblies described above. As shown, the dispensing assembly 787 may include a section of flexible tubing 832. The tubing 832 may extend from an inlet 834 which may be in communication with a storage compartment 802 containing crystalline constituent. The tubing 832 may be oriented so as to allow for gravity feed of constituent into the tubing 832. The inlet 834 may include a restrictor which lowers the rate of constituent flow into the tubing 832.

The tubing 832 may be held in place by one or more cradle 836. In the example embodiment two cradles 836 are included. The cradles 836 may position the flexible tubing 832 such that the tubing 832 lays up against pairs of support members 838A, B. In the example embodiment, each pair of support members 838A, B includes a support projection 838A and a support roller 838B. In alternative embodiments, only support rollers 838B or support projections 838A may be used. The support members 838A, B of each pair may be spaced apart such that an occluder 840 may be displaced into an intermediary space between the support members 838A, B. As shown in FIG. 233 and FIG. 234, the occluders 840 of the dispensing assembly 787 may be actuated into a space between the support members 838A, B or each pair of support members 838A, B. This may deform the flexible tubing 832 and prevent flow through the tubing 832.

As the dimensions of the tubing 832 may be known, the spacing between each pair of support members 838A, B may be selected such that the interior volume of the tubing 832 between each of the support member 838A, B pairs is a desired value. The occluder 840 associated with the downstream pair of support members 838A, B may be actuated to block off flow through the tubing 832 (see FIG. 233). Constituent may enter the tubing 832 and fill the volume of tubing 832 between the pairs of support members 838A, B. The upstream occluder 840 may then be actuated to isolate the known volume of constituent between the pairs of support members 838A, B. The downstream occluder 840 may then be actuated to retract that occluder 840 (see FIG. 234). This may allow the constituent to exit the tubing 832 and enter into a dosing manifold 784.

Referring now to FIGS. 235-236, in certain system 10 embodiments, it may be desirable to perform filling and sealing of a bag 26 outside of an enclosure 12 which is controlled to a clean room standard. In such embodiments, the system 10 may fill bags 26 which have been previously sterilized without exposing the interior volume of the bag 26 to the surrounding environment. This may be accomplished by establishing an aseptic connection between a port 392 of the bag 26 and a filling conduit where the interiors of the port 392 and filling conduit are sealed from the surrounding environment until that connection is formed. Fluid from a fluid circuit 710 (see, e.g., FIG. 204) may be transferred through the filling conduit and into the interior volume of the bag 26. The connection between the filling conduit and the port 392 of the bag 26 may then be broken in an aseptic fashion. In some embodiments, the filling conduit and port 392 may be sealed from the surrounding environment as communication between the two is severed.

An exemplary fluid packaging apparatus 900 which may facilitate filling of bags 26 in an uncontrolled or less stringently controlled surrounding environment is shown in FIGS. 235-236. In certain embodiments, a fluid packaging apparatus 900 may replace any of the sealing stations 358 described elsewhere herein. A fluid packaging apparatus 900 may also double as a filling station 356 allowing the fluid packaging apparatus 900 to be used in place of discrete filling and sealing stations 356, 358. This may reduce the complexity of system 10, allow a system 10 to be made more compact, and limit requirements for tight environmental control of the area in which bags 26 are filled and sealed.

As shown in FIGS. 235-236, the example fluid packaging apparatus 900 may include a fill conduit feed assembly 902. The fill conduit feed assembly 902 may advance a segment of fill conduit from a conduit dispenser 1050 (see FIG. 237) such as a spool or reel into the fluid packaging apparatus 900. The fill conduit 1060 (see FIG. 237) may have a terminal end which is sealed. The terminal end may be provided sealed or may be in a sealed state after the filling of a previous bag 26. Thus the interior of the fill conduit 1060 lumen may be kept out of communication with the surrounding environment. The fill conduit 1060 may be fed into a tube retainer 934 of a tubing manipulation assembly 904 (see FIG. 240) of the fluid packaging apparatus 900.

Referring now to FIGS. 237 and 238, an exemplary embodiment of conduit dispenser 1050 is depicted. As shown, the conduit dispenser 1050 may include a guide portion 1052 and a reel portion 1054. The guide portion 1052 may be in the form of a conic frustum. The guide portion 1052 may direct the fill conduit 1060 out of an aperture of the guide portion 1052 as a fill conduit feed assembly 902 pulls fill conduit 1060 out of the conduit dispenser 1050. The guide portion 1052 may include a bracket for mounting of the guide portion 1052 to a stand or the like which positions the conduit dispenser 1050 above the fill conduit feed assembly 902. Any other suitable mounting member may be used in other embodiments. As shown, the reel portion 1054 may couple to the guide portion 1052. In the example embodiment a bayonet mount is included. The guide portion 1052 includes mounting pins 1062. The reel portion 1054 includes cooperating mounting tracks 1064. In other embodiments, a magnetic coupling, threaded coupling, interference fit, snap fit, fasteners, adhesive, etc. may be used. In certain embodiments, the guide portion 1052 may be a reusable component. The reel portion 1054 may be disposable and new reel portions 1054 may be coupled to the guide portion 1052 as fill conduit 1060 is consumed.

The reel portion 1054 may have a cup like shape in which a coil of fill conduit 1060 may be stored. An organizer 1058 may be disposed within the reel portion 1054. In the example embodiment, the organizer 1058 is depicted as a plurality of walls which may provide a set or tracks within which the fill conduit 1060 may be laid. As the guide portion 1052 is a conic frustum, the walls may increase in height with proximity to the center of the reel portion 1054. This may allow for more fill conduit 1060 to be placed within the tracks formed by the organizer 1058. In alternative embodiments, a mandrel around which the fill conduit 1060 is wrapped may be used as the organizer 1058. The reel portion 1054 may be sized so as to hold a length of fill conduit 1060 sufficient to fill 50-100 bags 26. In some embodiments, the reel portion 1054 may hold around 10-20 feet of coiled fill conduit 1060. Larger or smaller reel portions with varying capacities may also be available. The fill conduit 1060 may come pre-primed and sterile. The fill conduit 1060 may be provided in a sealed state such that the interior of the fill conduit 1060 and the fluid contained therein is out of communication with the surrounding environment.

As best shown in FIG. 237, the reel portion 1054 of the conduit dispenser 1050 may include an inlet orifice 1066. A portion of the fill conduit 1060 which extends to the fluid circuit 710 (see, e.g. FIG. 204) may enter into the reel portion 1054 via the inlet orifice 1066. In the example embodiment, a standoff 1068 which cradles the fill conduit 1060 upstream of the inlet orifice 1066 is also included. The standoff 1068 may aid in ensuring that the radius of any bend in the fill conduit 1060 as it enters the inlet orifice 1066 is greater than a value which could lead to kinking of the fill conduit 1060. In certain embodiments, the terminal end of the fill conduit 1060 which connects to the fluid circuit 710 may include a quick connect fitting to facilitate establishment of a fluidic connection. In alternative embodiments, the inlet orifice 1066 may be included in side wall of the reel portion 1054 as opposed to a top face of the reel portion as shown. In other embodiments, the reel portion 1054 may include a quick connect or other fitting which an end of the fill conduit 1060 is in communication with. The reel portion 1054 may be docked on a cooperating fitting in communication to a source of fluid to place the fill conduit 1060 into communication with the source. In these alternative embodiments, the standoff 1068 may be omitted.

In the example embodiment, the organizer 1058 is also arranged to aid in preventing any kinking of the fill conduit 1060. As shown, the inlet orifice 1066 opens into the innermost portion of the track formed by the organizer 1058. The inner most portion of the track has a radius which may not cause kinking of the fill conduit 1060 within the reel portion 1054. The fill conduit 1060 may be wrapped once around the inner track 1070A, then pass through a break 1072 in the organizer 1058 wall to an intermediate track 1070B. The fill conduit 1060 may be wrapped once around the intermediate track and then pass through a break 1072 in the organizer 1058 wall to and outermost track 1070C. In alternative embodiments where the reel portion 1054 has a larger capacity there may be at least one additional intermediate track 1070B. The fill conduit 1060 may be wrapped along the outermost track 1070C. The intermediate track or tracks 1070B may then be filled followed by the inner most track 1070A. This wrapping process may be repeated until the fill conduit 1060 is completely wrapped into the organizer 1058. This may encourage fill conduit 1060 to be dispensed in a manner which is unlikely to lead to snagging or kinking. Additionally, as shown, the organizer 1058 may include rounded or chamfered edges which may similarly limit opportunity for fill conduit 1060 to kink or snag.

Where the fill conduit 1060 does not come pre-primed, the fill conduit 1060 may be connected to the fluid circuit 710 and hot water may be delivered through the fill conduit 1060 to a drain or a priming reservoir (e.g. a bag or other container). The control system 15 may require that hot water flow through the fill conduit 1060 for a predefined period of time (which may be preset depending on the temperature of the hot water) before the control system 15 may allow the fluid packaging apparatus 900 to operate with a new conduit dispenser 1050. Once the time period has been met, the downstream end of the fill conduit 1060 may be sealed by a bag or tube sealer assembly 906 (described later in the specification). This may leave the fill conduit 1060 primed and disinfected prior to use.

Referring now to FIG. 239, an exploded view of an example fill conduit feed assembly 902 is shown. As shown, the fill conduit feed assembly 902 may include a motor 912. The motor 912 may drive a shaft 914 which may be keyed (in the example embodiment with a "D" shaped cross section). The shaft 914 may mate into an orifice in a first gear 916 or a feed roller 920 coupled thereto. The first gear 916 may interdigitate with a second gear 918. Each of the gears 916, 918 may be coupled to a respective feed roller 920. As the shaft 914 rotates, this rotation may be transferred to the first and second gear 916, 918 which in turn may cause rotation of the feed rollers 920. As shown, the gears 916, 918 and feed rollers 920 may be captured within a housing 922. The housing 922 may include a feed passage 924 through which the fill conduit 1060 may be displaced. As shown, the rollers 920 include a concave surface 926 which may contact the exterior surface of the fill conduit 1060. This may ensure that the feed rollers 920 do not collapse or obstruct the lumen of the fill conduit 1060 as the fill conduit 1060 is displaced through the fill conduit feed assembly 902. The feed rollers 920 or the concave surface of the feed rollers 920 may be constructed of an elastomer or other material with a high friction coefficient so as to facilitate feed of the fill conduit 1060 as the feed rollers 920 are rotated.

Referring again primarily to FIGS. 235 and 236, in the example embodiment a grasper 418 is depicted and may be attached to a robotic arm 360 which may transport bags 26 to and from the fluid packaging apparatus 900. In some embodiments, the grasper 418 may remain at the fluid packaging apparatus 900 during filling and may hold the bag 26 in place. The bag 26 may be introduced to the fluid packaging apparatus 900 pre-sterilized. The port 392 of the bag 26 which is to be used for filling may be provided in a sealed state. Thus, the interior volume of the port 392 and bag 26 may be kept out of communication with the surrounding environment. When the bag 26 is introduced to the fluid packaging apparatus 900, the port 392 to be used for filling may be fed into the tube retainer assembly 934 of the tubing manipulation assembly 904 through a base plate 911 (see FIG. 240) of the fluid packaging apparatus 900. When both the port 392 and fill conduit 1060 are disposed in the tube retainer assembly 934, they may be substantially parallel to one another.

Referring now also to FIGS. 240-241, an example tubing manipulation assembly 904 and example base plate 911 are shown. As shown, a fill conduit feed guide 930 (best shown in FIG. 240) is included and may direct the fill conduit 1060 as the fill conduit 1060 is displaced into the tube retainer assembly 934. The fill conduit feed guide 930 may have a funnel like shape and may direct the fill conduit 1060 into a fill conduit retention trough 932 of the tube retainer assembly 934. Similarly, the base plate 911 may include a port guide 936 which may aid in directing the port 392 of the bag 26 into a port retention trough 938 of the tube retainer assembly 934. The fluid packaging apparatus 900 may include tubing sensors 933, 935 which may sense whether tubing is present in the fill conduit retention trough 932 and port retention trough 938. The tubing sensors 933, 935 may be optical sensors such as reflectivity based sensors which may monitor the fill conduit retention trough 932 and port retention trough 938 via windows 937 extending into each of the fill conduit retention trough 932 and port retention trough 938. The control system 15 may monitor the output of the tubing sensors 933, 935 and may use data from the tubing sensors 933, 935 as feedback for the fill conduit feed assembly 902 and grasper 418.

As shown, the tube retention assembly 934 may include a first portion 940A and a second portion 940B. The first and second portion 940A, B may be separated by a gap. The first portion 940A of the tube retention assembly 934 may be displaceable relative to the second portion 940B which in the example embodiment is fixed to the base plate 911. As shown, the first portion 940A is attached to a sled body 942 which may translationally displace along a set of guide rods 946 via a motor 944. The sled body 942 may also be coupled to a pivot body 943. The pivot body 943 may be pivotally coupled to a guide rod 945 allowing for rotation of the tubing manipulation assembly 904 and attached first portion 940A of the tube retention assembly 934 about the axis of the guide rod 945.

Additionally, as best shown in FIG. 241, the fill conduit retention trough 932 and the port retention trough 938 may each include enlarged regions 948 on each side of the gap between the first and second portion 940A, B of the tube retention assembly 934. These enlarged regions 948 may accommodate the shape change of the fill conduit 1060 and port 392 when the fill conduit 1060 and port 392 are flattened by an occluder assembly 908.

Referring now also to FIGS. 242-244, an exemplary occluder assembly 908 is depicted. The occluder assembly 908 may include a motor 952 which may displace a carriage 953 to which an occluder 950 is coupled toward and away from the tube retainer assembly 934. This may cause the fill conduit 1060 and the port 392 to be flattened against the walls of their respective fill conduit retention trough 932 and port retention trough 938. This may drive fluid out of the port 392 and fill conduit 1060 at least along a portion of the both the port 392 and the fill conduit 1060 that is located in the tube retainer assembly 934. As shown, the occluder 950 may include a first portion 956A and a second portion 956B. The first and second portion 956A, B may be separated from one another by a gap. The gap between the first and second portion 956A, B of the occluder 950 may be about the same width as the gap between the first and second portion 940A, B of the tube retainer assembly 934. The gap may also be disposed along the same plane as that of the tube retainer assembly 934. Each of the first and second portion 956A, B of the occluder 950 may include a set of occluder members 958. The occluder members 958 of each set of occluder members 958 may be spaced apart from one another a distance equal to the spacing between the fill conduit retention trough 932 and the port retention trough 938 of the tube retention assembly 934. This may allow the occluder members 958 to pass into the fill conduit retention trough 932 and the port retention trough 938 when the occluder 950 is advanced by the motor 952.

As shown, the second portion 956A of the occluder 950 is mounted on a rail 960. This may allow the second portion 956B of the occluder 950 to displace along with the first portion 940A of the tube retention assembly 934 as the sled body 942 of the tubing manipulation assembly 904 (see, e.g., FIG. 241) is moved. The rail 960 is included on a boom 962 which may be pivotally coupled to the guide rod 945 (see, e.g., FIG. 240). This may allow the second portion 956B of the occluder 950 to rotationally displace in tandem with the tube manipulation assembly 904. The guide rod 945 may also direct movement of the occluder assembly 908 as the motor 952 displaces the carriage 953 and attached occluder 950 toward and away from the tube retention assembly 934.

As shown, the first and second portion 956A, B of the occluder 950 may also include tie pins 964. The tie pins 964 may extend through the first and second portion 940A, B of the tube retention assembly 934 into the first and second portion 956A, B of the occluder 950. The tie pins 964 may help to couple motion of first and second portion 956A, B of the occluder 950 to motion of the first and second portions 940A, B of the tube retention assembly 934.

The second portion 956B of the occluder 950 may be coupled to the carriage 953 via a fastener 961. Specifically, the fastener 961 may extend through an elongate slot in the boom 962 and into a receiving hole in the carriage 953. As best shown in FIG. 244, the second portion 956B of the occluder 950 may also be coupled to the carriage 953 via a bias member 957. In the example embodiment, the bias member 957 is depicted as an extension spring, though any suitable bias member 957 may be used. The bias member 957 may exert a force which urges the second portion 956B of the occluder 950 to rotate about the guide rod 945 (see, e.g., FIG. 241) toward the first portion 956A of the occluder 950. The bias member 957 is further described in relation to FIG. 247. The elongate slot in the boom 962 may provide sufficient clearance for the fastener 961 to allow for this rotation to occur. Additionally, the carriage 953 may include rolling element bearings 959 which extend proud of the face of the carriage 953 adjacent the boom 962. The rolling element bearings 959 may allow the boom 962 to pivot without binding up against the carriage 952.

Referring now to FIG. 245, a cutter assembly 910 may be included in the fluid packaging apparatus 900. The cutter assembly 910 may be actuated by a cutter motor 970 which may drive a heated blade 972. The heated blade 972 may be disposed in a blade retainer 974 which may include a chamber in which a heater 976 is disposed. The example heater 976 is shown as a cartridge heater. The blade retainer 974 may also include a mount 978 for a temperature sensor 980 which may provide data to a control system 15 which governs operation of the heater 976. In certain embodiments, the heated blade 972 may be constructed of a metallic material which may be coated. In certain embodiments, a ceramic coating may be applied to the metallic material. The ceramic coating may be a cerakote in certain embodiments available from Cerakote of 7050 6th Street White City, Oregon. In alternative embodiments a synergistic surface enhancement NEDOX coating such as NASA material #20386 MSFC Handbook 527F (NEDOX SF-2), Johnson Space Flight Center #D9604F may be used. Such coatings may allow the heated blade 972 to be repeatedly reused during operation of the fluid packaging apparatus 900. NEDOX coatings may, for example, be available from General Magnaplate of 801 Avenue G East, Arlington, Texas.

As shown, the blade retainer 974 may be mounted on an arm 975 of the cutter assembly 910 which may couple onto the guide rod 945 to aid in directing the actuation movement of the cutter assembly 910. Thus, the guide rod 945 may provide a single axis which the cutter assembly 910, occluder assembly 908, tubing manipulation assembly 904 are all constrained to. By placing each of these assemblies on a single axis, the fluid packaging apparatus 900 may be made in a compact fashion.

Referring now also to FIG. 246, the cutter motor 970 may actuate the heated blade 972 into the gap extending through the tube retainer assembly 934 and occluder 950. This may be done while the occluder assembly 908 is actuated to flatten the fill conduit 1060 and port 392 within the fill conduit retention trough 932 and the port retention trough 938 of the tube retention assembly 934. The heated blade 972 may cut through the port 392 and fill conduit 1060 as the heated blade 972 is displaced into the gap. This may sever the terminal ends of the port 392 and fill conduit 1060 from the remaining portions of port 392 and fill conduit. Since the fill conduit 1060 and port 392 are flattened, substantially no liquid (e.g. water or saline) may be present in the lumens of these tubes. This may ensure that the liquid does not behave as a heat sink or boil due to the heat of the heated blade 972. Thus, flattening of the fill conduit 1060 and port 392 may simplify cutting and welding of the fill conduit and port 392.

Still referring to FIG. 246, as the heated blade 972 cuts through the port 392 and fill conduit 1060, the material of the port 392 and fill conduit 1060 may melt against the faces of the blade such that a seal is formed and maintained against the face of the heated blade 972 during the cutting action. This may prevent the interior lumens of the fill conduit 1060 and the port 392 from being exposed to the surrounding environment as they are cut. With the cutting assembly 910 held in the actuated position, a first portion 940A of the tube retainer assembly 934 may be displaced relative to a second portion 940B of the tube retainer assembly 934 until the remaining portions of the port 392 and the fill conduit 1060 are aligned or coaxial with one another. As mentioned elsewhere, the second portion 956B of the occluder 950 may be disposed on a rail 960 and may be coupled to the first portion 940A of the tube retention assembly 934. Thus, the second portion 956B of the occluder 950 may displace in tandem with the first portion 940A of the tube retention assembly 934. This may ensure that the fill conduit 1060 remains in a flattened and occluded state during displacement of the first portion 940A of the tube retention assembly 934. The first portion 940A of the tube retainer assembly 934 may be on a first side of the heated blade 972 while the second portion 940B may be on an opposing side of the heated blade 972. The interior lumens of the remaining portions of the port 392 and the fill conduit 1060 may remain in sealing contact with and slide along opposing faces of the heated blade 972 during this displacement. Thus, the interior lumens of the remaining portion of the port 392 and fill conduit 1060 may be maintained out of communication with the surrounding environment as they are brought into alignment with one another.

Referring now primarily to FIG. 247, in certain embodiments, as the heated blade 972 is withdrawn, the filling conduit 1060 and port 392 may be joined to one another such that a continuous lumen extending from the fill conduit 1060 to the interior of the bag 26 through the port 392 is formed. As the withdrawal occurs, the remaining portions of the port 392 and fill conduit 1060 may be pressed against one another such that a junction is formed and their interiors are kept isolated from the surrounding environment. As shown, the cutter assembly 910 may include a carriage portion 982 in which a cam surface 984 is provided. The tubing manipulation assembly 904 may include a cam follower 986. The cam follower 986 may be held in place against the cam surface 984 via force exerted by the bias member 957 of the occluder assembly 908 (see, e.g. FIG. 244). This force may be transferred through the tie pin 964 coupling the second portion 956B of the occluder 950 to the first portion 940A of the tube retention assembly 934 (see, FIG. 243). When the heated blade 972 of the cutter assembly 910 is actuated into the tube retention assembly 934 the cam follower 986 may be positioned against a raised portion 985A of the cam surface 984 as depicted in FIG. 247. In this position, the gap between the first and second portion 940A, B of the tube retention assembly 934 and the gap between the first and second portion 956A, B of the occluder 950 may be present.

In certain embodiments, a counterweight may be included on the tubing manipulation assembly 904. The counterweight may extend from the tubing manipulation assembly 904 past the cam surface 984. Thus, the counterweight may provide additional force that may aid in holding the cam follower 986 against the cam surface 984. In some embodiments, a counterweight may be used in place of the bias member 957. In certain embodiments, an additional bias member which couples the tubing manipulation assembly 904 to the base plate 911 may be included. This additional bias member may provide additional force which may aid in holding the cam follower 986 against the cam surface 984. In some embodiments, a bias member coupling the tubing manipulation assembly 904 may be used in place of the bias member 957 (with or without the above described counterweight).

As the heated blade 972 begins to be retracted out of the cut fill conduit 1060 and port 392, the cam follower 986 may transition to a sloped section 985B of the cam surface 984. The sloped section 985B of the cam surface 984 may lead to a recessed section 985C of the cam surface 984. Thus, as the cam follower 986 passes along the sloped section 985B of the cam surface 984, the force exerted by the bias member 957 (see FIG. 244) may cause the gaps to begin to close. Specifically, in the example embodiment, this force may cause the second portion 956B of the occluder 950 to pivot about the guide rod 945 and against the roller element bearings 959 toward the first portion 956A of the occluder 950 (see FIG. 244). In turn, this may pull on the tubing manipulation assembly 904 (see, e.g., FIG. 240) via the tie pin 964 connecting the first portion 940A of the tube retention assembly 934 to the second portion 956B of the occluder 950 (see FIG. 243). The pulling force may cause the tubing manipulation assembly 904 to rotate about the axis of the guide rod 945 (see, e.g. FIG. 240). As a result, the previously aligned remaining portions of the port 392 and the filling conduit 1060 may be driven toward one another via force originating from the bias member 957. The remaining portions of the filling conduit 1060 and port 392 may melt into each other and begin to form a junction as the heated blade 972 is retracted out of the way.

When the heated blade 972 is completely retracted out of the tube material, the cam follower 986 may transition to the recessed portion 985C of the cam surface 984. The force exerted by the bias member 957 may substantially close the gap and press the remaining portion of the port 392 and filling conduit 1060 against one another. This may allow the formation of the junction to complete. As the port 392 and filling conduit 1060 melt together as the heated blade 972 is removed, the interior of the tubing may be kept out of communication with the surrounding environment during the joining process.

In certain fluid packaging apparatus 900 embodiments, the lumen at the juncture between the fill conduit 1060 and port 392 may not always remain patent or entirely patent after the junction is formed. In such examples, one of first portion and second portion 940A, B of the tube retainer assembly 934 may be displaced relative to the other in order to break any seal which is obstructing the lumen. In the example embodiment described above, the sled 942 of the tubing manipulation assembly 904 may be driven back and forth over a predefined distance a number of times to exert stress on the bond closing off the lumen or portion of the lumen. This stress may disrupt the bond in the lumen without disrupting the integrity of the junction between the filling conduit and port 392. Fluid may then be delivered into the bag 26 to fill the bag 26.

The fill conduit feed assembly 902 may be positioned such that the feed passage 924 is aligned substantially in the center of the range of displacement of the displaced portion 940A, B of the tube retainer assembly 934. Thus, as the sled 942 is driven back and forth to disrupt any potential bond within the lumen, the angle of fill conduit 1060 exiting the fill conduit feed assembly 902 is kept as small as possible. This may limit axial stresses exerted on the fill conduit 1060 during this displacement and may limit any force which may tend to pull apart the newly formed junction.

Referring now to FIG. 248 and FIG. 249, the tube sealer assembly 906 may then be actuated to seal and cut the port 392 in order to free the filled bag 26 from the fluid packaging apparatus 900. Again, this may be accomplished without exposing the interior of the port 392 lumen or bag 26 to the surrounding environment. Bag sealer assemblies 906 such as that described in relations to FIG. 248 and FIG. 249 may be included in other embodiments described herein. For example, a tube sealer assembly 906 may be included in the filling station 1110 described in relation to FIGS. 199A-203. Such a tube sealer assembly 906 may be used to shorten the length of fill lines 1090 extending from the bags 26. The sealing station 1616 shown in FIG. 111 may also be a tube sealer assembly 906 as shown in FIGS. 248-249.

As shown, the example tube sealer assembly 906 of FIG. 248 and FIG. 249 may include a set of opposing jaws 990. The opposing jaws 990 may be displaced toward and away from each other via a motorized drive 992. In the example embodiment, the opposing jaws 990 may be coupled into a track 994 along which the jaws 990 may be displaced. When a port 392 of a bag 26 is ready to be sealed, the opposing jaws 990 may be driven toward one another so as to pinch the port 392 between sealing plates 998 of each jaw 990. This may drive fluid out of the lumen at the pinched region of the port 392.

A heater 996 such as a cartridge heater may be disposed in each of the opposing jaws 990. The heaters 996 may be powered so as to heat a sealing plates 998 to a temperature sufficient to melt the port material. As the port 392 is pinched, the walls of the lumen of the port 392 may be pressed against one another. As the material melts, the walls of the lumen of the port 392 may melt into one another sealing off the port 392. Each of the sealing plates 998 may include a mounting hole in which a temperature probe 999 may be disposed. Data from the temperature probes 999 may be utilized by the control system 15 to govern the heating of the sealing plates 998 via the heaters 996.

As shown, each of the jaws 990 may also include a cutter insert 1000. The cutter insert 1000 may include a raised peak 1004 which may extend through a slot 1002 in the sealing plate 998 with which it is associated. In the example embodiment, the peaks 1004 of each opposing jaw 990 are in the same plane as one another such that they may abut when the opposing jaws 990 are actuated closed by the motorized drive 992. The peaks 1004 may serve to cut the port 392 and free the filled bag 26 from the fluid packaging apparatus 900. Preferably, the cutter inserts 1000 may only cut through the port 392 after a robust seal has been created in the port 392 by the sealing plates 998. In some examples, the cutter insert 1000 may be constructed of a material with relatively low thermal conductivity. For instance, the cutter insert 1000 may be a plastic with a low thermal conductivity and high resistance to thermal degradation such as a plastic from the Polyaryletherketone (PAEK) family like Polyether ether ketone (PEEK). Other suitable materials may be used in alternative embodiments. Using a material which is a poor conductor of heat to construct the cutter inserts 1000 may be desirable as it may ensure that the port 392 reaches a suitable temperature to form a robust seal before the port 392 is severed. The heat from the sealing plates 998 may heat the port 392 until the port 392 material becomes sufficiently molten that the pressure exerted by the peaks 1004 is able to press through and cut the port 392. As shown, the peaks 1004 are blunt and rounded so as to limit concentration of pressure at any one point along the port 392 further helping to ensure that a robust seal is generated prior to severing of the bag 26. Where the tube sealer assembly 906 is intended to seal, but not cut through a port 392 (e.g. sealing station 1616 of FIG. 111), the cutter inserts 1000 may be omitted.

With the bag 26 freed, the fill conduit 1060 may be advanced such that the junction formed between the fill conduit 1060 and the port 392 is located at the tube sealer assembly 906. The tube sealer assembly 906 may again be actuated to form a seal in the fill conduit 1060 upstream of the junction and sever the juncture from the fill conduit 1060. The fill conduit feed assembly 902 may then retract the fill conduit 1060 such that the sealed end of the fill conduit 1060 is disposed in the fill conduit retention trough 932 of the tube retainer assembly 934. The next bag 26 may be loaded into the fluid packaging apparatus 900 and the process may be repeated as desired.

It should be noted that the motors 944, 952, 970, 992 of the fluid packaging apparatus 900 may, in certain embodiments, be replaced with pneumatic or hydraulic actuators. In such embodiments, a compressor and accumulator may be provided to facilitate actuation. Alternatively, a consumable cartridge of pressurized gas may be installed in the fluid packaging apparatus 900 and plumbed via a manifold to each of the actuators. Where motors 944, 952, 970, 992 are used, each of the motors included in the fluid packaging apparatus 900 may be outfitted with an encoder which may provide feedback on displacement.

Referring now to FIGS. 250 and 251, in certain embodiments, a bag sealing assembly 906 may be used to isolate a sample of fluid within the port 392 of the bag 26. In such embodiments, a cutter insert 1000 may not be included in each of the sealing plates 998. The bag sealing assembly 906 may be included in various embodiments of the system 10 which may not necessarily include a fluid packaging apparatus 900. A bag sealing assembly 906 may for example be included in the systems 10 depicted in FIG. 54, FIG. 56, and FIG. 177. This may allow for a system 10 to be constructed without a quarantine repository 362 (see, e.g. FIG. 56) within the enclosure 12 of that system 10. Bags 26 may be filled and an aliquot of fluid for later sampling may be isolated within a segment of the port 392 through which the bag 26 is filled. The port 392 of the bag 26 may be sealed at a first location 1140 which is proximal to the interior volume of the bag 26. As above, when the seal is generated, the walls of the lumen on the interior of the port 392 may melt into one another closing off the flow path through the port 392. As shown in FIG. 250, the port 392 of the bag 26 may also be sealed at a second location 1142 which is upstream of the first location 1140. In certain examples, the seal at the first location 1140 may be generated before the seal at the second location 1142. The distance between the first location 1140 and second location 1142 may be selected based on the lumen diameter of port 392 and the desired sample volume.

Once the bag 26 has been filled and a sample has been isolated within the port 392, the bag 26 may be released from the system 10. A user may use a sampling instrument to access to the sample for testing. For example, the user may puncture the port 392 between the first and second locations with a syringe or similar implement and extract fluid from the sample volume. Testing (e.g. pyrogen testing) may be conducted on fluid from the sample. The port 392 may then be cut at the first location 1140 and the portion of the port 392 including the sample volume and seal at the second location 1142 may be discarded.

Referring now to FIG. 252, a block diagram of a system 10 for producing and packaging medical fluids is shown. An exemplary embodiment of the system 10 shown in the block diagram of FIG. 252 is depicted in FIGS. 253-254. Though an environmentally controlled enclosure 12 (see, e.g., FIG. 111) may be included, no enclosure 12 is depicted in FIGS. 253-254. The system 10 may fill bags 26 which have been previously sterilized outside of an enclosure 12 without exposing the interior volume of the bag 26 or a filling conduit 2018 to the surrounding environment. The port 1654 of a bag 26 and a filling conduit 2018 may be provided in a sealed and sterile state. The port 1654 and filling conduit 2018 may be aseptically connected and fluid from a fluid circuit 710 (see, e.g., FIG. 204) may be transferred into the bag 26 via the filling conduit 2018. The connection between the filling conduit 2018 and the port 1654 may then be broken in an aseptic fashion leaving the port 1654 and fill conduit 2018 separated and in a sealed state.

As shown, the system 10 may include a bag carriage 2000 which may hold a bag 26. The bag carriage 2000 may be coupled to a carriage transport assembly 2004. The bag carriage 2000 may be driven along the carriage transport assembly 2004 to displace the bag carriage 2000 and any bag 26 thereon to various stations included in the system 10. The carriage transport assembly 2004 may include a sensor assembly 2290 (e.g. laser range finder) which may monitor the location of the bag carriage 2000 along the carriage transport assembly 2004. Displacement of the bag carriage 2000 may be controlled via commands issued from the control system 15 based at least in part on data received from the sensor assembly 2290. The bag carriage 2000 may include at least one grasper 2002 which may grasp bags 26 and hold bags 26 in place on the bag carriage 2000. The bag carriage 2000 may also include at least a portion which may be displaceable to raise and lower a bag 26 held by the one or more grasper 2002.

The bag carriage 2000 may be displaced to a bag feeder 1622 of the system 10. The bag feeder 1622 may be any bag feeder 1622 described herein. A bag 26 may be collected from the bag feeder 1622 by grasping the bag 26 with the grasper 2002 of the bag carriage 2000. Once a bag 26 is in place on the bag carriage 2000, the bag carriage 2000 may be displaced to a welding station 2006 of the system 10. At the welding station 2006, a port 1654 of the bag 26 may be joined to an end of a fill conduit 2018 via a weld in an aseptic fashion. The fill conduit 2018 may be dispensed (e.g. spooled out) of a fill conduit dispenser 1050 (see e.g. FIGS. 237-238). The system 10 may include an exhaust system 2008. Any fumes generated during welding may be collected via a ventilation system 2010 connected to the exhaust system 2008. The exhaust system 2008 may include one or more filter element which may clean the fume laden air collected by the ventilation system 2010.

After welding, the port 1654 of the bag 26 may be connected to the fill conduit 2018 via the weld. The fill conduit dispenser 1050 may be coupled to a dispenser transport assembly 2014 to allow the fill conduit dispenser 1050 to be displaced in tandem with the bag carriage 2000. The dispenser transport assembly 2014 may include a sensor assembly (e.g. laser range finder) which may monitor the location of the conduit dispenser 1050 along the dispenser transport assembly 2014. Displacement of the conduit dispenser 1050 may be controlled via commands issued from the control system 15 based at least in part on data received from the sensor assembly 2292.

In certain examples, there may be a possibility that the weld formed at the welding station 2006 may obstruct or partially close off (further discussed elsewhere in the specification) a portion of the flow path in the fill conduit and/or port 1654 in the area of the weld. The bag carriage 2000 along with a tubing dispenser 1050 may be displaced to weld opening station 2016. At the weld opening station 2016, the joint between the fill conduit 2018 and port 1654 may be acted upon (e.g. compressed, squished) to exert stress on the bond closing off the lumen or portion of the lumen. This stress may disrupt the bond within the lumen without disrupting the integrity of the junction between the filling conduit 2018 and port 1654.

The bag carriage 2000 and fill conduit dispenser 1050 may then be displaced to a separating station 2020 of the system 10. Fluid may be delivered into the bag 26 though the fill conduit 2018 from a fluid circuit 710 of the system 10. In other embodiments, filling of the bag 26 may be performed at the weld opening station 2016 or intermediate the weld opening station 2016 and the separating station 2020. At the separating station 2020, the port 1654 of the bag 26 may be separated from the fill conduit 2018. As the port 1654 and fill conduit 2018 are separated, the port 1654 and fill conduit 2018 may be sealed. The span of tubing including the joint between the fill conduit 2018 and port 1654 formed at the welding station 2006 may be removed at the separating station 2020.

After the port 1654 and fill conduit 2018 are separated at the separating station 2020, the fill conduit dispenser 1050 may be displaced back to the welding station 2006. The bag carriage 2000 may be displaced to a labelling station 2022. A label may be applied to the bag 26 on the bag carriage 2000 at the labeling station 2022. Any suitable labeler (such as any of those mentioned herein) may be used. The bag carriage 2000 may then be displaced to an output chute 2024 (not shown in FIGS. 253-254) and the bag 26 may be released from the grasper 2002. This may allow the bag 26 to pass into the output chute 2024 and out of the system 10. Though the bag 26 is labelled at the end of the packaging process, the bag 26 may be labelled at any convenient point within the system 10. In the event that the bag 26 needs to be rejected after labeling, the bag 26 may be returned to the labeling station 2022 and the label may be adjusted (e.g. blacked out, crossed out, etc.) to indicate the bag 26 is not to be used.

Referring now to FIG. 255, an exemplary bag carriage 2000 which may be included in the system 10 of FIG. 252 is depicted. As shown, the bag carriage 2000 may include a base 2030. The base 2030 may include a number of slide bearings 2032. The slide bearings 2032 may engage with guides 2034 (see, e.g., FIG. 254) of the carriage transport assembly 2004 of the system 10. This may allow the bag carriage 2000 and any bag 26 thereon to be displaced along a first displacement axis defined by the carriage transport assembly 2004.

A stand member 2036 may be coupled to the side of the base 2030 opposite the slide bearings 2032. The bag carriage 2000 may also include a platform 2038. The platform 2038 may be displaceable with respect to base 2030 and in some embodiments may be slidingly coupled to the stand member 2036. One of the platform 2038 and stand member 2036 may, for example, include a rail while the other may include a track with which the rail is engaged. Guide and slide bearing arrangements may be used in certain alternative examples to slidingly couple the stand member 2036 and platform 2038. An actuator 2040 (e.g. electromechanical, pneumatic, hydraulic) may be mounted on the base 2030 and may include an output shaft 2042 which may be coupled to the platform 2038. The control system 15 may command powering of the actuator 2040 to raise and lower the platform 2038 with respect to the base 2030. The sliding coupling between the stand member 2036 and the platform 2038 may constrain displacement of the platform 2038 to a prescribed second displacement axis. The second displacement axis may be substantially perpendicular to the first displacement axis. A sensor assembly 2039 may be coupled to the platform 2038 and may monitor displacement of the platform 2038 with respect to the base 2030 along the second displacement axis. Any suitable sensor type may be used. The sensor assembly 2039 may, for example, be a laser range finder, ultrasonic sensor, etc.

As shown, the platform 2038 may include a conveyer assembly 2046. The conveyer assembly 2046 may be disposed at the top of the platform 2038 and may serve as a rest for a bag 26 as the bag 26 is displaced throughout a system 10. The conveyer assembly 2046 may be driven to displace a bag 26 in a direction generally perpendicular to the first and second displacement axes. In the example shown, the conveyer assembly 2046 is oriented so as to displace a bag 26 along an axis in a plane perpendicular to the first and second axis but not perpendicular to the first and second axis. Thus, a bag 26 on a bag carriage 2000 may be displaced along three axes. In some embodiments, the conveyer assembly 2046 may be driven to feed a bag 26 off of the bag carriage 2000 and into an output chute 2024 (see, e.g., FIG. 252) of the system 10.

A set of port graspers 2044A, B may also be coupled to the platform 2038. In the example shown, each of the port graspers 2044A, B includes an immobile jaw 2048 and a displaceable jaw 2050. The port graspers 2044A, B, may be actuated such that the displaceable jaws 2050 are displaced (e.g. pivoted) between an open position and a grasping position (shown). The displaceable jaws 2050 may include one or more retention recess 2052 within which ports 1654 of a bag 26 may be disposed when the port graspers 2044A, B are in the grasping position. The first and second port graspers 2044A, B may be spaced apart from one another so as to form a gap between the first and second port graspers 2044A, B. Spacing of the first and second port graspers 2044A, B may be selected such that jaws 2132A, B of a welding assembly 2130 (see, e.g., FIG. 266) may be disposed between the two port graspers 2044A, B.

As shown, the conveyer assembly 2048 is oriented so as to slope downward from the port graspers 2044A, B. This may facilitate displacement of a filled bag 26 into an output chute 2024 disposed on a side of the bag carriage 2000 opposite the port graspers 2044A, B. Additionally, due to gravity, this may cause fluid filled into the bag 26 to tend to flow to the side of the bag 26 opposite the ports 1654 which may help to simplify filling.

An example bag feeder 1622 which may be included in the system 10 of FIG. 252 is shown in FIG. 256. The example bag feeder 1622 includes a hopper assembly 2060. The hopper assembly 2060 may include a number of walls which may define a channel 2064. Clips 1700 on which bags 26 are retained may be fed into the hopper assembly 2060 and into the channel 2064. In the example embodiment, the hopper assembly 2060 is oriented such that clips 1700 and the bags 26 retained thereon may be gravity fed through the channel 2064 of the hopper assembly 2060. When the hopper assembly 2060 is filled with clips 1700 (only one shown in FIG. 256), bags 26 may stack one above the other with each bag 26 (or at least the ports 1654 of each bag 26) in a substantially horizontal orientation. This may be particularly desirable where bags 26 are moved throughout a system 10 in a horizontal orientation as the bags 26 may be presented from the bag feeder 1622 already in this orientation. That said, gravity feed bag feeders 1622 such as that shown in FIG. 256 may be included in other system 10 embodiments described herein such as those shown in FIG. 56, FIG. 111, and FIG. 178. Additionally, in some embodiments, multiple bag feeders 1622 may be included in a system 10 (e.g. such as that shown in FIG. 252). Each bag feeder 1622 may be arranged to hold clips 1700 for different bag 26 varieties (e.g. bags 26 with different fill capacities, different numbers or arrangements of ports 1654, etc.).

The bag feeder 1622 may also include a sensing assembly 2070. The sensing assembly 2070 may monitor the number of clips 1700 stored in the hopper assembly 2060 and may also be referred to herein as a hopper fill level sensor assembly 2070. In some embodiments, the sensing assembly 2070 may include an ultrasonic sensor though any suitable sensor type may be used in alternative embodiments. In some embodiments, the sensor assembly 2070 may be a laser rangefinder. Alternatively, the sensor assembly 2070 may include a load cell which may monitor weight of the contents of the hopper assembly 2060 to determine a number of bags 26 contained in the hopper assembly 2060. A plunger or the like could be included in hopper assembly 2060 and may press against the last clip 1700 in the hopper assembly 2060. As the hopper assembly 2060 is depleted, the location of the plunger may change. This location may be monitored by a sensor assembly 2070 including a linear potentiometer, encoder, or linear variable differential transformer, etc. The control system 15 of the system 10 may receive data from the sensing assembly 2070 and may monitor the data to determine when the hopper assembly 2060 has been emptied or is approaching an empty state. The control system 15 may generate a user perceptible notification to the user (e.g. image or animation on a user interface) when the sensor assembly 2070 data indicates that the hopper assembly 2060 needs to be reloaded.

The bag feeder 1622 may include a support assembly 2062 upon which the bag 26 retained on a foremost clip 1700 in the hopper assembly 2060 may rest. The support assembly 2062 may include an arm 2066 which may be stationary and fixedly mounted to an immobile portion of the system 10. A number of rollers 2068 may be coupled to the arm 2066. Alternatively, a solid plate may be used instead of rollers. In such embodiments, the side of the plate opposite the arm 2066 may include a rail or wall which extends along at least a portion of the plate. The rail or wall may help align the bags on the support assembly 2062.

The bag feeder 1622 may also include a clip ejector assembly 2072. The clip ejector assembly 2072 may be actuated to remove the foremost clip 1700 in the hopper assembly 2060 once the bag 26 retained on the clip 1700 has been collected by the port graspers 2044A, B of the bag carriage 2000. The clip ejector assembly 2072 may also aid in locating a next clip 1700 within the hopper assembly 2060 into a prescribed position at the output end of the hopper assembly 2060. The clip ejector 2072 will be further described later in the specification.

Referring now to FIG. 257-258, two perspective views of an exemplary clip 1700 are depicted. As shown, the clip 1700 may include a main body 2074 which may extend from a first end 2076 of the clip 1700 to an opposing second end 2078 of the clip 1700. A first face 2080 of the clip 1700 may include a number of retention cradles 2082. The first face 2080 of the clip 1700 may be an underside of the clip 1700 when the clip 1700 is placed into a hopper assembly 2060 (see, e.g., FIG. 256). Ports 1654 of a bag 26 may be retained in the retention cradles 2082 to couple a bag 26 to the clip 1700. In the example embodiment, retention cradles 2082 are arranged such that ports 1654 may engage with the cradles 2082 via a snap fit. Each port 1654 may engage with at least one retention cradle 2082 defined on the clip 1700. Certain ports 1654 (e.g. longer ports 1654) may be engaged with multiple retention cradles 2082 at various points along their length. In the example embodiment, the clip 1700 is arranged to engage a three port 1654 bag 26. Other clips 1700 may include a different number or arrangement of retention cradles 2082 than that shown. The first face 2080 of the clip 1700 may also include at least one support cradle 2084. The support cradle(s) 2084 may form a rest where an expanse of port 1654 tubing may lay and may aid in keeping longer ports 1654 from bowing or bending. The support cradle 2084 is disposed between two guide clips 2087. A portion of a port 1654 may be snap fit into the guide clips 2087 and may further aid in ensuring that a longer port 1654 is held straight on the clip 1700. The first face 2080 of the clip 1700 may also include a recess 2092 along a portion of the second end 2078 of the main body 2074 where a notch 2094 is cut into the second end 2078.

A second face 2086 of the main body 2074 may include a set of spacers 2088. The second face 2086 may be disposed opposite the first face 2080 of the main body 2074 and may be a top face of the clip 1700 when the clip 1700 is installed in the hopper assembly 2060. The spacers 2088 may act as standoffs upon which other clips 1700 may sit when installed in hopper assembly 2060. The spacers 2088 may be ridges or ribs which may extend from the first end 2076 of the main body 2074 to the second end 2078 of the main body 2074. Each spacer 2088 may be disposed intermediate two retention cradles 2082 on the opposing side of the clip 1700. This may ensure that ports 1654 of a bag 26 retained on an above clip 1700 within a hopper assembly 2060 do not sit on the spacers 2088. This may help to increase the number of clips 1700 which may be installed into a hopper assembly 2060 (see, e.g., FIG. 256).

The main body 2074 of the example clip 1700 may be at least partially flanked by a set of wing bodies 2090. The wing bodies 2090 may be connected to the main body 2074 and may extend parallel to the main body 2074 along a plane between the second face 2086 and the portion of the spacers 2088 most proud of the second face 2086. Each of the wing bodies 2090 may extend from the second end 2078 of the main body 2074 to a point on the main body 2074 short of the first end 2076. Each wing body 2090 may include a fenestration 2096.

Referring now to FIG. 259, an example embodiment of an ejector sled 2098 is depicted. The ejector sled 2098 may be included in a clip ejector assembly 2072 of a bag feeder 1622. As shown, the ejector sled 2098 may include a set of ejector fingers 2100A, B. The ejector fingers 2100A, B may extend substantially parallel to one another within the same plane. The ejector fingers 2100A, B may each include a ramped end section 2102. The ramped end sections 2102 may be sloped such that the ejector fingers 2100A, B increase in thickness as distance from the end of the ejector finger 2100A, B increases. A catch ledge 2104 which generates a stepwise change in thickness of each ejector finger 2100A, B may be included at the thick end of each ramped end section 2102.

The ejector fingers 2100A, B may be separated and spaced from one another by a cross piece 2106. The ejector fingers 2100A, B may each be coupled to the cross piece 2106 via a pivot pin 2116. Thus, the ejector fingers 2100A, B may pivot with respect to the cross piece 2106 about the pivot pins 2116. A ram body 2108 may be disposed on the cross piece 2106 and may extend toward the ramped end sections 2102 of the ejector fingers 2100A, B. The ram body 2108 may include a wedge shaped portion which may cooperate with the notch 2096 in the second end 2078 of the main body 2074 of the clip 1700 (see, e.g., FIG. 258). The ejector fingers 2100A, B may also be separated and spaced from one another by a second cross piece 2110. A mounting arm 2112 may be attached to the cross piece 2106 on which the ram body 2108 is included. The mounting arm 2112 may be coupled to the other of the cross pieces 2110 via a bias member 2114. The bias member 2114 may for example be a coil spring such as an extension spring. The bias member 2114 may bias the ejector fingers 2100A, B to a home position. When the ejector fingers 2100A, B pivot about the pivot pins 2116 away from the home position, the bias member 2114 may become stressed. As the bias member 2114 restores to a less stressed state, the ejector fingers 2100A, B may automatically be caused to pivot back to the home position about the pivot pins 2116. Referring now also to FIGS. 260-261, the mounting arm 2112 may be coupled to an actuator 2120 (e.g. pneumatic, hydraulic, electromechanical) of the clip ejector assembly 2072. The actuator 2120 may be powered by a control system 15 of the system 10 to displace the mounting arm 2112 and the ejector sled 2098 attached thereto along a displacement axis. As shown, the mounting arm 2112 and ejector sled 2098 may be displaced between an advanced position (FIG. 260) and a retracted position (FIG. 261) with respect to the hopper assembly 2060. When in the advanced position, the ejector fingers 2100A, B may project into the channel 2064 of the hopper assembly 2060. The ramped end sections 2102 of the ejector fingers 2100A, B may be disposed in the fenestrations 2096 of the wing bodies 2090 of the foremost clip 1700. The ram body 2108 may be disposed within the notch 2094 in the second end 2078 of the clip 1700. As the notch 2094 and ram body 2108 include cooperating wedge shapes, this may help to center the clip 1700 within the hopper assembly 2060. The ends of the wing bodies 2090 most proximal the first end 2076 of the clip 1700 may abut the walls of the channel 2064. This may further help to ensure that the clip 1700 is in a prescribed location within the hopper assembly 2060.

Referring now again to FIG. 255 as well as FIGS. 260-261, since the clip 1700 may be in a prescribed location within the hopper assembly 2060 this may allow the port graspers 2044A, B of the bag carriage 2000 to be displaced to a preset location to collect the bag 26 retained on the clip 1700. In certain examples, the port graspers 2044A, B may be opened and the immovable jaws 2048 may be placed between ports 1654 of the bag 26 and the main body 2074 of the clip 1700. The port graspers 2044A, B may be actuated to a closed position. The platform 2038 of the bag carriage 2000 may then be actuated toward the base 2030 of the bag carriage 2000 to strip the ports 1654 out of the retention cradles 2082 and any guide clips 2087 on the clip 1700.

Referring now primarily to FIGS. 261 and 259, to remove the empty clip 1700, the mounting arm 2112 and the ejector sled 2098 may be displaced via the actuator 2120 to the retracted position. As the ejector sled 2098 is driven away from the hopper assembly 2060, the catch ledge 2104 on each ejector finger 2100A, B may abut and catch against an edge of an associated one of the fenestration 2096 in the wing bodies 2090 of the clip 1700. Further retraction of the ejector sled 2098 may cause the clip 1700 to be dragged along with the ejector sled 2098 and out of the hopper assembly 2060. The clip 1700 may then fall from the ejector sled 2098 into a receptacle 2122 (see, e.g., FIG. 253), waste chute, or other waste retention or collection arrangement.

Upon actuation of the ejector sled 2098 back to the advanced position, the ramped end sections 2102 of the ejector fingers 2100A, B may contact the second end 2078 of the next clip 1700. The ramped end sections 2102 may be sloped so as to ride over the second end 2078 and cause pivoting of the ejector fingers 2100A, B about the pivot pins 2116. This may also stress the bias member 2114. The bias member 2114 may restore to a less stressed state and cause the ejector fingers 2100A, B to return to the home position when the ramped end sections 2102 reach the fenestrations 2096 of the wing bodies 2090.

In alternative embodiments, the ejector fingers 2100A, B may be rigidly attached to at least one of the cross pieces 2106. The ejector fingers 2100A, B may not pivot, but may instead resiliently deflect. As the ejector sled 2098 is displaced toward the advanced position, the ejector fingers 2100A, B may bend to allow the ramped end sections 2102 to ride over the second end 2078 of the clip 1700. The ejector fingers 2100A, B may restore to an undeflected state when the ramped end sections 2102 reach the fenestrations 2096.

Referring now to FIG. 262, a perspective view of an example fill conduit dispenser 1050 is depicted. The fill conduit dispenser 1050 may include a guide portion 1052 and a reel portion 1054. The guide portion 1052 and a reel portion 1054 may be as described in relation to FIGS. 237-238. An organizer 1058 (see FIG. 238) may be disposed within the reel portion 1054. A portion of the fill conduit 1060 which extends to the mixing circuit 348 (see, e.g., FIG. 215) may enter into the reel portion 1054 via the inlet orifice 1066. As mentioned above, the fill conduit 2018 within the conduit dispenser 1050 may come pre-primed and sterile. The fill conduit 2018 may be provided in a sealed state such that the interior of the fill conduit 1060 and the fluid contained therein is out of communication with the surrounding environment. In alternative embodiments, the fill conduit 2018 may be evacuated to collapse the conduit 2018 and sealed in a sterile state. In still other embodiments, the fill conduit 2018 may be welded to a disinfect reservoir (5-20 L bag) or drain line and hot water may be delivered through the fill conduit 2018 to disinfect the fill conduit 2018 after a new conduit dispenser 1050 is installed in the system 10.

The conduit dispenser 1050 may include a mounting body such as a rail 2240 for mounting of the reel portion 1054 to a dispenser carriage 2242. The carriage 2242 may include a track 2244 within which the rail 2240 may be installed. In some embodiments, the track 2244 may include one or more spring loaded detent pin. The rail 2240 may include a recess which the detent pin may snap into when the conduit dispenser 1050 is loaded into the track 2244. This may aid in retaining the conduit dispenser 1050 in place on the carriage 2242 and help resist jostling of the conduit dispenser 1050 as the carriage 2242 is displaced about the system 10 via the dispenser transport assembly 2014.

The dispenser carriage 2242 may be a part of the dispenser transport assembly 2014 (a portion of which is shown in FIG. 262). The carriage 2242 may be displaced along a rail 2243 of the dispenser transport assembly 2014 such that the conduit dispenser 1050 may be moved from the welding station 2006 to the weld opening station 2016 and separating station 2020. The carriage 2242 may also include a conduit support projection 2248. The conduit support projection 2248 may include a flange 2250 with a retention notch 2252 at a terminal end thereof. When a new conduit dispenser 1050 is loaded into the system 10, the end of the fill conduit 2018 may be closed by a sealing element such as a cap 2254.

Referring now also to FIG. 263, a cross section through a cap 2254 disposed on a terminal end of a fill conduit 2018 is shown. The cap 2254 may include a first portion 2256 and a second portion 2258. The first and second portion 2256, 2258 may be frictionally held together and may be separable from one another. As shown, the first portion 2256 may include a compliant member 2266 (e.g. o-ring) which may compress against an interior face 2268 of the second portion 2258. Compression of the compliant member 2266 against the second portion 2258 may help to hold the first portion 2256 and second portion 2258 of the cap 2254 together.

The first portion 2256 may be a plug body which may extend into and seal the lumen of the terminal end of the fill conduit 2018 from the surrounding environment. The second portion 2258 may be a guide loop which may surround the fill conduit 2018. As shown, the exterior face 2260 of the second portion 2258 may include recess 2262 which may be seated into the retention notch 2252 of the flange 2250 on the conduit support projection 2248. Thus, the fill conduit 2018 may be routed out of the conduit dispenser 1050, along the conduit support projection 2248 and docked into the flange 2250.

A grasper may grasp the first portion 2256 of the cap 2254 and pull on the fill conduit 2018 to separate the first and second portion 2256, 2258 of the cap 2254. The first portion 2256 may remain in sealing engagement with the terminal end of the fill conduit 2018 and the fill conduit 2018 may be pulled along with the first portion 2256 of the cap 2254 through the second portion 2258 of the cap 2254. The second portion 2258 may remain retained in the retention notch 2252 of the flange 2250 and may act as an eyelet through which the fill conduit 2018 may be advanced and guided as fill conduit 2018 is consumed by the system 10. Second portion 2258 may include a dispensing end 2269 and a feed end 2267. The feed end 2267 may be disposed upstream of the dispensing end 2269. The feed end 2267 (that most proximal to the conduit dispenser 1050) of the second portion 2258 may taper or flare outward as distance from the dispensing end 2269 increases. In the example embodiment, the feed end 2267 may increase in diameter as distance from the dispensing end 2269 increases. This may aid in prevent snagging of the fill conduit 2018 as fill conduit 2018 is advanced through the second portion 2258.

As the second portion 2258 may be held in a fixed position on the conduit support projection 2248, the second portion 2258 may help to ensure that a portion of the fill conduit 2018 near the terminal end of the fill conduit 2018 is in a known location. This may allow various graspers of the system 10 to be displaced to a coordinate corresponding to the known location to facilitate grasping of the fill conduit 2018.

Referring now to FIG. 264, a block diagram of an example welding station 2006 is depicted. Once a bag 26 has been collected from the bag feeder 1622 (see, e.g., FIG. 256) by the bag carriage 2000, the bag carriage 2000 may be displaced along the carriage transport assembly 2004 to the welding station 2006. As shown, the welding station 2006 may include a welding assembly 2130. The welding assembly 2130 may include a set of opposed jaws 2132A, B and a cutting assembly 2137. The welding assembly 2130 may be actuated via commands issued by the control system 15 to capture a portion of a fill conduit 2018 and port 1654, cut the fill conduit 2018 and port 1654, and join the fill conduit 2018 to the port 1654.

As shown, at least one of the opposing jaws 2132A, B may be paired with at least one sensor 2133 which may monitor for the presence of a tube (e.g. port 1654 or fill conduit 2018) within the jaws 2132A, B. In some embodiments, each jaw 2132A, B may include a sensor 2133 which may monitor for the port 1654 and a sensor 2133 which may monitor for the fill conduit 2018. The sensors 2133 may be optical sensors such as reflectivity based sensors which may monitor the jaws 2132A, B via windows 2131 extending though each of the jaws 2132A, B.

The welding station 2006 may also include a port manipulator 2138 and a fill conduit manipulator 2140. The port manipulator 2138 and fill conduit manipulator 2140 may respectively aid in locating the port 1654 and fill conduit 2018 into position within the welding assembly 2130. The port manipulator 2138 and fill conduit manipulator 2140 may grasp the terminal ends of the fill conduit 2018 and port 1654 as the port 1654 and fill conduit 2018 are cut. Thus, the scrap generated during cutting may be retained in the port manipulator 2138 and fill conduit manipulator 2140 after cutting. End effectors 2141, 2142 of the port manipulator 2138 and fill conduit manipulator 2140 may be displaced to a scrap receptacle, waste chute, or the like to discard the cut terminal ends of the tubing. A cleaning assembly 2143 may also be included in the welding station 2006 and may be used to clean the cutting assembly 2137 periodically.

Still referring to FIG. 264, each of the jaws 2132A, B may include a set of troughs 2134A, B. The troughs 2134A, B may extend across opposing faces 2146 A, B of the jaw 2132A, B. The troughs 2134A, B may include a port retention trough 2134A and a fill conduit retention trough 2134B in certain embodiments. At least one of the jaws 2132A, B may be displaceable with respect to the other of the jaws 2132A, B. In the example embodiment, the first jaw 2132A may be displaceable, via operation of at least one jaw drive actuator 2144A, B (e.g. pneumatic, hydraulic, electromechanical), along a displacement axis. The displacement axis may be oriented perpendicular to the faces 2146A, B of the jaws 2132A including the troughs 2134A, B. The first jaw 2132A may be displaced toward the second jaw 2132B along the displacement axis until opposing faces 2146A, B of the jaws 2132A, B come into contact. When the first jaw 2132A is in contact with the second jaw 2132B, the jaws 2132A, B may be considered to be in a closed state. When the first and second jaws 2132A, B are spaced from one another, the jaws 2132A, B may be considered to be in an open state.

Referring now also to FIG. 265, a perspective view of an exemplary embodiment of the welding assembly 2130 of FIG. 264 is depicted. The jaws 2132A, B of the welding assembly 2130 are shown in the open position in FIG. 265. As shown, each of the jaws 2132A, B may be divided into a first jaw unit 2148 and a second jaw unit 2150. The first and second jaw unit 2148, 2150 may be separated from one another by a gap. As described later, this gap may be closeable by displacement of at least one of the first and second jaw units 2148, 2150 of each jaw 2132A, B against or at least toward the other. The gap may be sized to accept a cutting element 2136 of the cutting assembly 2137.

The cutting element 2136 may be displaced toward the jaws 2132A, B and into the gap via a cutting actuator 2154 (e.g. pneumatic, hydraulic, electromechanical) of the cutting assembly 2137. As shown, the cutting assembly 2137 may also include a heater element 2139 which may be powered by the control system 15 to heat the cutting element 2136. At least one temperature sensor 2135 in data communication with the control system 15 may be included in the cutter assembly 2137. Powering of the heater element 2139 may be governed by the control system 15 and may be based at least partially on data received from the at least one temperature sensor 2135. The cutting element 2136 may be a coated metal body. The coating may be a ceramic coating or a NEDOX coating such as any of those described elsewhere herein.

At least one of the first and second jaw units 2148, 2150 of each jaw 2132A, B may be displaceable with respect to the other jaw unit 2148, 2150 of that jaw 2132A, B. In the example embodiment, the second jaw unit 2150 of each jaw 2132A, B may displace along a first and second axis which are substantially parallel to the faces 2146A, B of the jaws 2132A, B including the troughs 2134A, B. The first and second axes may be oriented substantially perpendicular to one another. Each of the second jaw units 2150 may be coupled to one another via a linking assembly 2156. The linking assembly 2156 may be driven by a first axis actuator 2158 (e.g. pneumatic, hydraulic, electromechanical) and a second axis actuator 2160 (e.g. pneumatic, hydraulic, electromechanical). Since the actuators 2158, 2160 for the second jaw units 2150 act upon the linking assembly 2156, each of the second jaw units 2150 may be displaced along their displacement axes in tandem with one another. The jaw drive actuator 2144A for the second jaw unit 2150 of the first jaw 2132A may also be displaced as the first axis actuator 2158 and second axis actuator 2160 are powered.

The second jaw units 2150 may have a displacement range along the first displacement axis from a first position to a second position. In some embodiment, stop members 2152 may be included in the welding assembly 2130 to prevent movement of the second jaw units 2150 beyond the displacement range defined for the first displacement axis. In the first position (shown in FIG. 265), the portion of the port retention trough 2134A in each jaw unit 2148, 2150 and the portion of the fill conduit retention trough 2134B in each jaw unit 2148, 2150 may respectively be aligned (e.g. coaxial). In the second position, the portion of the fill conduit retention trough 2134B in the second jaw units 2150 may be aligned with the portion of the port retention troughs 2134A in the first jaw units 2148.

The second jaw units 2150 may have a displacement range along the second displacement axis from a spread position to a compacted position. In the spread position, the gap between the first and second jaw units 2148, 2150 may be present and may be at its widest. In the compacted positon, the gap between the first and second jaws 2132A, B may be reduced or absent. In some embodiments, in the compacted position, the first and second jaw units 2148, 2150 may be in abutment with one another. In other embodiments, the second jaw units 2150 may be driven toward the first jaw units 2148 by a distance equal to or slightly greater than the thickness of the cutting element 2136.

Referring now to FIGS. 266-267, a portion of the exemplary embodiment of the welding assembly 2130 shown in FIG. 265 is depicted with the jaws 2132A, B in the closed state. As shown, each jaw unit 2148, 2150 of the first jaw 2132A may be coupled to an output body 2168 of an associated jaw drive actuator 2144A, B. In the example embodiment, each jaw unit 2148, 2150 of the first jaw 2132A may be coupled to a respective output body 2168 via a set of fasteners 2170. The fasteners 2170 may extend through the output bodies 2168 to couple into the jaw units 2148, 2150, but may not threadedly engage with the output bodies 2168. The output bodies 2168 may be displaceable with respect to the first and second jaw units 2148, 2150 of the first jaw 2132A. The output bodies 2168 may be displaceable from a position distal to the first and second jaw units 2148, 2150 (see FIG. 266) of the first jaw 2132A to a position proximal to the first and second jaw units 2148, 2150 of the first jaw 2132A. The output bodies 2168 may displace along the length of the fasteners 2170 as the output bodies 2168 move relative to the jaw units 2148, 2150 of the first jaw 2132A. At least one bias member 2172 may be disposed between each of the first and second jaw units 2148, 2150 and the respective output bodies 2168. In the example embodiment, a compression spring is included surrounding each of the fasteners 2170. The bias members 2172 may exert a bias force on the associated jaw unit 2148, 2150 which urges the jaw units 2148, 2150 to the distal position with respect to the output bodies 2168.

As the actuators 2144A, B displace the first jaw 2132A against the second jaw 2132B, the first jaw 2132A may contact the second jaw 2132B. The first and second jaw unit 2148, 2150 may be held in the distal position by the bias members 2172 as this occurs. As shown, one or both of the jaws 2132A, B may include at least one locating projection 2190. In the example embodiment, locating projections 2190 which flank each of the troughs 3124A, B are visible on the second jaw 2132B. The at least one locating projection 2190 may be wedge shaped. The jaws 2132A, B may include also include cooperating receiving recesses 2192 for each of the locating projections 2190 in the other of the jaws 2132A, B. As the jaws 2132A, B reach the closed position, the at least one locating projection 2190 may enter the associated receiving recess(es) 2192 in the opposed jaw 2132A, B. As the locating projection(s) 2190 advance into the receiving recess(es) 2192, the interaction of the locating projection(s) 2190 and receiving recess(es) 2192 may help to eliminate any misalignment of the jaws 2132A, B. This may be attributable to the wedge shape of the locating projection(s) 2190.

As the actuators 2144A, B continue to actuate the output bodies 2168, further movement of the first jaw 2132A may be obstructed by the presence of the second jaw 2132B. Thus, continued movement of the output bodies 2168 may advance the output bodies 2168 toward the first and second jaw units 2148, 2150 of the first jaw 2132A and the bias members 2172 may become compressed (see FIG. 267). The output bodies 2168 may be in the proximal position with respect to the associated first and second jaw units 2148, 2150 of the first jaw 2132A when the jaw drive actuators 2144A, B have finished actuation of the output bodies 2168 to the end of their displacement range.

Referring now to FIG. 268, a cross section of FIG. 267 taken along the axes of the port retention troughs 2134A of the first jaw units 2148 is shown. As shown, a port 1654 is in place within the port retention troughs 2134A. The port 1654 may be held by the port graspers 2044A, B of the bag carriage 2000. A fill conduit 2018 would also be in position within the fill conduit retention troughs 2134B of the jaws 2132A, B. The terminal end of the fill conduit 2018 may be held by an end effector 2142 (e.g. grasper) of the fill conduit manipulator 2140.

Each of the output bodies 2168 may include at least one occluder projection 2180. In certain examples, each output body 2168 may include an occluder projection 2180 for each trough 2134A, B. As the output bodies 2168 are displaced proximal to the jaw units 2148, 2150 of the first jaw 2132A, the occluder projections 2180 may project into the retention troughs 2134A, B via cutouts 2184 in the jaw units 2148, 2150 of the first jaw 2132A. As this occurs, any tubing (e.g. fill conduit 2018 or, in the example cross-section, the port 1654) may be collapsed or flattened such that the lumen through the tubing is closed. This may ensure, for example, that any liquid in the lumen is displaced out of a region of the tubing in order to help to facilitate welding.

Referring now to FIG. 269, another cross section taken along the port retention troughs 2134A of the first jaw units 2148 is shown. To weld the bag 26 to the fill conduit 2018, the cutting element 2136 of the cutting assembly 2137 may be heated by the heater 2139 to a target cutting temperature and displaced into the gap between the first and second jaw units 2148, 2150. As this occurs, the cutting element 2136 may cut through the port 1654 and fill conduit 2018 by melting the port 1654 and fill conduit 2018 in the region collapsed by the occluder projections 2080. There may be a gap between the occluder projections 2080 associated with each of the output bodies 2168 which is sized to accept the cutting element 2136. Cutting of the port 1654 and fill conduit 2018 may sever the terminal ends of the port 1654 and fill conduit 2018 from the remaining portions of port 1654 and fill conduit 2018. Since the port 1654 and fill conduit 2018 are flattened, substantially no liquid (e.g. water or saline) may be present in the lumens of these tubes. This may ensure that the liquid does not behave as a heat sink or boil due to the heat of the heated cutting element 2136. Thus, flattening of the port 1654 and fill conduit 2018 may simplify cutting and welding of the port 1654 and fill conduit 2018.

As the cutting element 2136 cuts through the port 1654 and fill conduit 2018, the material of the port 1654 and fill conduit 2018 may melt against the faces of the cutting element 2136 such that a seal is formed and maintained against the face of the cutting element 2136 during the cutting action. This may prevent the interior lumens of the port 1654 and fill conduit 2018 from being exposed to the surrounding environment as they are cut.

Referring now to FIG. 270, another cross section taken along the port retention troughs 2134A of the first jaw units 2148 is depicted. With the cutting element 2136 disposed within the gap, the second jaw units 2150 of the jaws 2132A, B may be displaced relative the first jaw units 2148 along the first displacement axis of the second jaw units 2150. The second jaw units 2150 may be displaced until the fill conduit retention troughs 2134B of the second jaw units 2150 are aligned or coaxial with the port retention troughs 2134A of the first jaw units 2148. In some embodiments, the second jaw units 2150 may be displaced until the second jaw units 2150 abut against a stop 2152 (see. e.g., FIG. 265). This may align the remaining portions of the port 1654 and the fill conduit 2018 with one another in the jaws 2132A, B.

Referring now to FIG. 271, the second jaw units 2150 may be displaced along the second displacement axis (toward the first jaw units 2148) as the cutting element 2136 is retracted. As a result, the previously aligned remaining portions of the port 1654 and the fill conduit 2019 may be driven toward one another. The remaining portions of the port 1654 and fill conduit 2018 may melt into each other and begin to form a bond as the cutting element 2136 is displaced out of the way. Thus, as the cutting element 2136 is removed, the remaining portions of the port 1654 and fill conduit 2018 may be pressed against one another such that a junction is formed while keeping their interiors isolated from the surrounding environment. In certain examples, the cutting element 2136 may never be contacted by the jaw units 2148, 2150 as the second jaw units 2150 are displaced toward the first jaw units 2148. This may ensure that the jaws 2132A, B do not get excessively hot (e.g. hot enough to melt tubing seated in the troughs 2134A, B) during the welding operation. This may also help to preserve any coating on the surface of the cutting element 2136 from getting scratched against the jaws 2132A, B.

Once the joint between the port 1654 and fill conduit 2018 is formed, the jaws 2132A, B may then be actuated open by the jaw drive actuators 2144A, B. The joined port 1654 and fill conduit 2018 may be removed from the jaws 2132A, B by the port graspers 2044A, B of the bag carriage 2000. The bag carriage 2000 may then be displaced along the carriage transport assembly 2004 to the weld opening station 2016. An end effector 2141 of the port manipulator 2138 (see, e.g., FIG. 264) may grasp the severed terminal end of the port 1654 after the port 1654 has been cut, but before the jaws 2132A, B have been opened. As mentioned above, the end effector 2142 of the fill conduit manipulator 2140 may also be grasping the severed terminal end of the fill conduit 2018. The port manipulator 2138 and fill conduit manipulator 2140 may displace the scrap ends of the port 1654 and fill conduit 2018 respectively to a discard location (scrap receptacle, waste chute, etc.) within the system 10.

Referring now to FIG. 272, an example embodiment of a cleaning assembly 2143 is depicted. The cutting element 2136 may be displaced to the cleaning assembly 2143 such that any residual tubing material may be removed off of the surface of the cutting element 2136. This may be done, for example, each time a preset number of welds have been performed at the welding assembly 2130.

As shown, the cleaning assembly 2143 may include at least one set of cleaning elements 2270. The cleaning elements 2270 may include at least one pair of brushes. Other embodiments may include a series of brush pairs. For illustrative purposes, the brushes as depicted as cylindrical bodies in FIG. 272. The brushes may be positioned such that the brushes may slightly extend into and intermesh with one another. The brushes may be metal wire brushes or polymer brushes in certain embodiments. In some embodiments, the brushes may be nylon bristled brushes. Preferably, the brush material may be selected so as to not damage any coating on the cutting element 2136.

The cleaning assembly 2143 may include a drive motor 2272 which may be coupled to a gearbox 2274. Each of the cleaning elements 2170 may be mounted to an output shaft 2176 extending from the gearbox 2174. The gearbox 2174 may be arranged such that the output shafts 2176 and the attached cleaning elements 2170 counter rotate with respect to one another when the drive motor 2172 is powered.

To clean a cutting element 2136, the cutting assembly 2137 may be displaced to the cleaning station 2143 via a cleaner actuator 2278 (e.g. pneumatic, hydraulic, electromechanical, see FIG. 265). The cutting element 2136 may then be displaced between the cleaning element 2170 and the drive motor 2172 may be powered to rotate the cleaning elements 2170. As the cleaning elements 2170 rotate, any residual polymer on the faces of the cutting element 2136 may be rubbed off of the cutting element 2136. The cleaner actuator 2278 may displace the length of cutting element 2136 back and forth between the cleaning elements 2170 to ensure that the entirety of the cutting element 2136 is cleaned.

Referring now to FIG. 273 and FIG. 274, two block diagrams of a weld opening station 2016 are depicted. As shown, the joined fill conduit 2018 and port 1654 are positioned between a support plate 2202 and a compression element 2204. The joined fill conduit 2018 and port 1654 are specifically seated against a raceway 2200 of the support plate 2202. The flow lumen 2210 in the area of the joint 2206 between the fill conduit 2018 and port 1654 is shown partially blocked by an obstruction 2208 in FIG. 273. Such an obstruction may occasionally be generated by excessive bonding of the flattened tubing as the tubing is welded in the welding assembly 2130.

Still referring to FIGS. 273-274, to break the obstruction and reopen the lumen 2210, the fill conduit dispenser 1050 and bag carriage 2000 (only the port graspers 2044A, B are shown in FIGS. 273-274 for ease of illustration) may be displaced from the weld station 2006 to the weld opening station 2016. The fill conduit dispenser 1050 and the port graspers 2044A, B may be moved such that the joined fill conduit 2018 and port 1654 are positioned in the raceway 2200 (see FIG. 273). The compression element 2204 may be displaced away from the support plate 2202 via an actuator 2214 (e.g. a linear actuator) to create a space for the joined fill conduit 2018 and port 1654 to be displaced into position against the raceway 2200.

The compression element 2204 (e.g. a roller) may then be driven over the joined fill conduit 2018 and port 1654 via powering of an actuator 2212. This may compress the tubing against the raceway 2200. As this occurs, stress may be exerted on the bond forming the obstruction 2208. This stress may disrupt the bond to remove the obstruction 2208 (see FIG. 274). Thus, the lumen 2210 may be reopened without disrupting the integrity of the joint 2206 between the filling conduit 2018 and port 1654. The bag 26 may be filled after the obstruction has been removed 2208.

In certain embodiments, the compression element 2204 may be displaced from the fill conduit port 1654 side of the joint 2206 toward the port fill conduit side of the joint 2206. This may be desirable as the fill conduit 2018 may typically be full of incompressible fluid. The length of fill conduit 2018 stored in the fill conduit dispenser 1050 may have sufficient compliance to accept any of the displaced fluid. Displacing of the compression element 2204 from the fill conduit 2018 of the joint 2206 toward the port 1654 may cause an undesirable amount of stress on the joint 2206 as the incompressible fluid is driven into the obstruction 2208.

Referring now to FIG. 275, an exemplary embodiment of the weld opening 2016 shown in FIGS. 273-274 is depicted. As shown, the support plate 2202 may be mounted to a stationary body 2216 included in the system 10. The compression element 2204 (a roller in the example embodiment) may be mounted on a boom 2218 coupled to an output of a rotary actuator 2212. The rotary actuator 2212 may be coupled to a mounting plate 2220. The mounting plate 2220 may be coupled to at least one linear actuator 2214 (two are shown in FIG. 275). Two linear actuators 2214 are shown in the example embodiment. One of the linear actuators 2214 may be replaced with a guide along which the mounting plate 2220 may slide in alternative embodiments. The linear actuator 2214 may be powered to displace the rotary actuator 2212, boom 2218, and compression element 2204 along a displacement axis oriented perpendicular to support plate

2202. As the rotary actuator 2212 is powered, the boom 2218 and compression element 2204 may be swung about a pivot axis of the output shaft 2222 of the rotary actuator 2212. When the compression element 2204 is against the raceway 2200 of the support plate 2202, the compression element 2204 may be swung along the length of the raceway 2200. The compression element 2204 may include raise regions 2205. The raised regions 2205 may ride along grooves 2207 in the support plate 2202 which may serve to guide the compression element 2204 along the raceway 2200.

Referring now also to FIG. 276, a perspective view of an example support plate 2202 is depicted. As shown, the raceway 2200 may include a flat portion 2224 and a fluted portion 2226 which may include at least one flute 2228. The width of the flute 2228 may increase as proximity to the edge of the support plate 2202 decreases. As the joined fill conduit 2018 and port 1654 are displaced to against the support plate 2202, the tubing may be nocked into place within the flute 2228 to aid in positioning the tubing. The compression element 2204 may then be driven over the joint 2206 between the fill conduit 2018 and port 1654 to disrupt any obstruction 2208. As the boom 2218 is swung to drive the compression element 2204 over the fill conduit 2018 and port 1654, the support plate 2202 may be held stationary. The mounting plate 2220 may displace away from and back towards the support plate 2202 as this occurs to accommodate the pivotal motion of the boom 2218 and compression element 2204 about the output shaft 2222 of the rotary actuator 2212.

Referring now to FIG. 277, a block diagram of an example separating station 2020 of a system 10 is shown. The separating station 2020 may include a dissociating assembly 2300. The dissociating assembly 2300 may receive a length of conduit 2305 including a joint 2206 (see, e.g., FIG. 274). The joint 2206 may be created by attaching a first conduit to a second separate conduit. For example, the length of conduit 2305 may be formed from a fill conduit 2018 which has been welded to the port 1654 of a bag 26 in a welding assembly 2030 (see, e.g., FIG. 265). The dissociating assembly 2300 may create sealed regions in the length of conduit 2305 on each side of the joint 2206 and may cut through the regions of the conduit 2305 where the seals are formed. Thus, the first conduit (e.g. fill conduit 2018) and second conduit (e.g. port 1654 of a bag 26) may be dissociated from one another. Due to the seals, cutting may be performed without exposing the interior of the length of conduit 2305 to the environment and any controlled environment in the interior lumen of the conduit 2305 may be maintained.

During cutting of the length of conduit 2305, a span of conduit including the joint 2206 may be expected from the length of conduit 2305 as scrap. Cuts in the conduit 2305 may be made in central portions of the sealed regions. As a result, the terminal ends of the dissociated first and second conduit may be sealed in addition to the ends of the scrap conduit span 2350 (see. e.g., FIG. 289). Preferably, the scrap conduit span 2350 may be cut as short as is practicable so as to minimize the amount of the first and second conduit which is consumed during the cutting operation.

As shown, the dissociating assembly 2300 may include a first die block 2302A and second die block 2302B. The die blocks 2302A, B may both include a die 2306. Each of the dies blocks 2302A, B may be disposed in opposition to one another. At least one of the die blocks 2302A, B may be displaceable with respect to the other. The die blocks 2302A, B may be displaceable from an open position (shown in FIG. 277) in which the die blocks 2302A, B are spaced apart from one another to a closed position (see, e.g., FIG. 281) in which the dies 2306 on each die block 2302A, B are driven together. In the example embodiment, the first die block 2302A is depicted coupled to an actuator 2304. The actuator 2304 may displace the first die block 2302A along a displacement axis toward and away from the second die block 2302A, B to transition the die blocks 2302A, B between the open and closed positions. The second die block 2302B may be stationary and may be mounted to an immobile portion of the system 10. In alternative embodiments, each die block 2302A, B may be mounted to a respective actuator and each die block 2302A, B may be displaced during opening and closing of the dissociating assembly 2300.

Each of the dies 2306 may thermally communicate with at least one heating element 2308. In some examples, the heating elements 2308 may be physically attached to the backsides of the die 2306. In alternative embodiments, the dies 2306 may be fastened to the die blocks 2302A, B so as to compressively sandwich each heating element 2308 between a die block 2302A, B and a die 2306. Thermal paste may be included on each side of the heating element 2308. The heating elements 2308 may be high watt density heating elements which may be powered to rapidly heat the associated die 2306 to a desired temperature. In some embodiments, the heating elements 2308 may be heated to the temperature set point in 3-10 seconds (e.g. 4-5 seconds). The heating elements 2308 used may be ceramic material heating elements with high thermal conductivity and high resistivity. For example, the heating elements 2308 may be Aluminum nitride heaters or Boron nitride heaters.

Power to the heating elements 2308 may be governed by a control system 15 which may be in data communication with at least one temperature sensor 2310 monitoring the temperature of dies 2306. In various embodiments, each die 2306 may be monitored by one or more temperature sensor 2310 which may be mounted to or in a receptacle of each die 2306. The temperature sensors 2310 may be resistance temperature detectors in certain examples though other varieties of temperature sensors may be used. The control system 15 may command power to the heating elements 2308 based on data from the temperature sensors 2310 to heat the die 2306 to a predetermined heating temperature set point. The heating temperature set point may be dependent on the conduit 2305 material and the desired cycle time. Where a PVC conduit 2305 is used, the heating temperature set point may be between 145°-160° C. Higher temperatures may shorten the duration of the sealing and cutting operation. For example, at about 160° C. cutting and sealing may be completed in about one second.

The dissociating assembly 2300 may also include at least one cooling assembly 2312 in thermal communication with each of the dies 2306. In the example embodiment, a cooling assembly 2312 for each die block 2302A, B is depicted. Each of the cooling assemblies 2312 may include at least one cooling fan 2314 and at least one heat sink 2316. The heat sinks 2316 may include a plurality of fins and at least one heat pipe 2315. The heat sink(s) 2316 of each cooling assembly 2312 may include a conductive baseplate 2317 which may be coupled to one of the die blocks 2302A, B via a thermal adhesive or thermal paste. The cooling assemblies 2312 may be fastened to the die blocks 2302A, B such that the conductive baseplates 2317 are compressively sandwiched between the die blocks 2302A, B and the rest of each respective cooling assembly 2312. The cooling fans 2314 may be any suitable cooling fan. In certain embodiments, the cooling fans 2314 may be CPU cooling fans. In some embodiments, the cooling fans 2314 may have an CFM rating of at least 70 (e.g. 75).

The cooling assemblies 2312 may be capable of rapidly cooling the dies 2306 after cutting and formation of sealed regions within the conduit 2305. The control system 15 may orchestrate powering of the cooling fans 2314 based on data from the temperature sensors 2310 to cool the dies 2306 to a predetermined cooling temperature set point (e.g. 70°-100° C.). The decrease in temperature between the heating temperature set point and the cooling temperature set point may be between 45°-90° C. The cooling temperature set point may depend on the type of material from which the conduit 2305 is formed. In certain examples, the cooling assemblies 2312 may cool the dies 2306 to a temperature at which the conduit 2305 may be removed from the dissociating assembly 2312 in 5-15 seconds (e.g. 8-12 seconds).

As shown in FIG. 277, the displaceable die block 2302A may include a stop projection 2318. The stop projection 2318 may be formed adjacent or as part of the die 2306 of the first die block 2302A. The separating station 2020 may include a scrap retainer assembly 2324. The scrap retainer assembly 2324 may include a scrap retainer element 2320 and a scrap retention actuator 2322. As shown, the scrap retention assembly 2324 may be coupled to the first die block 2302A such that the scrap retention assembly 2324 moves in tandem with the first die block 2302A. The scrap retainer element 2320 may be driven by the scrap retention actuator 2322 from a retracted position distal to the dies 2306 (shown in FIG. 277) to a deployed position proximal the stop projection 2318.

After the length of conduit 2305 has been sealed and cut, the scrap retainer element 2320 may be displaced by the actuator 2322 from the distal position to the proximal position. This may press the scrap conduit span 2350 (see, e.g., FIG. 289) against the stop projection 2318 and capture the scrap conduit span 2350 between the scrap retainer element 2320 and stop projection 2318. With the scrap conduit span 2350 captured, the actuator 2304 for the first die block 2302A may be powered to displace the first die block 2302A to the open position.

As shown, the separating station 2020 may also include a scrap collection assembly 2326. The scrap collection assembly 2326 may include a scrap collection actuator 2328 and a scrap container 2330. After the first die block 2302A is brought to the open position, the scrap collection actuator 2328 may displace the scrap container 2330 into the space between the two die blocks 2302A. The scrap retention actuator 2322 may then be powered to retract the scrap retainer element 2320 away from the stop projection 2318. This may free the scrap conduit span and allow the scrap conduit span to fall into the scrap container 2330. The scrap collection actuator 2328 may then displace the scrap container 2330 out of the space between the die blocks 2302A, B. In some examples, the scrap container 2330 may be displaced to a waste chute or the like and the scrap collection actuator 2330 may be powered to dump any scrap conduit spans in the scrap container 2330 into the waste chute.

Referring now to FIG. 278, a front view of an example embodiment of the separating station 2020 shown in FIG. 277 is depicted. As shown, die blocks 2302A, B are shown in an open state. The scrap retention element 2320 is depicted in a retracted state. Additionally, the scrap container 2330 is depicted in a withdrawn state and clear of the space between the die blocks 2302A, B. A portion of the ventilation system 2010 is also depicted in FIG. 278. The ventilation system 2010 may include two ports 2013 adjacent one of the dies 2306. In the example embodiment, the ports 2013 are disposed adjacent the die 2306 included on die block 2302B. The ports 2013 may be connected to a ventilation line 2011 which may be plumbed to an exhaust system 2008 of the system 10 and may help to remove any fumes generated during sealing and cutting of tubing.

Referring now to FIG. 279, a perspective view of a portion of the dissociating assembly 2300 including the first die block 2302A and scrap retainer assembly 2324 is depicted. The scrap retention element 2320 is shown in a deployed state proximal to the stop projection 2318. In the example embodiment, the stop projection 2318 is included on the die 2306. The scrap retention element 2320 may be displaced to the deployed state prior to the die blocks 2302A, B being closed upon a length of conduit to be cut.

As shown, the scrap retention actuator 2322 may be a linear actuator (e.g. pneumatic, hydraulic, electromechanical) which may displace the scrap retention element 2320 along an axis. The displacement axis may be substantially perpendicular to a face of the stop projection 2318. Referring now also to FIG. 280, a perspective view of an example scrap retention element 2320, the scrap retention element 2320 may include an elongate member 2336 which extends from a mounting segment 2338. The mounting segment 2338 may be coupled to an output body 2340 of the actuator 2322. The elongate member 2336 may include a terminal end opposite the mounting segment 2338 which may include a notch 2342. The notch 2342 may encompass a portion of a scrap conduit span 2350 (see, e.g., FIG. 289) held against the stop projection 2318 after cutting has completed. The elongate member 2336 may also include a chamfered face 2344. The chamfered face 2344 may be the face of the elongate member 2336 most proximal the opposing die body 2302B.

Still referring to FIG. 279, the die blocks 2302A, B may be mounted to the dissociating assembly 2300 via fasteners 2345. Thin bridges 2347 of material may connect the portions of the die blocks 2302A, B including the fasteners 2345 to portions of the die blocks 2302A, B to which the dies 2306 are mounted. The thin bridges 2347 may help to inhibit flow of heat from the die blocks 2302A, B to the components of the dissociating assembly 2300 to which the die blocks 2302A, B are coupled via the fasteners 2345.

Referring now to FIG. 281 and FIG. 282, the die bodies 2302A, B are shown in the closed position. The scrap retention element 2320 may be in the deployed state as the die bodies 2302A, B are initially transitioned to the closed position as shown in FIG. 281. The scrap retention actuator 2322 may subsequently be powered to retract the scrap retention element 2320 clear of the dies 2306 as shown in FIG. 282. Though not shown in FIGS. 281-282 (see FIGS. 285A-287B), a length of conduit would be secured between the dies 2306 as the die bodies 2302A, B are driven to the closed position. While in the position shown in FIG. 282, the heating elements 2308 (see, e.g., FIG. 277) may be powered to heat the dies 2306. As a result, the sealed regions may be established in the length of conduit in the and the dies 2306 may cut through the conduit in the sealed regions. The cut and seals may be generated without exposure of the interior of the conduit to the surrounding environment. Thus sterility of the interior of the conduit may be maintained where the interior of the conduit 2305 is provided in a sterile state.

Referring now to FIGS. 283-284 an exemplary die 2306 and a cross-section of two dies 2306 disposed adjacent and in opposition to one another are respectively depicted. The dies 2306 on each of the die blocks 2302A, B may be essentially the same. In the example shown in FIG. 283, the die 2306 includes a stop projection 2318 and scrap retention element guides 2346. These may be omitted on the opposing one of the dies 2306. As shown, each of the dies 2306 may include a substantially flat medial region 2360. The medial region 2360 may be flanked on each side by a set of first raised sealing surfaces 2362A, B. The set of first raised sealing surfaces 2362A, B may also be substantially flat and may extend along a plane which is parallel to the medial region 2360.

There may be a medial ramped region 2364 which spans between the medial region 2360 and each of the first raised sealing surfaces 2362A, B. The transition between the medial region 2360 and medial ramped regions 2364 may be rounded. Likewise, the transition between the medial ramped regions 2364 and the first raised sealing surfaces 2362A, B may also be rounded. When the dies 2306 are brought together, the distance between the first raised sealing surfaces 2362A, B of each die 2306 may be selected so as to be less than the thickness of the collapsed walls of a conduit intended to be sealed and cut by the dies 2306. In some embodiments, the distance may be 65-85% (e.g. 75%) of the thickness of the conduit walls.

Each of the dies 2306 may include peak elements 2366 which may separate the first raised sealing surfaces 2362A, B from a set of second raised sealing surfaces 2368A, B. The peak elements 2366 may extend proud of the first and second raised sealing surfaces 2362A, B, 2368A, B. The transitions from the first and second raised sealing surfaces 2362A, B, 2368A, B to the peak elements 2366 may be rounded. When the dies 2306 are displaced against one another, the peak elements 2366 on each of the opposing dies 2306 may come into contact. The peak elements 2366 may include a rounded or pointed end in certain examples. In the embodiment shown, the end of the peak elements 2366 are depicted as a flat plateau.

The second raised sealing surfaces 2368A, B may be substantially flat and may extend substantially parallel to the medial regions 2360 of the dies 2306. When the dies 2306 are brought together, the distance between the second raised sealing surfaces 2368A, B of each die 2306 may be selected so as to be less than the thickness of the collapsed walls of a conduit intended to be sealed and cut by the dies 2306. In some embodiments, the distance may be 50-90% (e.g. 75%) of the thickness of the conduit walls. The second raised sealing surfaces 2368 A, B may be coplanar with the first raised sealing surfaces 2362A, B in certain embodiments.

A lateral ramped region 2372 may extend from each of the second raised sealing surfaces 2368A, B of each die 2306 to a set of lateral retention surfaces 2374. The lateral retention surfaces 2374 may be substantially flat and may be parallel to the medial region 2360. The transitions to the lateral ramped regions 2372 from the second raised sealing surfaces 2368A, B and lateral retention surfaces 2374 may be rounded. When the dies 2306 are displaced against one another the distance between opposing lateral retention surfaces 2374 may be less than the outer diameter of a conduit intended to be sealed and cut by the dies 2306. This may ensure that as the dies 2306 are closed against the conduit, some pressure may be exerted against the conduit to aid in holding the conduit in place within the dies 2306. Preferably, the distance between the opposing lateral retention surfaces 2374 may be such that the lumen within the conduit 2305 is not collapsed. Thus, the distance between the opposing lateral retention surfaces 2374 may be greater than the thickness of the conduit walls.

Each of the lateral retention surfaces 2374 may include a depression 2376 which may extend to a side 2378 of the die 2306. The depth of the depression 2376 may be greatest at the side 2378 of the die 2306 and may decrease in depth in continuous fashion as distance from the side 2378 of the die 2306 increases. Additionally, the depth of the depression 2376 may increase as distance from the midplane of the die 2306 decreases. When the dies 2306 are displaced against one another the distance between opposing surfaces of the depressions 2376 at the sides 2378 of the dies 2306 may be no greater than equal to the outer diameter of a conduit intended to be sealed and cut by the dies 2306. In certain examples the distance between opposing surfaces of the depressions 2376 at the sides 2378 of the dies 2306 may be 90-100% of the outer diameter of the conduit 2305. This may help to locate and hold the conduit 2305 in place within the dies 2306. Additionally, preventing substantial compression of the conduit 2305 in these areas may help to ensure that the peripheral edges of the dies 2306 do not cut into the conduit 2305 as the dies 2306 are heated.

The sets of second raised sealing surfaces 2368A, B, lateral ramped regions 2372, lateral retention surfaces 2374, and depressions 2376 on each side of the dies 2306 may collectively form conduit shaping regions 2380. As best shown in FIG. 283, the dies 2306 may include sets of walls 2370 which may flank each of the conduit shaping regions 2380. The walls 2370 may extend proud of the second raised sealing surfaces 2368A, B. When the dies 2306 are displaced against one another the walls 2370 of the opposing dies 2306 may contact and sit against one another. The walls 2370 may act as polymer flow barriers which obstruct molten polymer from flowing outside of the conduit shaping regions 2380 of each die 2306.

The progression of FIG. 285A through FIG. 287B depict an illustrative length of conduit 2305 being sealed and cut by dies 2306 of an example dissociation assembly 2300. In the progression of FIG. 285A through FIG. 287B the conduit 2305 is shown as a piece of fill conduit 2018 and a port 1654 of a bag 26 which have been coupled to one another at a joint 2206. The conduit 2305 is liquid filled as represented by the stippling within the lumen 2210 of the conduit 2305. Though a fill conduit 2018 and port 1654 are shown for sake of example, any type of conduit may be sealed and cut. Though the example embodiment is described in the context of liquid filled conduits, the disclosure is not limited to sealing and cutting of liquid filled conduits. Gas filled conduits may also be sealed and cut in the manner described in relation to the progression of FIG. 285A through FIG. 287B.

Referring specifically to FIGS. 285A-B, a set of cross-sectional views are shown. FIG. 285A depicts a cross-sectional view through the midplane of the example dies 2306. FIG. 285B is a cross section taken along the plane of the top surface of the walls 2370 of one of the dies 2306. As shown, the conduit 2305 may be positioned on the die 2306 of the second die body 2302B. The conduit 2305 may for example be displaced to the die 2306 via a bag carriage 2000 (see, e.g., FIG. 252) and dispenser carriage 2242 (see, e.g., FIG. 262) of the system 10. The scrap retainer element 2320 may be actuated to the deployed state.

Referring now to FIGS. 286A-B another set of cross-sectional views are shown. FIG. 286A depicts a cross-sectional view through the midplane of the example dies 2306. FIG. 286B is a cross section taken along the plane of the top surface of the walls 2370 of one of the dies 2306. The die actuator 2304 (see, e.g., FIG. 278) may be powered to transition the die bodies 2302A, B to the closed position. As the die bodies 2302A, B are brought together, a bottom face of the scrap retention element 2320 may contact the region of the conduit 2305 including the joint 2206. Further displacement of the die body 2302A may press the scrap retention element 2320 into the region including the joint 2206 to at least partially collapse the conduit 2305 in this region. This may drive fluid in the conduit 2305 out of the region of the conduit 2305 including the joint 2206. The contours of the chamfered face 2344 of the scrap retention element 2320 may aid in directing fluid away from the joint 2206 region.

When the closed position is reached (shown in FIG. 286A-B), the conduit 2305 may be flattened and compressed between the first and second raised sealing surfaces 2362A, B, 2368A, B. The peak elements 2366 may press into, but not cut the conduit 2305. This may firmly occlude the conduit 2305 at these locations. Thus, the span of the conduit 2305 including the joint 2206 may be isolated from the remainder of the conduit 2305 allowing the scrap retainer element 2320 to be retracted. A constant pressure may be applied on the conduit 2305 by the dies 2306 when the dies 2306 are in the closed position.

Referring now to FIGS. 287A-B another set of cross-sectional views are shown. FIG. 287A depicts a cross-sectional view through the midplane of the example dies 2306. FIG. 287B is a cross section taken along the plane of the top surface of the walls 2370 of one of the dies 2306. As mentioned above, the control system 15 may command the heating elements 2308 associated with each die 2306 to heat to a heating temperature set point once the scrap retainer element 2320 has been withdrawn. The chamfered face 2344 may aid in withdrawal of the scrap retention element 2320 as the chamfers may be cut at an angle. Thus the chamfers may form ramps which may facilitate removal of the scrap retention element.

As the dies 2306 are heated, conduit 2305 may become sufficiently molten that the walls of the conduit 2305 may seal together in the regions compressed between the first and second raised sealing surfaces 2362A, B, 2368A, B. The constant pressure exerted by the dies 2306 on the conduit 2305 may cause the peak elements 2366 to press through the conduit 2305 dissociating the portions of the conduit 2305 on each side of the dies 2306. In the example embodiment, the port 1654 may be separated from the fill conduit 2018. A scrap conduit span 2350 between the peak elements 2366 may also be generated. As the regions of the conduit 2305 cut by the peak elements 2366 may be firmly occluded and sealed, the interior lumen 2210 of the conduit 2305 may not be exposed to the surrounding environment as the conduit 2305 is cut. As a result, any controlled environment (e.g. sterile environment) within the lumen 2210 may be preserved.

When heated, the conduit 2305 material may flow and spread along at least the first and second raised sealing surfaces 2362A, B, 2368A, B due to the compression. The walls 2370 flanking the second raised sealing surfaces 2368A, B may constrain the flow of this material such that the spreading is limited. As a result, the cut ends of the fill conduit 2018 and port 1654 may reliably be shaped to a substantially controlled form which may provide a robust seal. Additionally, where the interior volume of the conduit 2305 is filled with liquid, the liquid may help to resist the flow of conduit 2305 material into the lumen 2210. Thus, the liquid within the conduit 2305 may be leveraged to help constrain flow of molten conduit 2305 material as well. As mentioned above, once sealing and cutting has concluded, the cooling assemblies 2312 (see, e.g., FIG. 277) may be powered to decrease the temperature of the conduit 2305 and dies 2306 to a cooling temperature set point at which the port 1654 and fill conduit 2018 may be removed.

After cutting is completed and referring now to FIGS. 288-289, the scrap retention actuator 2322 may be powered to deploy the scrap retention element 2320. The scrap conduit span 2350 may be displaced against the stop projection 2318 of one of the dies 2306 by the scrap retention element 2320. The scrap retention element 2320 may be deployed until a certain predefined pressure is exerted against the scrap conduit span 2350 to prevent bursting of the scrap conduit span 2350. The notch 2342 of the scrap retention element 2320 may also surround and cradle a portion of the scrap conduit span 2350. Thus, with the scrap retention element 2320 deployed, the scrap conduit span 2350 may be held and retained in place on the die 2306. The die actuator 2304 may be powered to transition the die bodies 2302A, B to the open position.

Referring now to FIGS. 290-292, the scrap collection actuator 2328 may then be powered to displace the scrap collection container 2330 into the space between the die bodies 2302A, B. As shown, the scrap collection actuator 2328 is a rotary actuator (e.g., pneumatic, hydraulic, electromechanical). The scrap collection container 2330 may be attached to an output of the scrap collection actuator 2328 by an arm 2352. Once the scrap collection container 2330 is in position under the scrap retention element 2320, the scrap retention element 2320 may be retracted by the scrap retention actuator 2322. The scrap conduit span 2350 may fall from the die 2306 and into the scrap collection container 2330. The scrap collection actuator 2328 may then be powered to swing the scrap collection container 2330 to a withdrawn position. In the event that the scrap conduit span 2350 sticks to the scrap retention element, the scrap retention element guides 2346 may block movement of the scrap conduit span 2350 as the scrap retention element 2320 is retracted. Thus, the scrap retention element guides may dislodge a stuck scrap conduit span 2350 from the scrap retention element 2320.

Various alternatives and modifications can be devised by those skilled in the art without departing from the disclosure. Accordingly, the present disclosure is intended to embrace all such alternatives, modifications and variances. Additionally, while several embodiments of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. And, those skilled in the art will envision other modifications within the scope and spirit of the claims appended hereto. Other elements, steps, methods and techniques that are insubstantially different from those described above and/or in the appended claims are also intended to be within the scope of the disclosure.

The embodiments shown in drawings are presented only to demonstrate certain examples of the disclosure. And, the drawings described are only illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B.

Furthermore, the terms "first", "second", "third" and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the embodiments of the disclosure described herein are capable of operation in other sequences and/or arrangements than are described or illustrated herein.

What is claimed is:

1. A method of establishing a fluid coupling between a port and a manifold comprising:

advancing the port into a receptacle of the manifold until the port reaches a first position in which a cover of the port is spaced from a piercing member of the receptacle and a first sealing member of the port is in a sealing relationship against a sidewall of the receptacle;

bathing the port in high temperature fluid flowing from the piercing member to a disinfection flow path in communication with the receptacle for a predetermined period of time;

advancing the port into the receptacle to a second position in which the piercing member has punctured through the cover on the port and a second sealing member of the port has formed a seal against the sidewall of the receptacle between the piecing member and the disinfection flow path.

2. The method of claim 1, wherein the port is included in a cartridge of dissolvable crystalline salt.

3. The method of claim 1, wherein the method further comprises flowing diluent through the piercing member and into a cartridge bearing the port.

4. The method of claim 1, wherein the cover is constructed of at least one material selected from a list consisting of foil, foam, and plastic.

5. The method of claim 1, wherein the method further comprises flowing the high temperature fluid through the disinfection flow path and into a second receptacle of the manifold.

6. The method of claim 5, wherein the method further comprises bathing a second port disposed within the second receptacle with the high temperature fluid.

7. The method of claim 5, wherein the method further comprises flowing the high temperature fluid out of the second receptacle via a second piercing member which is disposed in the second receptacle.

8. The method of claim 1, wherein advancing the port to the first position comprises driving a carriage coupled to a cartridge from which the port extends in a first direction.

9. The method of claim 1, wherein advancing the port to the second position comprises driving a carriage coupled to a cartridge from which the port extends in a first direction.

10. A method of establishing a fluid coupling between a port and a receptacle comprising:

advancing the port into a receptacle until the port reaches a first position in which a cover of the port is spaced from a piercing member of the receptacle and a first sealing member of the port is in a sealing relationship against a sidewall of the receptacle;

bathing the port in disinfecting fluid flowing from the piercing member to a disinfection flow path in communication with the receptacle;

advancing the port into the receptacle to a second position in which the piercing member has punctured through the cover on the port and a second sealing member of the port provides a seal against the sidewall of the receptacle intermediate the piecing member and the disinfection flow path.

11. The method of claim 10, wherein the port is included in a cartridge having a flow path therethrough.

12. The method of claim 10, wherein the method further comprises flowing diluent through the piercing member and into a cartridge from which the port projects.

13. The method of claim 10, wherein the cover is constructed of at least one material selected from a list consisting of foil, foam, and plastic.

14. The method of claim 10, wherein the method further comprises flowing the disinfection fluid through the disinfection flow path and into a second receptacle in fluid communication with the disinfection flow path.

15. The method of claim 14, wherein the method further comprises bathing a second port disposed within the second receptacle in the disinfection fluid.

16. The method of claim 14, wherein the method further comprises flowing the disinfection fluid out of the second receptacle via a second piercing member which is disposed in the second receptacle.

17. The method of claim 10, wherein advancing the port to the first position comprises driving a carriage coupled to a cartridge from which the port extends in a first direction.

18. The method of claim 10, wherein advancing the port to the second position comprises driving a carriage coupled to a cartridge from which the port extends in a first direction.

19. A method of establishing a fluid coupling between a port and a receptacle comprising:

advancing the port into a receptacle until the port reaches a partially installed position in which a cover of the port is spaced from a piercing member of the receptacle and a first sealing member of the port is in a sealing relationship against a sidewall of the receptacle;

disinfecting the port with fluid flowing from the piercing member to a disinfection flow path in communication with the receptacle;

advancing the port into the receptacle to a spiked position in which the piercing member has punctured through the cover and a second sealing member of the port provides a seal against the sidewall of the receptacle blocking flow between the piercing member and the disinfection flow path.

20. The method of claim 19, wherein the port extends from a cartridge.

21. The method of claim 19, wherein the advancing the port into the port to the partially installed position and the spike position comprises driving an actuator coupled to a cartridge from which the port extends.

22. The method of claim 19, wherein the method further comprises flowing diluent through the piercing member and into a cartridge from which the port projects.

23. The method of claim 19, wherein the method further comprises flowing the disinfection fluid through the disinfection flow path and into a second receptacle in fluid communication with the disinfection flow path.

24. The method of claim 23, wherein the method further comprises bathing a second port disposed within the second receptacle in the disinfection fluid.

25. The method of claim 23, wherein the method further comprises flowing the disinfection fluid out of the second receptacle via a second piercing member which is disposed in the second receptacle.

* * * * *